US008153279B2

(12) United States Patent
Eum et al.

(10) Patent No.: US 8,153,279 B2
(45) Date of Patent: Apr. 10, 2012

(54) ORGANIC ELECTROLUMINESCENT COMPOUNDS AND ORGANIC ELECTROLUMINESCENT DEVICE USING THE SAME

(75) Inventors: Sung Jin Eum, Seoul (KR); Young Jun Cho, Seoul (KR); Hyuck Joo Kwon, Seoul (KR); Bong Ok Kim, Seoul (KR); Sung Min Kim, Seoul (KR); Seung Soo Yoon, Seoul (KR)

(73) Assignee: Gracel Display Inc., Seoul (KR)

( * ) Notice: Subject to any disclaimer, the term of this patent is extended or adjusted under 35 U.S.C. 154(b) by 514 days.

(21) Appl. No.: 12/456,844

(22) Filed: Jun. 23, 2009

(65) Prior Publication Data

US 2010/0033083 A1 Feb. 11, 2010

(30) Foreign Application Priority Data

Jun. 24, 2008 (KR) ........................ 10-2008-0059496

(51) Int. Cl.
*H01L 51/54* (2006.01)

(52) U.S. Cl. ........ 428/690; 428/917; 544/234; 564/234; 313/504; 313/505; 313/506; 136/263; 257/40

(58) Field of Classification Search ................. 428/690, 428/917; 544/234; 564/234; 313/504, 505, 313/506; 136/263; 257/40
See application file for complete search history.

(56) References Cited

U.S. PATENT DOCUMENTS

| | | | |
|---|---|---|---|
| 7,888,863 B2 * | 2/2011 | Shin et al. | 313/504 |
| 2006/0192482 A1 * | 8/2006 | Igarashi et al. | 313/504 |

* cited by examiner

*Primary Examiner* — Jennifer Chriss
*Assistant Examiner* — Gregory Clark
(74) *Attorney, Agent, or Firm* — Edwin Oh

(57) ABSTRACT

Provided are novel organic electroluminescent compounds, and organic electroluminescent devices and organic solar cells employing the same. Specifically, the organic electroluminescent compounds according to the invention are characterized in that they are represented by Chemical Formula (1):

Chemical Formula 1

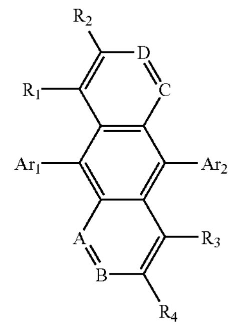

wherein, A, B, C and D independently represent $CR_5$ or N, provided that A, B, C and D cannot represent $CR_5$ all at the same time.

Since the organic electroluminescent compounds according to the invention have good luminous efficiency and excellent color purity and life property of material, OLED's having very good operation life can be manufactured therefrom.

9 Claims, 1 Drawing Sheet

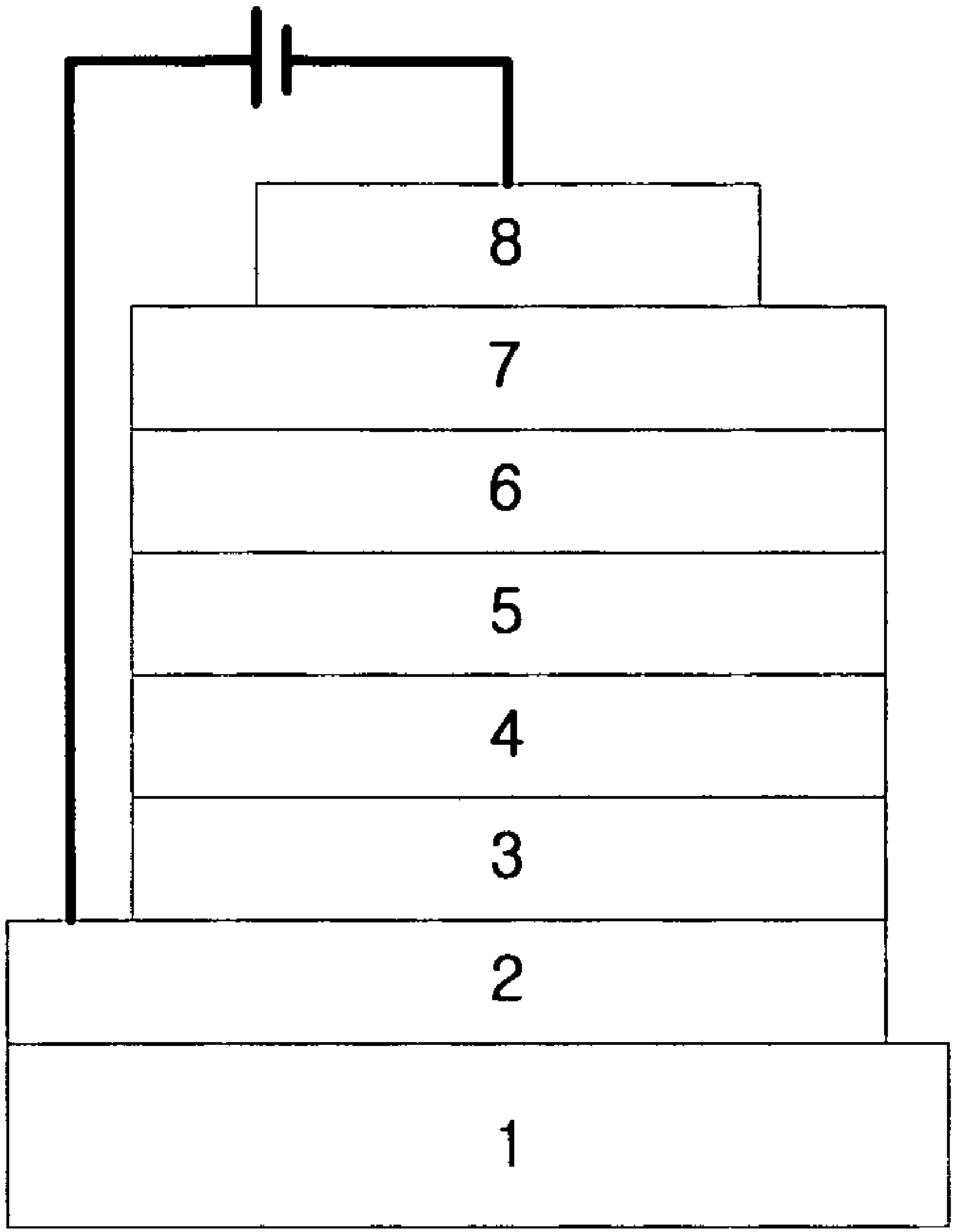
8
7
6
5
4
3
2
1

ORGANIC ELECTROLUMINESCENT COMPOUNDS AND ORGANIC ELECTROLUMINESCENT DEVICE USING THE SAME

FIELD OF THE INVENTION

The present invention relates to novel organic electroluminescent compounds, and organic electroluminescent devices employing the same in an electroluminescent layer. More specifically, the invention relates to novel organic electroluminescent compounds to be employed as green or blue electroluminescent material, and organic electroluminescent devices employing the same as host.

BACKGROUND OF THE INVENTION

Three electroluminescent materials (for red, green and blue) are employed to realize a full-colored OLED display. The important issue is to develop red, green and blue electroluminescent materials with high efficiency and long life, in order to enhance the overall feature of the organic electroluminescent (EL) devices. The EL materials are classified into host materials and dopant materials from the aspect of their functions. It is generally known that a device structure having the most excellent EL properties can be fabricated with an EL layer prepared by doping a dopant to a host. Recently, development of organic EL devices with high efficiency and long life comes to the fore as an urgent subject, and particularly urgent is development of a material with far better EL properties as compared to conventional EL materials as considering EL properties required for a medium to large sized OLED panel. From this point of view, development of host material is one of the most important issues to be settled. The desired properties for the host material (serving as a solvent and energy conveyer in solid state) are high purity and appropriate molecular weight to enable vapor-deposition in vacuo. In addition, glass transition temperature and thermal decomposition temperature should be high enough to ensure thermal stability. Further, the host material should have high electrochemical stability for providing long life. It is to be easy to form an amorphous thin film, with high adhesiveness to other materials of adjacent layers but without interlayer migration.

In the meanwhile, for conventional blue materials, a number of materials have been developed and commercialized since the development of diphenylvinyl-biphenyl (DPVBi) (Compound a) by Idemitsu-Kosan. In addition to the blue material system from Idemitsu-Kosan, dinaphthylanthracene (DNA) (Compound b) of Kodac, tetra(t-butyl)perylene (Compound c) system or the like have been known. However, extensive research and development should be performed with respect to these materials. The distryl compound system of Idemitsu-Kosan, which is known to have highest efficiency up to now, has 6 lm/W power efficiency and beneficial device lifetime of more than 30,000 hr. However, when it is applied to a full-colored display, the lifetime is merely several thousand hours, owing to decrease of color purity over operation time. In case of blue electroluminescence, it becomes advantageous from the aspect of the luminous efficiency, if the electroluminescent wavelength is shifted a little toward longer wavelength. However, it is not easy to apply the material to a display of high quality because of unsatisfactory color purity in blue. Furthermore, the research and development of such materials are urgent because of the problems in color purity, efficiency and thermal stability.

Compound a

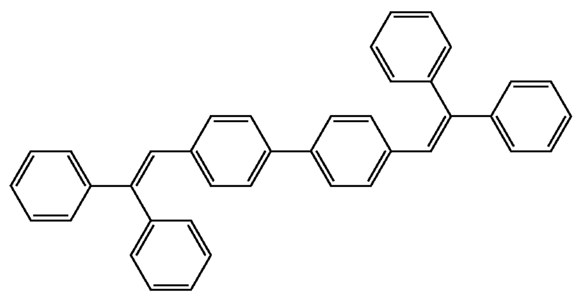

Compound b

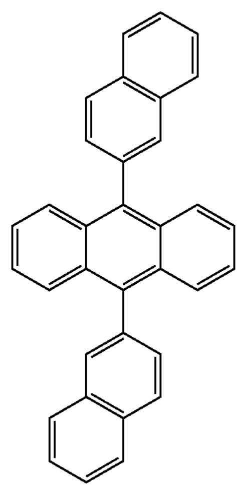

Compound c

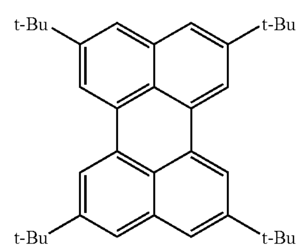

In order to develop a host material with high efficiency and long life, compounds based on different backbones have been disclosed, such as dispiro-fluorene-anthracene (TBSA), terspirofluorene (TSF) and bitriphenylene (BTP). These compounds, however, did not result in color purity and luminous efficiency at a sufficient level.

-continued

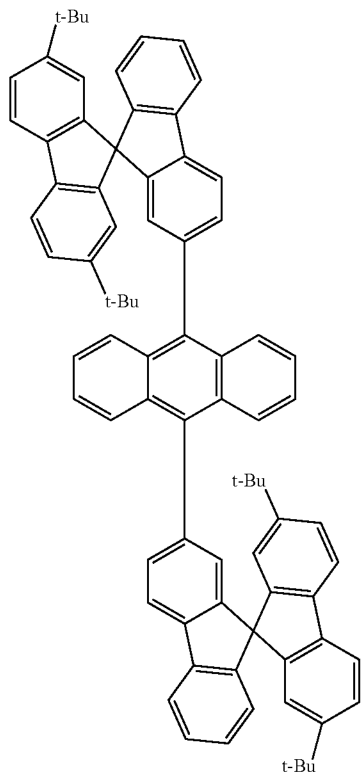

TBSA

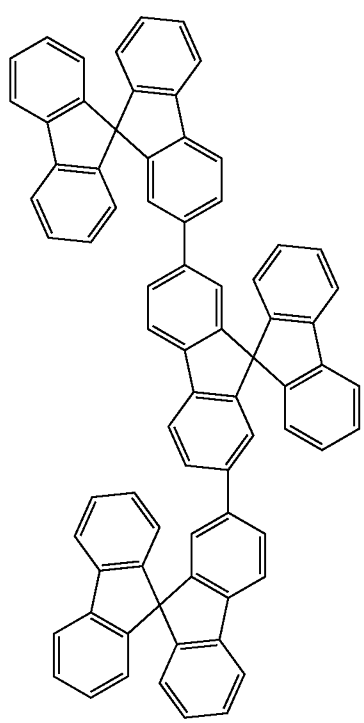

TSF

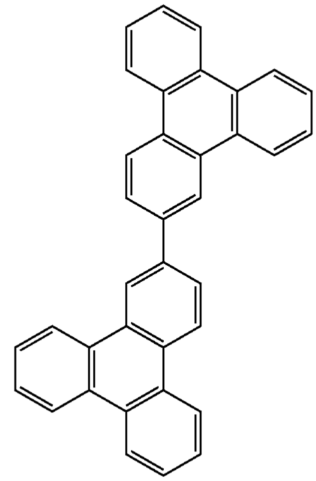

BTP

The compound TBSA as reported by Gyeongsang National University and Samsung SDI (Kwon, S. K. et al., Advanced Materials, 2001, 13, 1690; Japanese Patent Laid-Open No. 2002121547), showed luminous efficiency of 3 cd/A at 7.7 V, and relatively good color coordinate of (0.15, 0.11), but it was applied as a material for a single layer, being inappropriate for practical use. The compound TSF reported by Taiwan National University (Wu, C.-C. et al., Advanced Materials, 2004, 16, 61; US Patent Publication No. 2005040392) showed relatively good external quantum efficiency of 5.3%, but it was still inappropriate for practical use. The compound BTP reported by Chingwha National University of Taiwan (Cheng, C.-H. et al., Advanced Materials, 2002, 14, 1409; US Patent Publication No. 2004076852) showed luminous efficiency of 2.76 cd/A and relatively good color coordinate of (0.16, 0.14), but this was still insufficient for practical use.

As described above, conventional materials are constituted of a single layer, not forming a host-dopant thin layer, and is difficult to be used practically from the aspect of color purity and efficiency. There are not enough data reliable, with respect to its long life.

In the meanwhile, according to a patent application of Mitsui Chemicals (Japan) (U.S. Pat. No. 7,166,240), the compounds shown below have the absorption spectra at 390 to 430 nm, with luminous efficiency of 4.6 cd/A. However, on the basis of these data, the compounds with above absorption wavelength range, electroluminescence of greenish blue color is anticipated, and the Patent Publication also indicates the color as bluish green color.

Particularly, embodiment of pure blue color is impossible with the symmetrical structure of the Patent Publication, and the material, which cannot provide pure blue luminescence, is inadequate to be practically applied to a full-colored display.

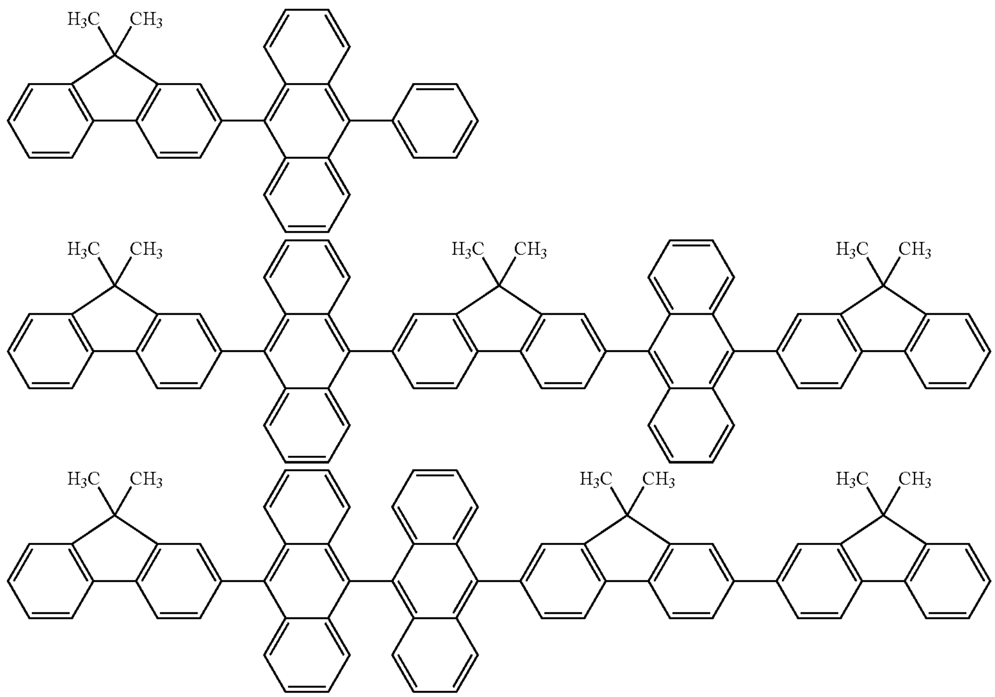

SUMMARY OF THE INVENTION

With intensive efforts to overcome the problems of conventional techniques as described above, the present inventors have invented novel electroluminescent compounds to realize an organic electroluminescent device having excellent luminous efficiency and noticeably improved lifetime.

The object of the present invention is to provide organic electroluminescent compounds having the backbone to give more excellent electroluminescent properties, longer device life and appropriate color coordinate, as compared to those of conventional host materials, with overcoming disadvantages of them.

Another object of the invention is to provide organic electroluminescent devices of high efficiency and long life, which employ said organic electroluminescent compounds as electroluminescent material.

Thus, the present invention relates to organic electroluminescent compounds represented by Chemical Formula (1), and organic electroluminescent devices comprising the same. Since the organic electroluminescent compounds according to the invention have good luminous efficiency and excellent color purity and life property of material, OLED's having very good operation life can be manufactured therefrom.

Chemical Formula 1

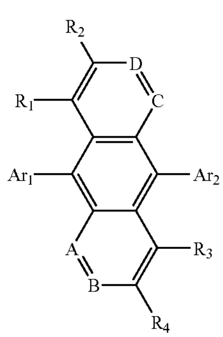

In Chemical Formula (1), A, B, C and D independently represent $CR_5$ or N, provided that A, B, C and D cannot represent $CR_5$ all at the same time;

$R_1$ through $R_5$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl, or $R_1$ and $R_2$ or $R_3$ and $R_4$ may be independently linked via (C3-C60)alkylene or (C3-C60)alkenylene with or without a fused ring to form an alicyclic ring, a mono- or a poly-cyclic aromatic ring; the alkylene or alkenylene may be further substituted by one or more substituent(s) selected from halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro and hydroxyl;

$Ar_1$ and $Ar_2$ independently represent (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2 C60)alkynyl, (C1-C60)alkoxy, cyano, (C1-C60)alkylamino, (C6-C60)arylamino, (C6-C60)ar(C1-C60)alkyl, (C6-C60)

aryloxy, (C6-C60)arylthio, (C1-C60)alkylthio, (C1-C60) alkoxycarbonyl, (C1-C60)alkylcarbonyl, (C6-C60) arylcarbonyl, carboxyl, nitro, hydroxyl,

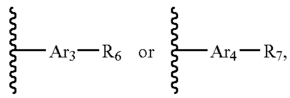

or a substituent represented by one of the following structural formulas:

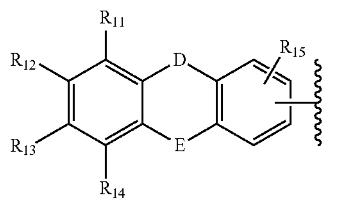

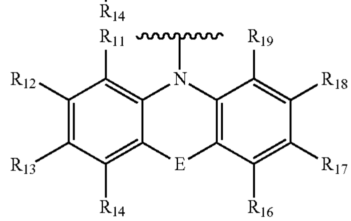

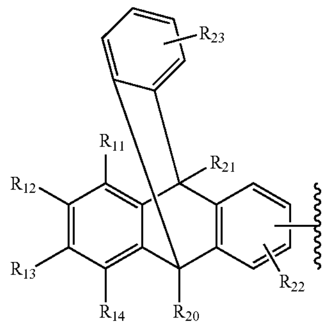

$Ar_3$ and $Ar_4$ independently represent (C1-C60)alkylenoxy, (C1-C60)alkylenethio, (C6-C60)arylenoxy, (C6-C60)arylenethio, (C6-C60)arylene or (C3-C60)heteroarylene;

$R_6$ and $R_7$ independently represent (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C6-C60)arylthio, (C1-C60)alkylthio, (C1-C60) alkoxycarbonyl, (C1-C60)alkylcarbonyl, (C6-C60)arylcarbonyl, carboxyl, nitro or hydroxyl;

$R_{11}$ through $R_{23}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri (C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60) alkylthio, (C1-C60)alkoxycarbonyl, (C1-C60)alkylcarbonyl, (C6-C60)arylcarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, a monocyclic or polycyclic aromatic ring;

D and E independently represent a chemical bond, —$(CR_{31}R_{32})_a$—, —$N(R_{33})$—, —S—, —O—, —$Si(R_{34})(R_{35})$—, —$P(R_{36})$—, —C(═O)—, —$B(R_{37})$—, —$In(R_{38})$—, —Se—, —$Ge(R_{39})(R_{40})$—, —$Sn(R_{41})(R_{42})$—, $Ga(R_{43})$— or —$(R_{44})C$═$C(R_{45})$—;

$R_{31}$ through $R_{45}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri (C6 C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60) alkylthio, (C1-C60)alkoxycarbonyl, (C1-C60)alkylcarbonyl, (C6-C60)arylcarbonyl, carboxyl, nitro or hydroxyl; or $R_3$, and $R_{32}$, $R_{34}$ and $R_{35}$, $R_{39}$ and $R_{40}$, $R_{41}$ and $R_{42}$, or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino, arylamino, alkylthio, aryloxy, arylthio of $R_1$, through $R_9$, $Ar_1$, $Ar_2$, $R_{11}$ through $R_{23}$ and $R_{31}$ through $R_{45}$; and alkylenoxy, alkylenethio, arylenoxy, arylenethio, arylene or heteroarylene of $Ar_3$ and $Ar_4$ may be further substituted by one or more substituent(s) selected from halogen, (C1-C60)alkyl with or without halogen substituent(s), (C6-C60)aryl, (C3-C60)heteroaryl with or without (C6-C60)aryl substituent(s), 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2 C60)alkynyl, (C1-C60)alkoxy, cyano, (C1-C60)alkylamino, (C6-C60)arylamino, (C6-C60)ar(C1-C60)alkyl, (C6-C60) aryloxy, (C6-C60)arylthio, (C1-C60)alkylthio, (C1-C60) alkoxycarbonyl, (C1-C60)alkylcarbonyl, (C6-C60)arylcarbonyl, carboxyl, nitro and hydroxyl; and a is an integer from 0 to 4.

BRIEF DESCRIPTION OF THE DRAWINGS

FIG. 1 is a cross-sectional view of an OLED.

DETAILED DESCRIPTION OF THE INVENTION

Referring now to the Drawings, FIG. 1 illustrates a cross-sectional view of an OLED of the present invention comprising a Glass 1, Transparent electrode 2, Hole injecting layer 3, Hole transport layer 4, Electroluminescent layer 5, Electron transport layer 6, Electron injecting layer 7 and Al cathode 8.

The "alkyl", "alkoxy" or other substituents containing "alkyl" moiety described in the present invention may be linear or branched species.

The term "aryl" described herein means an organic radical derived from aromatic hydrocarbon via elimination of one hydrogen atom. Each ring suitably comprises a monocyclic or fused ring system containing from 4 to 7, preferably from 5 to 6 cyclic atoms. Specific examples include phenyl, naphthyl, biphenyl, anthryl, tetrahydronaphthyl, indanyl, fluorenyl, phenanthryl, triphenylenyl, pyrenyl, perylenyl, chrysenyl, naphthacenyl and fluoranthenyl, but they are not restricted thereto.

The term "heteroaryl" described herein means an aryl group containing from 1 to 4 heteroatom(s) selected from N, O, S and Si for the aromatic cyclic backbone atoms, and carbon atom(s) for remaining aromatic cyclic backbone atoms. The heteroaryl may be 5- or 6-membered monocyclic heteroaryl or a polycyclic heteroaryl which is fused with one or more benzene ring(s), and may be partially saturated. The heteroaryl groups may include divalent aryl groups of which the heteroatoms are oxidized or quarternized to form N-oxides, quaternary salts, or the like. Specific examples include monocyclic heteroaryl groups such as furyl, thiophenyl, pyrrolyl, pyranyl, imidazolyl, pyrazolyl, thiazolyl, thiadiazolyl, isothiazolyl, isoxazolyl, oxazolyl, oxadiazolyl, triazinyl, tetrazinyl, triazolyl, tetrazolyl, furazanyl, pyridyl, pyrazinyl, pyrimidinyl, pyridazinyl; polycyclic heteroaryl groups such as benzofuranyl, benzothiophenyl, isobenzofuranyl, benzimidazolyl, benzothiazolyl, benzisothiazolyl, benzisoxazolyl, benzoxazolyl, isoindolyl, indolyl, indazolyl, benzothiadiazolyl, quinolyl, isoquinolyl, cinnolinyl, quinazolinyl, quinolizinyl, quinoxalinyl, carbazolyl, phenanthridinyl and benzodioxolyl; and corresponding N-oxides (for example, pyridyl N-oxide, quinolyl N-oxide) and quaternary salts thereof; but they are not restricted thereto.

The naphthyl of Chemical Formula (1) may be 1-naphthyl or 2-naphthyl; the anthryl may be 1-anthryl, 2-anthryl or 9-anthryl; and the fluorenyl may be 1-fluorenyl, 2-fluorenyl, 3-fluorenyl, 4-fluorenyl or 9-fluorenyl.

The substituents comprising "(C1-C60)alkyl" moiety described herein may contain 1 to 60 carbon atoms, 1 to 20 carbon atoms, or 1 to 10 carbon atoms. The substituents comprising "(C6-C60)aryl" moiety may contain 6 to 60 carbon atoms, 6 to 20 carbon atoms, or 6 to 12 carbon atoms. The substituents comprising "(C3-C60)heteroaryl" moiety may contain 3 to 60 carbon atoms, 4 to 20 carbon atoms, or 4 to 12 carbon atoms. The substituents comprising "(C3-C60)cycloalkyl" moiety may contain 3 to 60 carbon atoms, 3 to 20 carbon atoms, or 3 to 7 carbon atoms. The substituents comprising "(C2-C60)alkenyl or alkynyl" moiety may contain 2 to 60 carbon atoms, 2 to 20 carbon atoms, or 2 to 10 carbon atoms.

The organic electroluminescent compounds according to the present invention may be selected from the compounds represented by one of Chemical Formulas (2) to (7):

Chemical Formula 2

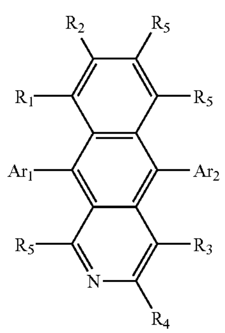

Chemical Formula 3

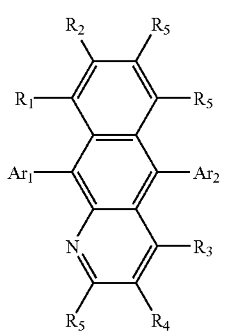

-continued

Chemical Formula 4

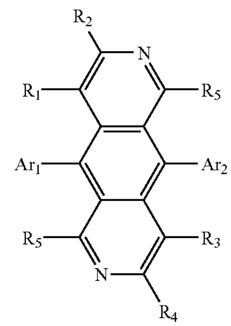

Chemical Formula 5

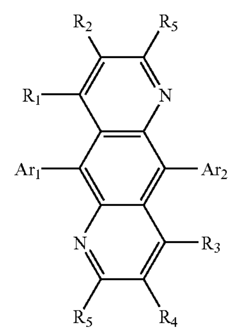

Chemical Formula 6

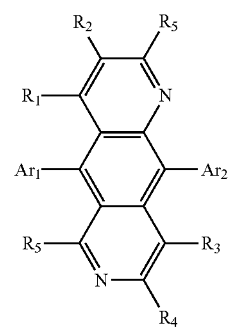

Chemical Formula 7

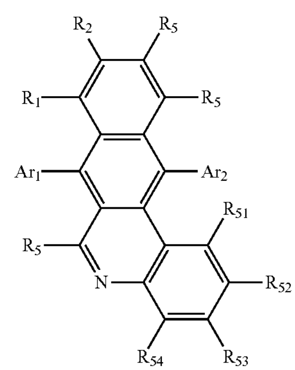

wherein, $Ar_1$, $Ar_2$ and $R_1$ through $R_5$ are defined as in Chemical Formula (1);

$R_{51}$ through $R_{54}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro or hydroxyl, or $R_{52}$ and $R_{53}$ may be linked via (C3-C60)alkylene or (C3-C60) alkenylene with or without a fused ring to form an alicyclic ring, or a monocyclic or polycyclic aromatic ring;

$R_1$ through $R_5$ independently represent hydrogen, chloro, fluoro, methyl, ethyl, n-propyl, i-propyl, n-butyl, i-butyl, t-butyl, n-pentyl, i-pentyl, n-hexyl, n-heptyl, n-octyl, 2-ethylhexyl, n-nonyl, decyl, dodecyl, hexadecyl, benzyl, trifluoromethyl, perfluoroethyl, trifluoroethyl, perfluoropropyl, perfluorobutyl, methoxy, ethoxy, n-propoxy, i-propoxy, n-butoxy, i-butoxy, t-butoxy, n-pentoxy, i-pentoxy, n-hexyloxy, n-heptoxy, cyclopropyl, cyclobutyl, cyclopentyl, cyclohexyl, cycloheptyl, cyclooctyl, cyclononyl, cyclodecyl, morpholino, thiomorpholino, phenyl, naphthyl, biphenyl, 9,9-dimethylfluorenyl, 9,9-diphenylfluorenyl, phenanthryl, anthryl, fluoranthenyl, triphenylenyl, pyrenyl, chrysenyl, naphthacenyl, perylenyl, spirobifluorenyl, pyridyl, pyrrolyl, furanyl, thiophenyl, imidazolyl, benzimidazolyl, pyrazinyl, pyrimidinyl, pyridazinyl, quinolyl, triazinyl, benzofuranyl, benzothiophenyl, pyrazolyl, indolyl, carbazolyl, thiazolyl, oxazolyl, benzothiazolyl, benzoxazolyl, phenathrolinyl, trimethylsilyl, triethylsilyl, tripropylsilyl, tri(t-butyl)silyl, t-butyldimethylsilyl, dimethylphenylsilyl, triphenylsilyl, adamantyl, bicyclo[2.2.1]heptyl, bicyclo[2.2.2]octyl, bicyclo[3.2.1]octyl, bicyclo[5.2.0]nonyl, bicyclo[4.2.2]decyl, bicyclo[2.2.2]octyl, 4-pentylbicyclo[2.2.2]octyl, ethenyl, phenylethenyl, ethynyl, phenylethynyl, cyano, dimethylamino, diphenylamino, monomethylamino, monophenylamino, phenyloxy, phenylthio, methoxycarbonyl, ethoxycarbonyl, t-butoxycarbonyl, methylcarbonyl, ethylcarbonyl, benzylcarbonyl, phenylcarbonyl, carboxyl, nitro or hydroxyl;

$Ar_1$ and $Ar_2$ are independently selected from methyl, ethyl, n-propyl, i-propyl, n-butyl, i-butyl, t-butyl, n-pentyl, i-pentyl, n-hexyl, n-heptyl, n-octyl, 2-ethylhexyl, n-nonyl, decyl, dodecyl, hexadecyl, benzyl, trifluoromethyl, perfluoroethyl, trifluoroethyl, perfluoropropyl, perfluorobutyl, trimethylsilyl, triethylsilyl, tripropylsilyl, tri(t-butyl)silyl, t-butyldimethylsilyl, dimethylphenylsilyl, triphenylsilyl and the following structures, without restriction:

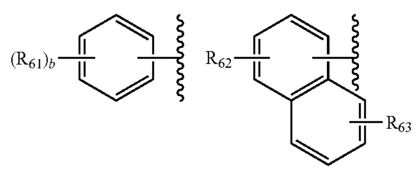

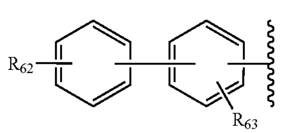

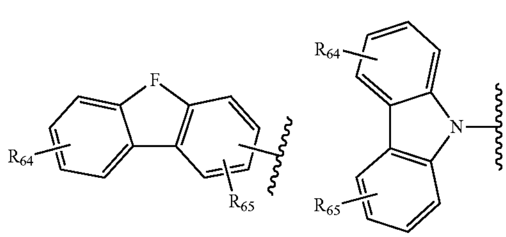

-continued

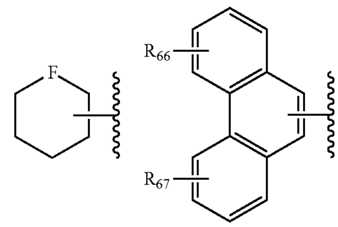

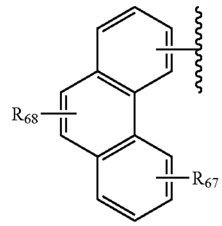

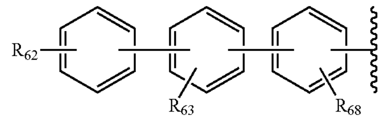

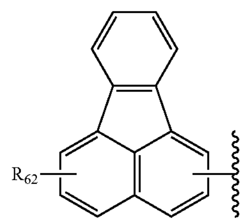

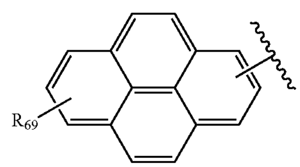

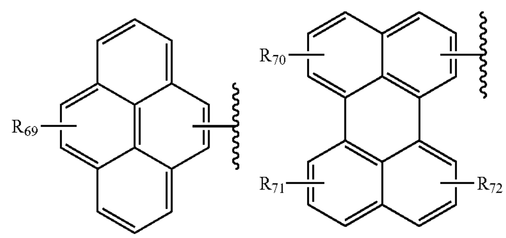

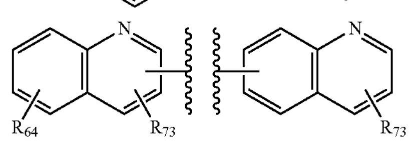

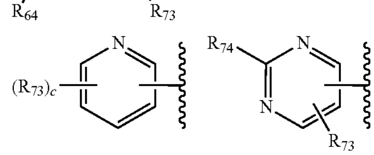

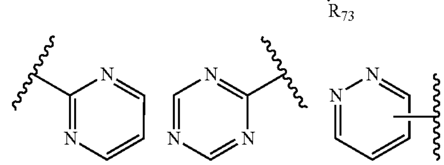

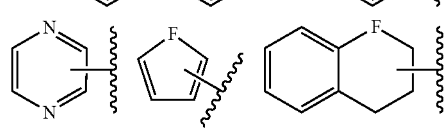

-continued
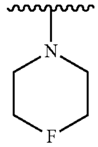
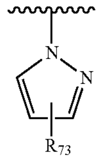
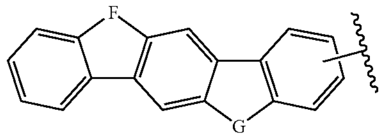
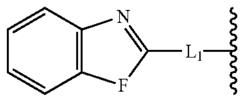
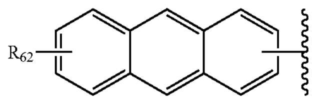
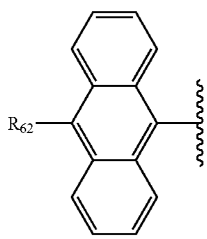
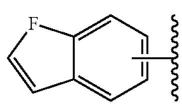
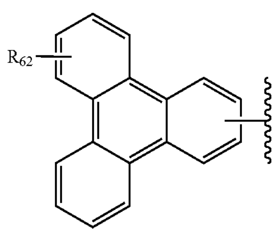
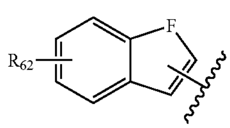
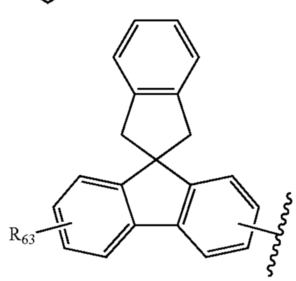
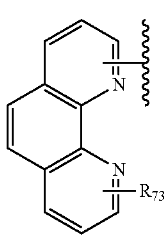
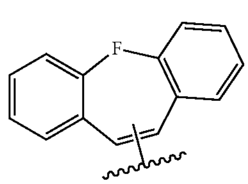
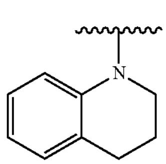
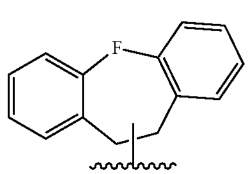
-continued
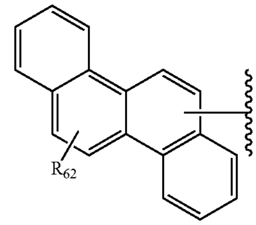
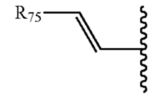
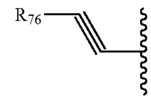
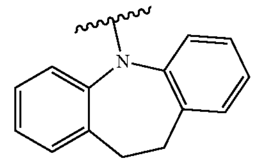
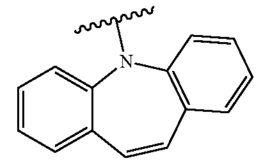
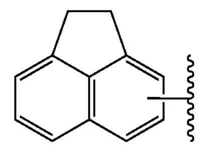
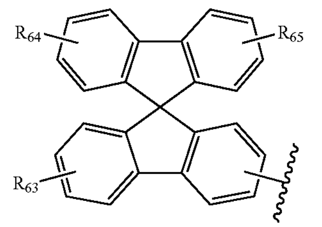
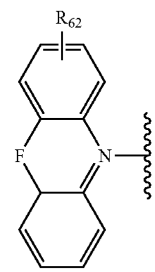
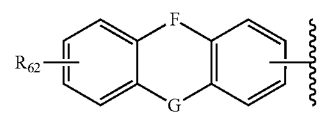
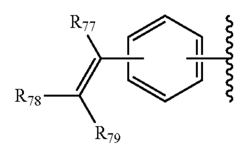
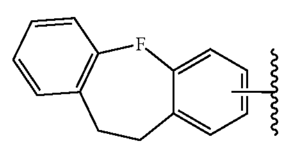
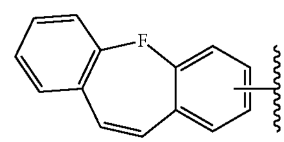
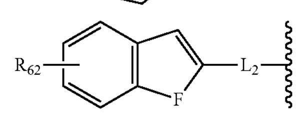
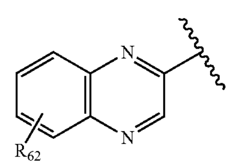
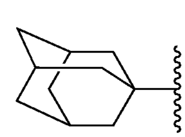
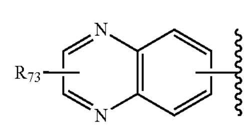
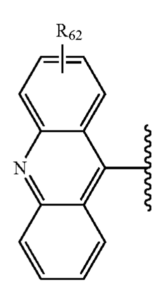

-continued

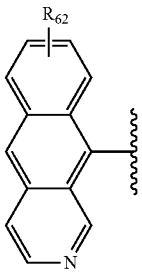

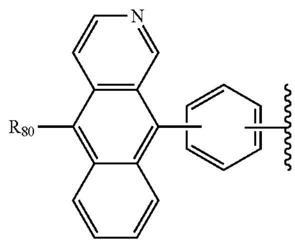

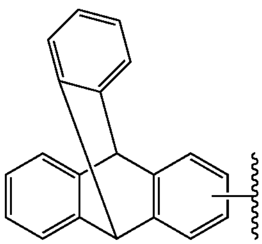

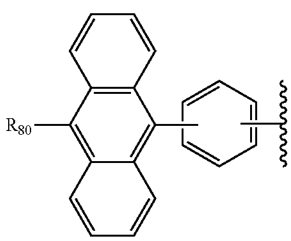

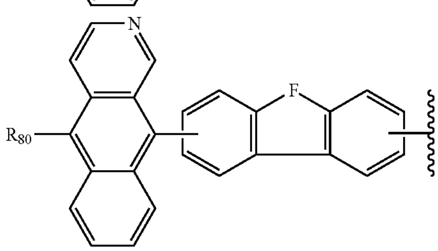

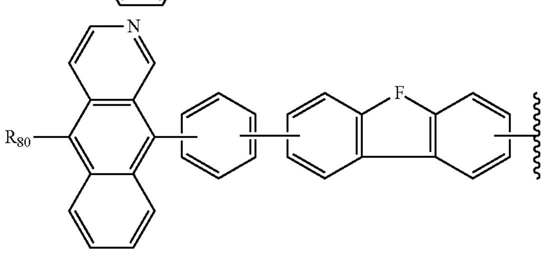

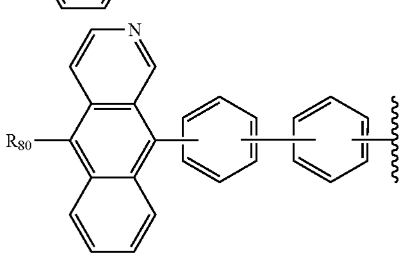

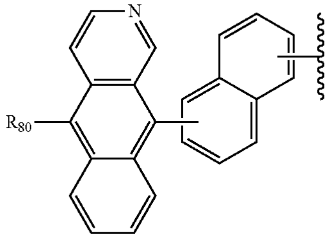

-continued

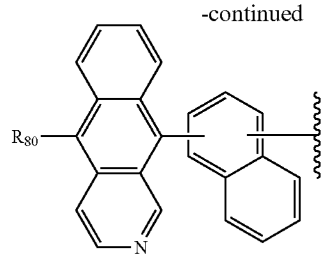

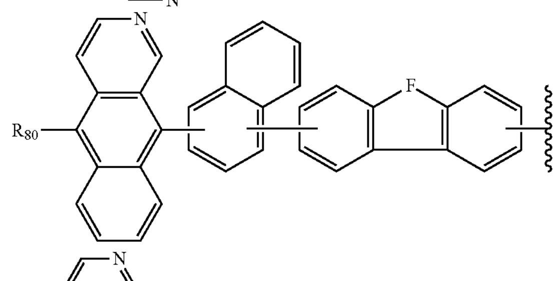

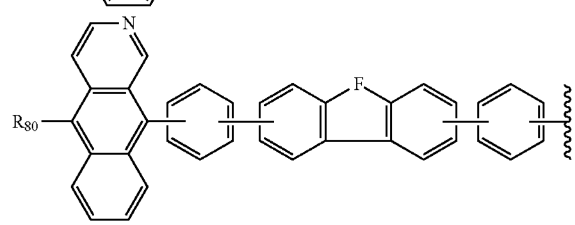

wherein, $R_{61}$ through $R_{76}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl; and the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino, arylamino, alkylthio, alkoxy, aryloxy or arylthio of $R_{61}$ through $R_{76}$ may be further substituted by halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl;

$R_{77}$ through $R_{80}$ independently represent hydrogen, halogen, (C1-C60)alkyl with or without halogen substituent(s), (C6-C60)aryl, (C3-C60)heteroaryl with or without (C6-C60)aryl substituent(s), 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl;

$L_1$ and $L_2$ independently represent a chemical bond, (C6-C60)arylene or (C3-C60)heteroarylene, wherein the arylene or heteroarylene of $L_1$ or $L_2$ may be further substituted by one or more substituent(s) selected from (C1-C60)alkyl, halogen, cyano, (C1-C60)alkoxy, (C3-C60)cycloalkyl, (C6-C60)aryl, (C3-C60)heteroaryl, adamantyl, (C7-C60)bicycloalkyl, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro, hydroxy, tri(C1-C30)alkylsilyl, di(C1-C30)alkyl(C6-C30)arylsilyl and tri(C6-C30)arylsilyl;

F and G independently represent a chemical bond, —C($R_{81}$)($R_{82}$)—, —N($R_{83}$)—, —S—, —O—, —Si($R_{84}$)($R_{85}$)—P($R_{86}$)—, —C(═O)—, —B($R_{87}$)—, —In($R_{88}$)—, —Se—, —Ge($R_{89}$)($R_{90}$)—, —Sn($R_{91}$)($R_{92}$)— or —Ga($R_{93}$)—;

wherein $R_{81}$ through $R_{93}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl, or $R_{81}$ and $R_{82}$, $R_{84}$ and $R_{85}$, $R_{89}$ and $R_{90}$, or $R_{91}$ and $R_{92}$ may be linked via (C3-C60)alkylene or (C3-C60)alkenylene with or without a fused ring to form an alicyclic ring, or a monocyclic or polycyclic aromatic ring;

b is an integer from 1 to 5; and c is an integer from 0 to 4.

More specifically, $Ar_1$ and $Ar_2$ are independently selected from the following structures, without restriction:

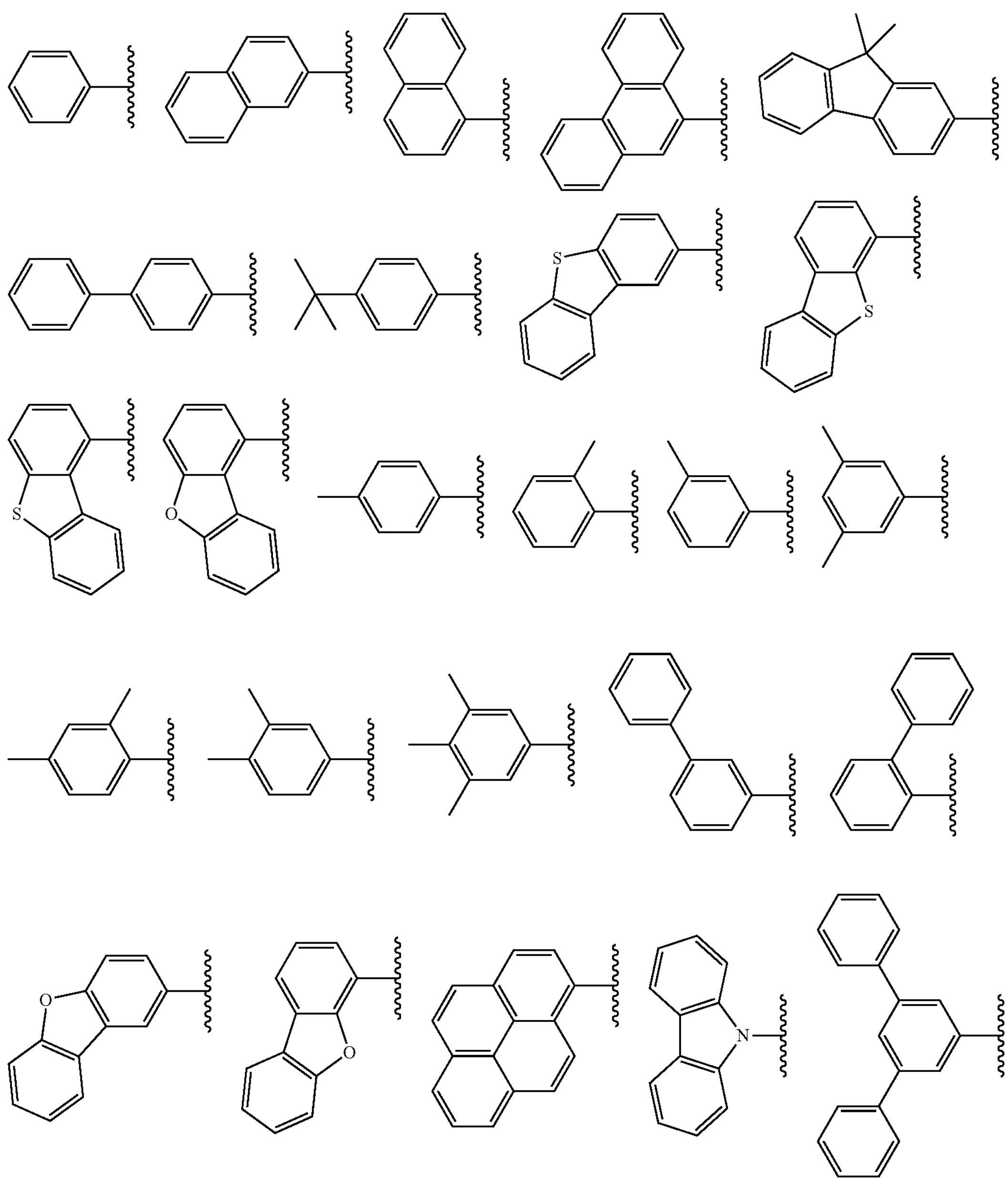

-continued
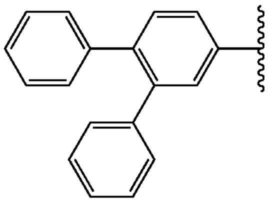
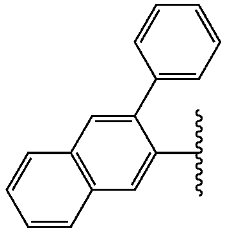
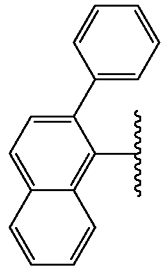
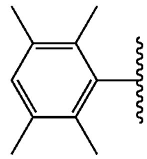
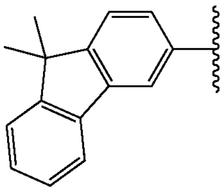
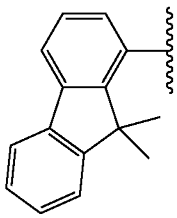
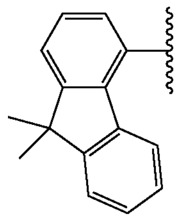
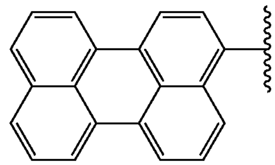
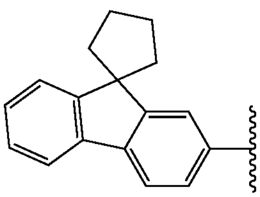
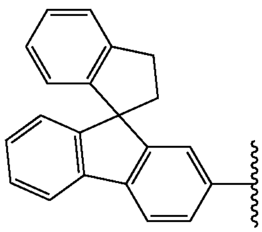
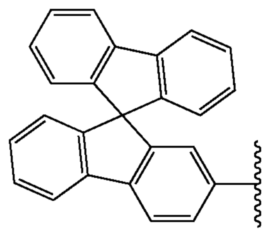
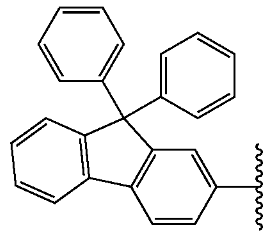
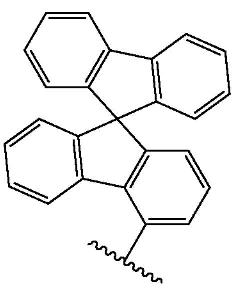
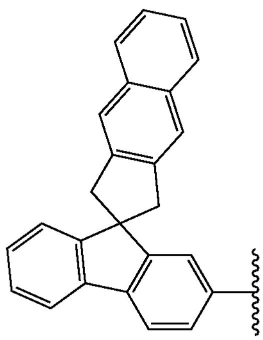
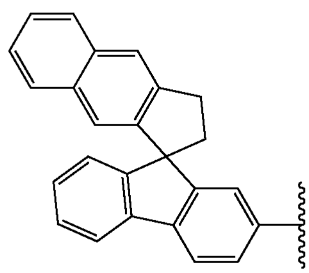
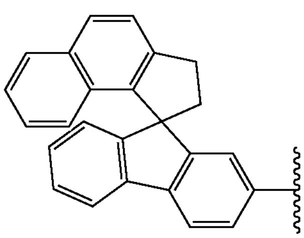
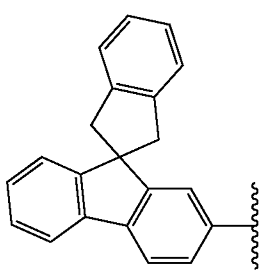
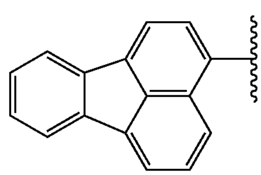
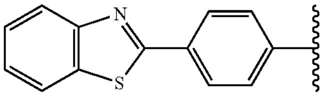
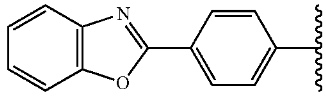
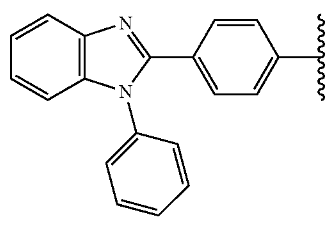

-continued
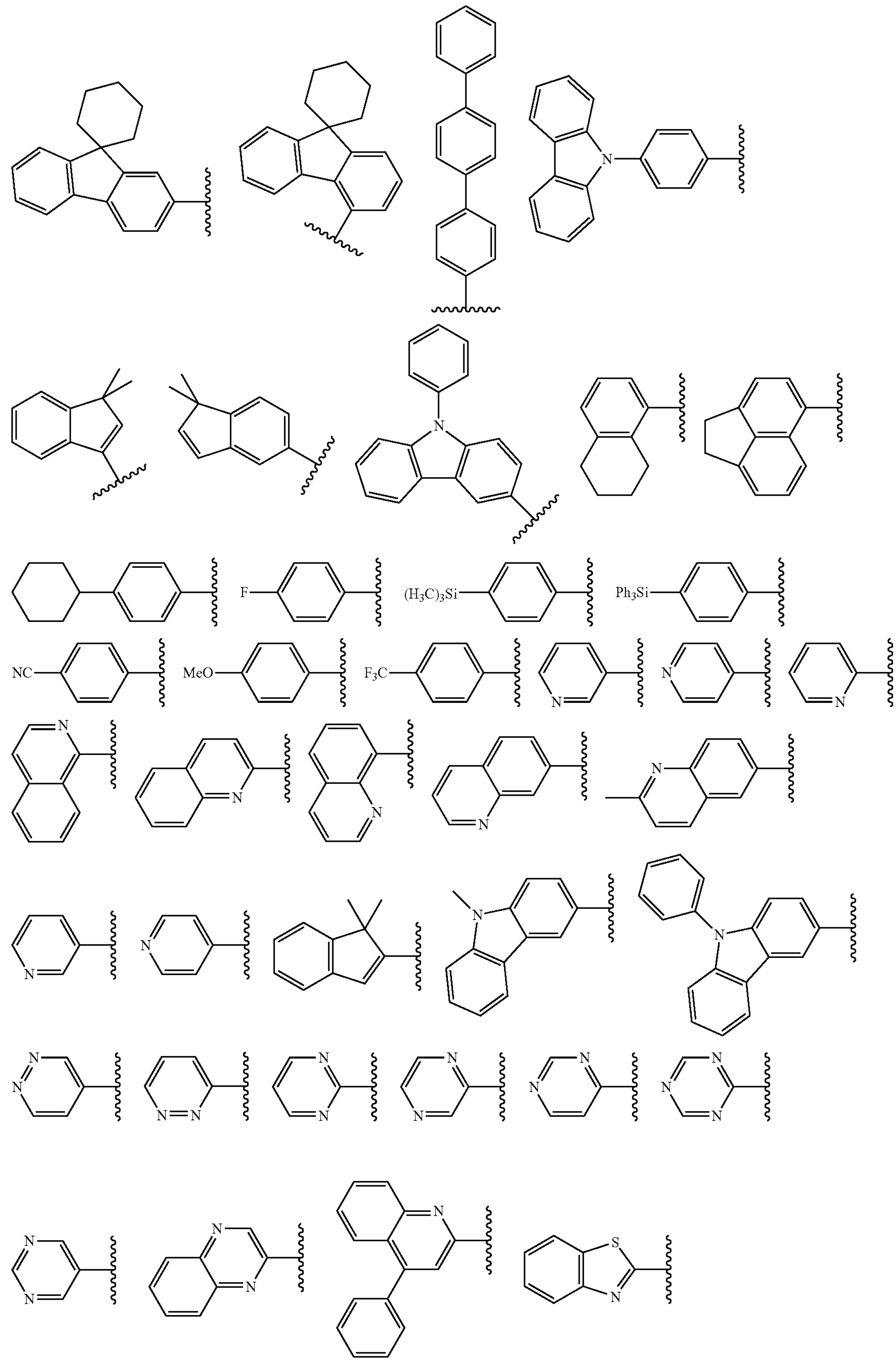

-continued
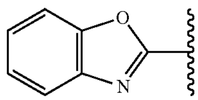
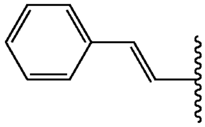
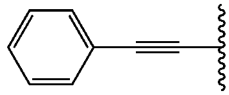
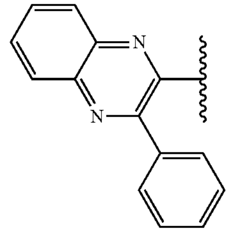
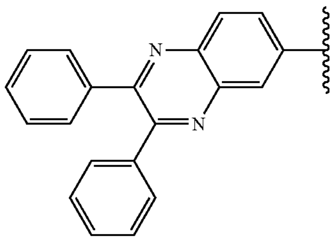
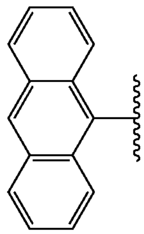
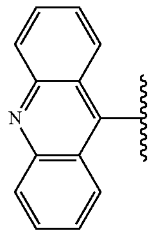
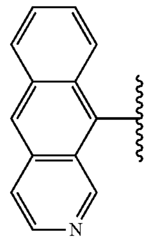
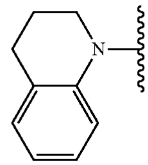
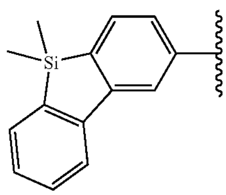
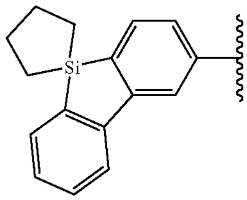
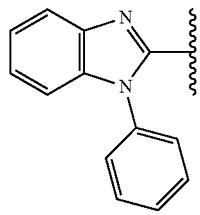
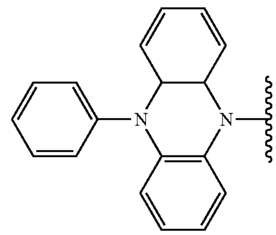
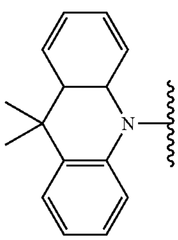
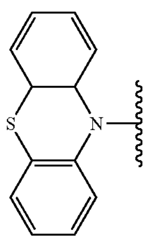
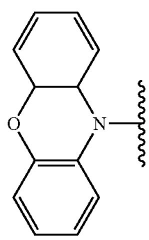
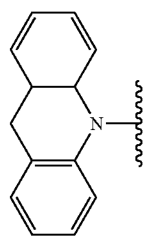
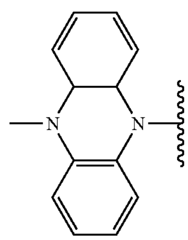
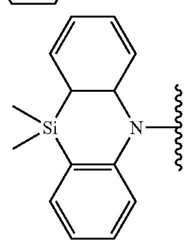
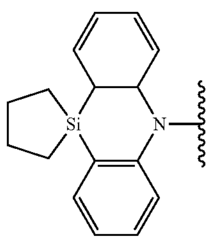
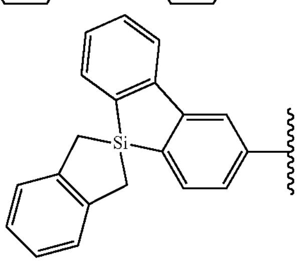
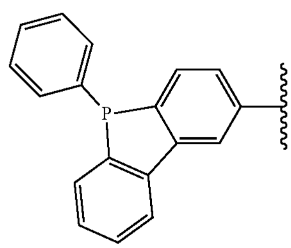
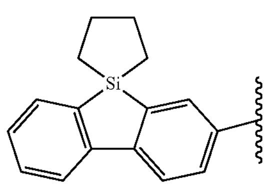
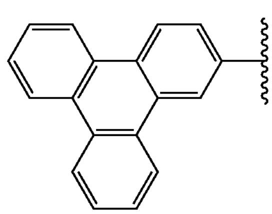
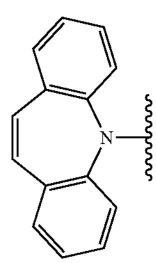
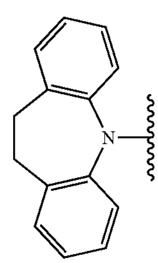
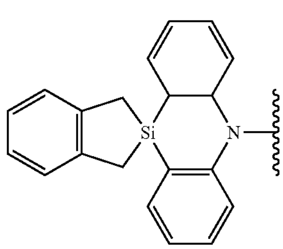
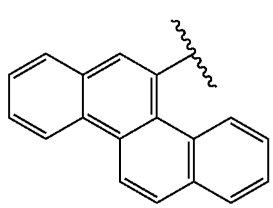
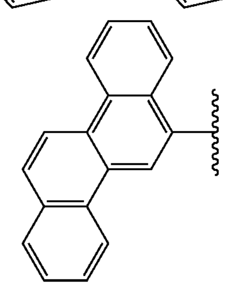

-continued
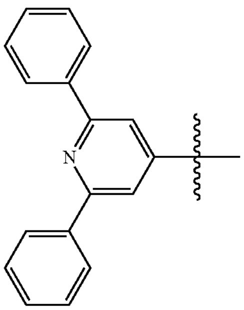
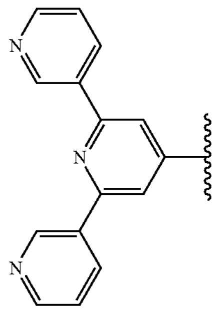
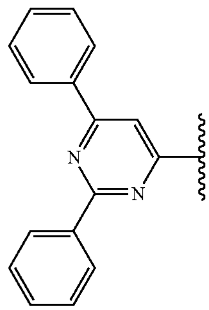
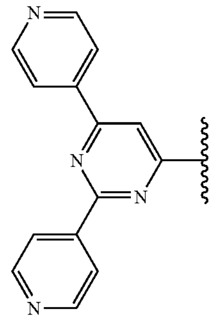
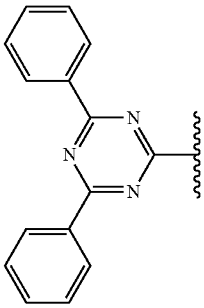
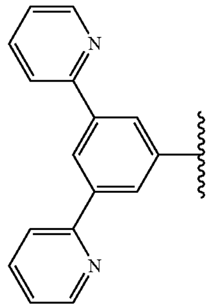
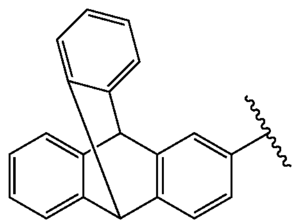
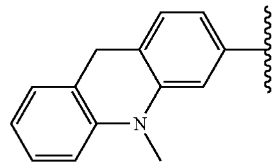
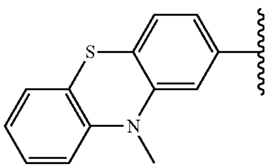
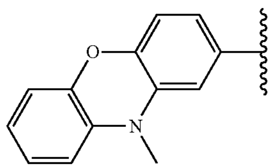
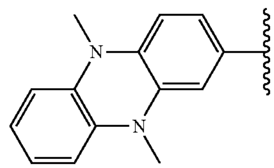
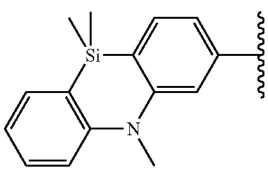
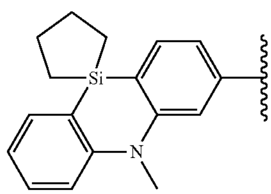
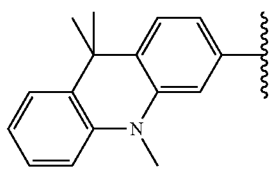
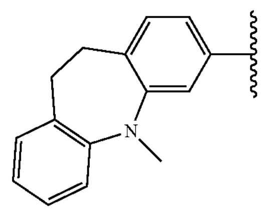
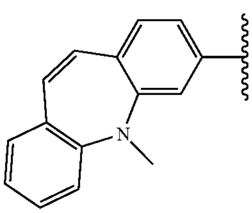
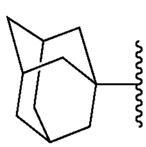
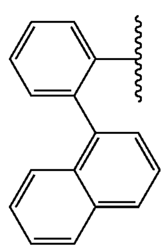
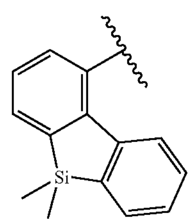
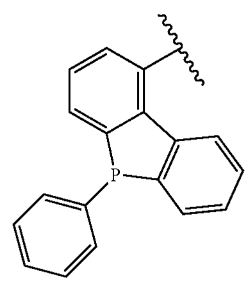
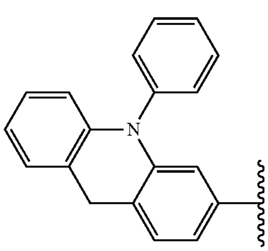
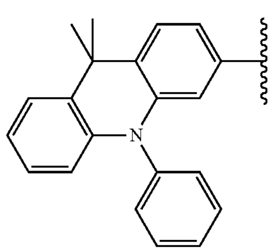
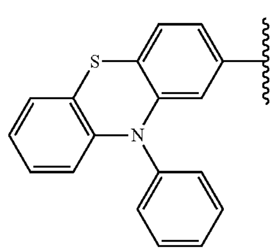

-continued
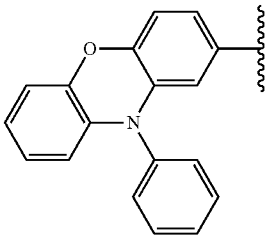
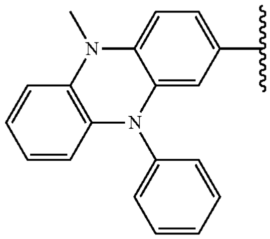
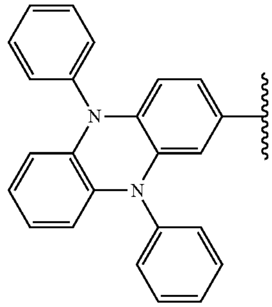
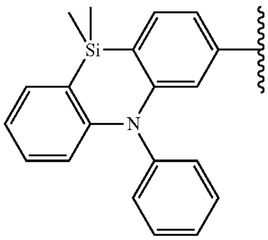
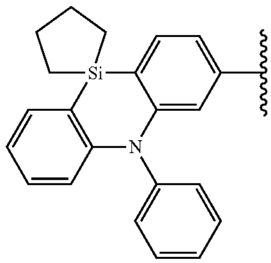
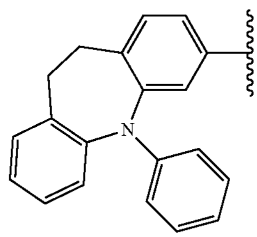
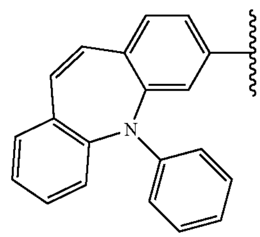
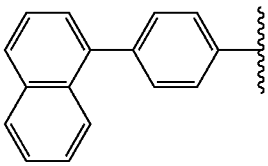
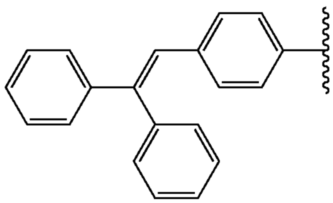
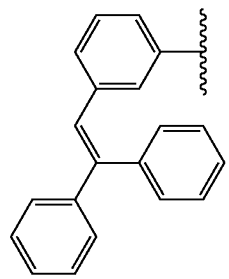
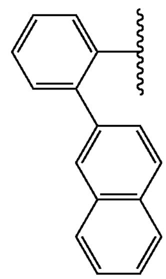
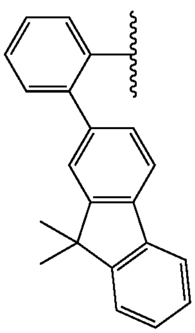
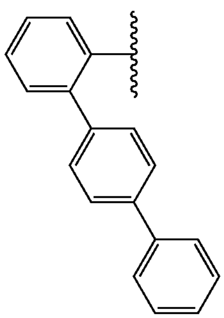
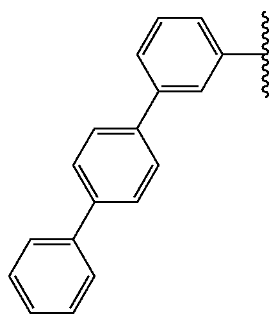
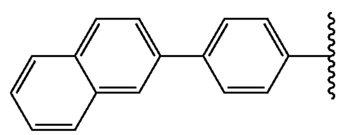
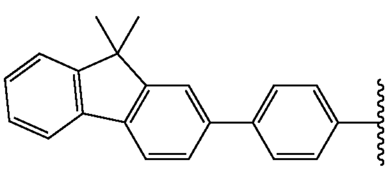
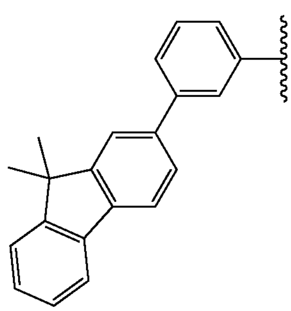
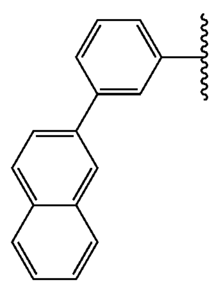
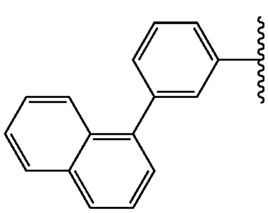
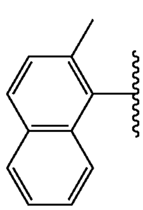
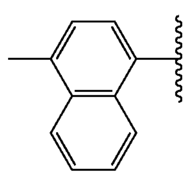
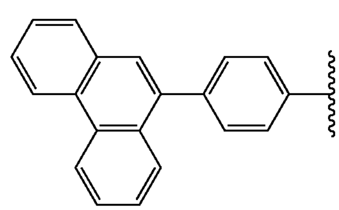

-continued
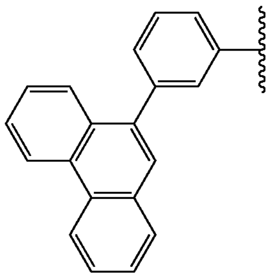
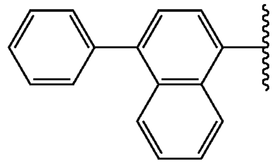
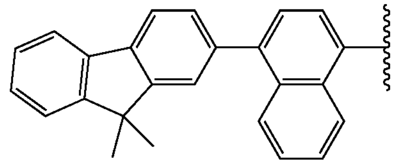
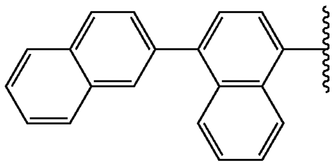
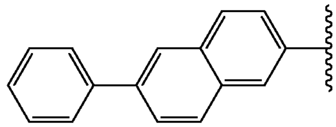
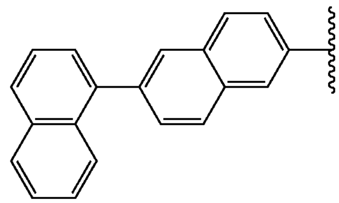
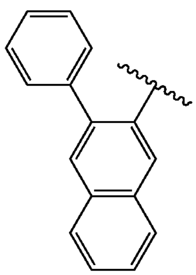
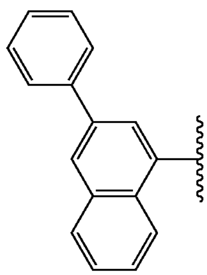
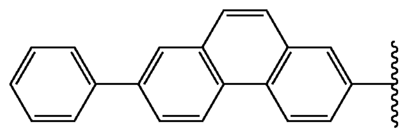
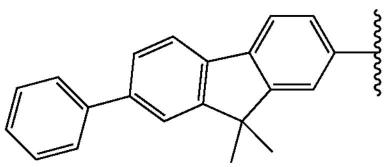
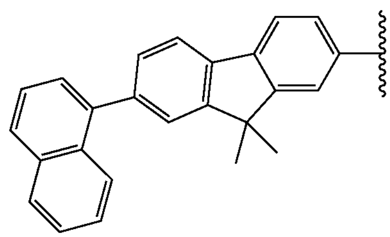
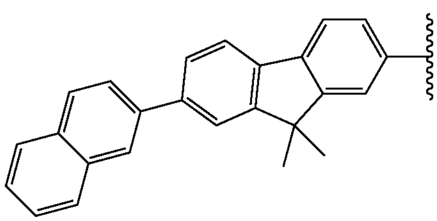
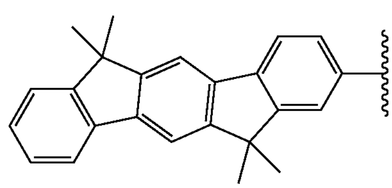
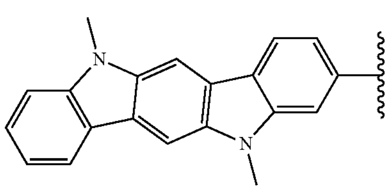
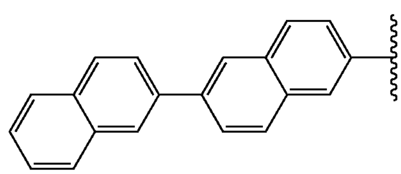
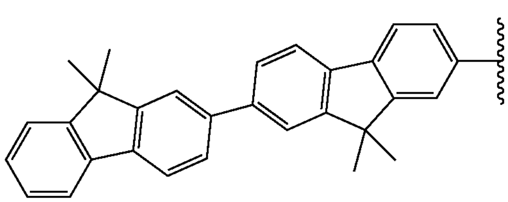
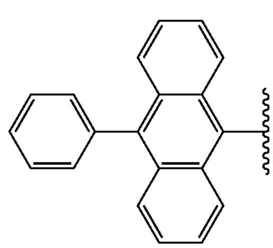

-continued
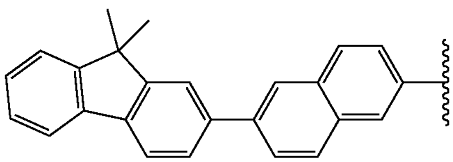
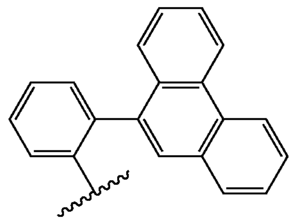
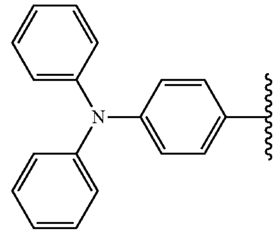
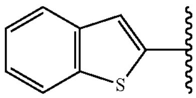
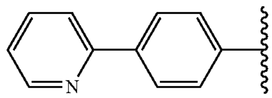
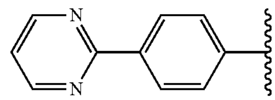
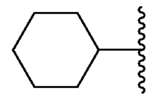
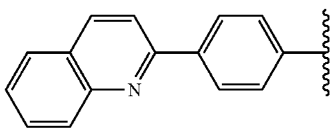
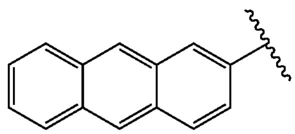
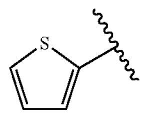
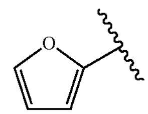
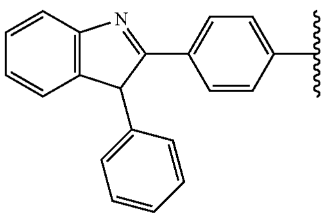
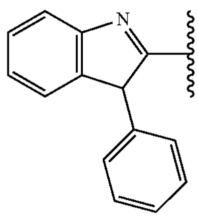
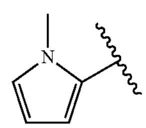
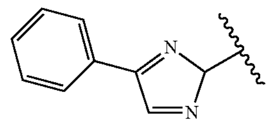
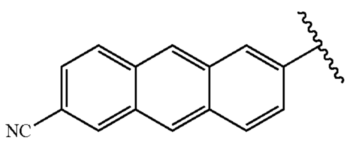
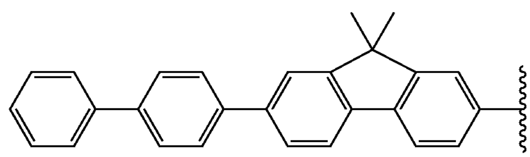
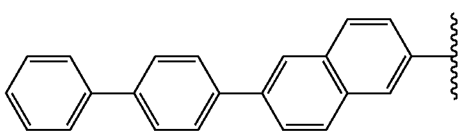
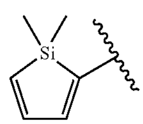
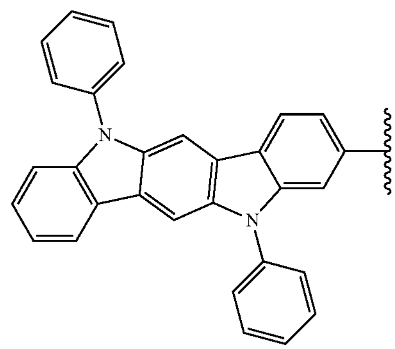
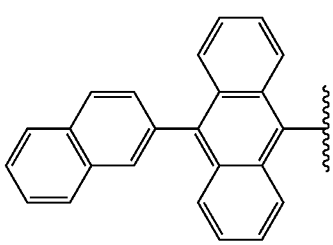
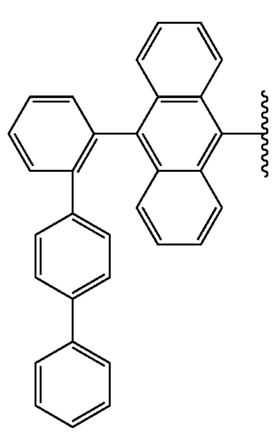
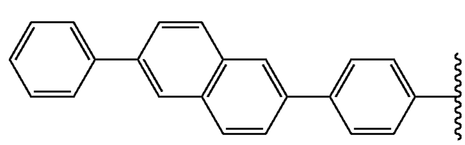

-continued
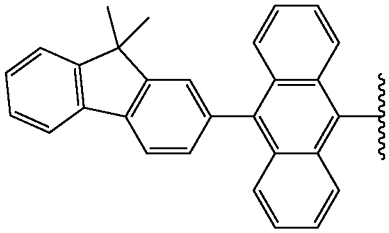
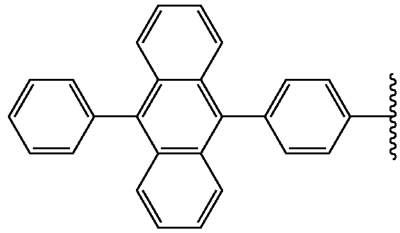
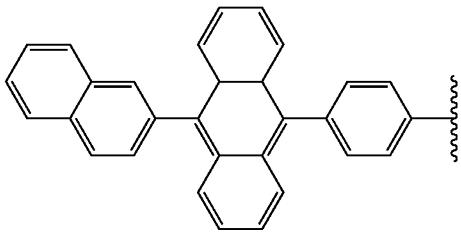
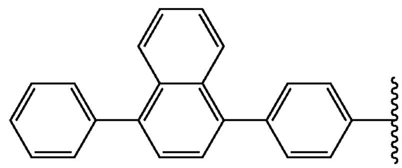
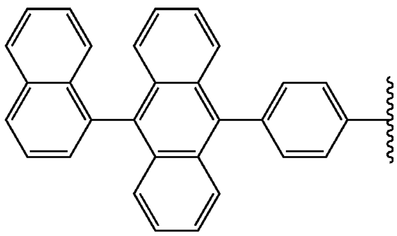
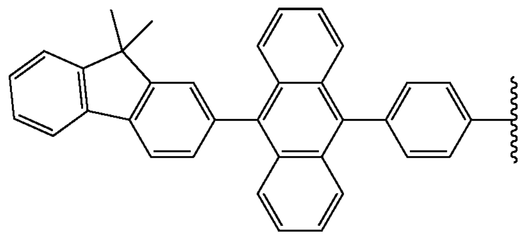
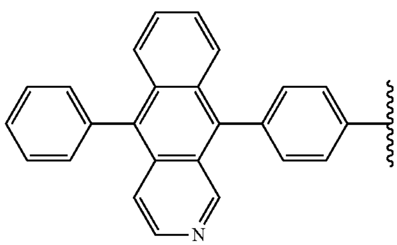
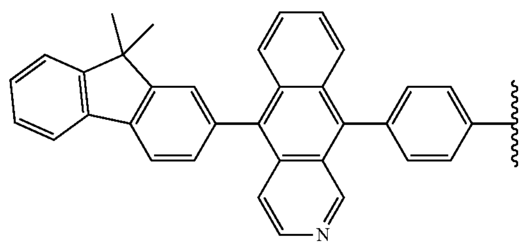
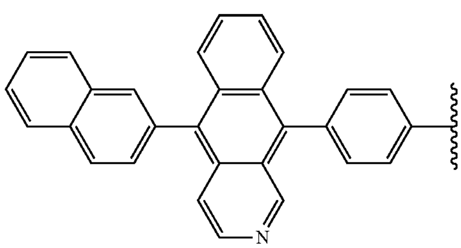
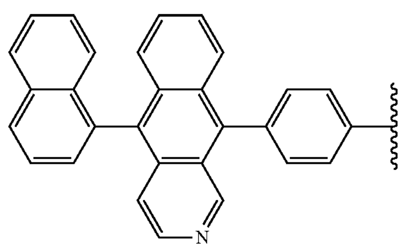
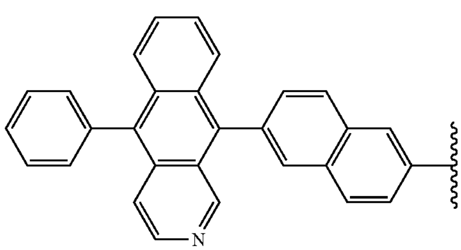
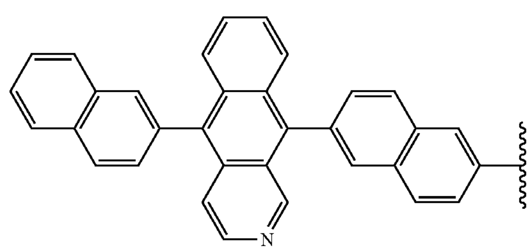
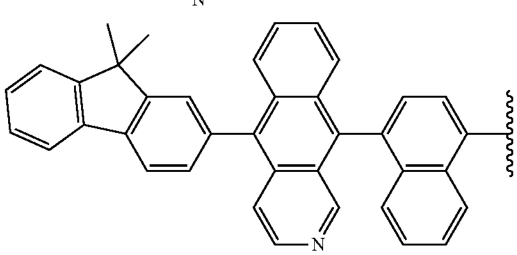
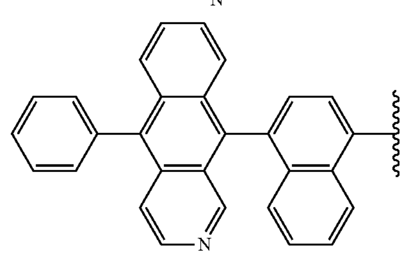

-continued
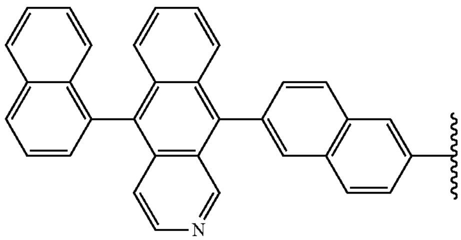
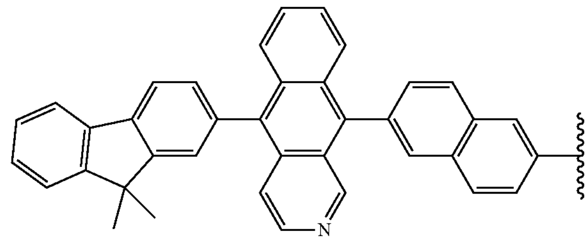
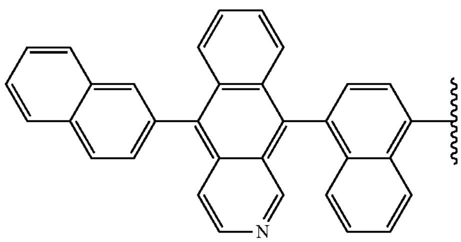
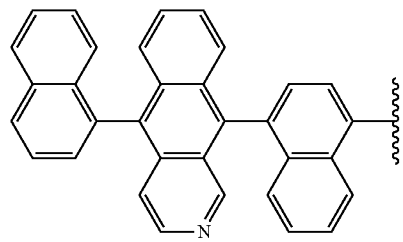
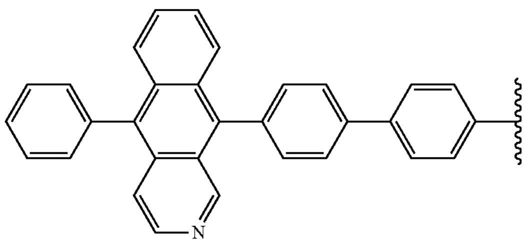
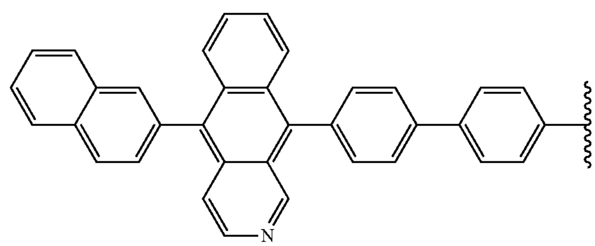
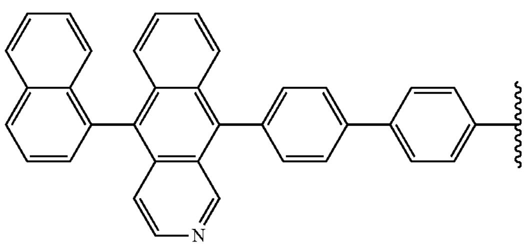
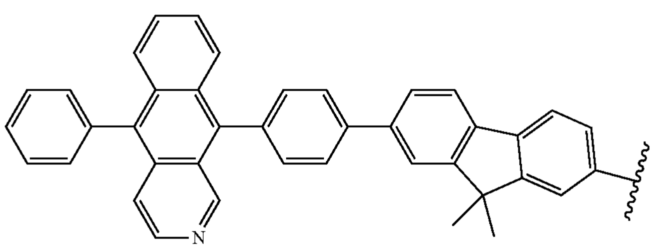
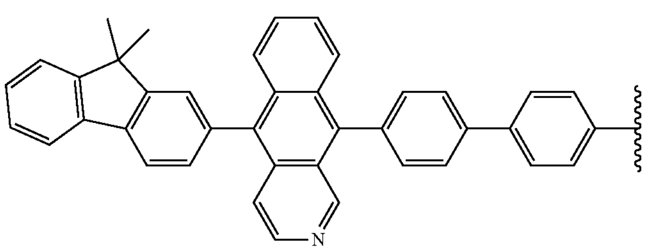
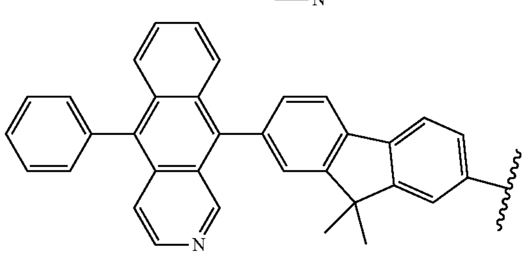
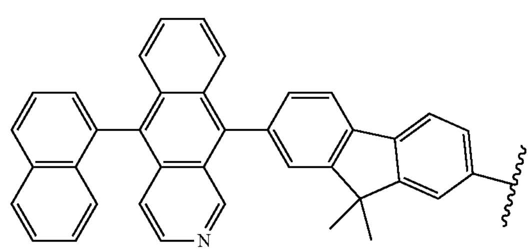

-continued
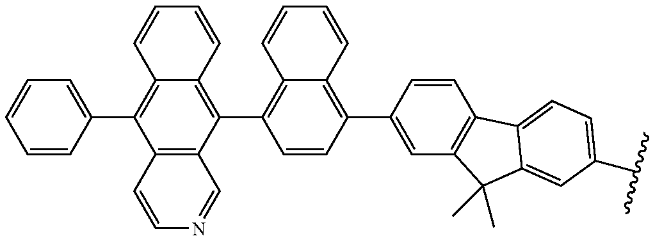
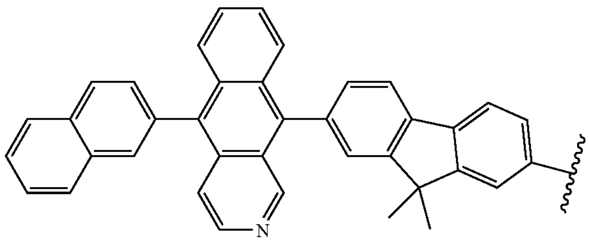
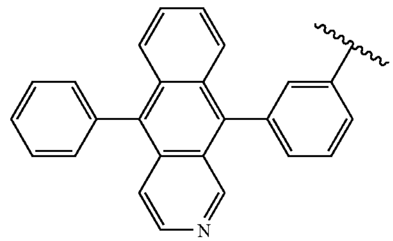
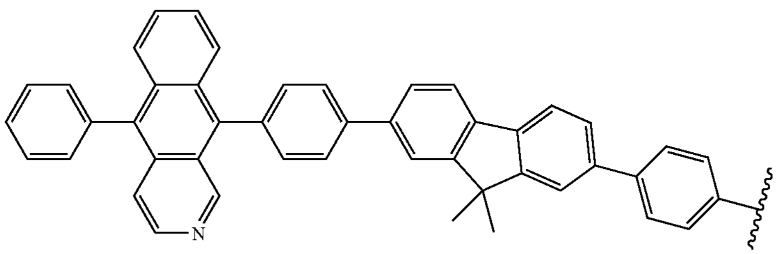
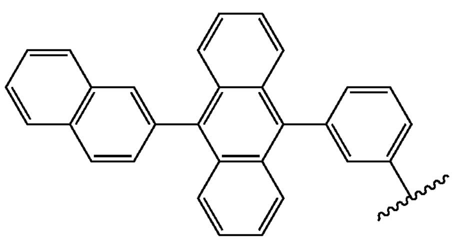
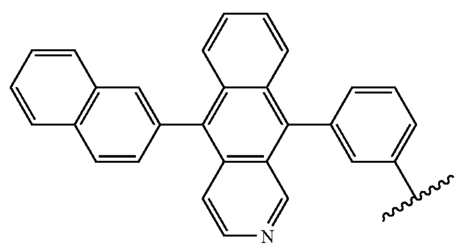
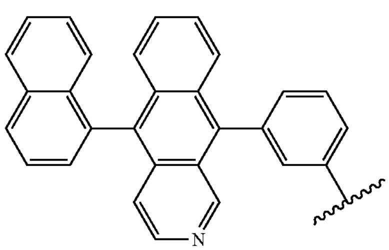
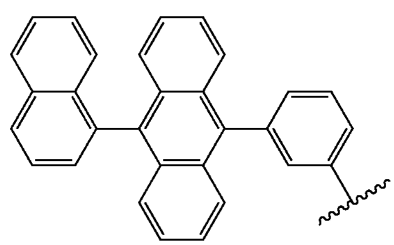
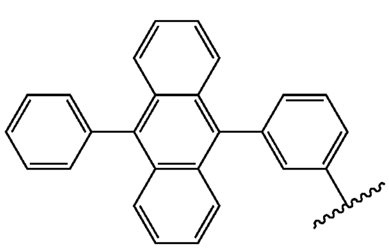

The organic electroluminescent compounds according to the present invention can be more specifically exemplified by the following compounds, without restriction:
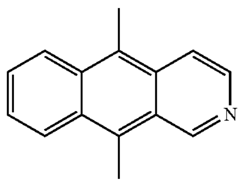
1
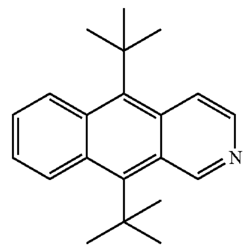
2
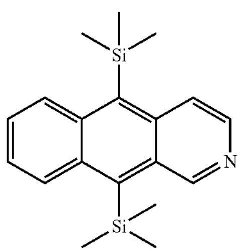
3
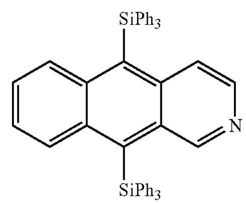
4
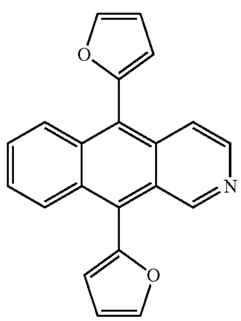
5
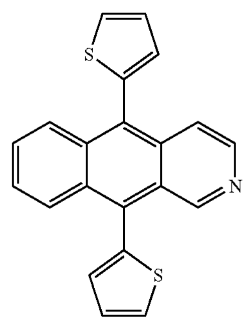
6
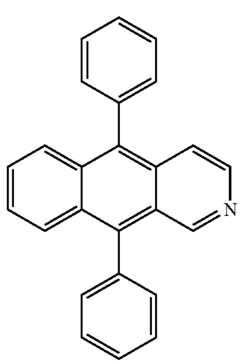
7
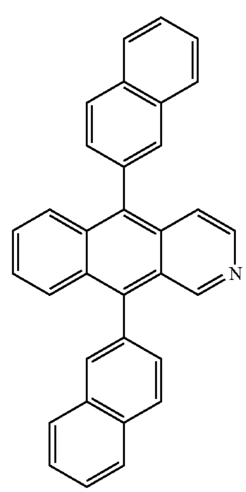
8

-continued
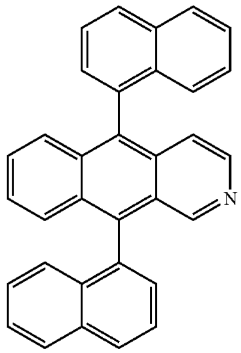
9
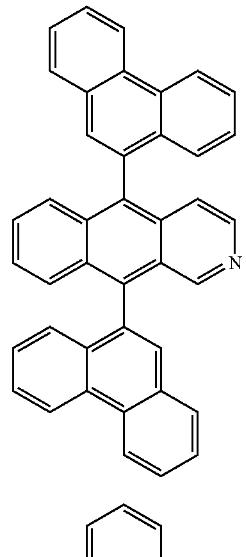
10
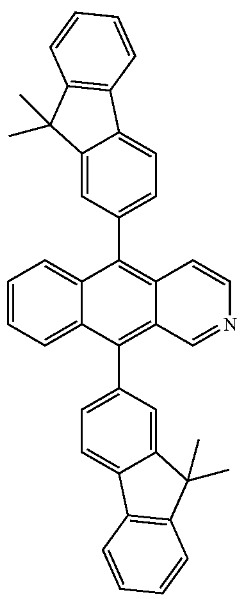
11
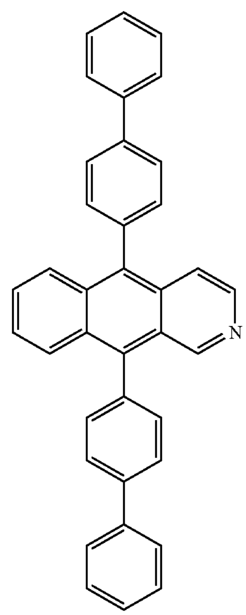
12
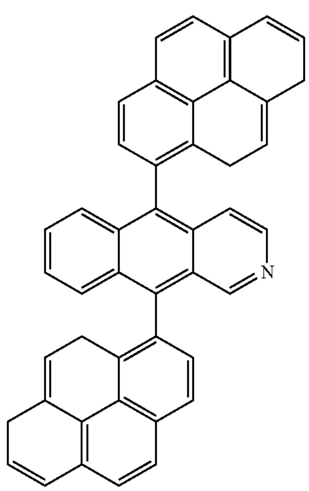
13
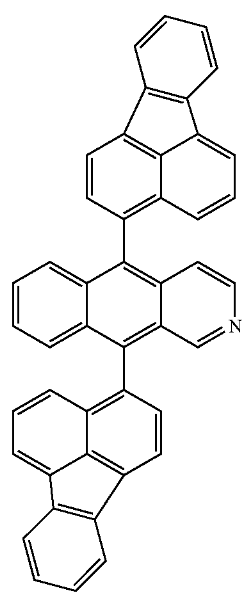
14

-continued
15
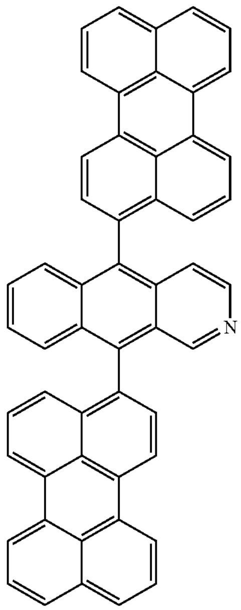
16
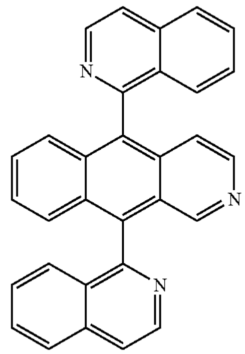
17
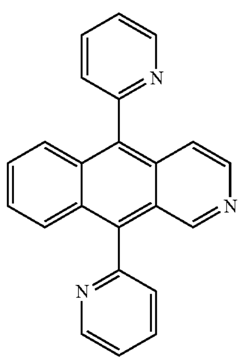
18
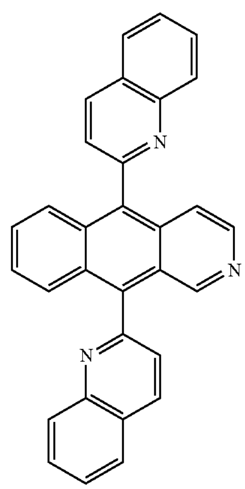
19
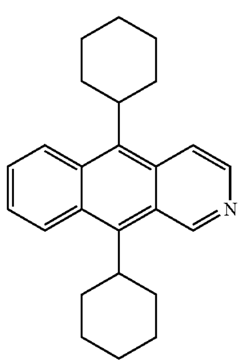
20
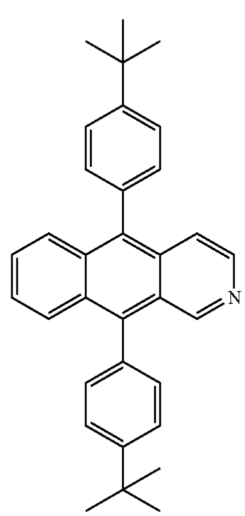

-continued
21
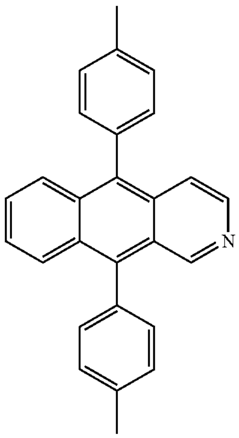
22
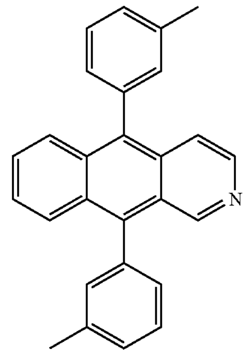
23
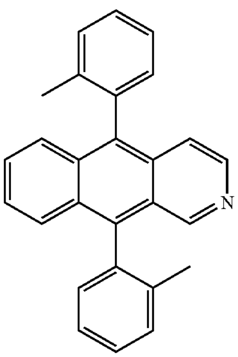
24
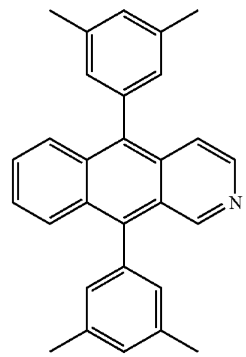
25
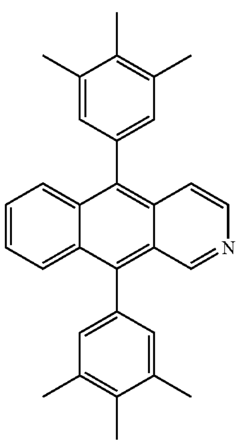
26
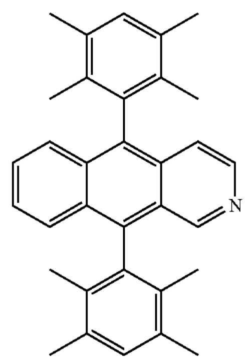
27
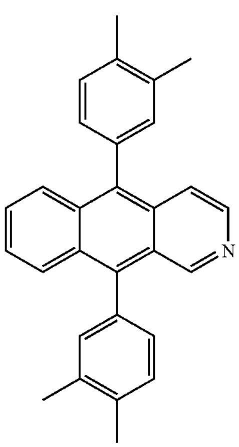
28
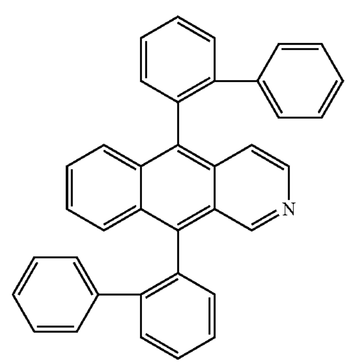

-continued
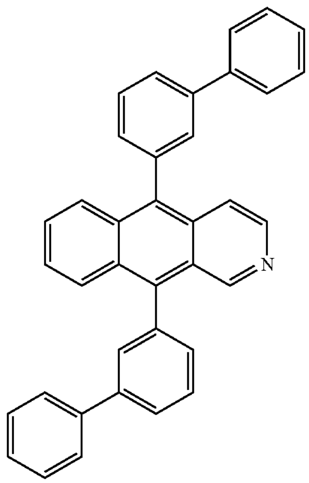
29
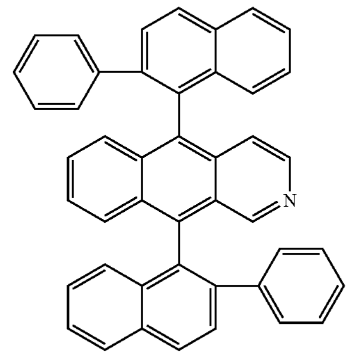
30
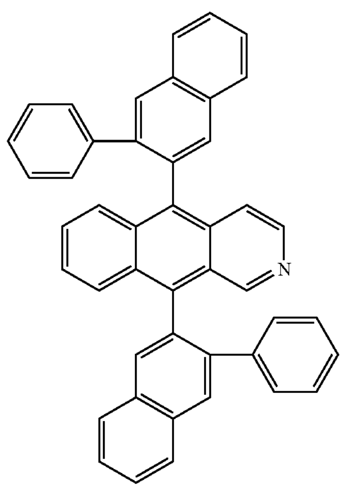
31
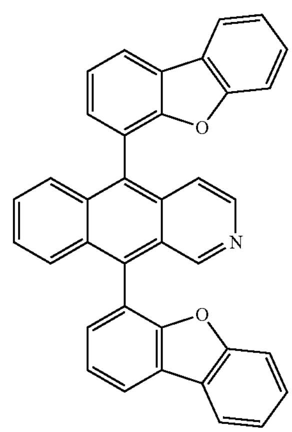
32
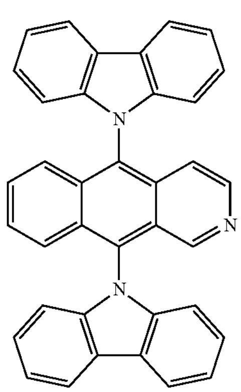
33
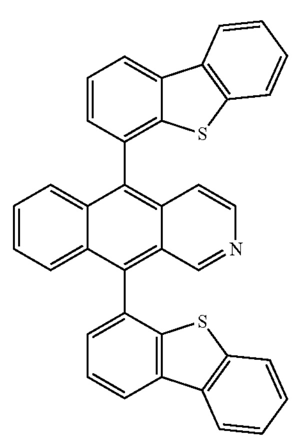
34

-continued
35
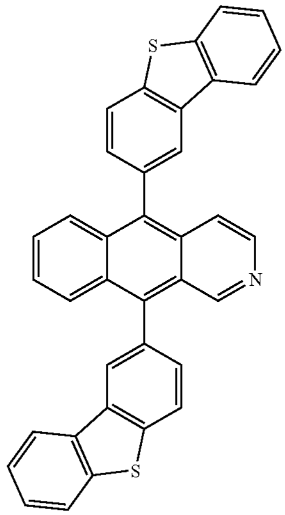
36
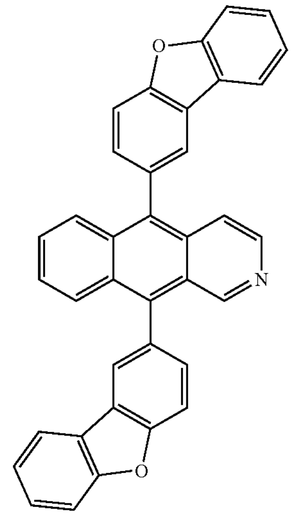
37
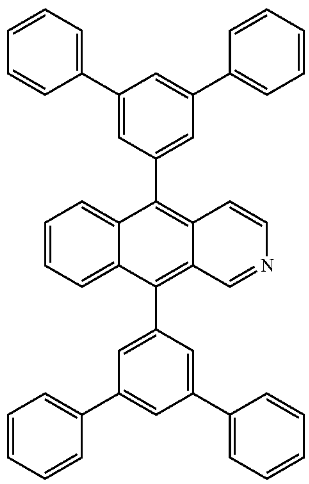
38
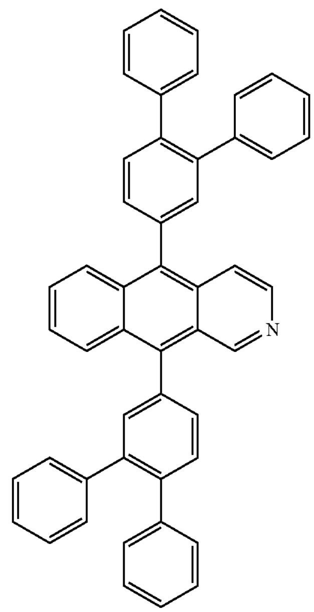
39
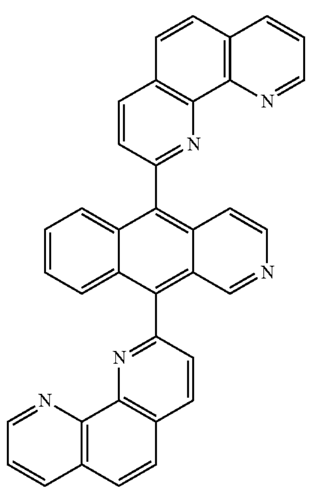
40
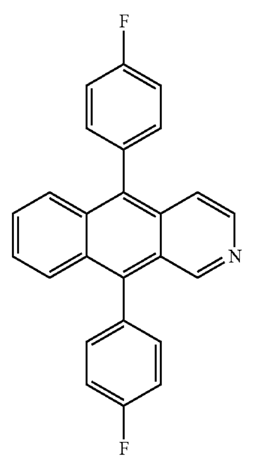

-continued
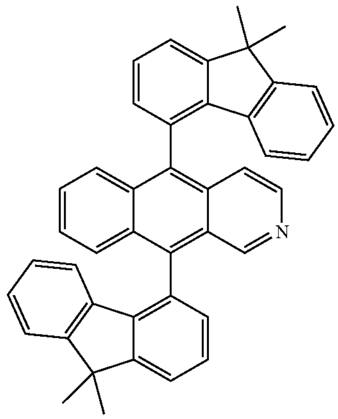
41
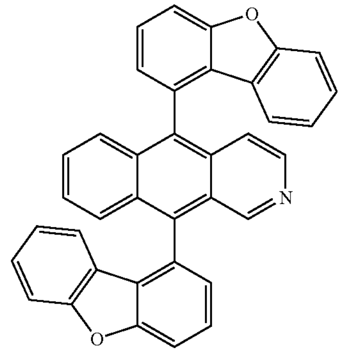
42
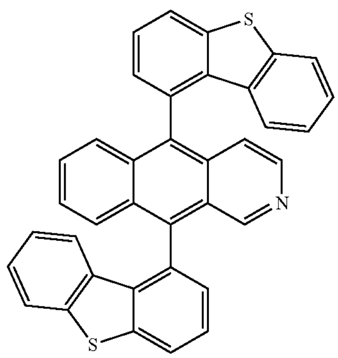
43
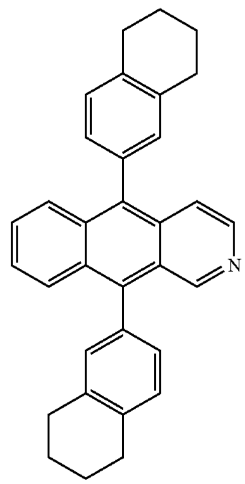
44
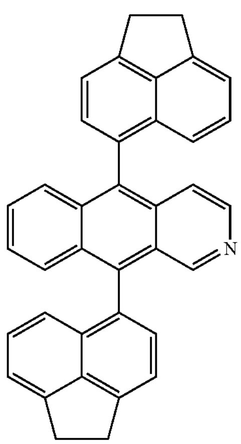
45
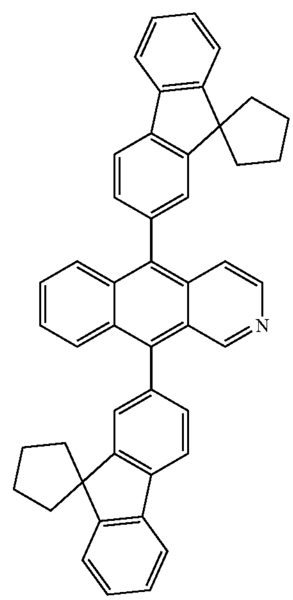
46

-continued
47
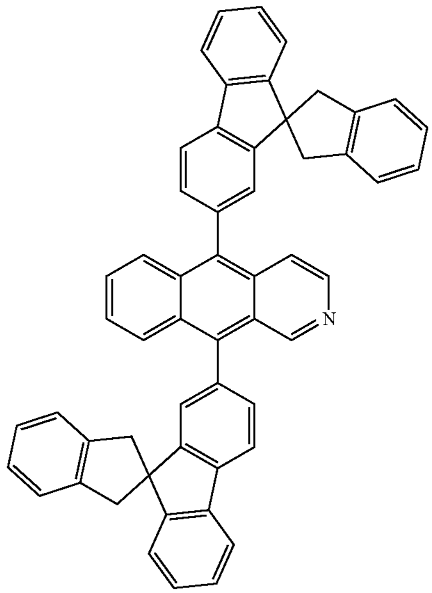
48
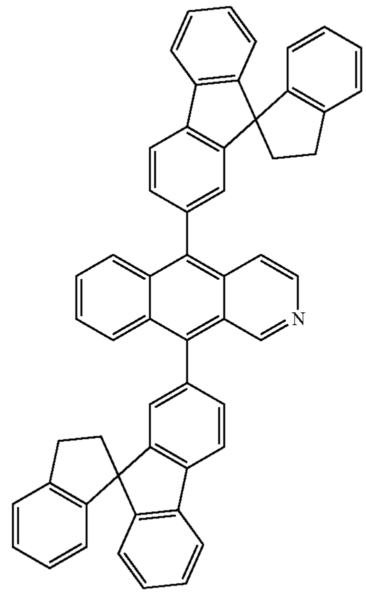
49
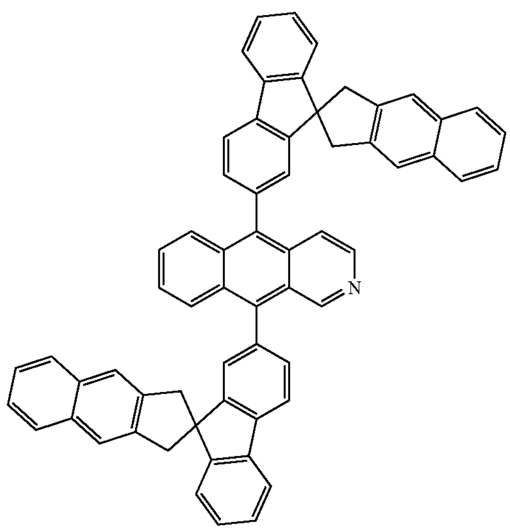
50
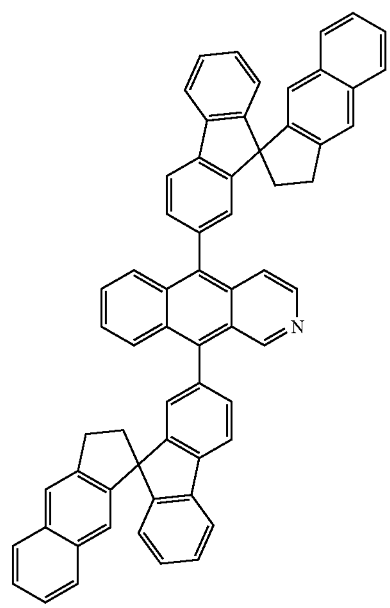

-continued
51
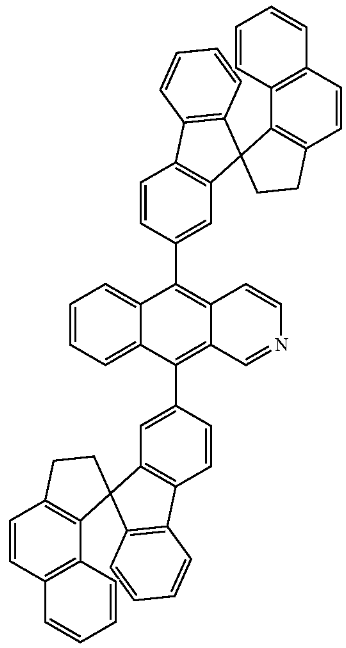
52
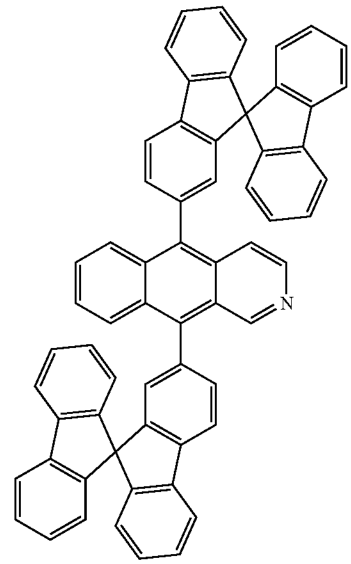
53
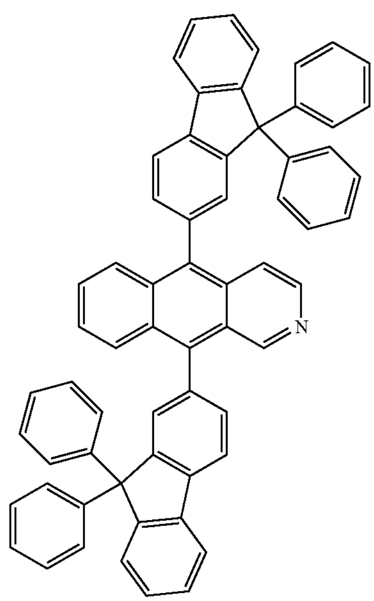
54
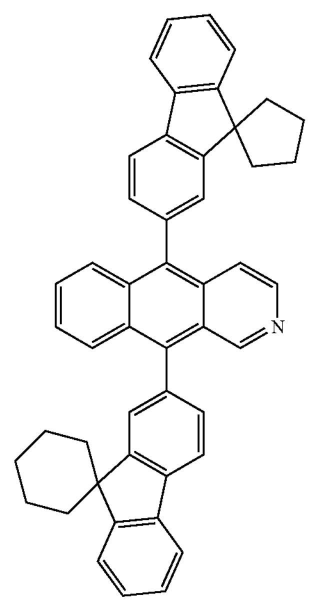

-continued
55
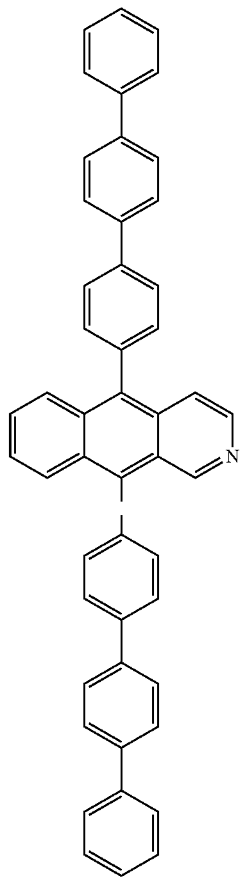
56
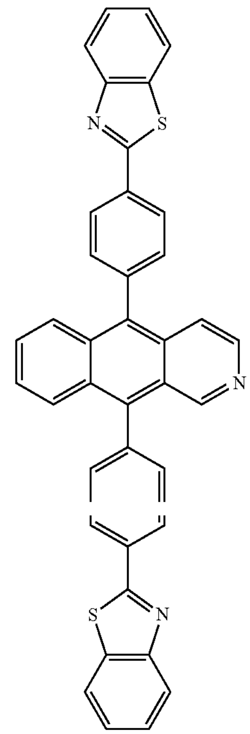
57
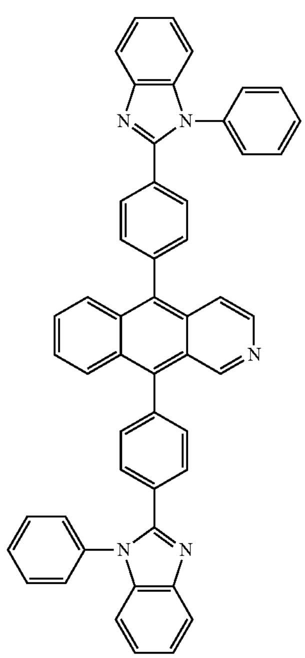
58
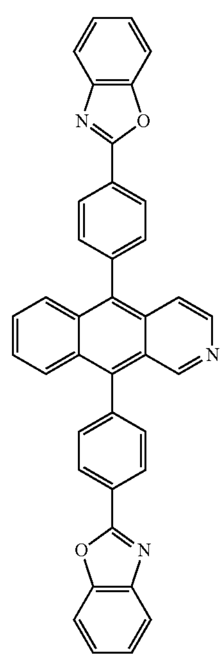

-continued
59
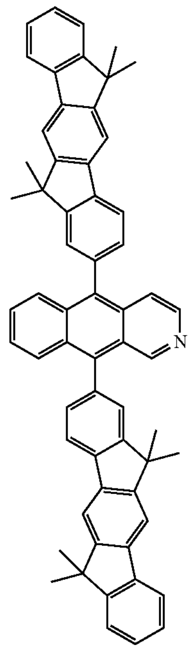
60
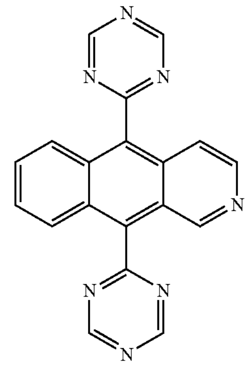
61
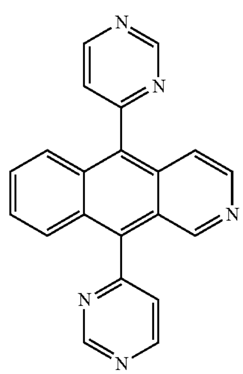
62
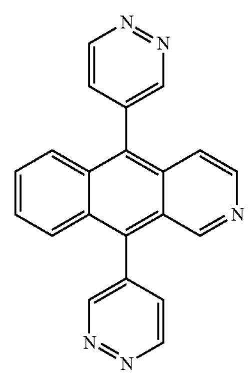
63
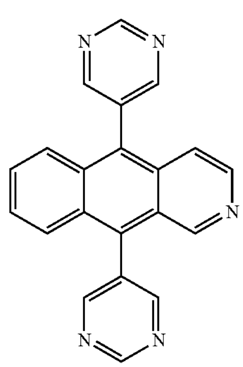
64
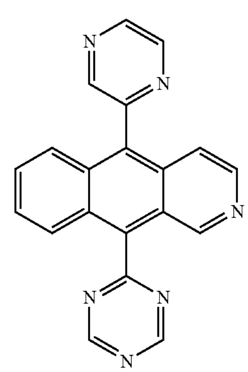

-continued
65
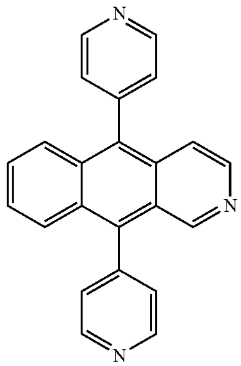
66
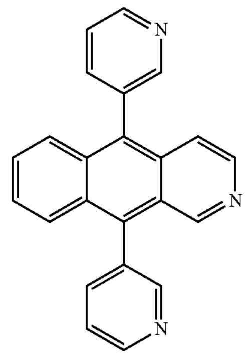
67
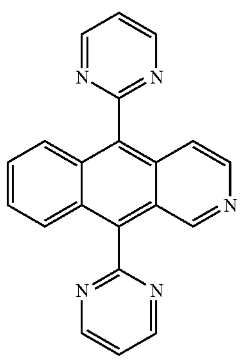
68
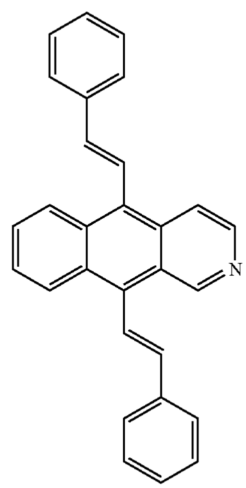
69
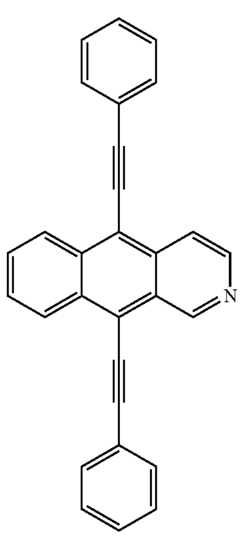
70
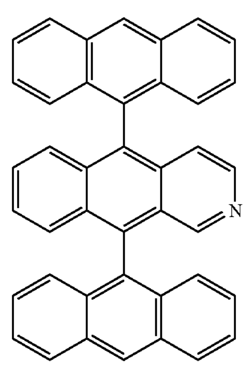

-continued
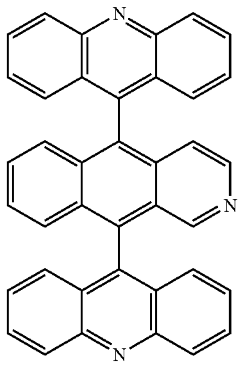
71
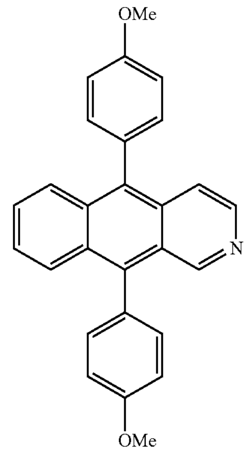
72
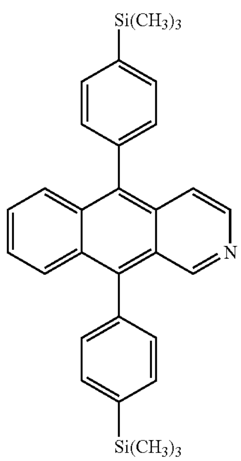
73
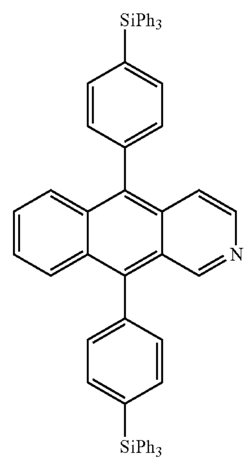
74
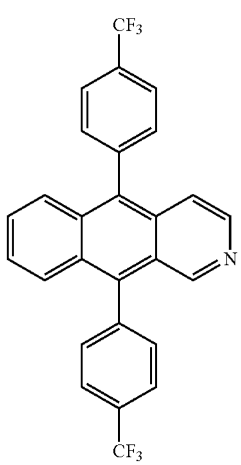
75
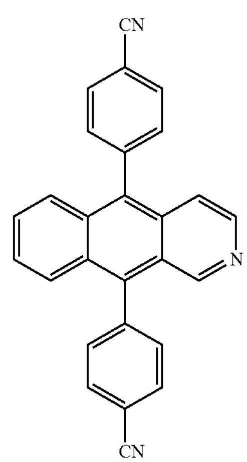
76

-continued
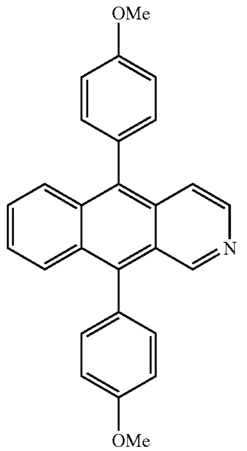
77
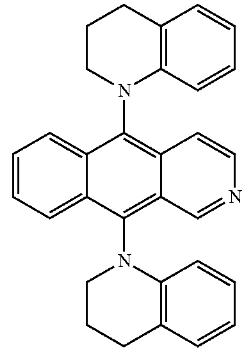
78
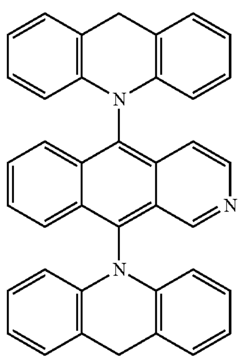
79
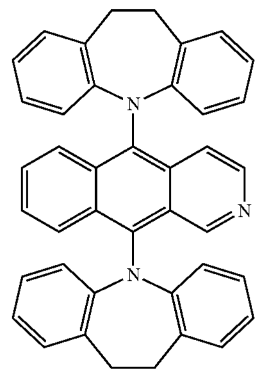
80
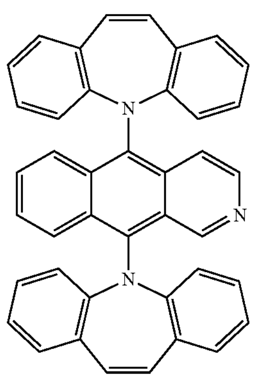
81
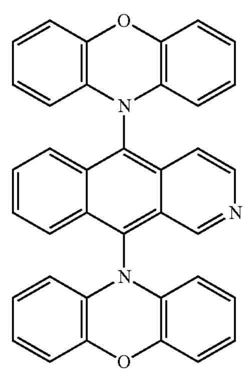
82
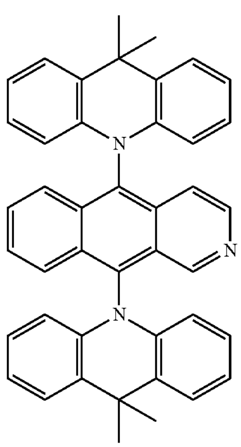
83
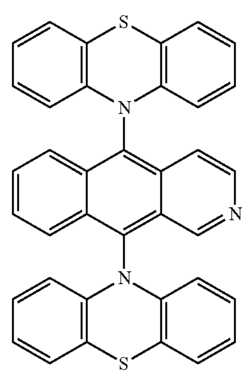
84

-continued
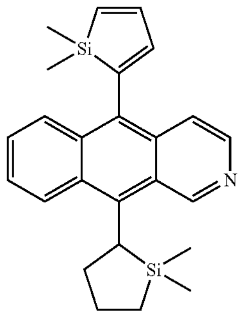
85
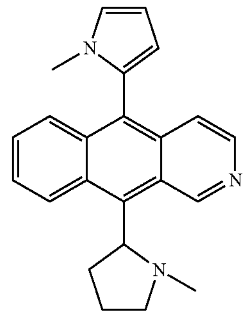
86
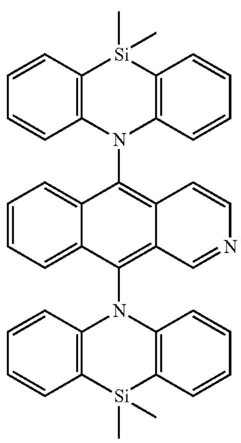
87
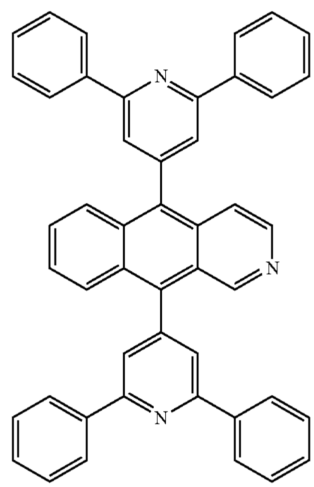
88
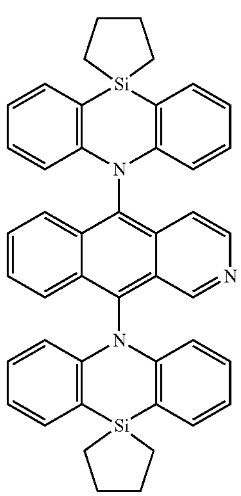
89
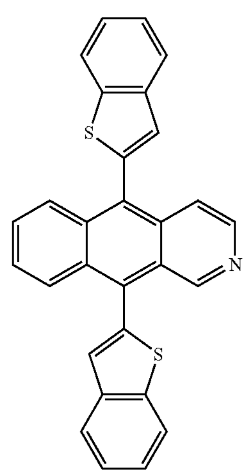
90

-continued
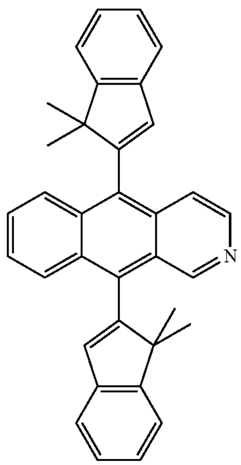
91
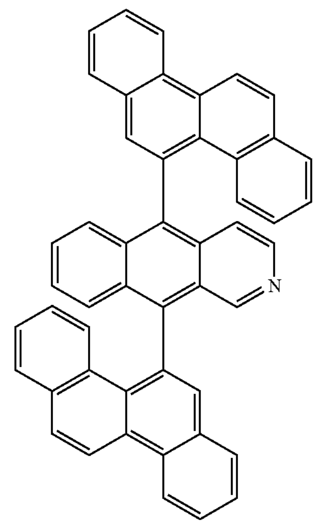
92
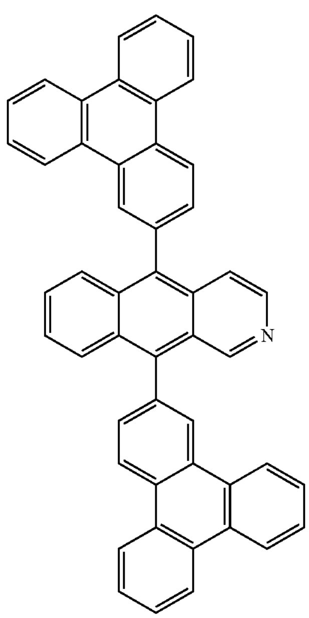
93
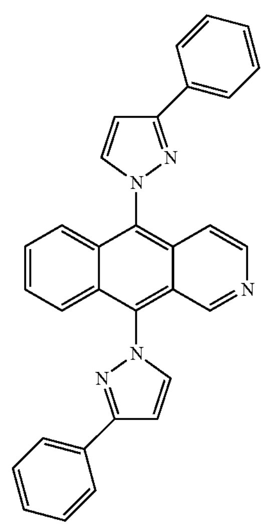
94

-continued
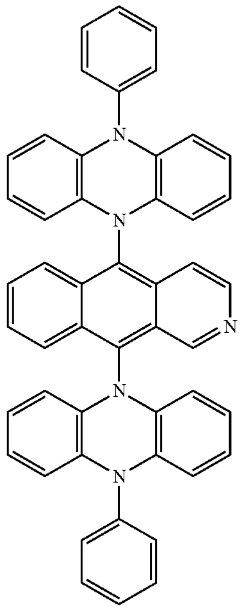
95
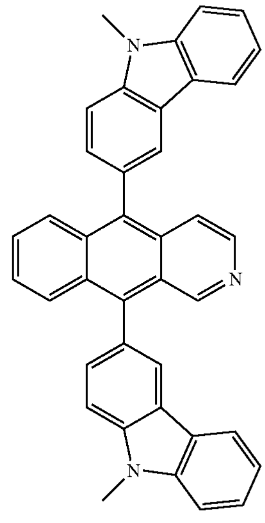
96
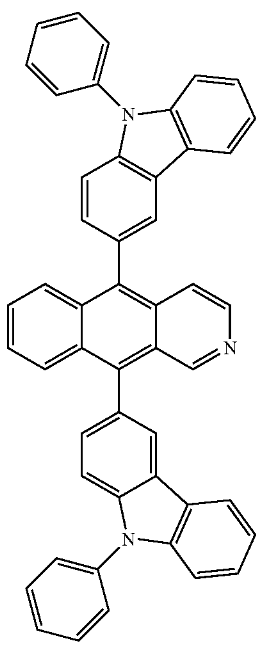
97
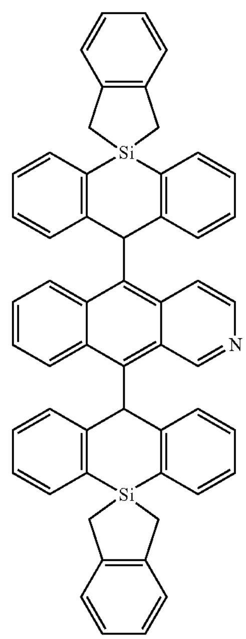
98

-continued
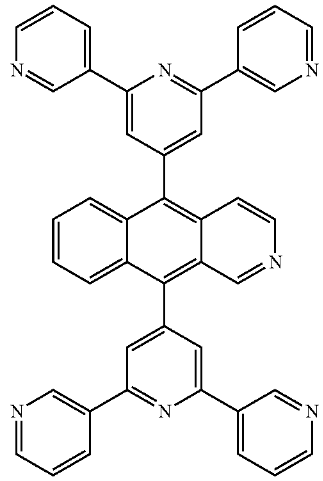
99
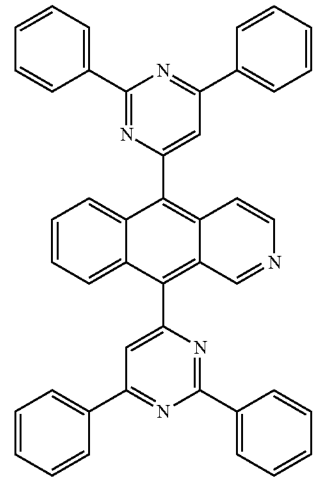
100
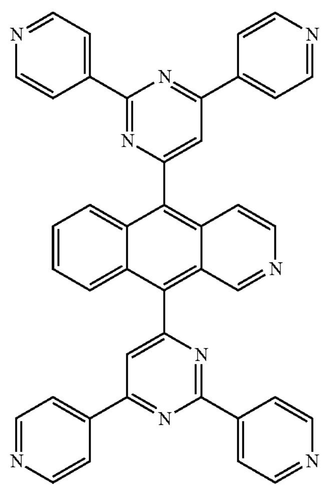
101
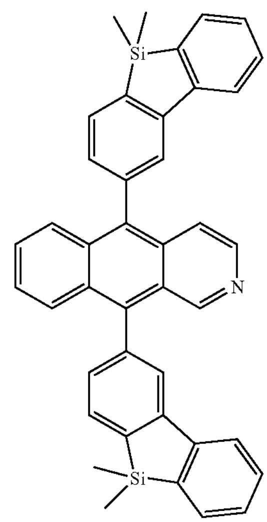
102
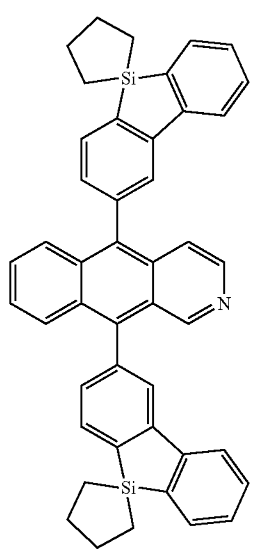
103
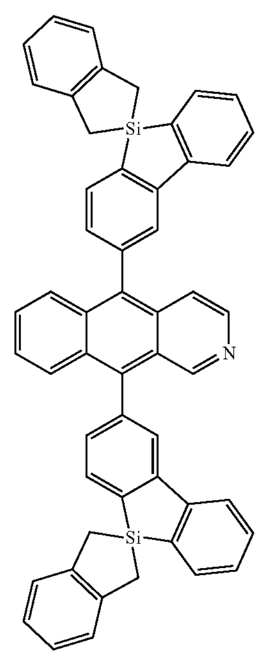
104

-continued
105
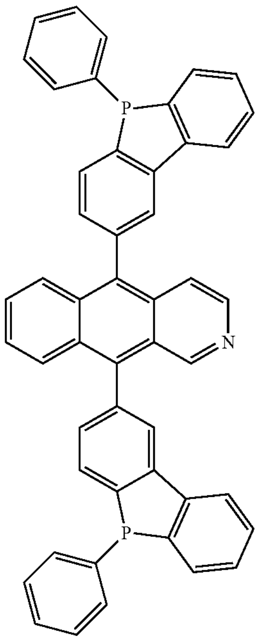
106
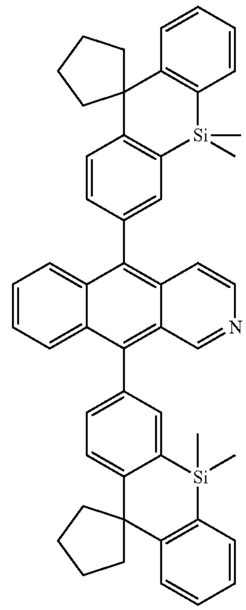
107
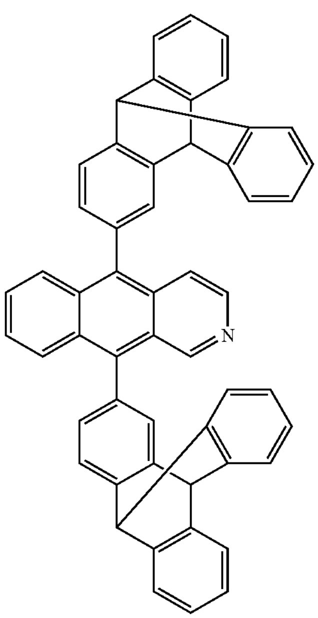
108
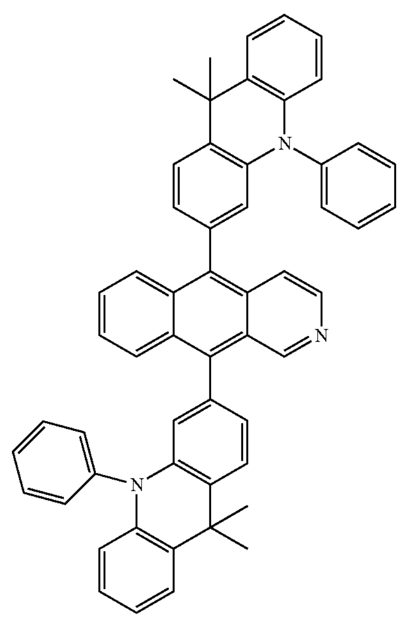

-continued
109
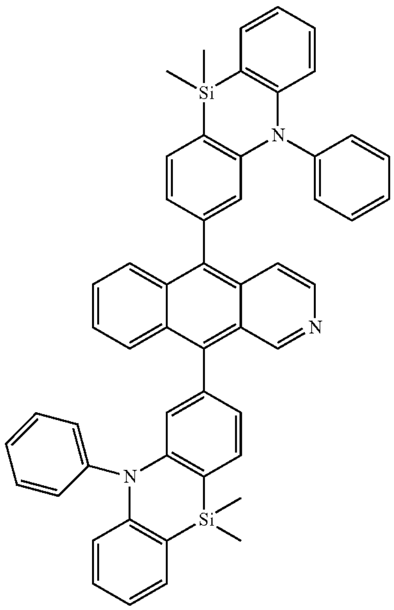
110
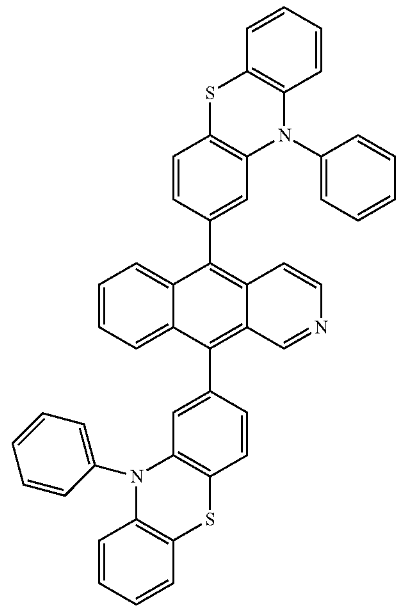
111
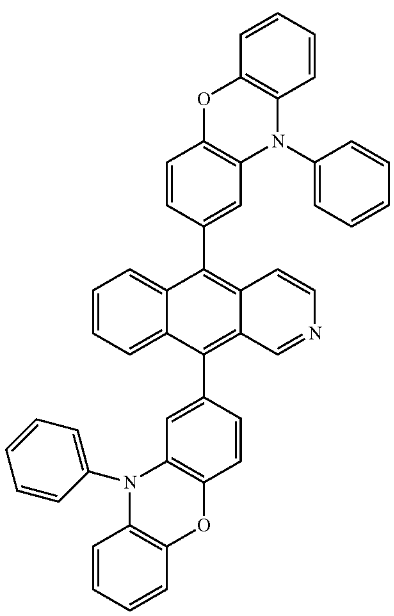
112
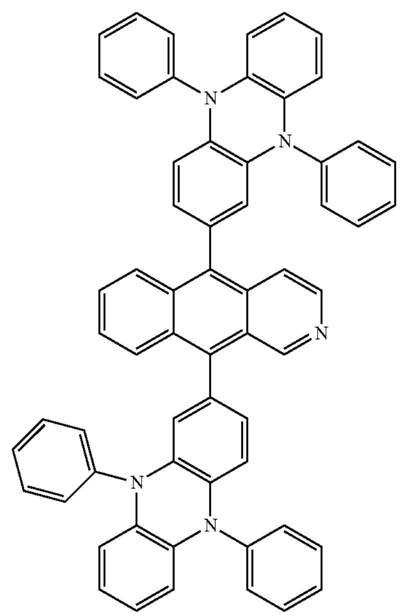

-continued
113
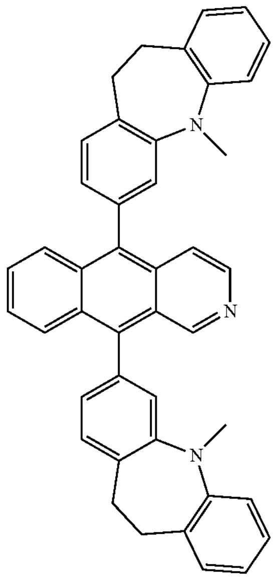
114
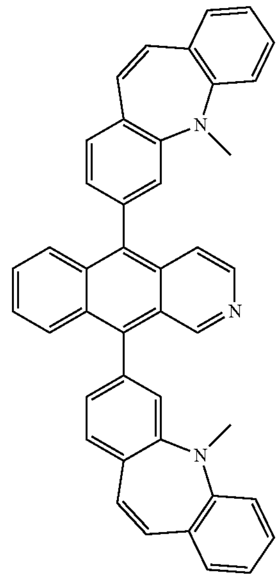
115
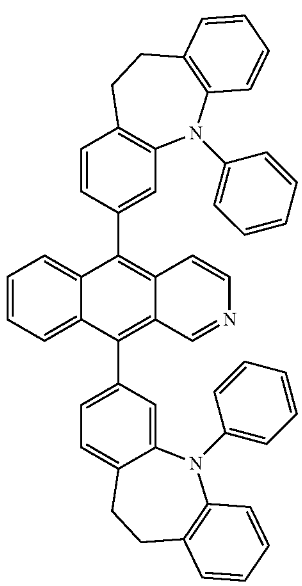
116
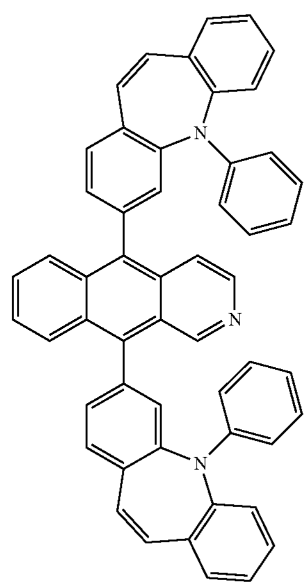

-continued
117
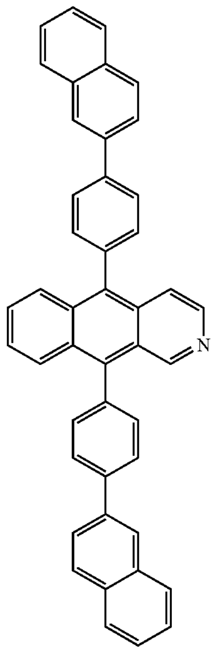
118
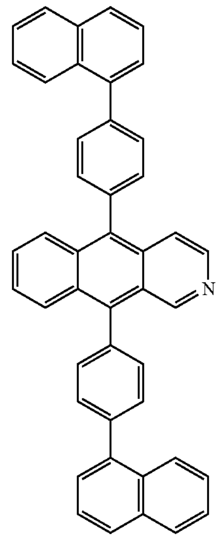
119
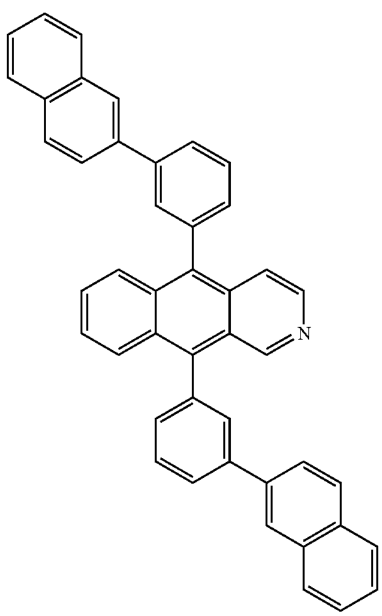
120
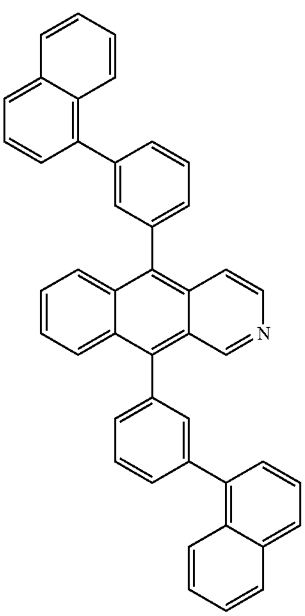

-continued
121
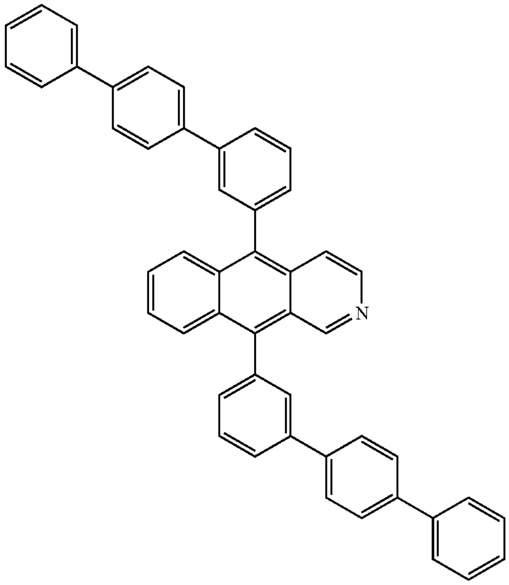
122
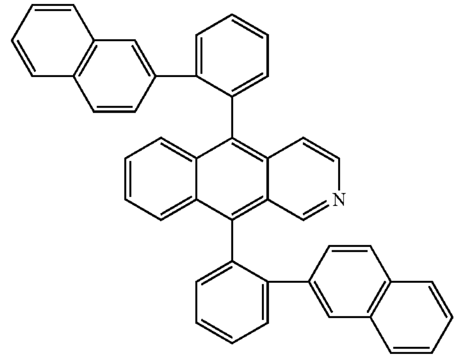
123
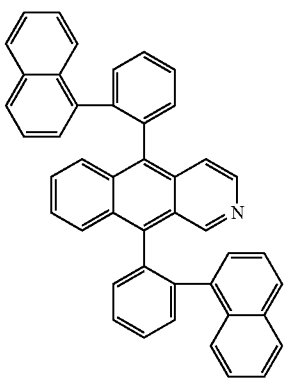
124
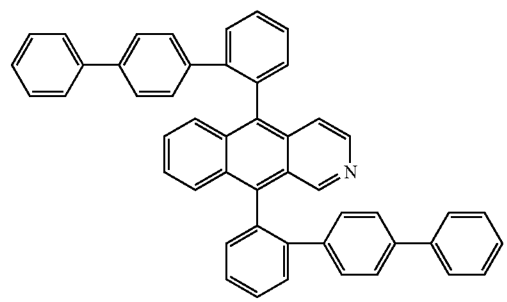
125
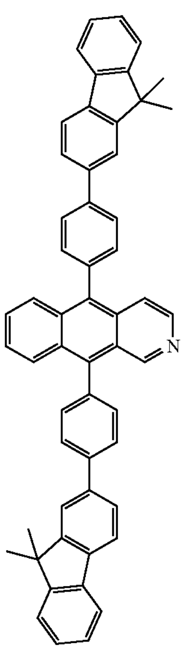
126
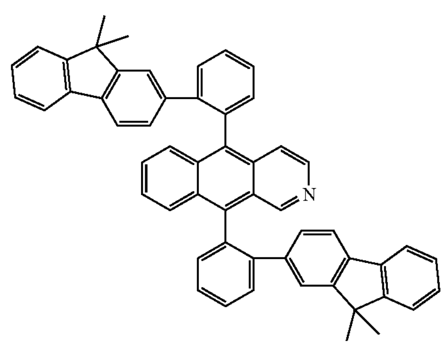

-continued
127
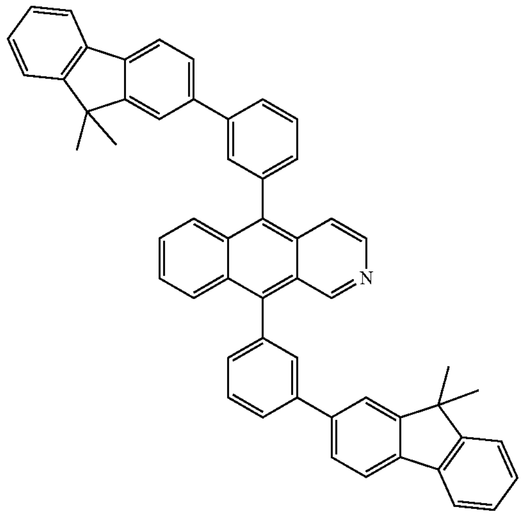
128
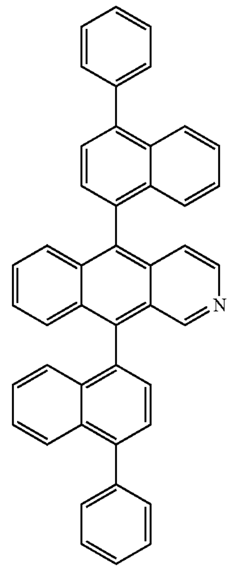
129
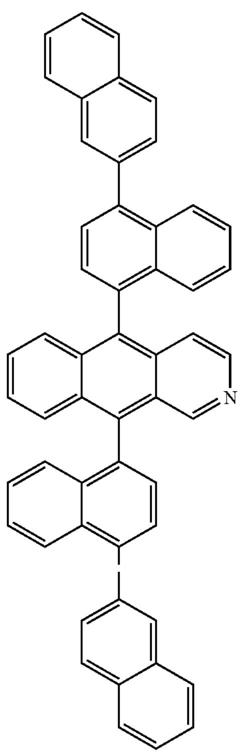
130
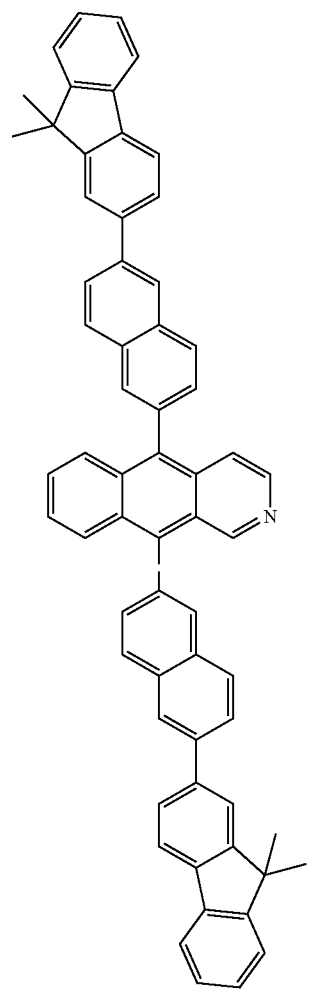

-continued
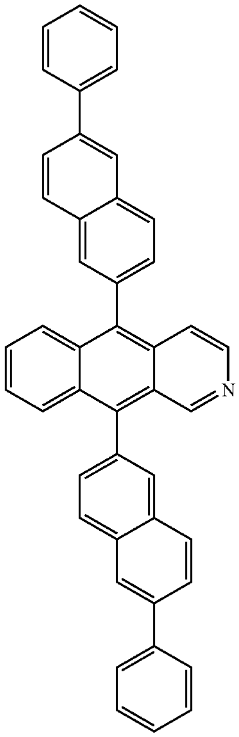
131
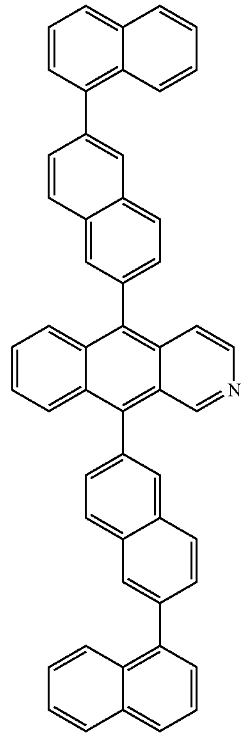
132
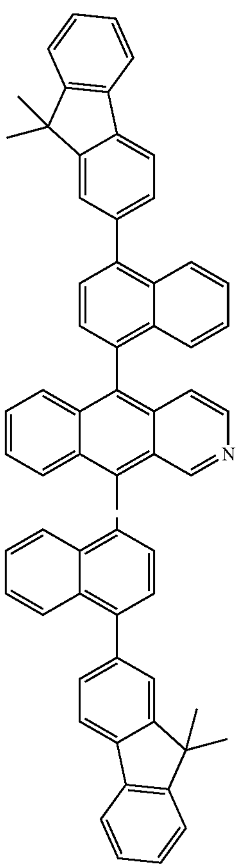
133
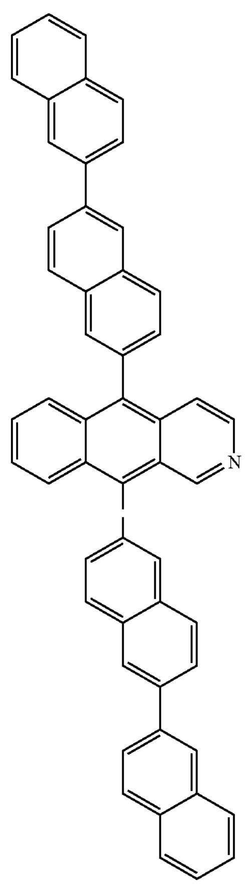
134

-continued
135
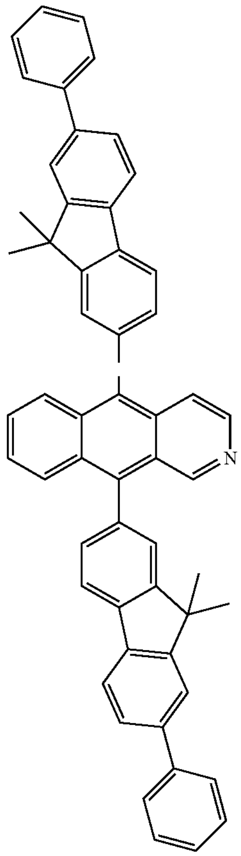
136
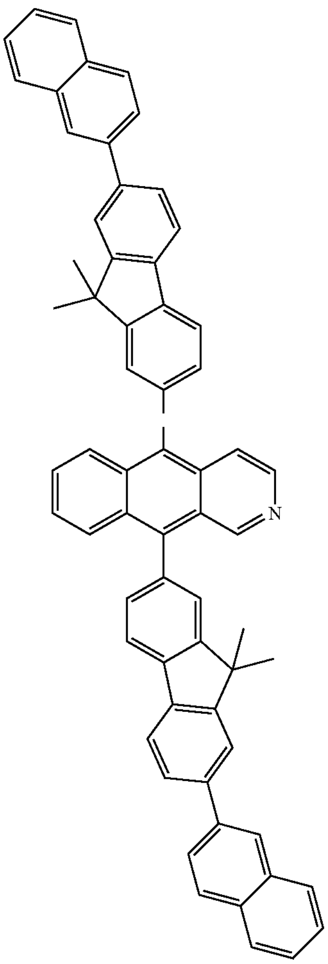
137
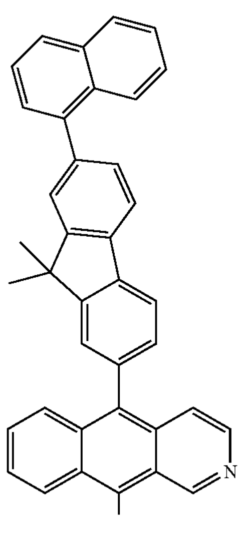

-continued
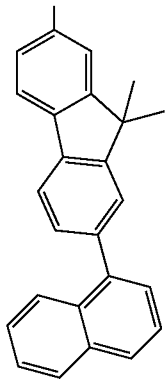
138
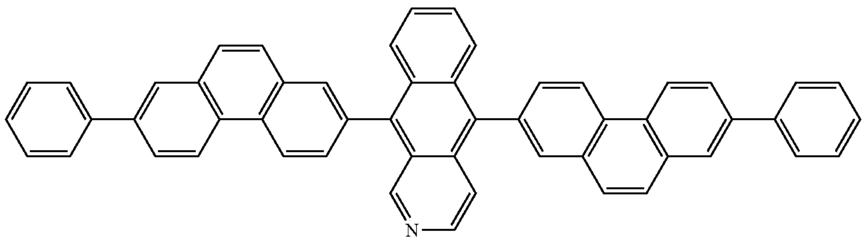
139
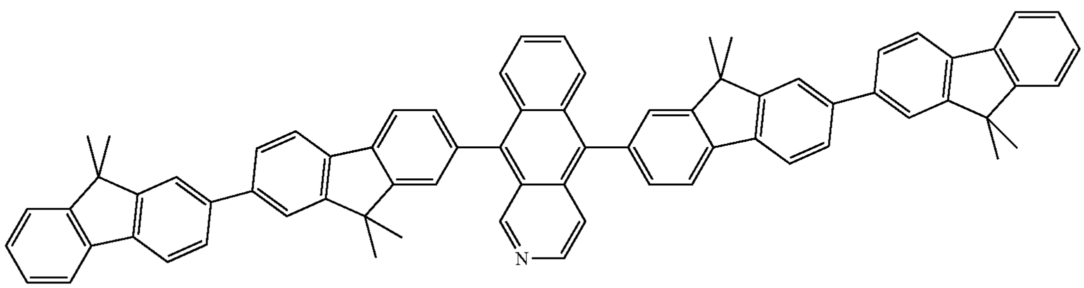
140
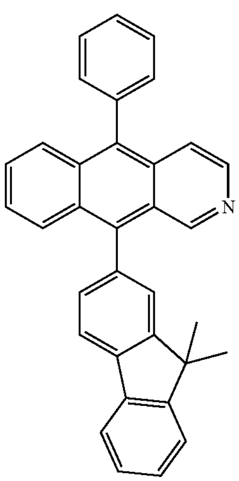
141
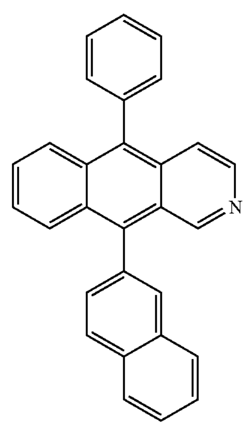

-continued
142
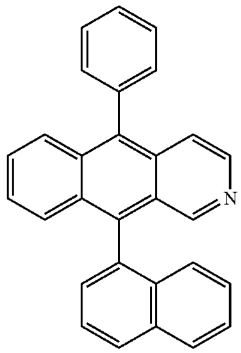
143
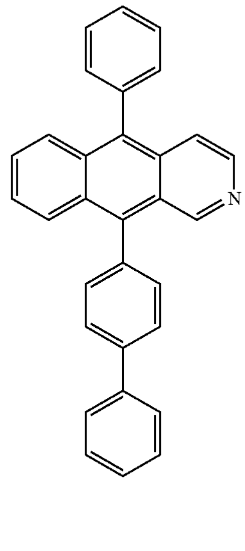
144
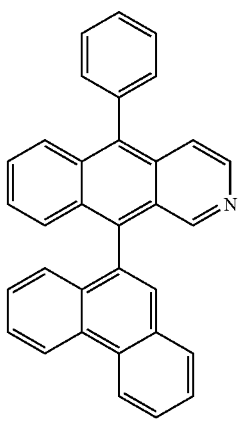
145
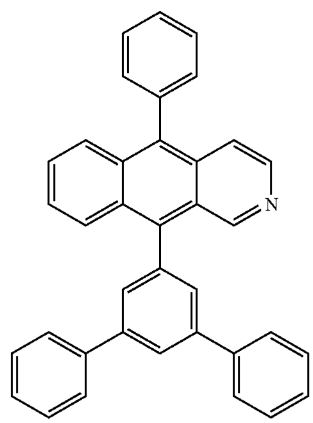
146
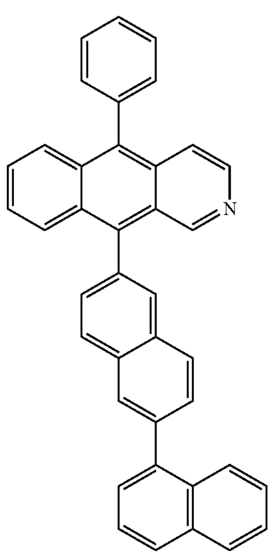
147
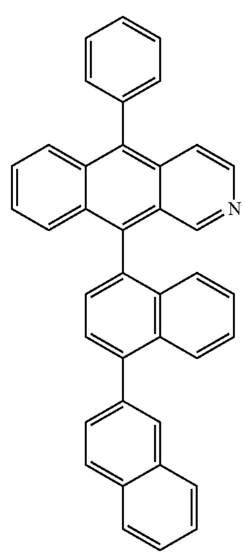

-continued
148
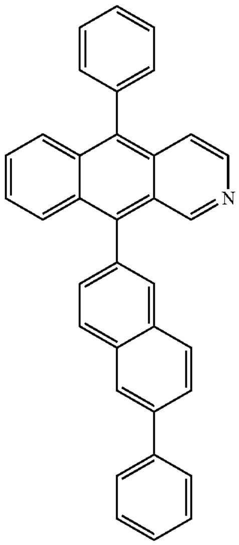
149
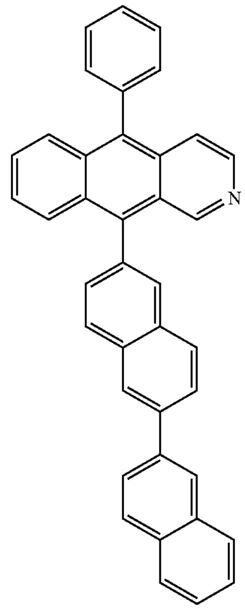
150
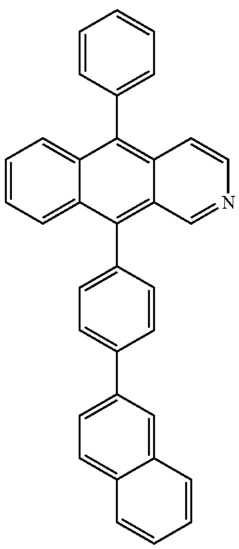
151
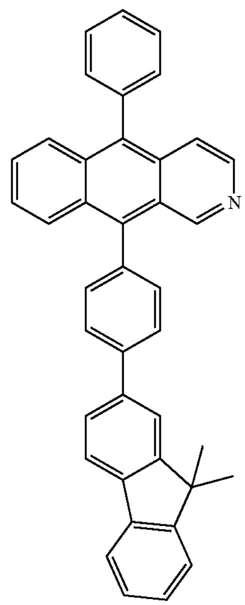
152
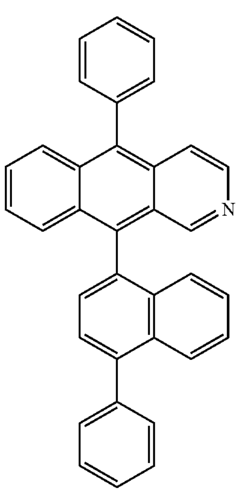
153
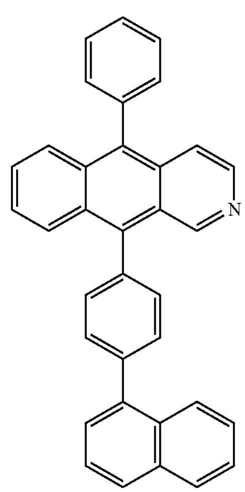

-continued
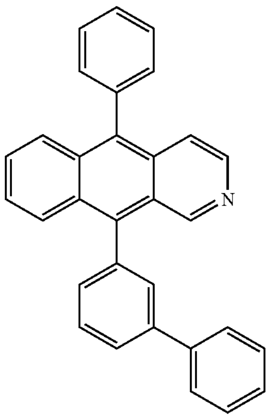
154
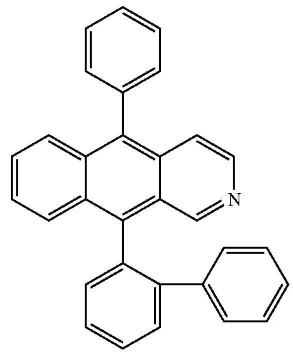
155
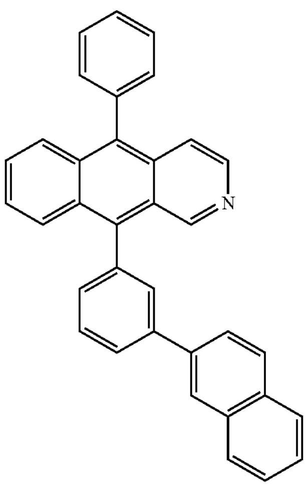
156
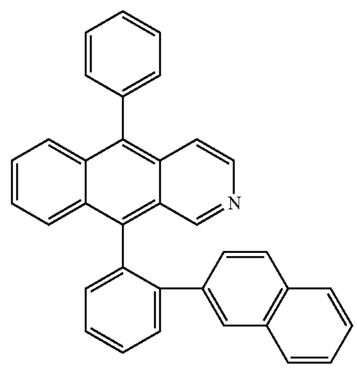
157
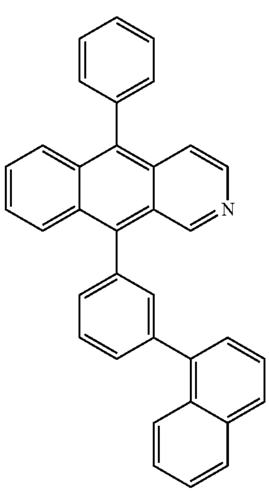
158
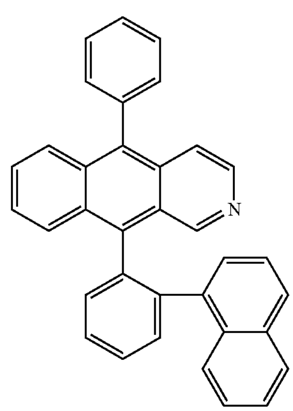
159

-continued
160
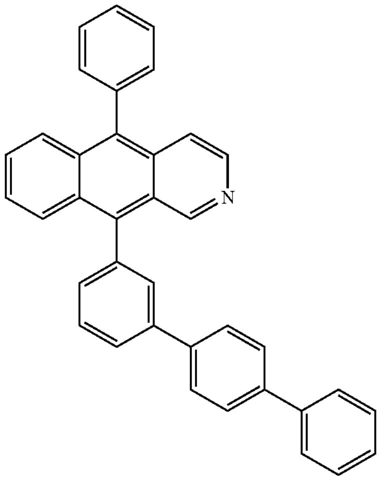
161
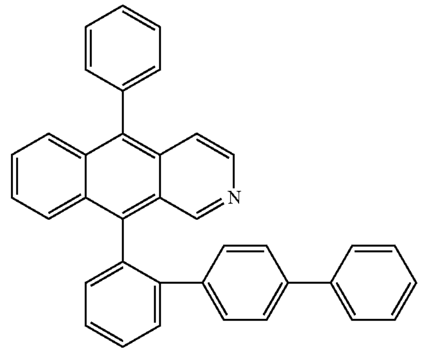
162
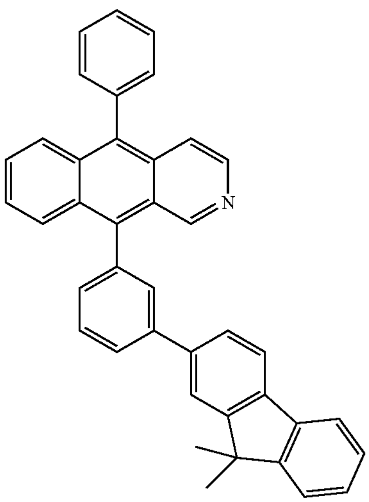
163
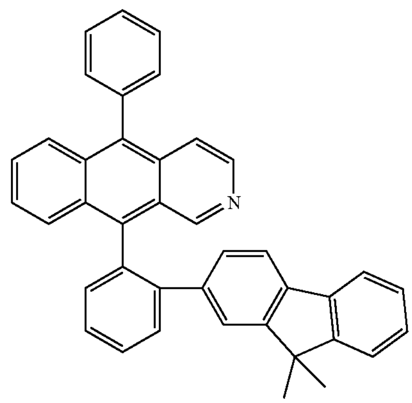
164
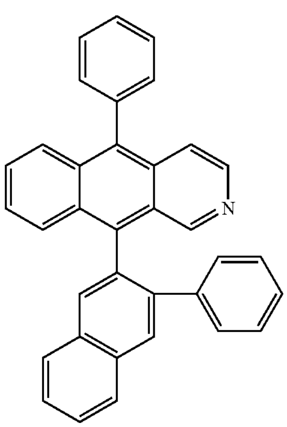
165
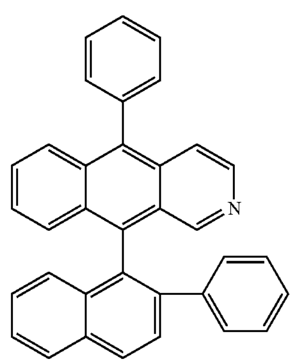

-continued
166
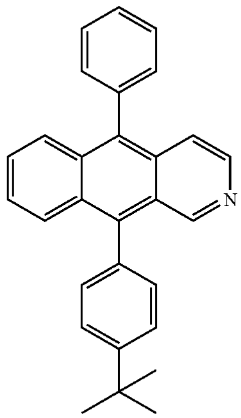
167
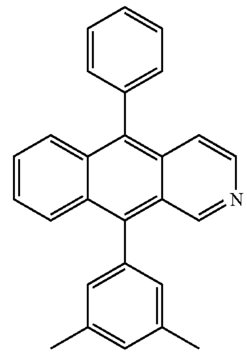
168
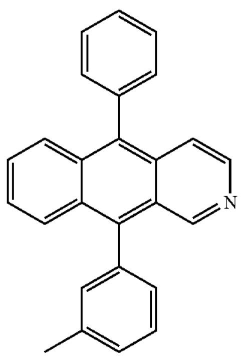
169
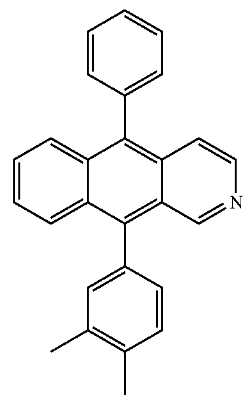
170
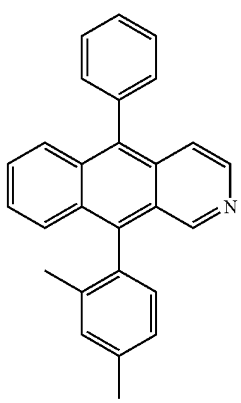
171
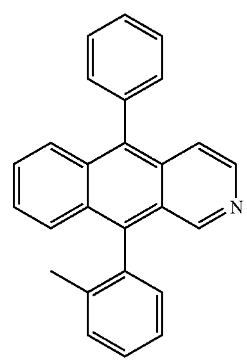
172
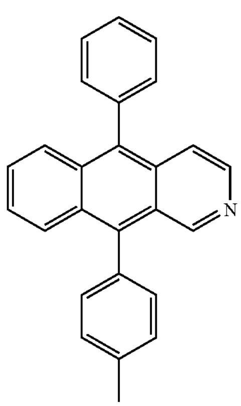
173
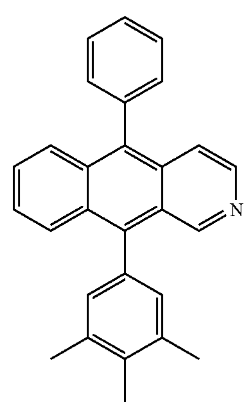

-continued
174
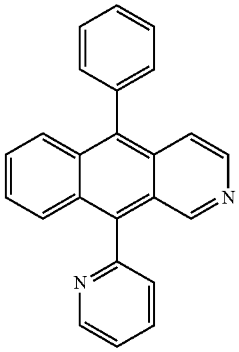
175
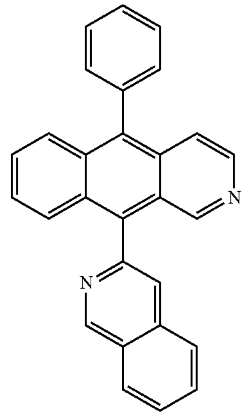
176
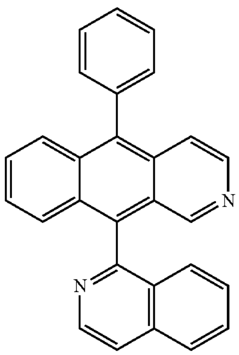
177
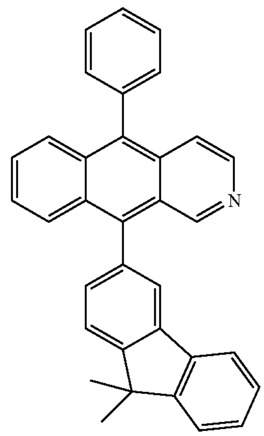
178
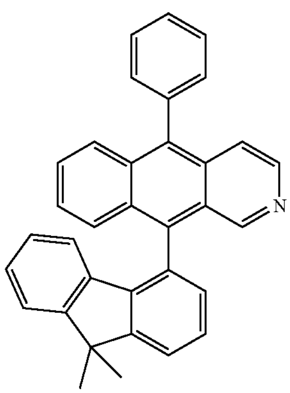
179
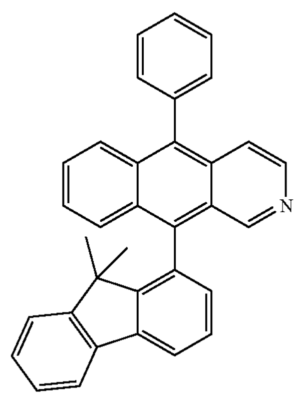
180
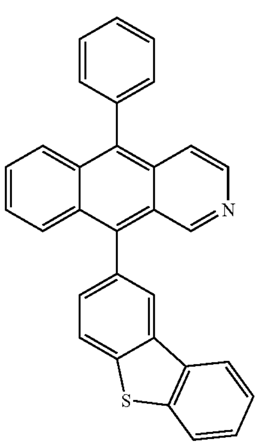
181
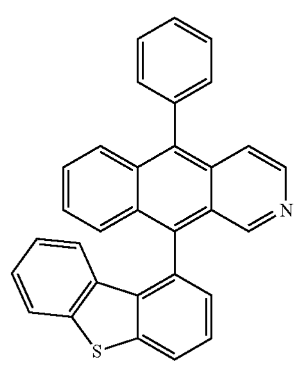

-continued
182
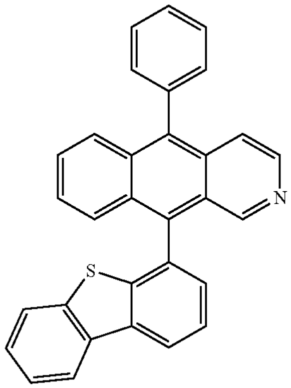
183
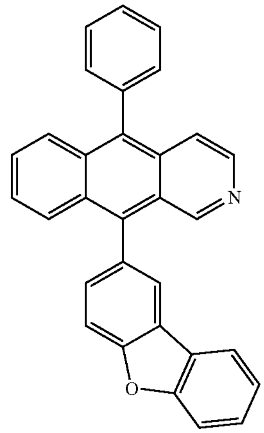
184
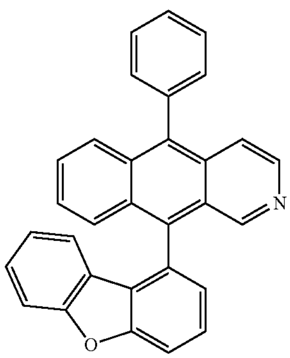
185
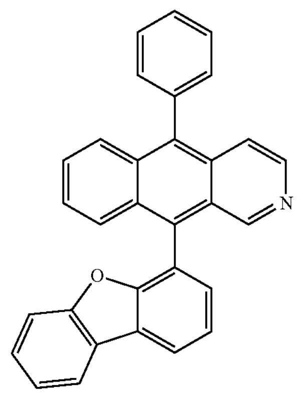
186
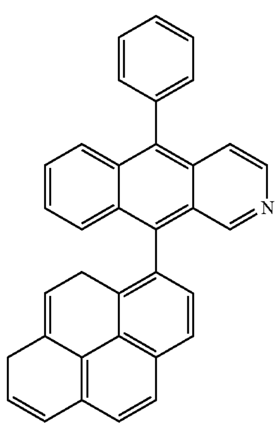
187
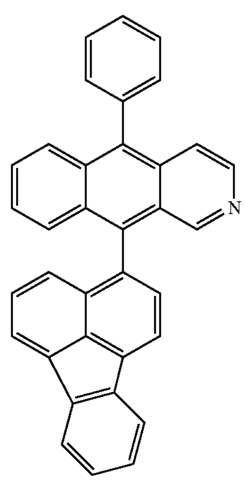

-continued
188
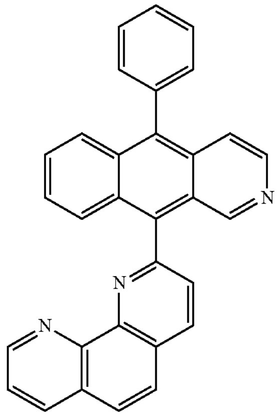
189
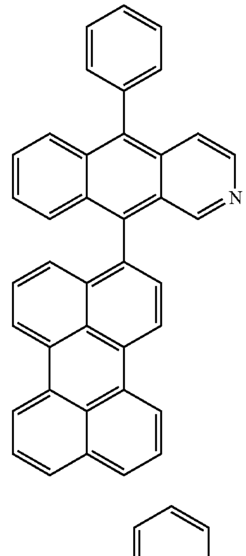
190
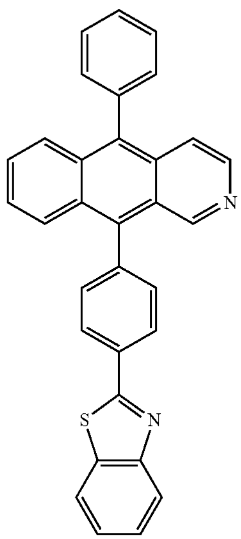
191
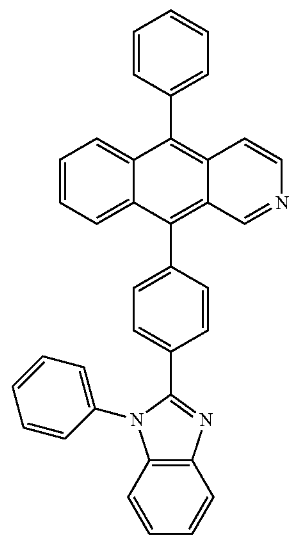
192
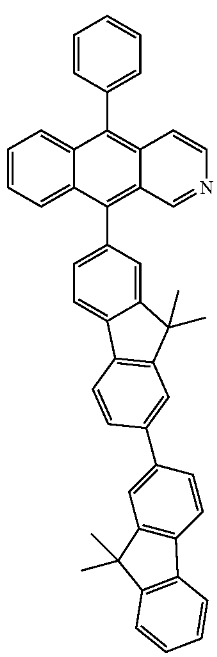
193
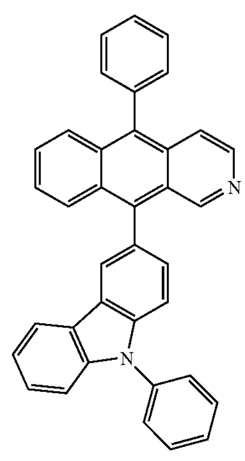

-continued
194
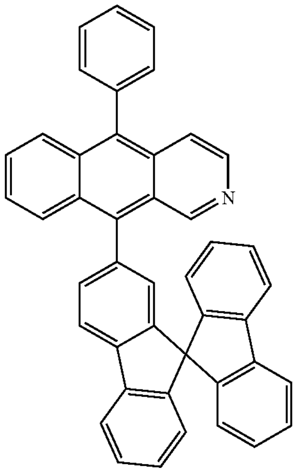
195
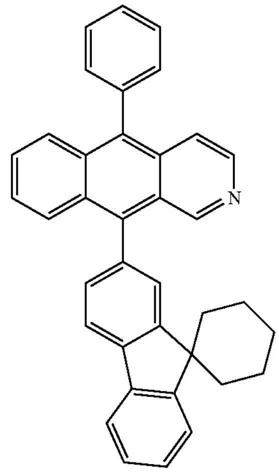
196
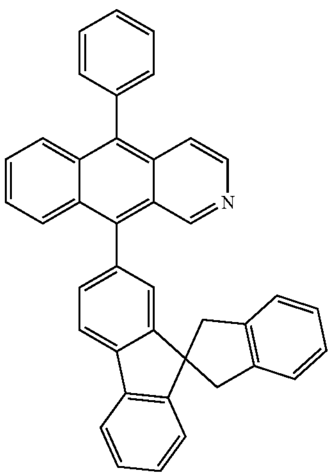
197
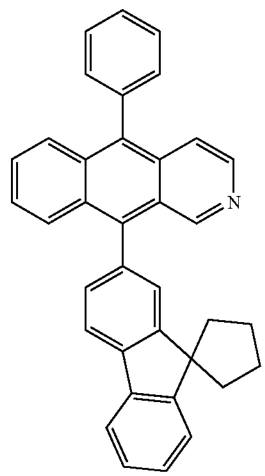
198
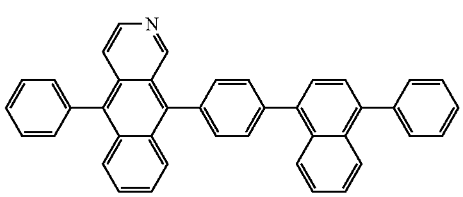
199
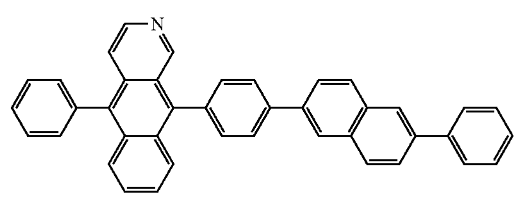
200
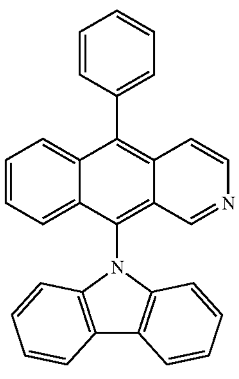
201
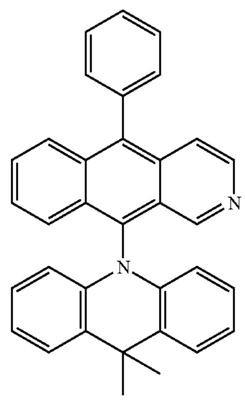

-continued
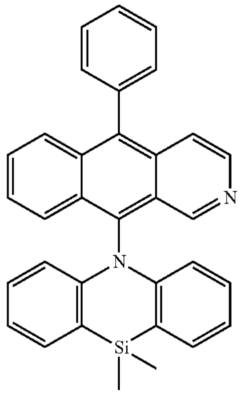
202
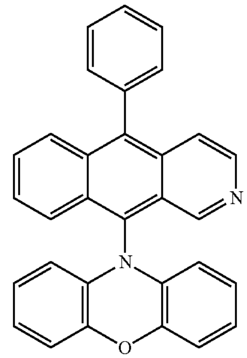
203
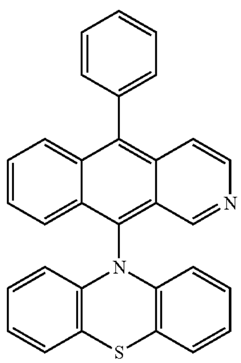
204
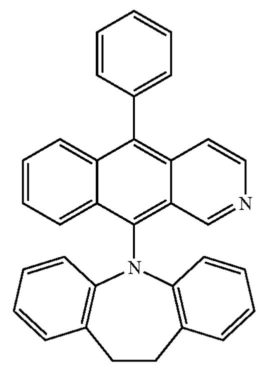
205
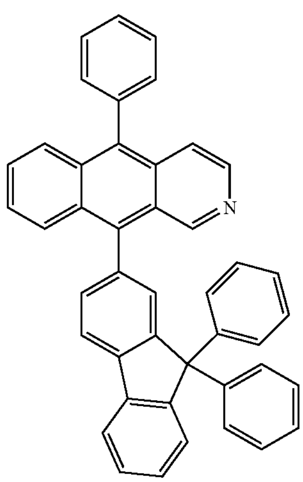
206
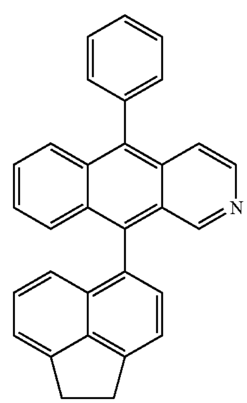
207
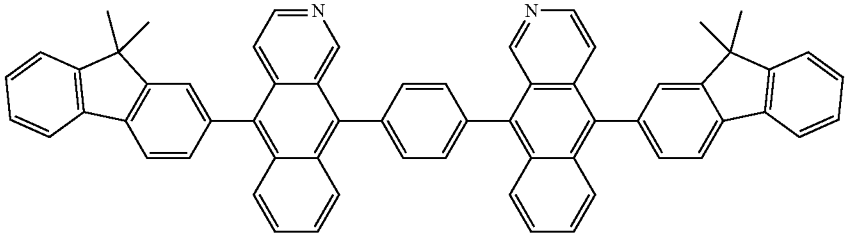
208

-continued
209
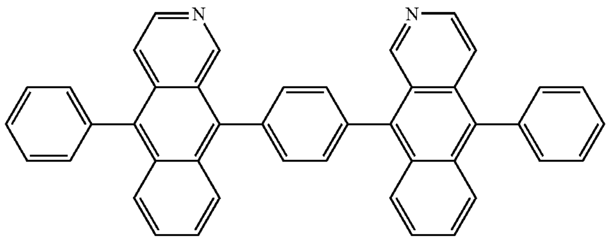
210
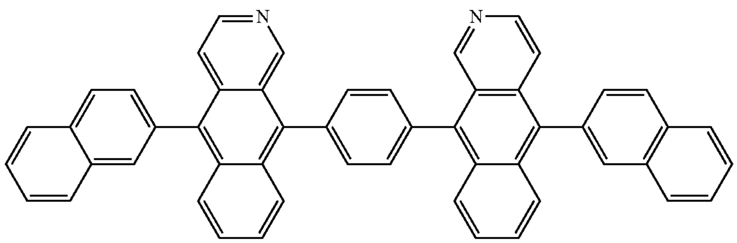
211
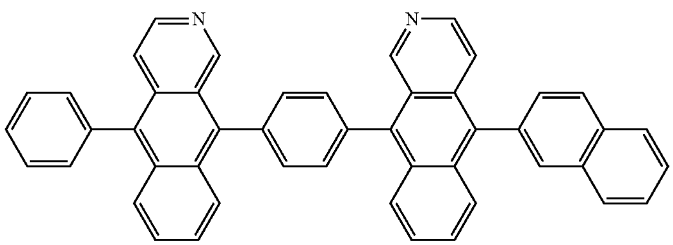
212
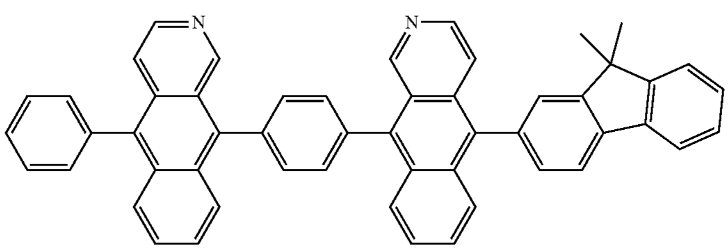
213
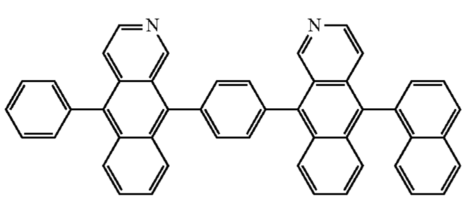
214
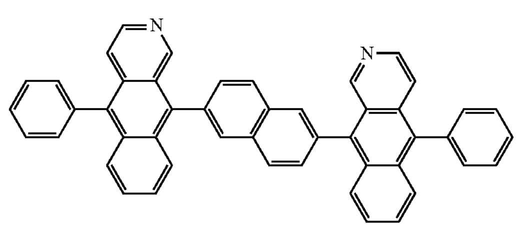
215
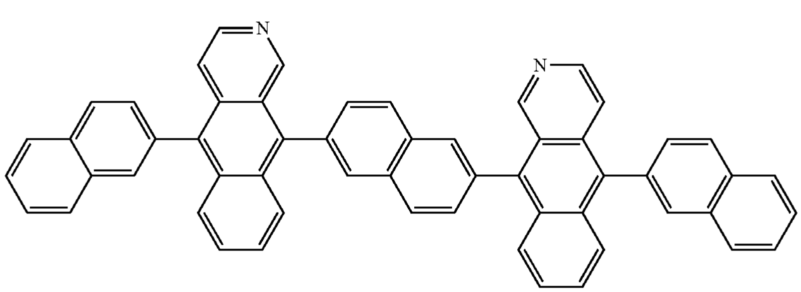

-continued
216
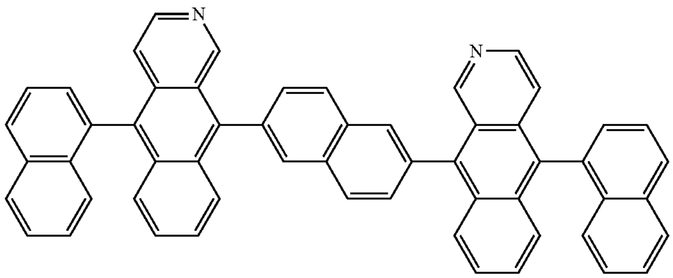
217
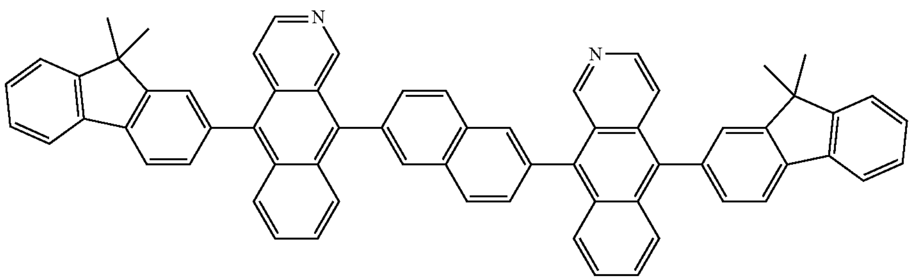
218
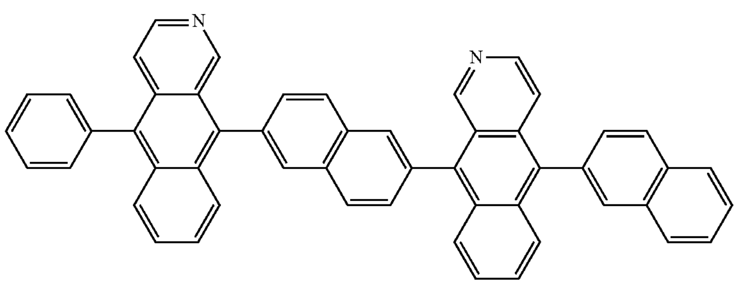
219
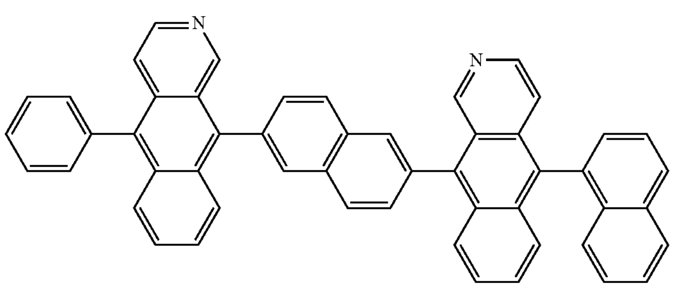
220
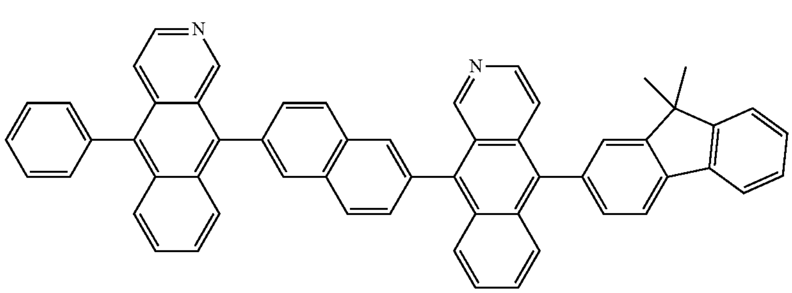

-continued
221
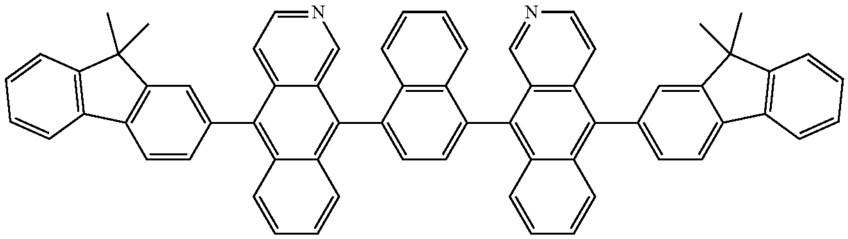
222
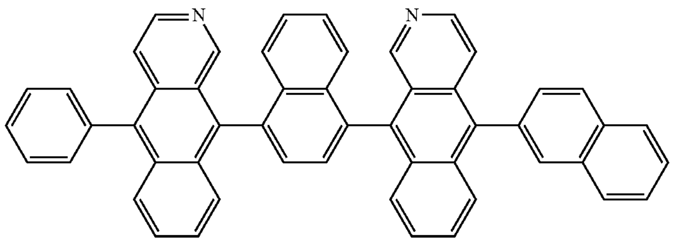
223
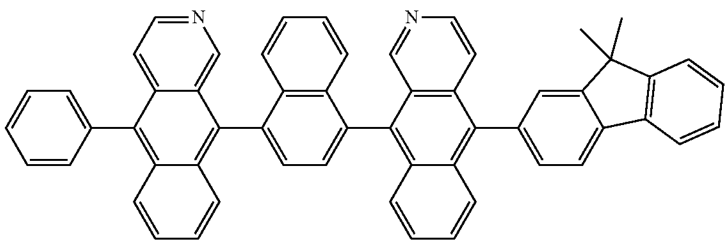
224
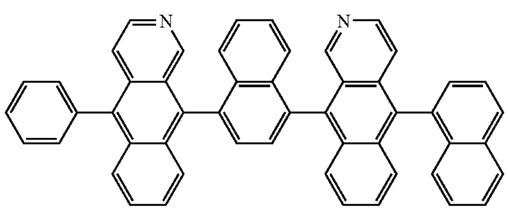
225
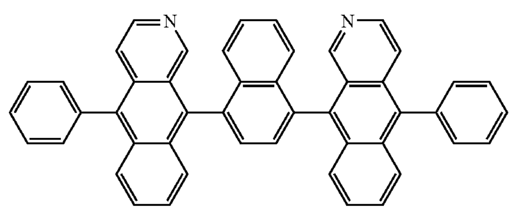
226
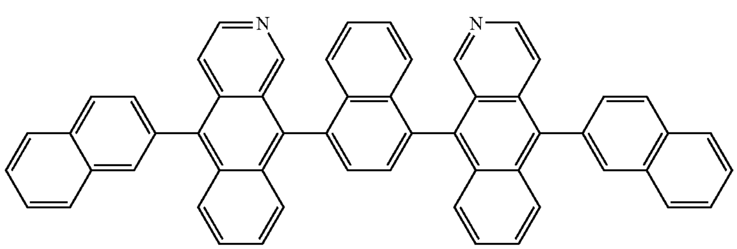
227
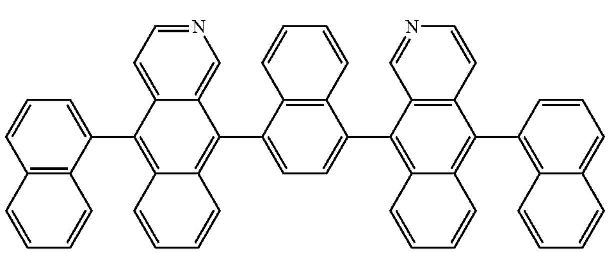

-continued
228
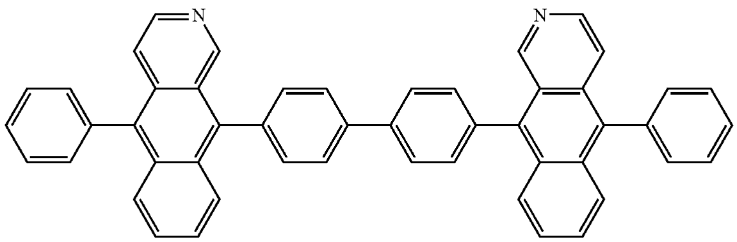
229
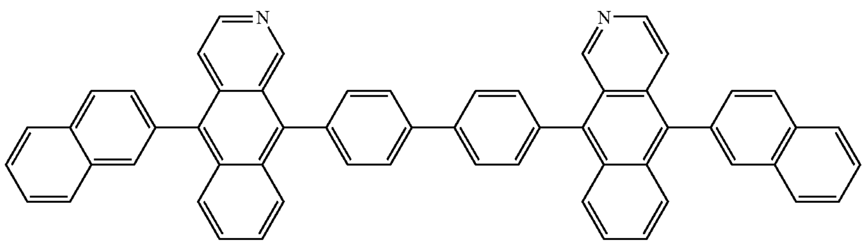
230
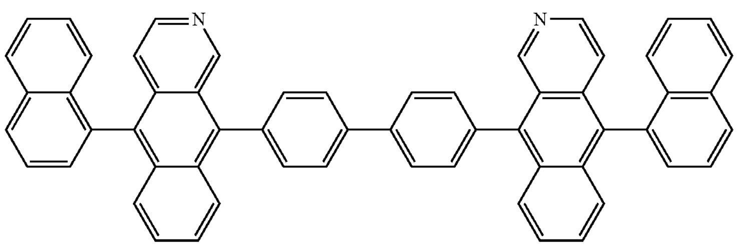
231
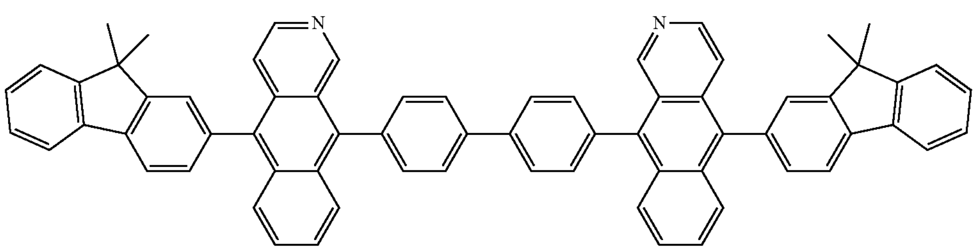
232
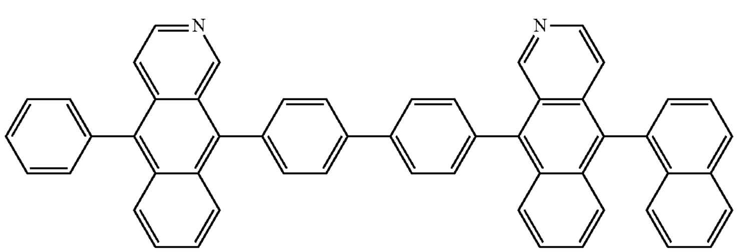
233
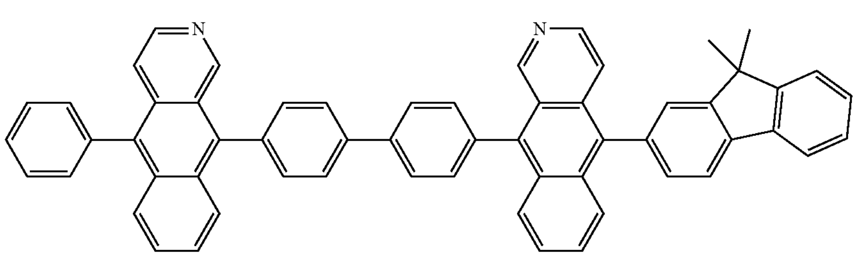

-continued
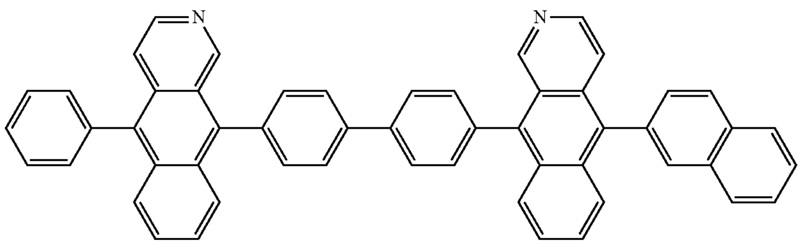
234
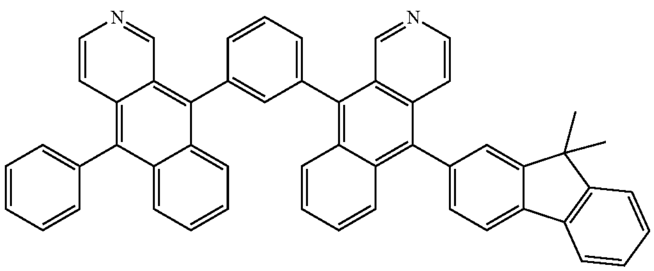
235
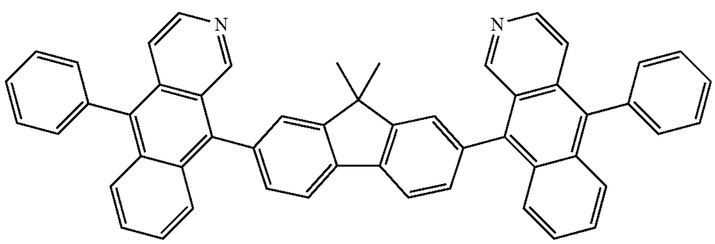
236
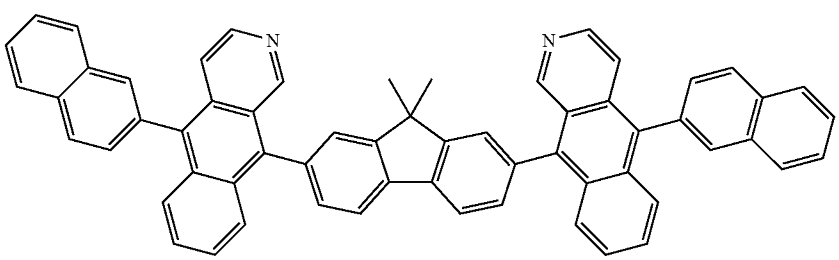
237
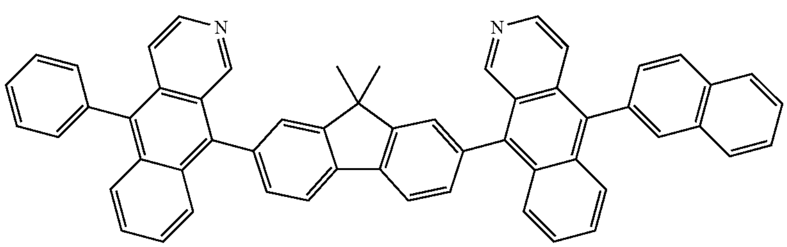
238
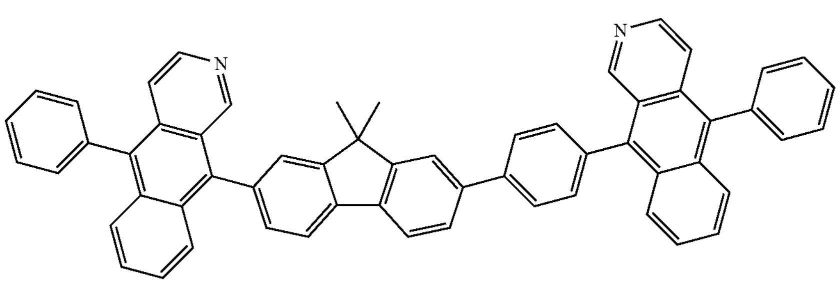
239

-continued
240
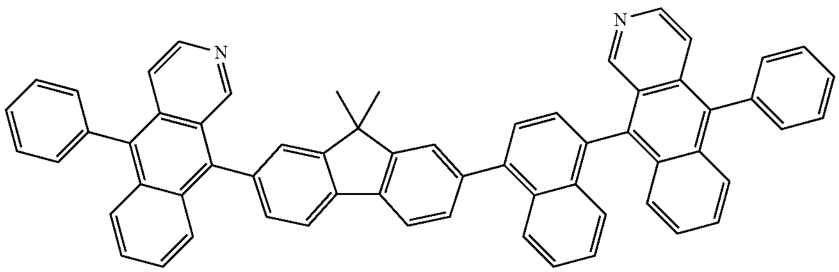
241
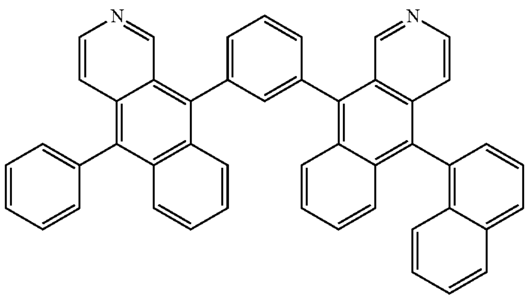
242
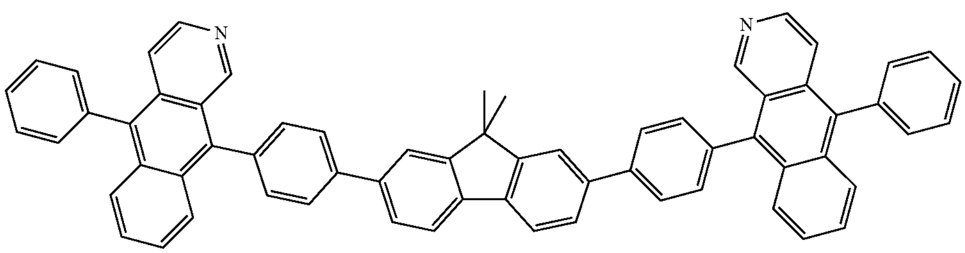
243
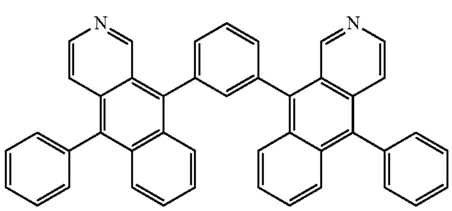
244
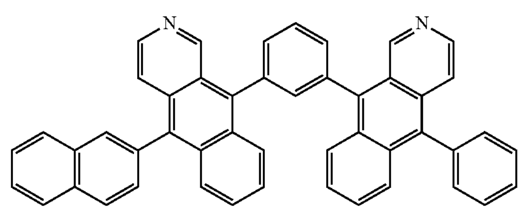
245
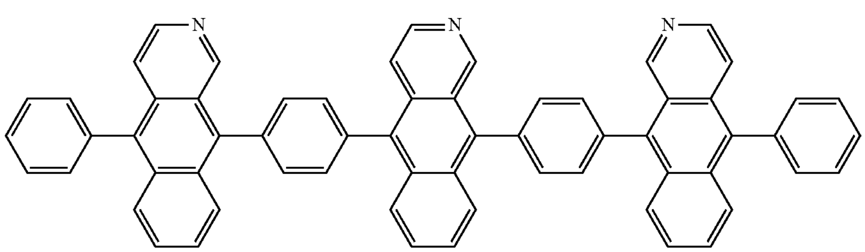
246
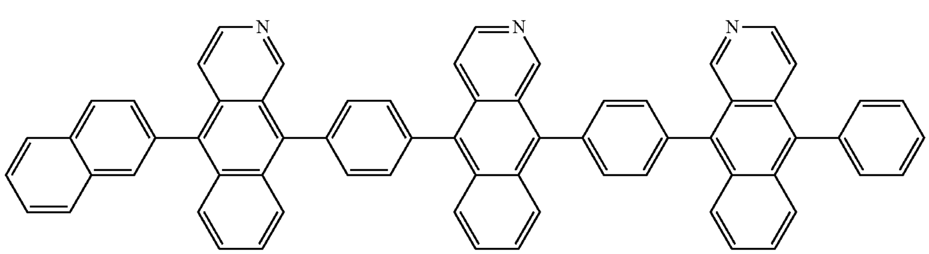

-continued
247
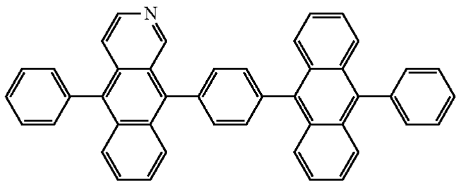
248
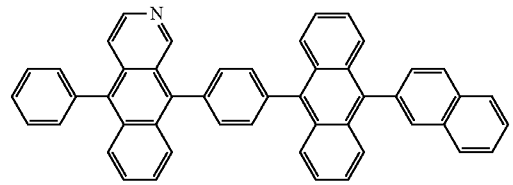
249
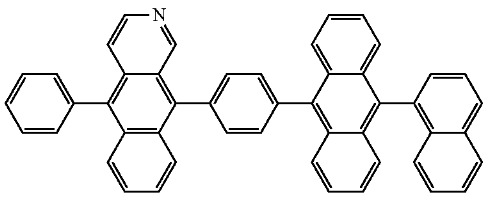
250
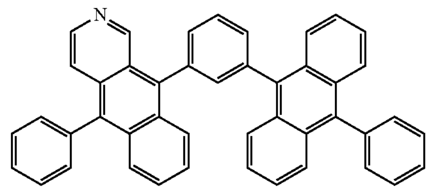
251
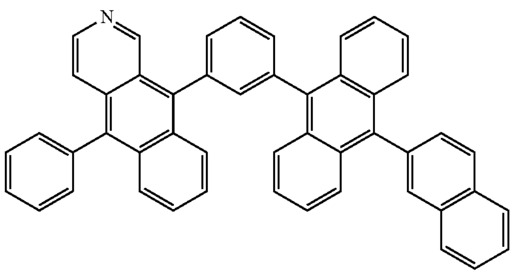
252
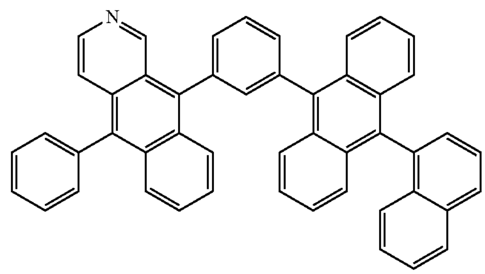
253
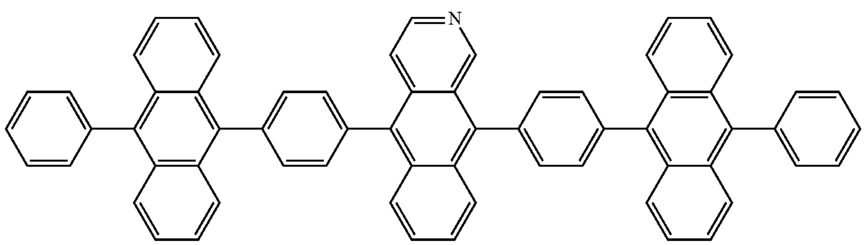
254
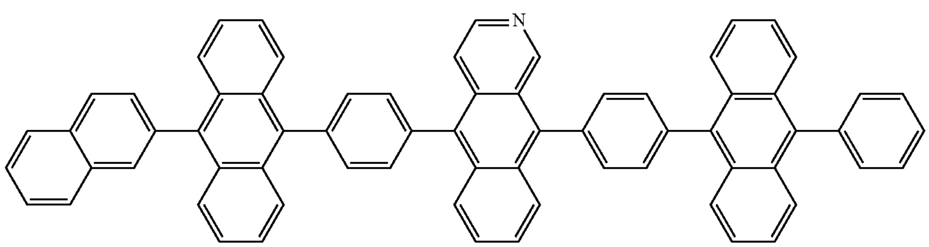
255
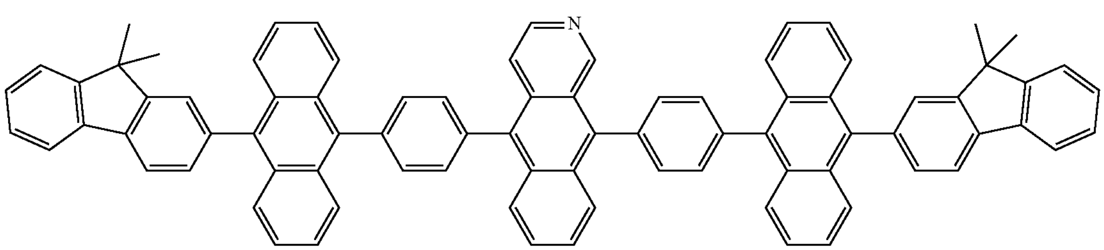
256
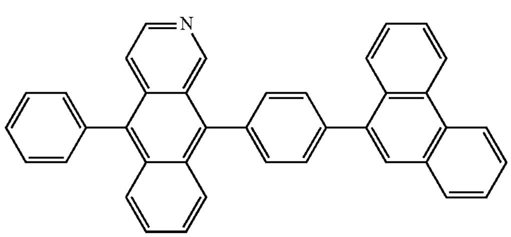
257
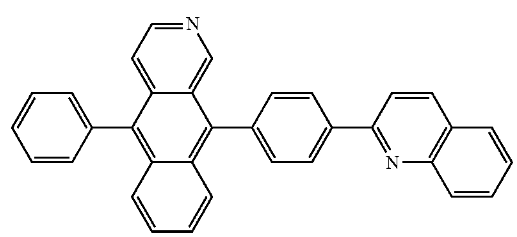

-continued
258
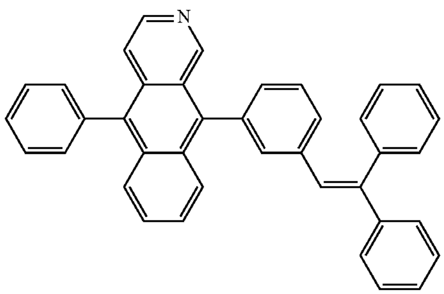
259
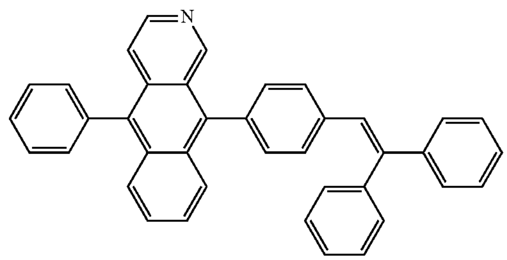
260
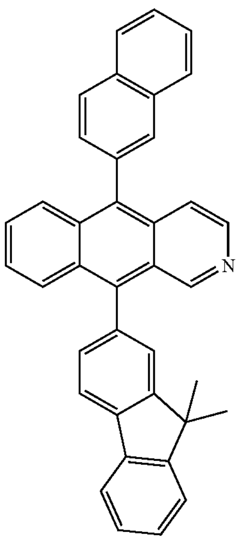
261
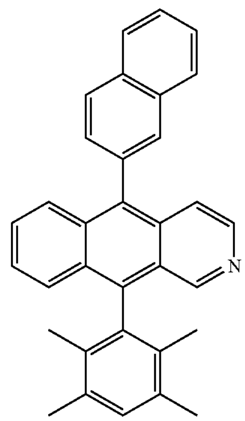
262
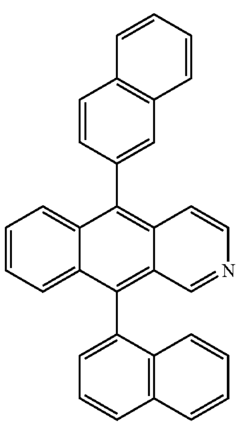
263
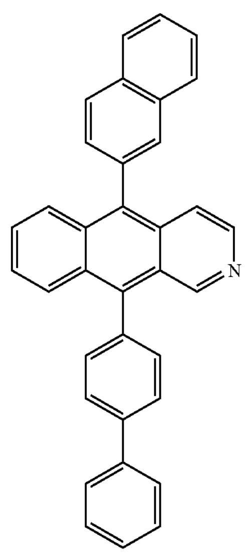

-continued
264
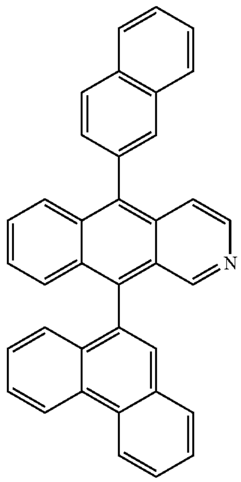
265
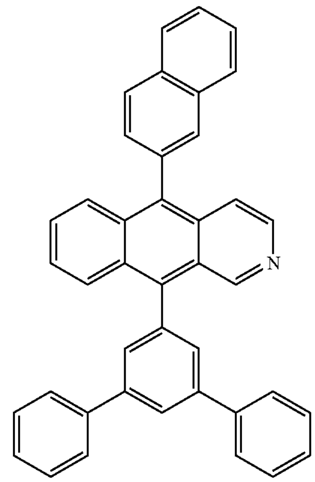
266
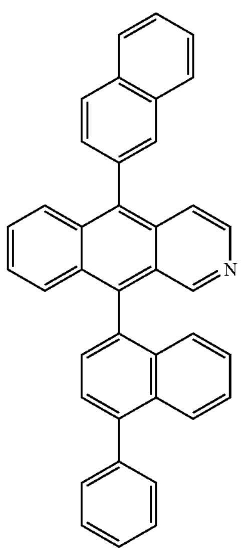
267
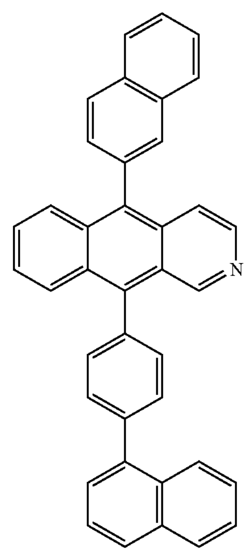
268
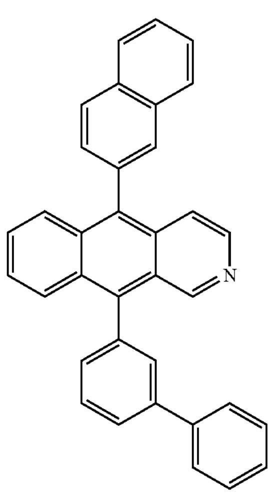
269
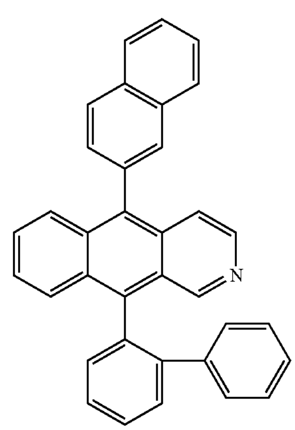

-continued
270
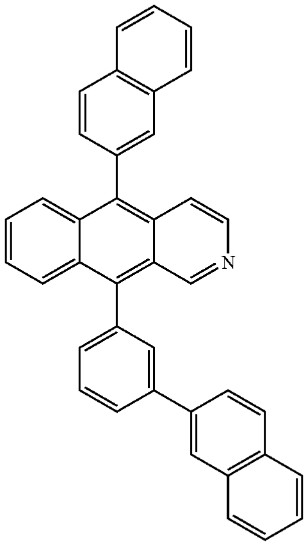
271
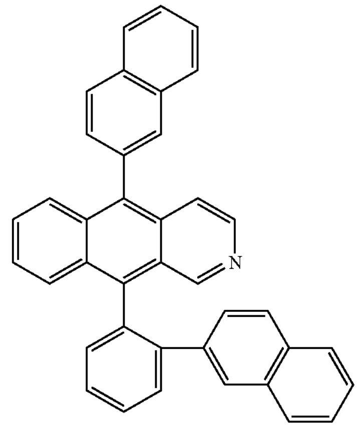
272
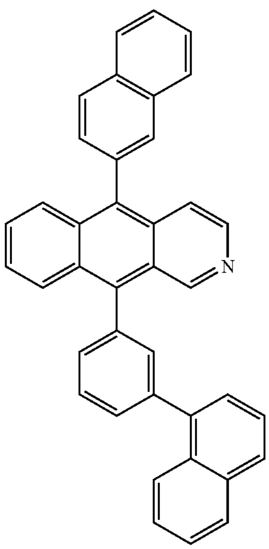
273
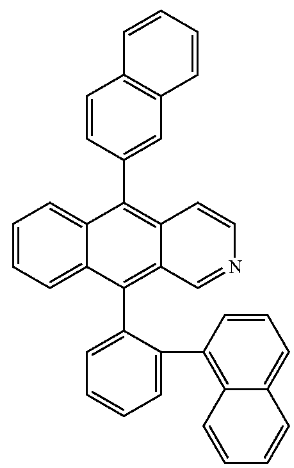
274
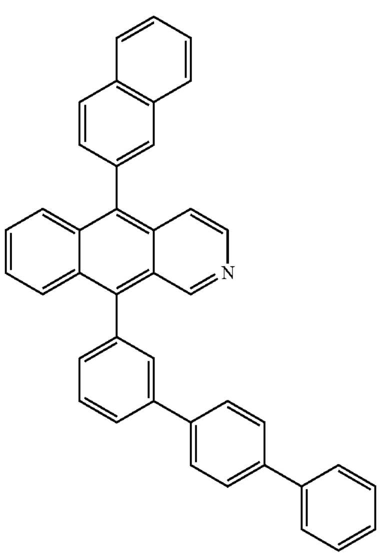
275
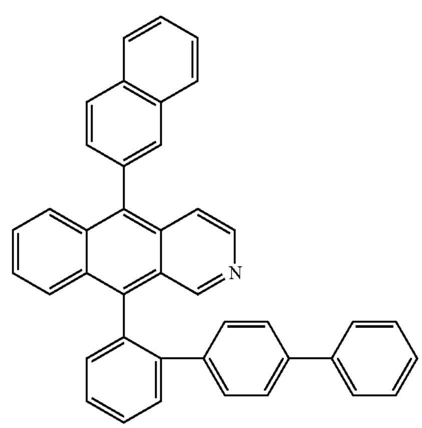

-continued
276
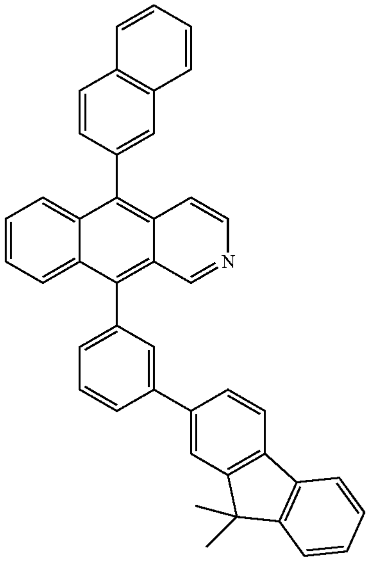
277
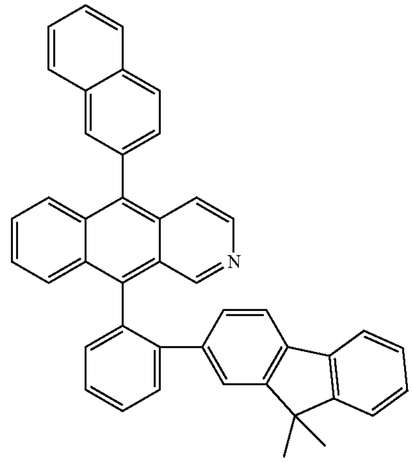
278
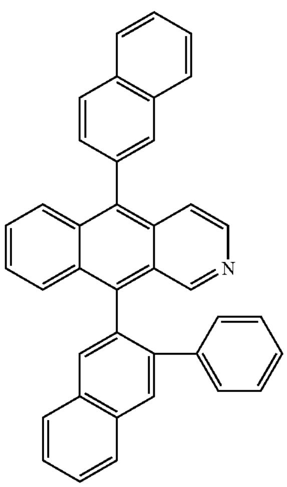
279
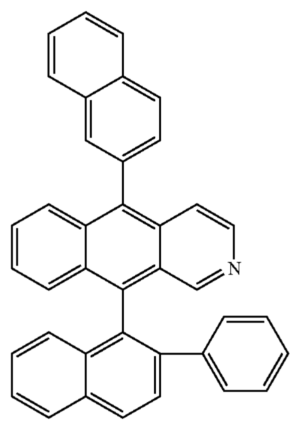
280
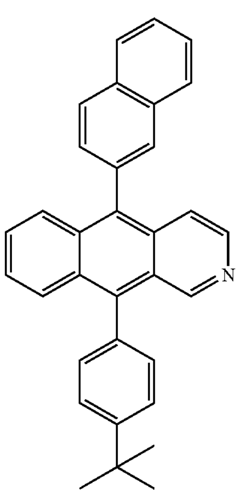
281
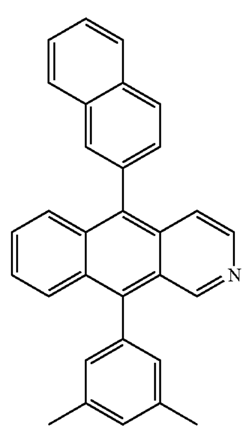

-continued
282
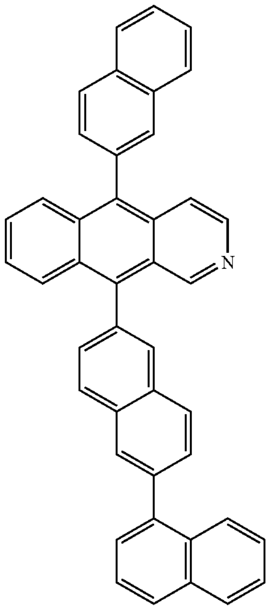
283
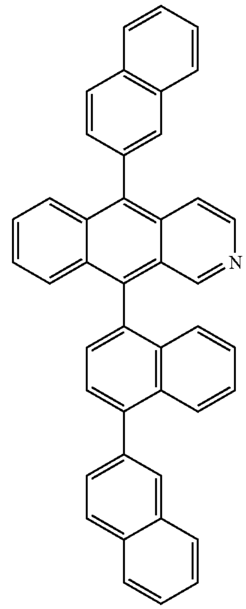
284
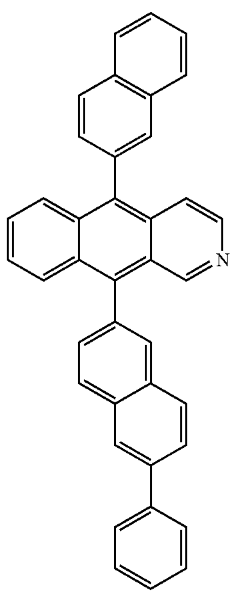
285
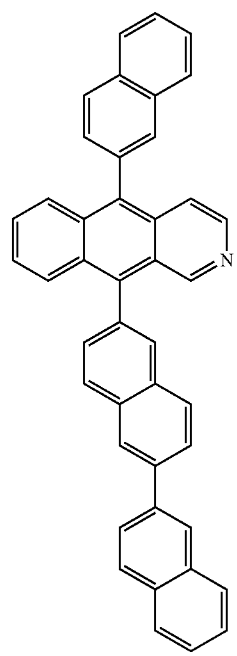

-continued
286
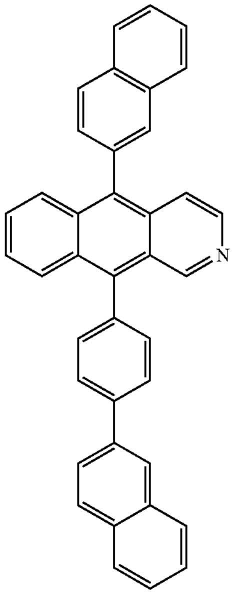
287
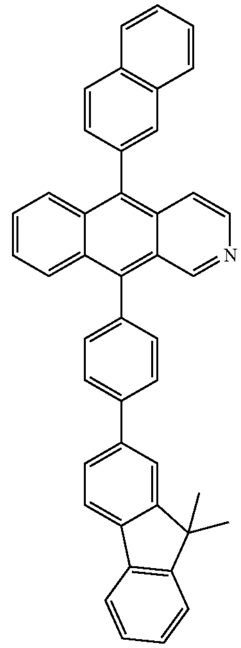
288
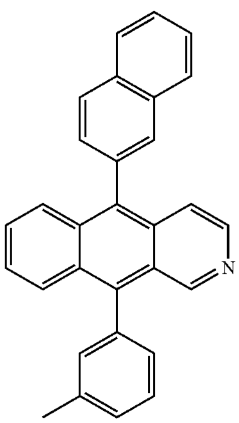
289
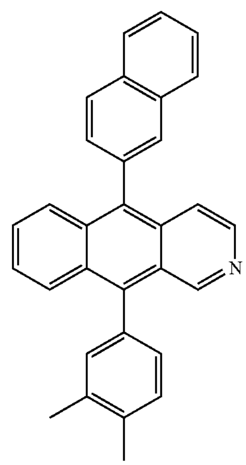
290
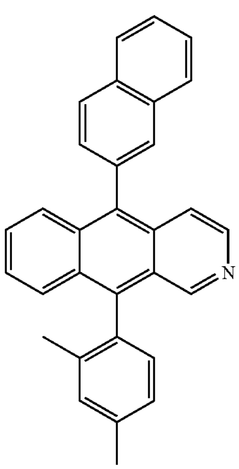
291
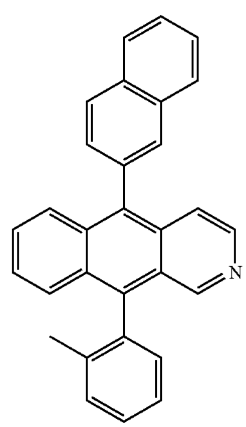

-continued
292
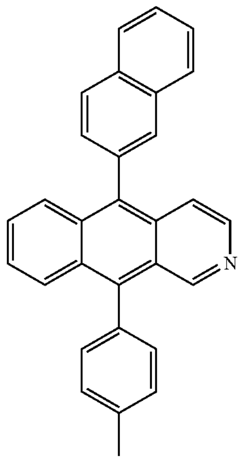
293
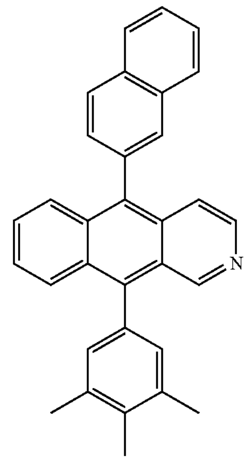
294
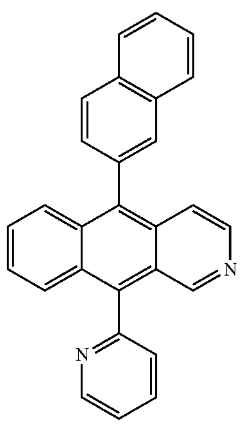
295
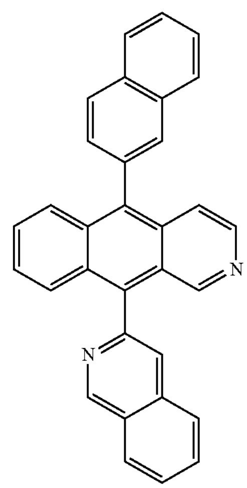
296
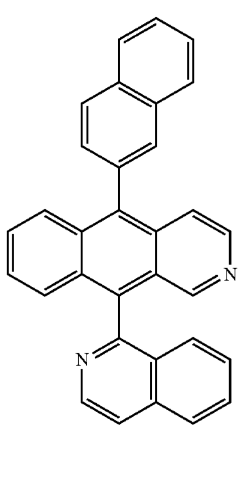
297
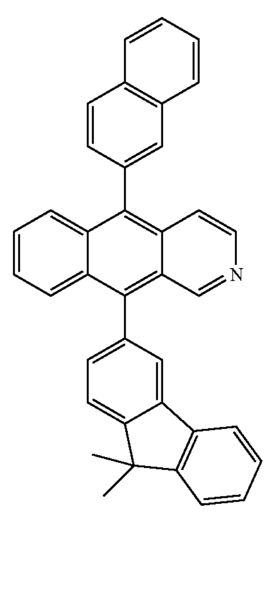

-continued
298
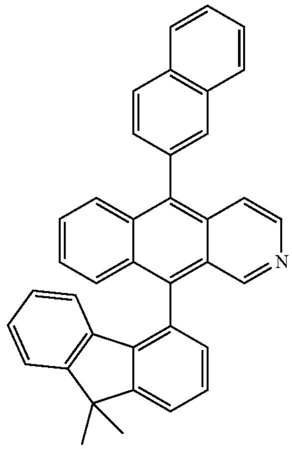
299
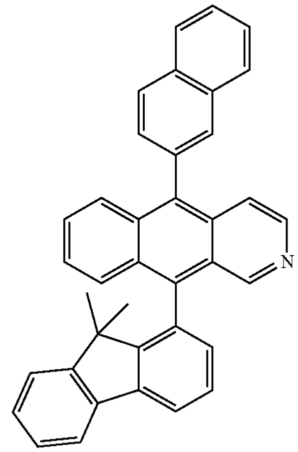
300
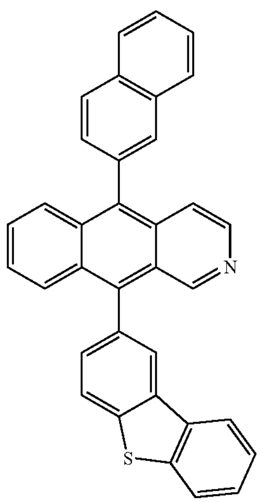
301
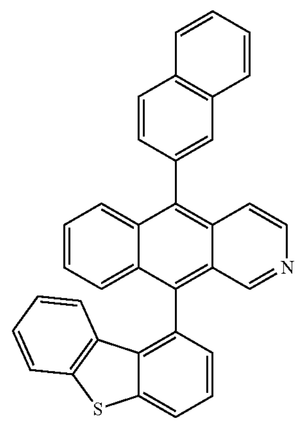
302
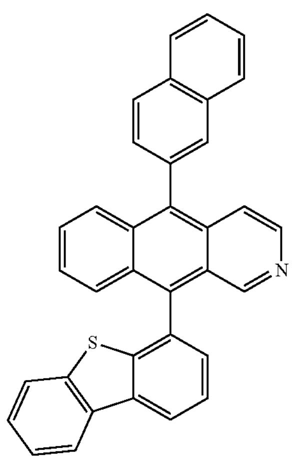
303
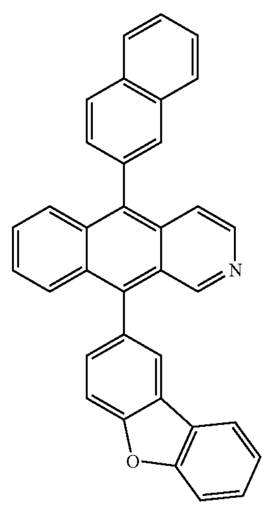

-continued
304
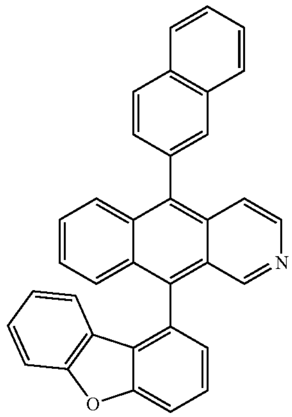
305
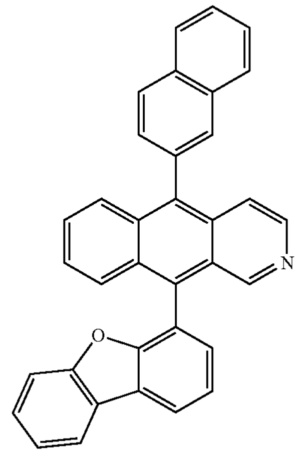
306
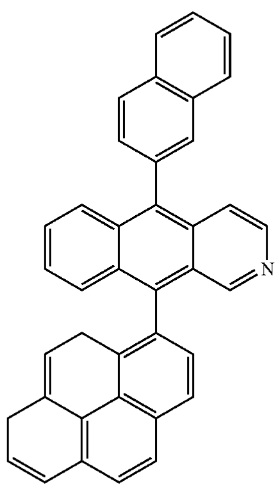
307
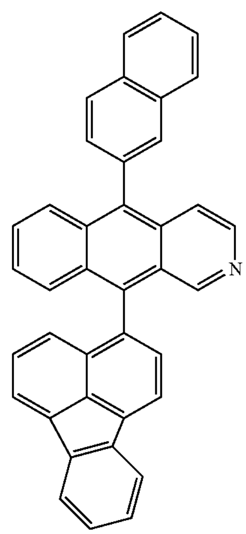
308
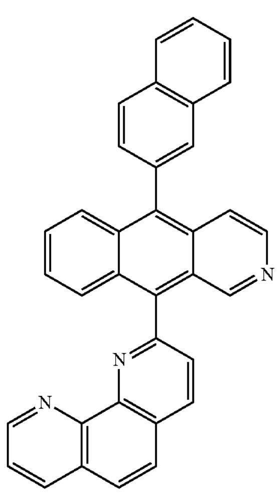
309
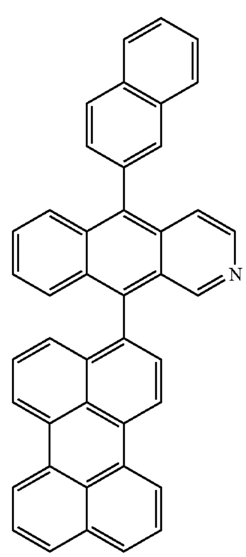

-continued
310
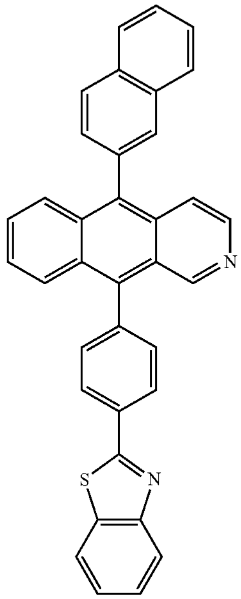
311
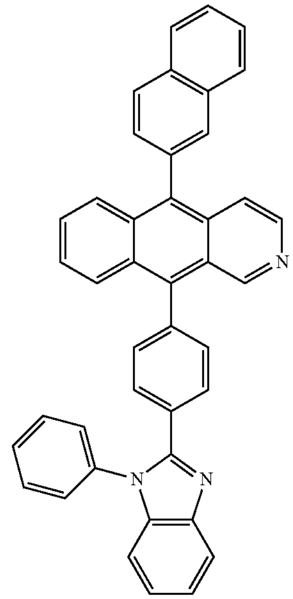
312
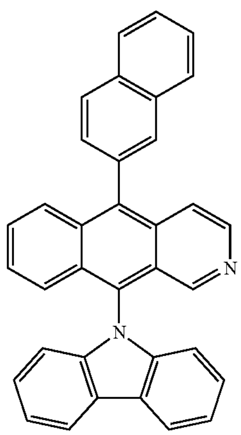
313
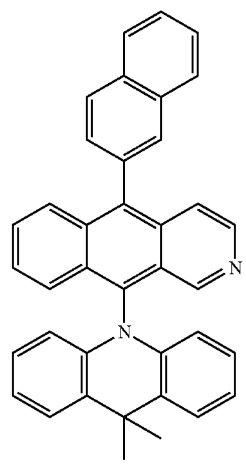
314
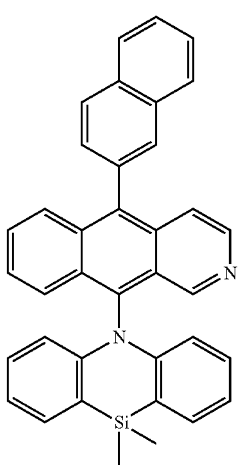
315
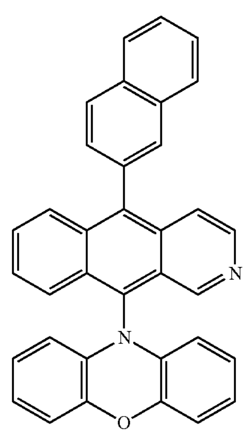

-continued
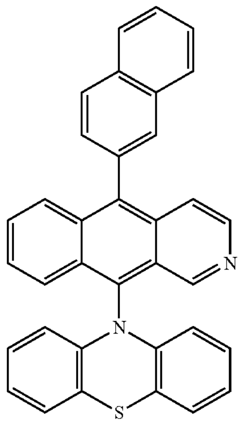
316
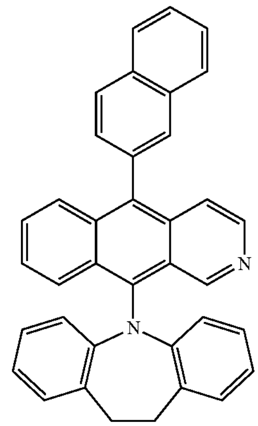
317
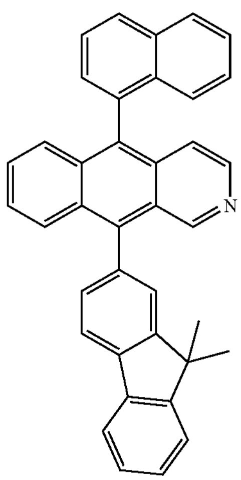
318
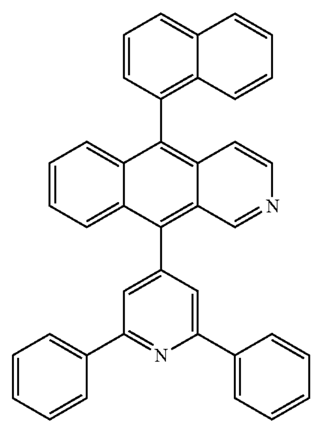
319
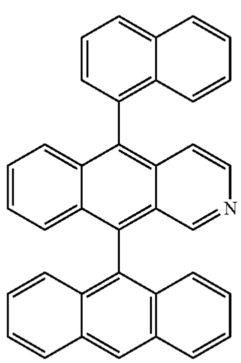
320
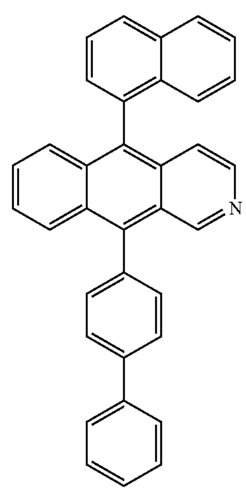
321

-continued
322
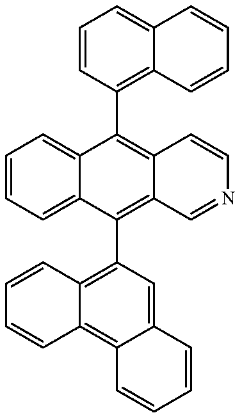
323
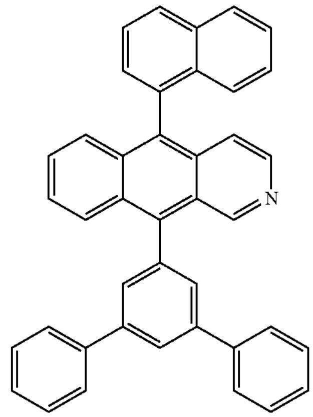
324
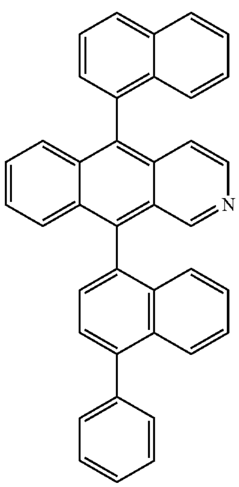
325
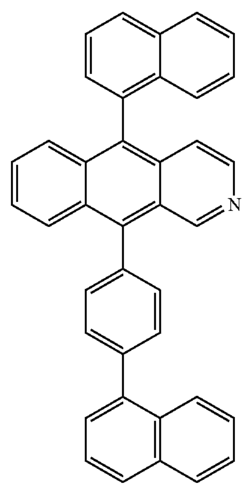
326
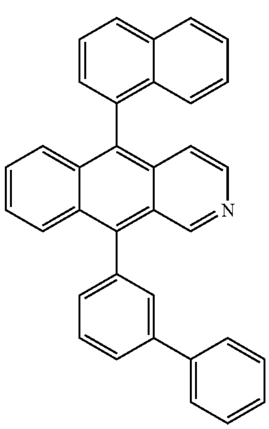
327
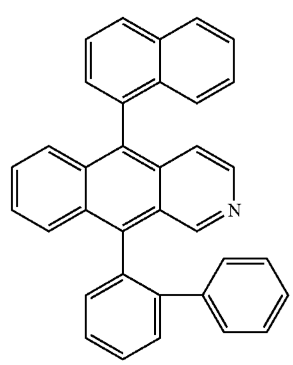

-continued
328
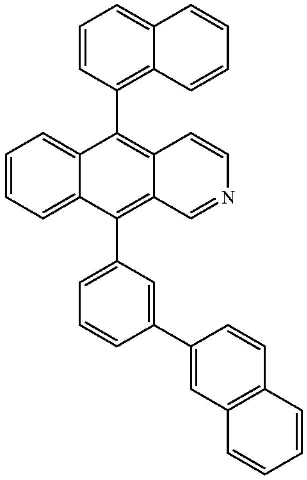
329
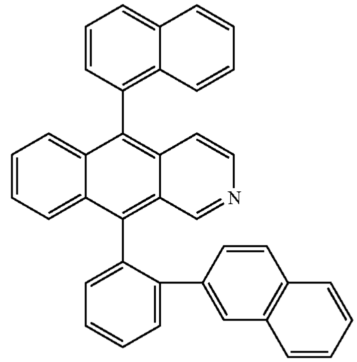
330
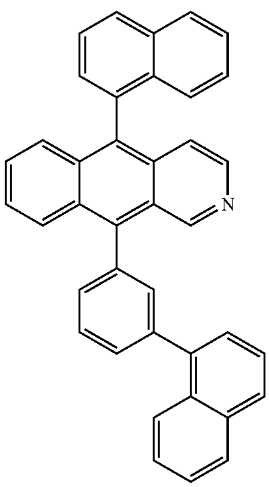
331
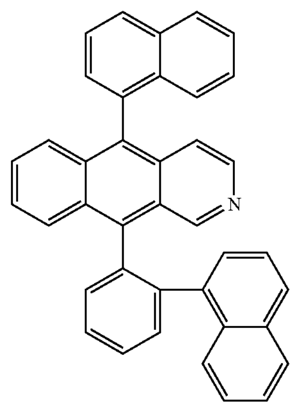
332
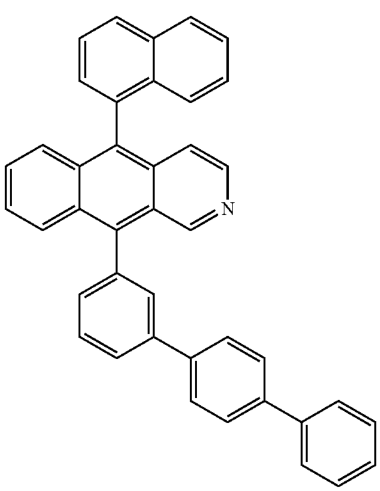
333
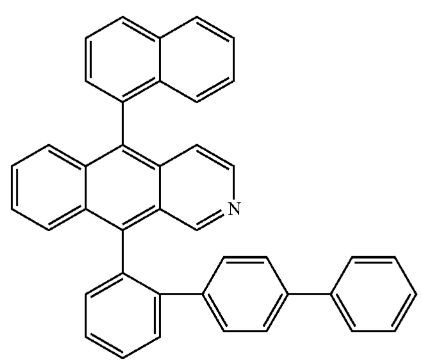

-continued
334
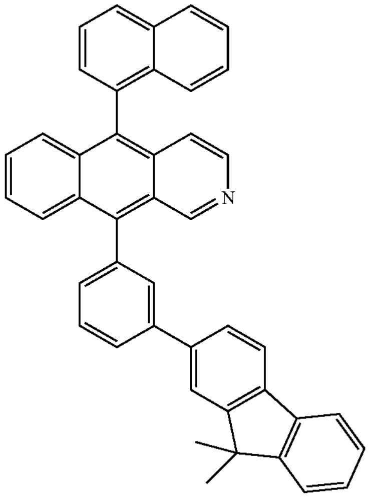
335
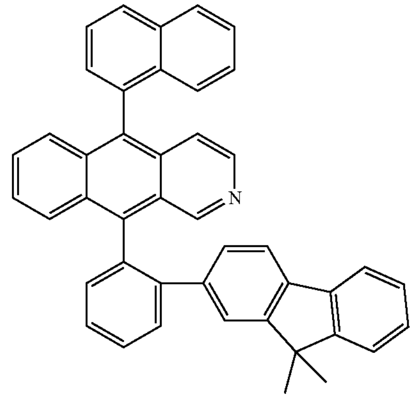
336
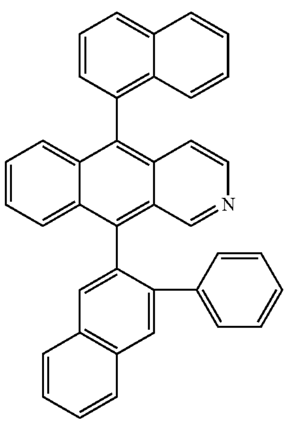
337
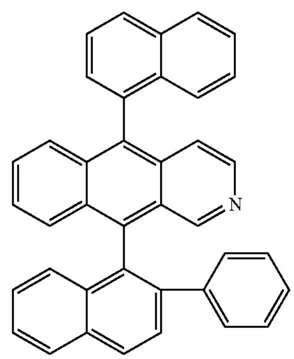
338
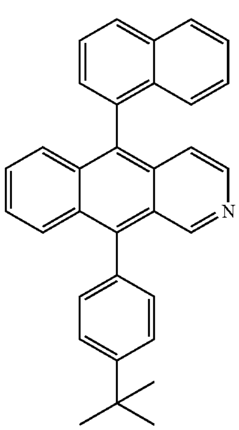
339
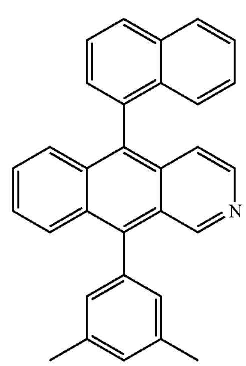

-continued
340
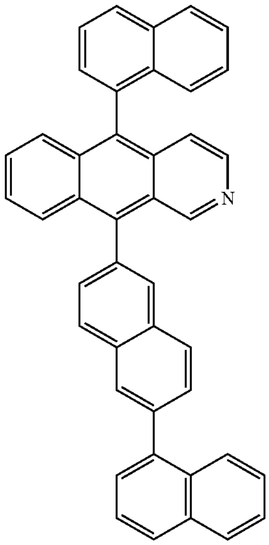
341
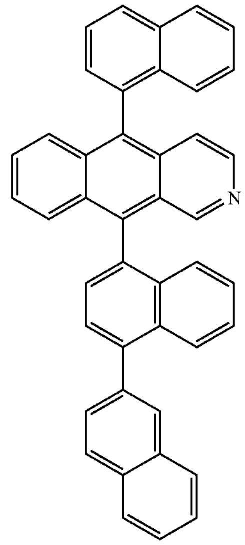
342
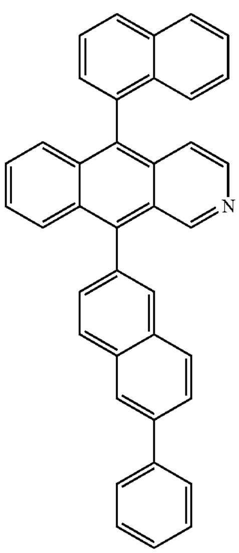
343
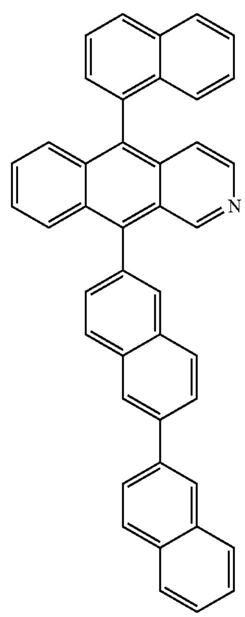

-continued
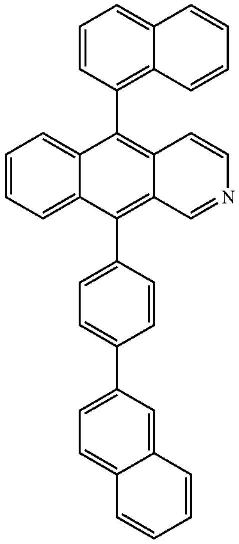
344
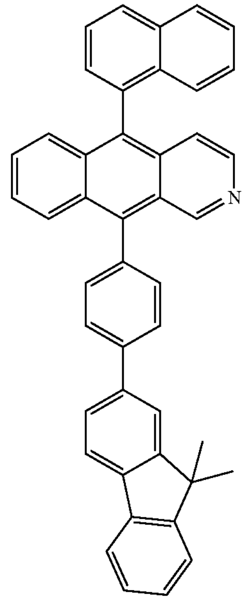
345
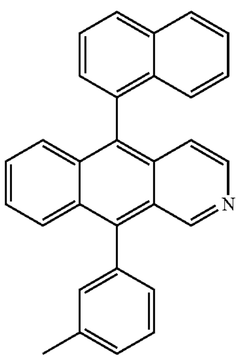
346
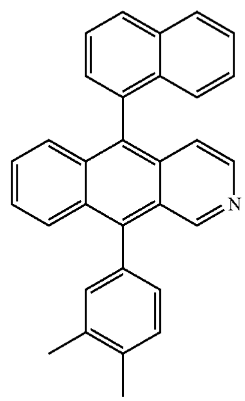
347
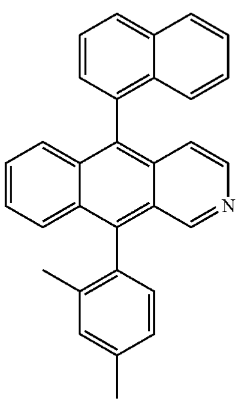
348
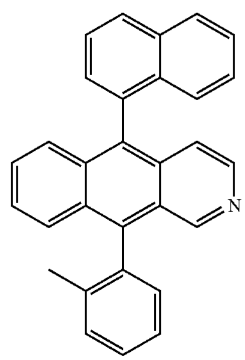
349

-continued
350
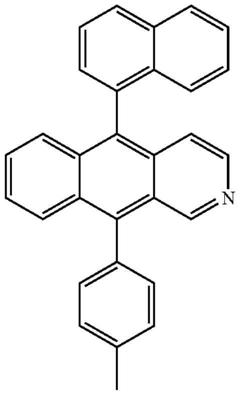
351
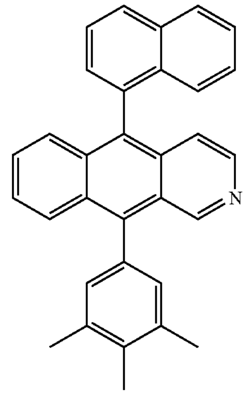
352
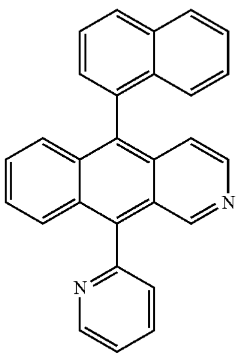
353
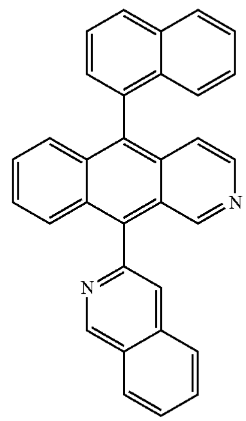
354
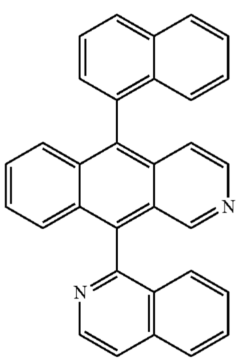
355
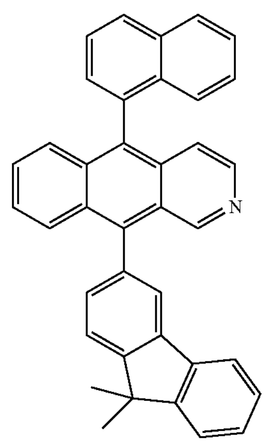
356
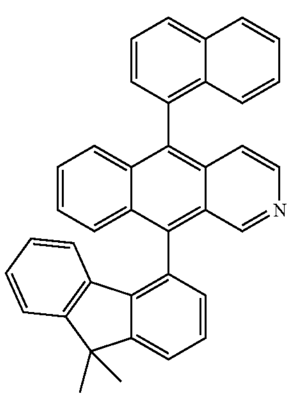
357
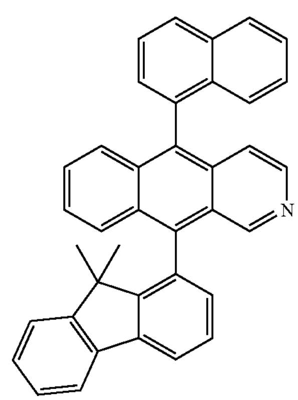

-continued
358
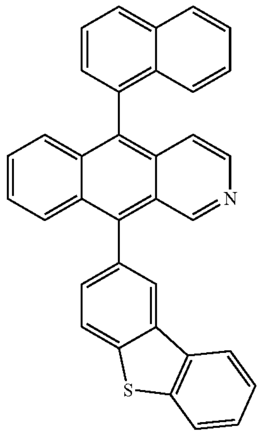
359
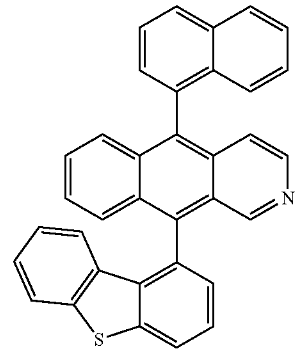
360
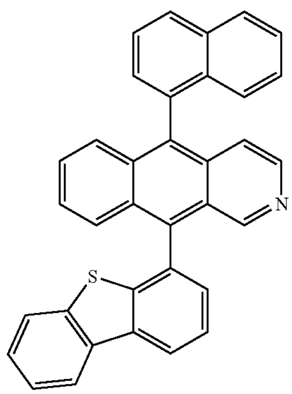
361
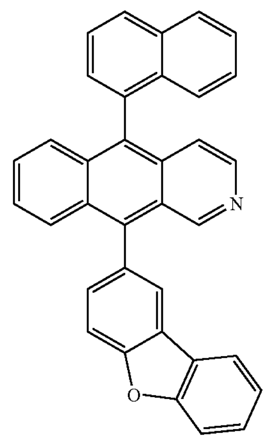
362
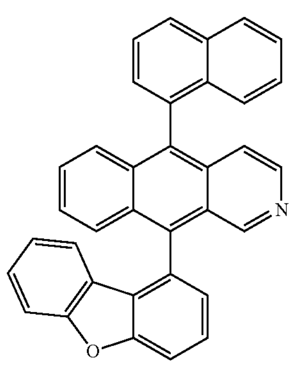
363
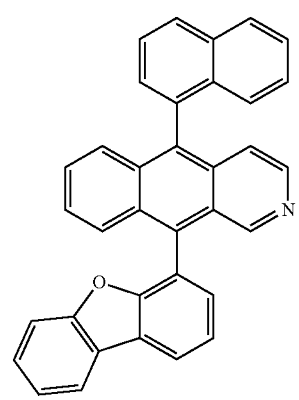

-continued
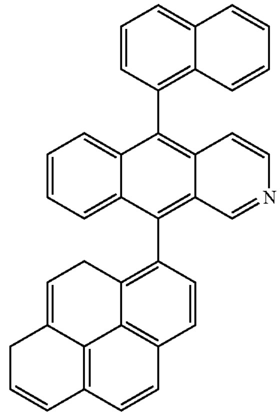
364
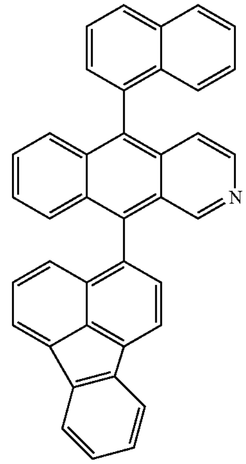
365
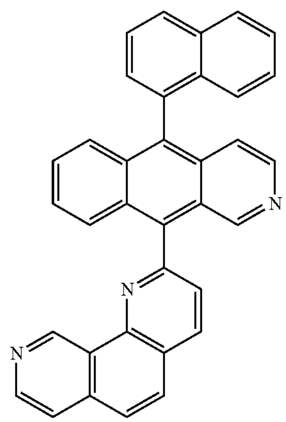
366
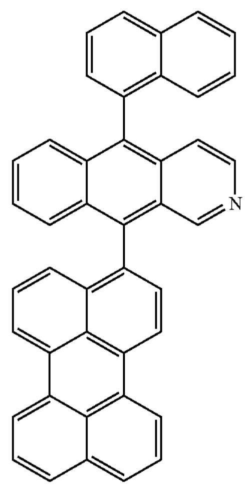
367
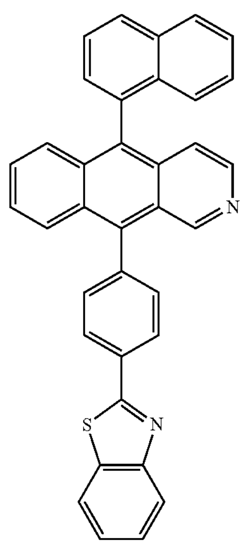
368
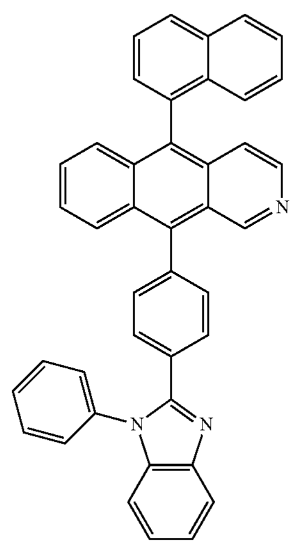
369

-continued
370
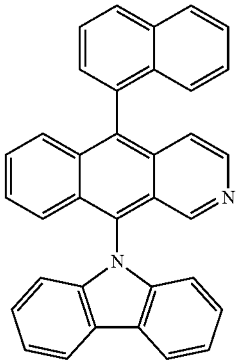
371
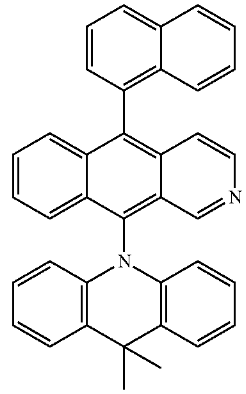
372
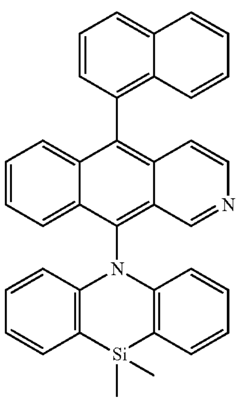
373
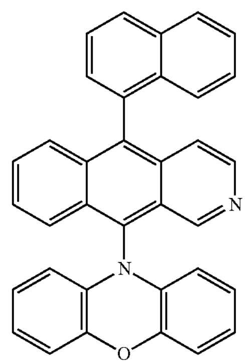
374
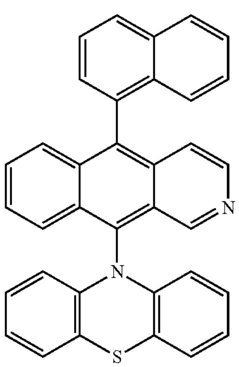
375
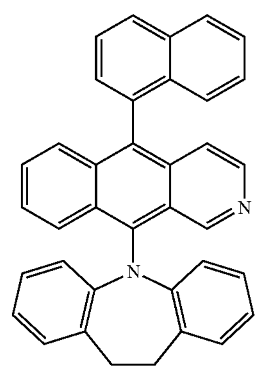
376
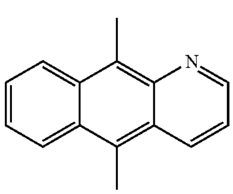
377
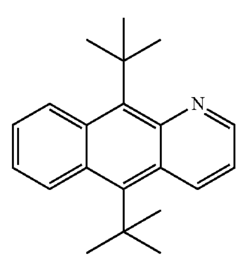

-continued
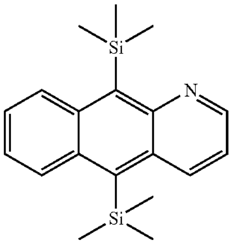
378
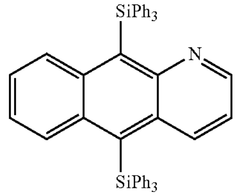
379
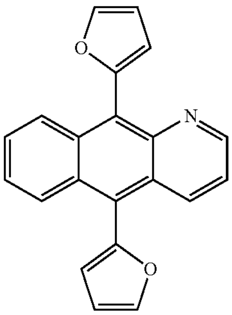
380
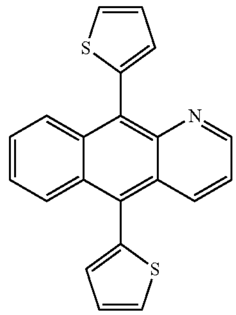
381
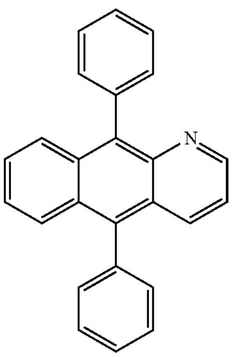
382
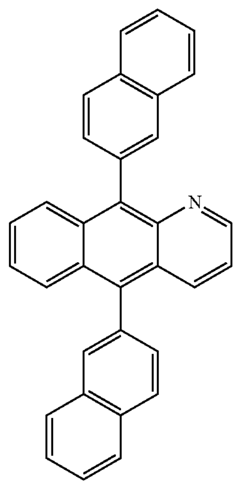
383
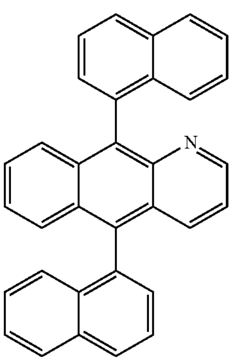
384
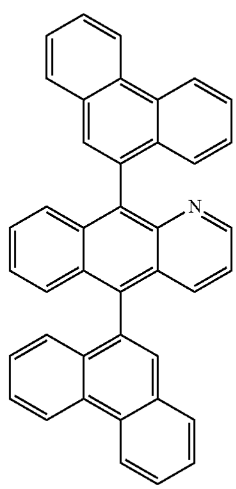
385

-continued
386
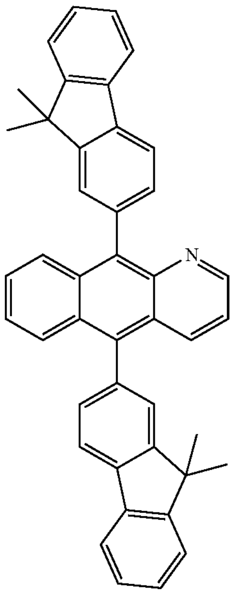
387
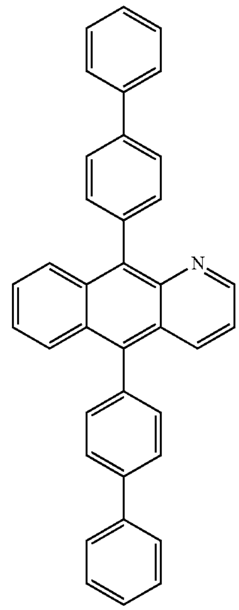
388
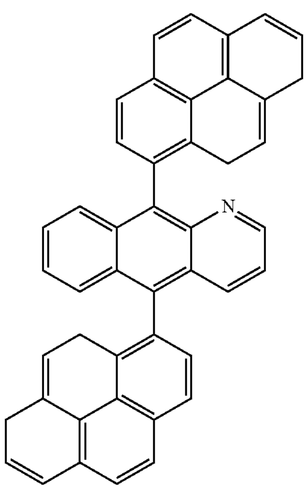
389
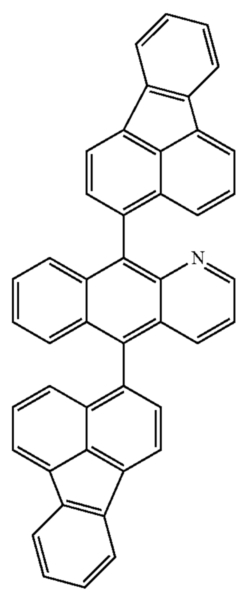

-continued
390
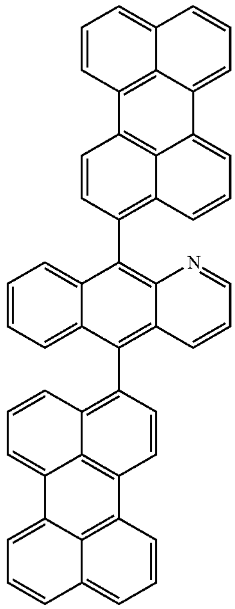
391
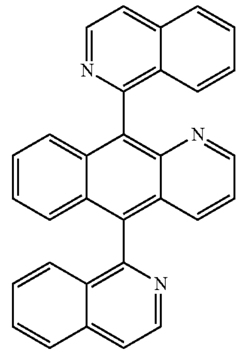
392
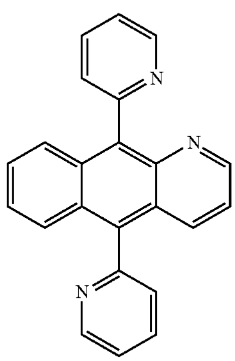
393
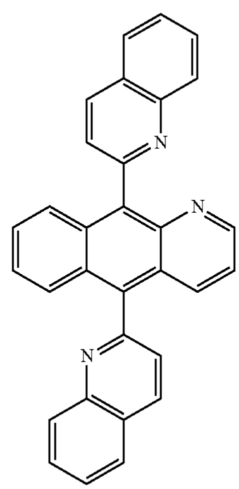
394
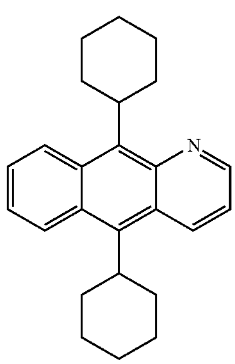
395
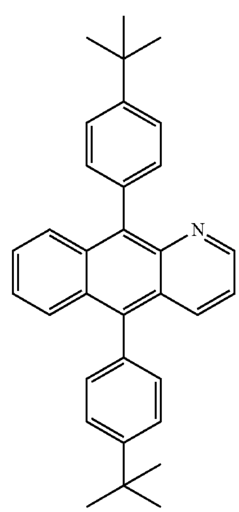

-continued
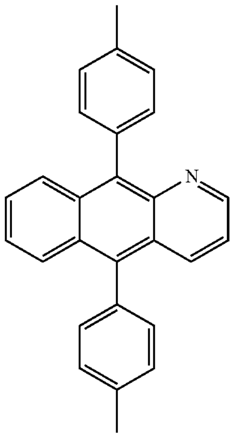
396
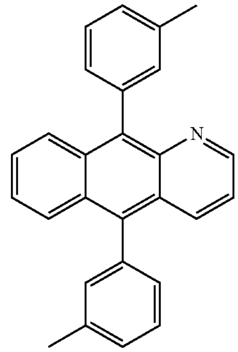
397
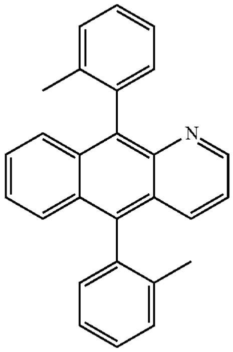
398
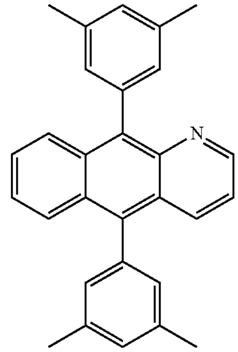
399
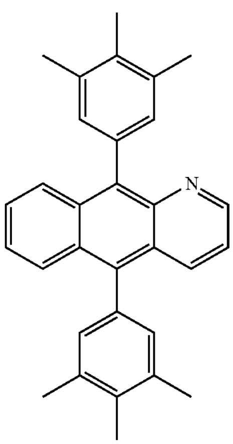
400
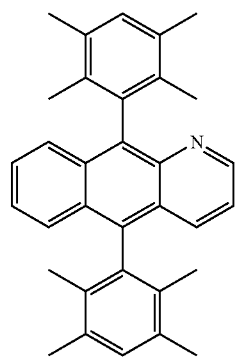
401
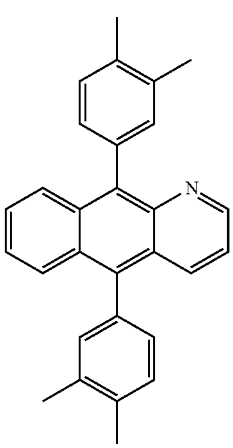
402
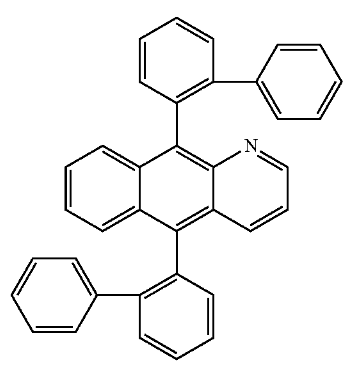
403

-continued
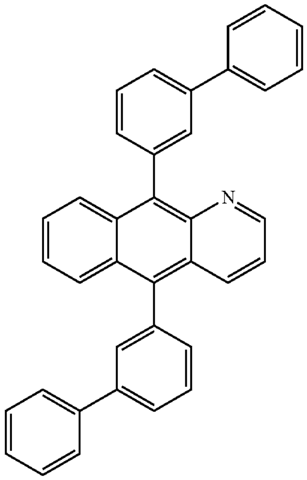
404
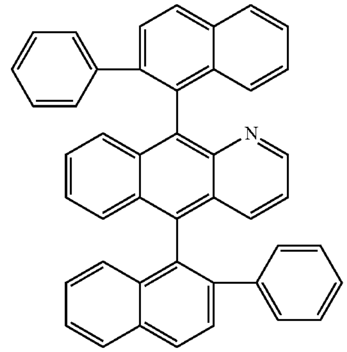
405
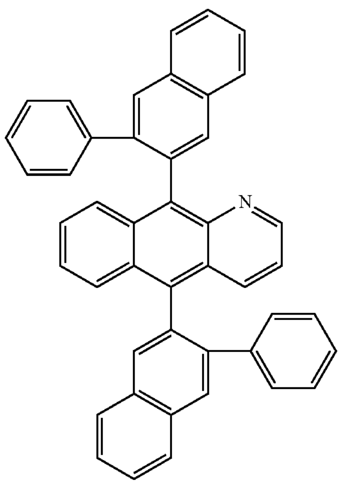
406
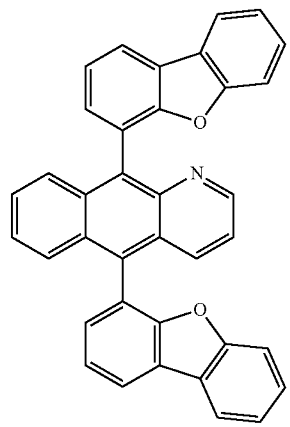
407
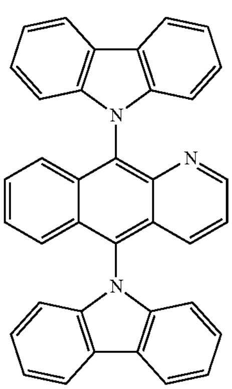
408
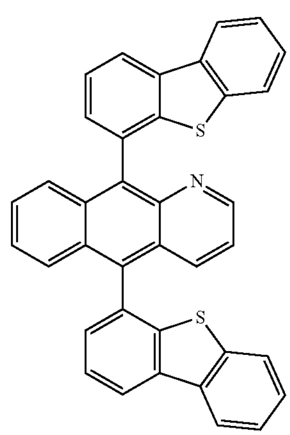
409

-continued
410
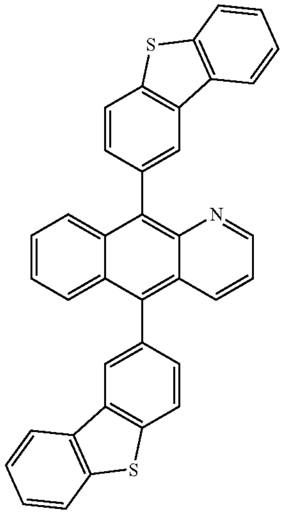
411
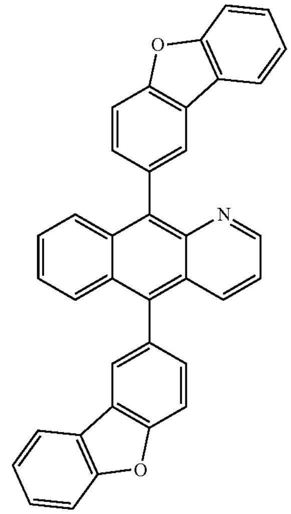
412
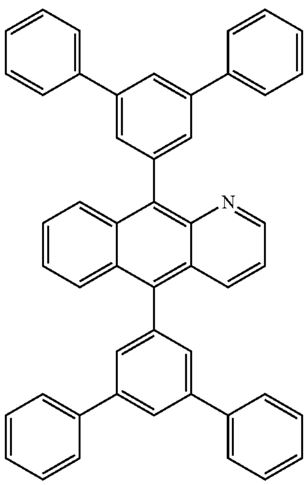
413
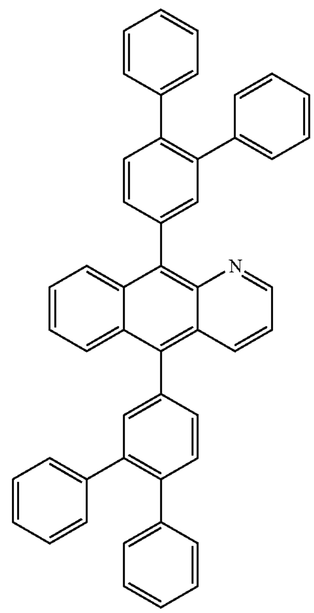
414
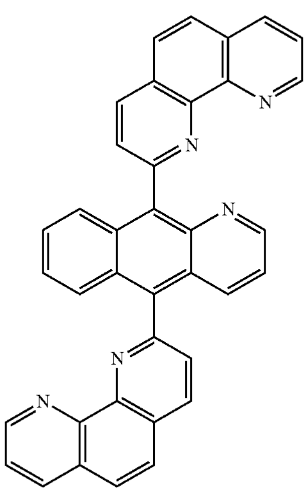
415
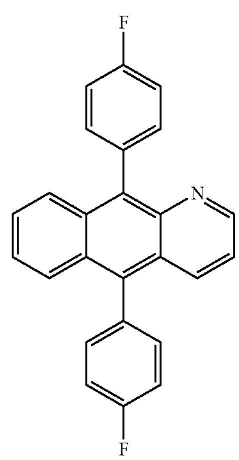

-continued
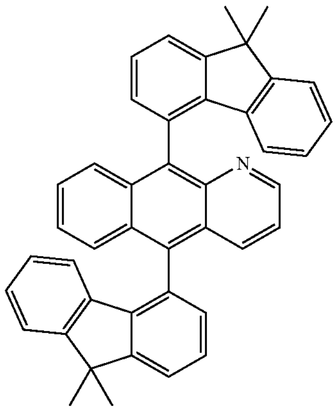
416
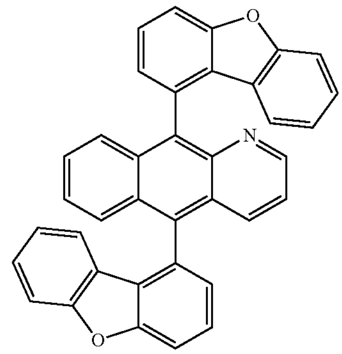
417
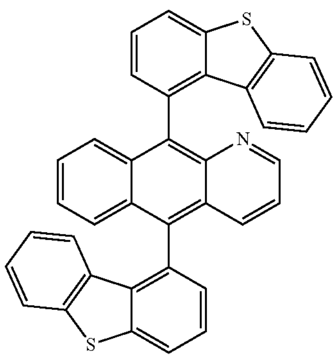
418
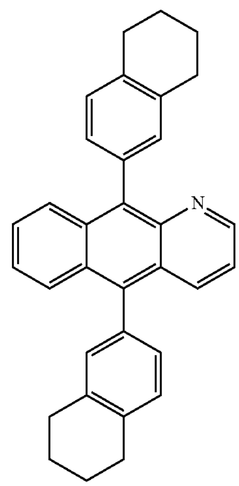
419
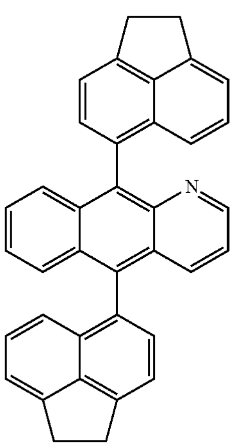
420
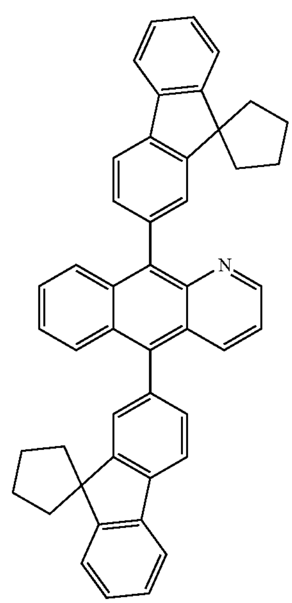
421

-continued
422
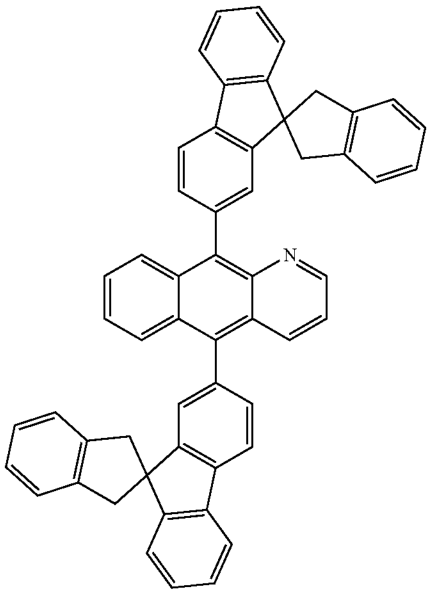
423
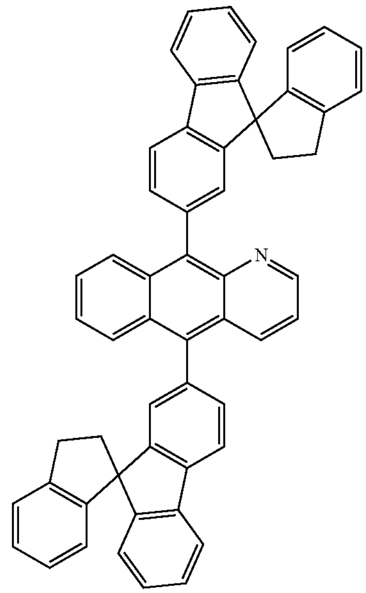
424
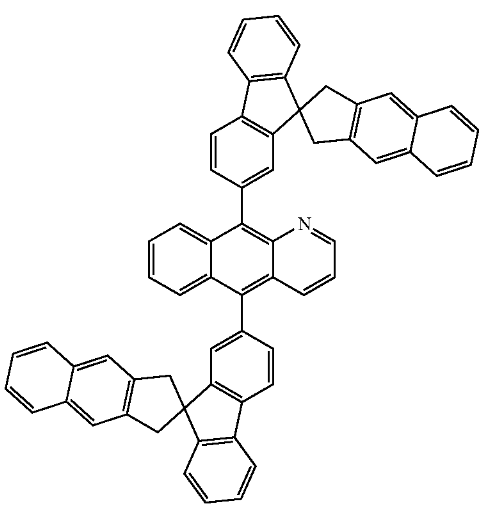
425
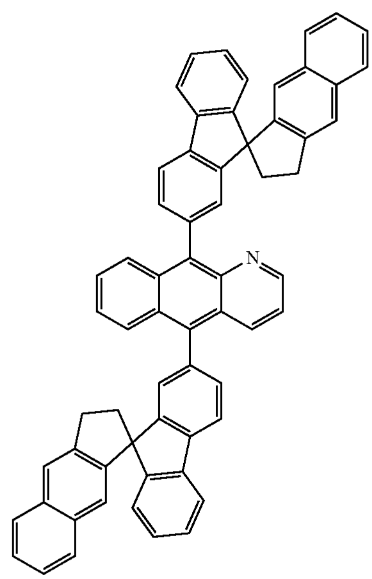

-continued
426
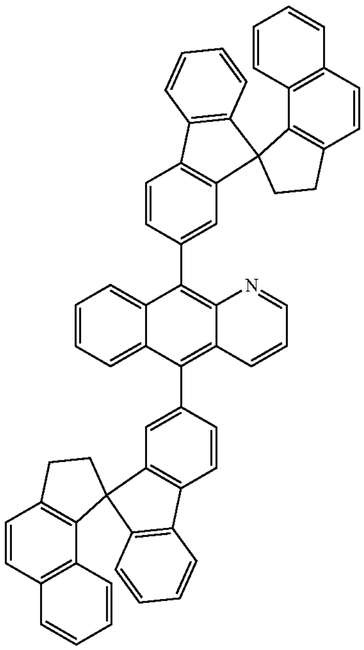
427
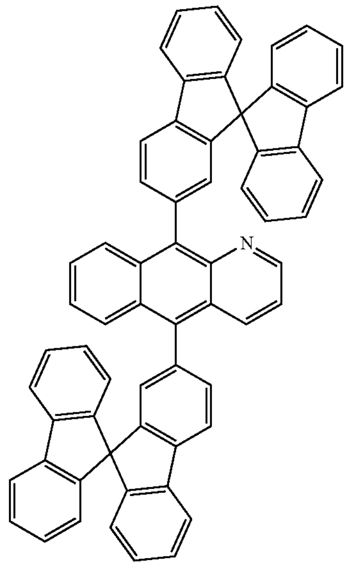
428
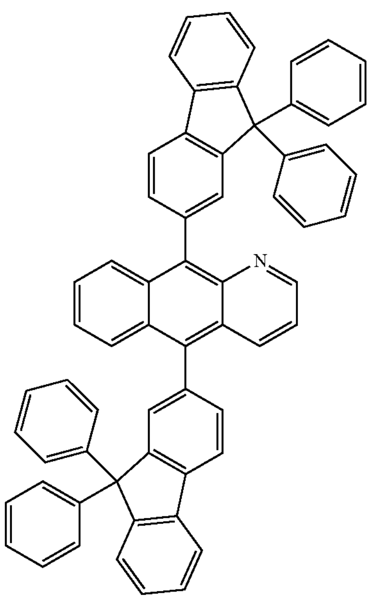
429
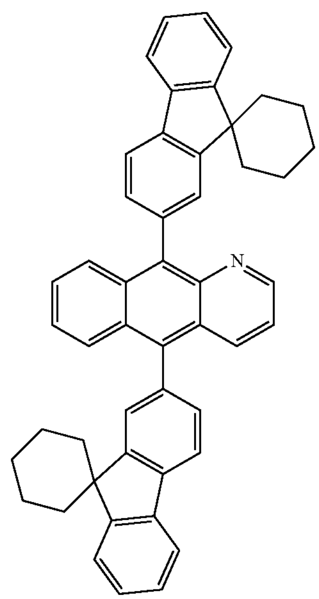

-continued
430
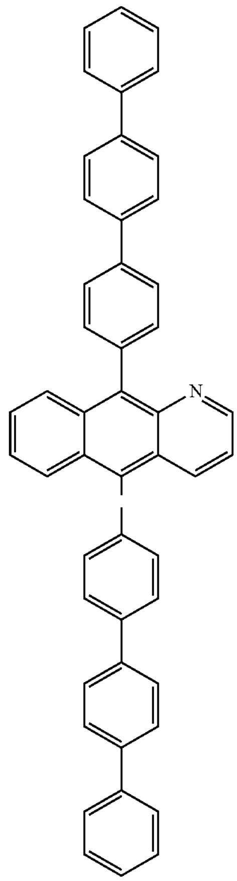
431
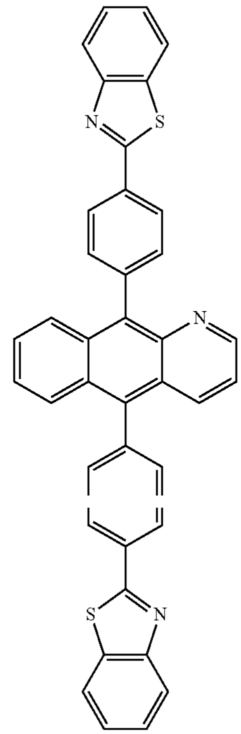
432
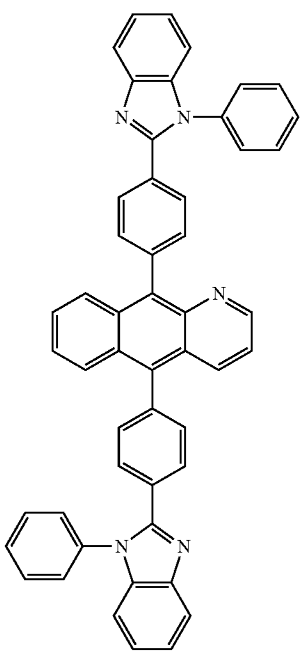
433
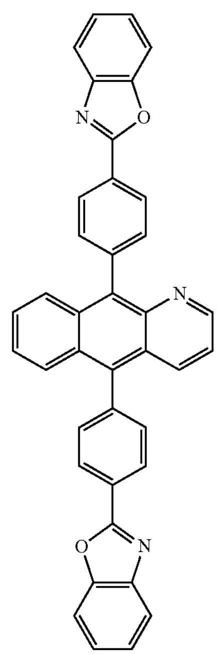

-continued
434
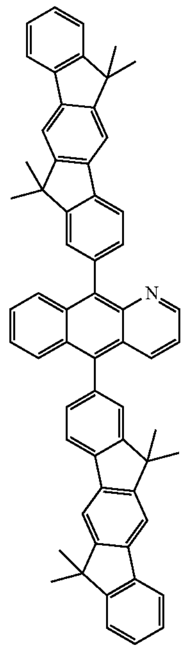
435
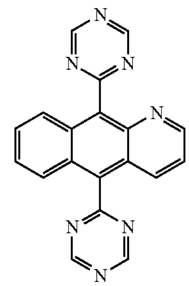
436
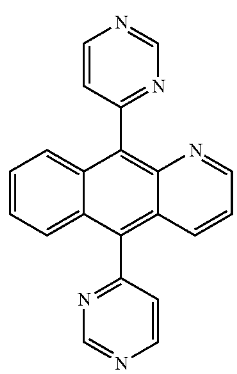
437
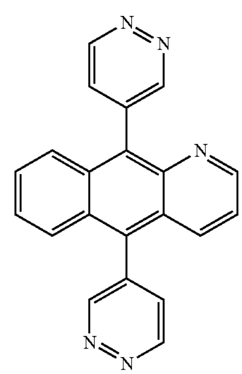
438
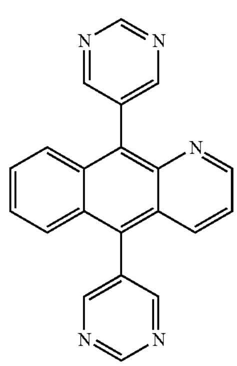
439
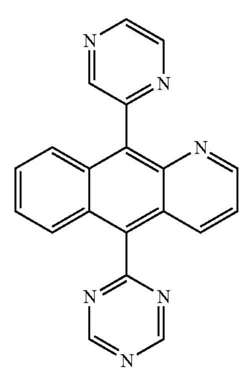

-continued
440
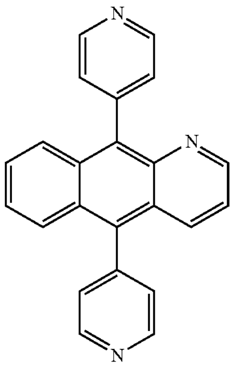
441
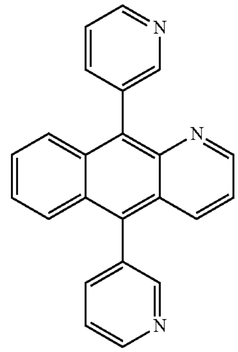
442
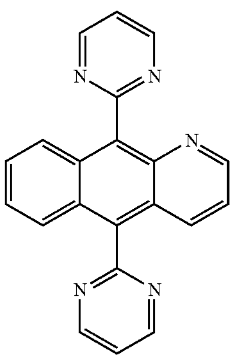
443
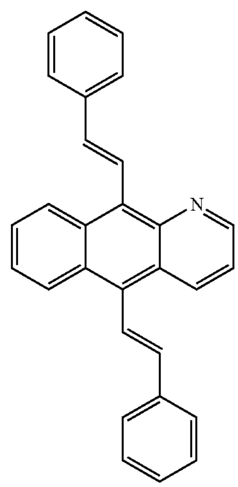
444
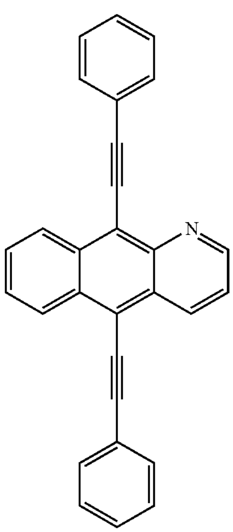
445
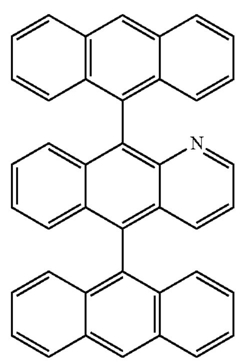

-continued
446
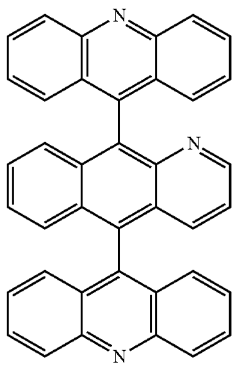
447
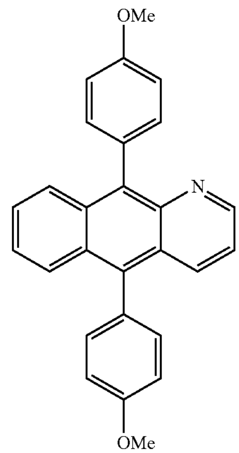
448
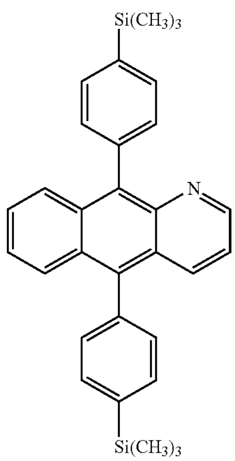
449
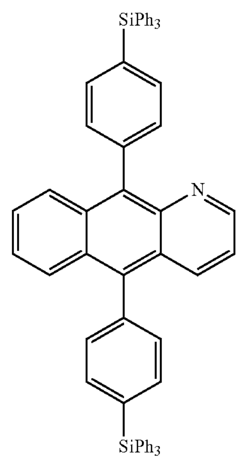
450
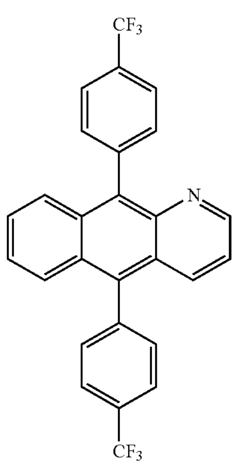
451
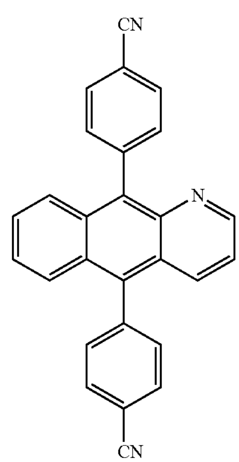

-continued
452
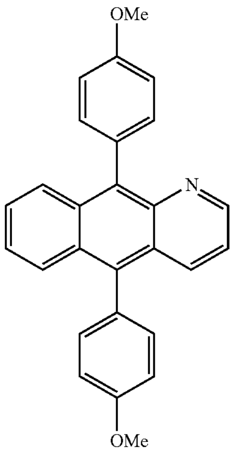
453
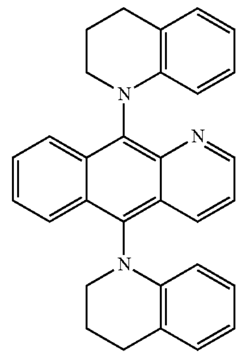
454
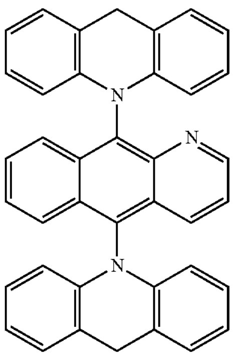
455
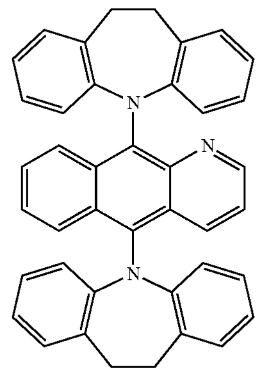
456
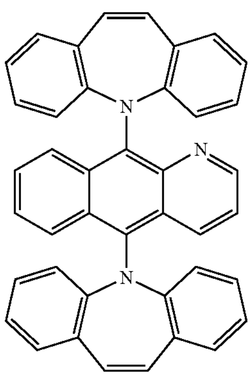
457
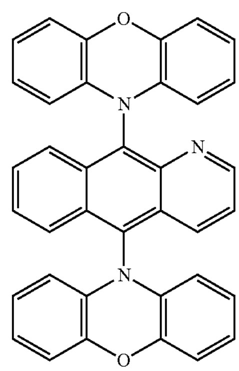
458
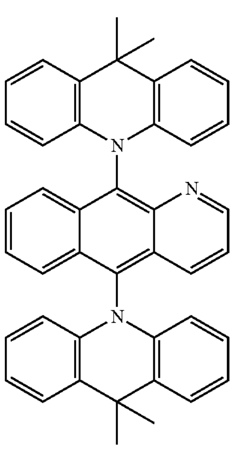
459
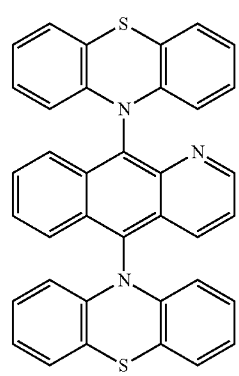

-continued
560
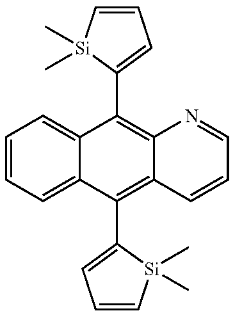
461
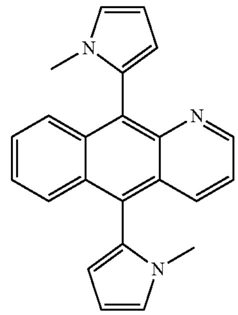
462
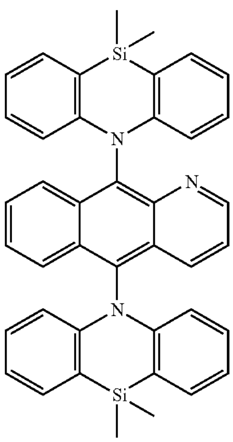
463
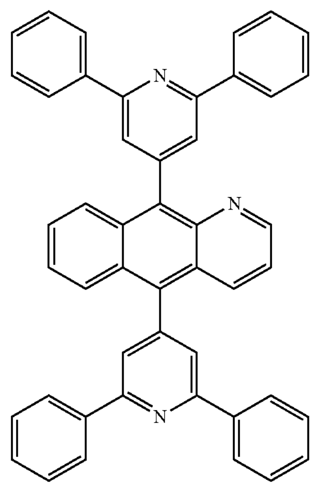
464
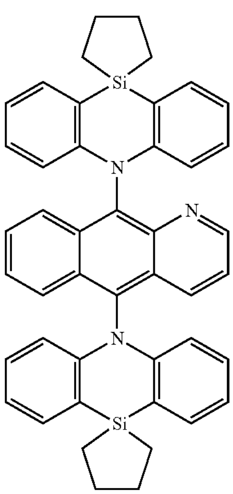
465
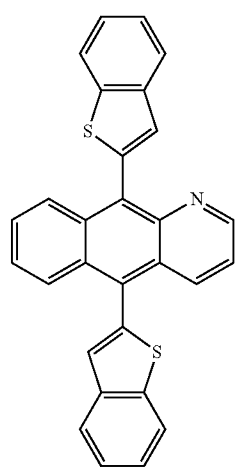

-continued
466
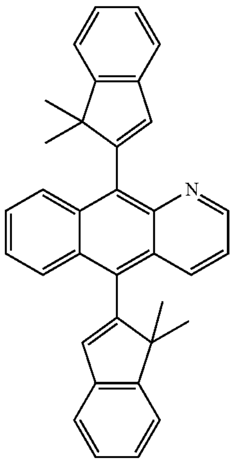
467
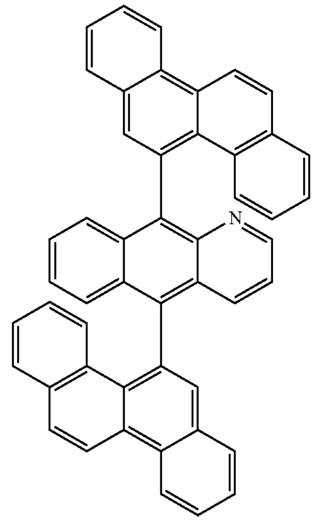
468
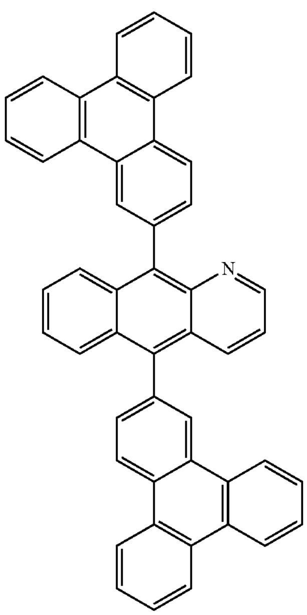
469
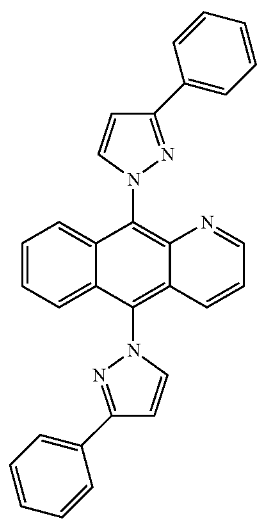

-continued
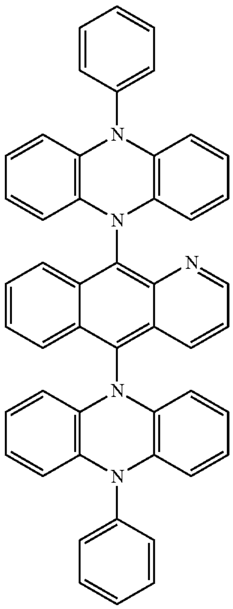
470
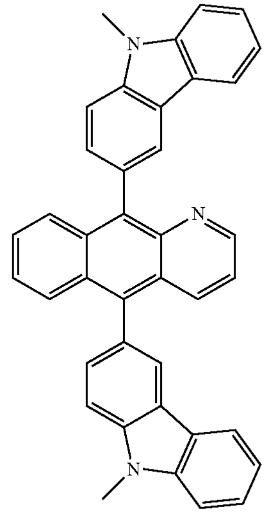
471
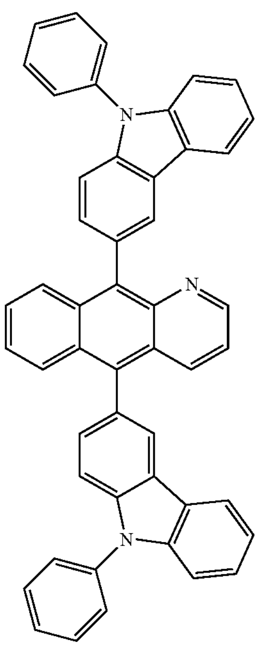
472
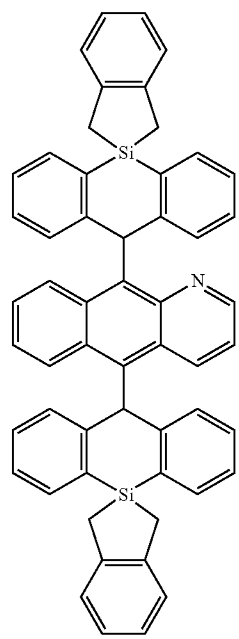
473

-continued
474
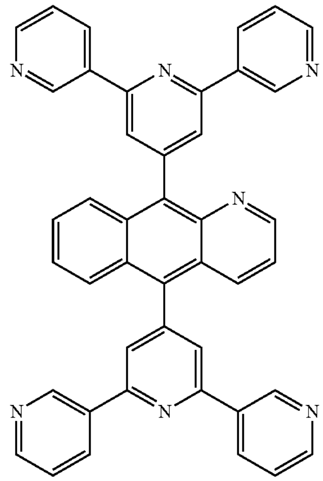
475
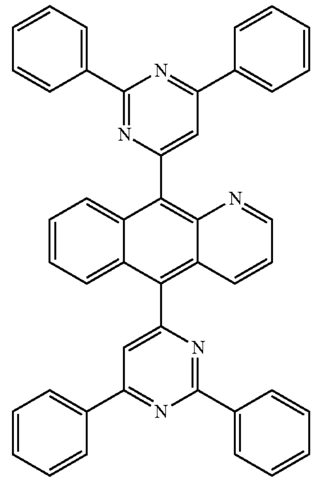
476
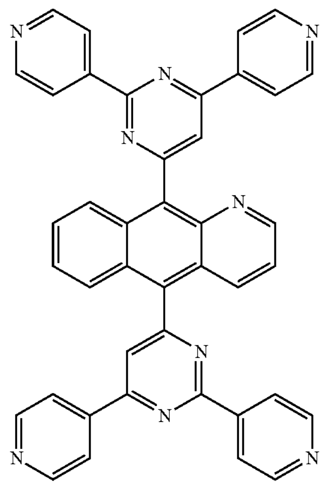
477
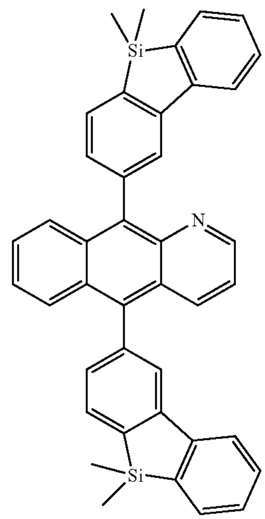
478
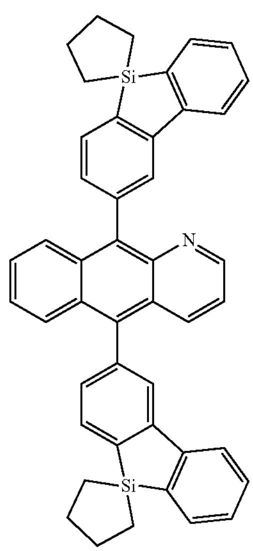
479
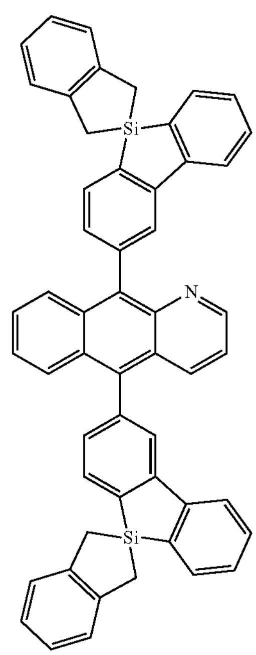

-continued
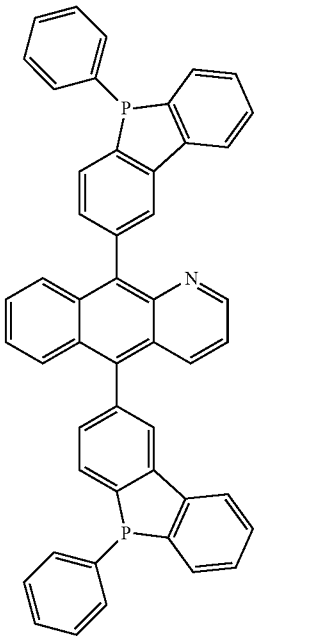
480
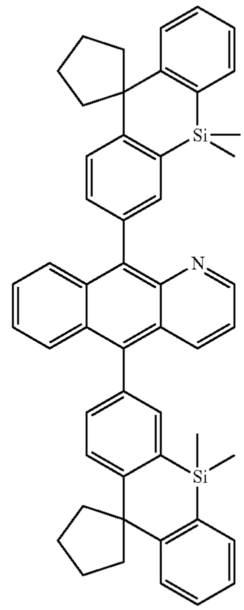
481
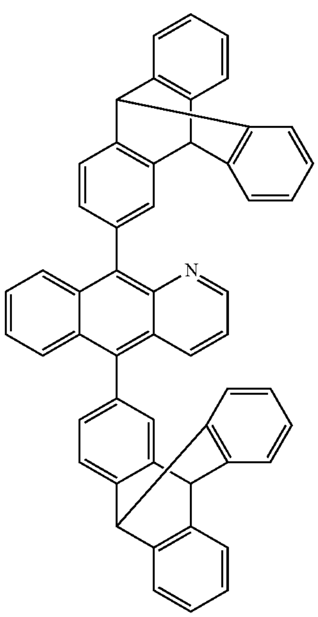
482
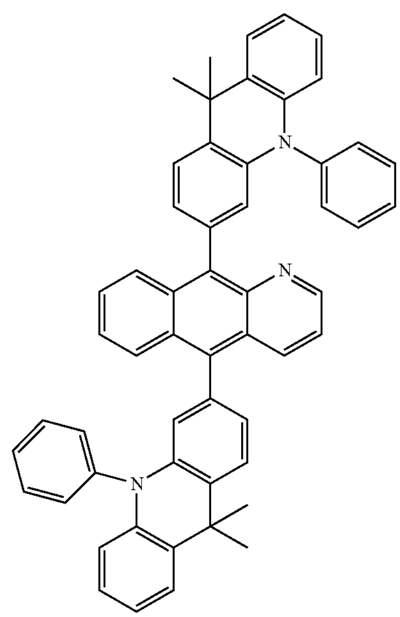
483

-continued
484
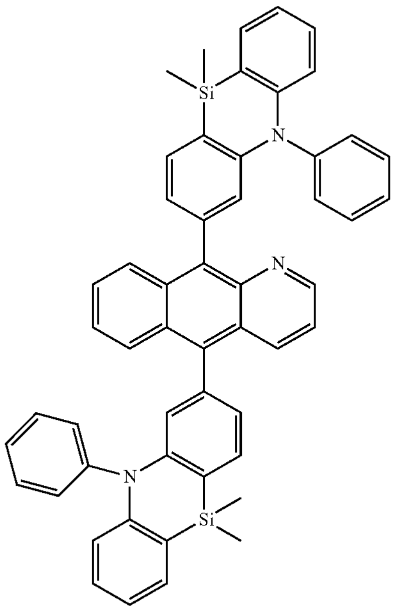
485
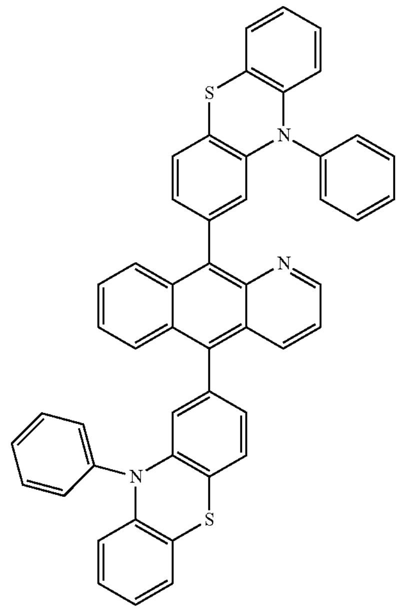
486
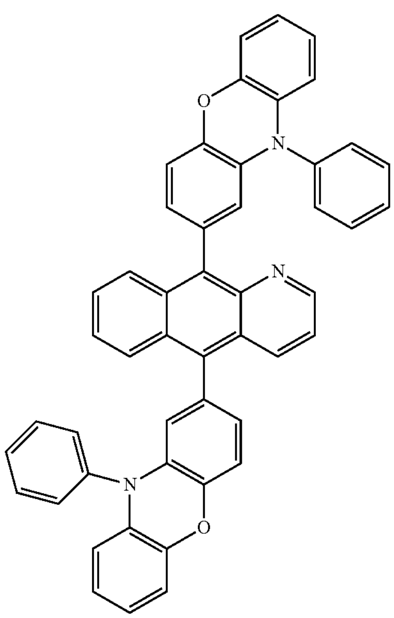
487
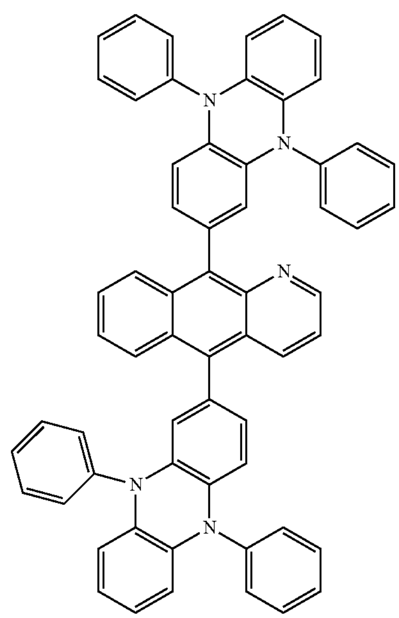

-continued
488
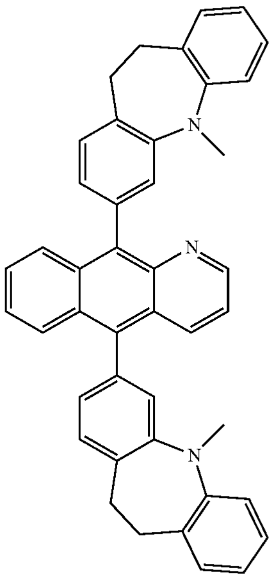
489
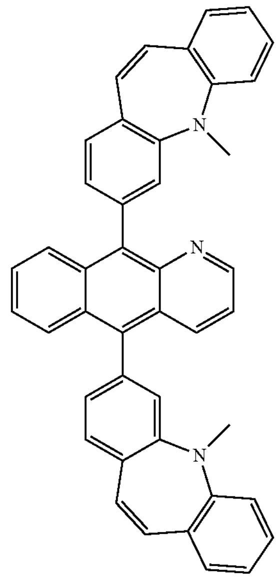
490
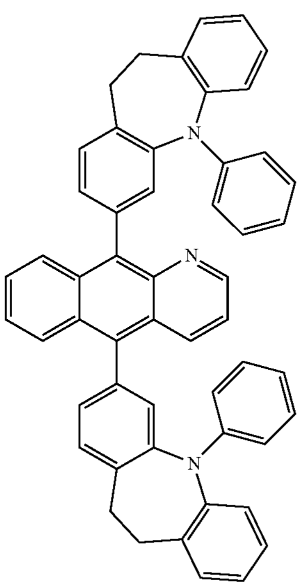
491
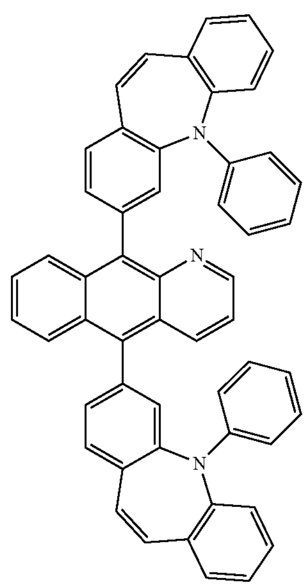

-continued
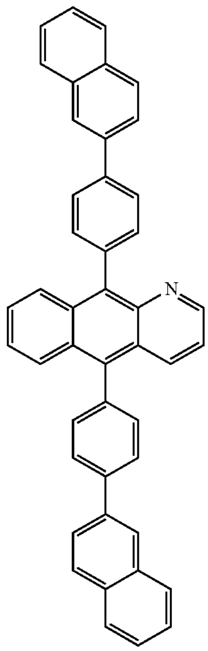
492
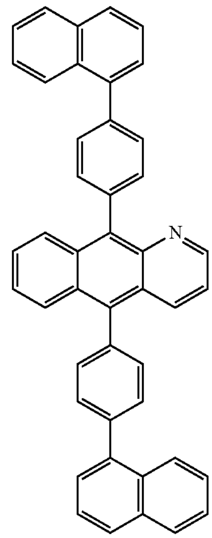
493
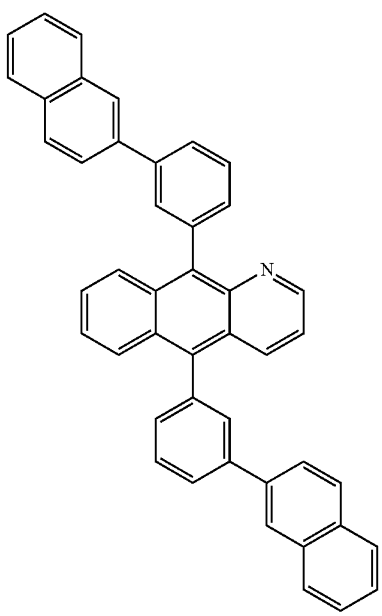
494
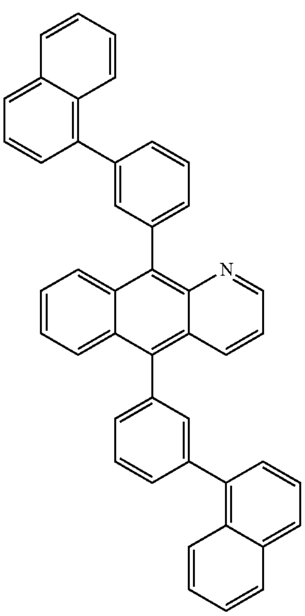
495

-continued
496
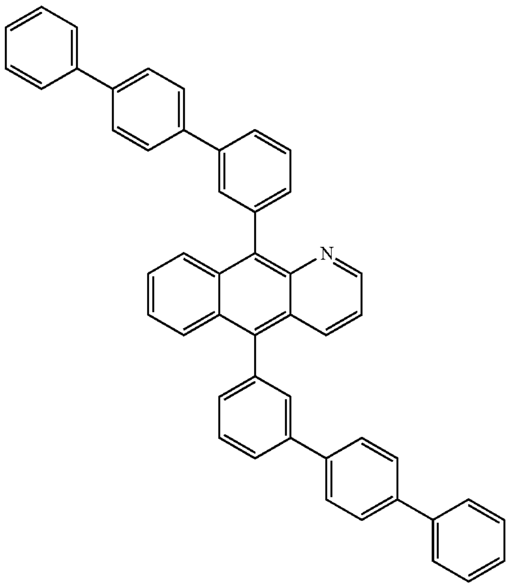
497
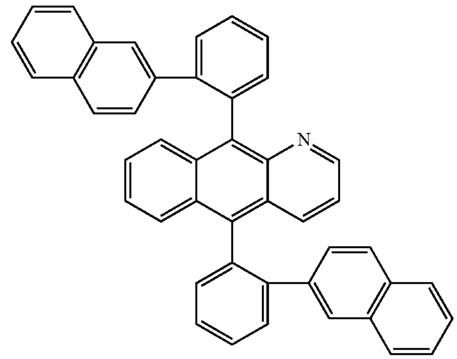
498
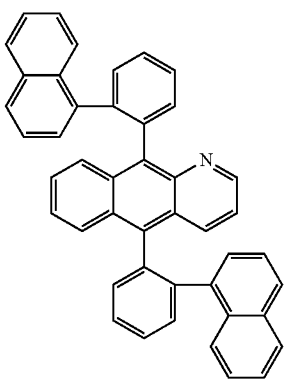
499
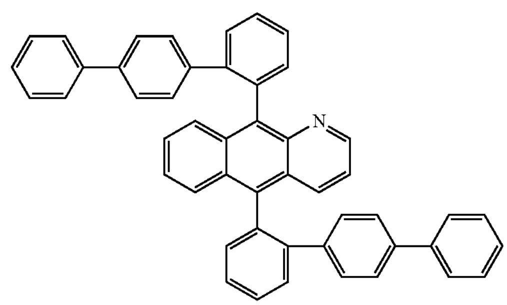
500
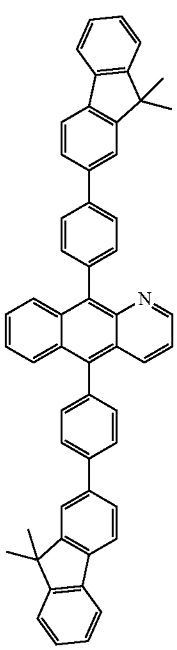
501
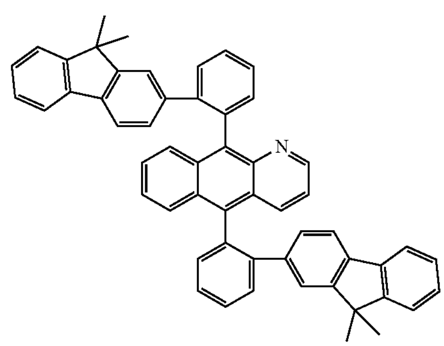

-continued
502
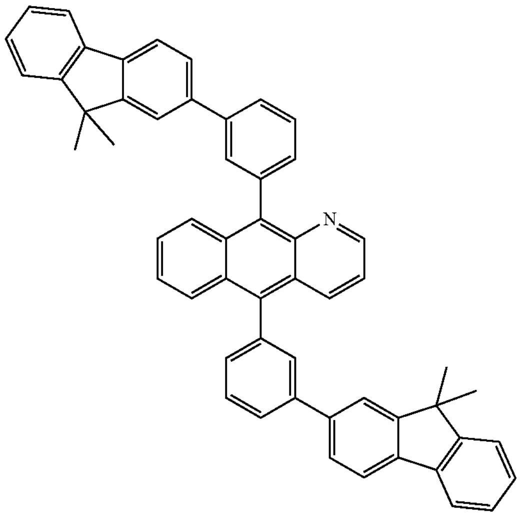
503
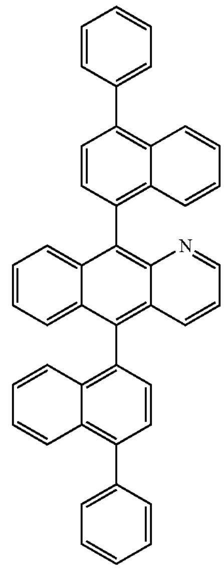
504
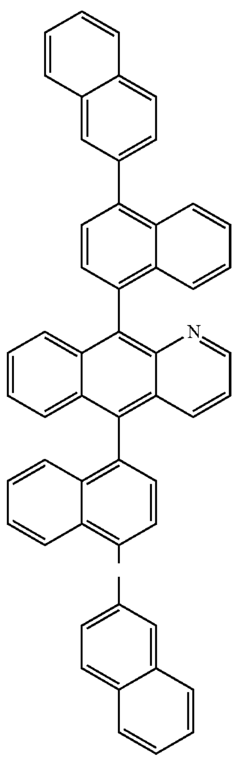
505
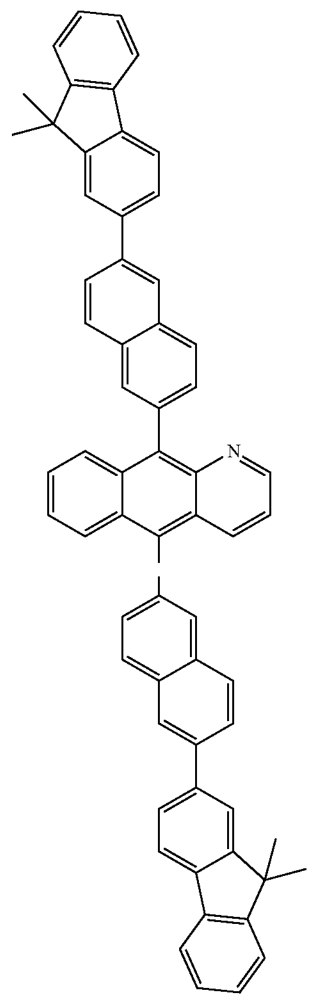

-continued
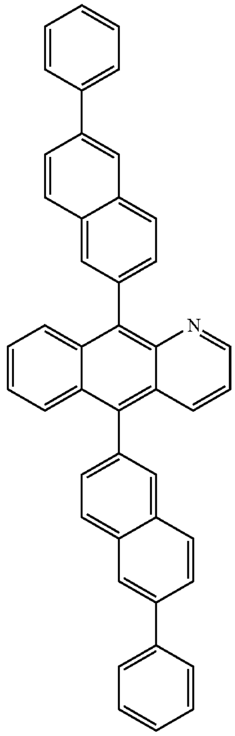
506
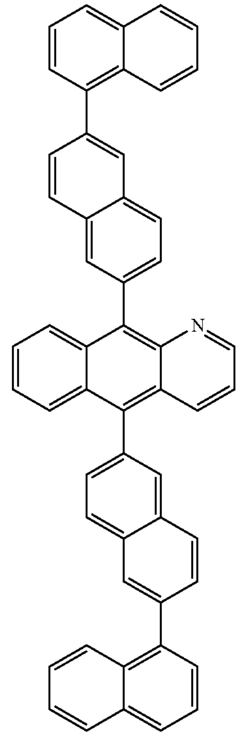
507
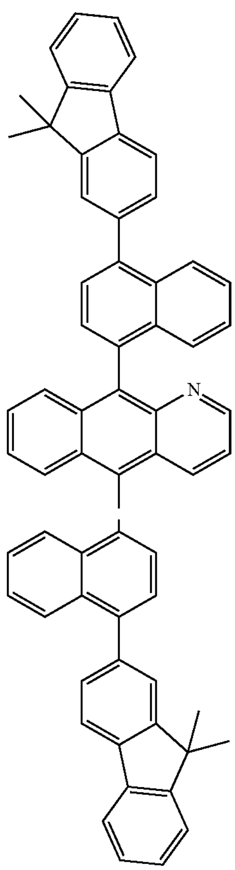
508
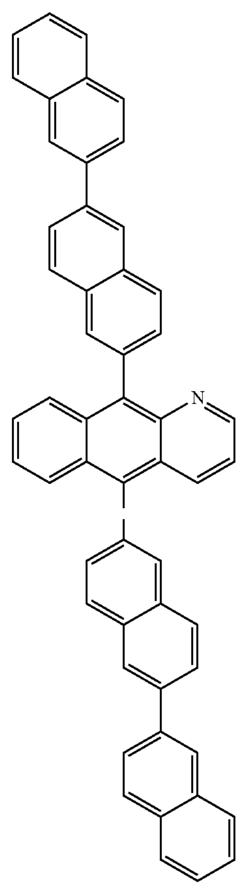
509

-continued
510
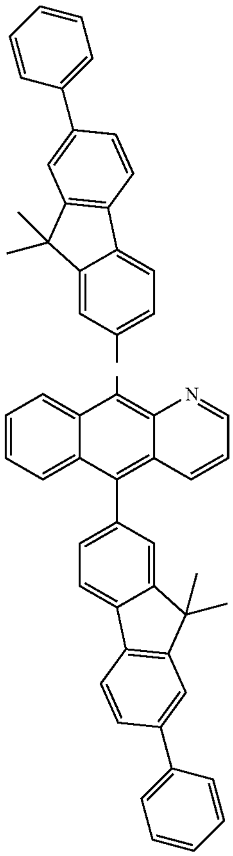
511
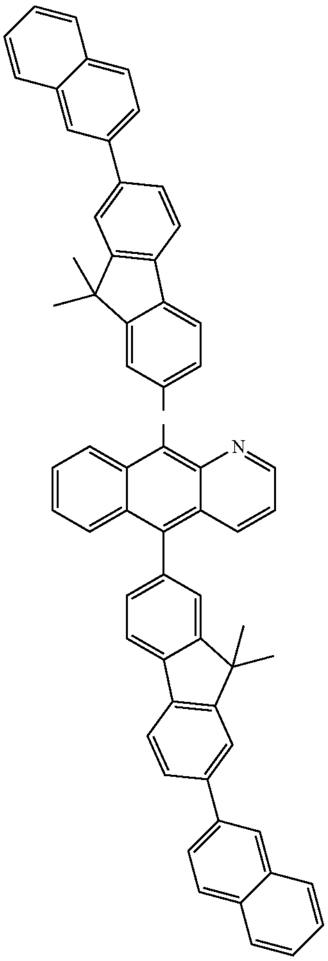
512
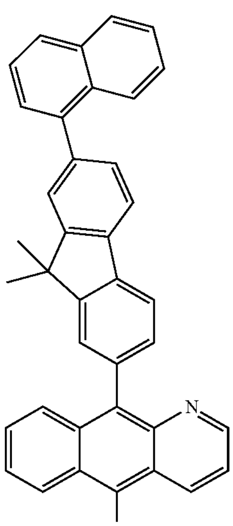
513
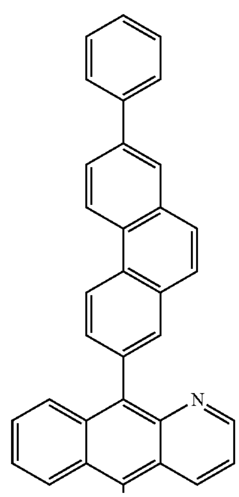

-continued
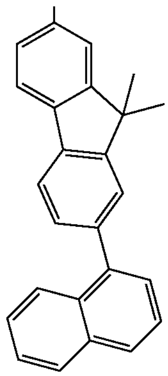
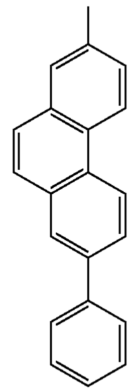
514
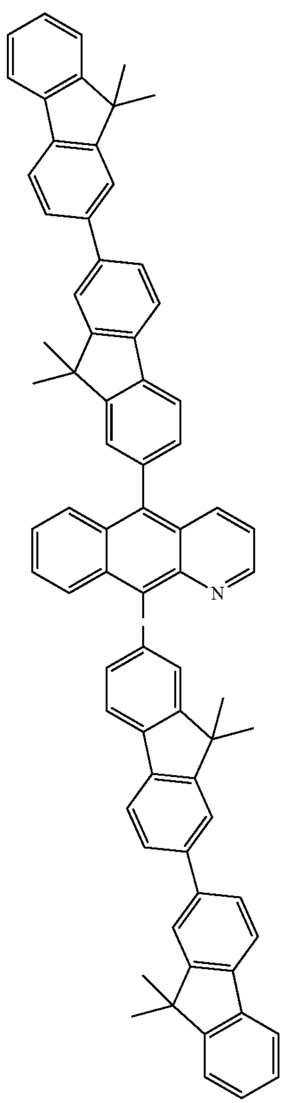

-continued
515
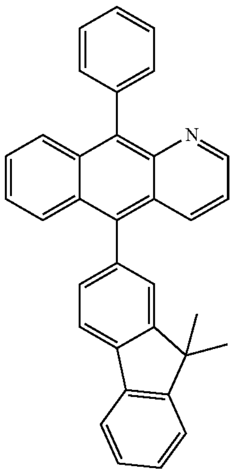
516
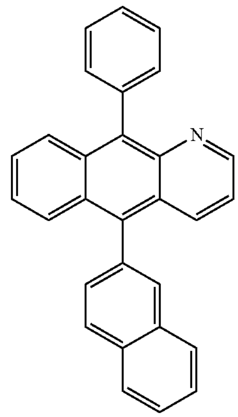
517
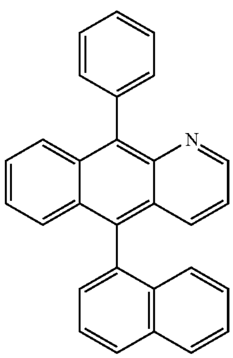
518
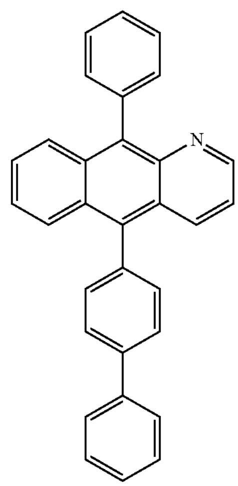
519
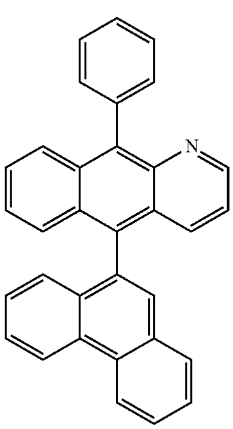
520
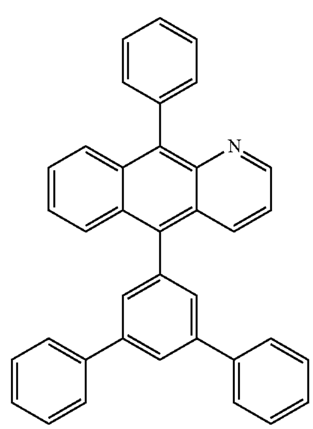

-continued
521
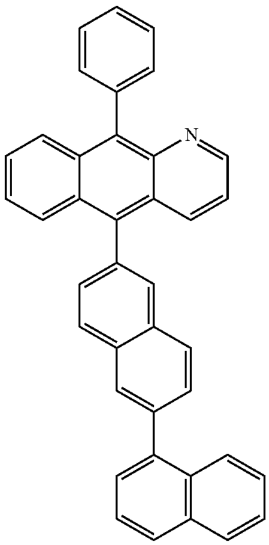
522
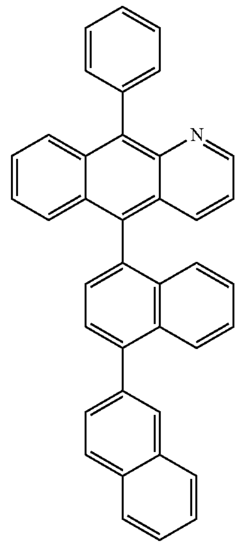
523
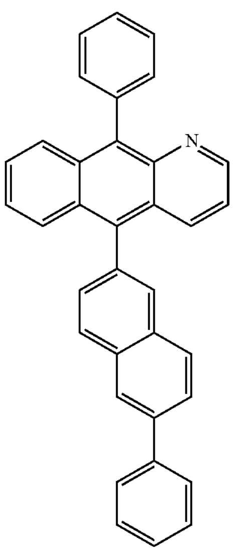
524
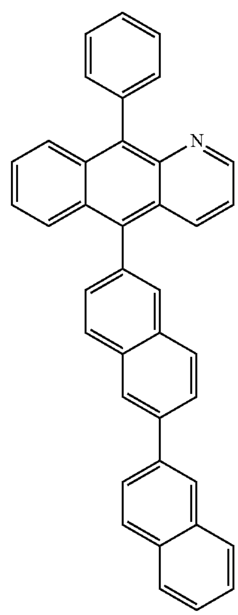

-continued
525
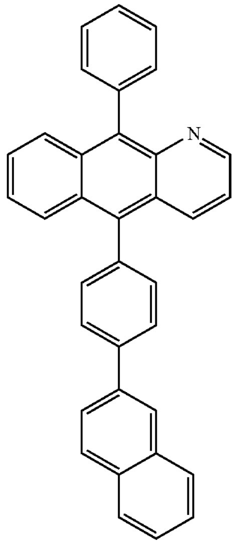
526
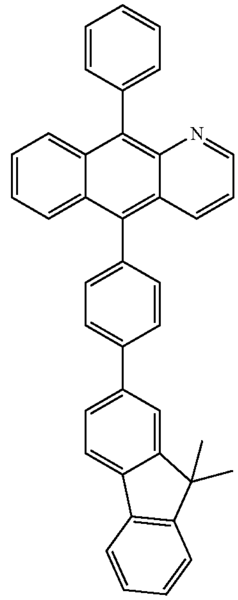
527
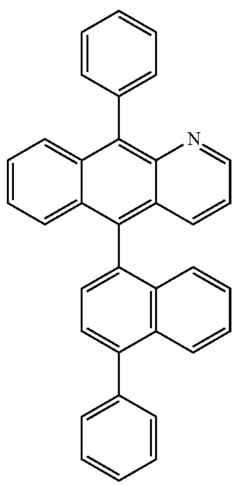
528
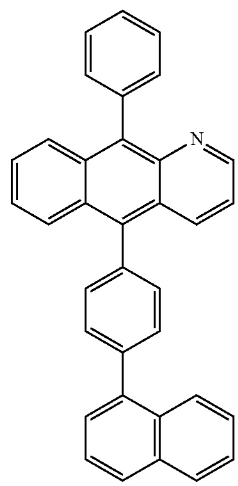
529
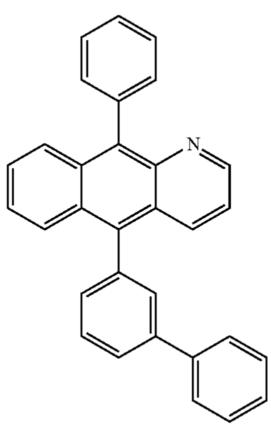
530
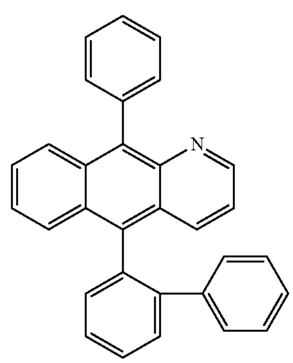

-continued
531
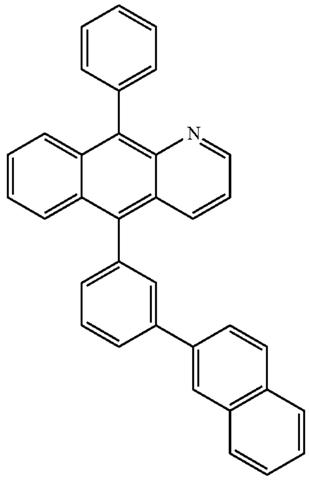
532
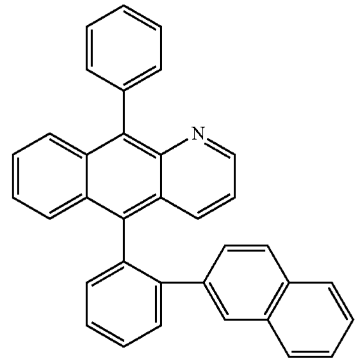
533
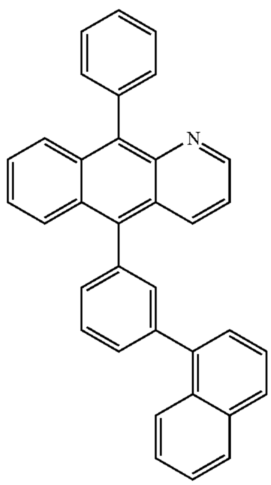
534
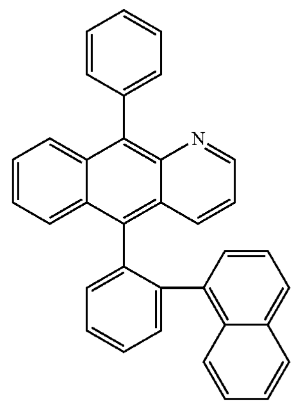
535
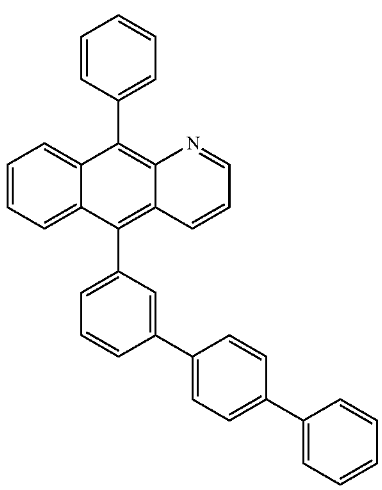
536
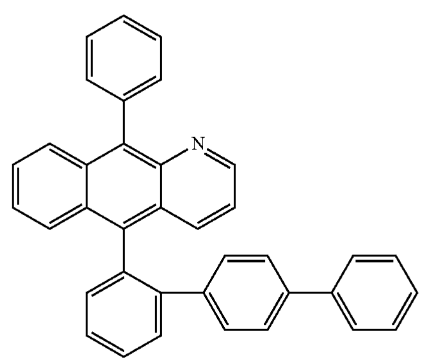

-continued
537
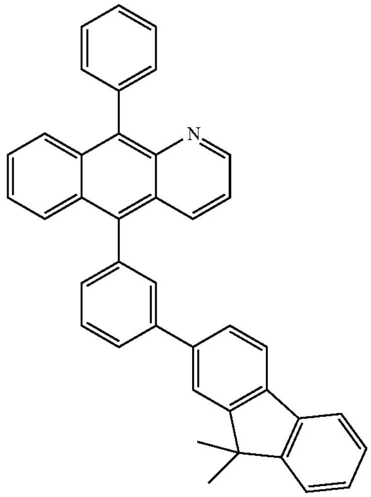
538
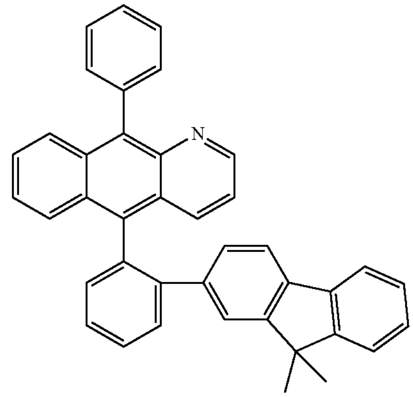
539
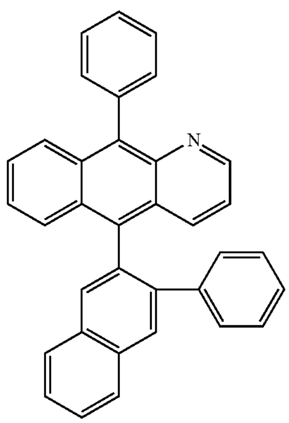
540
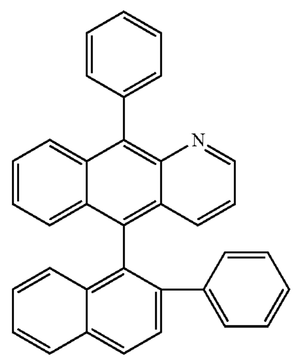
541
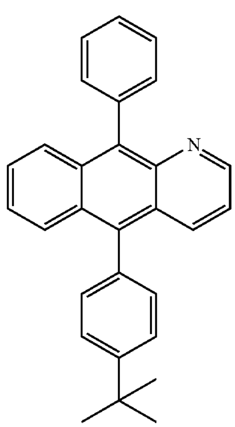
542
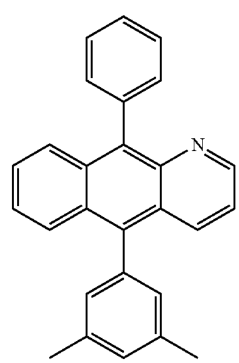

-continued
543
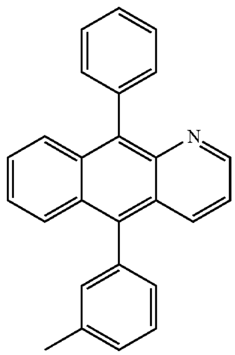
544
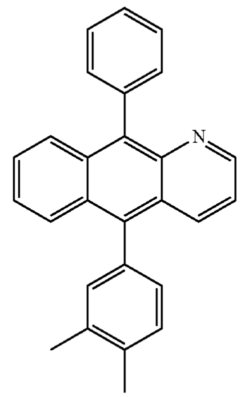
545
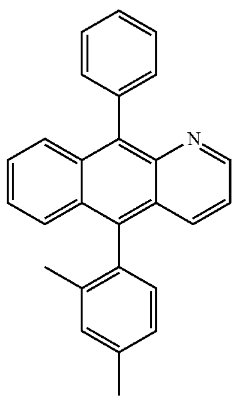
456
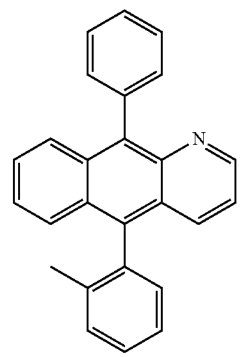
547
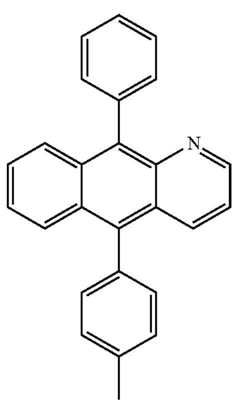
548
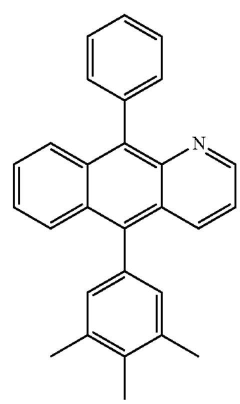
549
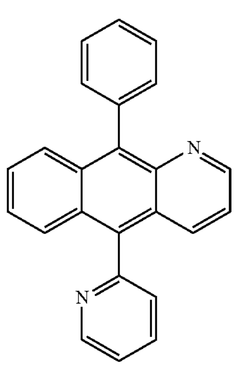
550
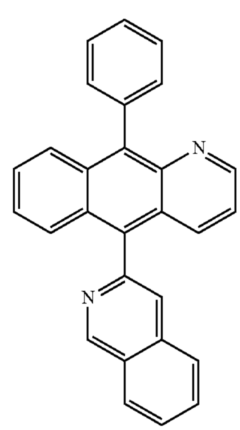

-continued
551
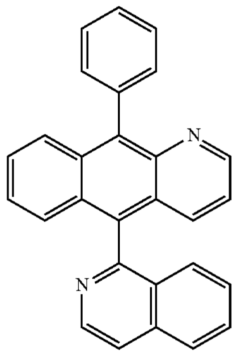
552
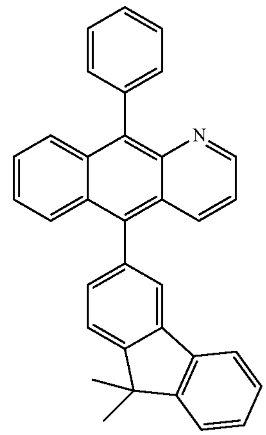
553
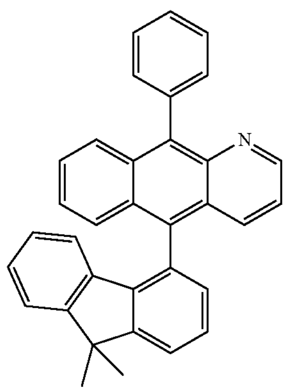
554
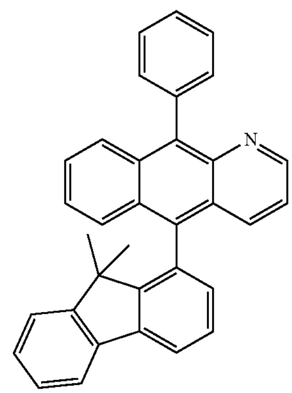
555
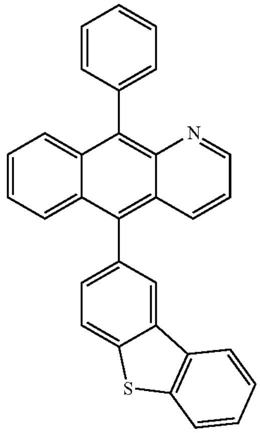
556
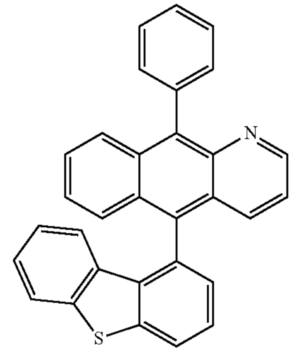

-continued
557
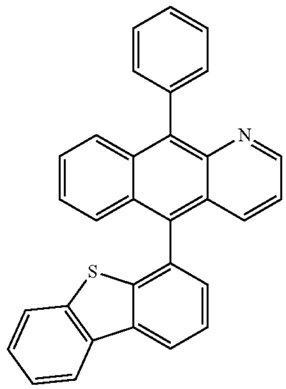
558
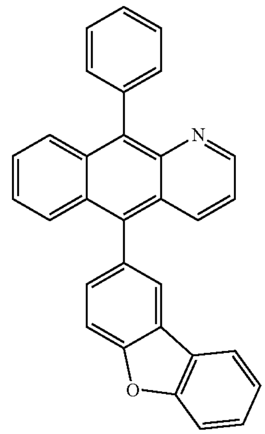
559
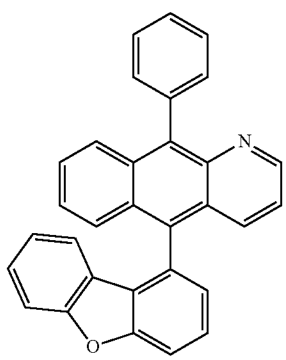
560
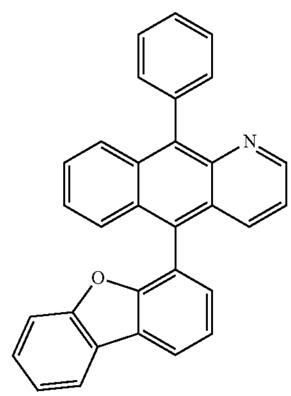
561
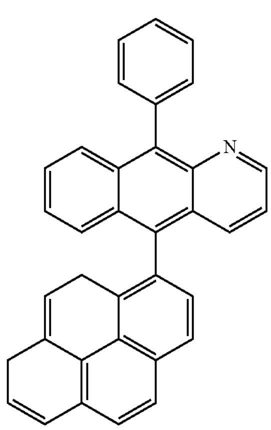
562
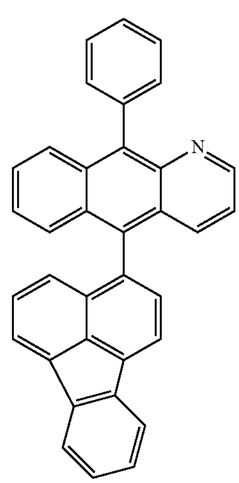

-continued
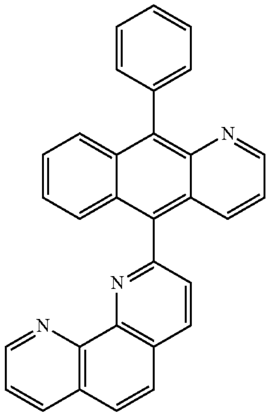
563
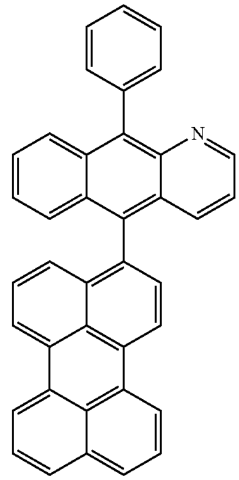
564
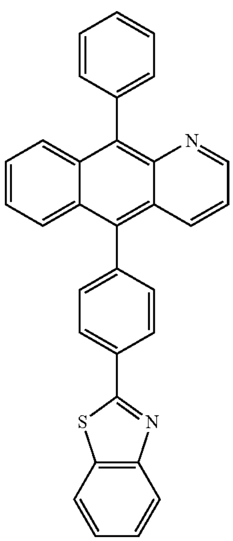
565
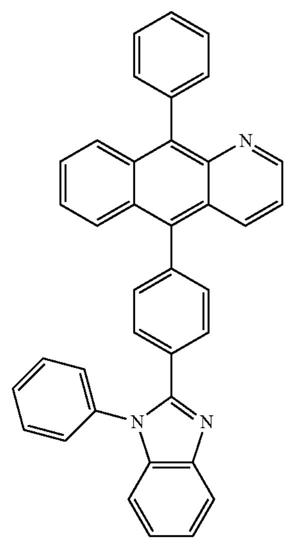
566
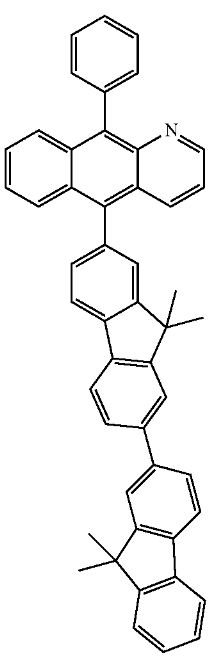
567
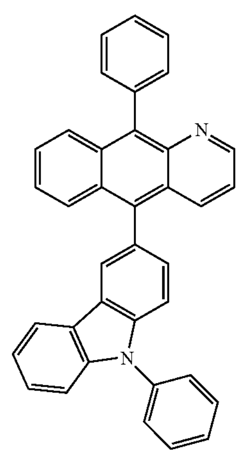
568

-continued
569
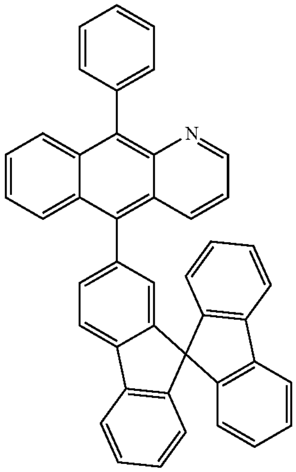
570
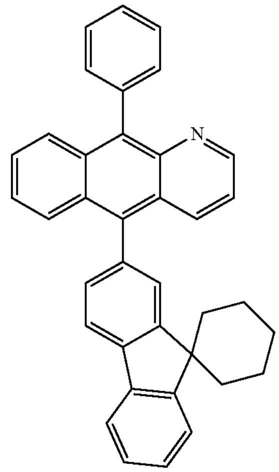
571
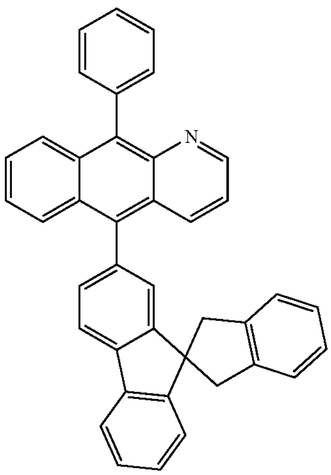
572
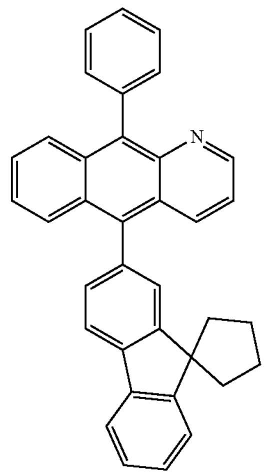
573
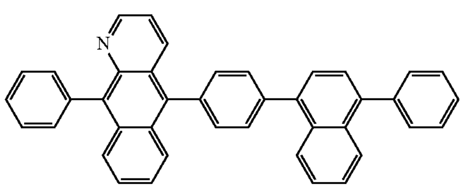
574
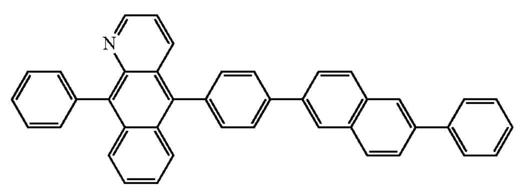
575
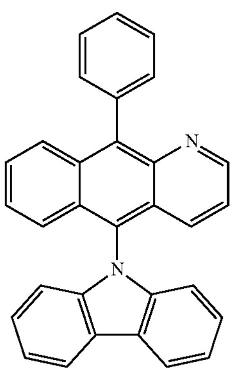
576
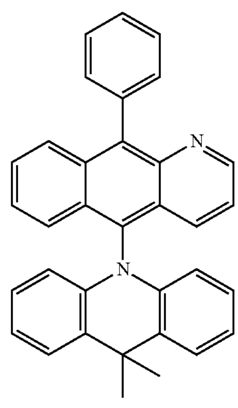

-continued
577
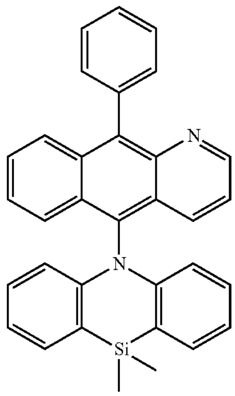
578
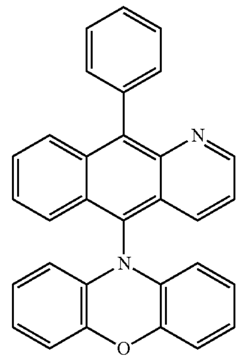
579
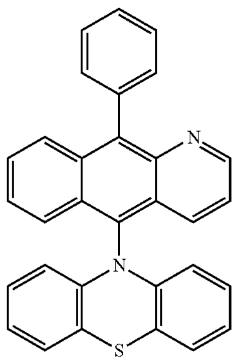
580
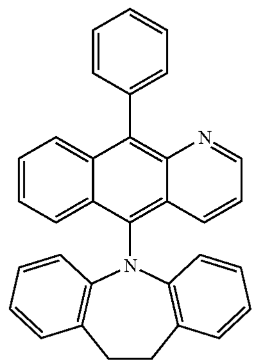
581
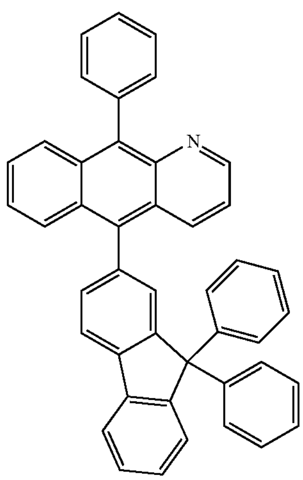
582
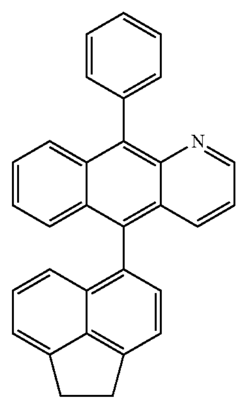
583
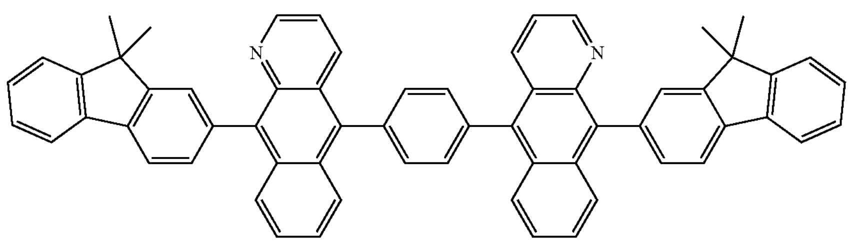

-continued
584
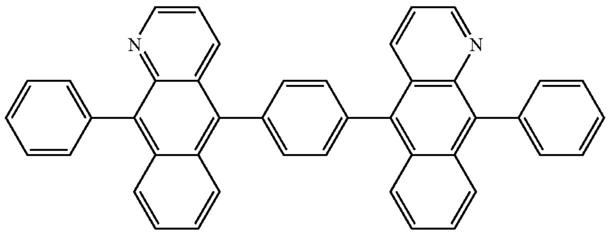
585
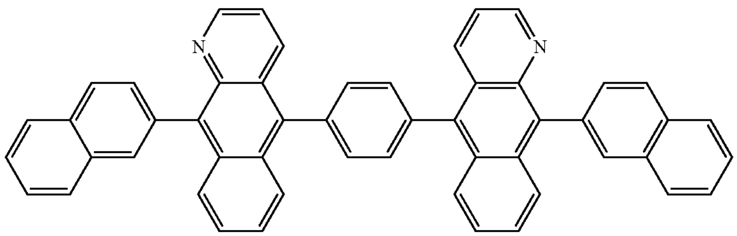
586
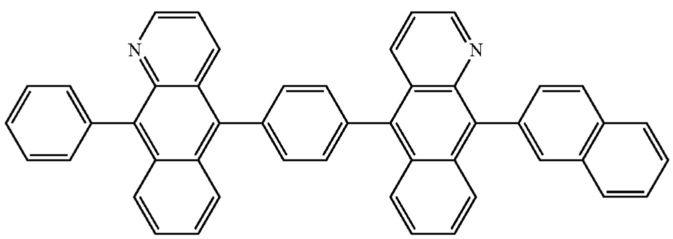
587
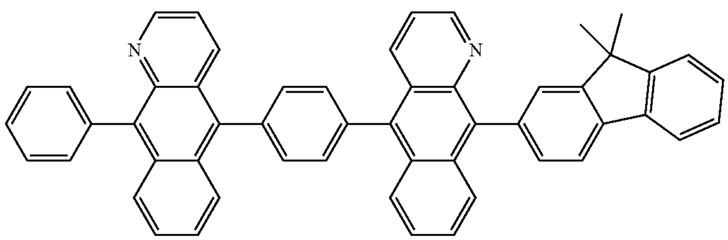
588
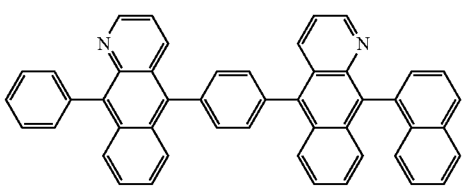
589
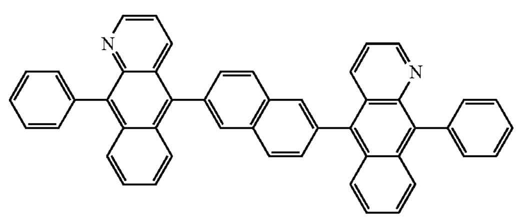
590
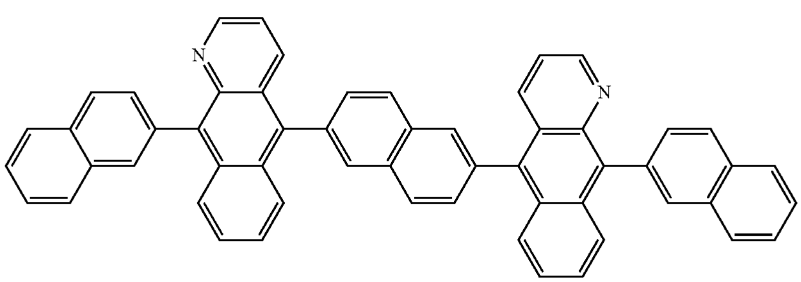

-continued
591
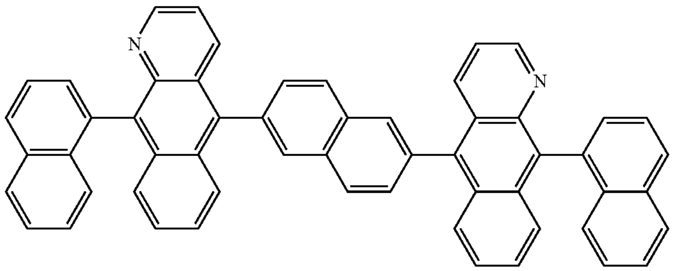
592
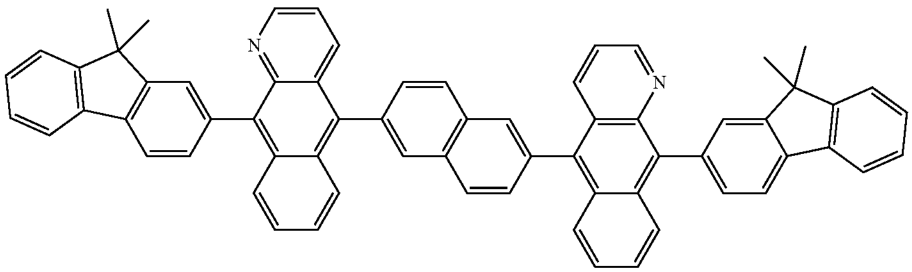
593
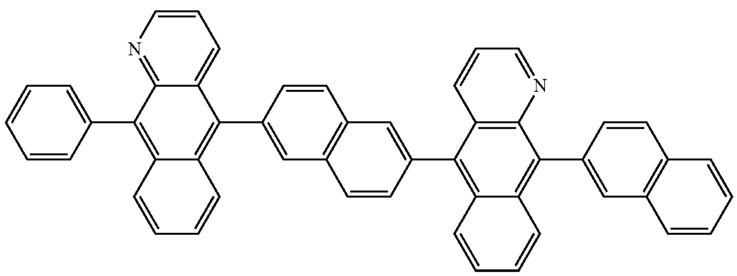
594
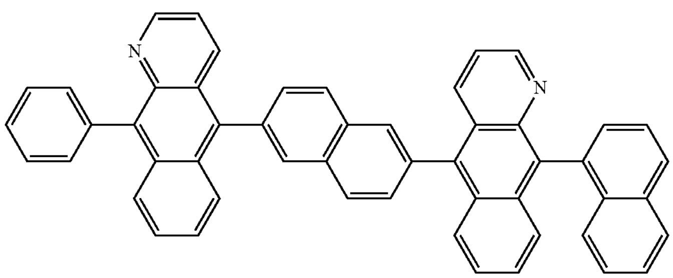
595
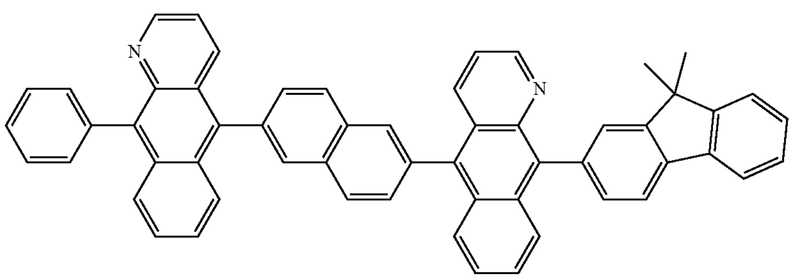
596
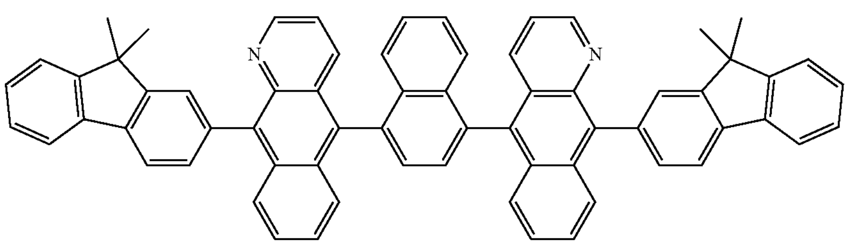

-continued
597
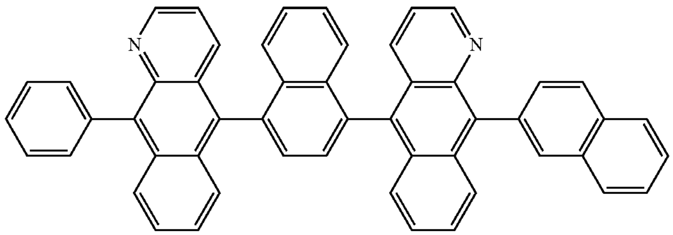
598
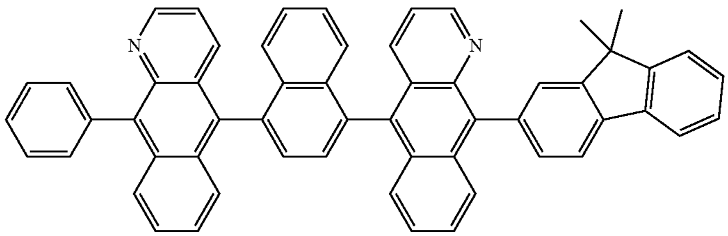
599
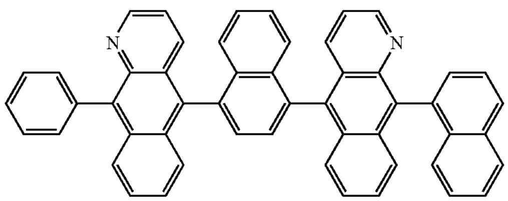
600
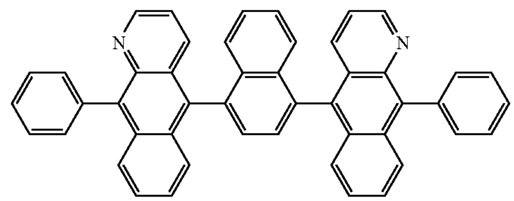
601
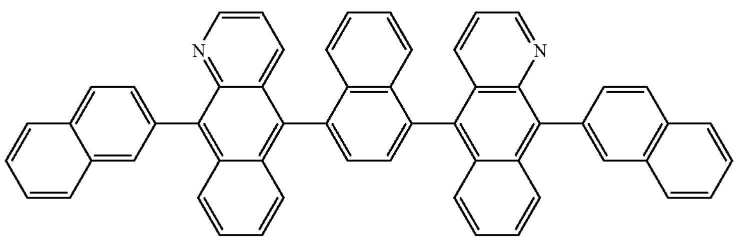
602
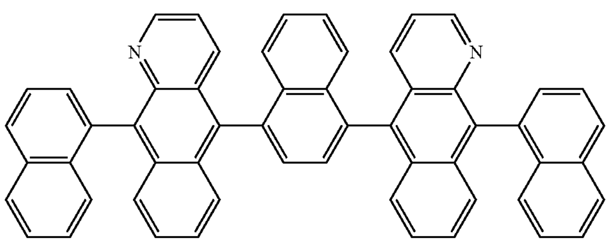
603
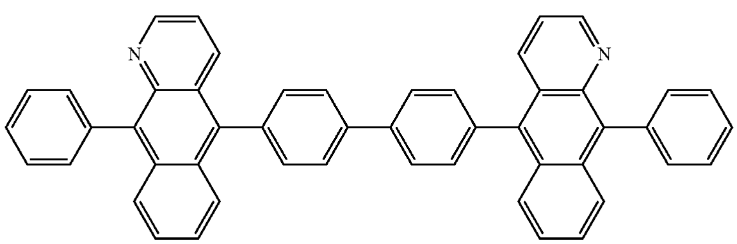
604
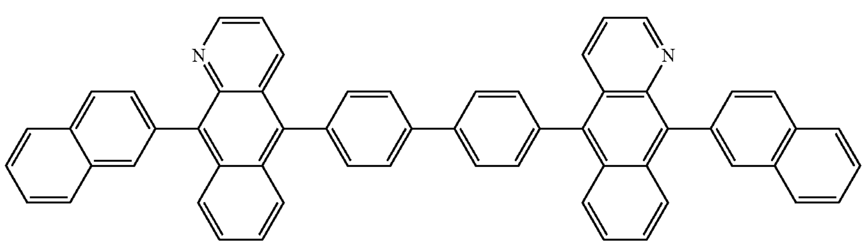

-continued
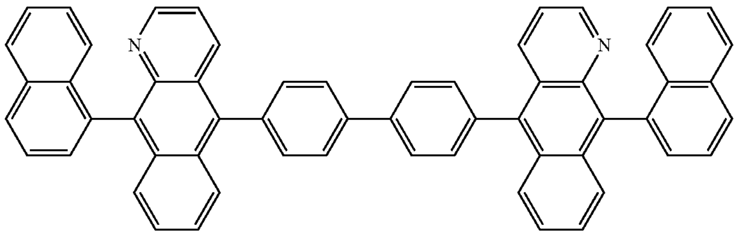
605
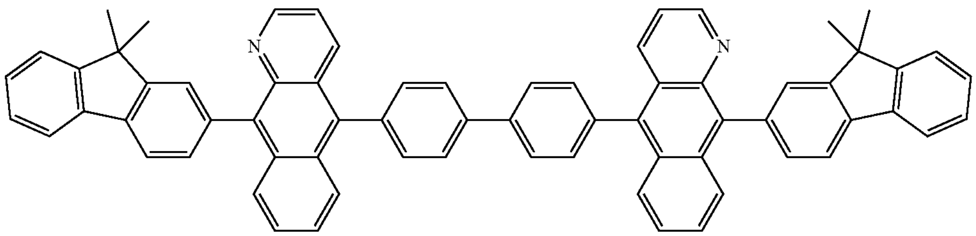
606
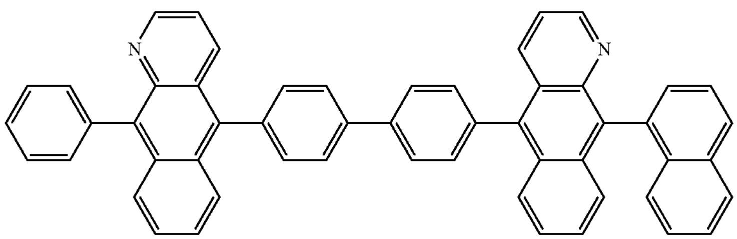
607
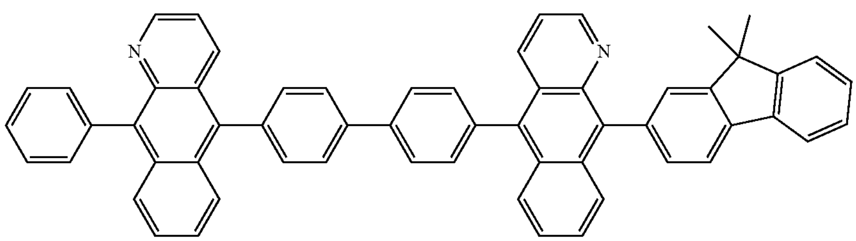
608
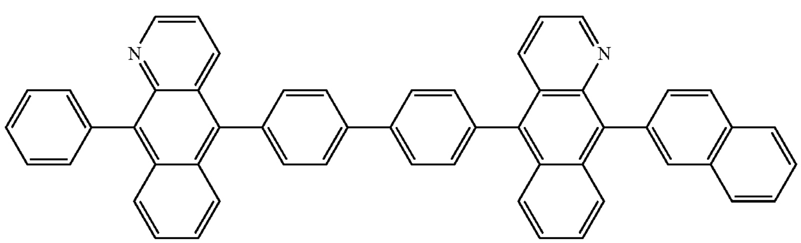
609
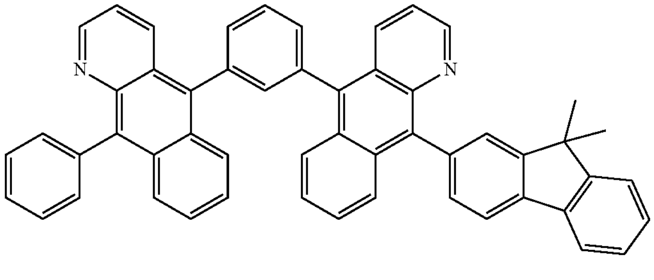
610

-continued
611
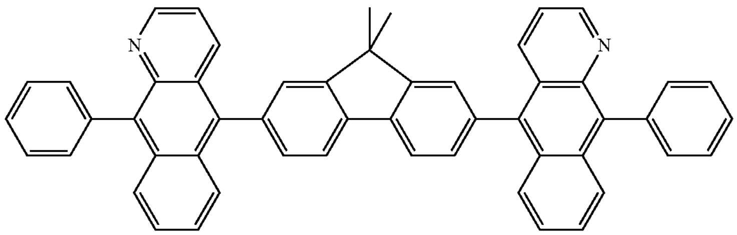
612
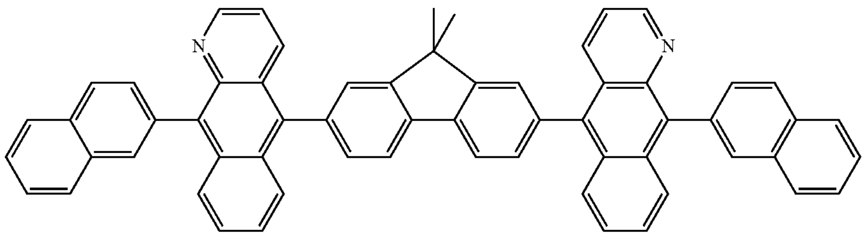
613
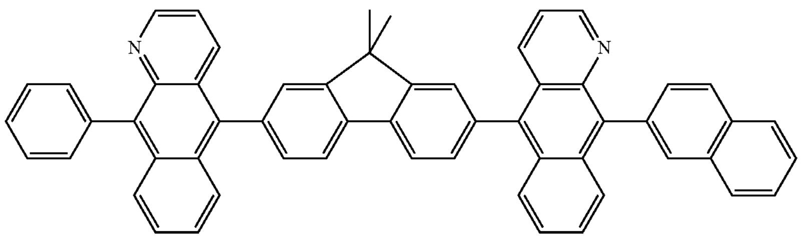
614
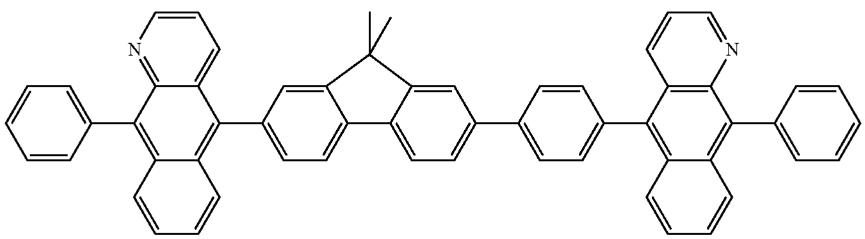
615
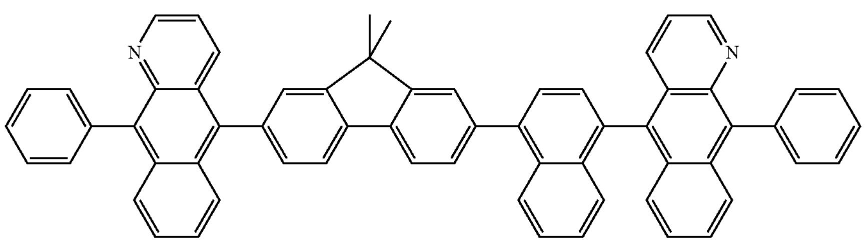
616
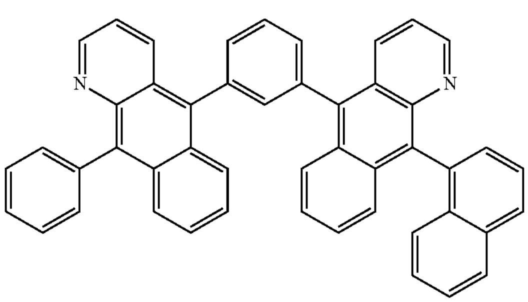

-continued
617
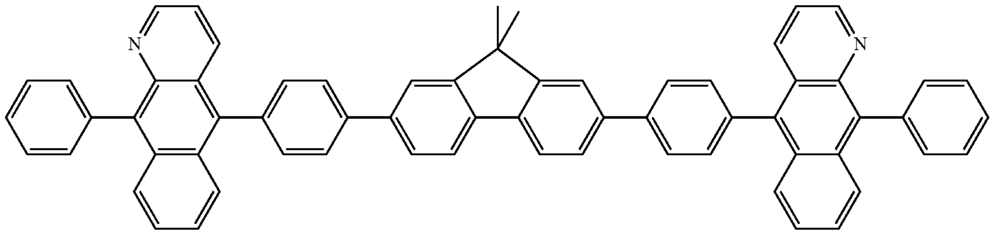
618
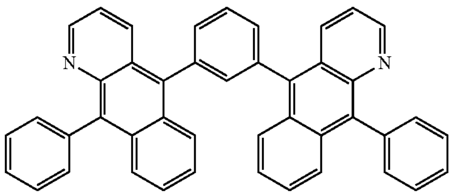
619
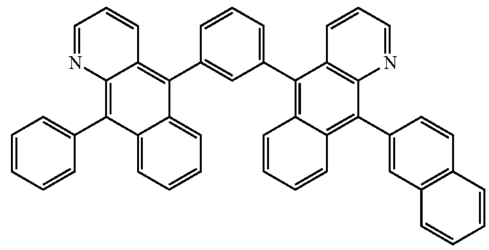
620
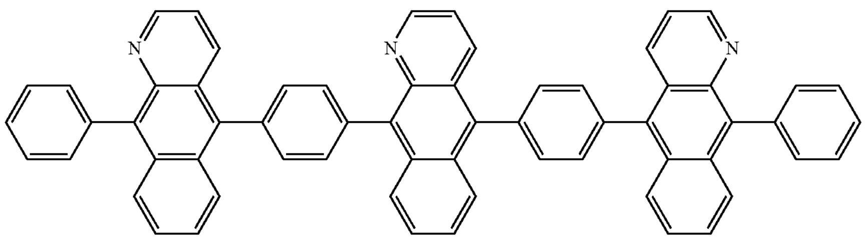
621
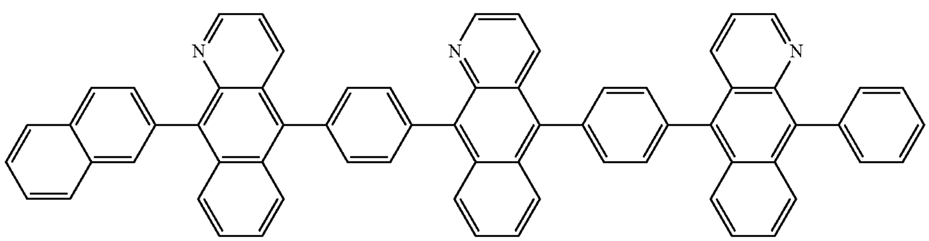
622
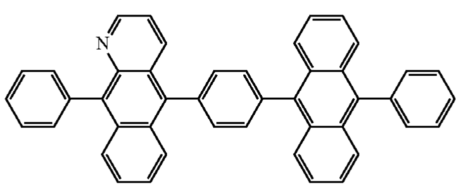
623
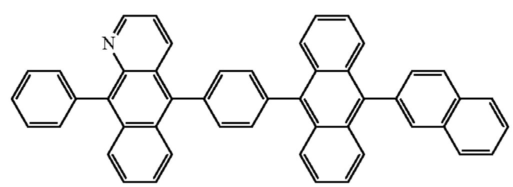
624
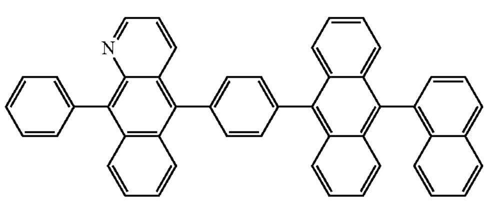
625
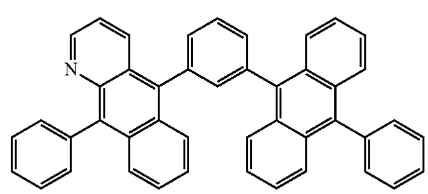
626
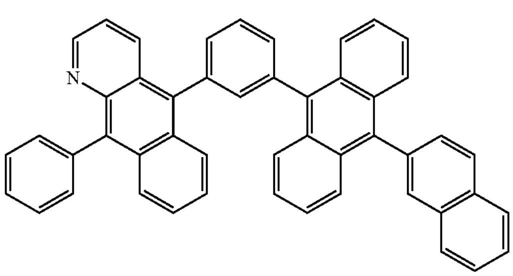
627
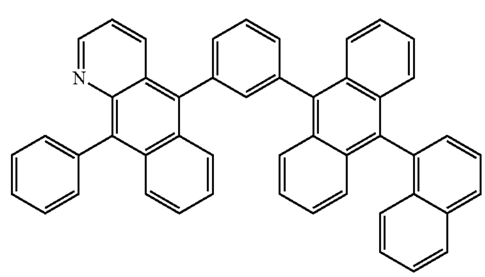

-continued
628
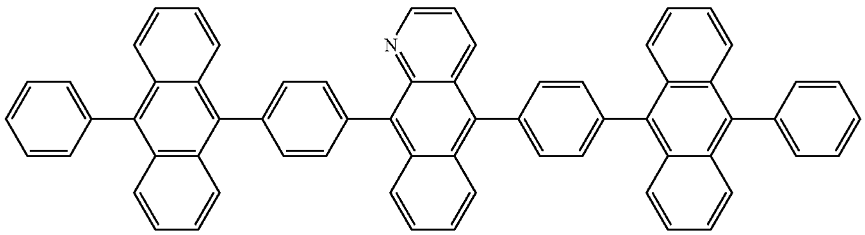
629
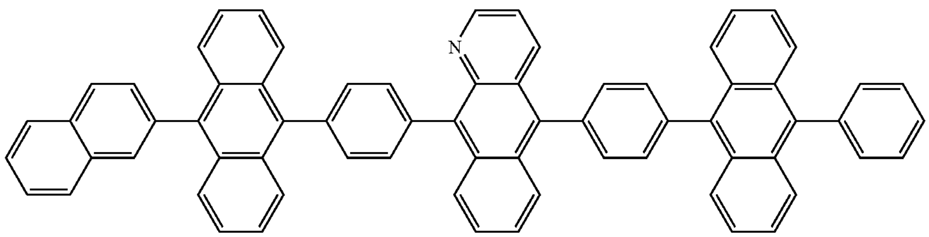
630
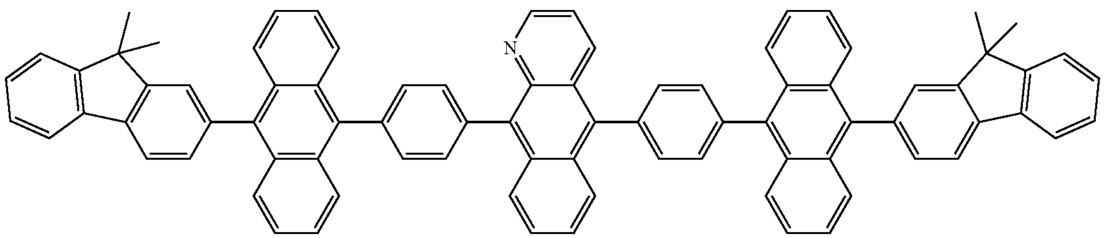
631
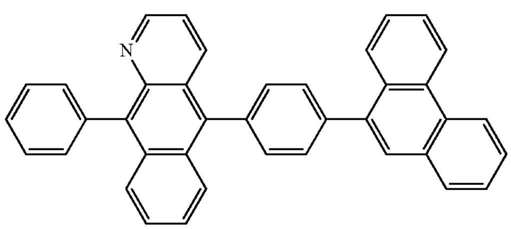
632
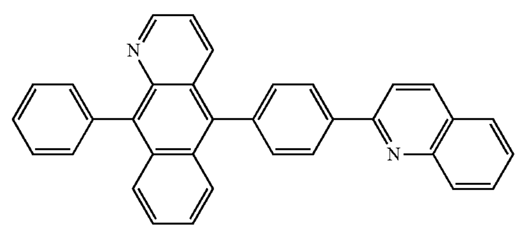
633
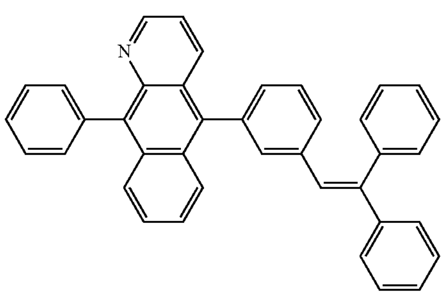
634
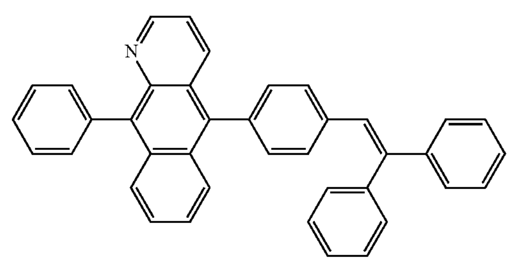

-continued
635
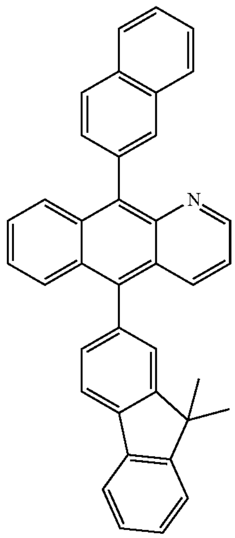
636
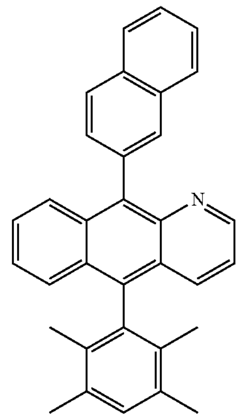
637
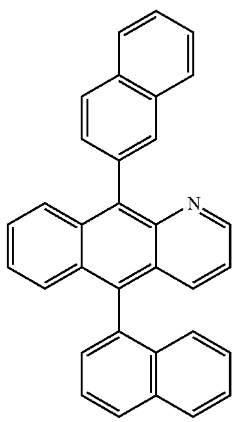
638
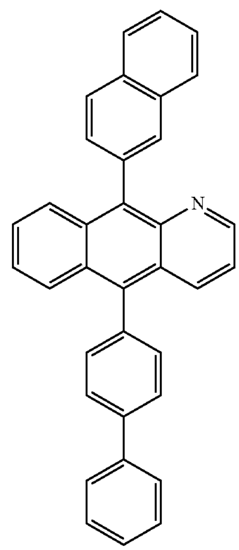
639
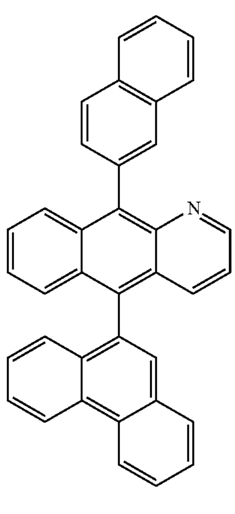
640
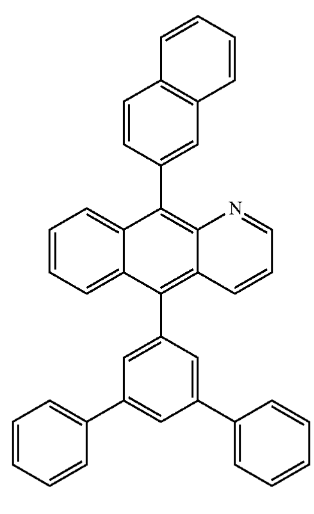

-continued
641
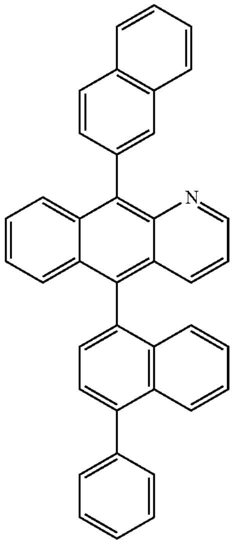
642
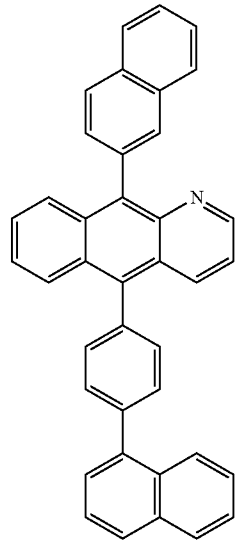
643
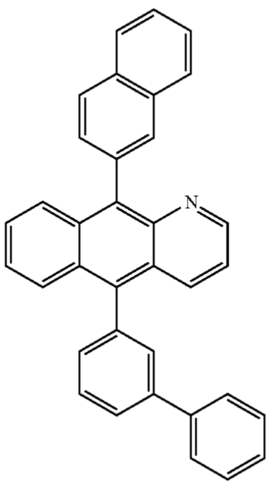
644
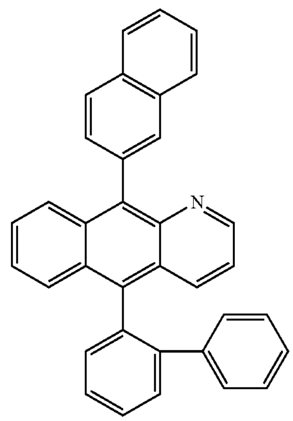
645
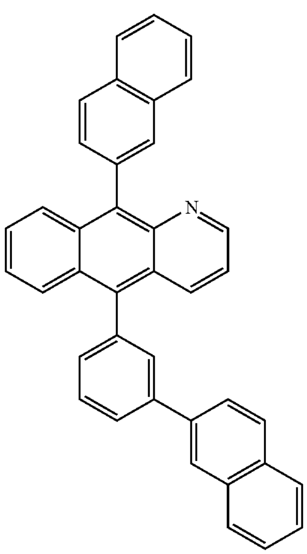
646
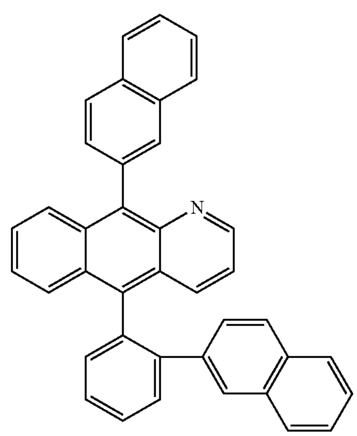

-continued
647
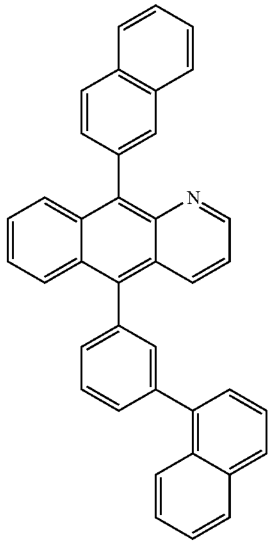
648
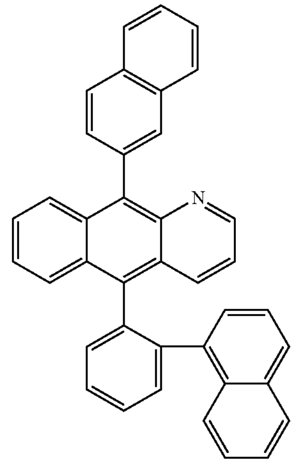
649
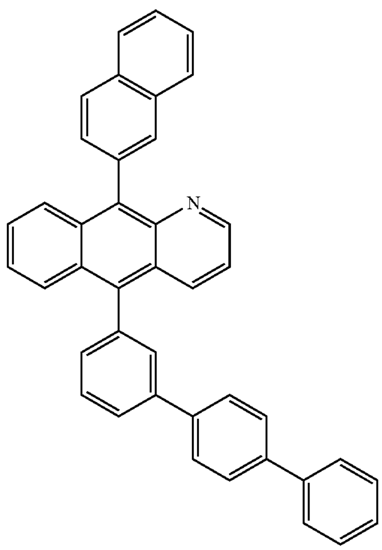
650
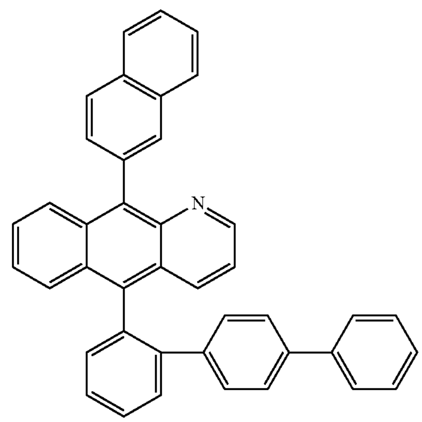
651
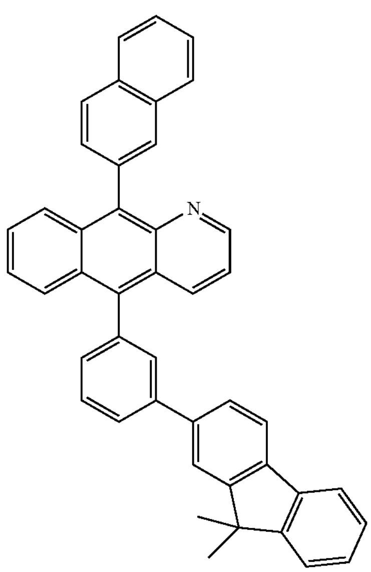
652
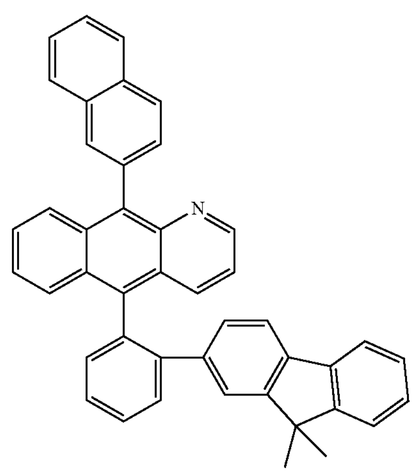

-continued
653
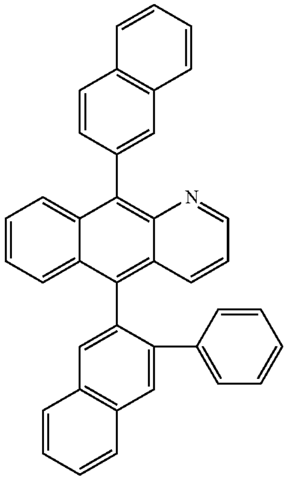
654
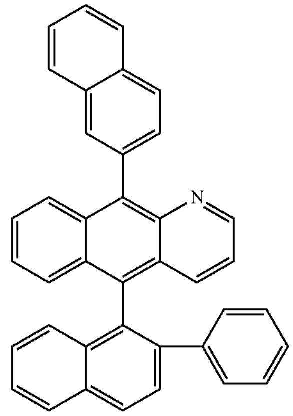
655
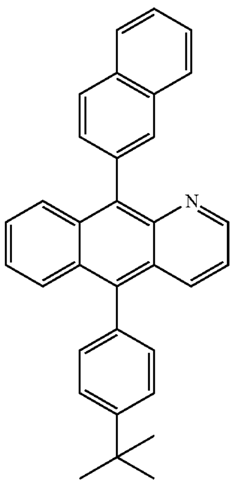
656
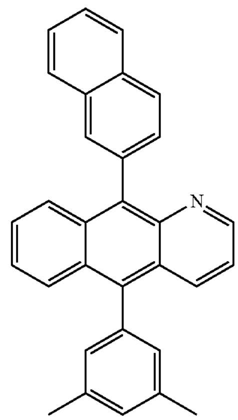
657
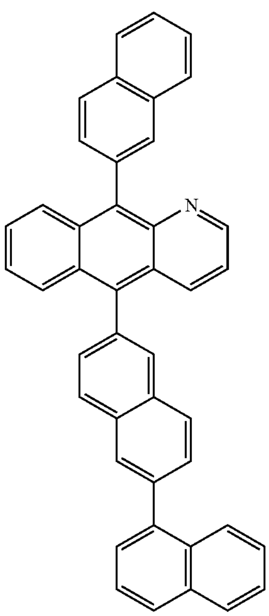
658
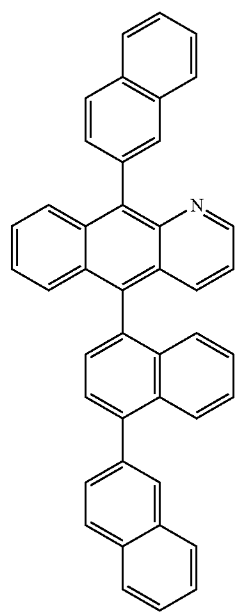

-continued
659
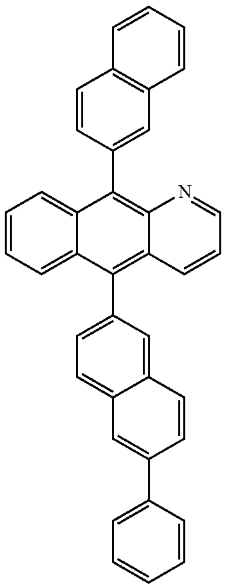
660
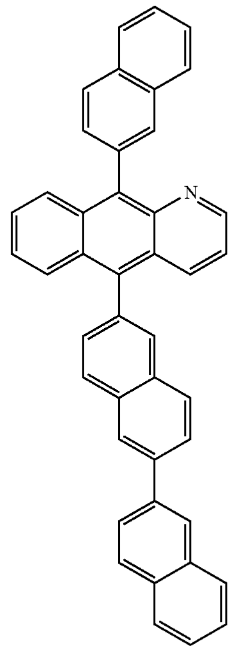
661
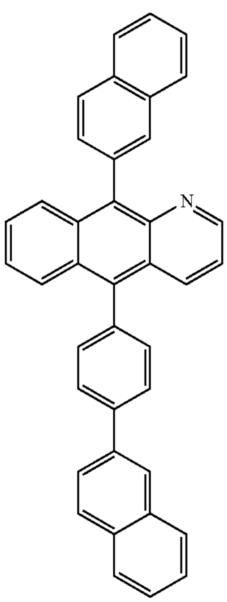
662
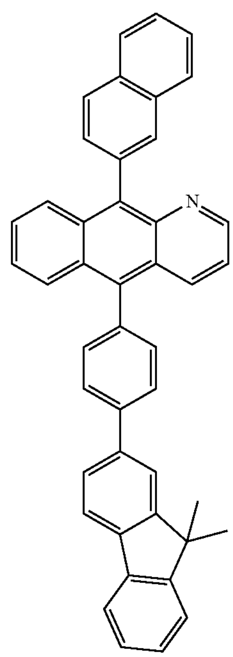

-continued
663
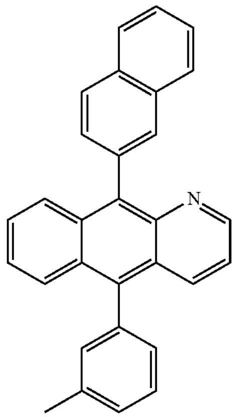
664
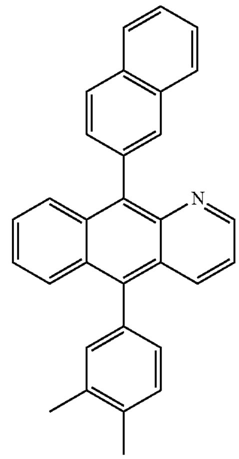
665
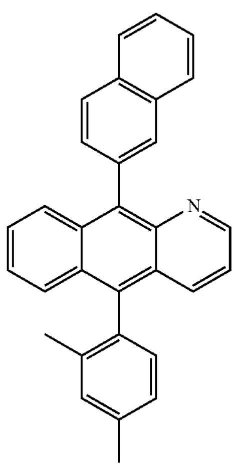
666
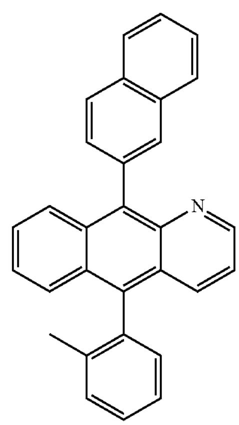
667
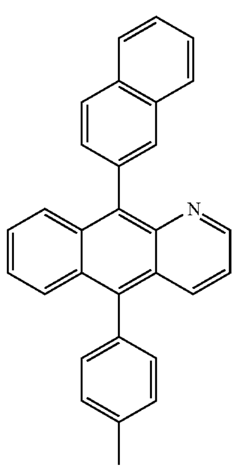
668
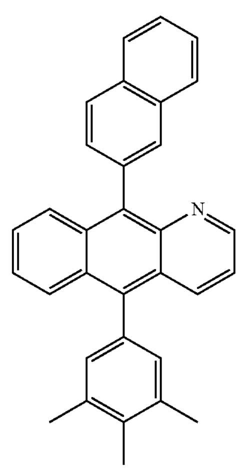

-continued
669
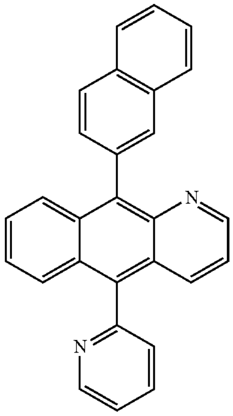
670
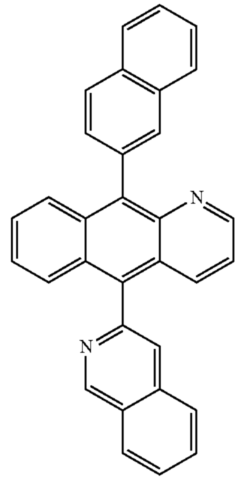
671
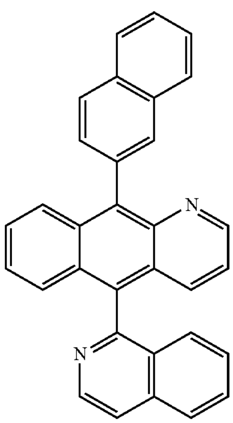
672
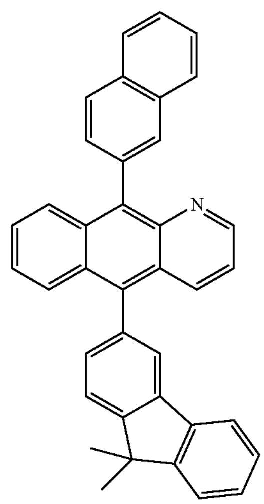
673
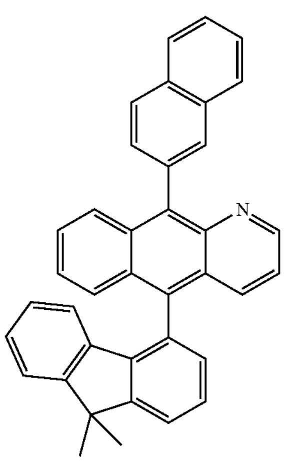
674
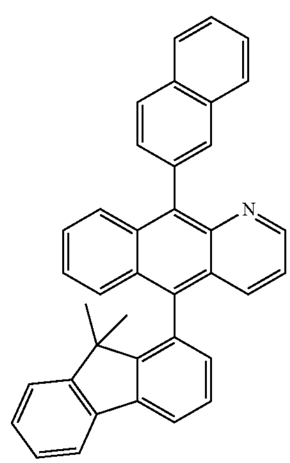

-continued
675
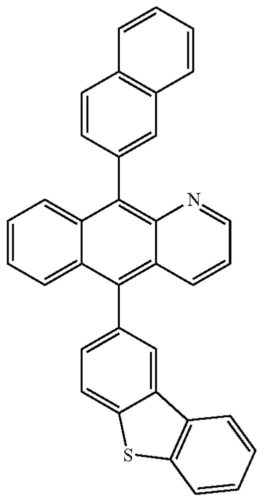
676
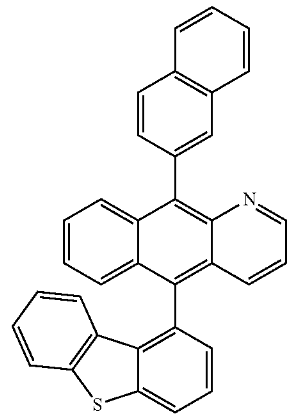
677
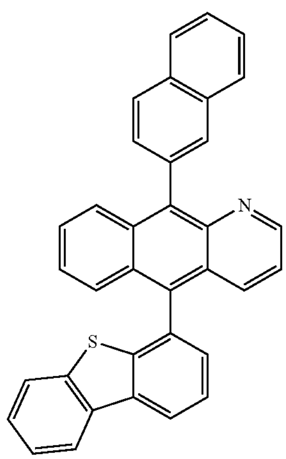
678
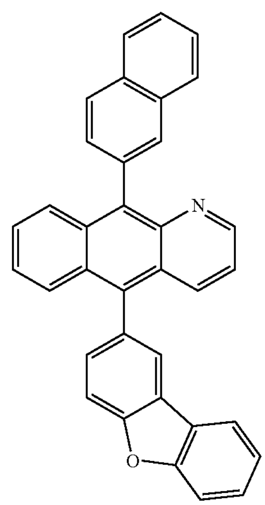
679
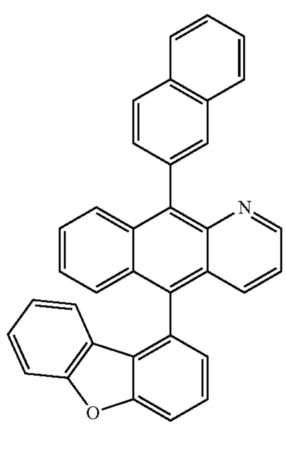
680
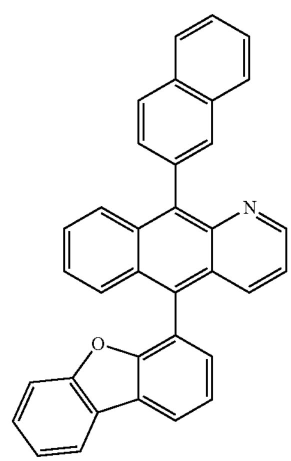

-continued
681
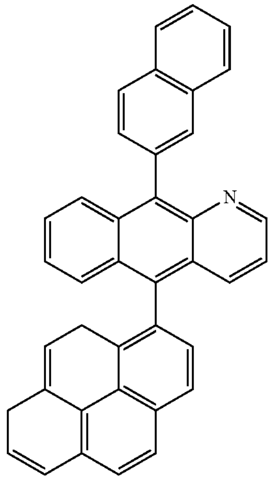
682
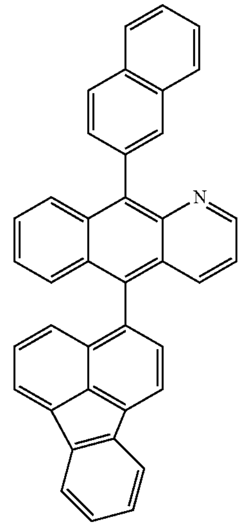
683
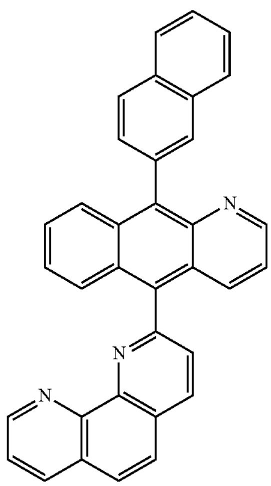
684
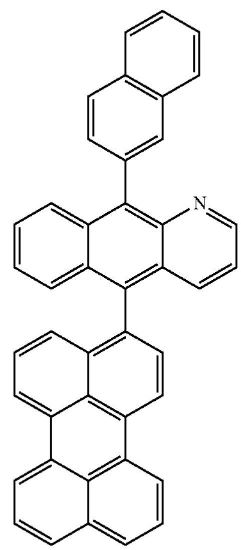
685
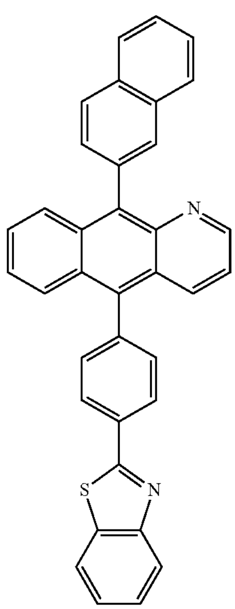
686
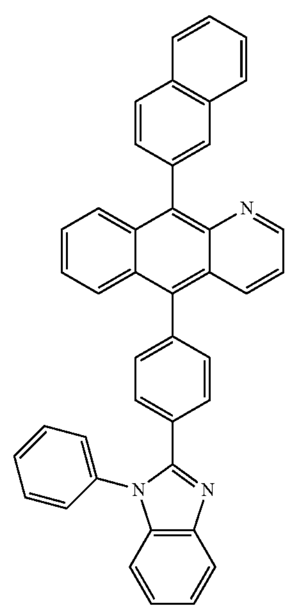

-continued
687
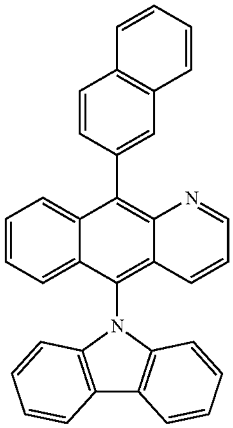
688
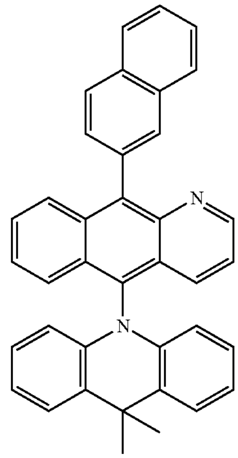
689
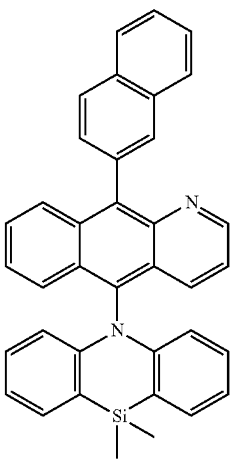
690
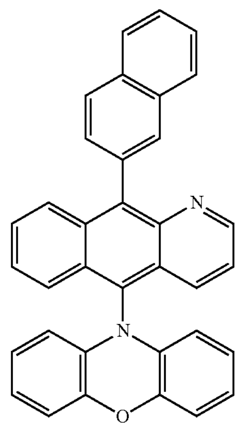
691
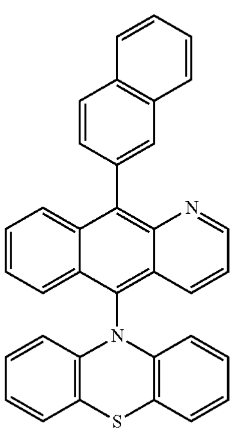
692
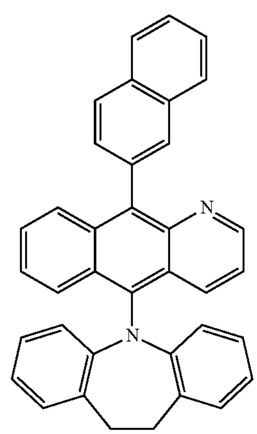

-continued
693
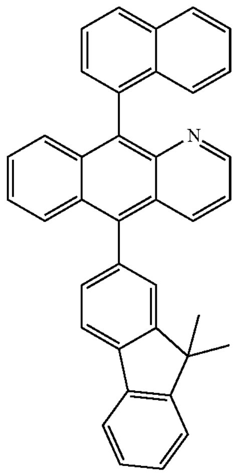
694
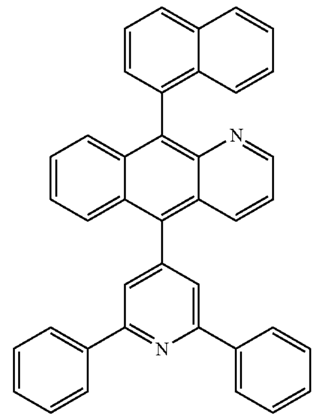
695
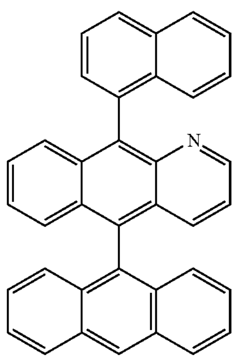
696
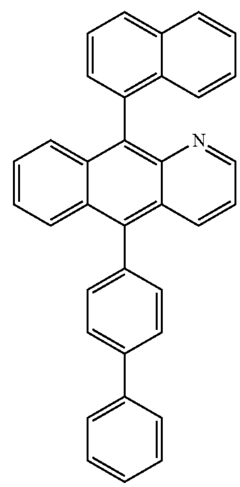
697
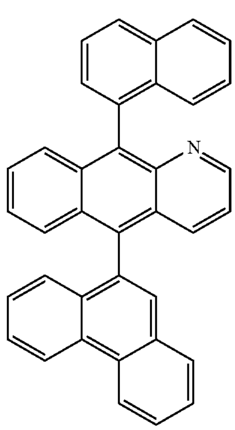
698
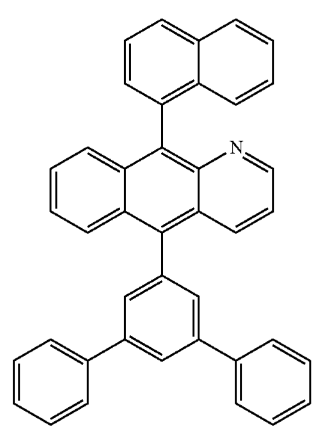

-continued
699
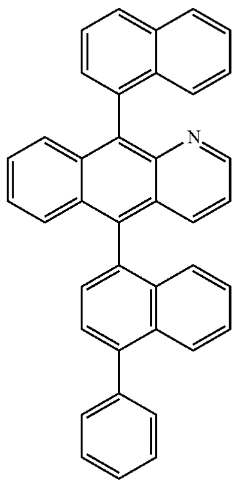
700
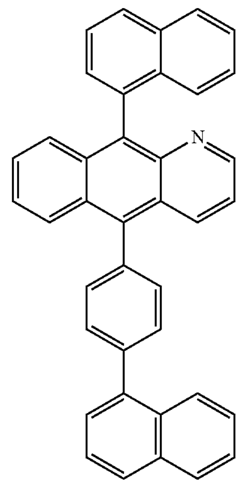
701
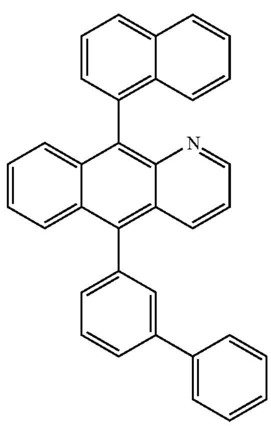
702
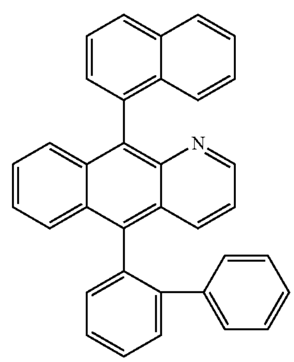
703
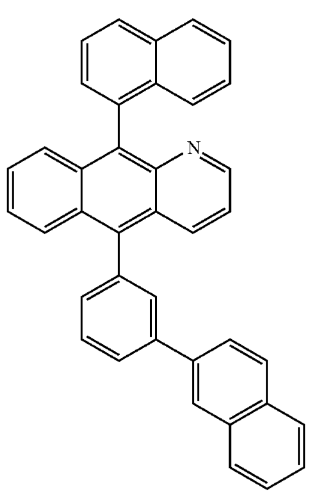
704
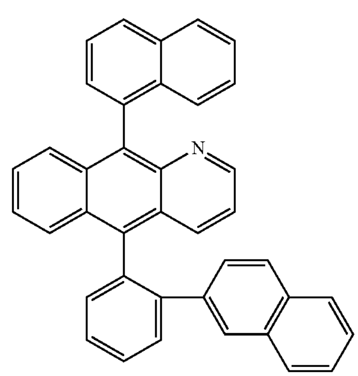

-continued
705
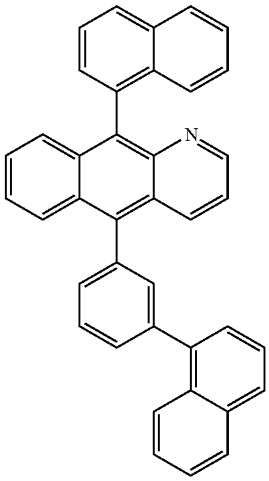
706
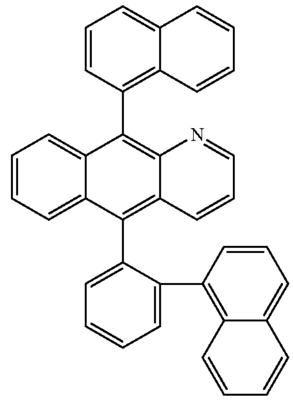
707
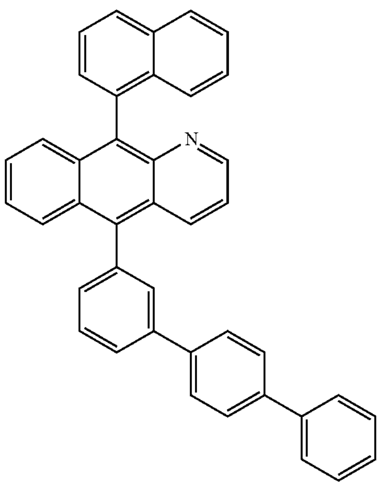
708
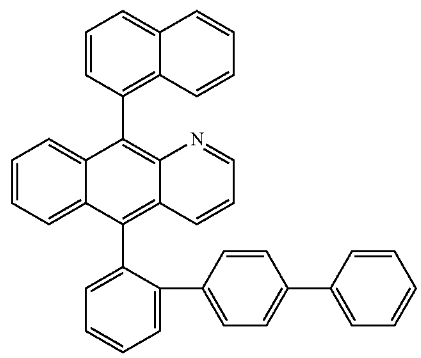
709
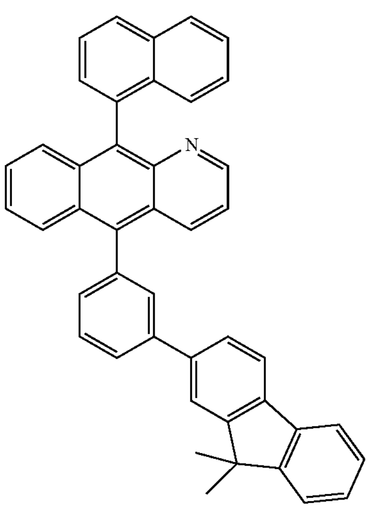
710
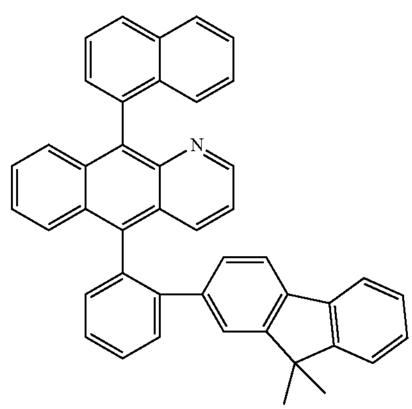

-continued
711
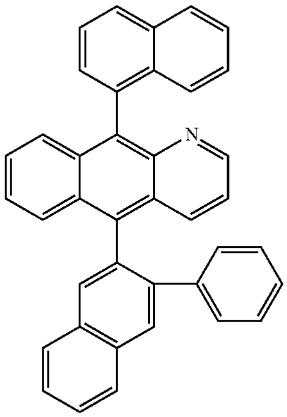
712
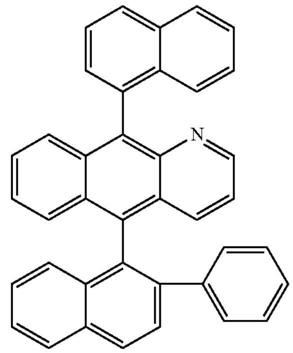
713
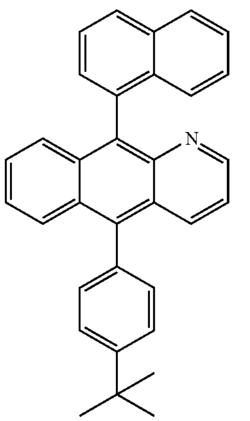
714
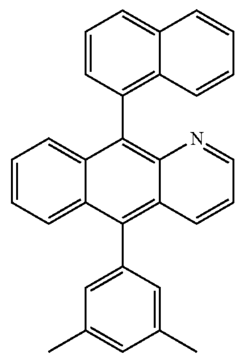
715
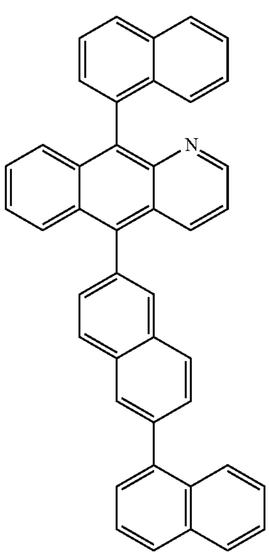
716
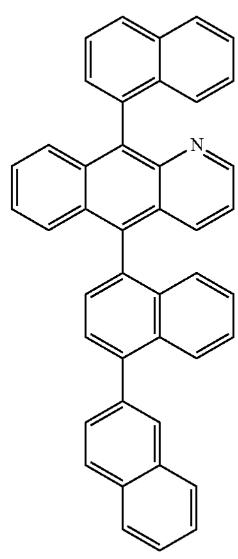

-continued
717
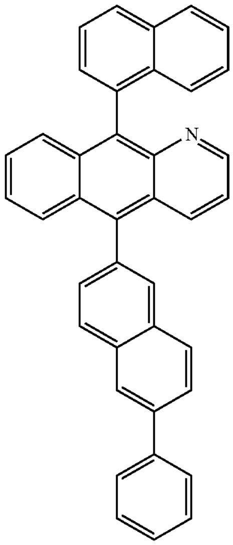
718
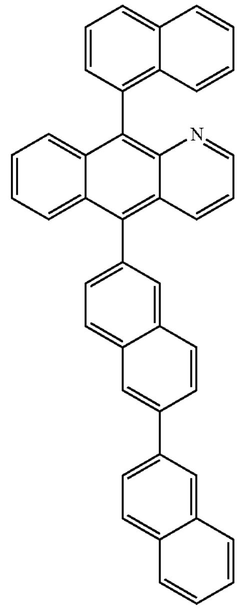
719
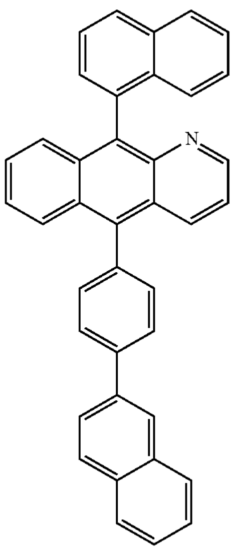
720
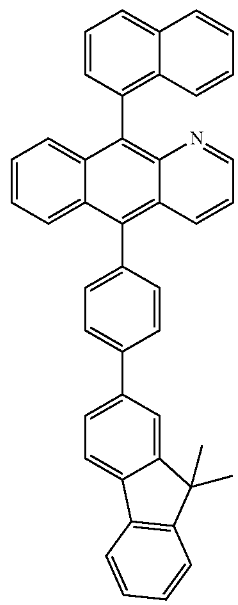
721
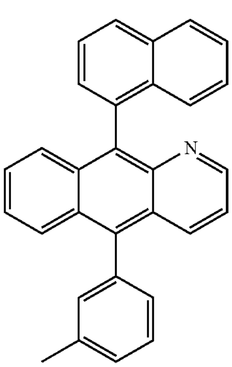
722
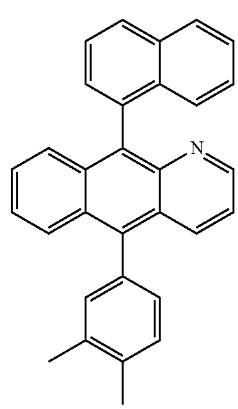

-continued
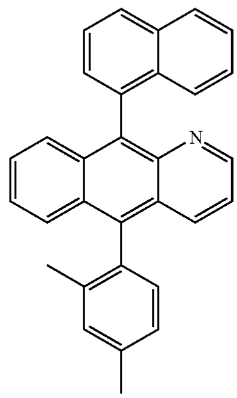
723
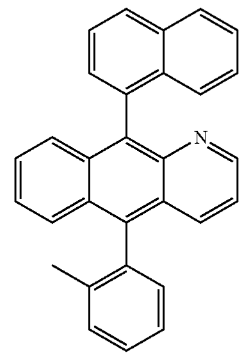
724
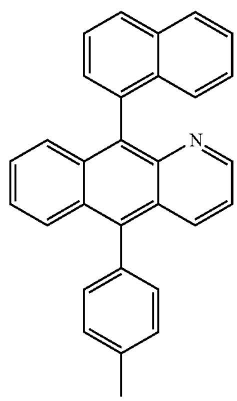
725
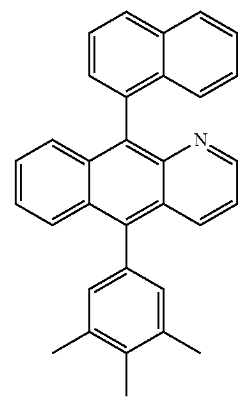
726
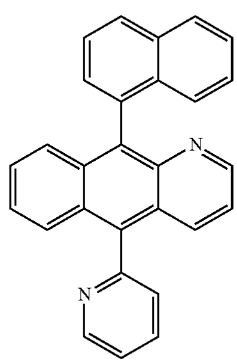
727
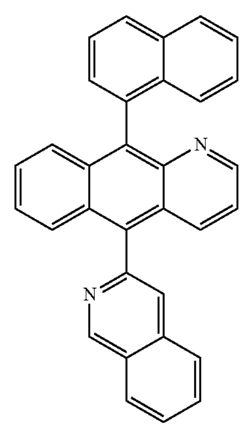
728
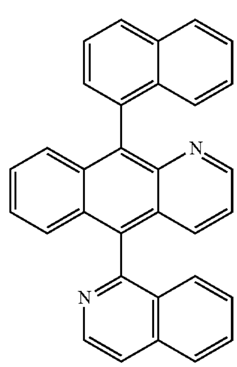
729
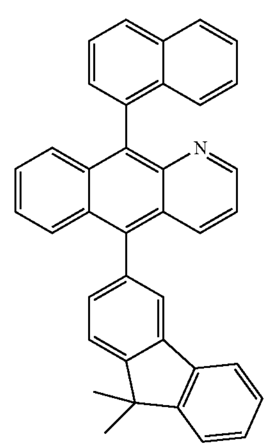
730

-continued
731
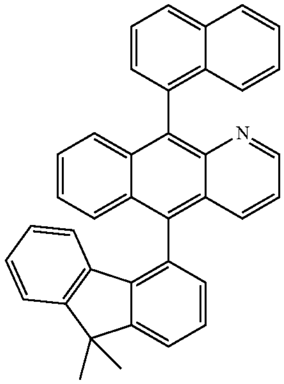
732
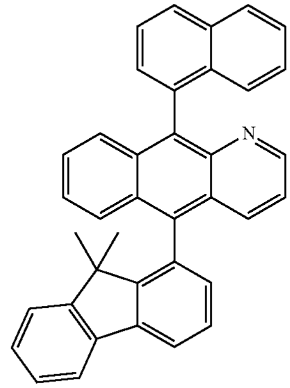
733
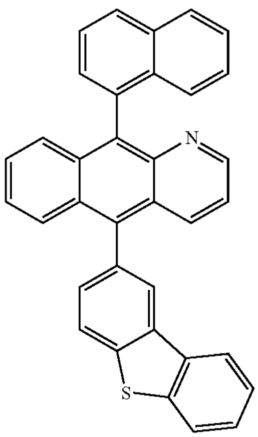
734
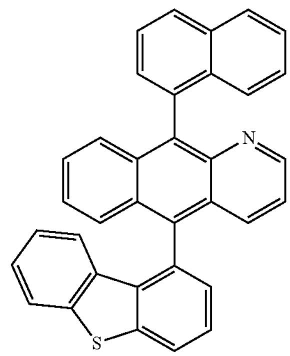
735
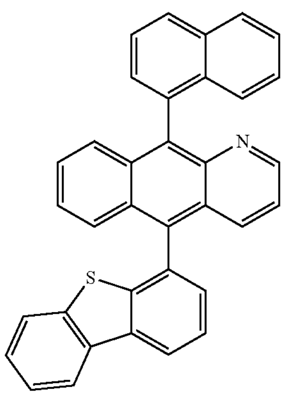
736
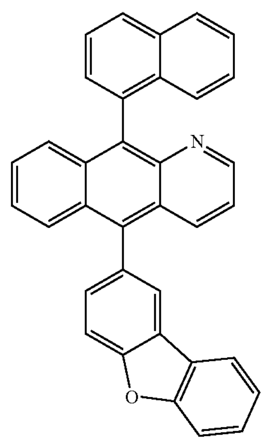
737
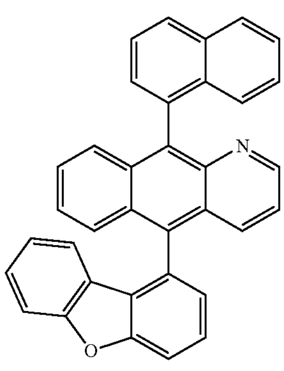
738
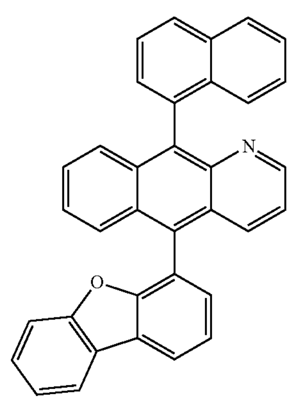

-continued
739
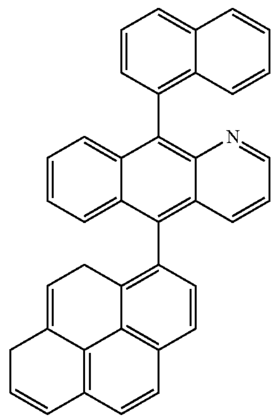
740
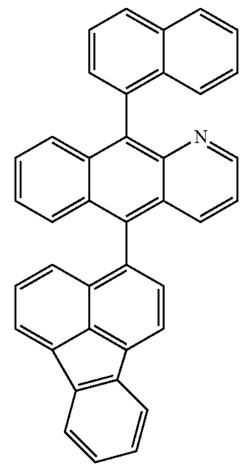
741
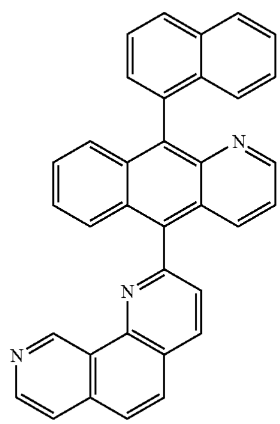
742
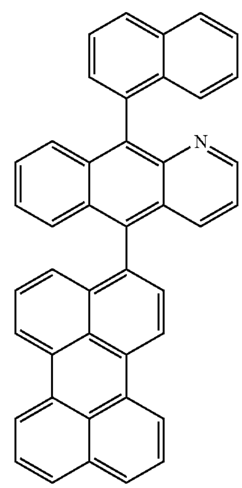
743
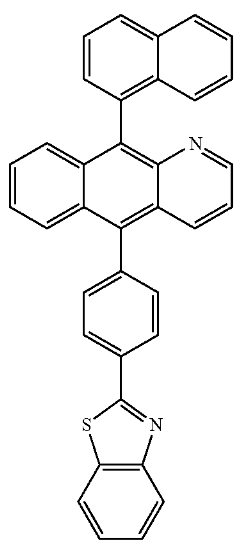
744
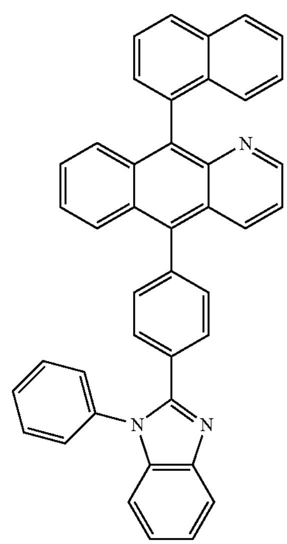

-continued
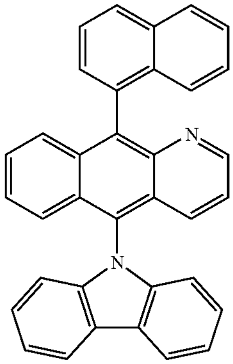
745
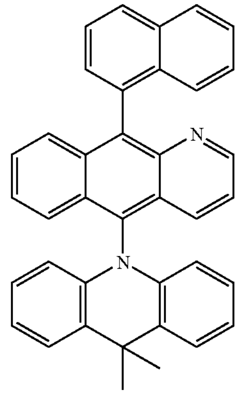
746
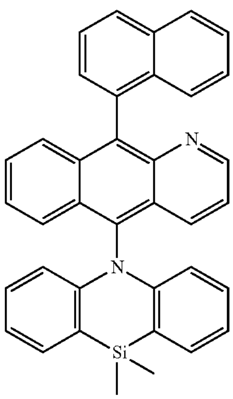
747
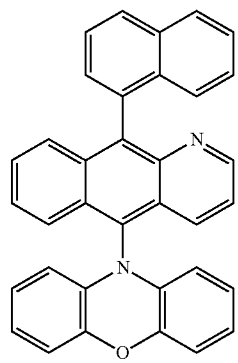
748
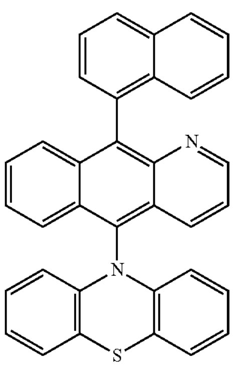
749
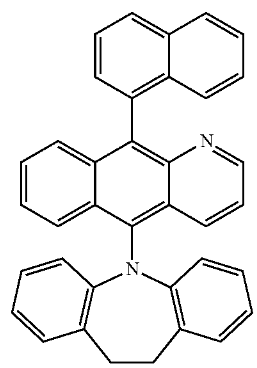
750
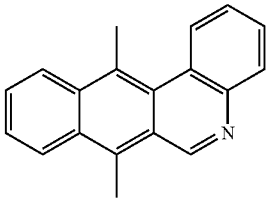
751
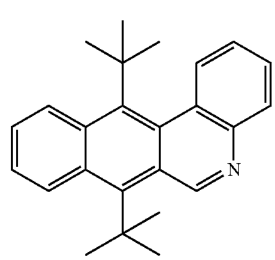
752

-continued
753
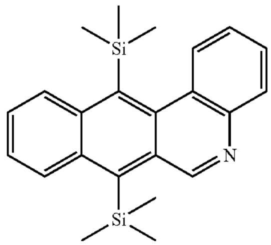
754
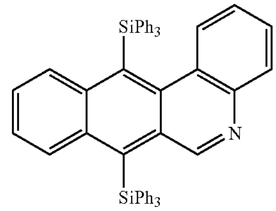
755
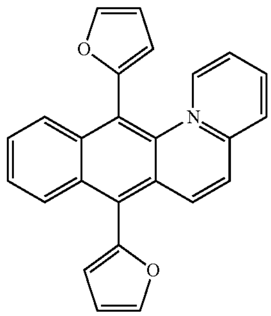
756
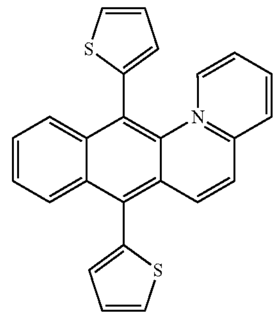
757
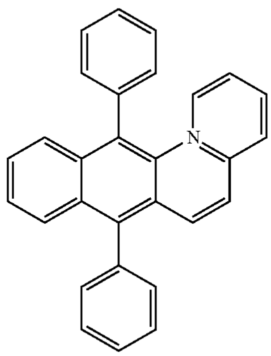
758
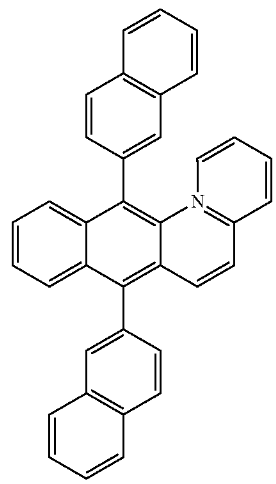
759
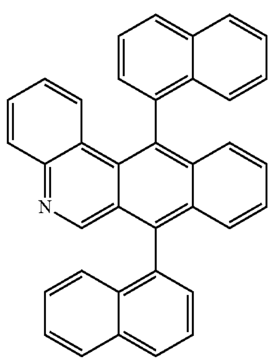
760
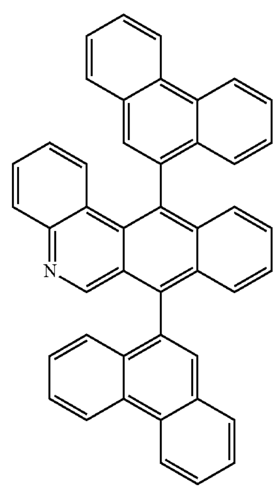

-continued
761
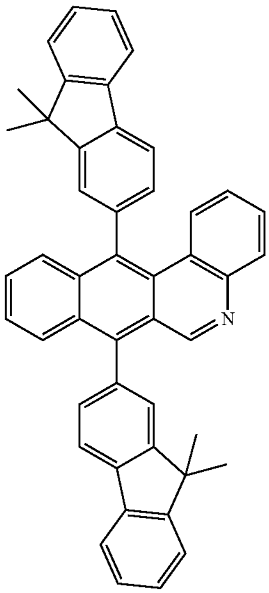
762
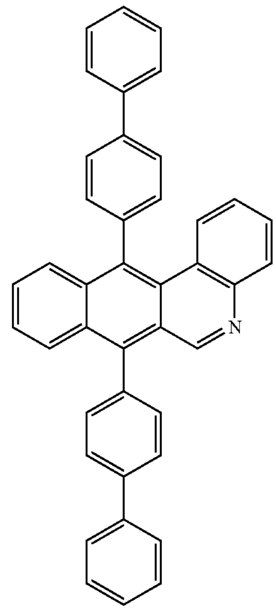
763
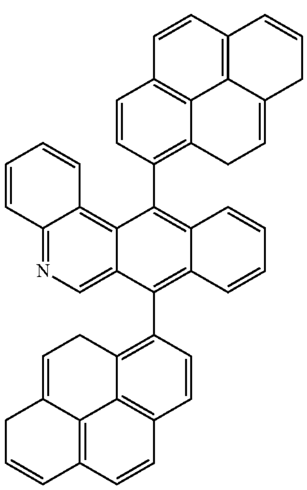
764
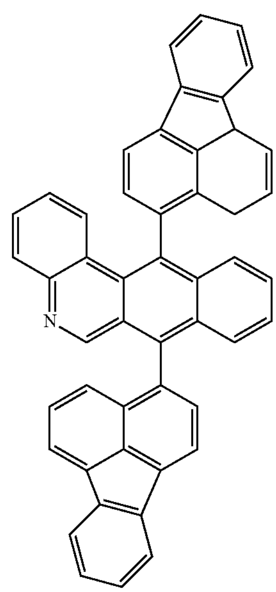

-continued
765
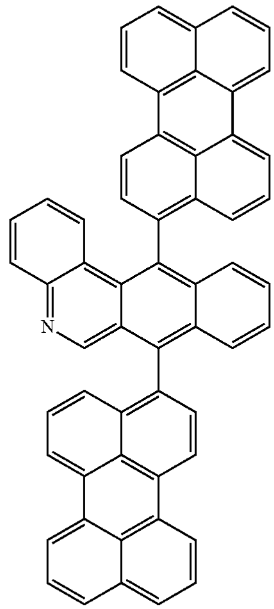
766
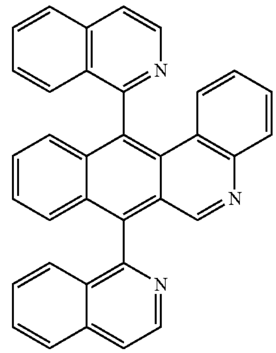
767
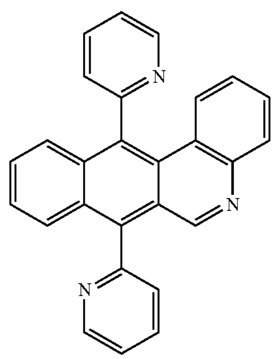
768
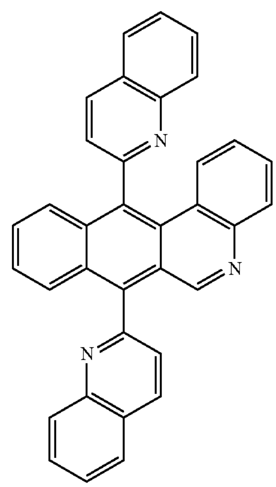
769
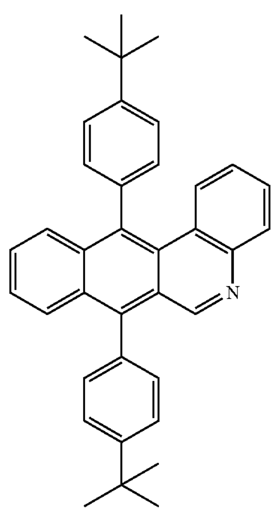
770
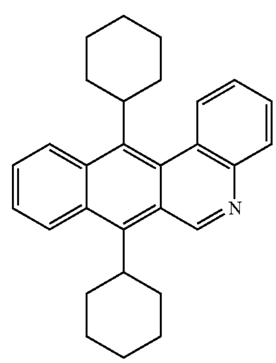

-continued
771
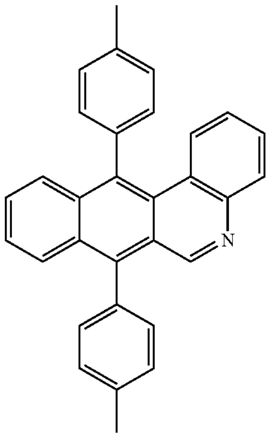
772
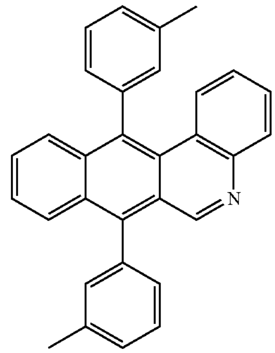
773
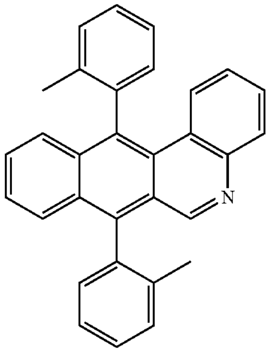
774
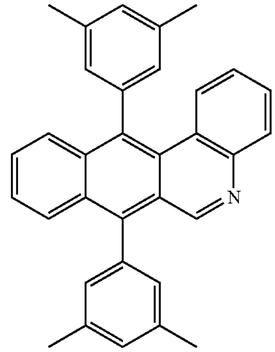
775
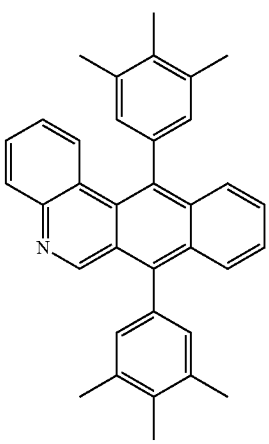
776
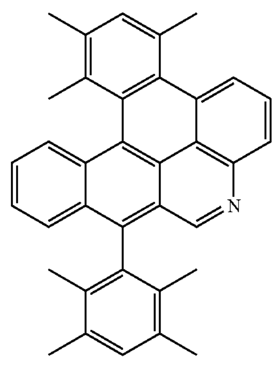
777
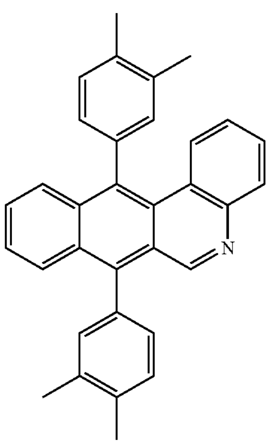
778
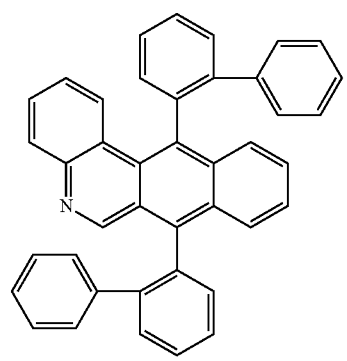

-continued
779
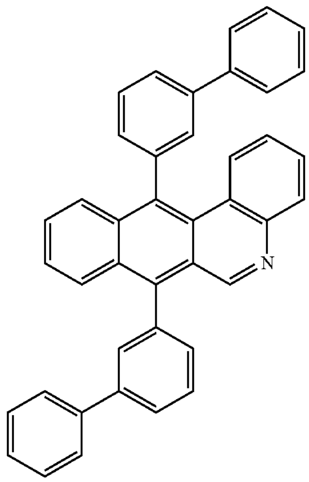
780
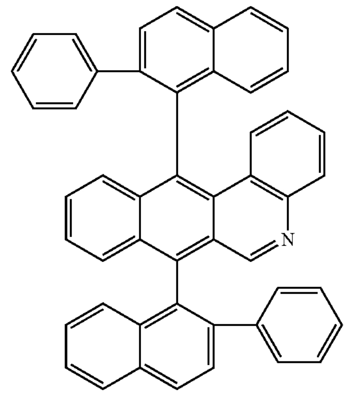
781
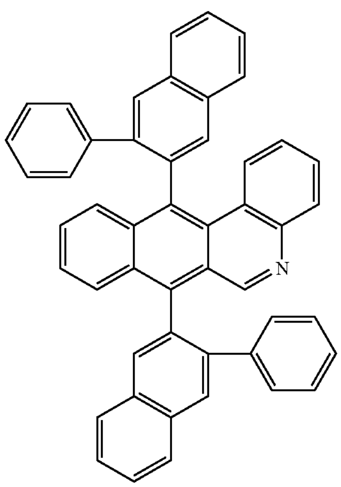
782
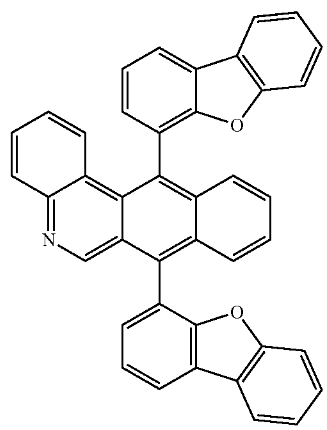
783
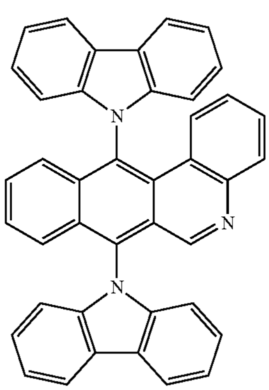
784
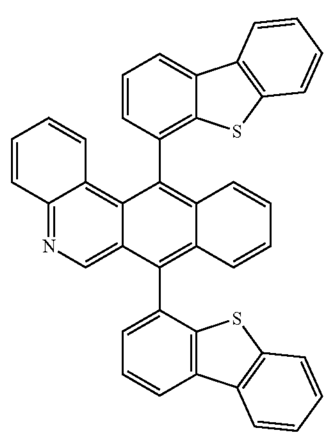

-continued
785
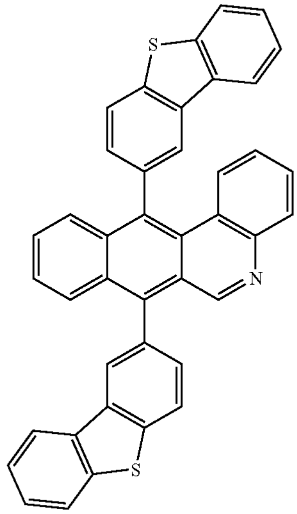
786
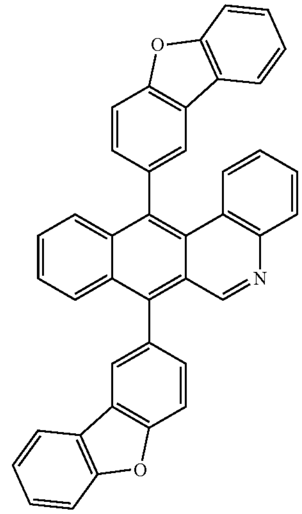
787
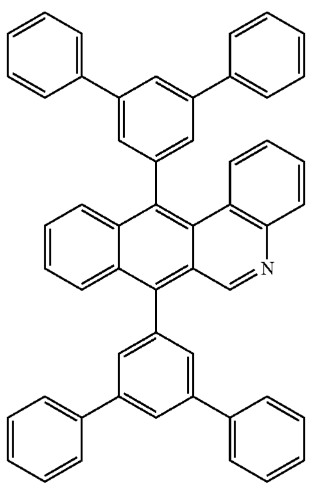
788
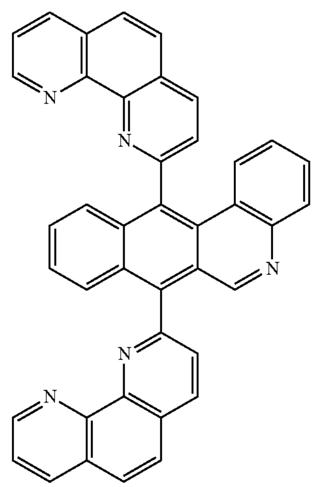
789
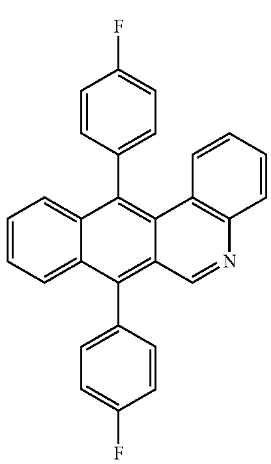
790
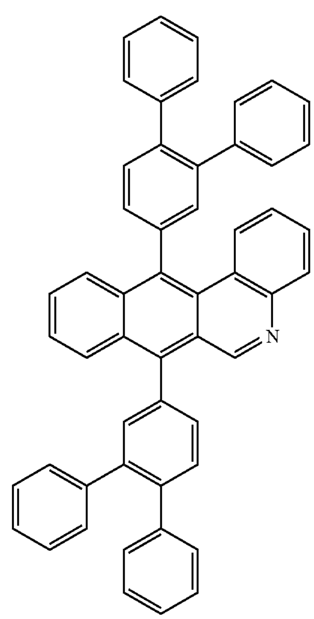

-continued
791
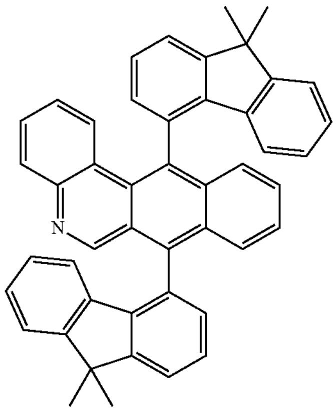
792
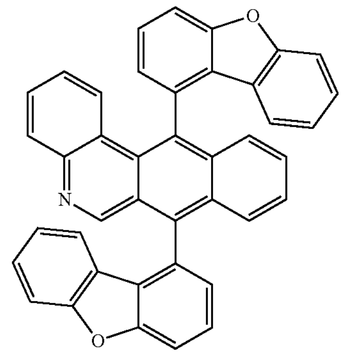
793
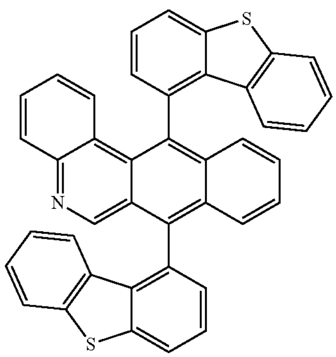
794
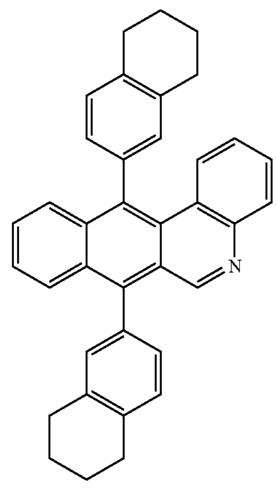
795
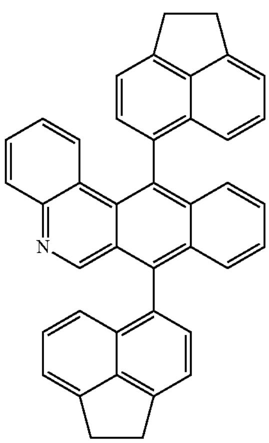
796
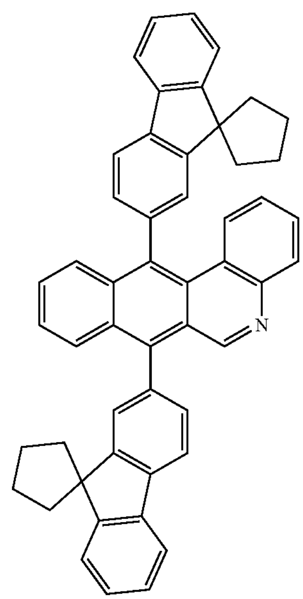

-continued
797
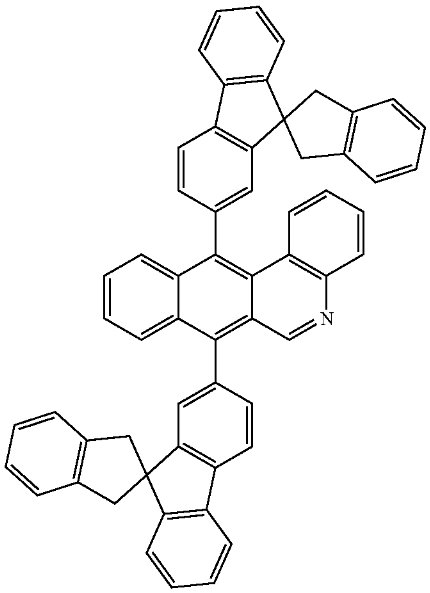
798
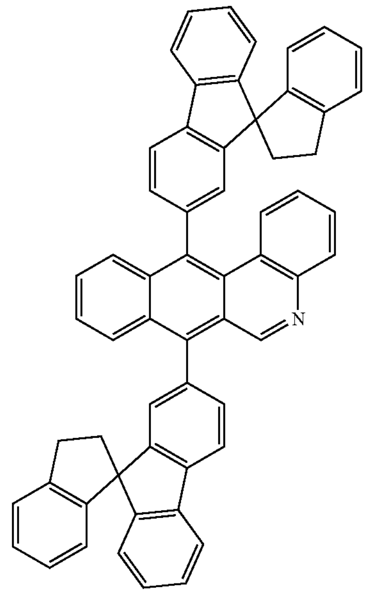
799
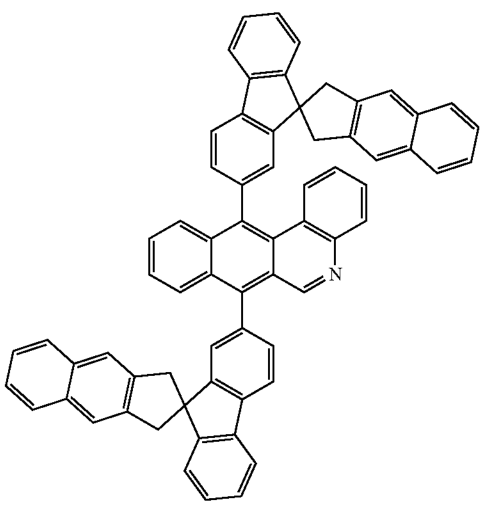
800
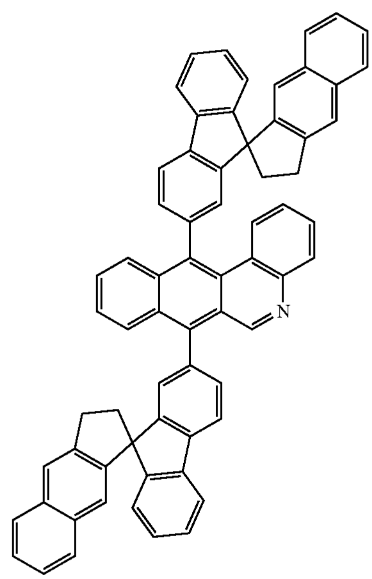

-continued
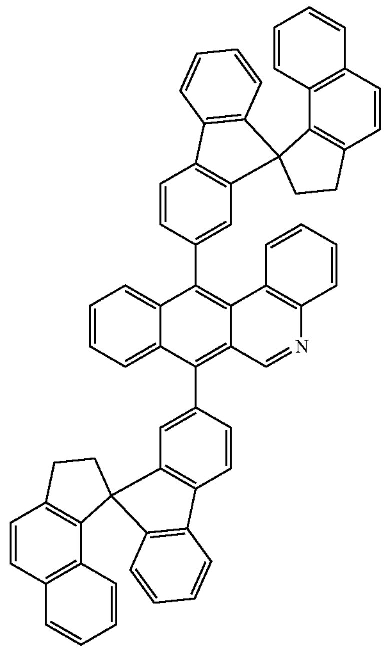
801
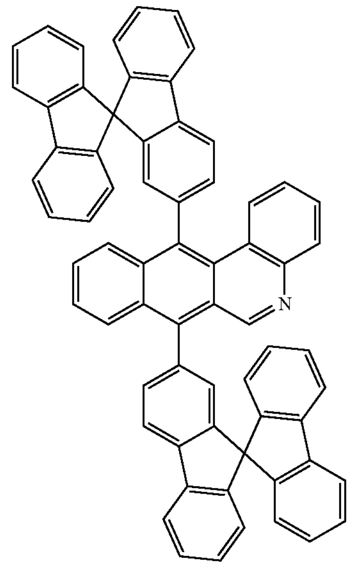
802
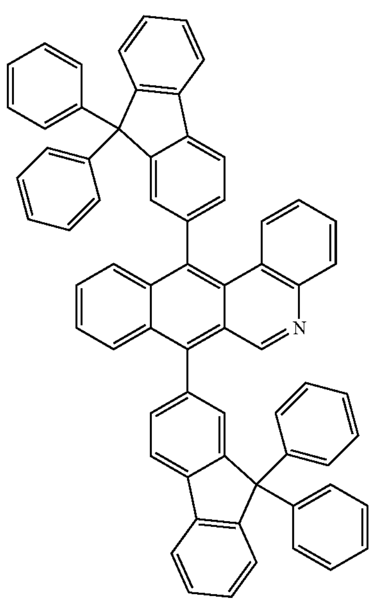
803
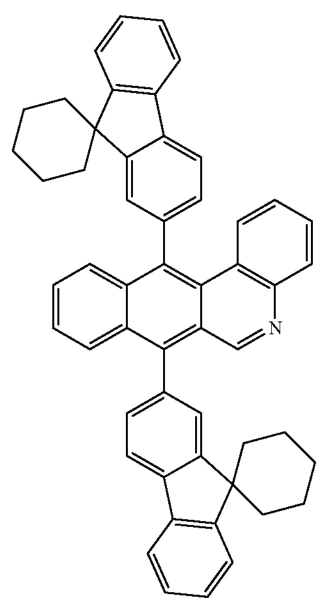
804

-continued
805
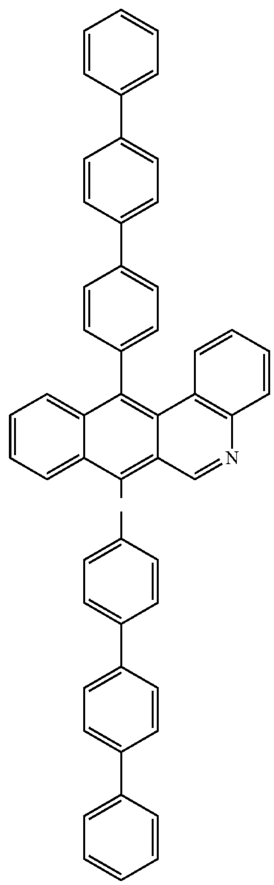
806
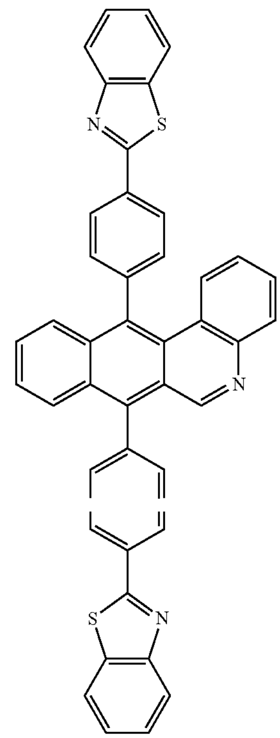
807
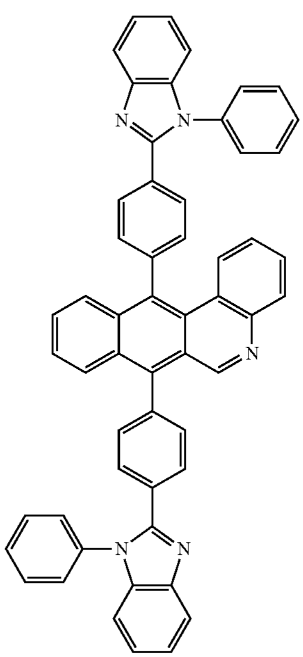
808
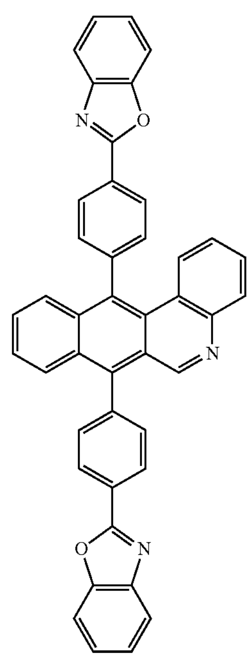

-continued
809
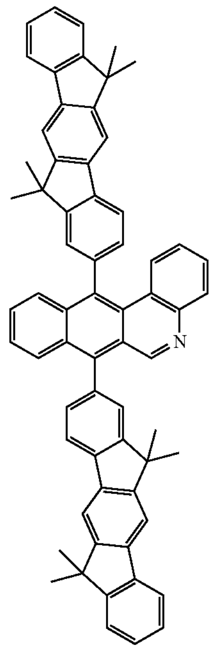
810
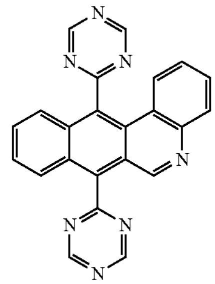
811
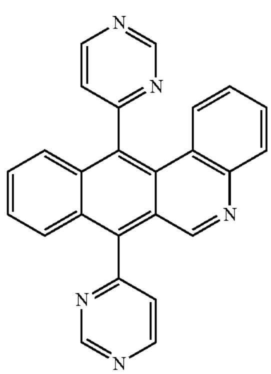
812
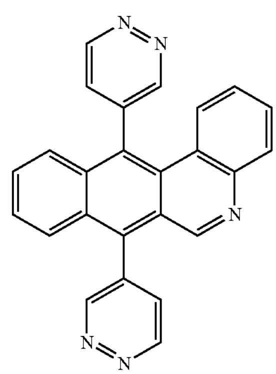
813
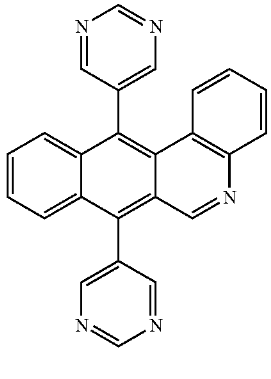
814
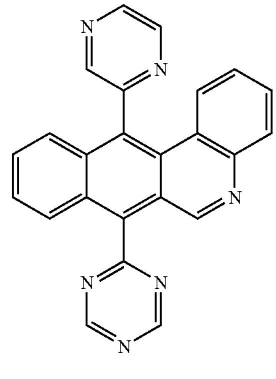

-continued
815
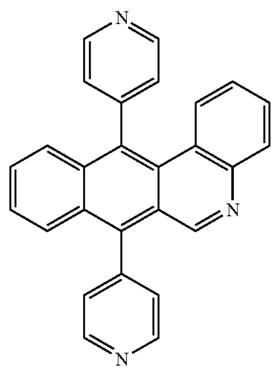
816
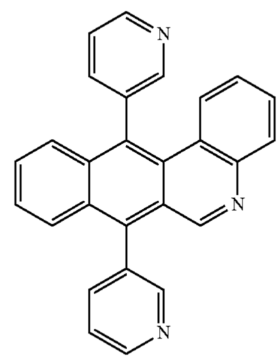
817
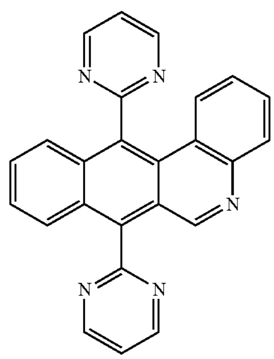
818
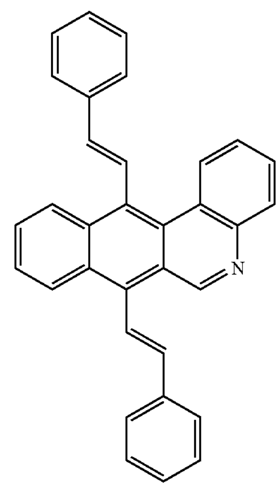
819
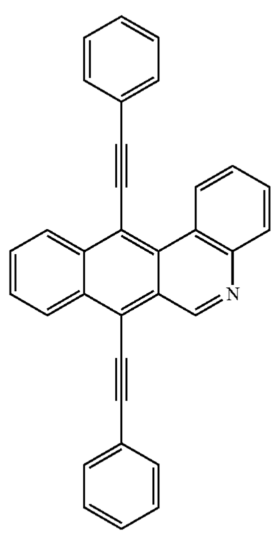
820
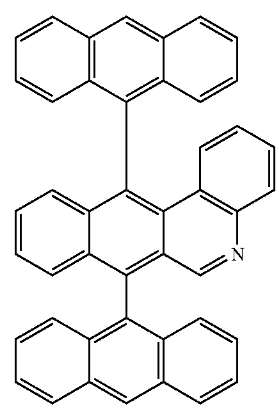

-continued
821
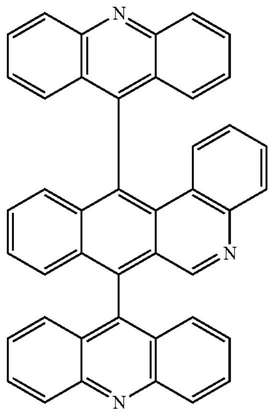
822
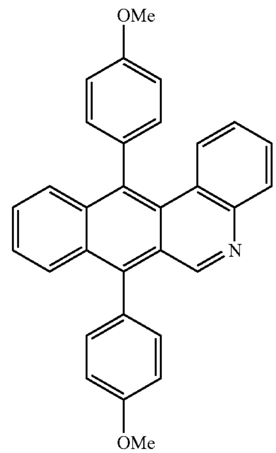
823
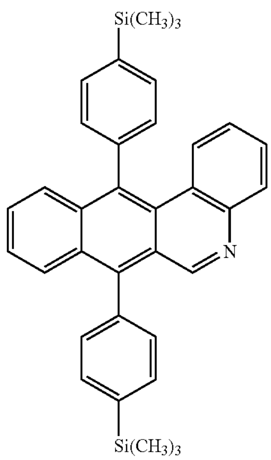
824
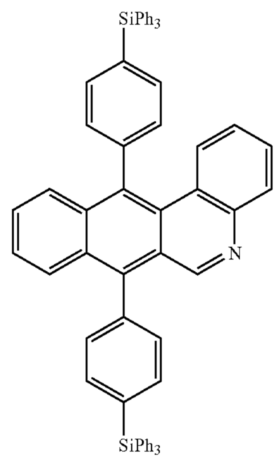
825
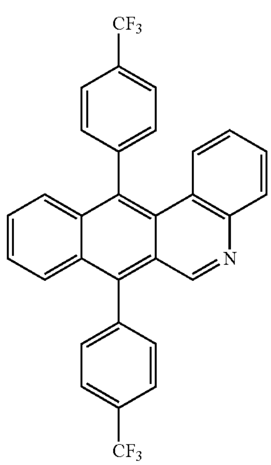
826
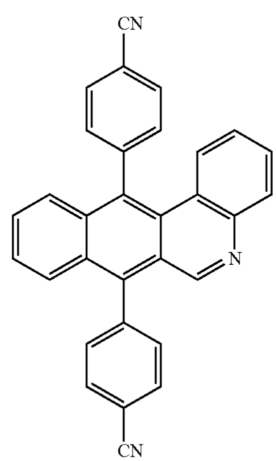

-continued
927
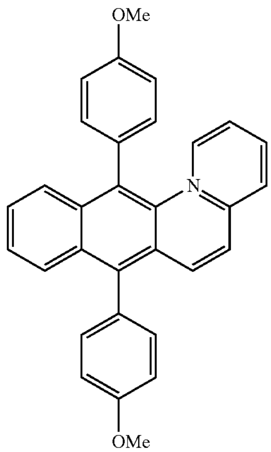
828
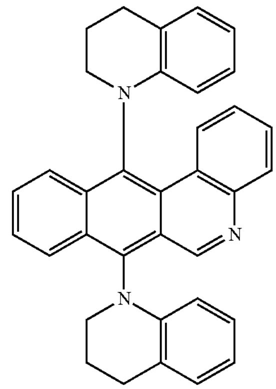
829
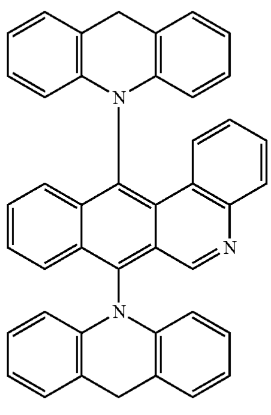
830
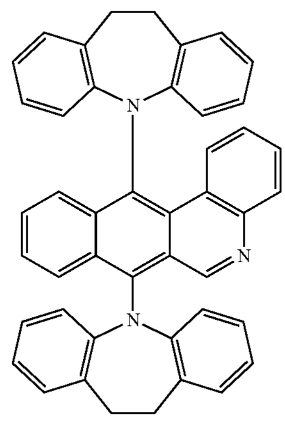
831
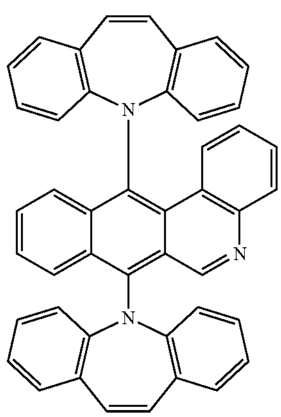
832
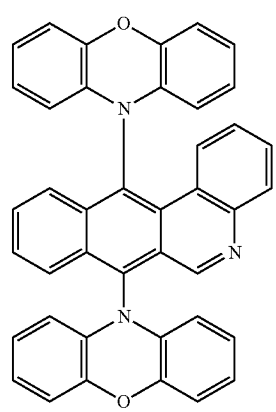

-continued
833
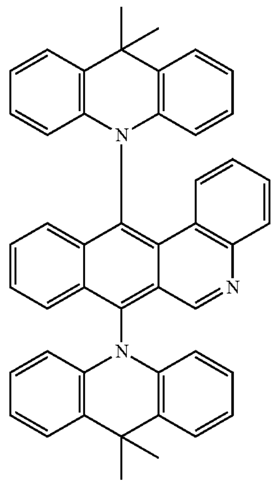
834
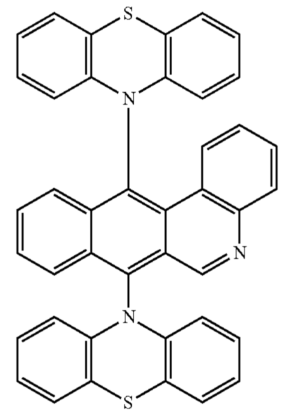
835
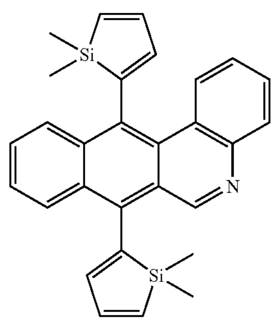
836
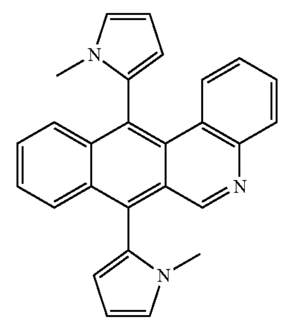
837
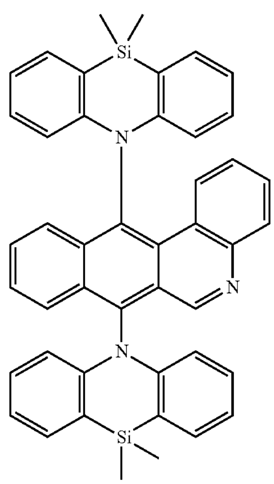
838
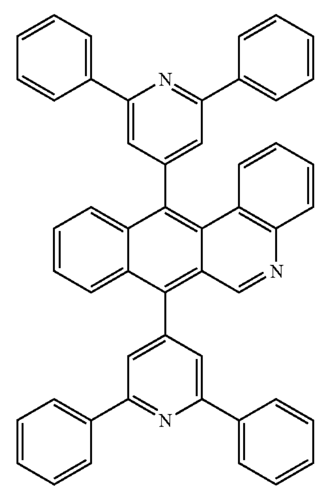

-continued
839
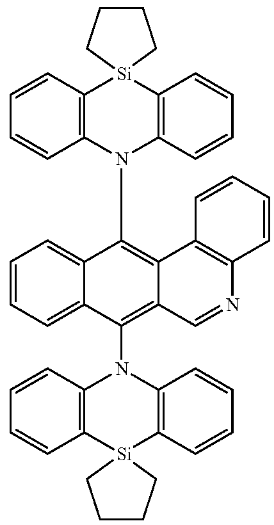
840
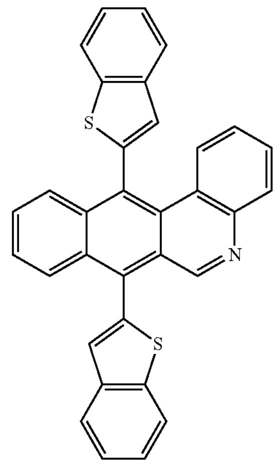
841
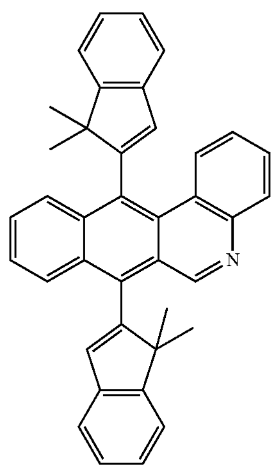
842
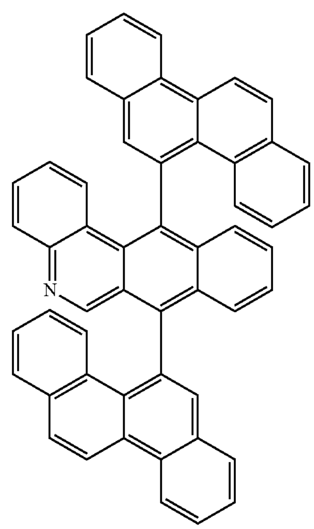
843
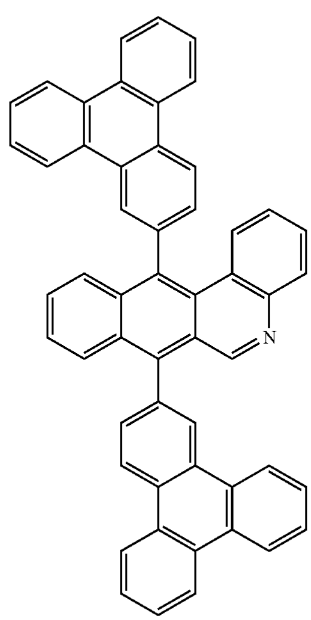
844
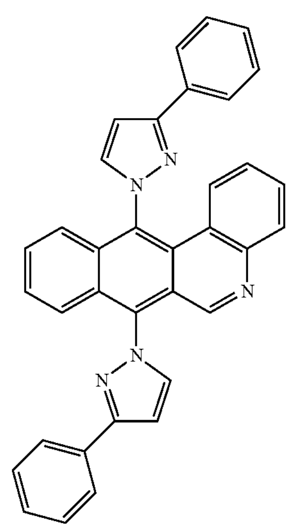

-continued
845
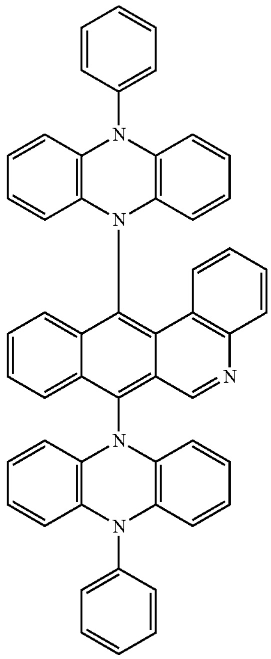
846
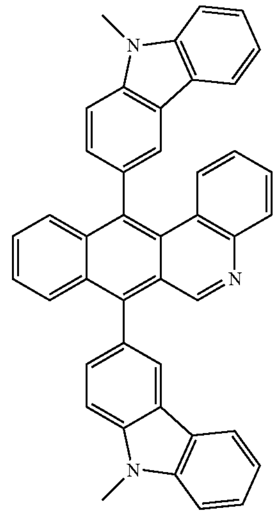
847
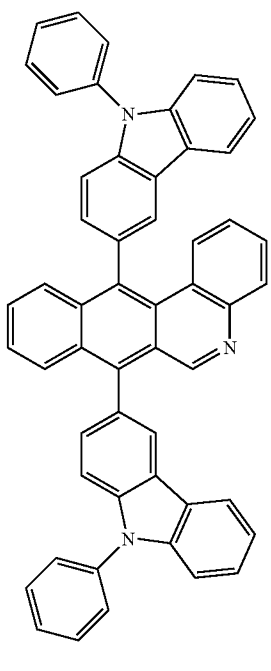
848
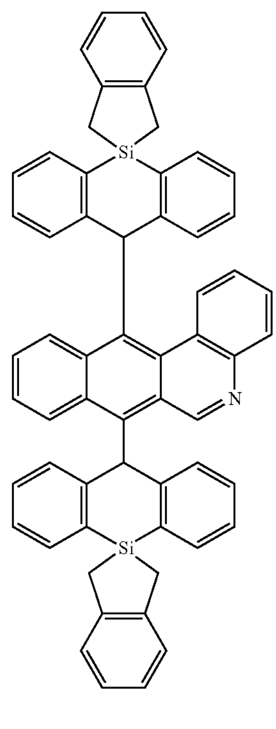

-continued
849
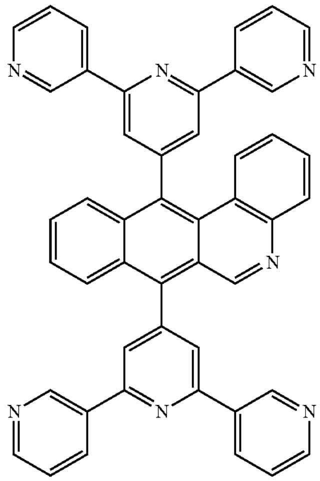
850
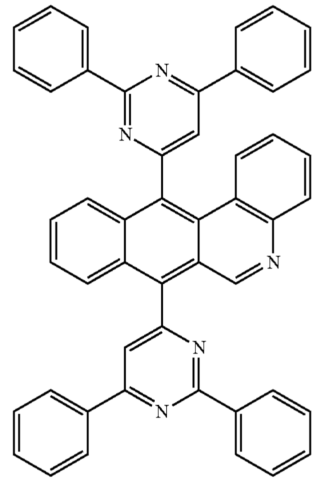
851
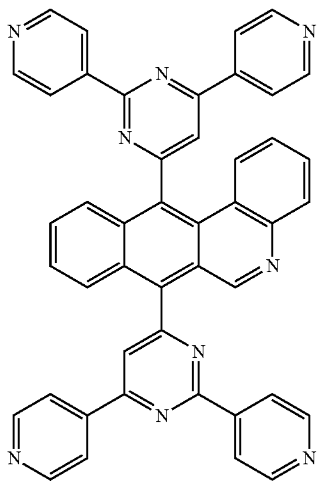
852
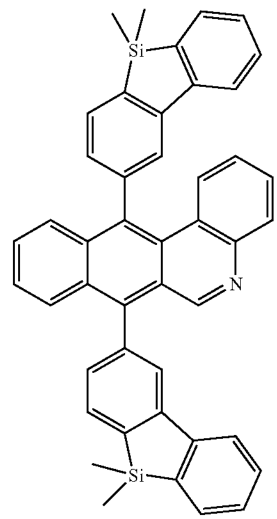
853
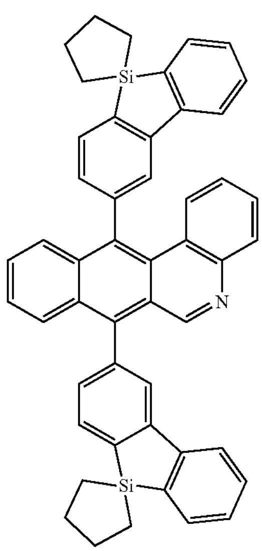
854
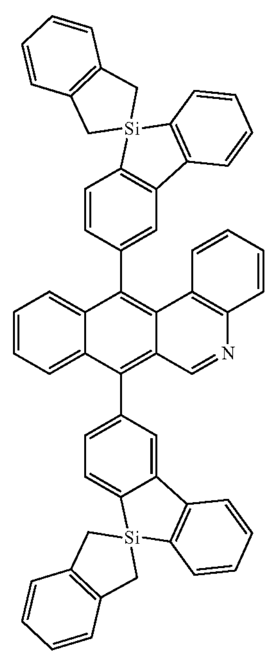

-continued
855
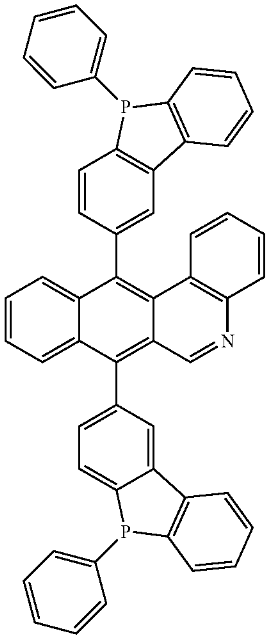
856
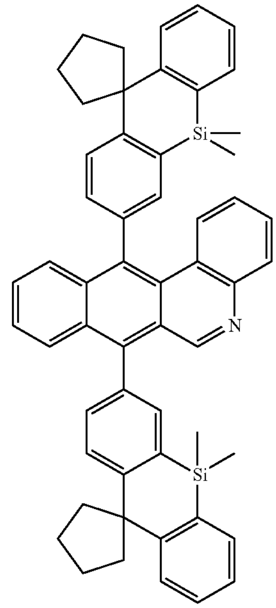
857
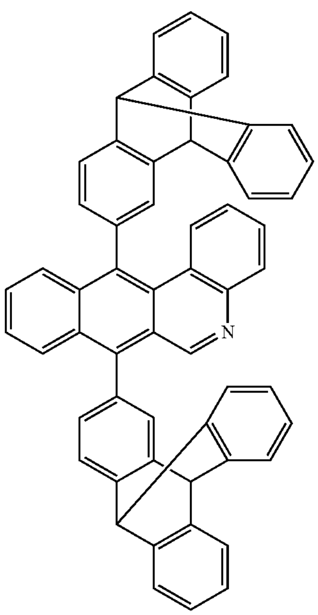
858
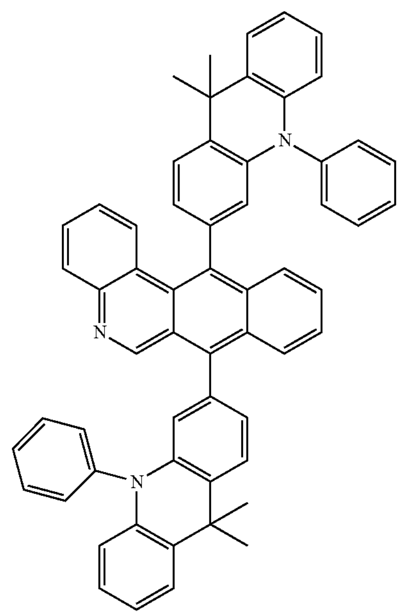

-continued
859
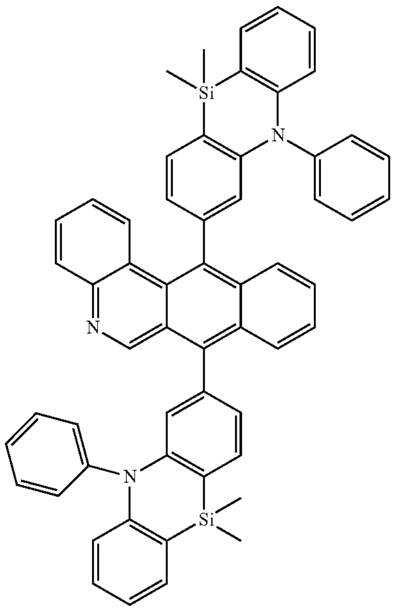
860
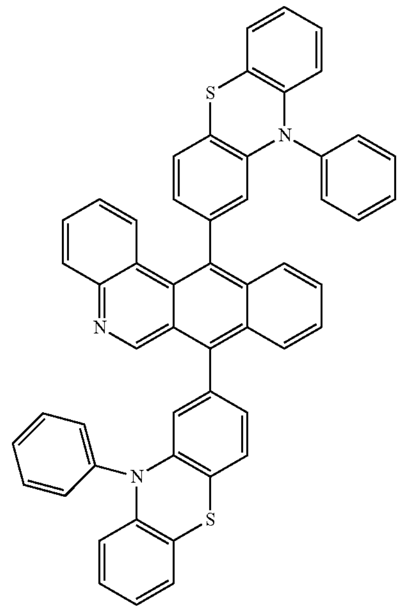
861
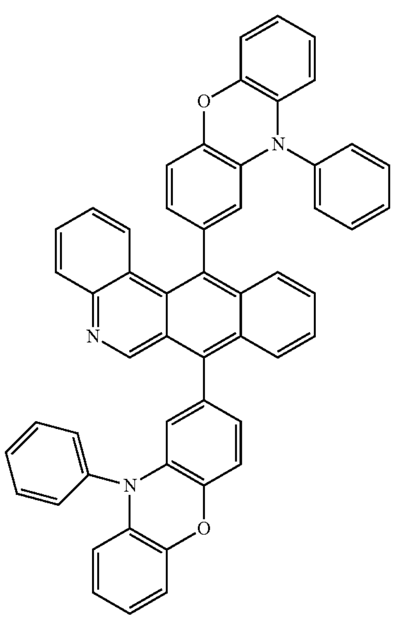
862
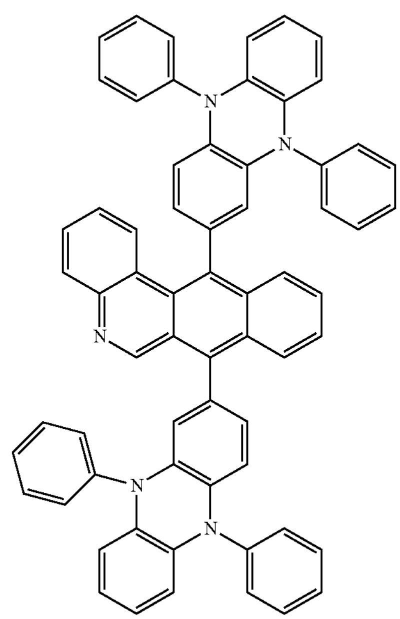

-continued
863
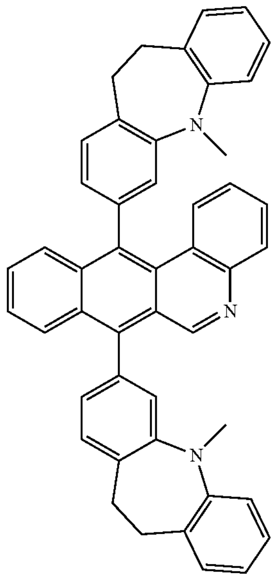
864
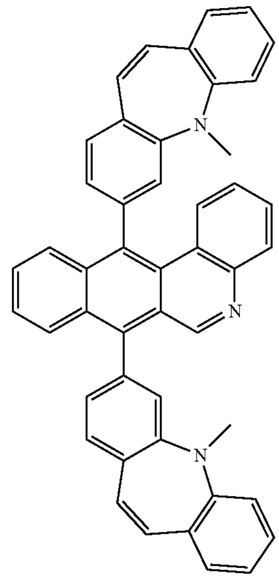
865
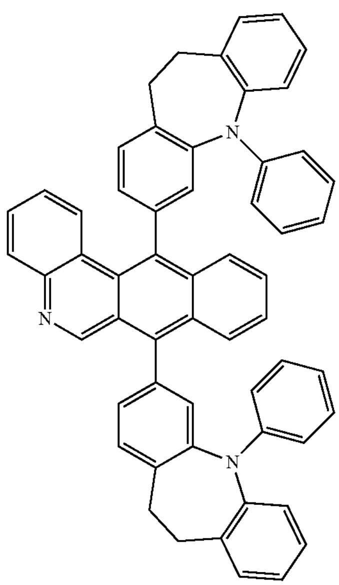
866
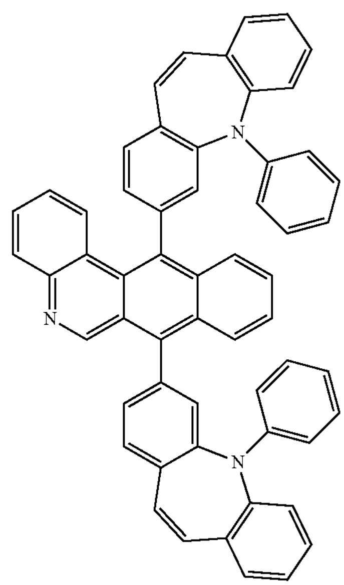

-continued
867
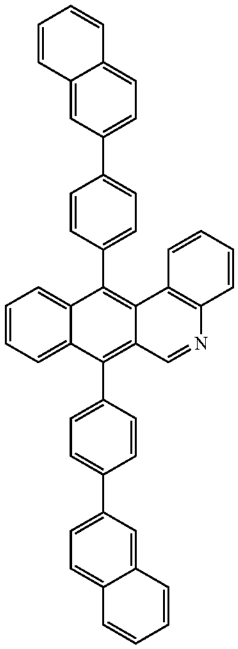
868
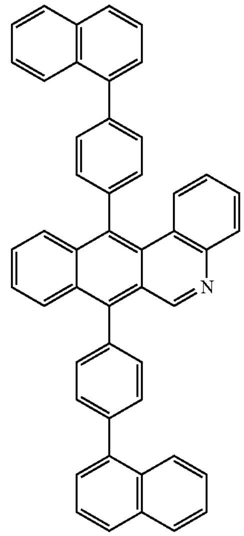
869
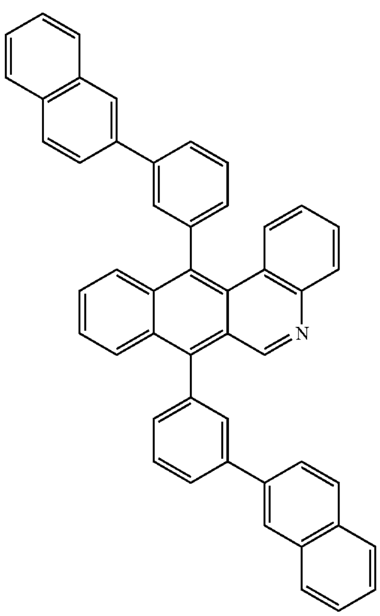
870
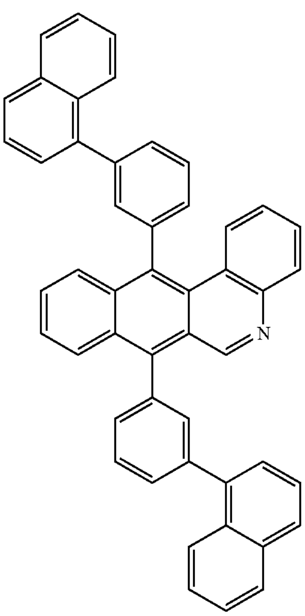

-continued
871
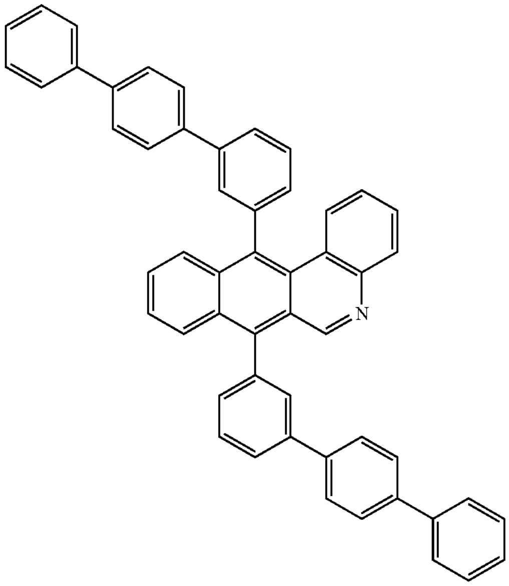
872
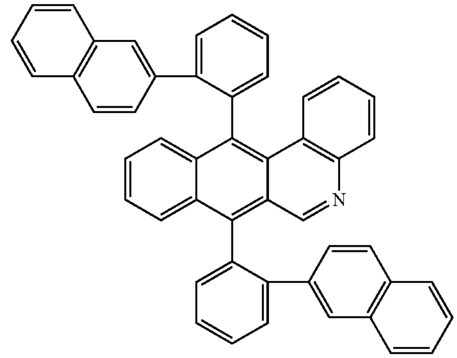
873
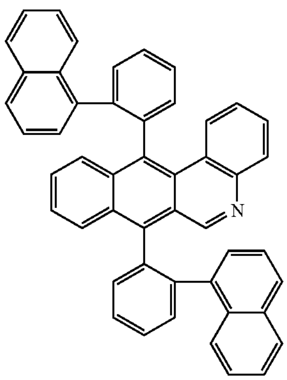
874
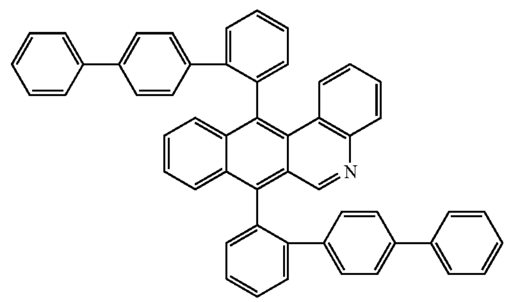
875
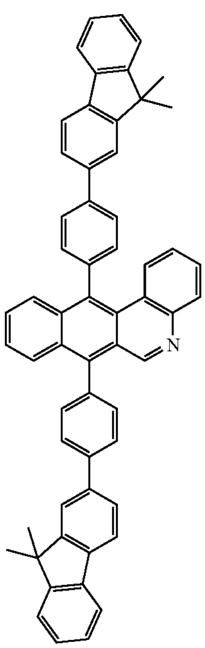
876
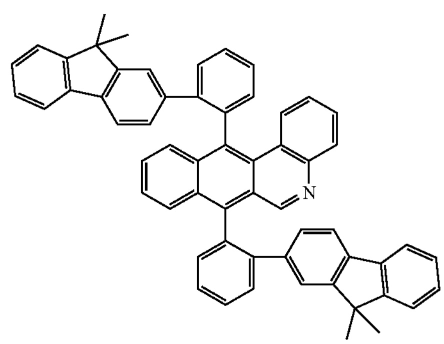

-continued
877
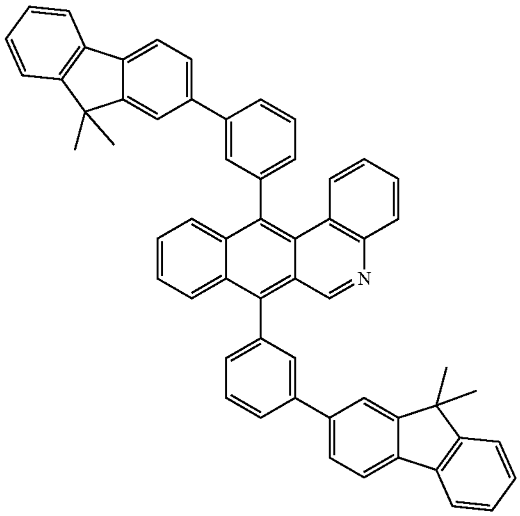
878
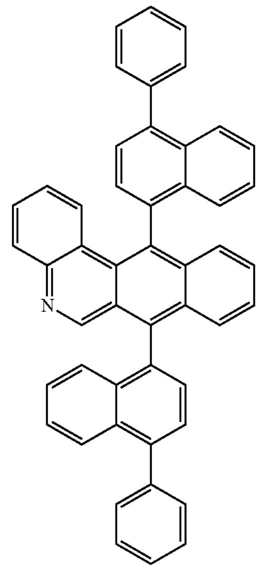
879
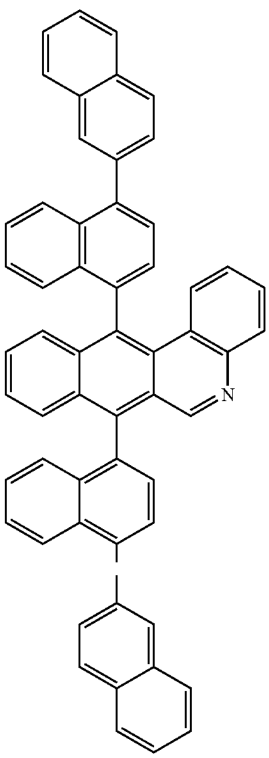
880
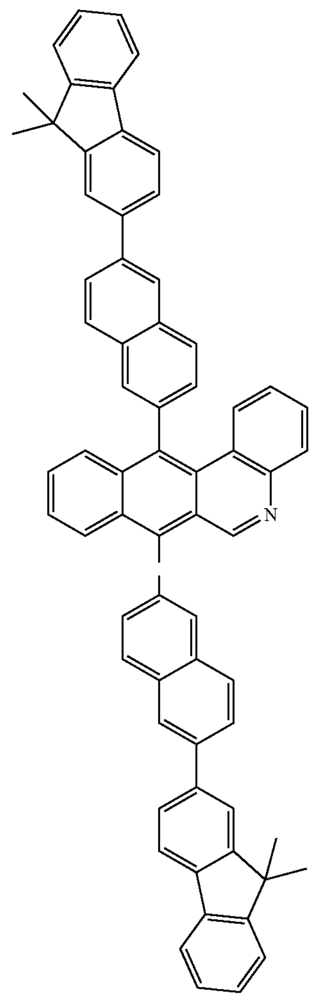

-continued
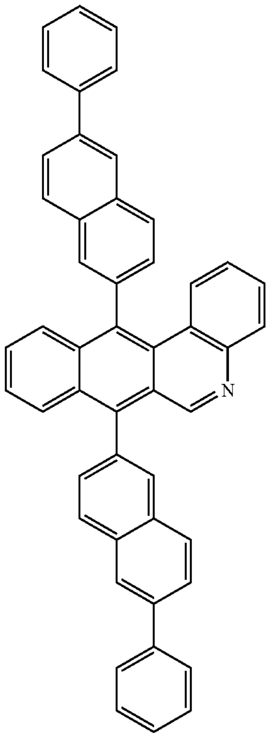
881
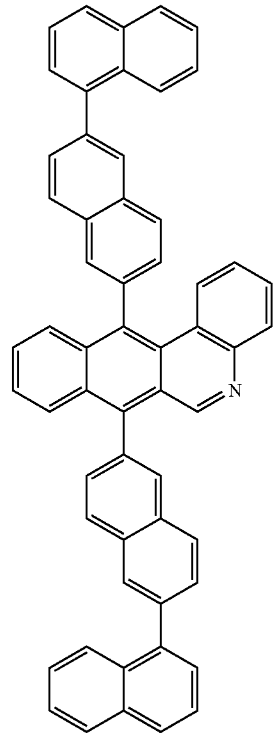
882
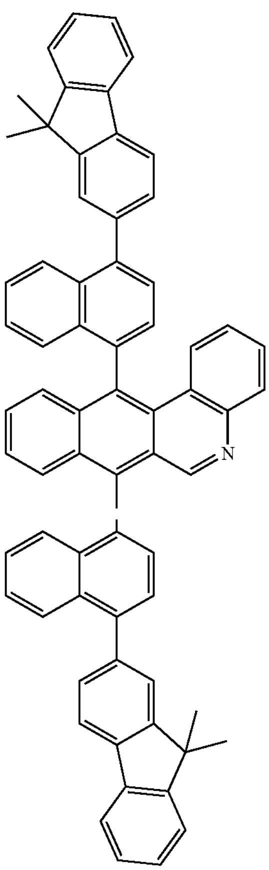
883
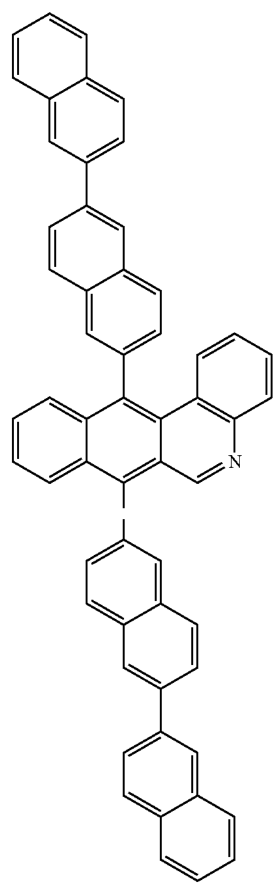
884

-continued
885
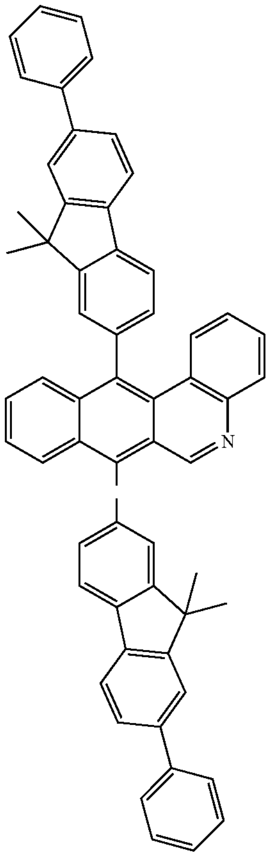
886
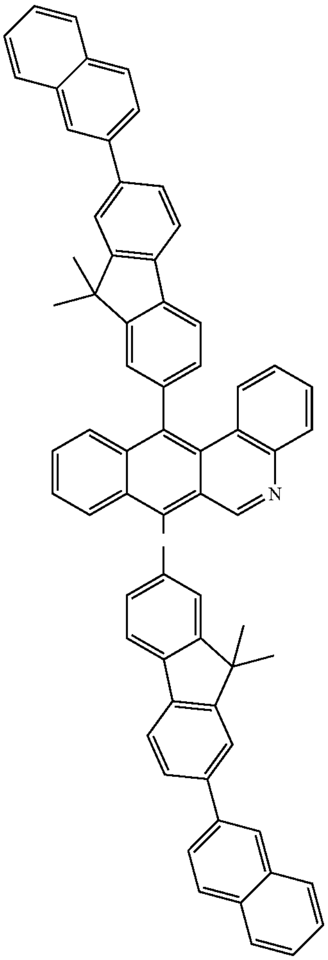
887
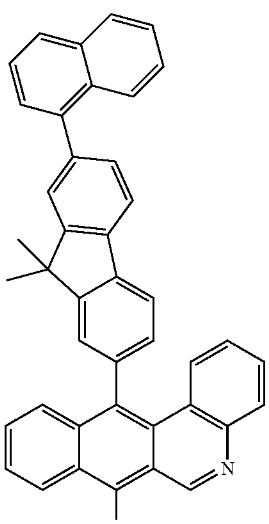
888
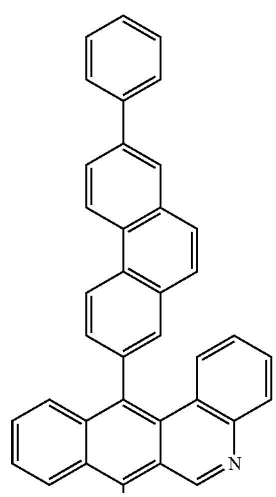

-continued
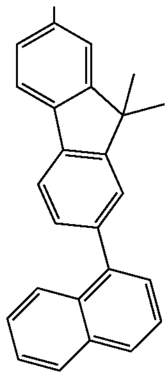
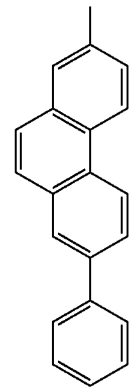
889
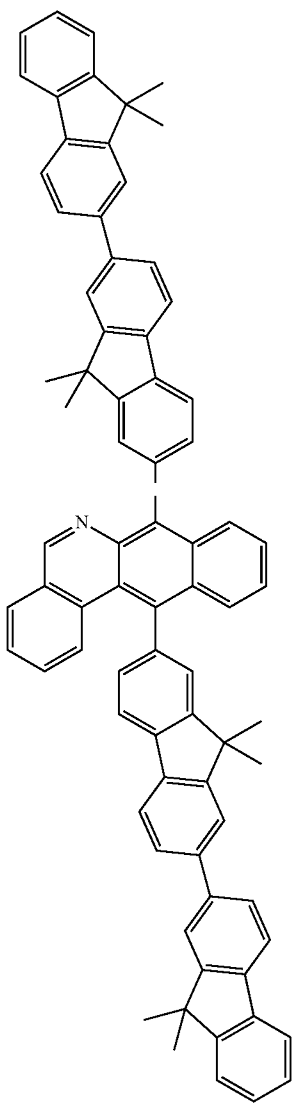

-continued
890
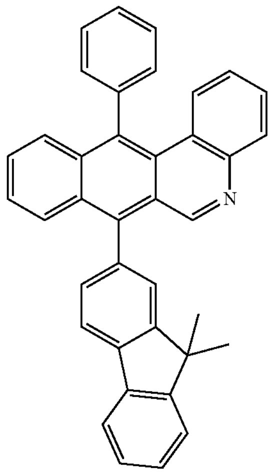
891
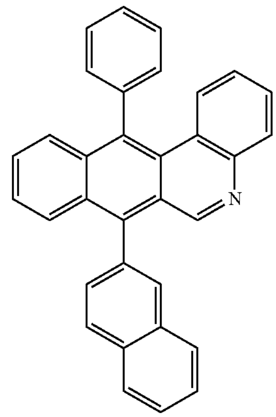
892
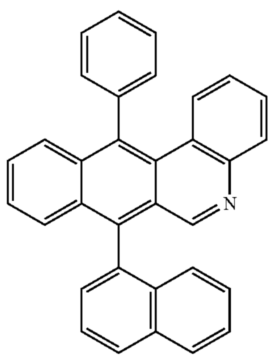
893
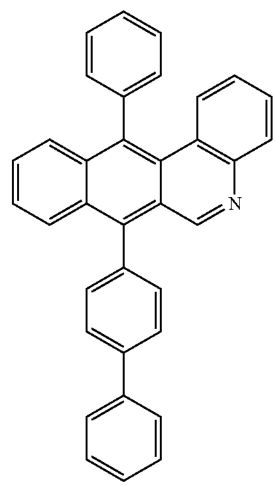
894
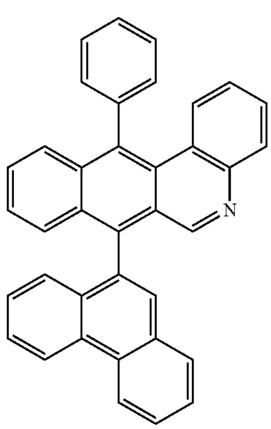
895
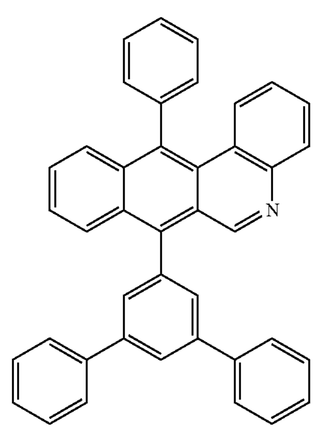

-continued
896
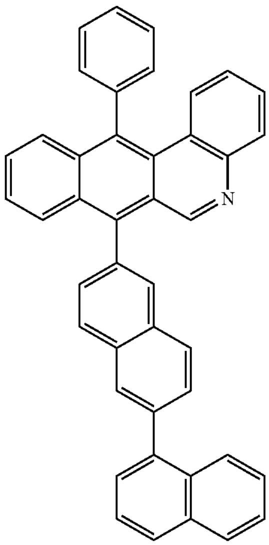
897
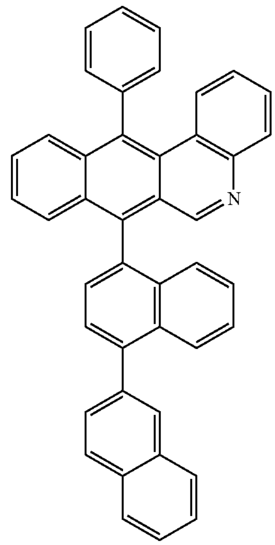
898
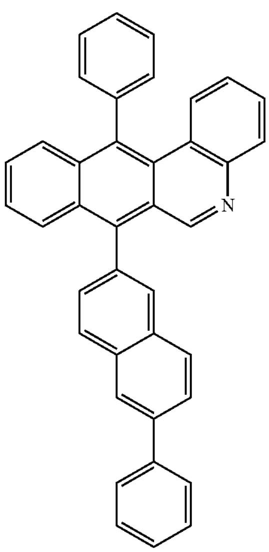
899
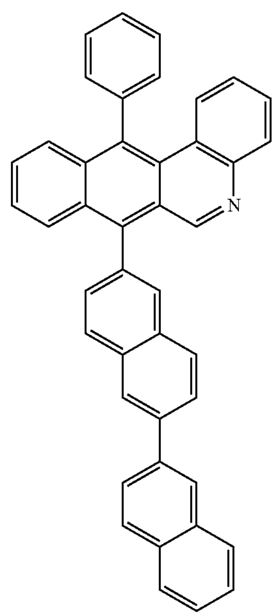

-continued
900
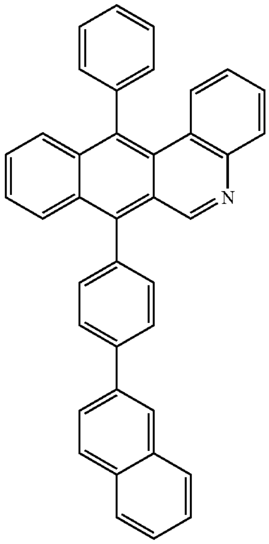
901
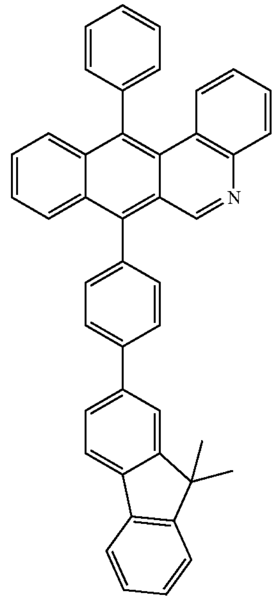
902
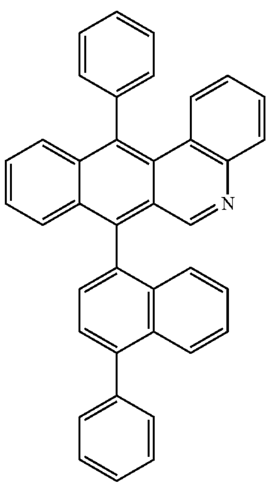
903
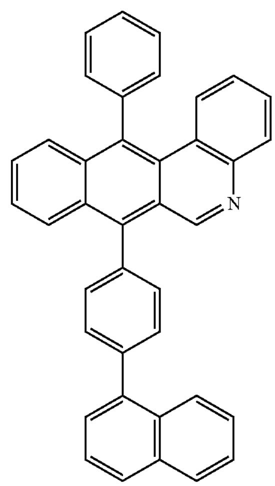
904
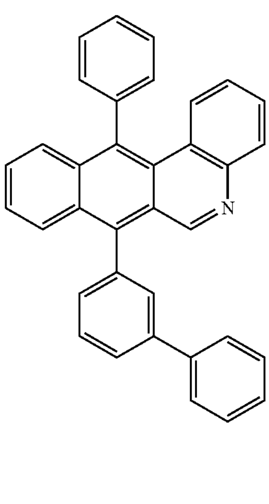
905
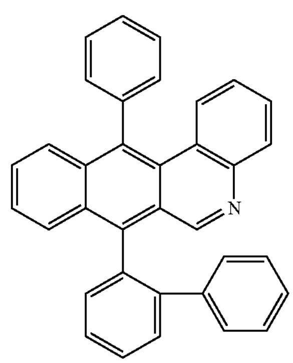

-continued
906
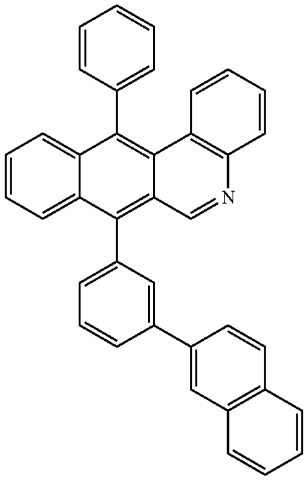
907
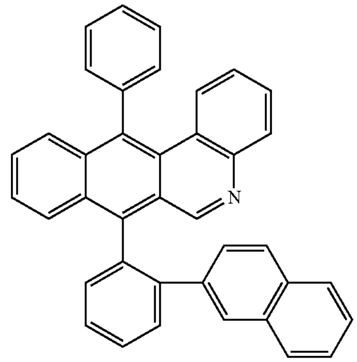
908
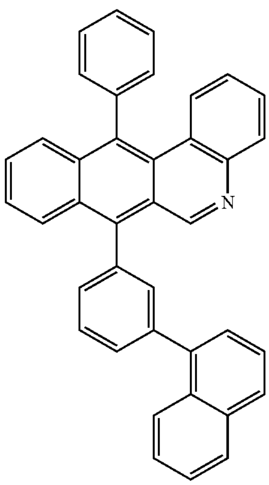
909
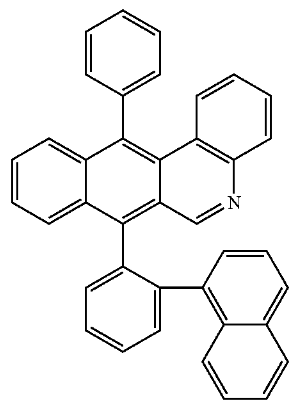
910
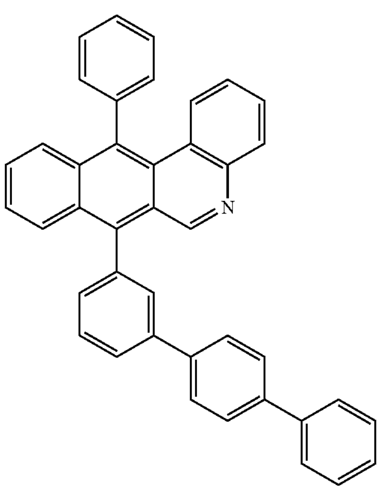
911
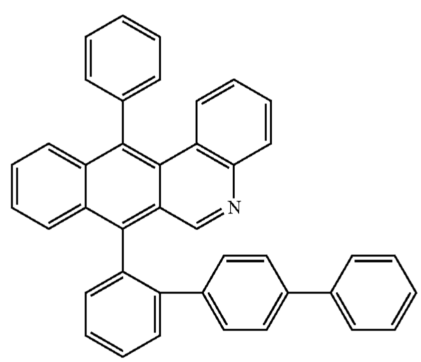

-continued
912
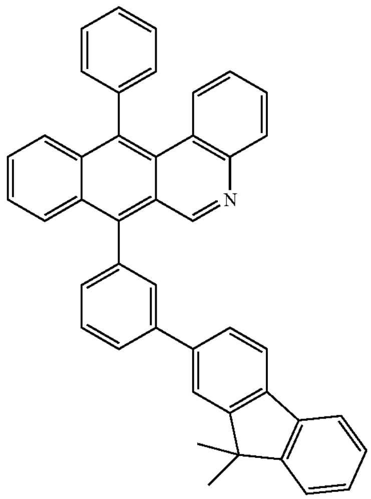
913
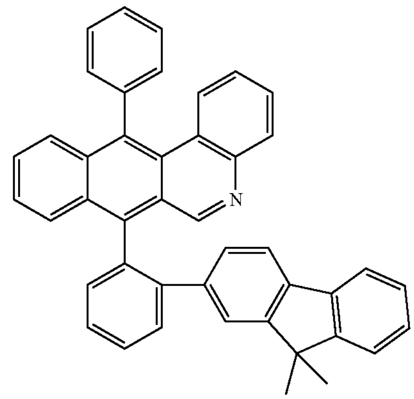
914
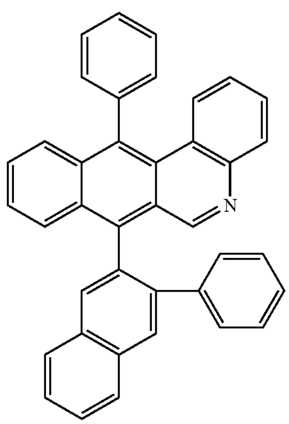
915
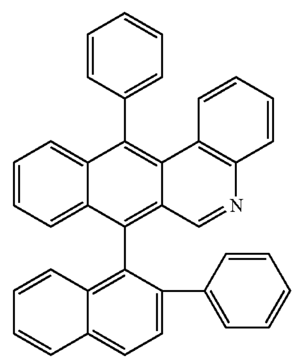
916
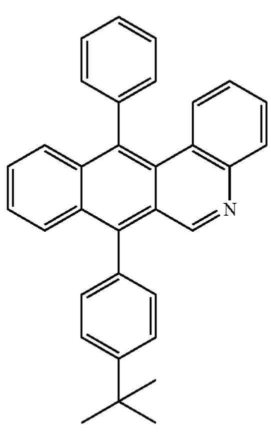
917
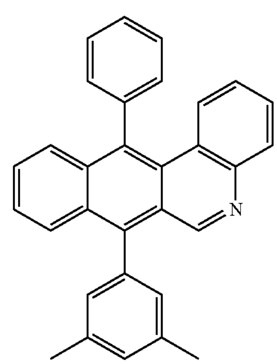

-continued
918
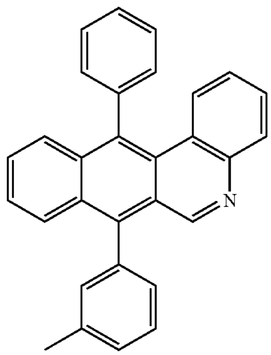
919
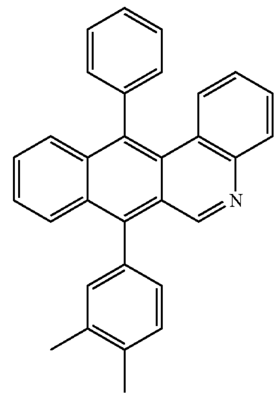
920
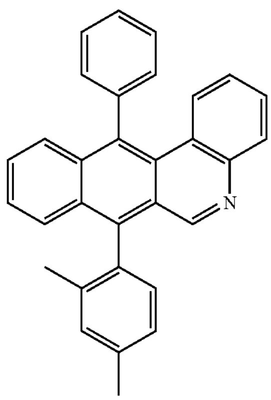
921
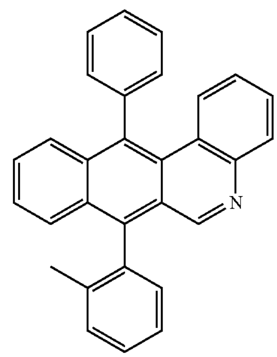
922
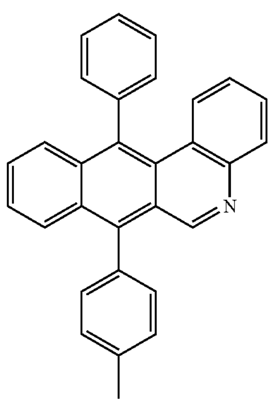
923
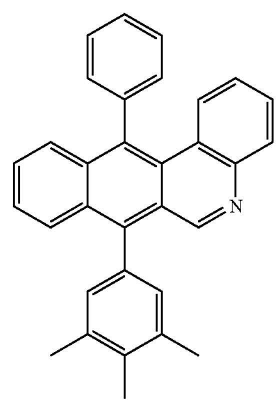
924
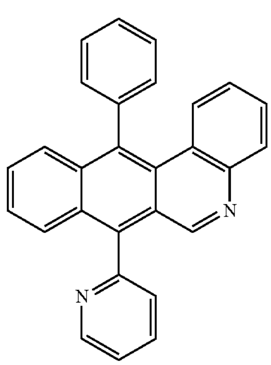
925
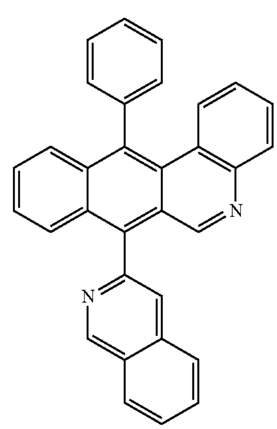

-continued
926
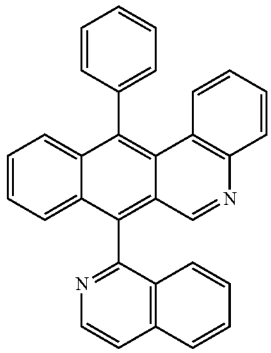
927
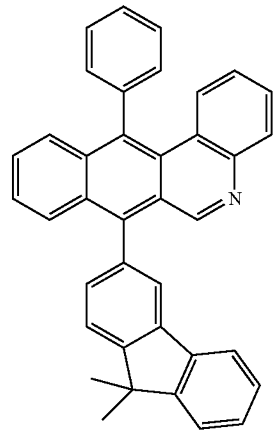
928
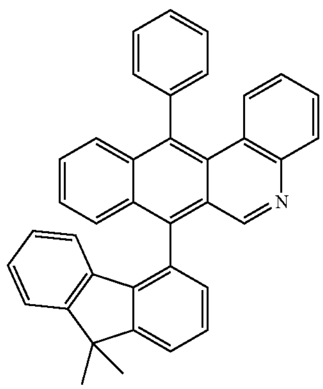
929
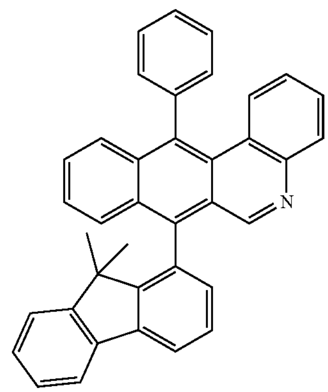
930
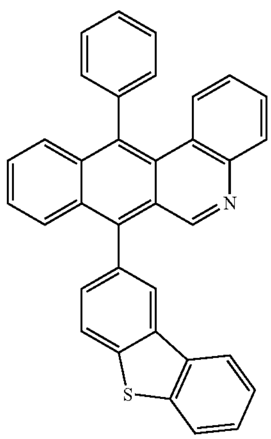
931
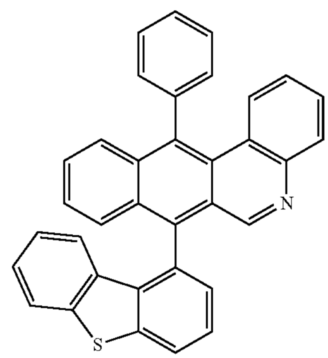
932
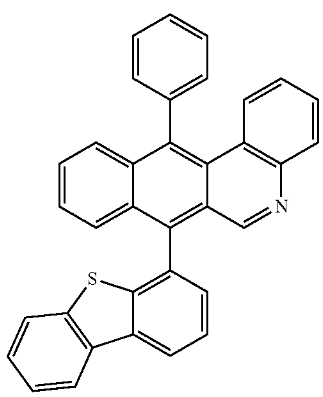
933
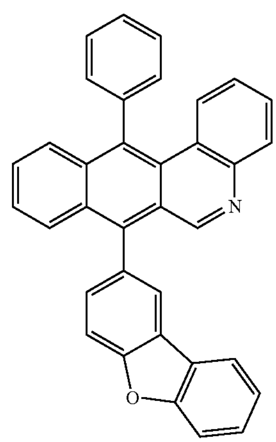

-continued
934
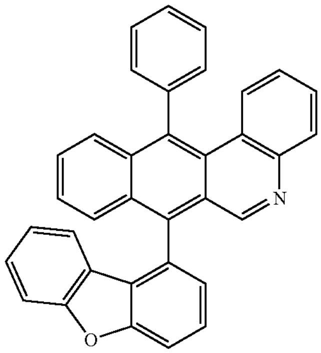
935
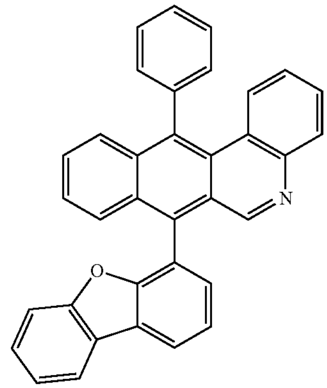
936
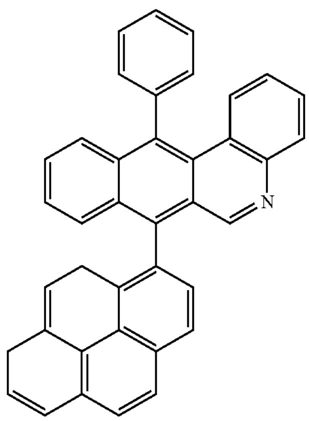
937
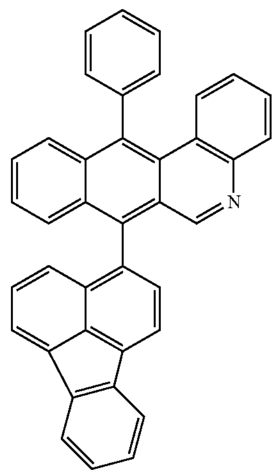
938
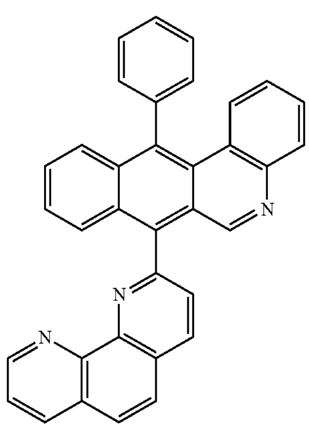
939
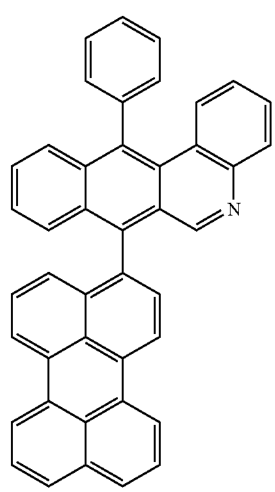

-continued
940
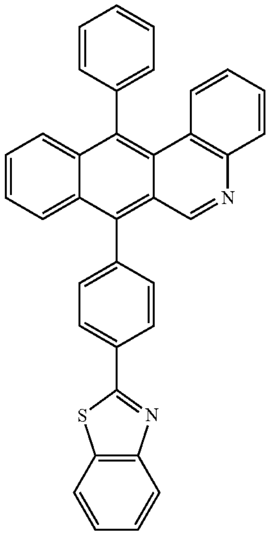
941
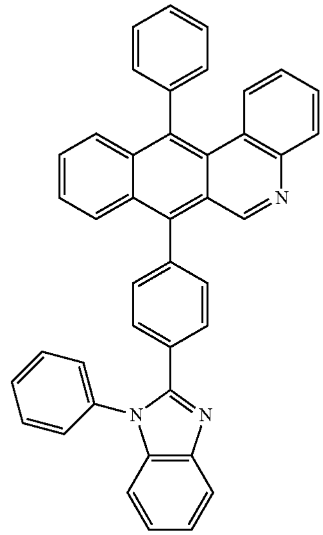
942
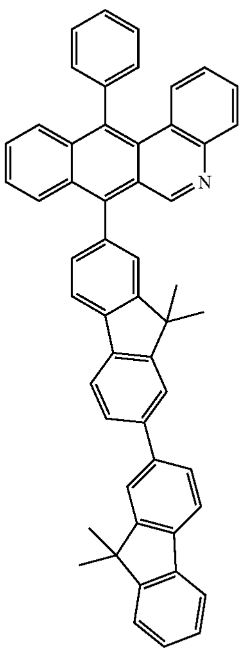
943
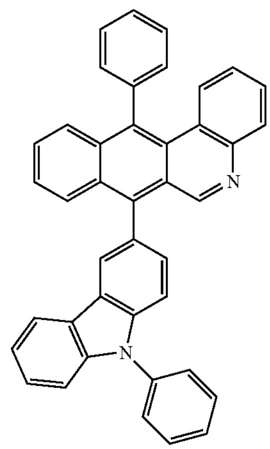
944
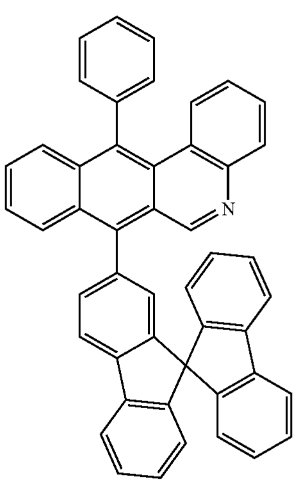
945
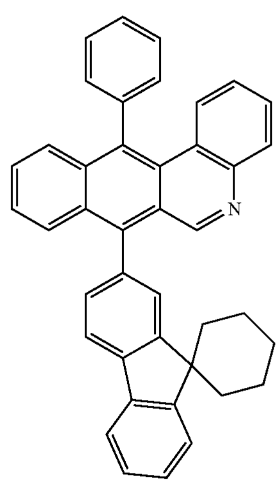

-continued
946
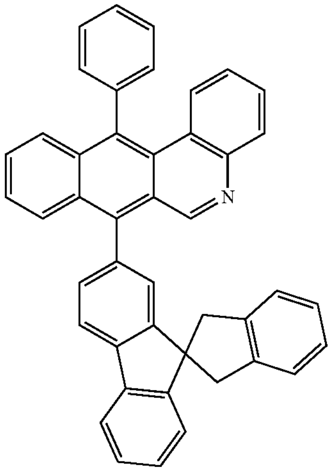
947
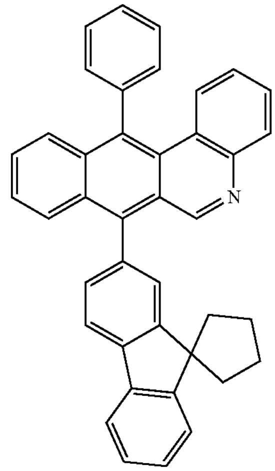
948
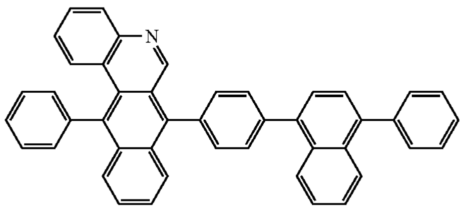
949
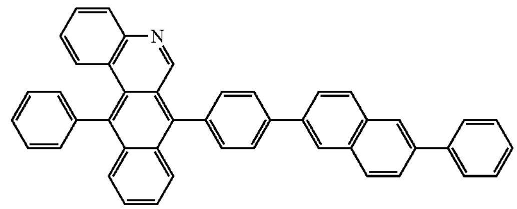
950
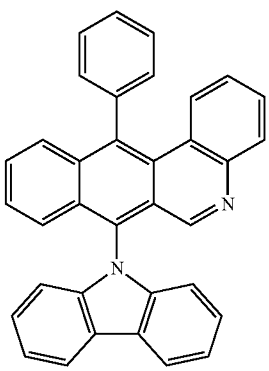
951
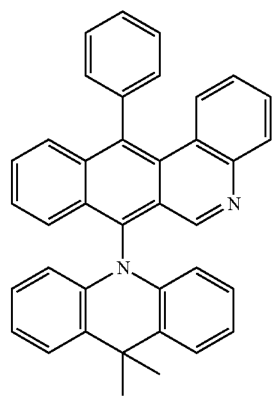
952
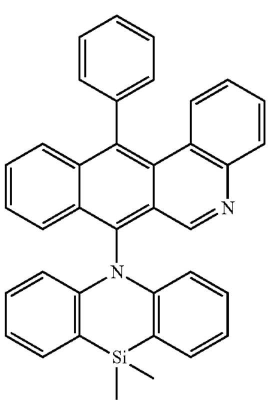
953
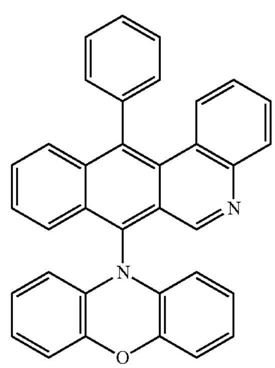

-continued
954
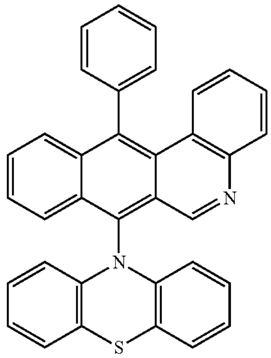
955
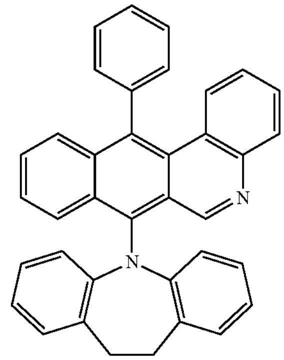
956
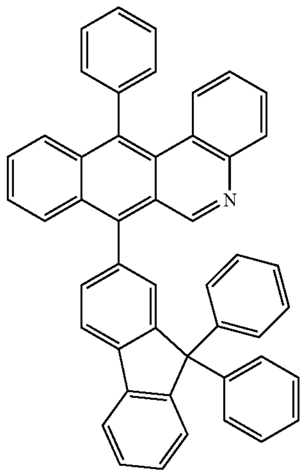
957
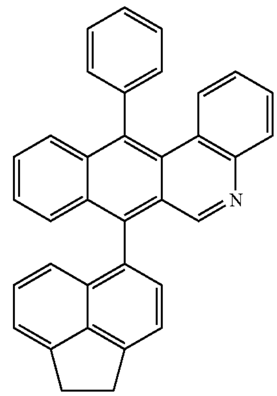
958
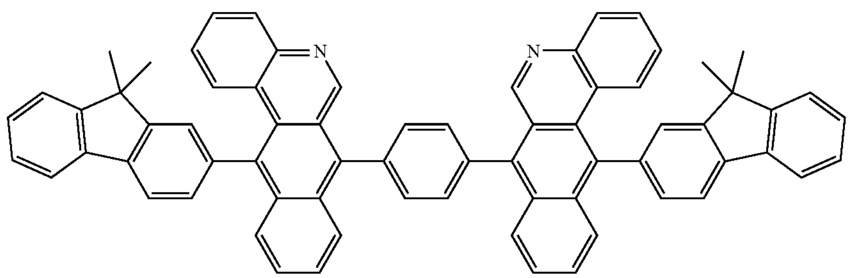
959
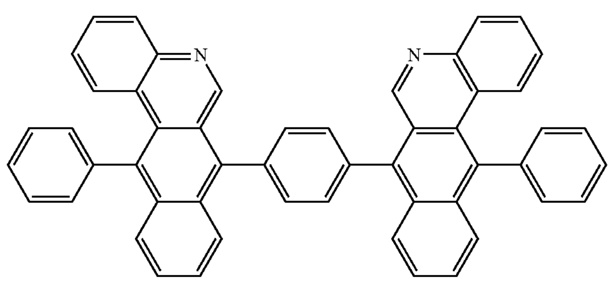
960
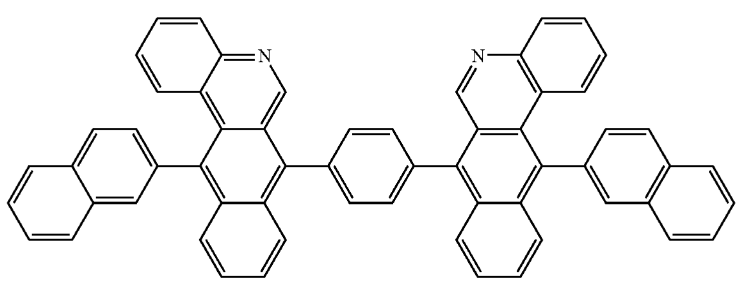

-continued
961
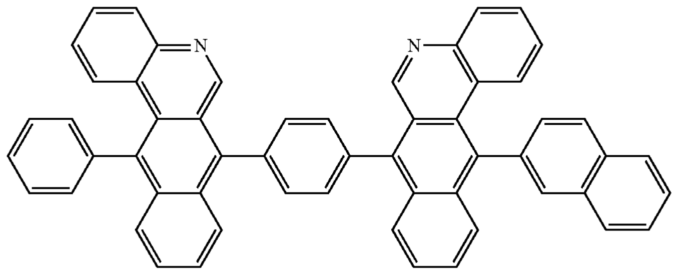
962
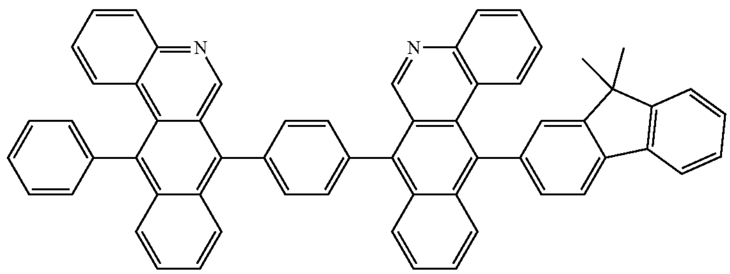
963
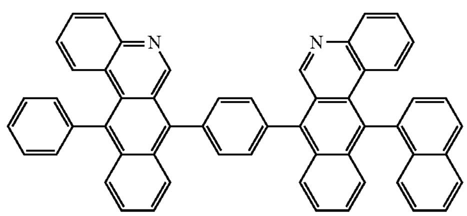
964
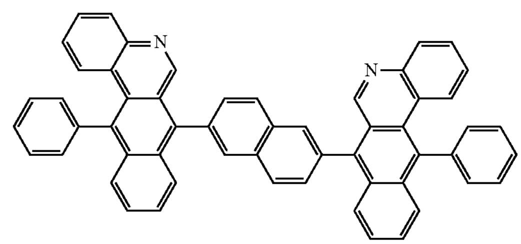
965
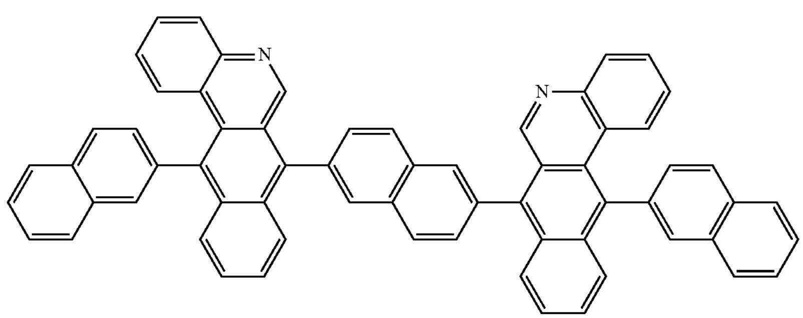
966
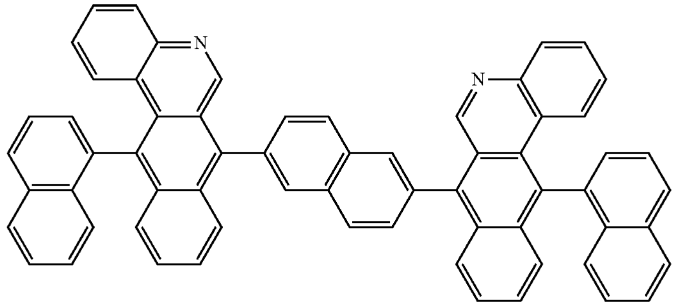

-continued
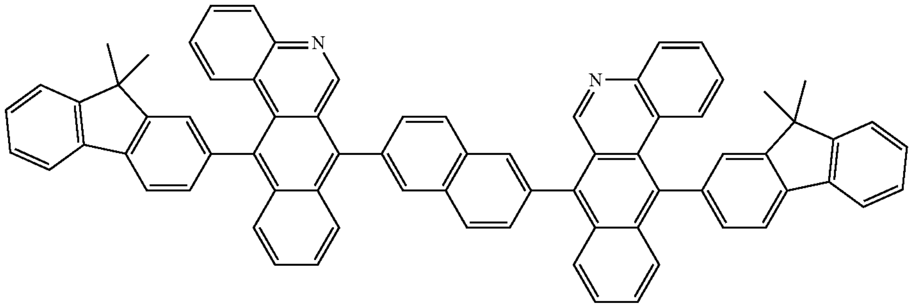
967
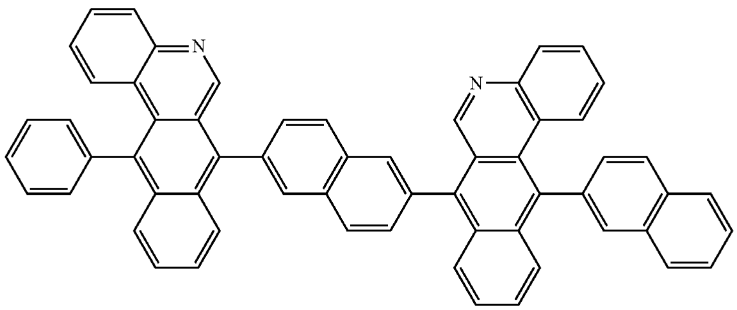
968
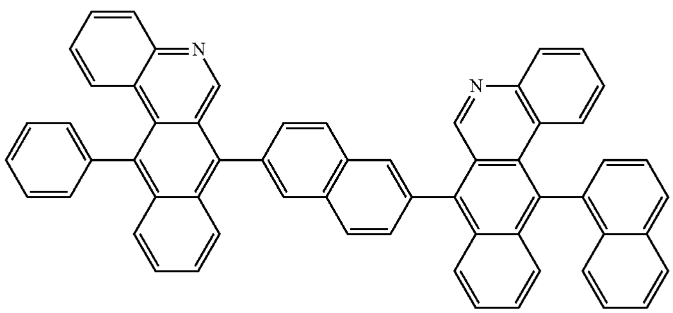
969
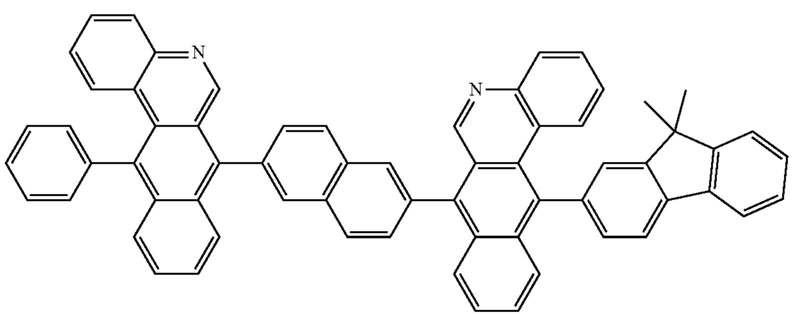
970
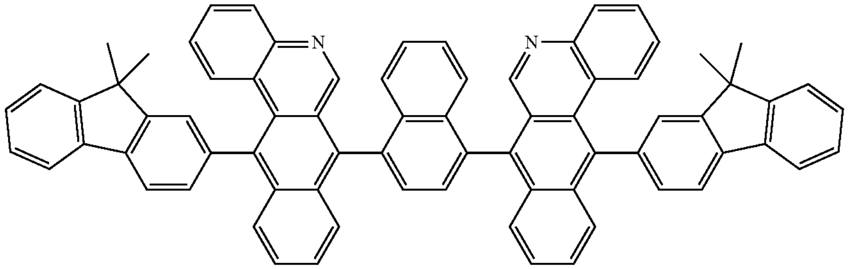
971

-continued
972
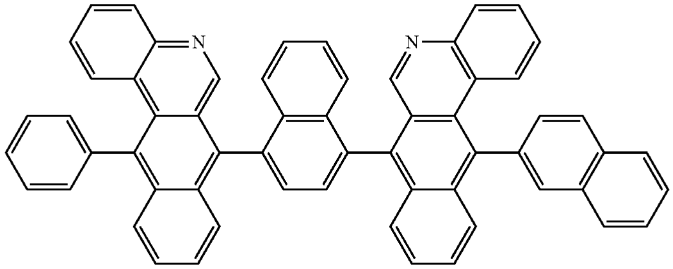
973
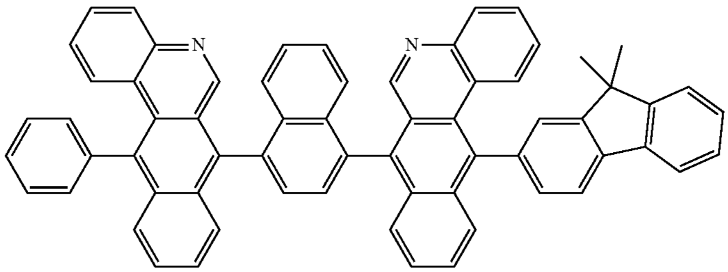
974
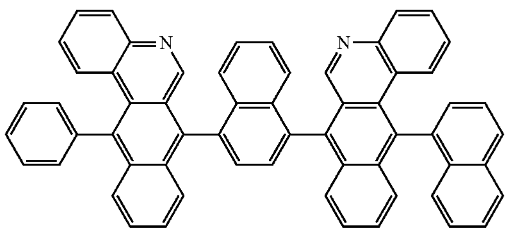
975
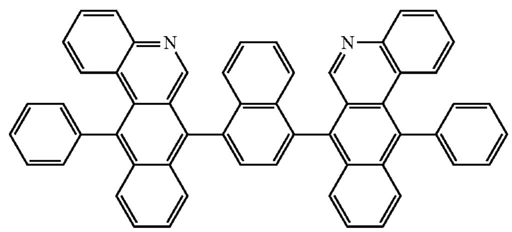
976
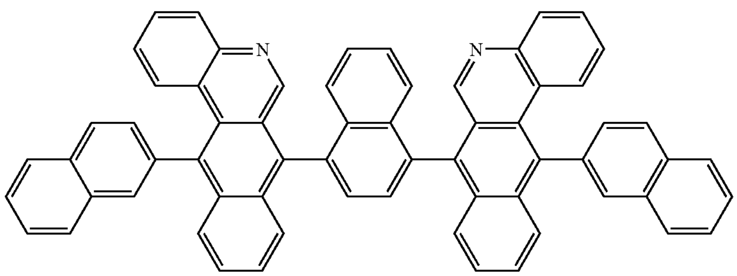
977
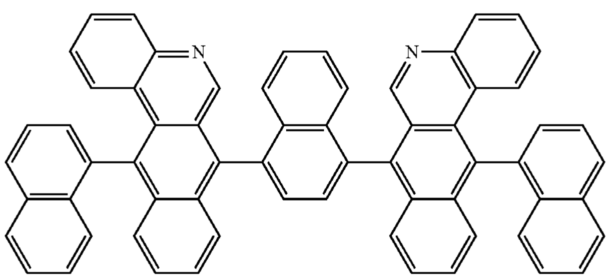
978
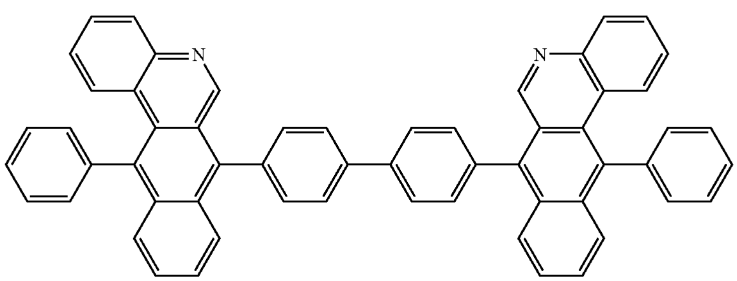

-continued
979
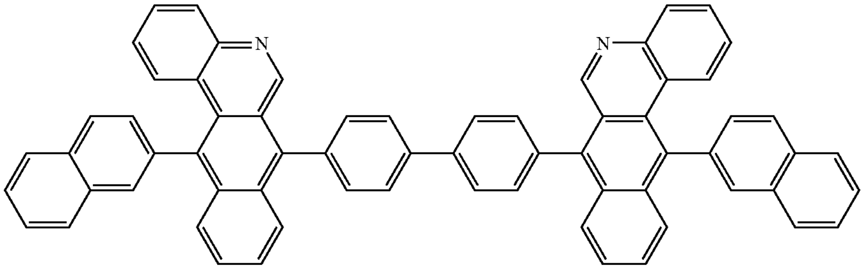
980
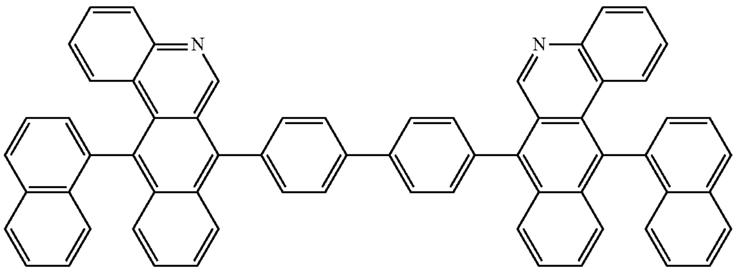
981
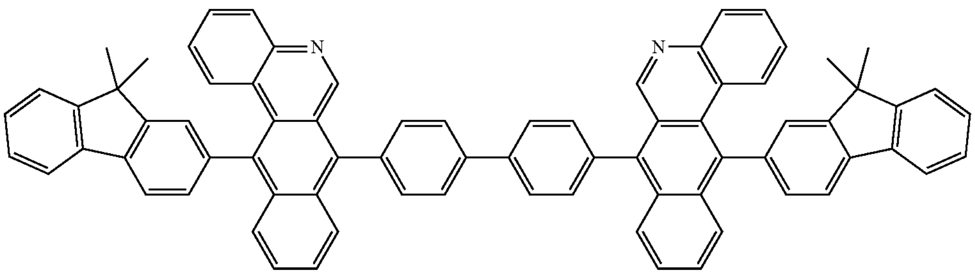
982
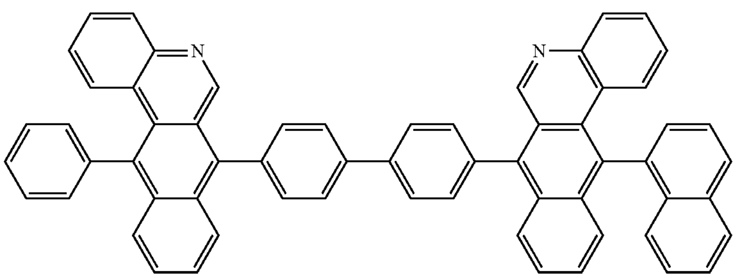
983
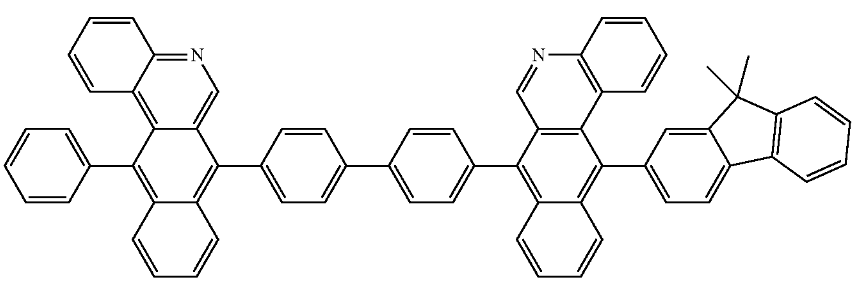

-continued
984
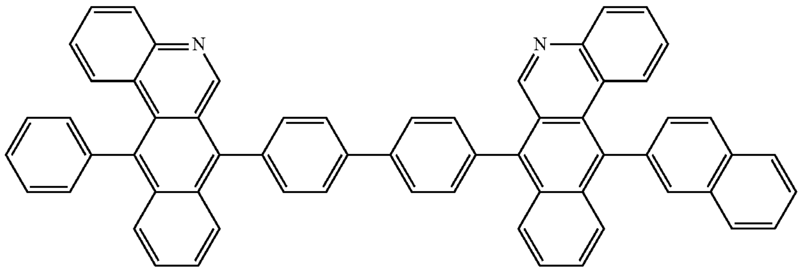
985
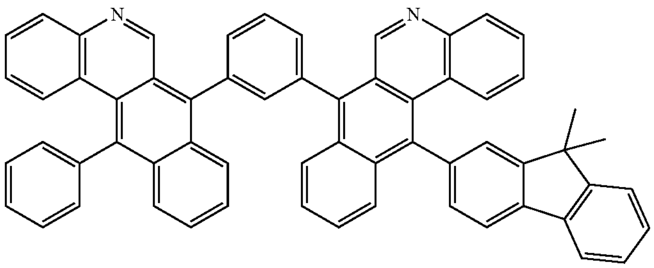
986
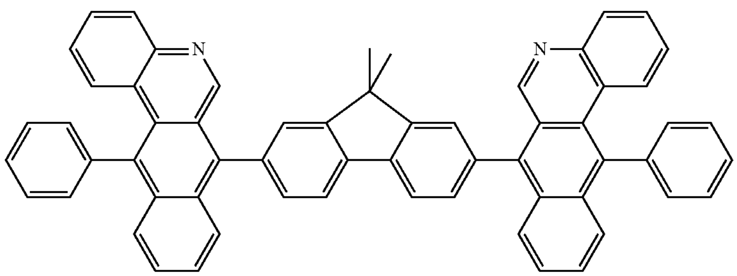
987
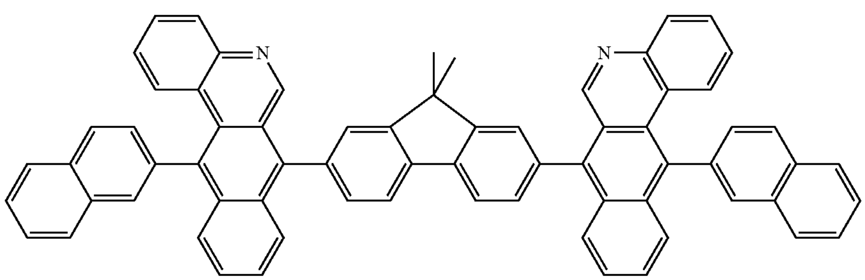
988
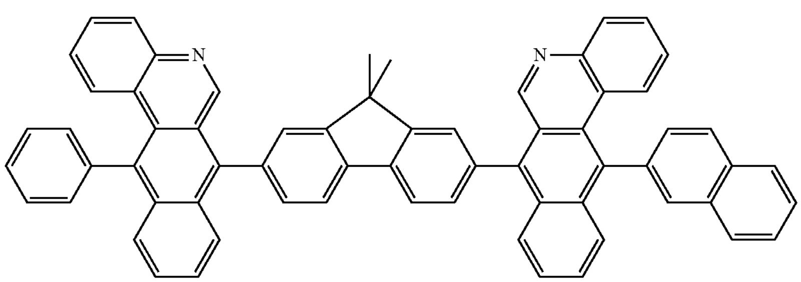

-continued
989
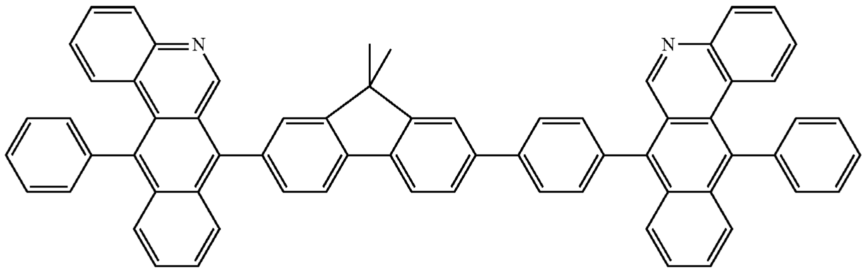
990
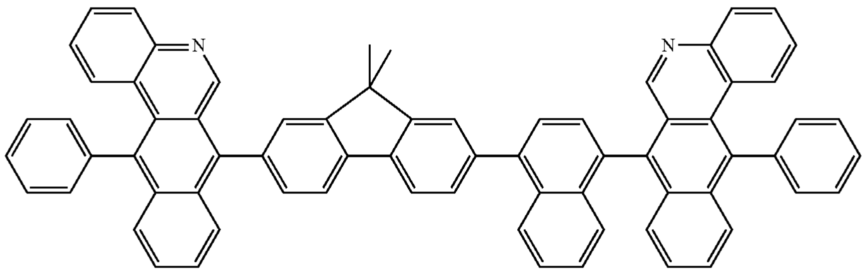
991
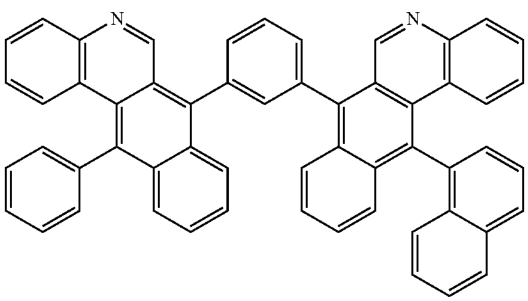
992
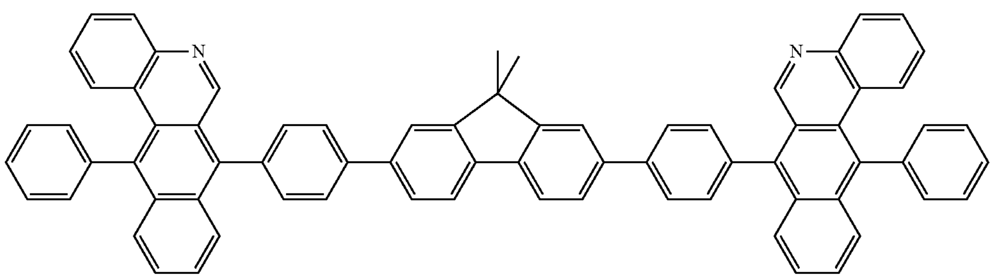
993
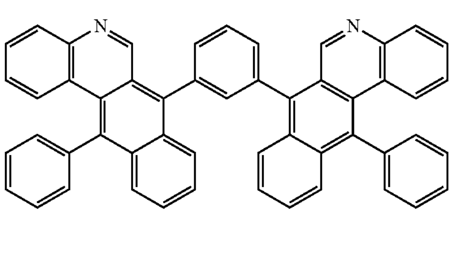
994
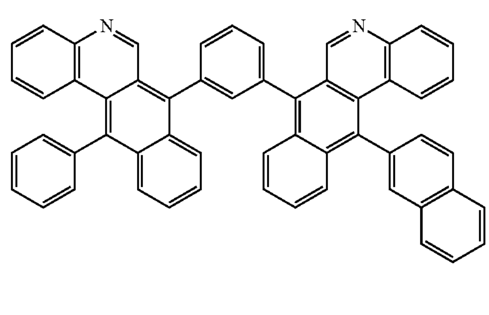

-continued
995
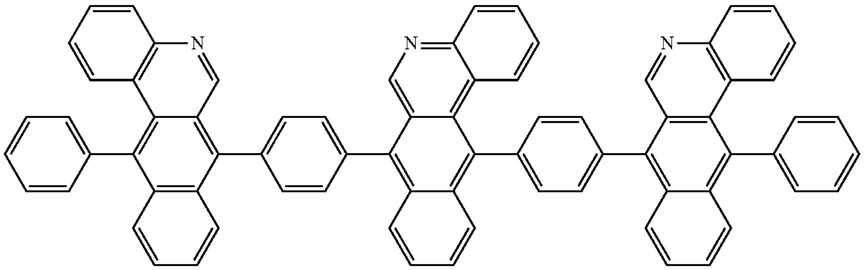
996
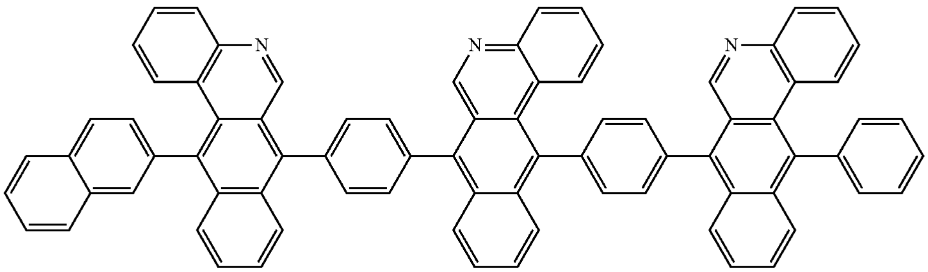
997
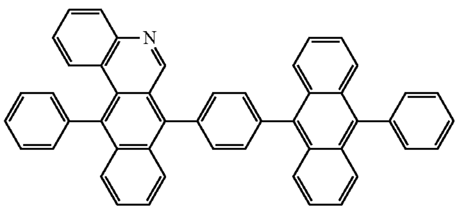
998
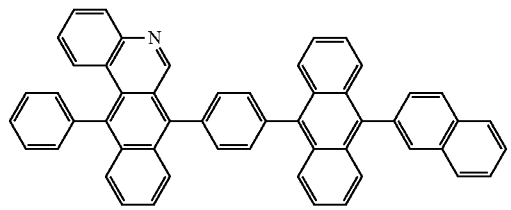
999
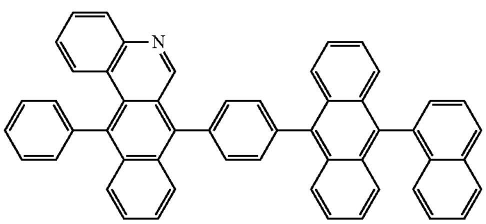
1000
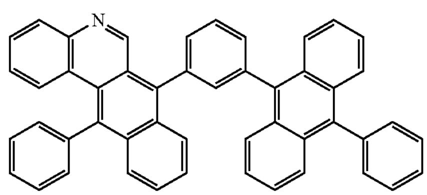
1001
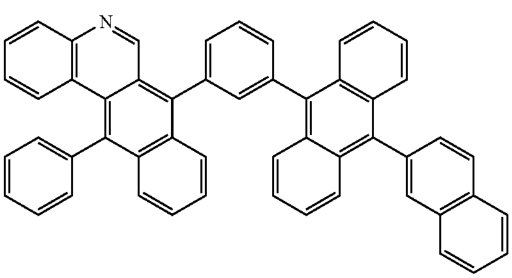
1002
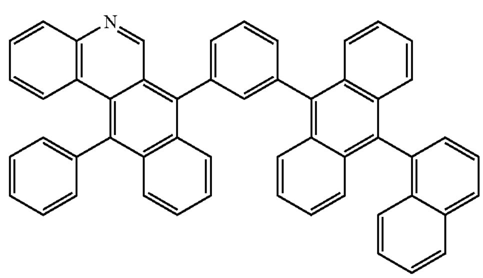
1003
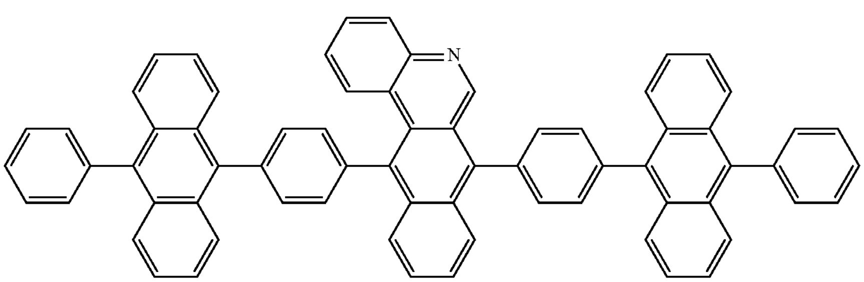

-continued
1004
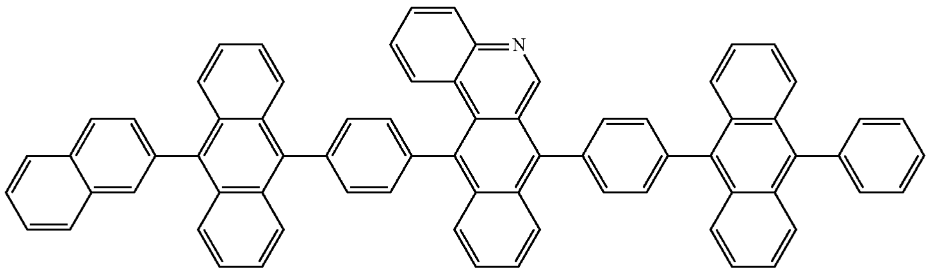
1005
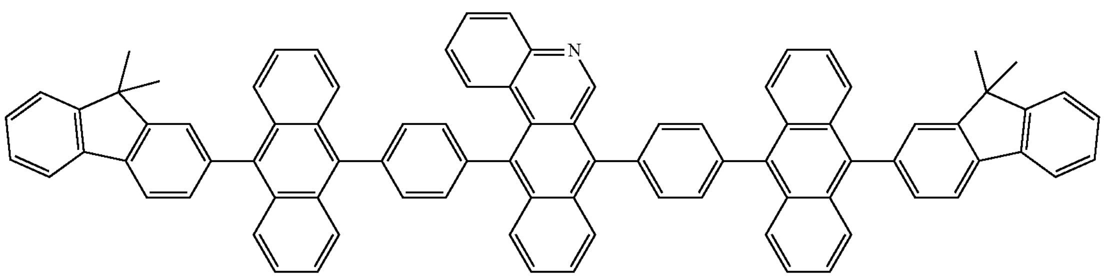
1006
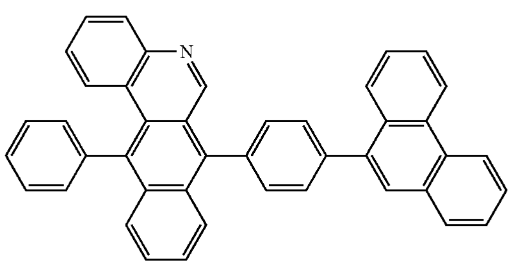
1007
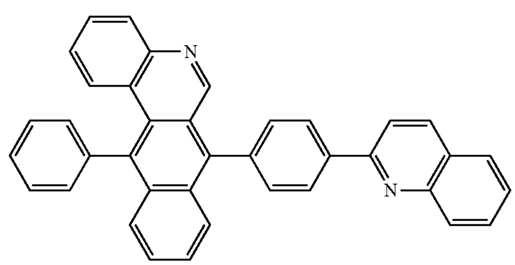
1008
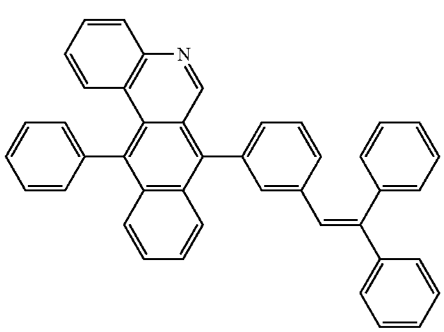
1009
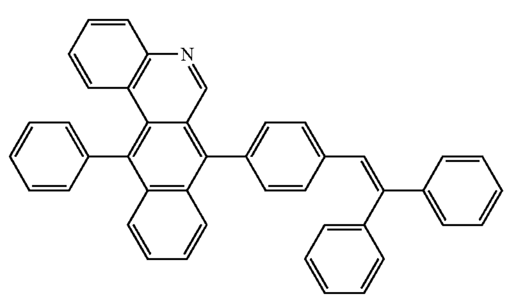

-continued
1010
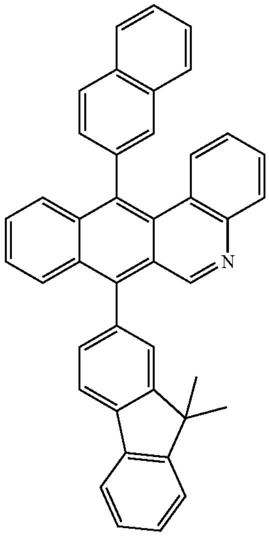
1011
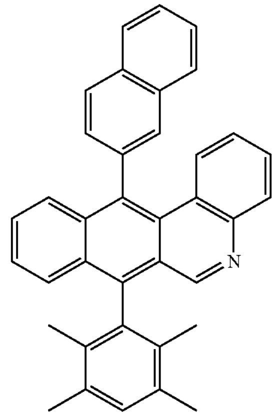
1012
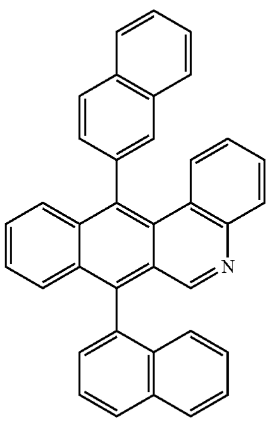
1013
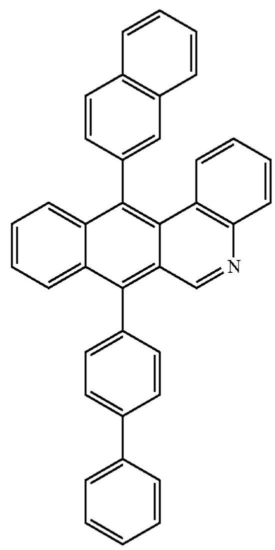
1014
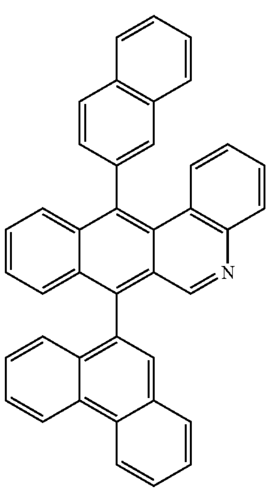
1015
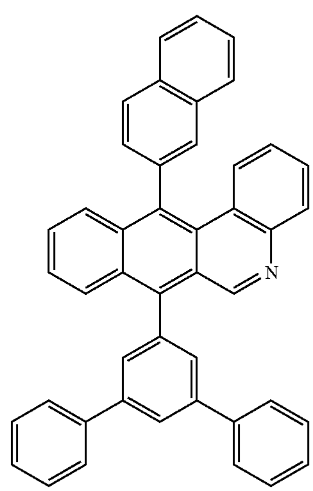

-continued
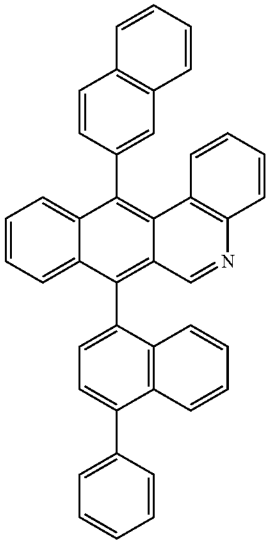
1016
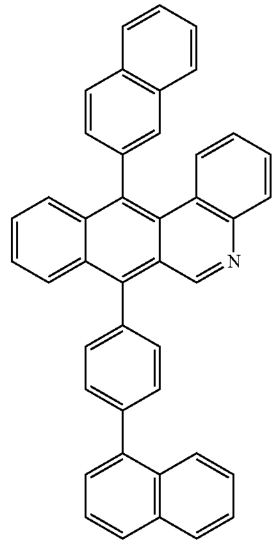
1017
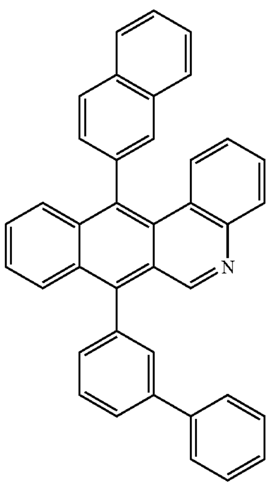
1018
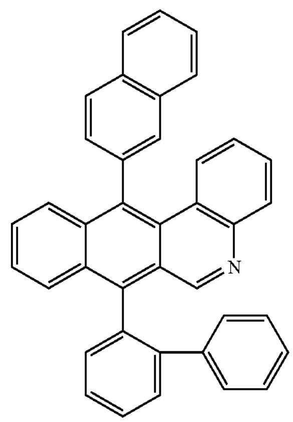
1019
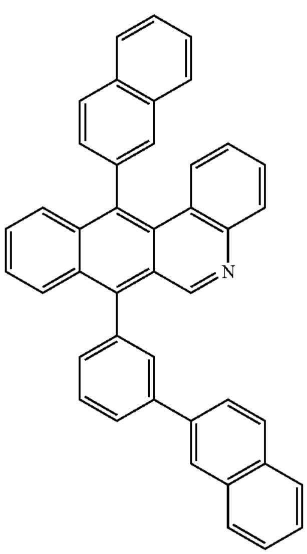
1020
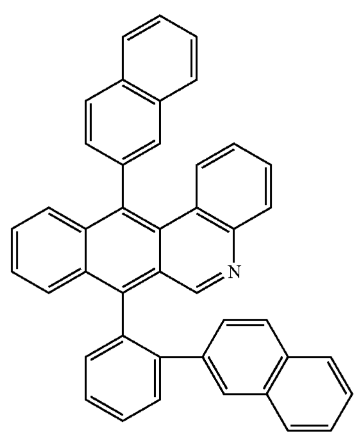
1021

-continued
1022
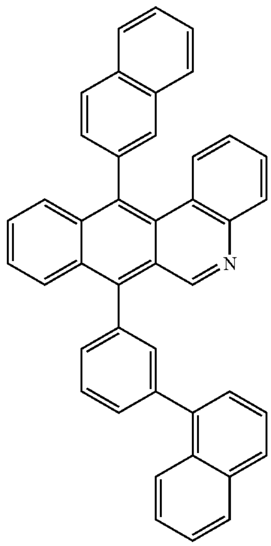
1023
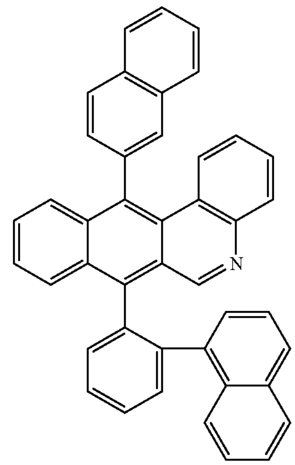
1024
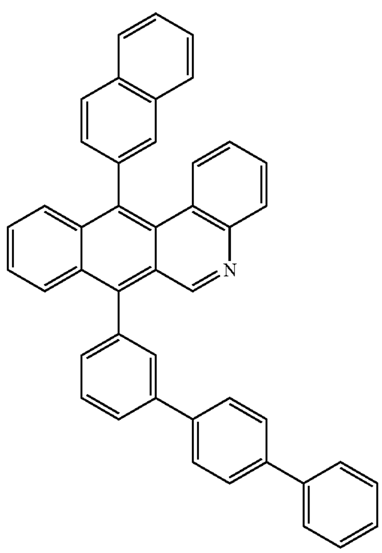
1025
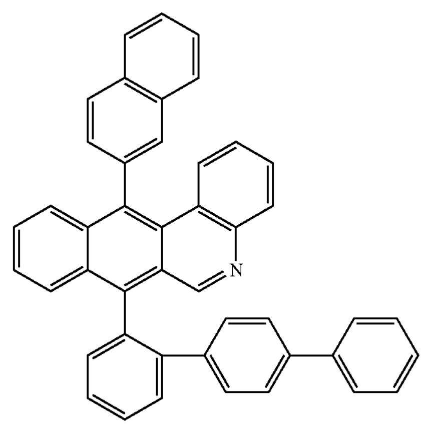
1026
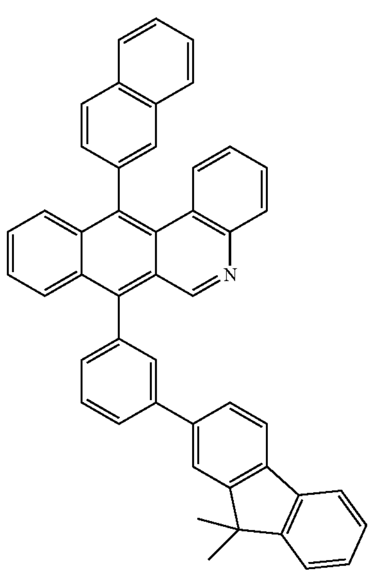
1027
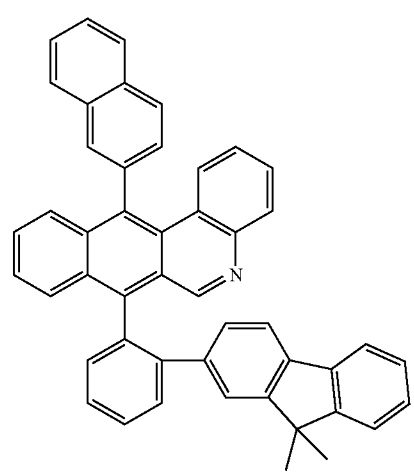

-continued
1028
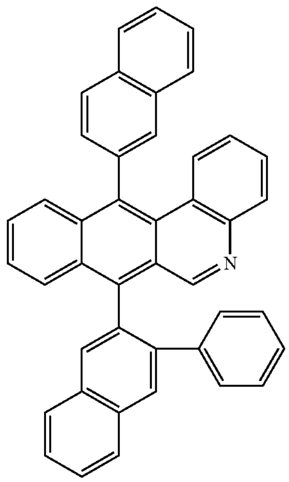
1029
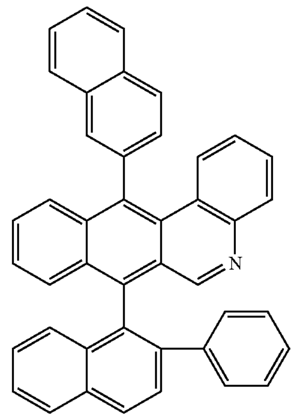
1030
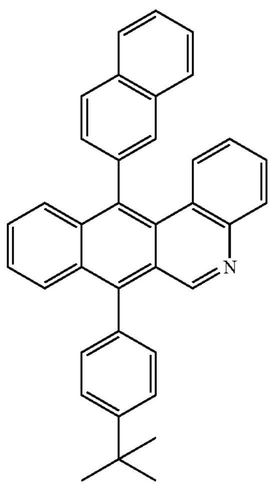
1031
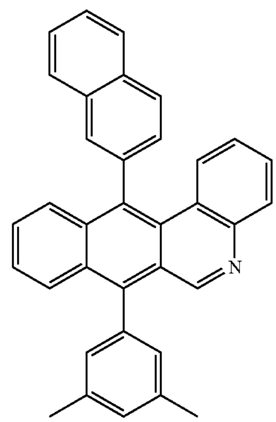
1032
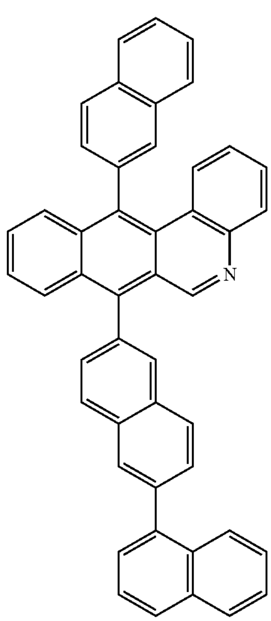
1033
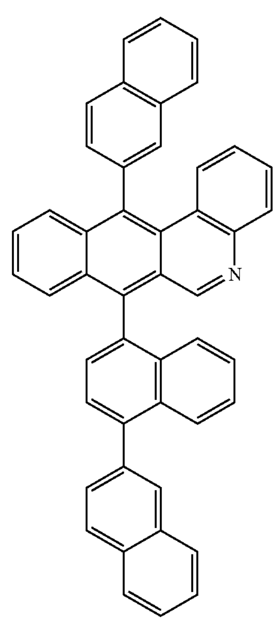

-continued
1034
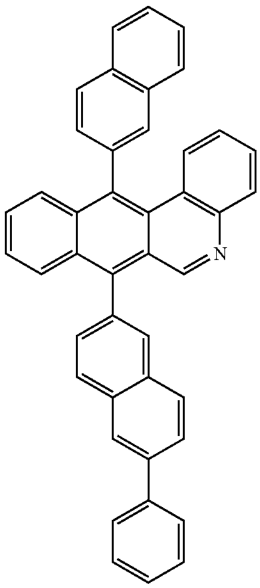
1035
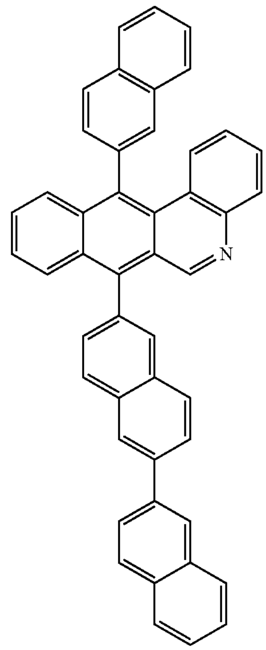
1036
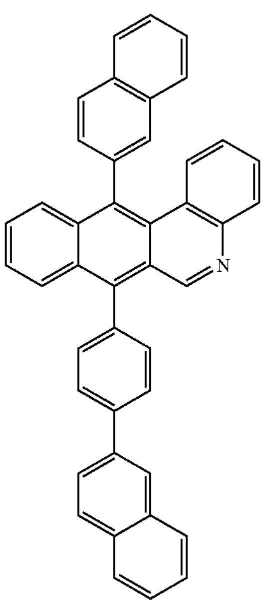
1037
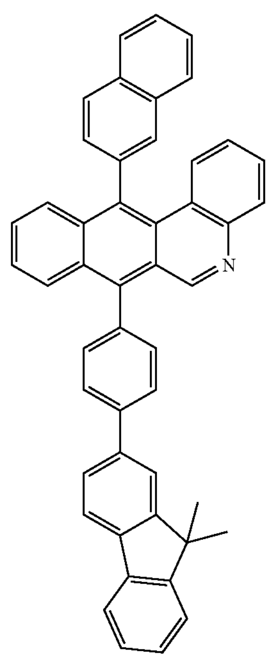

-continued
1038
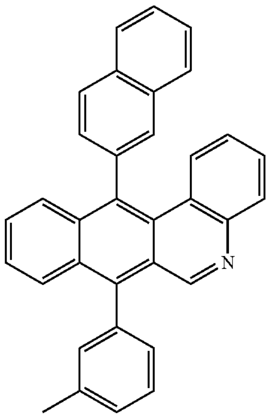
1039
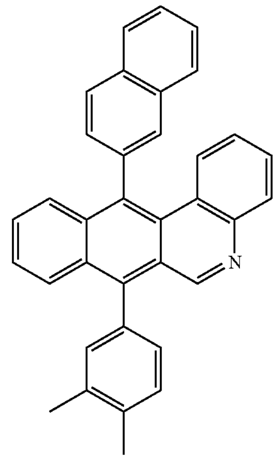
1040
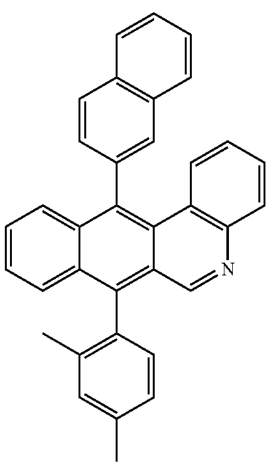
1041
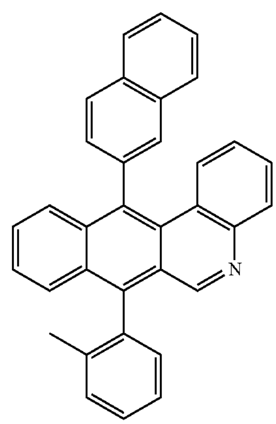
1042
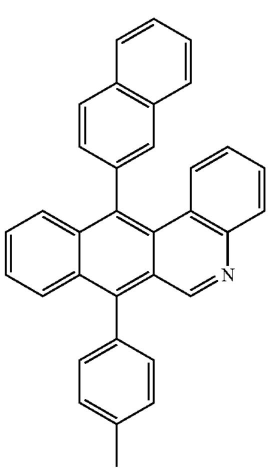
1043
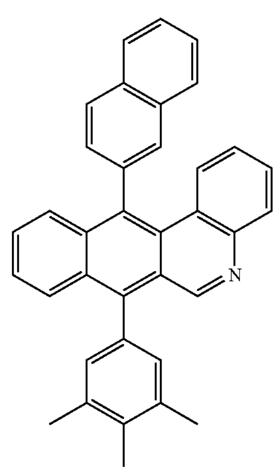

-continued
1044
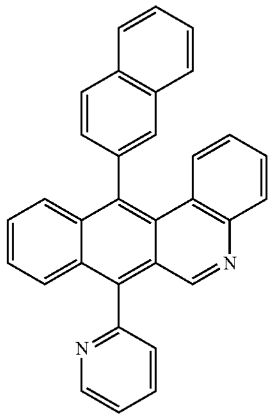
1045
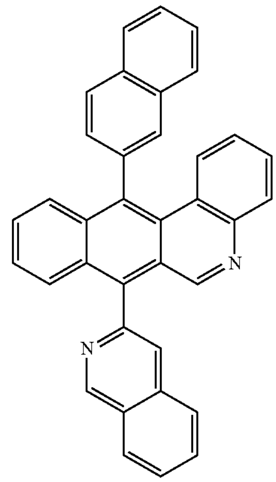
1046
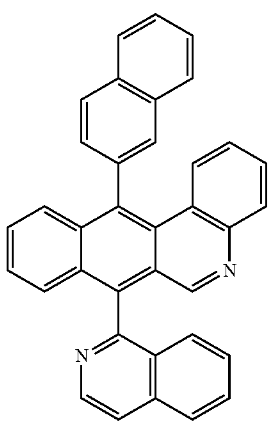
1047
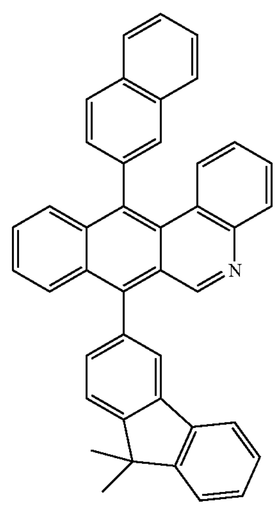
1048
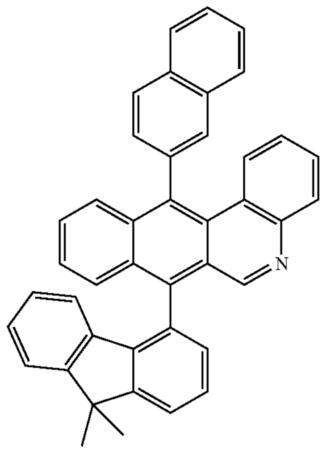
1049
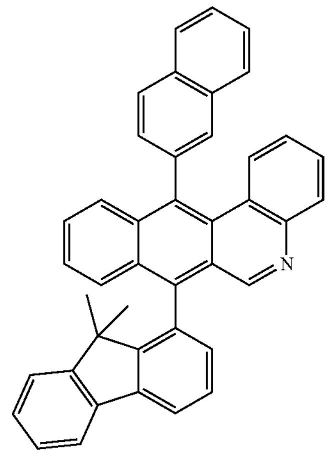

-continued
1050
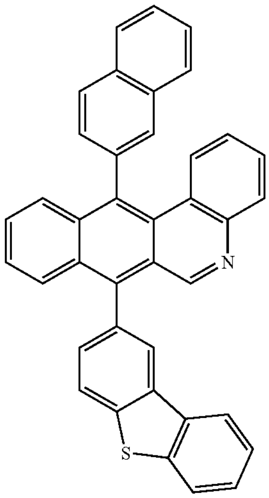
1051
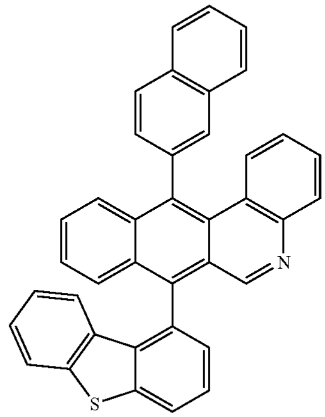
1052
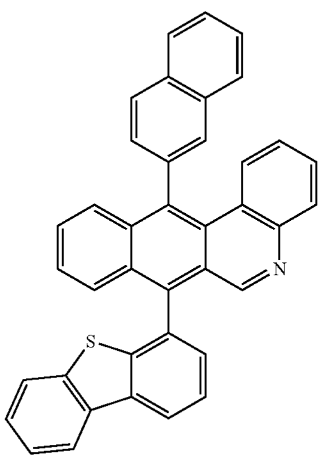
1053
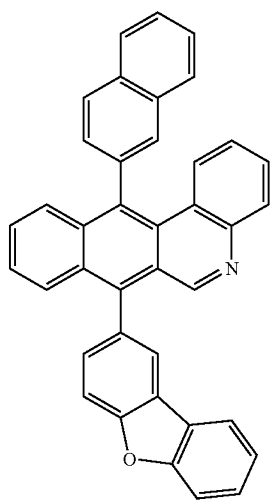
1054
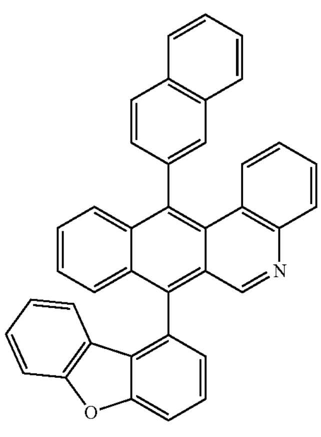
1055
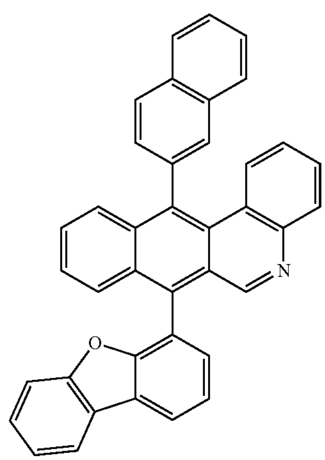

-continued
1056
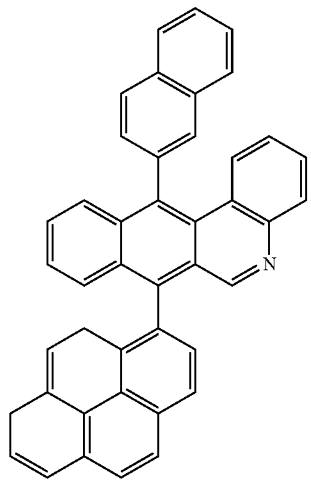
1057
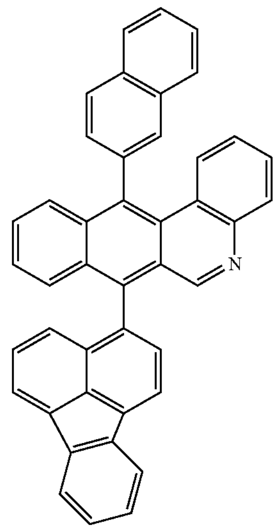
1058
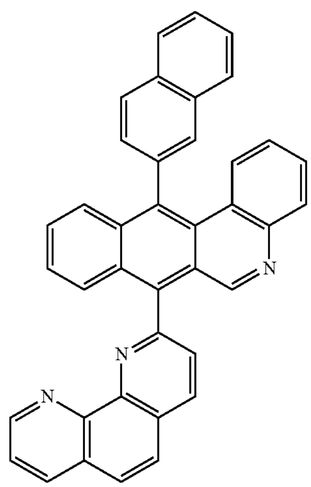
1059
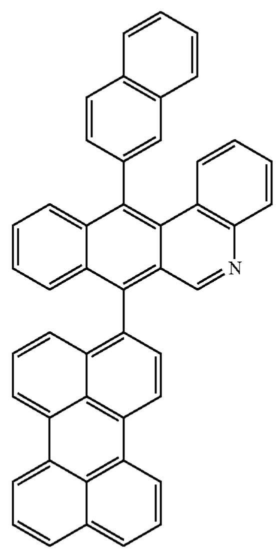
1060
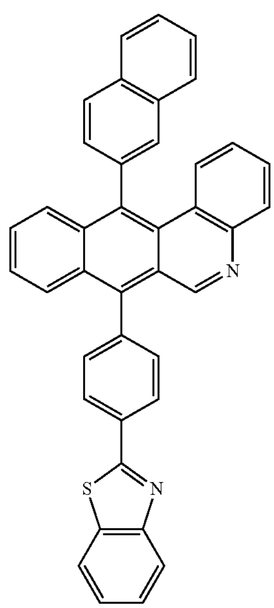
1061
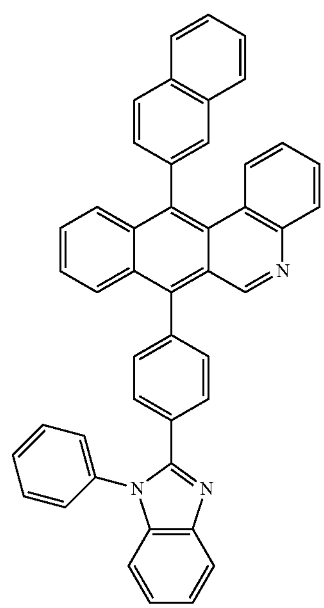

-continued
1062
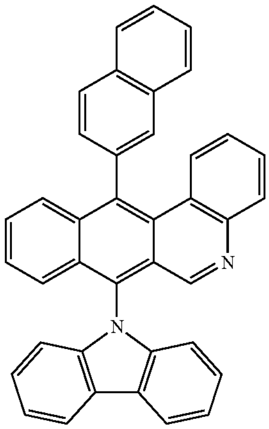
1063
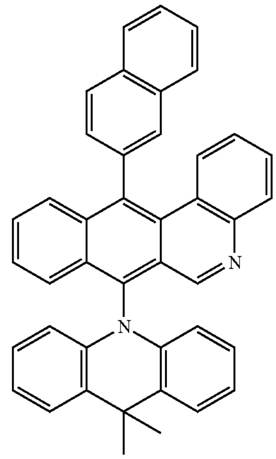
1064
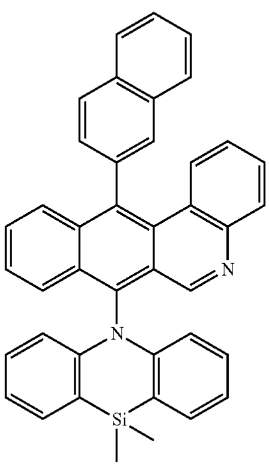
1065
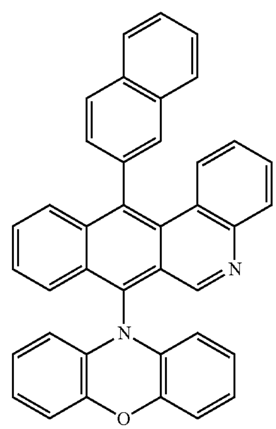
1066
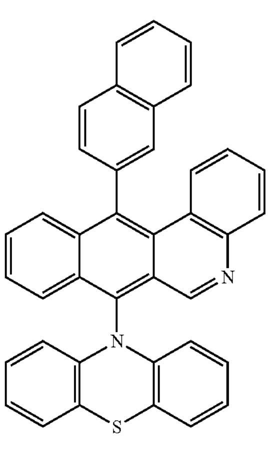
1067
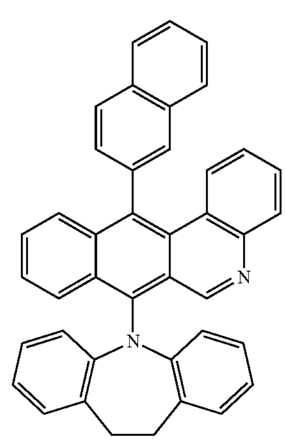

-continued
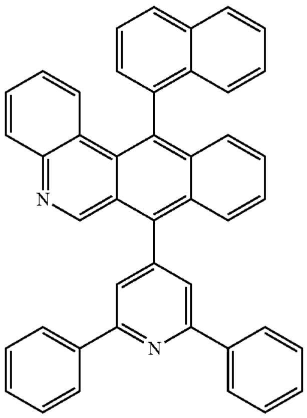
1068
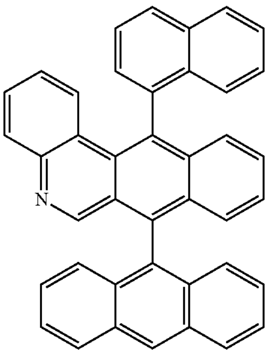
1069
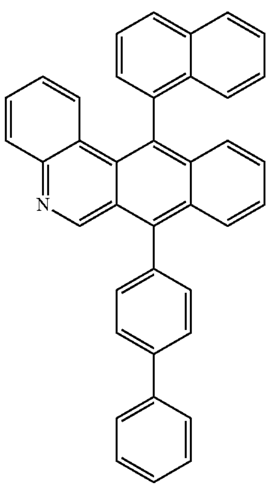
1070
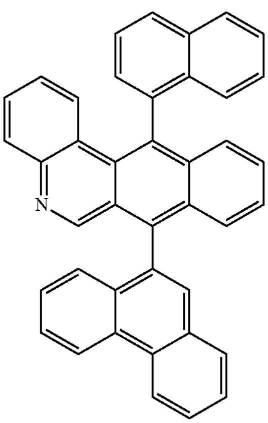
1071
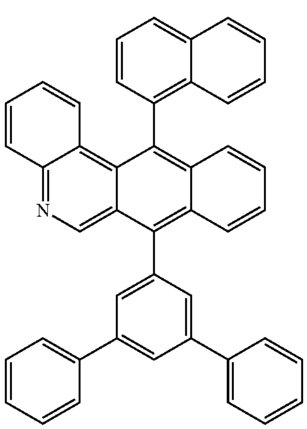
1072
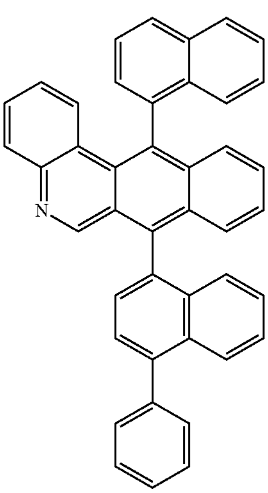
1073

-continued
1074
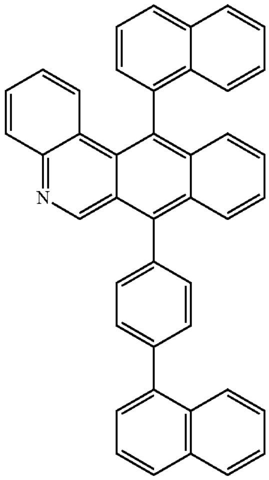
1075
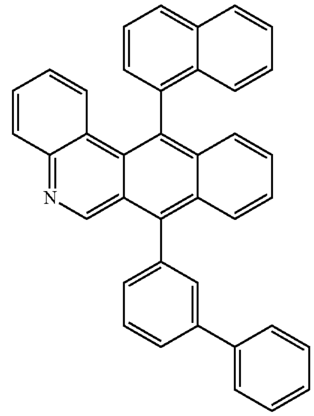
1076
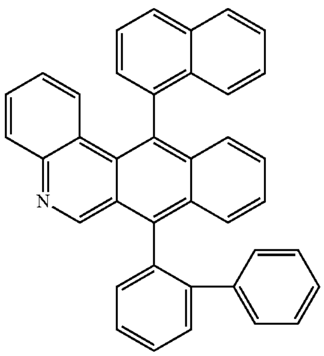
1077
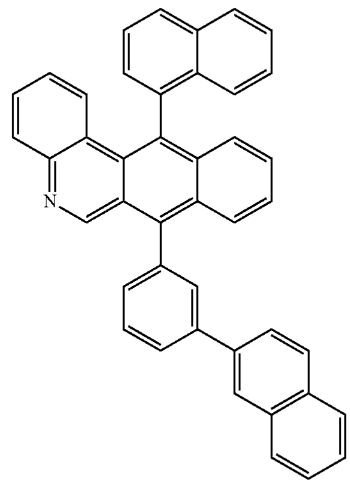
1078
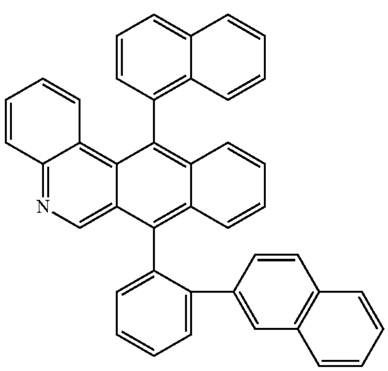
1079
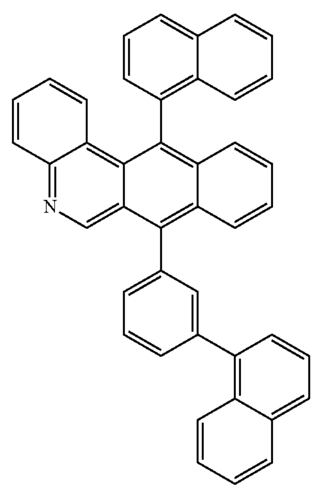

-continued
1080
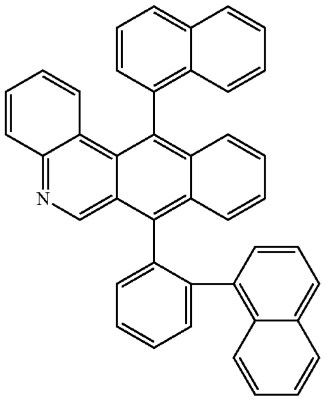
1081
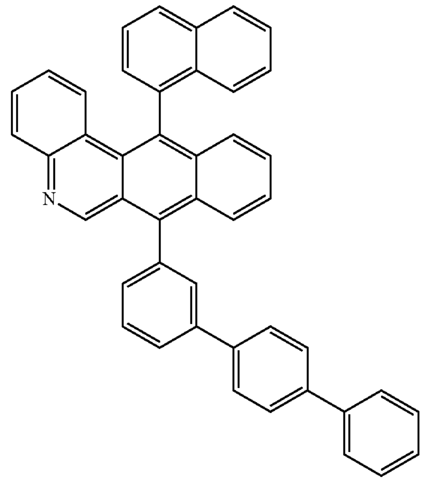
1082
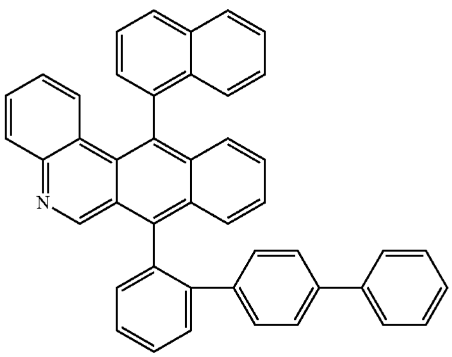
1083
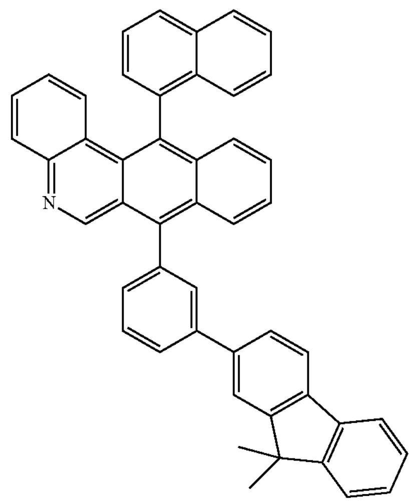
1084
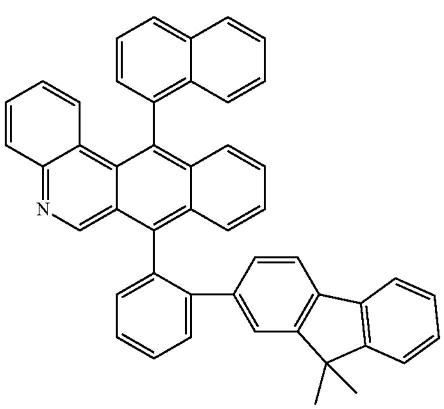
1085
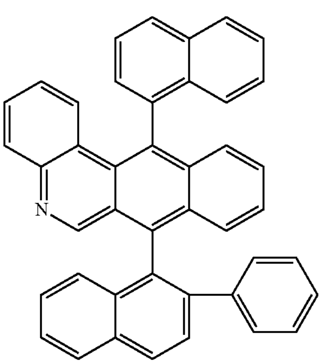

-continued
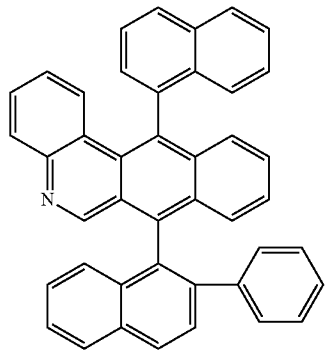
1086
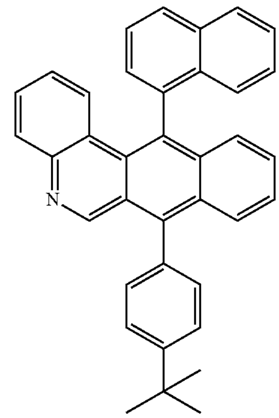
1087
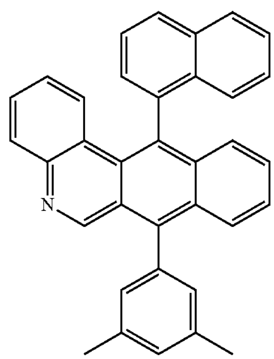
1088
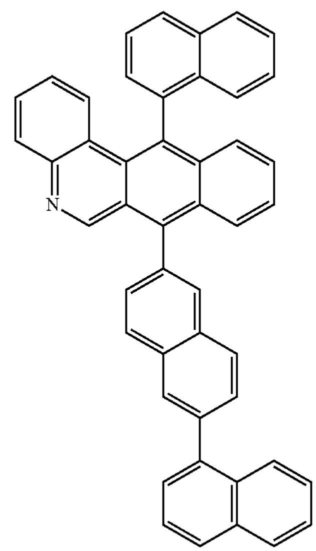
1089
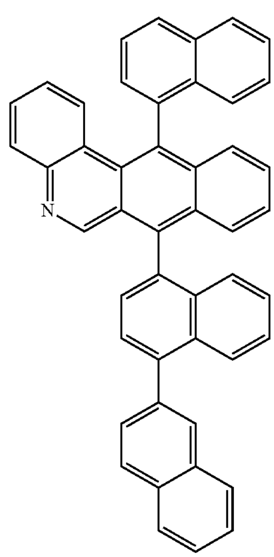
1090
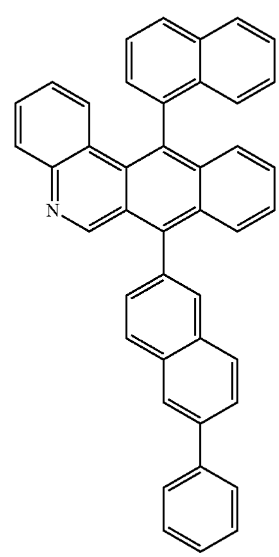
1091

-continued
1092
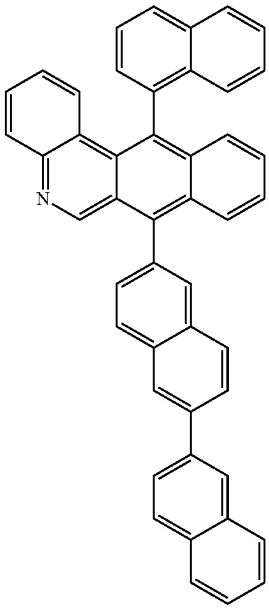
1093
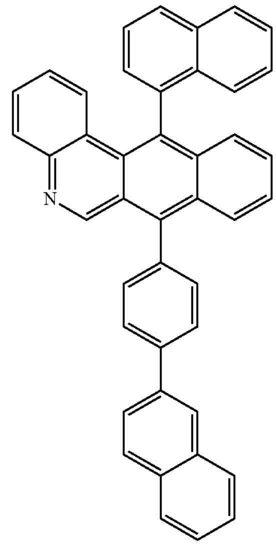
1094
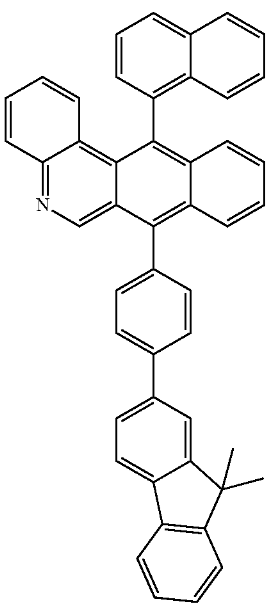
1095
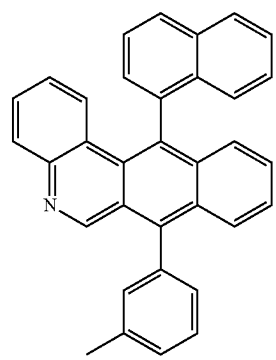
1096
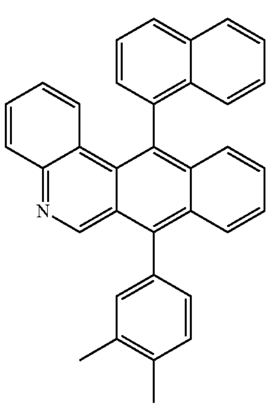
1097
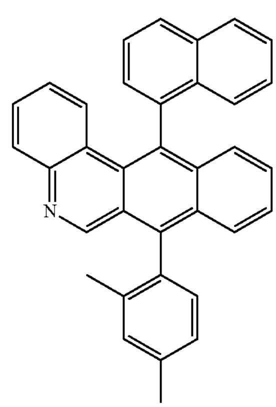

-continued
1098
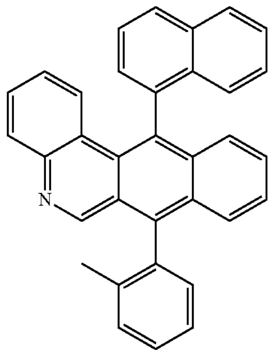
1099
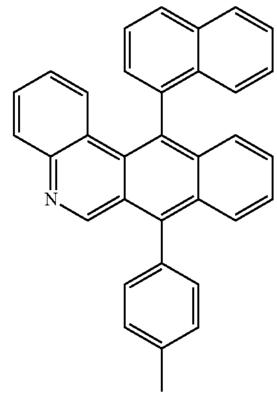
1100
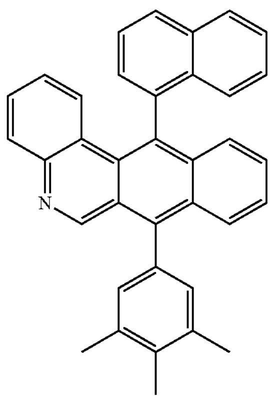
1101
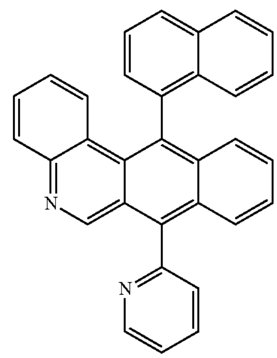
1102
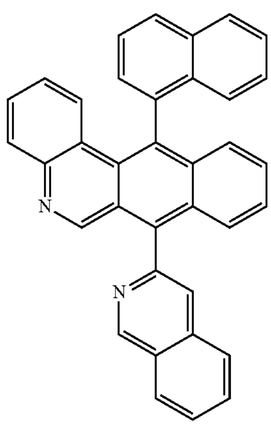
1103
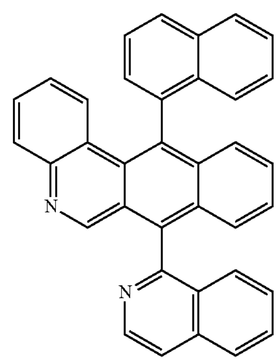
1104
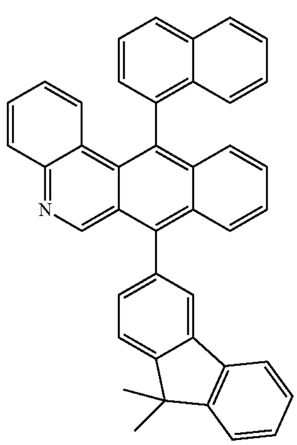
1105
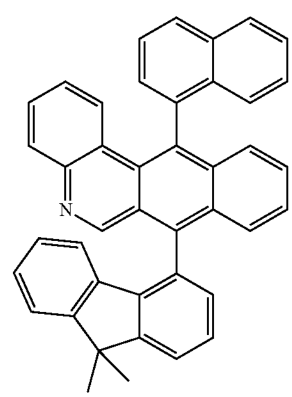

-continued
1106
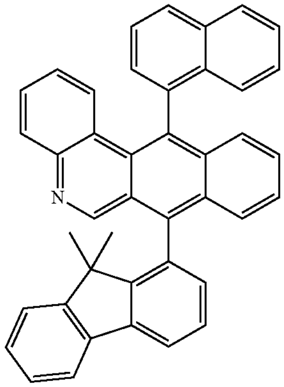
1107
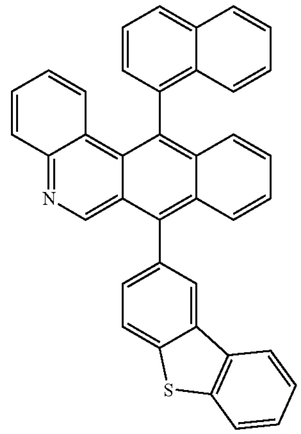
1108
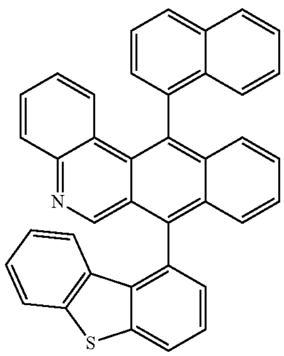
1109
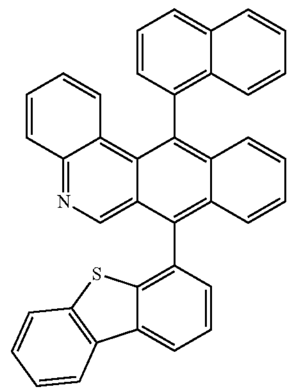
1110
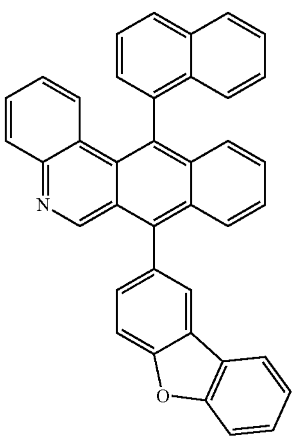
1111
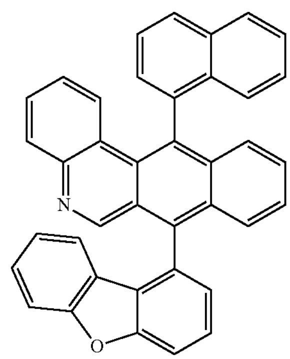
1112
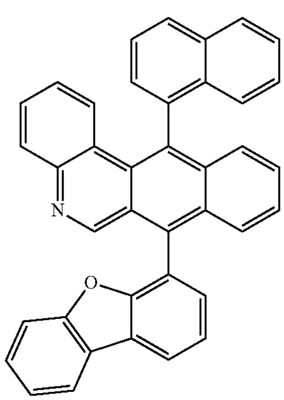
1113
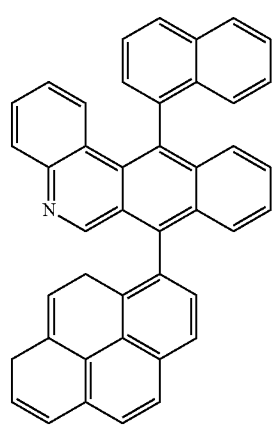

-continued
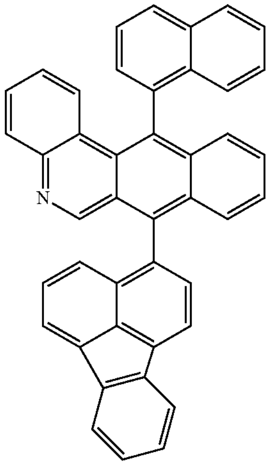
1114
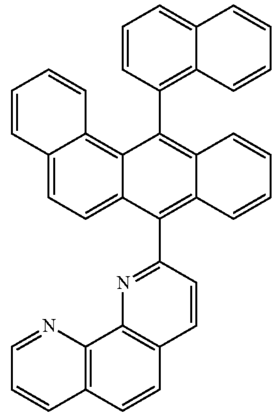
1115
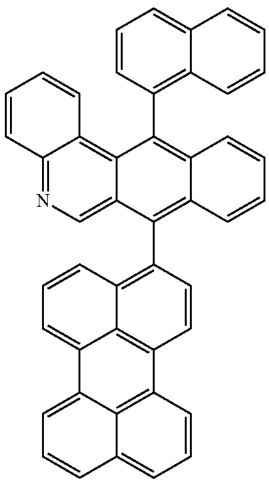
1116
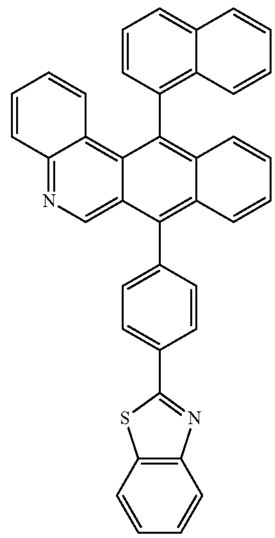
1117
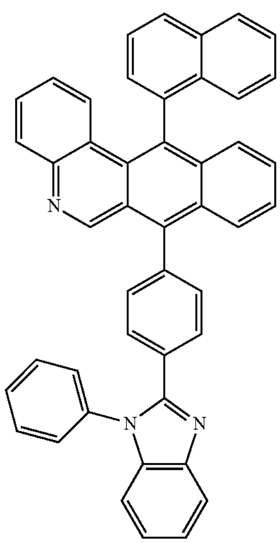
1118
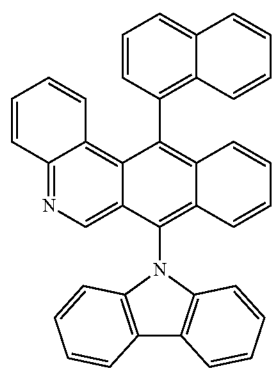
1119

-continued
1120
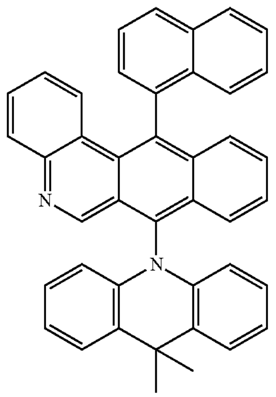
1121
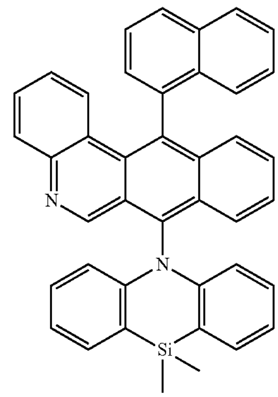
1122
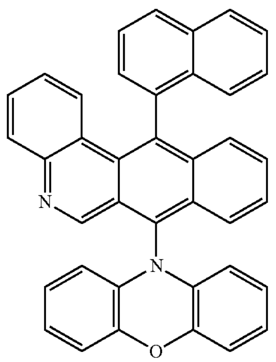
1123
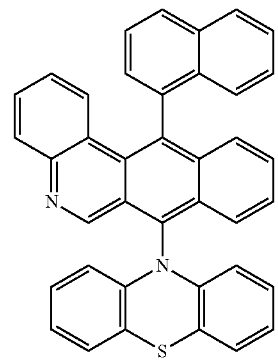
1124
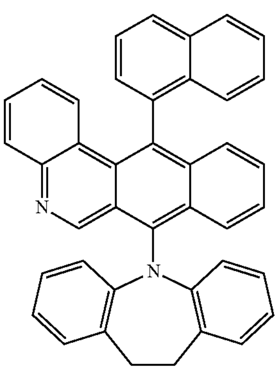
1125
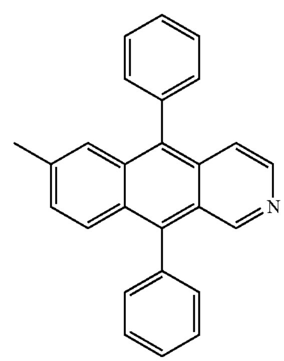
1126
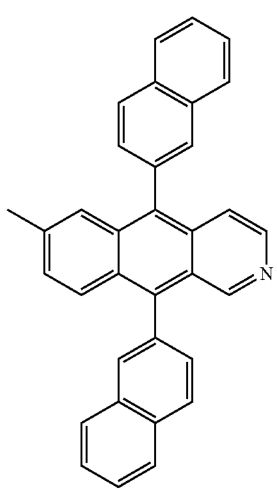
1127
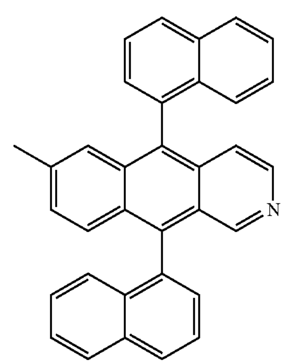

-continued
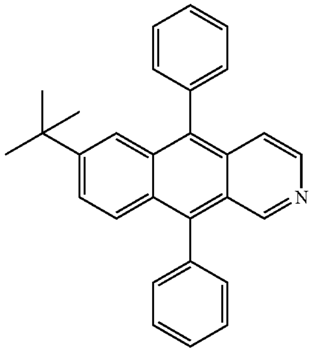
1128
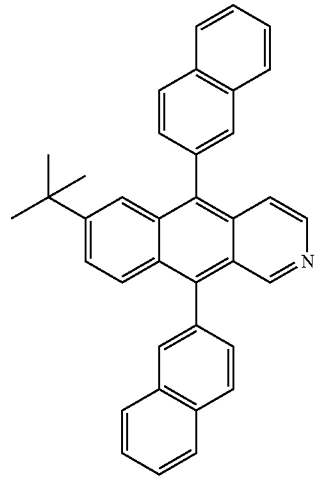
1129
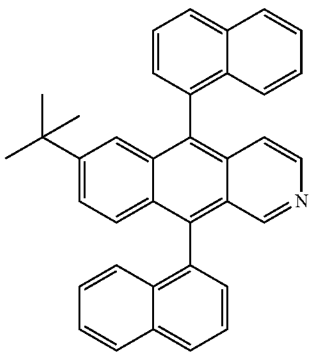
1130
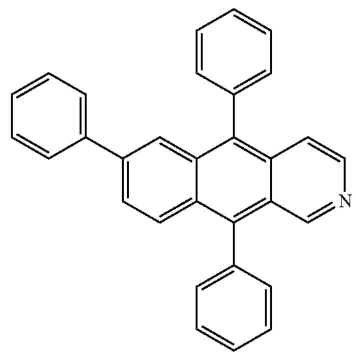
1131
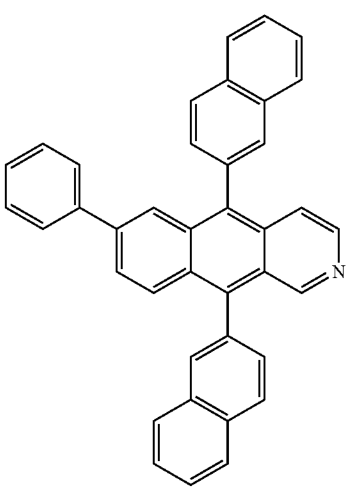
1132
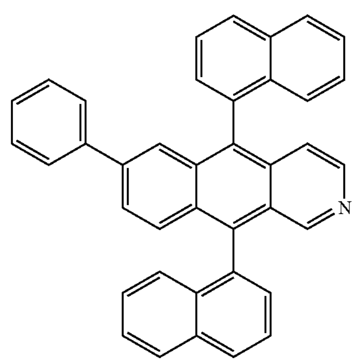
1133

-continued
1134
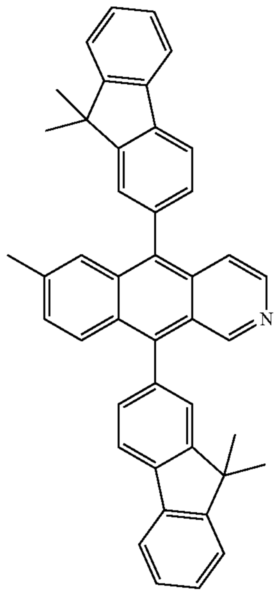
1135
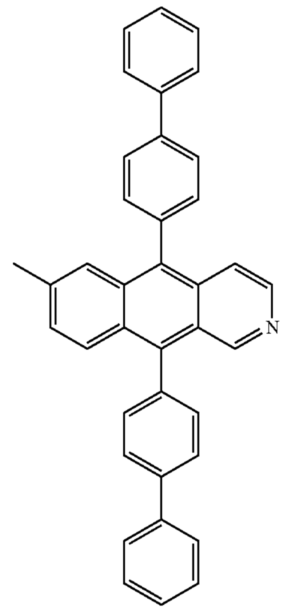
1136
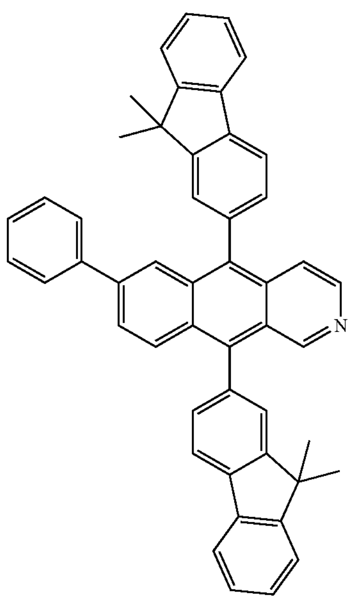
1137
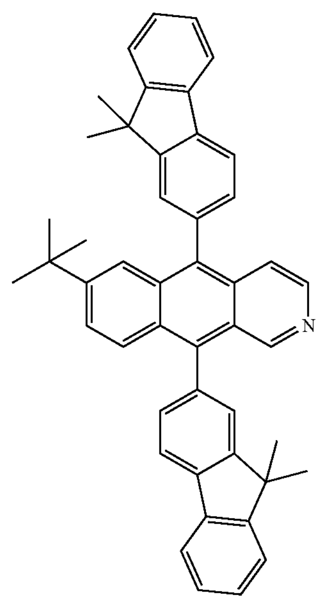

-continued
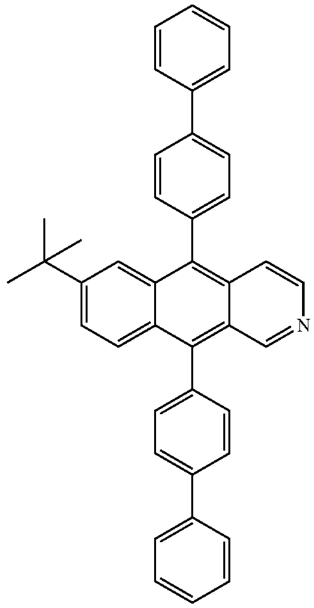
1138
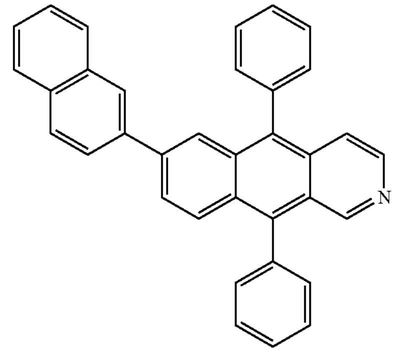
1139
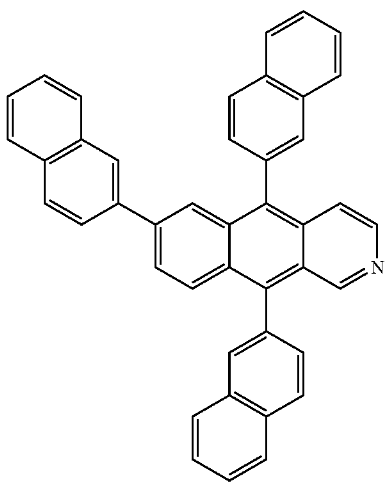
1140
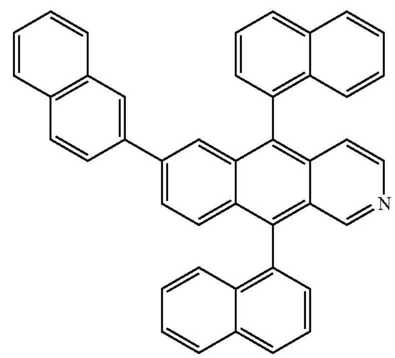
1141
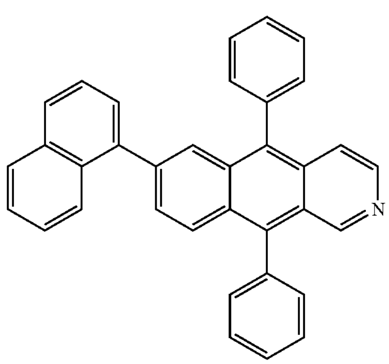
1142
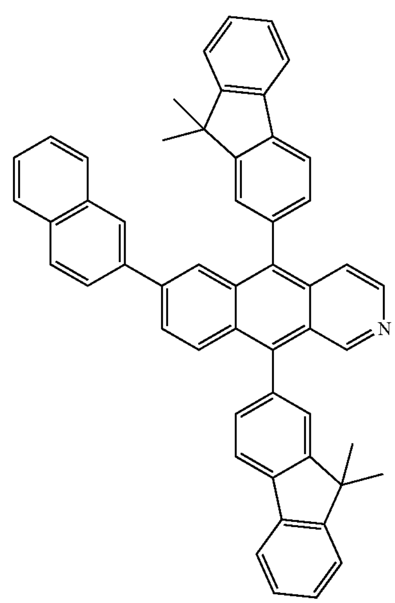
1143

-continued
1144
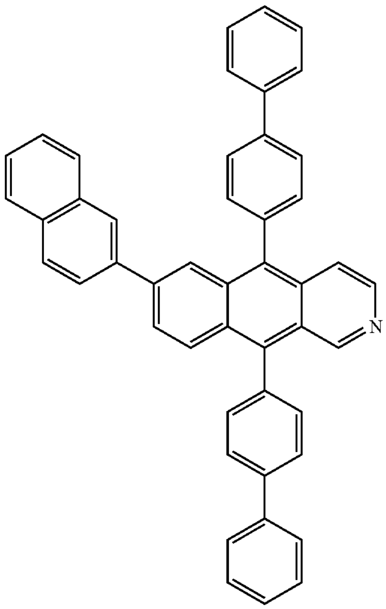
1145
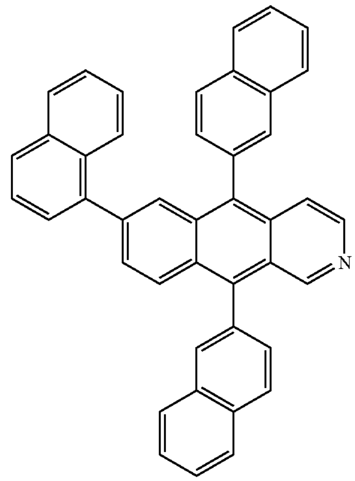
1146
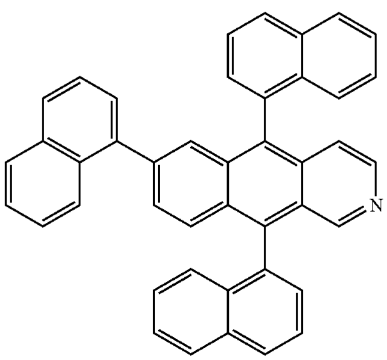
1147
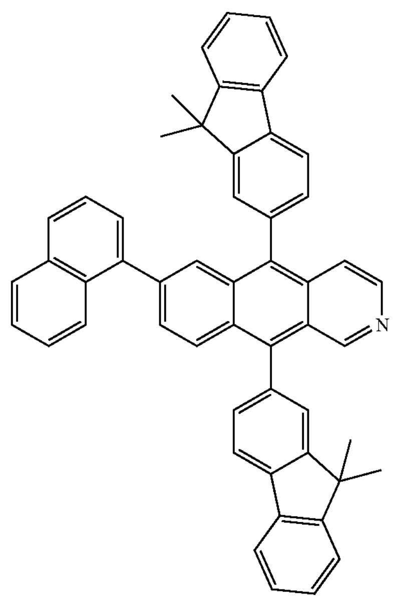

-continued
1148
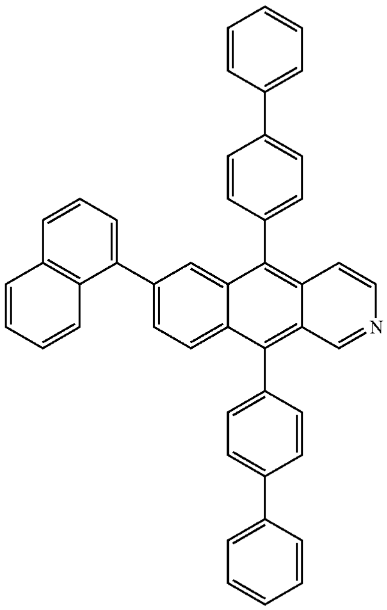
1149
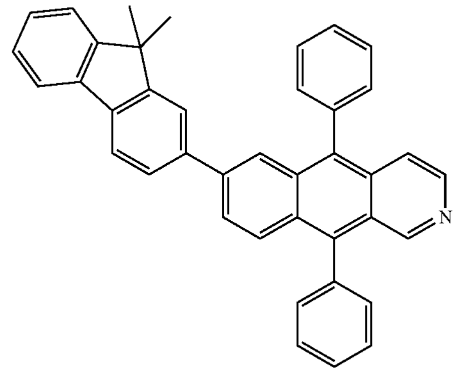
1150
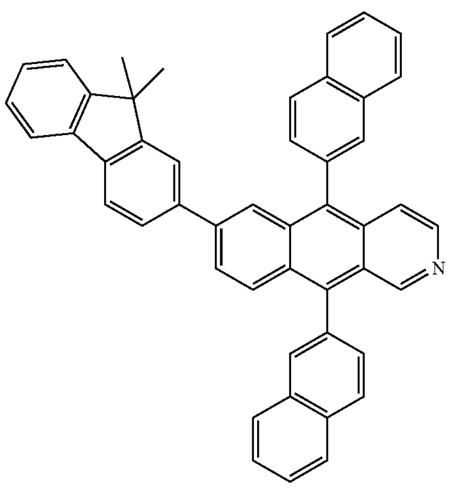
1151
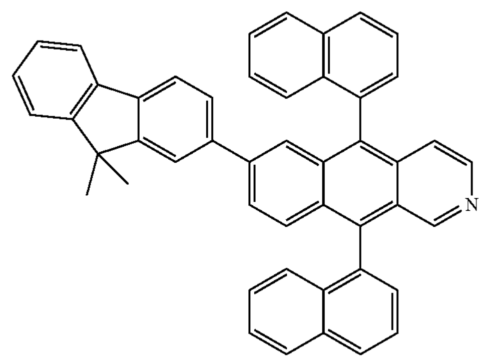
1152
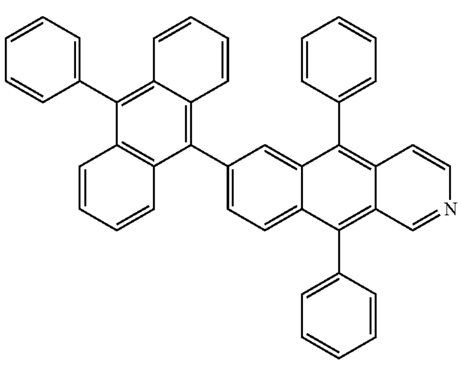
1153
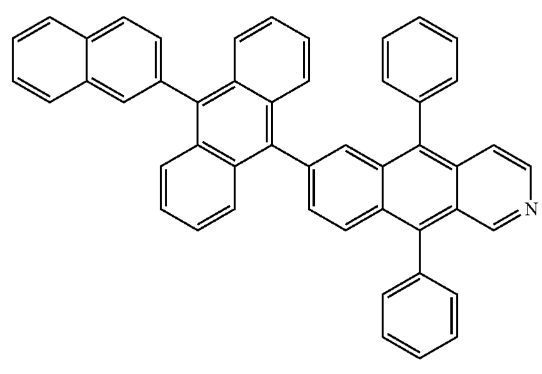

-continued
1154
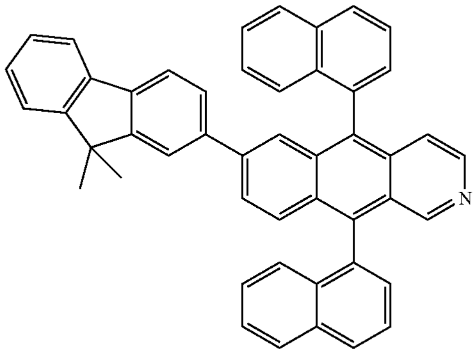
1155
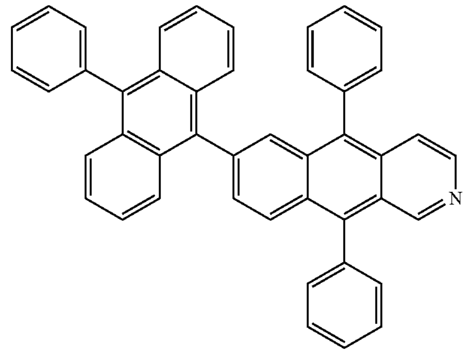
1156
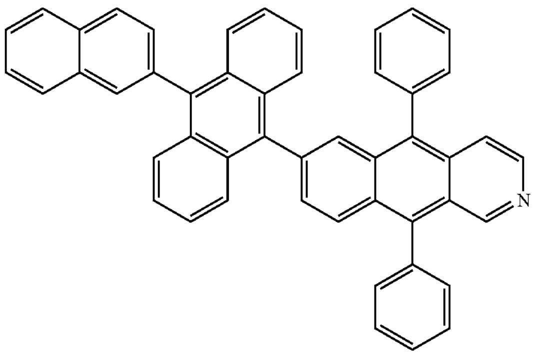
1157
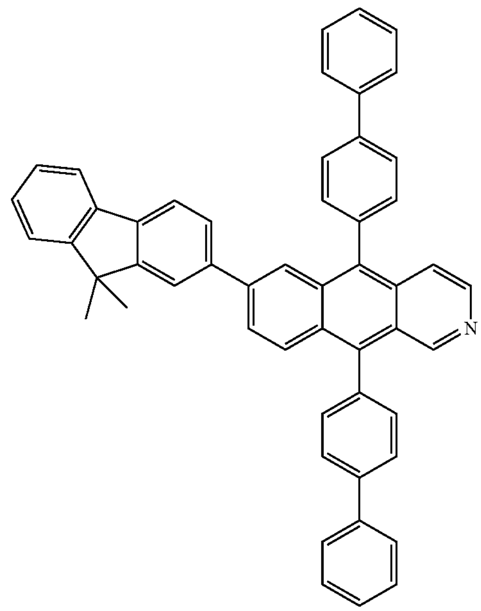
1158
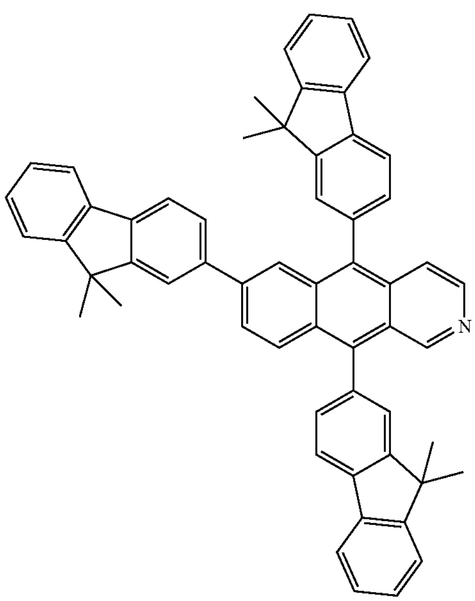
1159
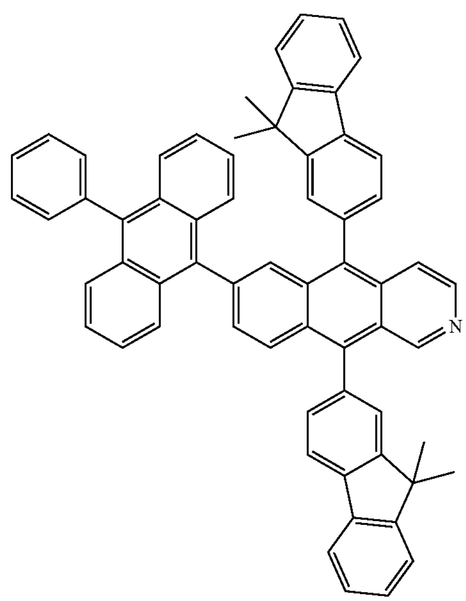

-continued
1160
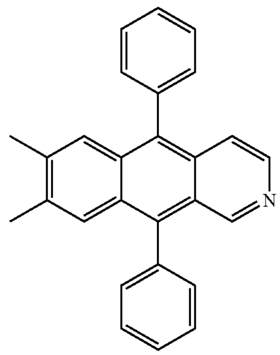
1161
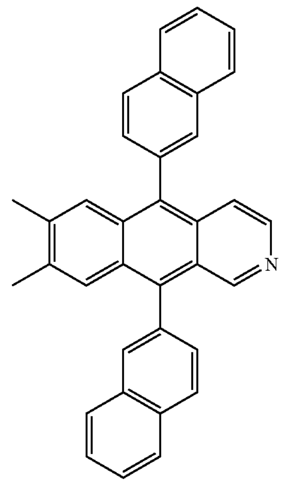
1162
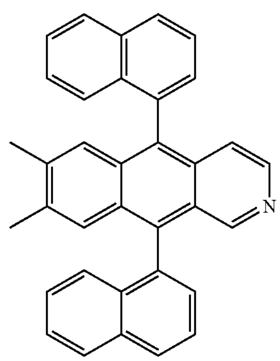
1163
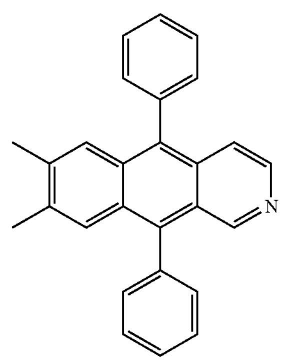
1164
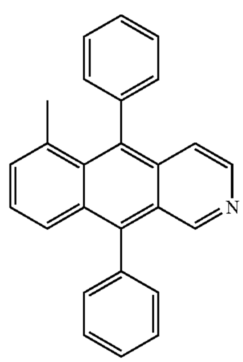
1165
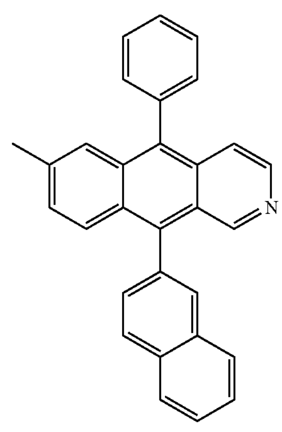

-continued
1166
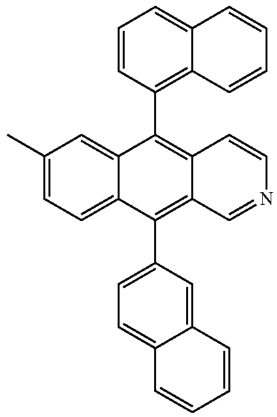
1167
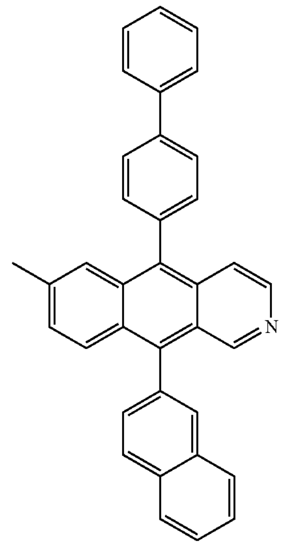
1168
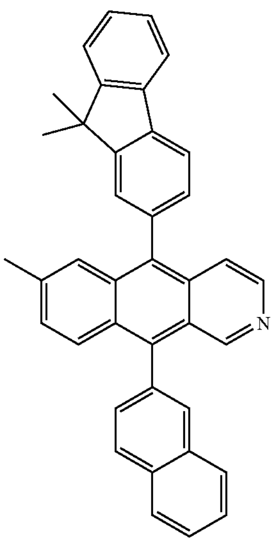
1169
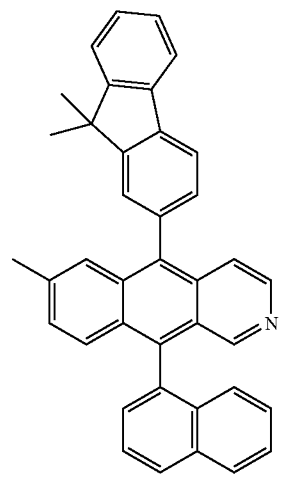
1170
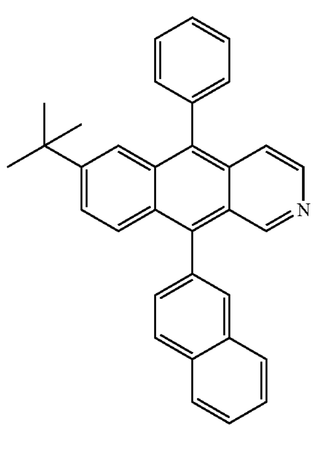
1171
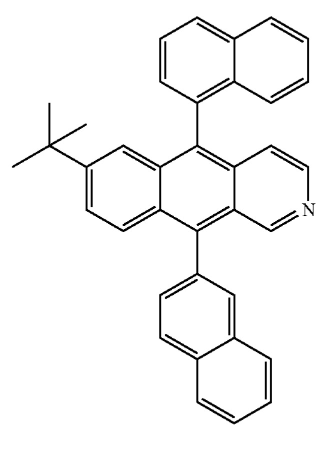

-continued
1172
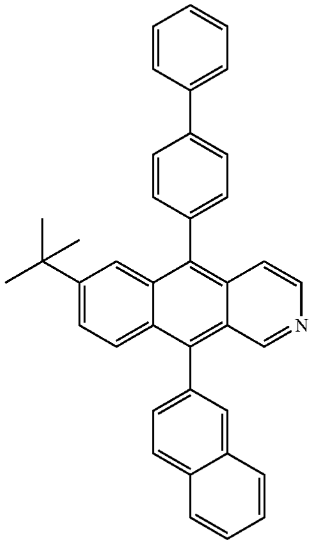
1173
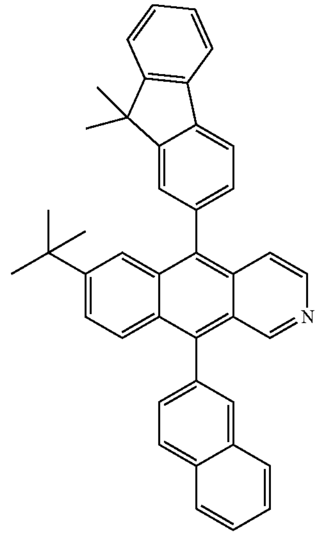
1174
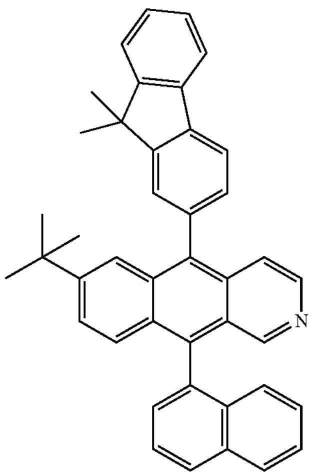
1175
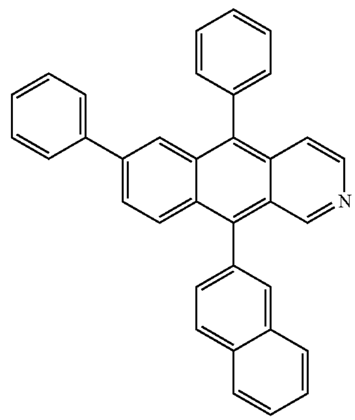
1176
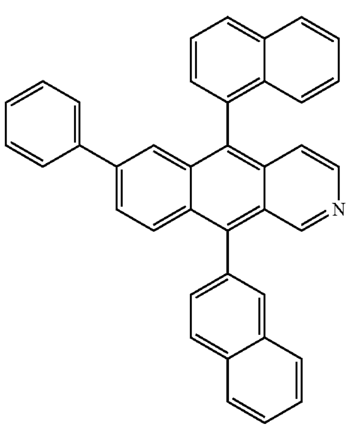
1177
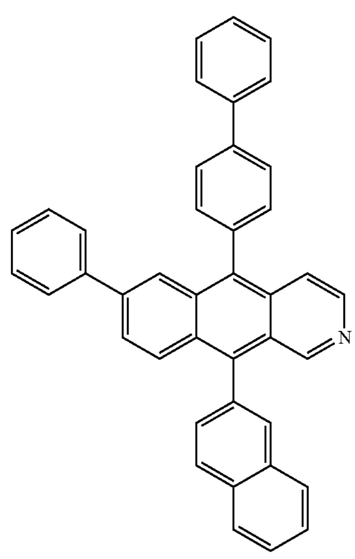

-continued
1178
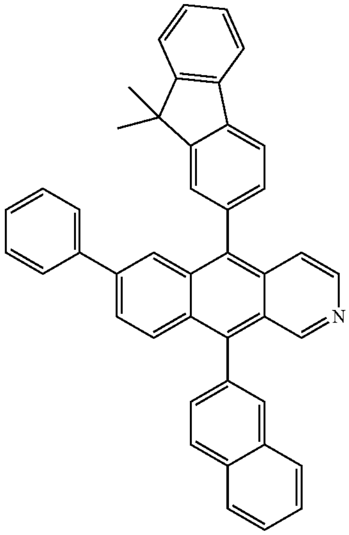
1179
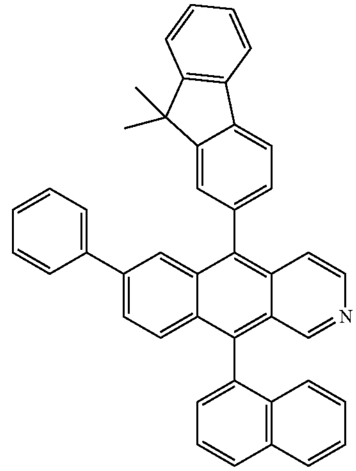
1180
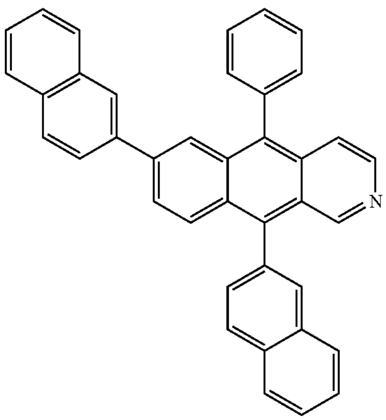
1181
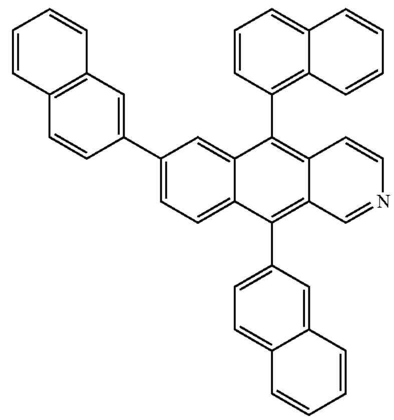
1182
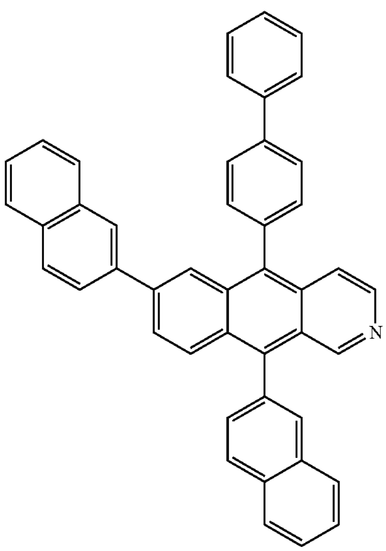
1183
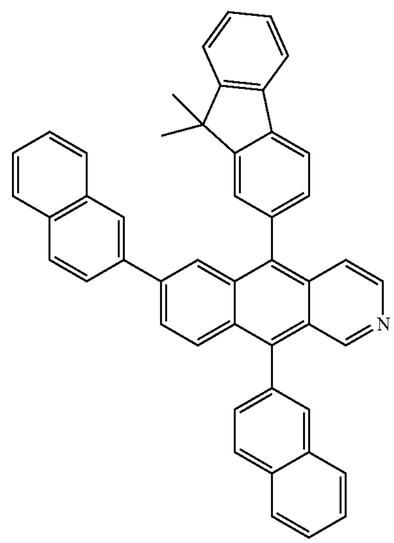

-continued
1184
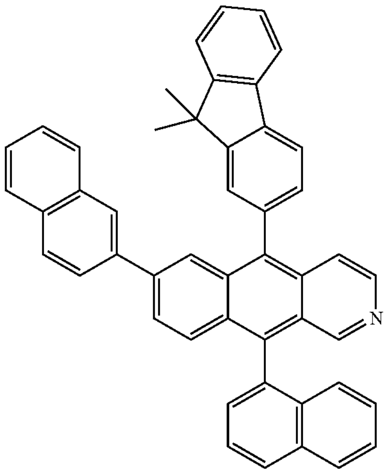
1185
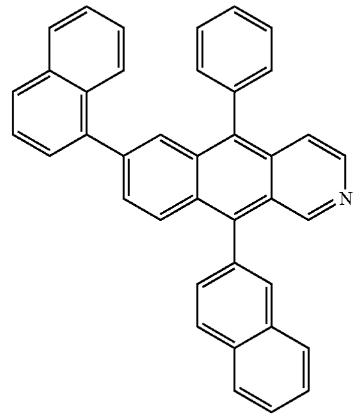
1186
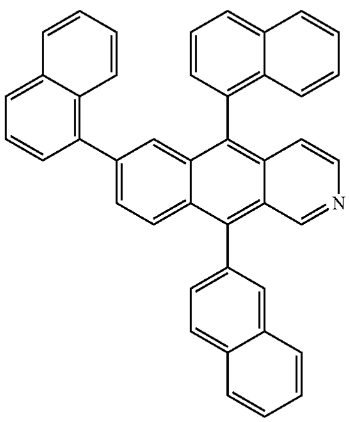
1187
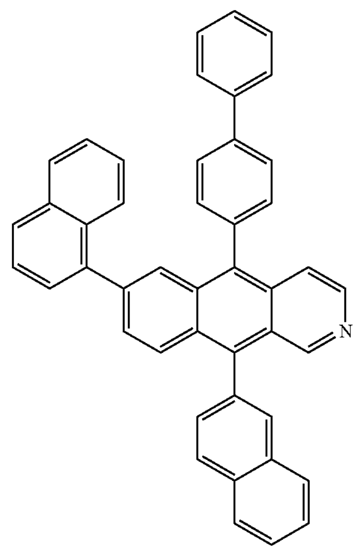
1188
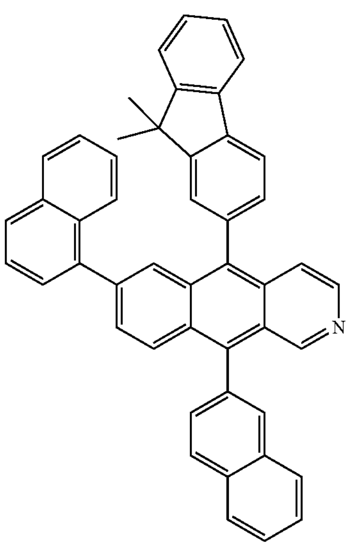
1189
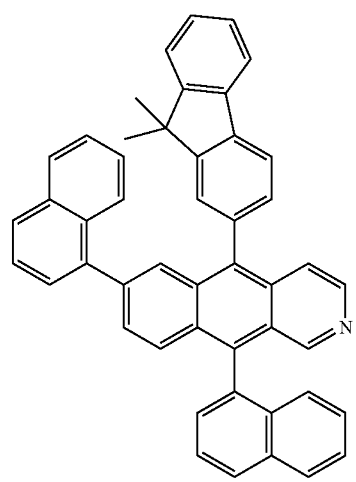

-continued
1190
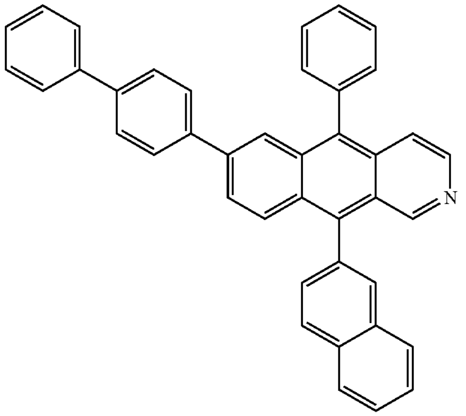
1191
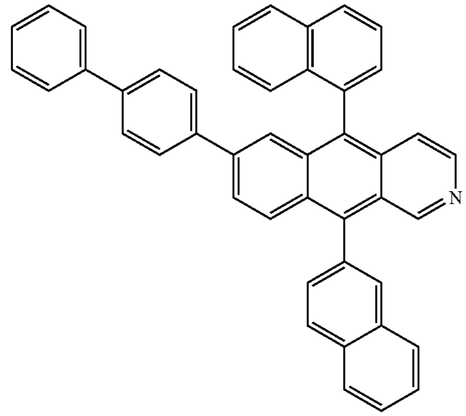
1192
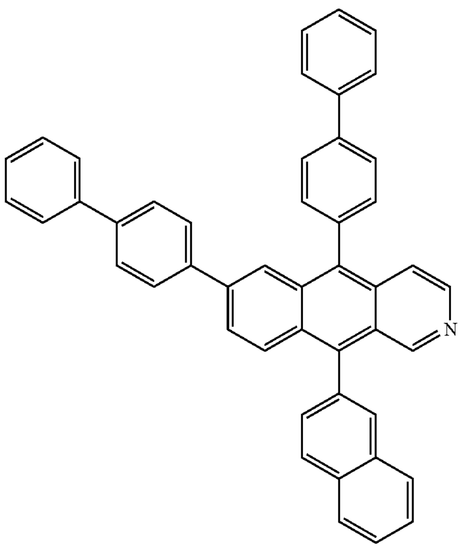
1193
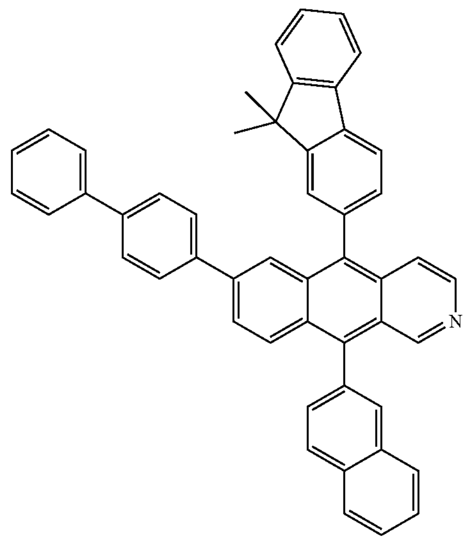
1194
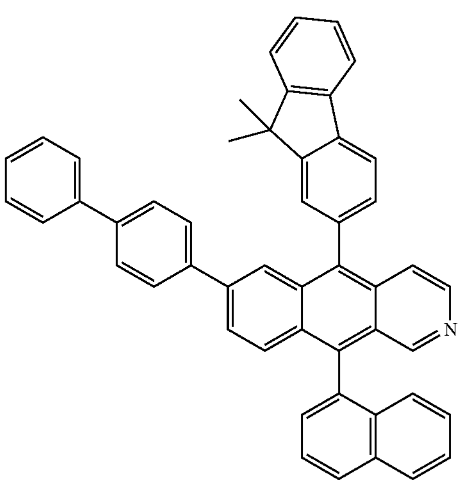
1195
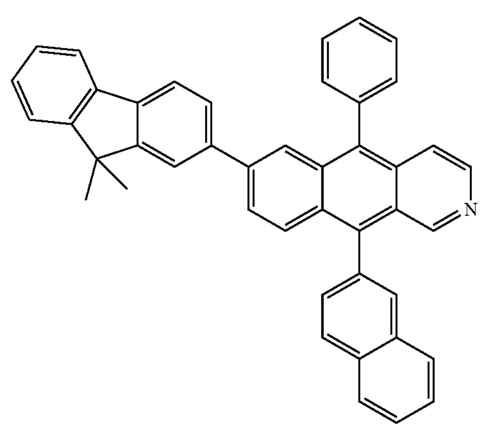

-continued
1196
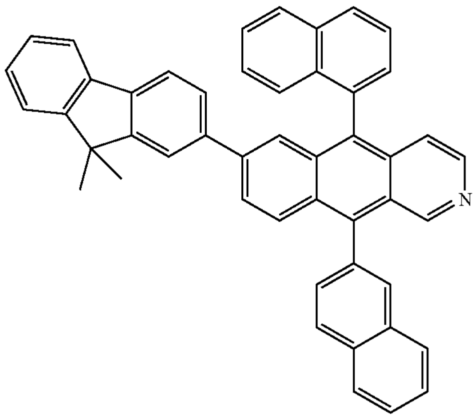
1197
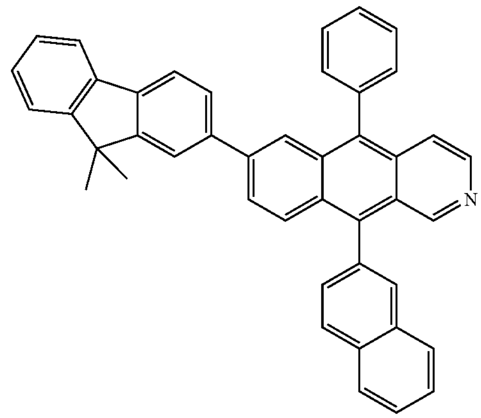
1198
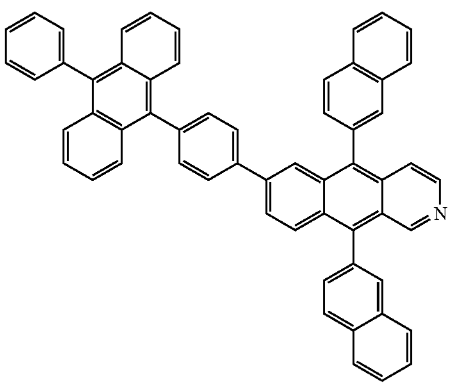
1199
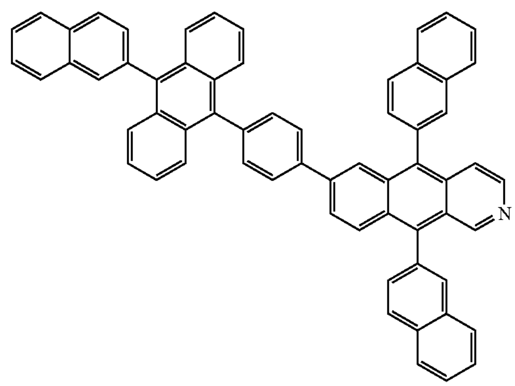
1200
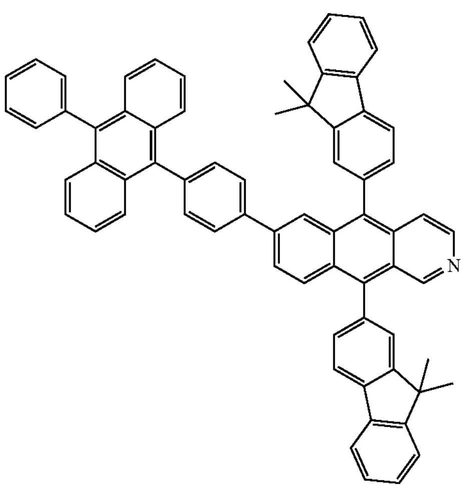
1201
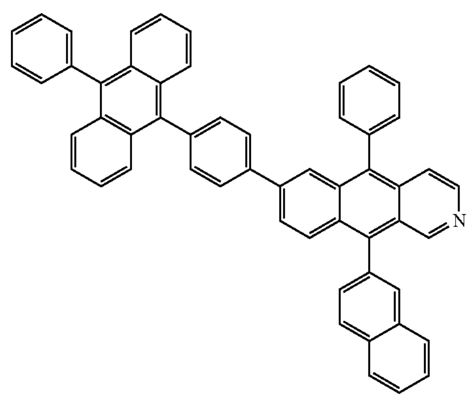

-continued
1202
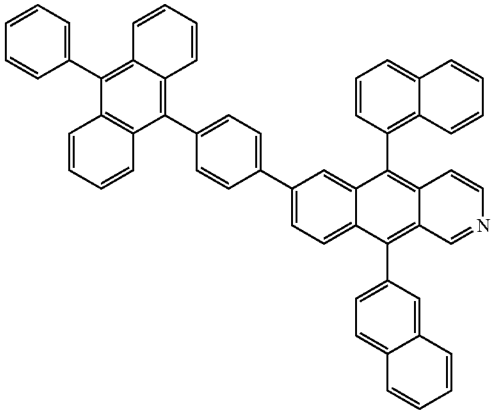
1203
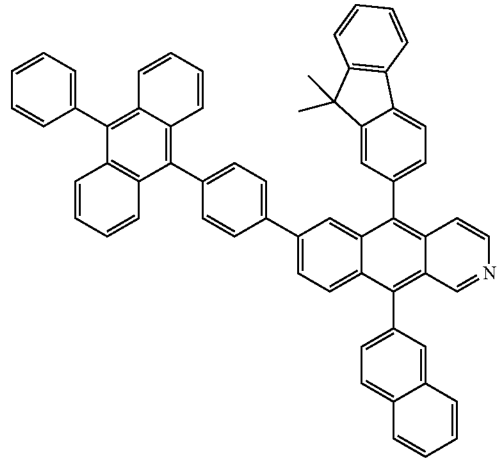
1204
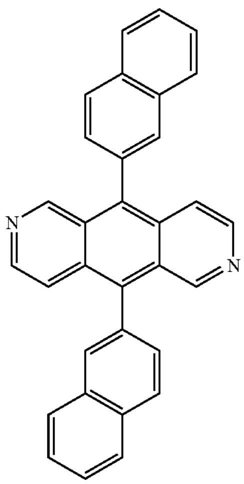
1205
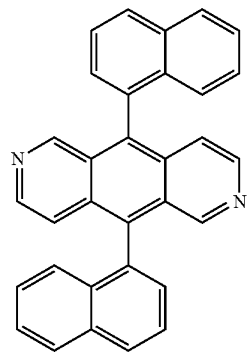
1206
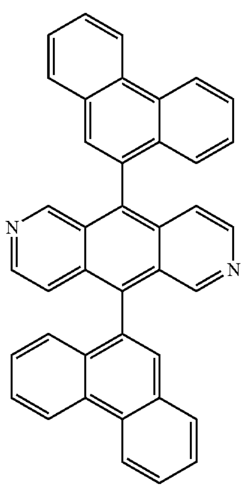
1207
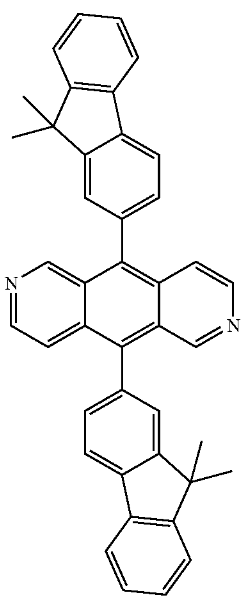

-continued
1208
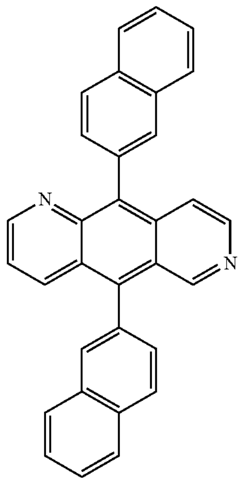
1209
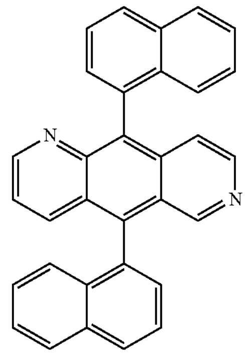
1210
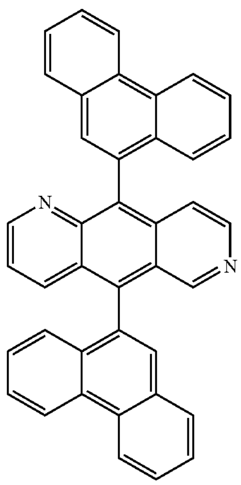
1211
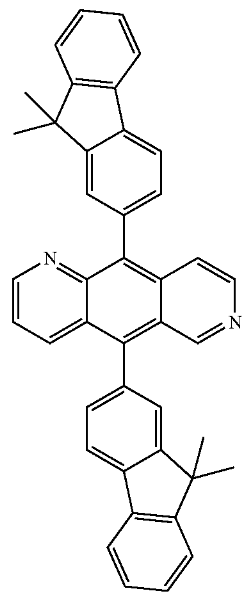
1212
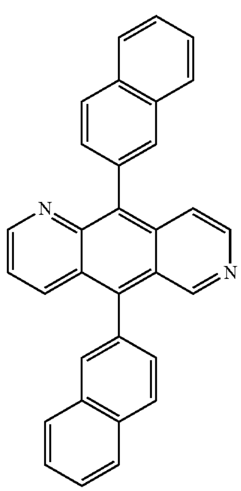
1213
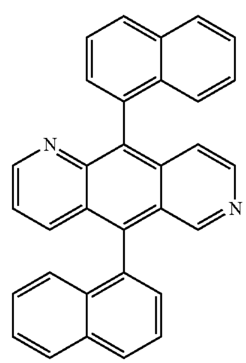

-continued

1214

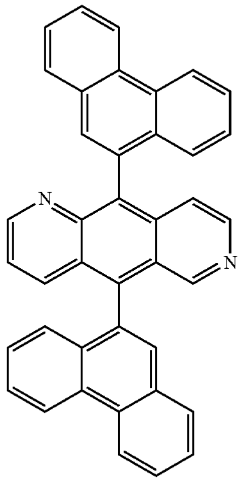

1215

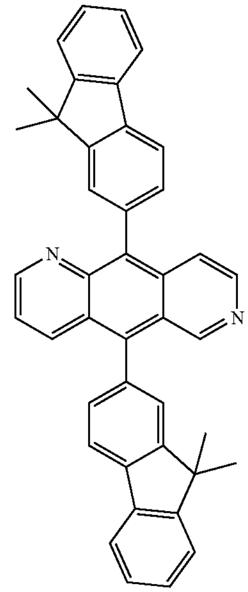

The organic electroluminescent compounds of the present invention can be prepared according to the procedure illustrated by Reaction Scheme (1):

Reaction Scheme 1

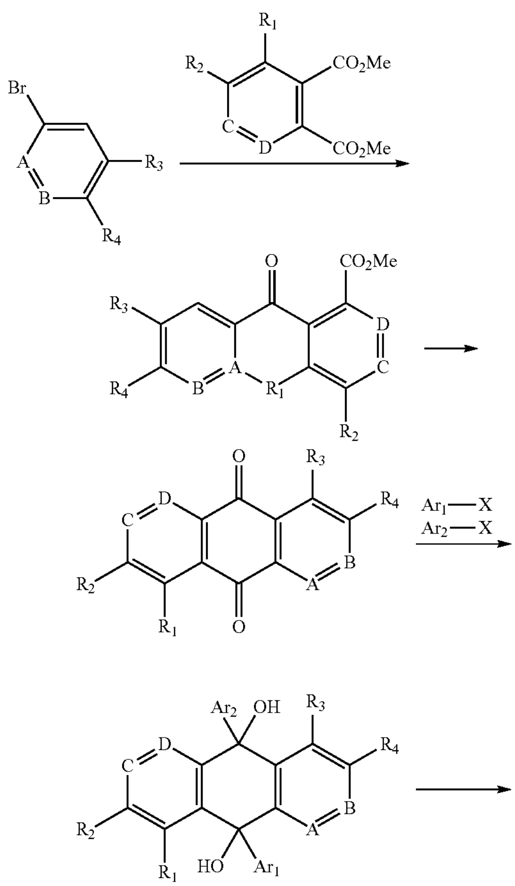

-continued

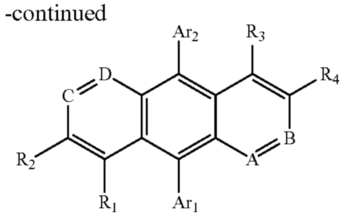

wherein, A, B, C, D, $Ar_1$, $Ar_2$ and $R_1$ through $R_4$ are defined as in Chemical Formula (1), and X represents halogen.

The present invention also provides organic solar cells, which comprises one or more organic electroluminescent compound(s) represented by Chemical Formula (1).

The present invention also provides an organic electroluminescent device which is comprised of a first electrode; a second electrode; and at least one organic layer(s) interposed between the first electrode and the second electrode; wherein the organic layer comprises one or more organic electroluminescent compound(s) represented by Chemical Formula (1).

The organic electroluminescent device according to the present invention is characterized in that the organic layer comprises an electroluminescent layer, which comprises one or more organic electroluminescent compound(s) represented by Chemical Formula (1) as electroluminescent host, and one or more dopant(s). The dopant to be applied to the organic electroluminescent device according to the invention is not particularly restricted, but preferably selected from the compounds represented by one of Chemical Formulas (8) to (10).

Chemical Formula 8

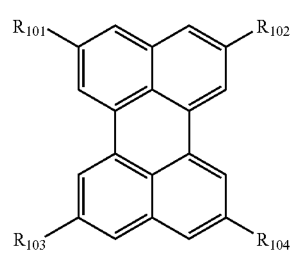

In Chemical Formula (8), $R_{101}$ through $R_{104}$ independently represent hydrogen, halogen, (C1-C60)alkyl, (C6-C60)aryl, (C4-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60) alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro or hydroxyl; or each of $R_{101}$ through $R_{104}$ may be linked to an adjacent substituent via (C3-C60)alkylene or (C3-C60) alkenylene with or without fused ring to form an alicyclic ring, or a monocyclic or polycyclic aromatic ring;

the alkyl, alkenyl, alkynyl, cycloalkyl, heterocycloalkyl, aryl, heteroaryl, arylsilyl, alkylsilyl, alkoxy, aryloxy, arylthio, alkylamino, arylamino of $R_{101}$ through $R_{104}$, or the alicyclic ring, or the monocyclic or polycyclic aromatic ring formed therefrom by linkage to an adjacent substituent via (C3-C60) alkylene or (C3-C60)alkenylene with or without a fused ring may be further substituted by one or more substituent(s) selected from halogen, (C1-C60)alkyl, (C6-C60)aryl, (C4-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60) arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro and hydroxyl.

Chemical Formula 9

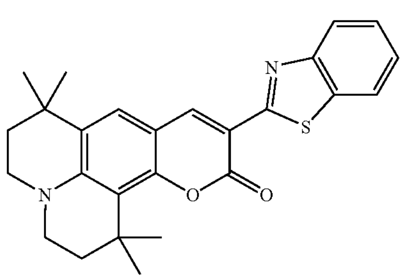

Chemical Formula 10

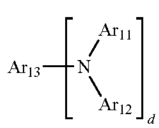

In Chemical Formula (10), $Ar_{11}$ and $Ar_{12}$ independently represent (C1-C60)alkyl, (C6-C60)aryl, (C4-C60)heteroaryl, (C6-C60)arylamino, (C1-C60)alkylamino, 5- or 6-membered heterocycloalkyl containing one or more heteroatom(s) selected from N, O and S, (C3-C60)cycloalkyl, or arylene having one of the structures shown below: or

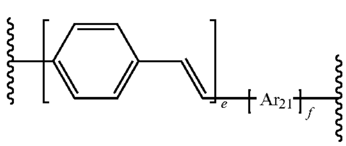

-continued

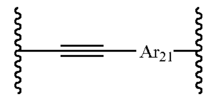

$Ar_{11}$ and $Ar_{12}$ may be linked via (C3-C60)alkylene or (C3-C60)alkenylene with or without a fused ring to form an alicyclic ring, or a monocyclic or polycyclic aromatic ring;

$Ar_{13}$ represents (C6-C60)arylene, (C4-C60)heteroarylene or arylene having one of the structures shown below:

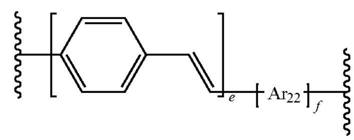

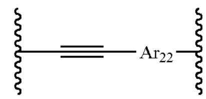

wherein, $Ar_{21}$ and $Ar_{22}$ independently represent (C6-C60) arylene or (C4-C60)heteroarylene;

d is an integer from 1 to 4, e is an integer from 1 to 4, and f is an integer of 0 or 1; and the alkyl, aryl, heteroaryl, arylamino, alkylamino, cycloalkyl or heterocycloalkyl of $Ar_{11}$ and $Ar_{12}$; or the arylene or heteroarylene of $Ar_{13}$, $Ar_{21}$ and $Ar_{22}$ may be further substituted by one or more substituent(s) selected from a group consisting of halogen, (C1-C60)alkyl, (C6-C60)aryl, (C4 C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60) arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro and hydroxyl.

The electroluminescent layer means the layer where electroluminescence occurs, and it may be a single layer or a multi-layer consisting of two or more layers laminated. When a mixture of host-dopant is used according to the constitution of the present invention, noticeable improvement in luminous efficiency by the electroluminescent host according to the invention could be confirmed. Those results can be achieved by doping concentration of 0.5 to 20% by weight. The host according to the present invention exhibits higher hole and electron conductivity, and excellent stability of the material as compared to other conventional host materials, and provides improved device life as well as luminous efficiency.

Thus, it can be described that use of the compound represented by one of Chemical Formulas (8) to (10) as an electroluminescent dopant significantly supplements electronic drawback of the organic electroluminescent compounds of Chemical Formula (1) according to the present invention.

The dopant compounds represented by one of Chemical Formulas (8) to (10) can be exemplified by the following compounds, but are not restricted thereto.

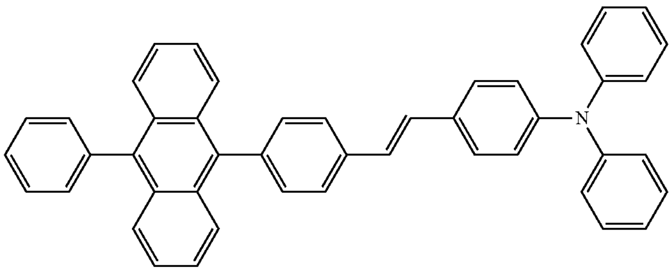
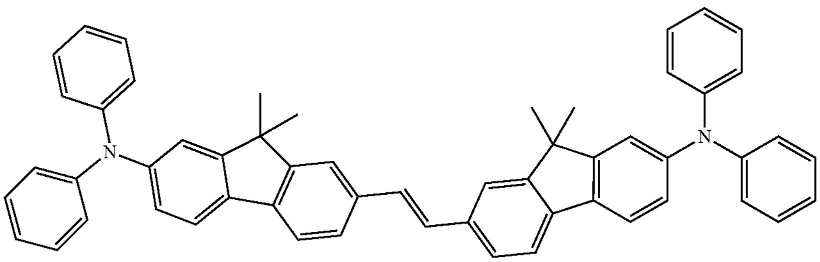
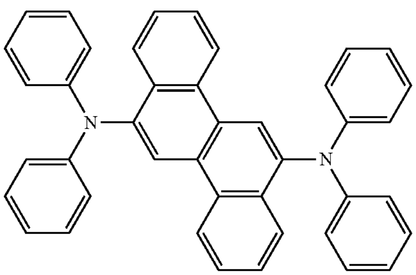
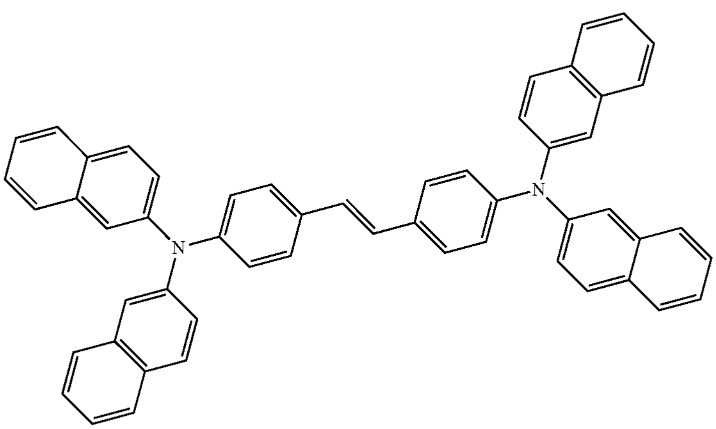
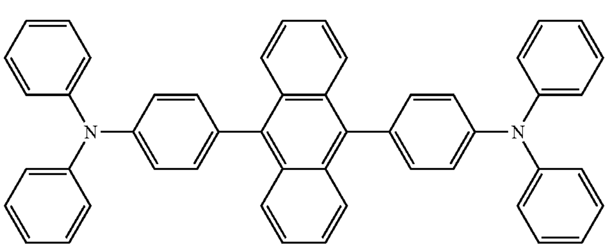

-continued
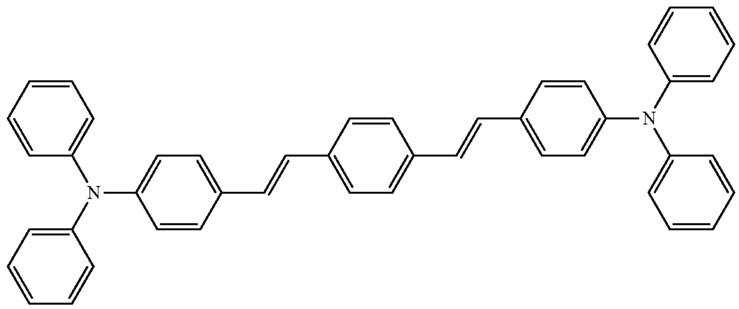
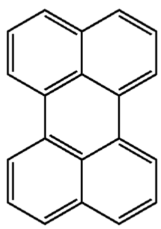
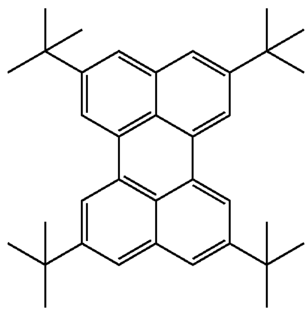
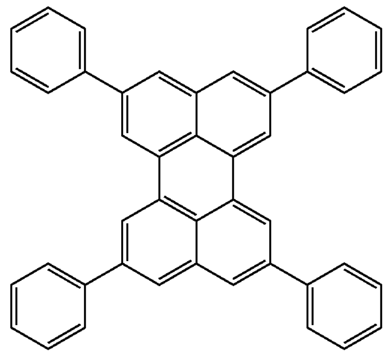
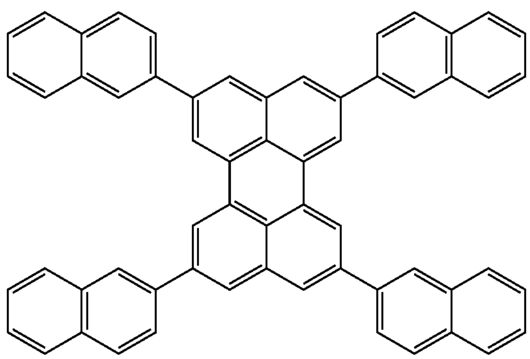
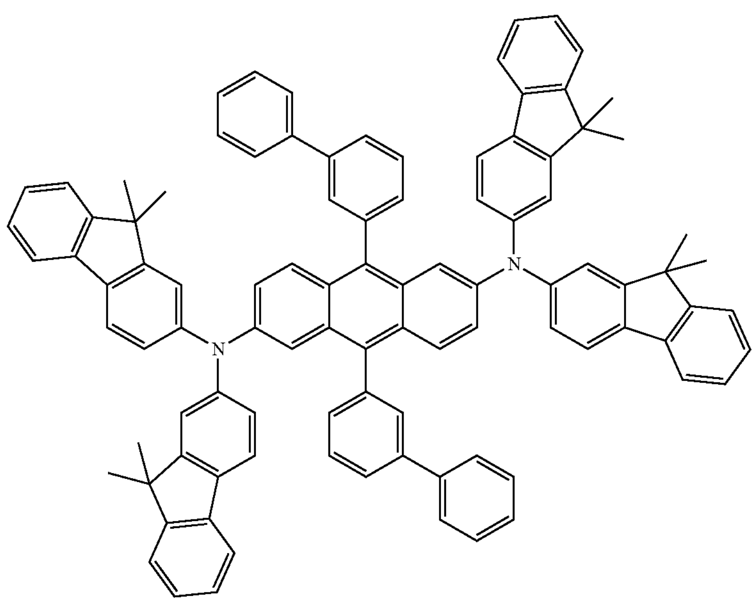

-continued
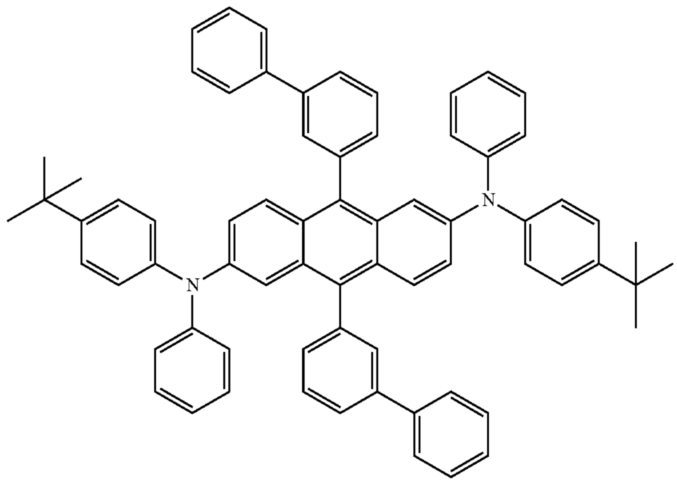
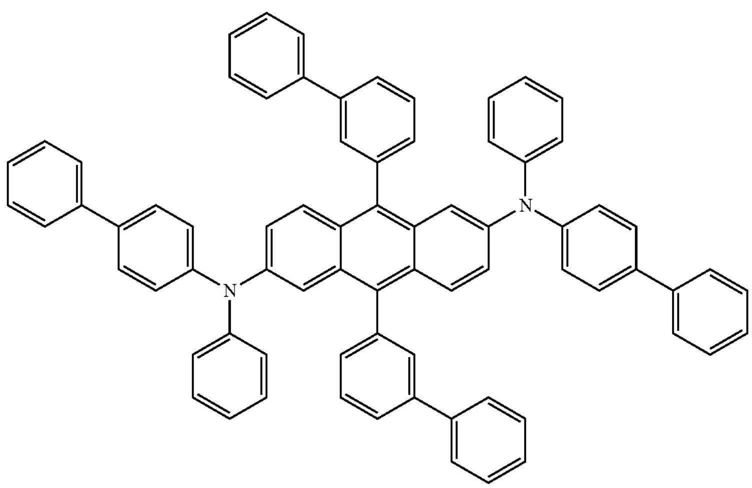
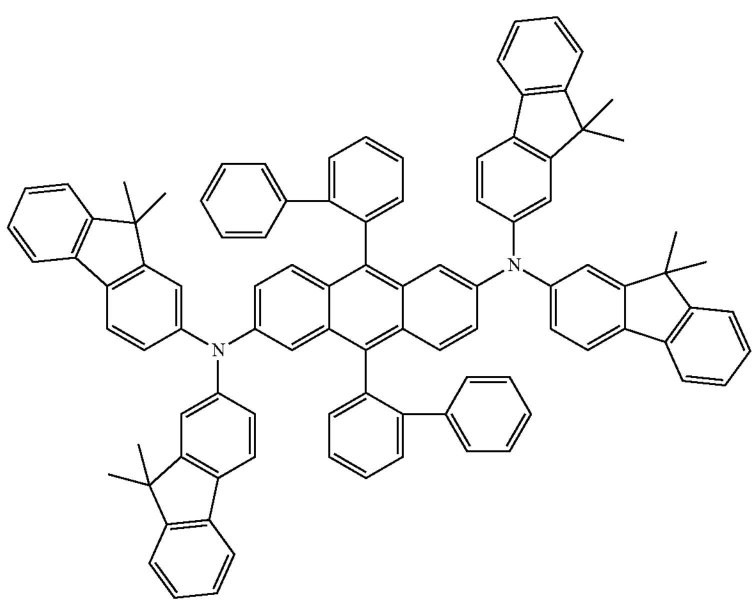

-continued

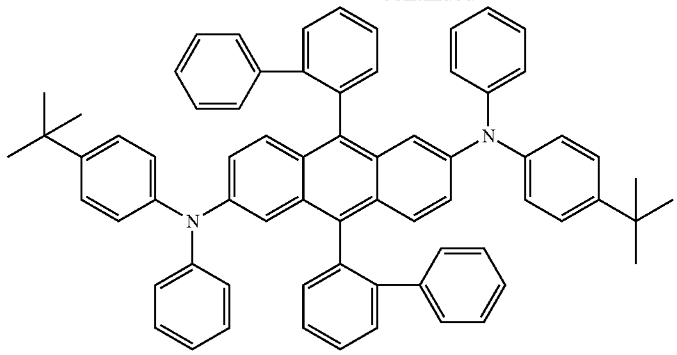

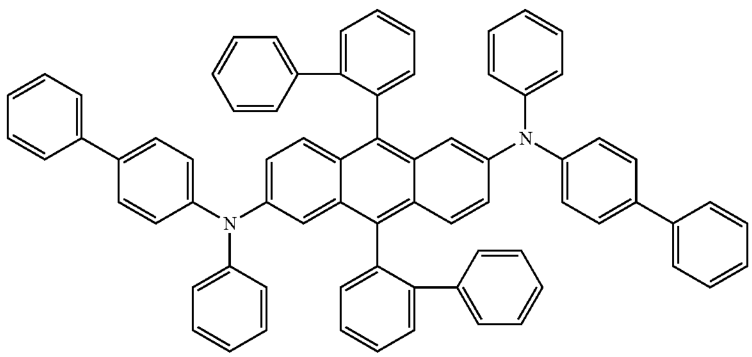

The organic electroluminescent device according to the invention may further comprise one or more compound(s) selected from a group consisting of arylamine compounds and styrylarylamine compounds, as well as the organic electroluminescent compound represented by Chemical Formula (1). Examples of the arylamine or styrylarylamine compounds include the compounds represented by Chemical Formula (11), but they are not restricted thereto:

Chemical Formula 11

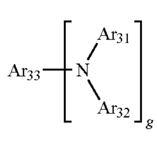

wherein, $Ar_{31}$ and $Ar_{32}$ independently represent (C1-C60) alkyl, (C6-C60)aryl, (C4-C60)heteroaryl, (C6-C60)arylamino, (C1-C60)alkylamino, morpholino, thiomorpholino, 5- or 6-membered heterocycloalkyl containing one or more heteroatom(s) selected from N, O and S, or (C3-C60)cycloalkyl, or $Ar_{31}$ and $Ar_{32}$ may be linked via (C3-C60)alkylene or (C3-C60)alkenylene with or without a fused ring to form an alicyclic ring, or a monocyclic or polycyclic aromatic ring; the aryl, heteroaryl, arylamino or heterocycloalkyl of $Ar_{31}$ and $Ar_{32}$ may be further substituted by one or more substituent(s) selected from halogen, (C1-C60)alkyl, (C2-C60)alkenyl, (C2-C60)alkynyl, (C6-C60)aryl, (C4-C60)heteroaryl, 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60) arylsilyl, tri(C6-C60)arylsilyl, adamantyl, (C7-C60)bicycloalkyl, (C1-C60)alkoxy, cyano, (C1-C60)alkylamino, (C6-C60)arylamino, (C6-C60)ar(C1-C60)alkyl, (C6-C60) aryloxy, (C1-C60)alkylthio, (C6-C60)arylthio, (C1-C60) alkoxycarbonyl, (C1-C60)alkylcarbonyl, (C6-C60) arylcarbonyl, carboxyl, nitro and hydroxyl;

$Ar_{33}$ represents (C6-C60)aryl, (C5-C60)heteroaryl or (C6-C60)arylamino; the aryl, heteroaryl or arylamino of $Ar_{33}$ may be further substituted by one or more substituent(s) selected from halogen, (C1-C60)alkyl, (C6-C60)aryl, (C4-C60)heteroaryl, 5- or 6-membered heterocycloalkyl containing one or more heteroatom(s) selected from N, O and S, (C3-C60) cycloalkyl, tri(C1-C60)alkylsilyl, di(C1-C60)alkyl(C6-C60) arylsilyl, tri(C6-C60)arylsilyl, adamantyl, (C7-C60)bicycloalkyl, (C2-C60)alkenyl, (C2-C60)alkynyl, (C1-C60) alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60) alkylcarbonyl, (C6-C60)arylcarbonyl, carboxyl, nitro and hydroxyl; and g is an integer from 1 to 4.

The arylamine compounds and styrylarylamine compounds may be more specifically exemplified by the following compounds, but are not restricted thereto.

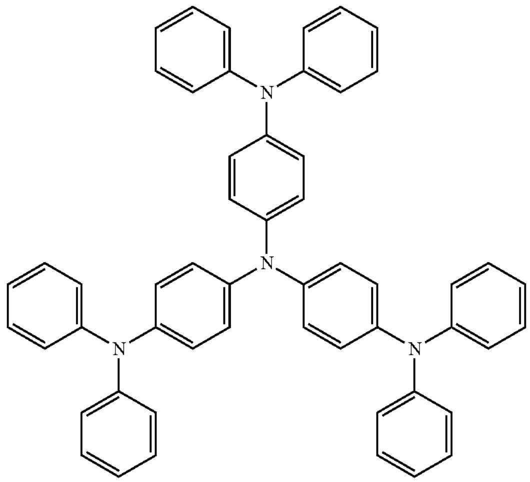
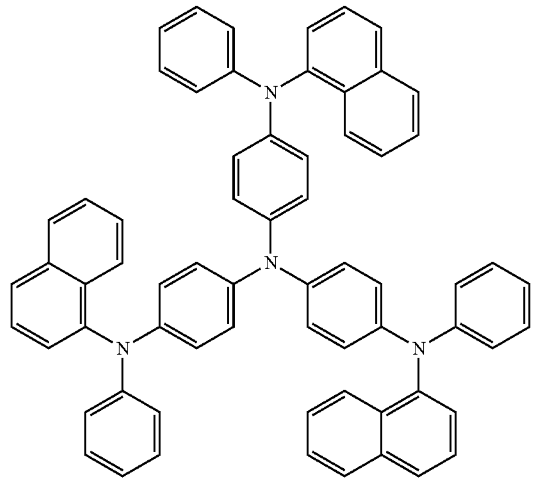
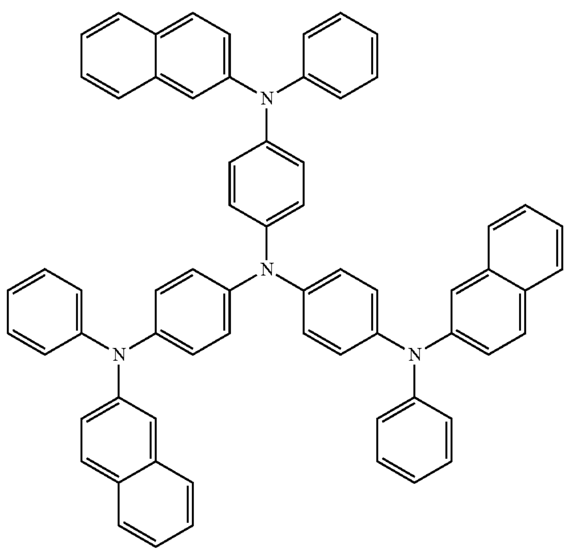
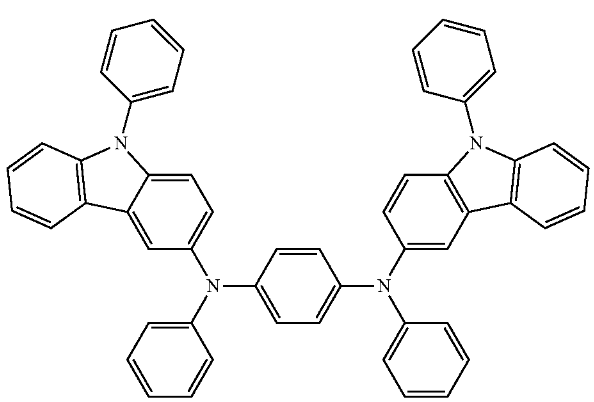

-continued
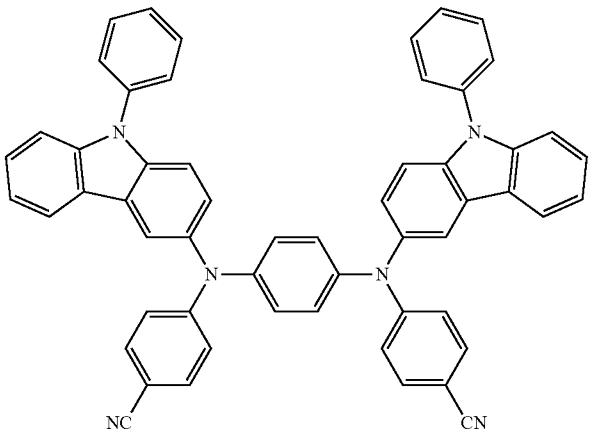
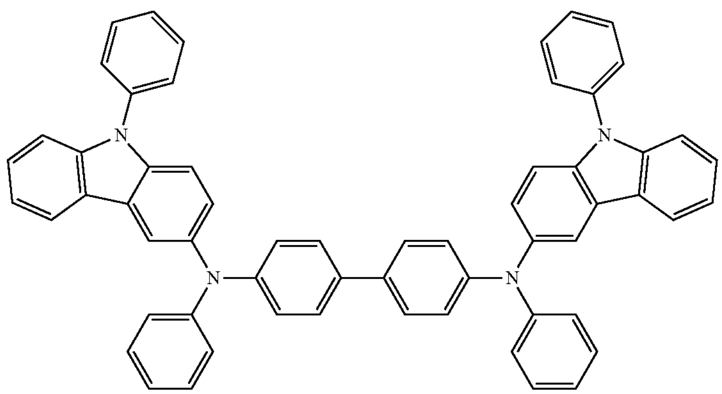
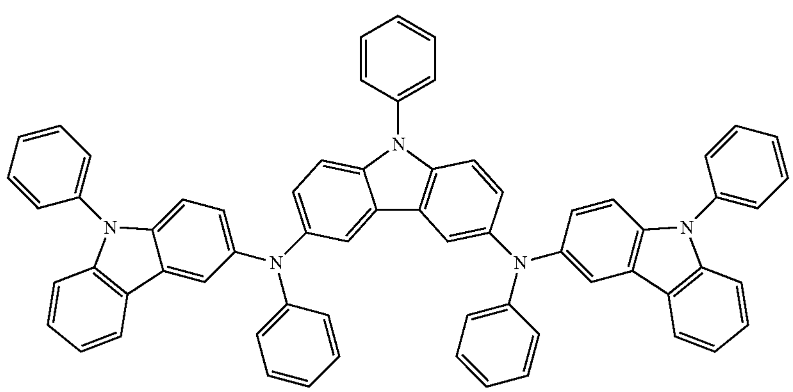
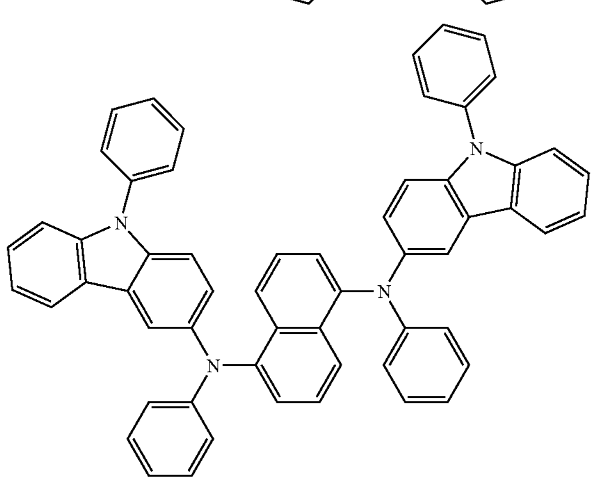
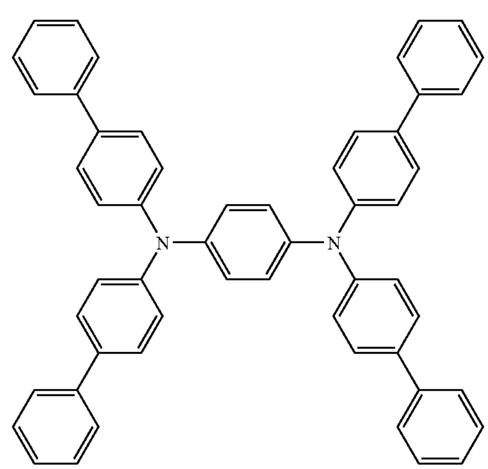

-continued
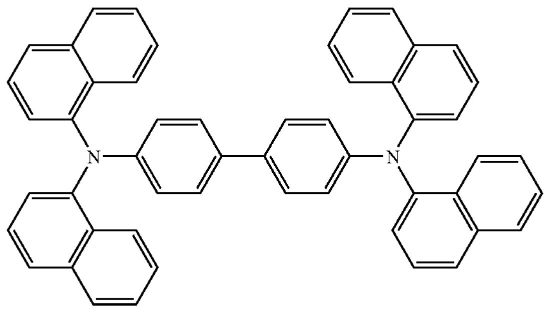
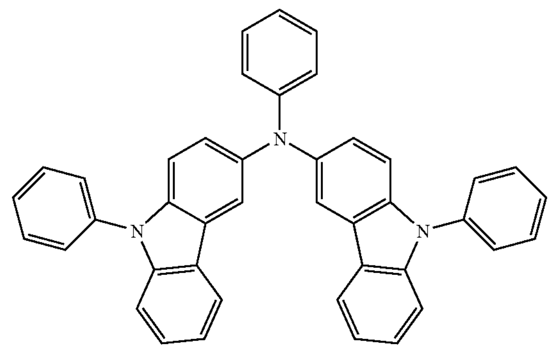
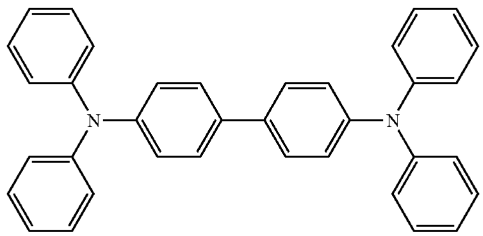
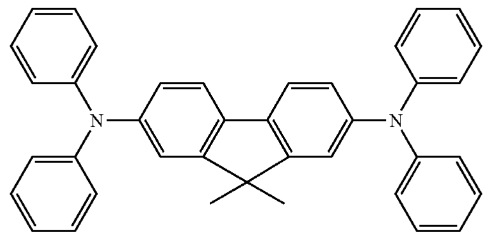
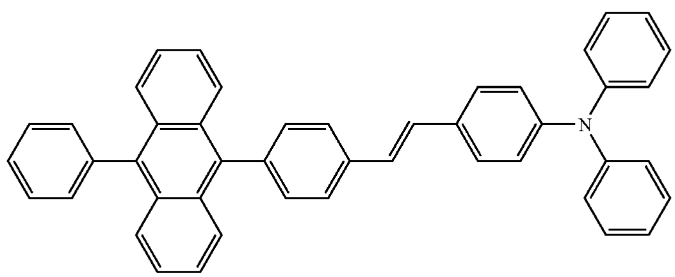
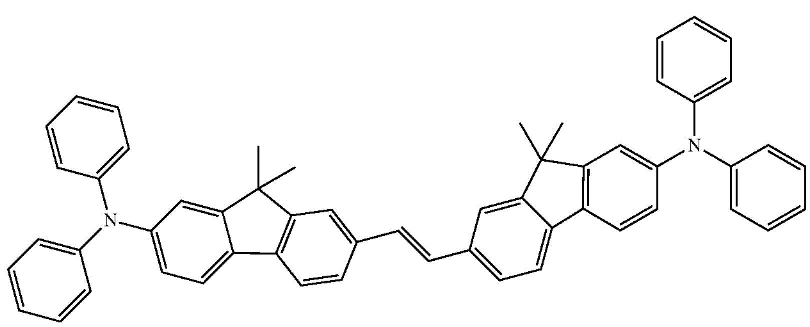
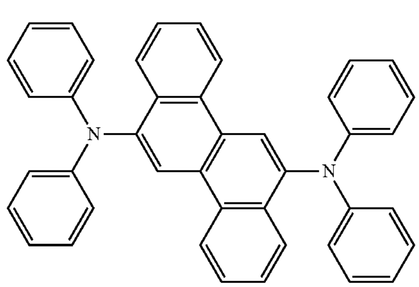

-continued
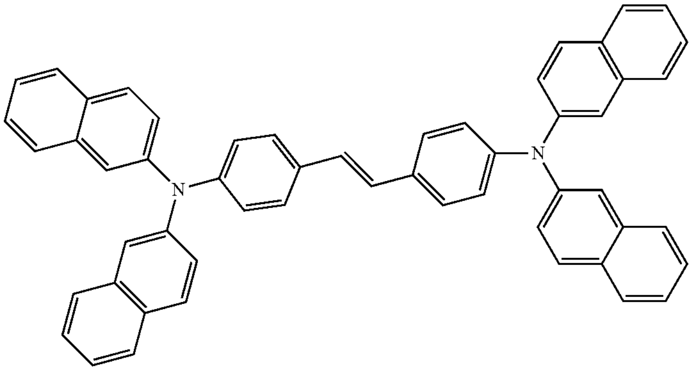
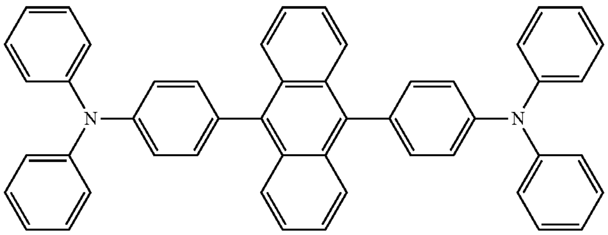
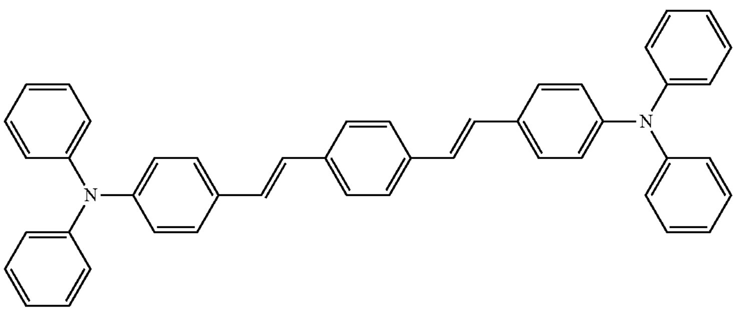
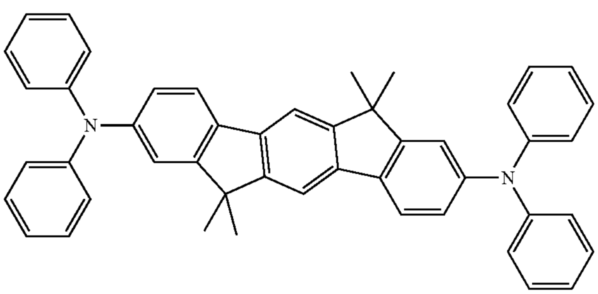
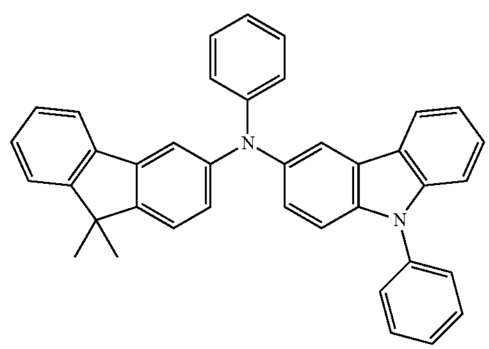
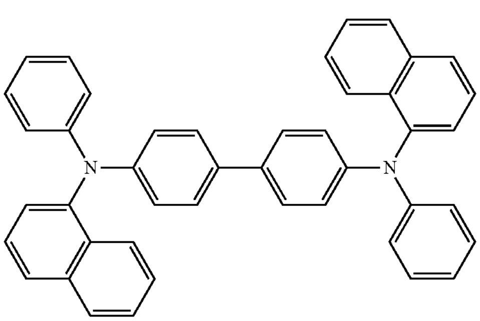

In an organic electroluminescent device according to the present invention, the organic layer may further comprise one or more metal(s) selected from a group consisting of organic metals of Group 1, Group 2, $4^{th}$ period and $5^{th}$ period transition metals, lanthanide metals and d-transition elements from the Periodic Table of Elements, as well as the organic electroluminescent compound represented by Chemical Formula (1). The organic layer may comprise a charge generating layer in addition to the electroluminescent layer.

The present invention can realize an organic electroluminescent device having a pixel structure of independent light-emitting mode, which comprises an organic electroluminescent device containing the organic electroluminescent compound of Chemical Formula (1) as a sub-pixel and one or more sub-pixel(s) comprising one or more metallic compound(s) selected from a group consisting of Ir, Pt, Pd, Rh, Re, Os, Tl, Pb, Bi, In, Sn, Sb, Te, Au and Ag, patterned in parallel at the same time.

Further, the organic electroluminescent device is an organic display wherein the organic layer comprises, in addition to the organic electroluminescent compound represented by Chemical Formula (1), one or more compound(s) selected from compounds having the electroluminescent peak of wavelength of not less than 560 nm, at the same time. The compounds having the electroluminescent peak of wavelength of not less than 560 nm may be exemplified by the compounds represented by one of Chemical Formulas (12) to (16), but they are not restricted thereto.

$M^1L^{11}L^{12}L^{13}$ Chemical Formula 12

In Chemical Formula (12), $M^1$ is selected from metals of Groups 7, 8, 9, 10, 11, 13, 14, 15 and 16 in the Periodic Table of Elements, and ligands $L^{11}$, $L^{12}$ and $L^{13}$ are independently selected from the following structures:

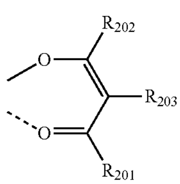

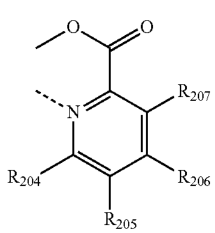

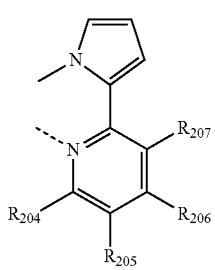

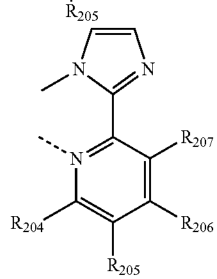

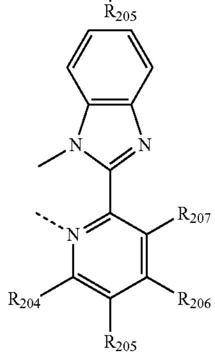

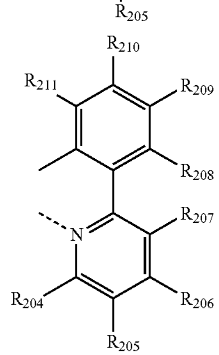

-continued

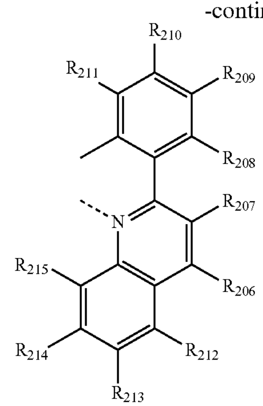

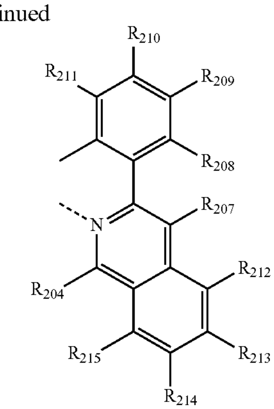

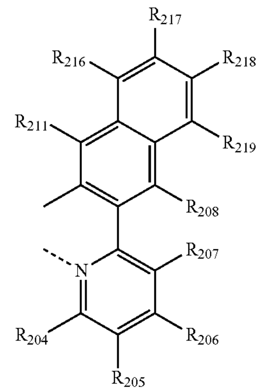

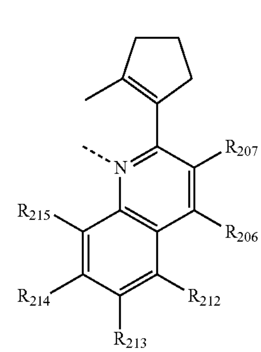

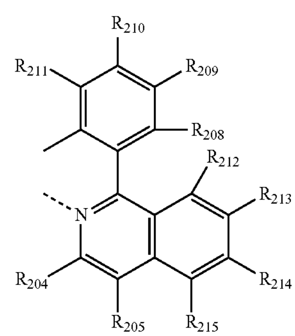

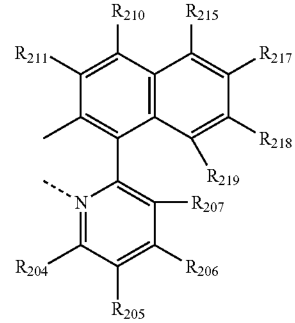

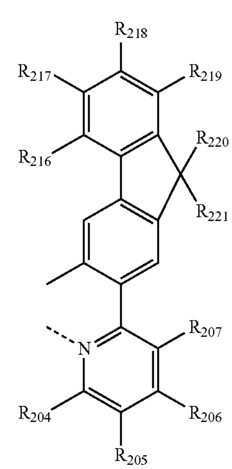

-continued

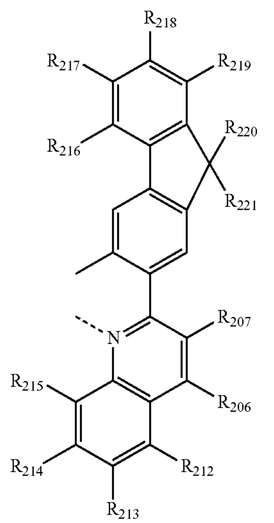

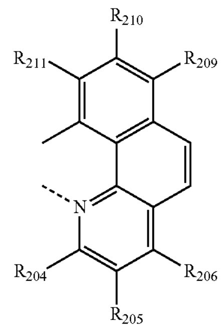

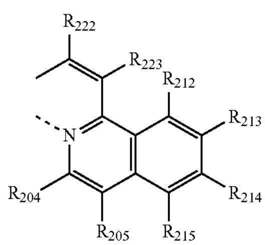

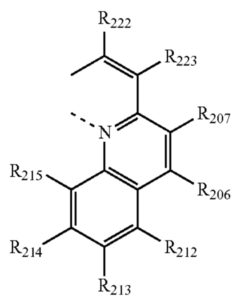

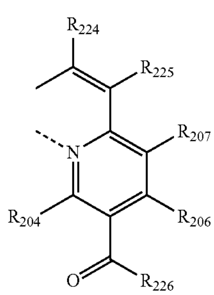

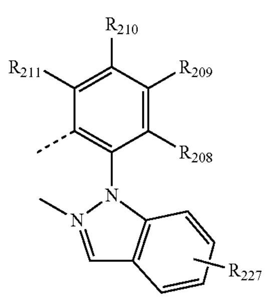

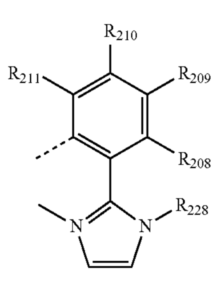

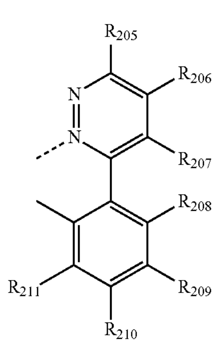

-continued

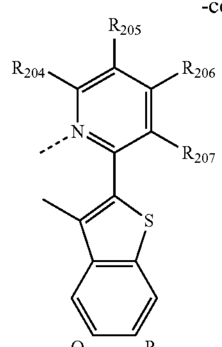

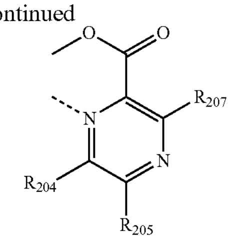

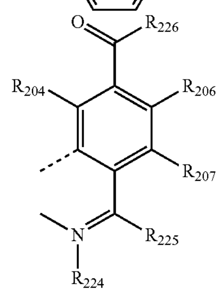

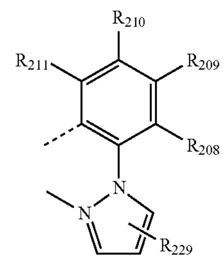

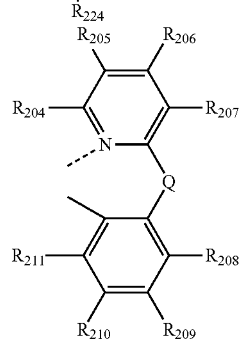

wherein, $R_{201}$ through $R_{203}$ independently represent hydrogen, (C1-C60)alkyl with or without halogen substituent(s), (C6-C60)aryl with or without (C1-C60)alkyl substituent(s), or halogen;

$R_{204}$ through $R_{219}$ independently represent hydrogen, (C1-C60)alkyl, (C1-C30)alkoxy, (C3-C60)cycloalkyl, (C2-C30) alkenyl, (C6-C60)aryl, mono or di(C1-C30)alkylamino, mono or di(C6-30)arylamino, $SF_5$, tri(C1-C30)alkylsilyl, di(C1-C30)alkyl(C6-C30)arylsilyl, tri(C6-C30)arylsilyl, cyano or halogen; and the alkyl, cycloalkyl, alkenyl or aryl of $R_{204}$ through $R_{219}$ may be further substituted by one or more substituent(s) selected from (C1-C60)alkyl, (C6-C60)aryl and halogen;

$R_{220}$ through $R_{223}$ independently represent hydrogen, (C1-C60)alkyl with or without halogen substituent(s), (C6-C60) aryl with or without (C1-C60)alkyl substituent(s);

$R_{224}$ and $R_{225}$ independently represent hydrogen, (C1-C60)alkyl, (C6-C60)aryl or halogen, or $R_{224}$ and $R_{225}$ may be linked via (C3-C12)alkylene or (C3-C12)alkenylene with or without a fused ring to form an alicyclic ring, or a monocyclic or polycyclic aromatic ring; the alkyl or aryl of $R_{224}$ and $R_{225}$, or the alicyclic ring, or the monocyclic or polycyclic aromatic ring formed therefrom via (C3-C12)alkylene or (C3-C12) alkenylene with or without a fused ring may be further substituted by one or more substituent(s) selected from (C1-C60) alkyl with or without halogen substituent(s), (C1-C30) alkoxy, halogen, tri(C1-C30)alkylsilyl, tri(C6-C30)arylsilyl and (C6-C60)aryl;

$R_{226}$ represents (C1-C60)alkyl, (C6-C60)aryl, (C5-C60) heteroaryl or halogen;

$R_{227}$ through $R_{229}$ independently represent hydrogen, (C1-C60)alkyl, (C6-C60)aryl or halogen; the alkyl or aryl of $R_{226}$ through $R_{229}$ may be further substituted by halogen or (C1-C60)alkyl;

Q represents

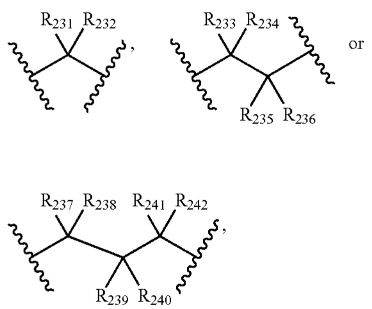

and $R_{231}$ through $R_{242}$ independently represent hydrogen, (C1-C60)alkyl with or without halogen substituent(s), (C1-C30)alkoxy, halogen, (C6-C60)aryl, cyano or (C5-C60)cycloalkyl, or each of $R_{231}$ through $R_{242}$ may be linked to an adjacent substituent via alkylene or alkenylene to form a (C5-C7) spiro-ring or a (C5-C9) fused ring, or each of them may be linked to $R_{207}$ or $R_{208}$ via alkylene or alkenylene to form a (C5-C7) fused ring.

Chemical Formula 13

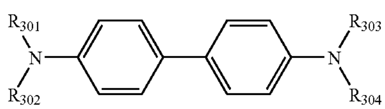

In Chemical Formula (13), $R_{301}$ through $R_{304}$ independently represent (C1-C60)alkyl or (C6-C60)aryl, or each of them may be linked to an adjacent substituent via (C3-C60) alkylene or (C3-C60)alkenylene with or without a fused ring to form an alicyclic ring, or a monocyclic or polycyclic aromatic ring; and the alkyl or aryl of $R_{301}$ through $R_{304}$, or the alicyclic ring, or the monocyclic or polycyclic aromatic ring formed therefrom by linkage via (C3-C60)alkylene or (C3-C60)alkenylene with or without a fused ring may be further substituted by one or more substituent(s) selected from (C1-C60)alkyl with or without halogen substituent(s), (C1-C60) alkoxy, halogen, tri(C1-C60)alkylsilyl, tri(C6-C60)arylsilyl and (C6-C60)aryl.

Chemical Formula 14

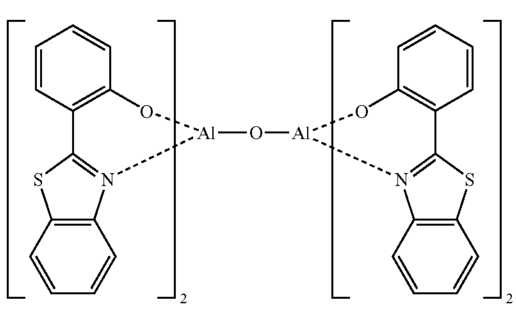

-continued

Chemical Formula 15

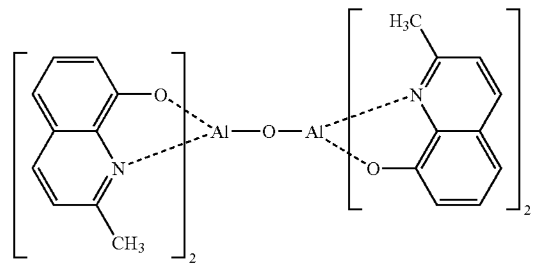

$L^{24}L^{25}M^{2}(T)_{h}$ Chemical Formula 16

In Chemical Formula (16), the ligands, $L^{24}$ and $L^{25}$ are independently selected from the following structures:

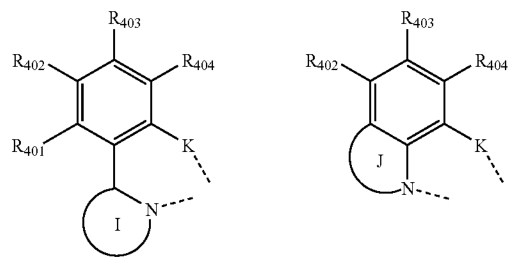

$M^2$ is a bivalent or trivalent metal;

h is 0 when $M^2$ is a bivalent metal, while h is 1 when $M^2$ is a trivalent metal;

T represents (C6-C60)aryloxy or tri(C6-C60)arylsilyl, and the aryloxy and triarylsilyl of T may be further substituted by (C1-C60)alkyl or (C6-C60)aryl;

K represents O, S or Se;

ring I represents oxazole, thiazole, imidazole, oxadiazole, thiadiazole, benzoxazole, benzothiazole, benzimidazole, pyridine or quinoline;

ring J represents pyridine or quinoline, and ring J may be further substituted by (C1-C60)alkyl, or phenyl or naphthyl with or without (C1-C60)alkyl substituent(s);

$R_{401}$ through $R_{404}$ independently represent hydrogen, (C1-C60)alkyl, halogen, tri(C1-C60)alkylsilyl, tri(C6-C60)arylsilyl or (C6-C60)aryl, or each of them may be linked to an adjacent substituent via (C3-C60)alkylene or (C3-C60)alkenylene to form a fused ring; the pyridine or quinoline may form a chemical bond with $R_{401}$ to form a fused ring; and ring I or the aryl group of $R_{401}$ through $R_{404}$ may be further substituted by (C1-C60)alkyl, halogen, (C1-C60)alkyl with halogen substituent(s), phenyl, naphthyl, tri(C1-C60)alkylsilyl, tri(C6-C60)arylsilyl or amino group.

The compounds having electroluminescent peak of wavelength of not less than 560 nm, can be exemplified by the following compounds, but they are not restricted thereto.

-continued
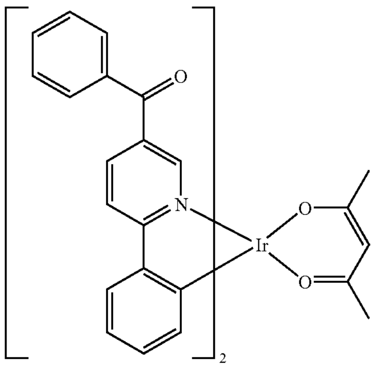
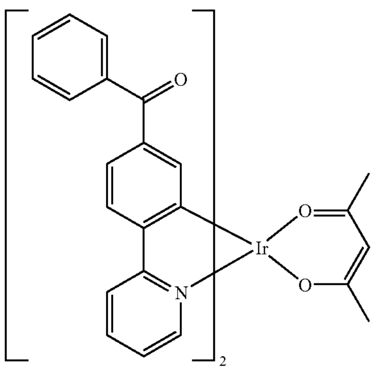
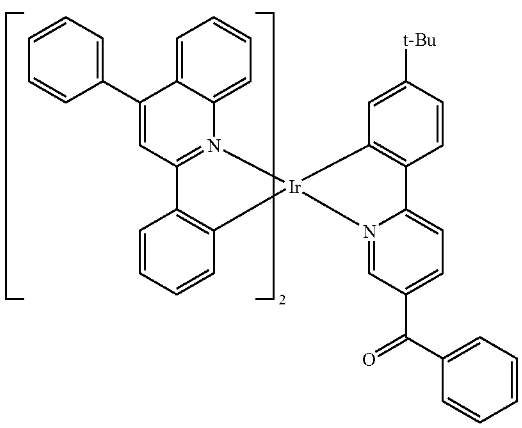
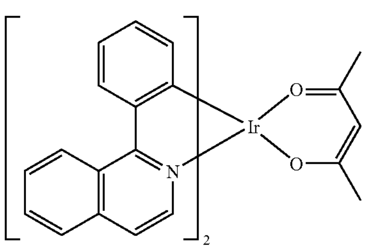
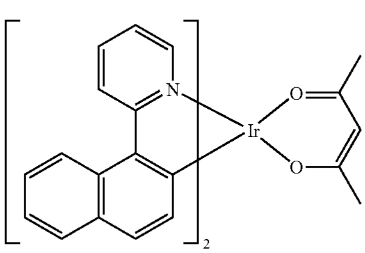
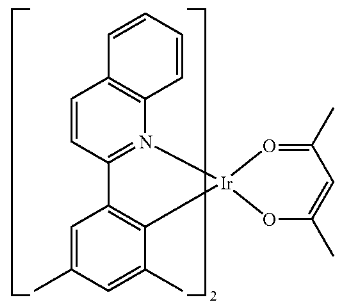
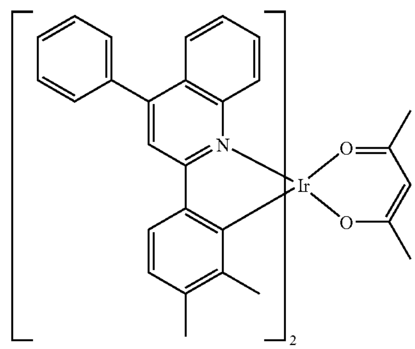
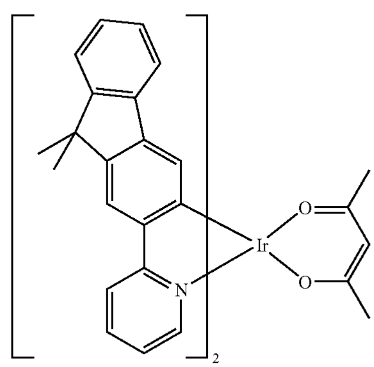
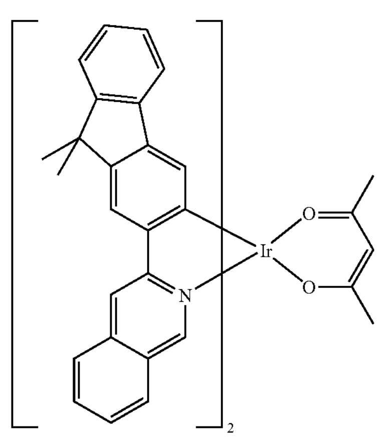

-continued
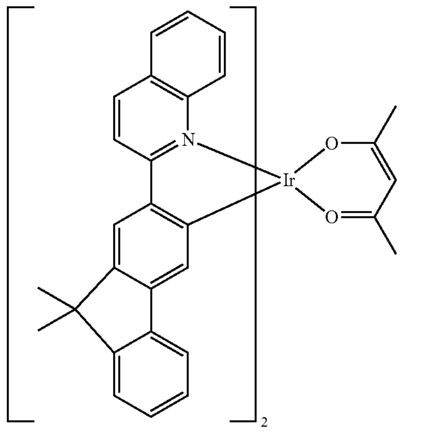
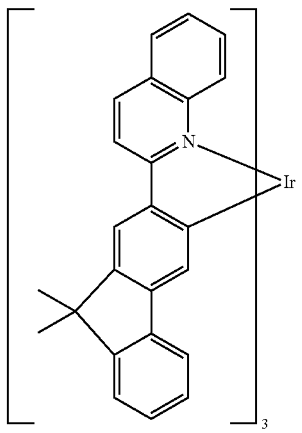
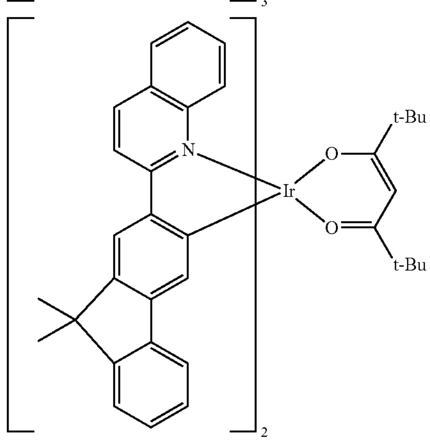
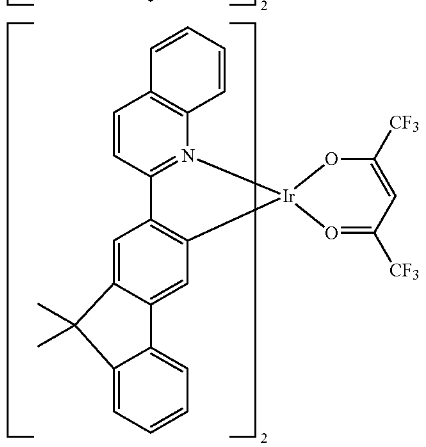
-continued
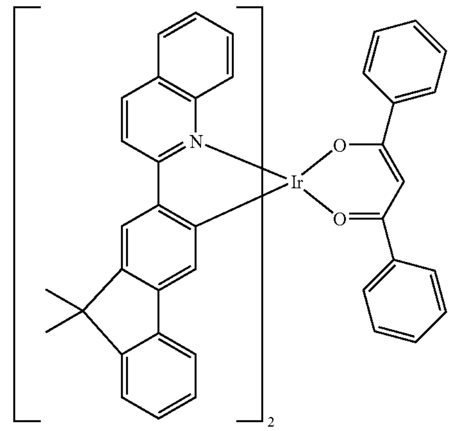
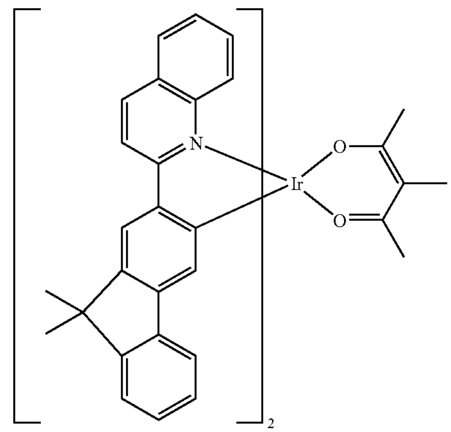
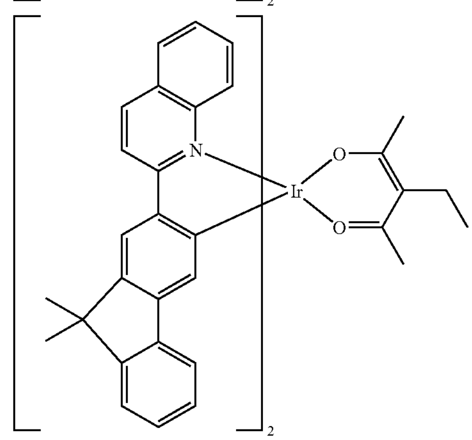
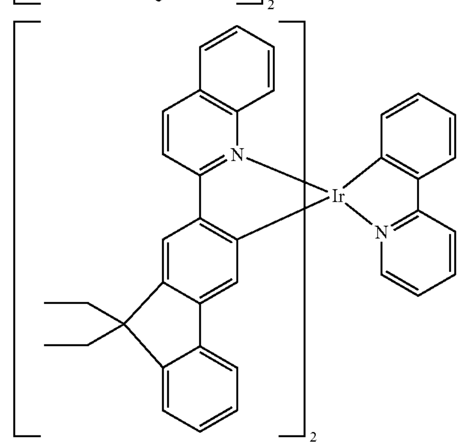

-continued
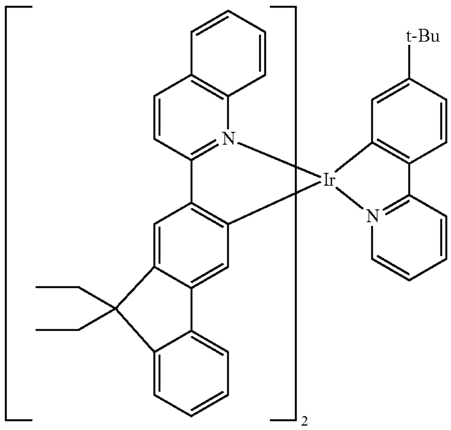
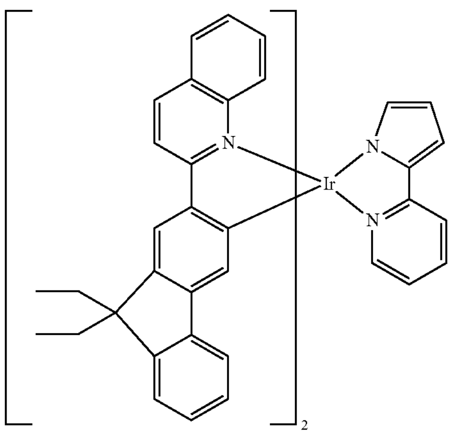
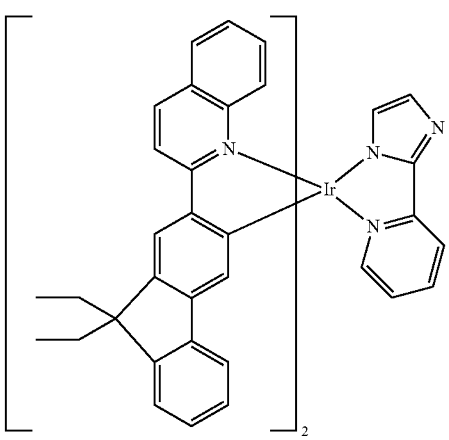
-continued
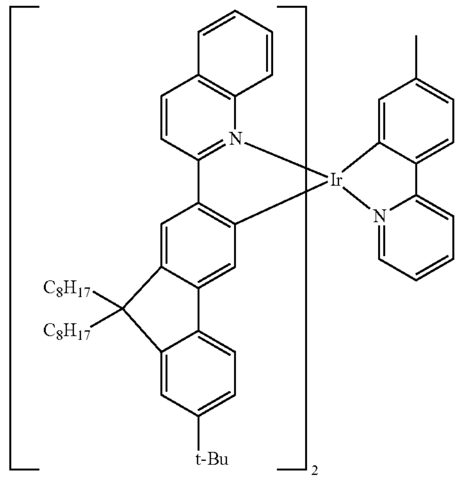
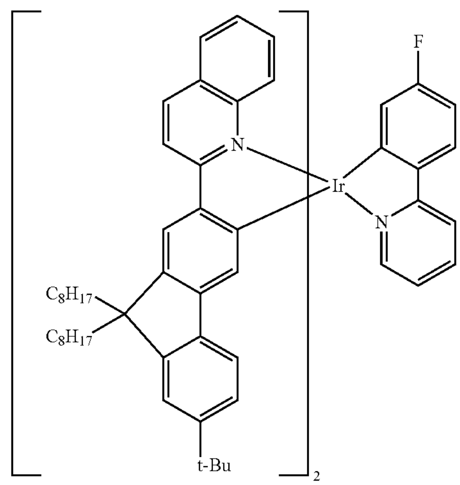
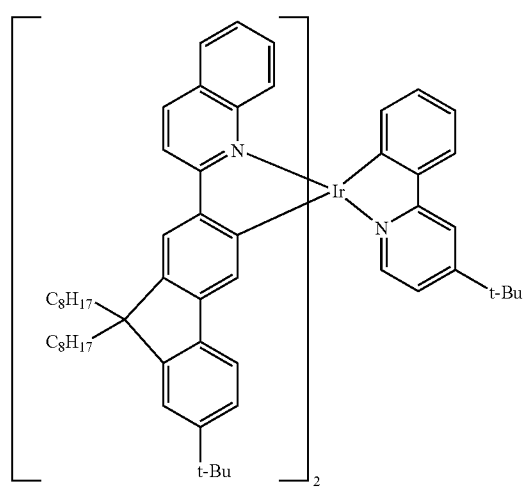

-continued
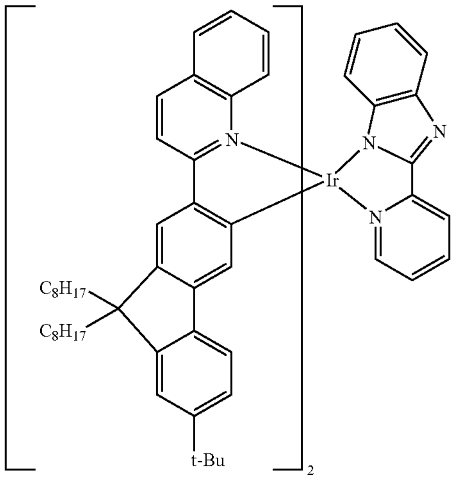
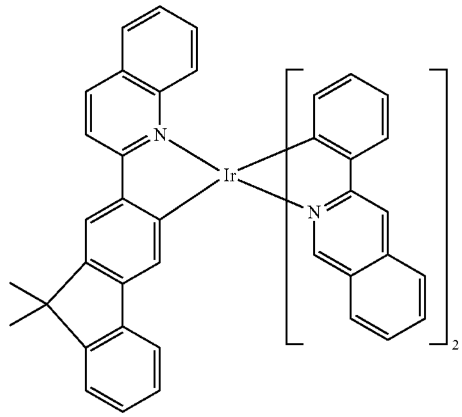
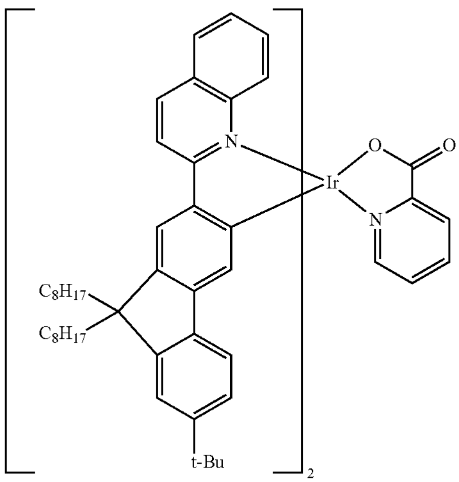
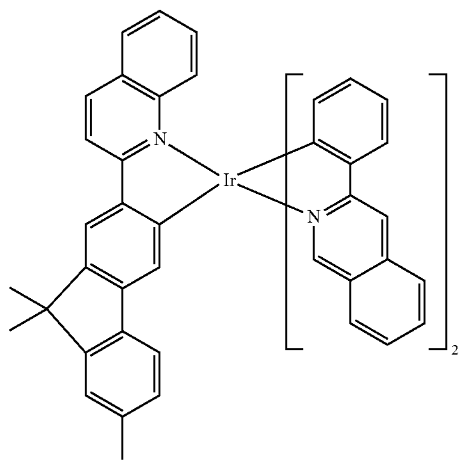
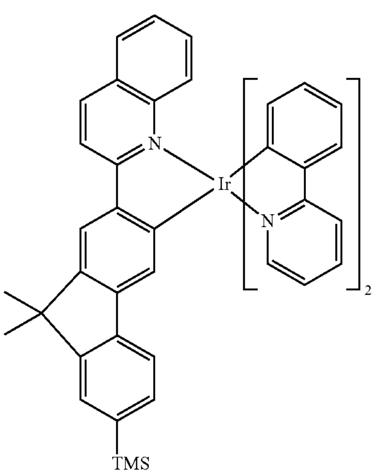
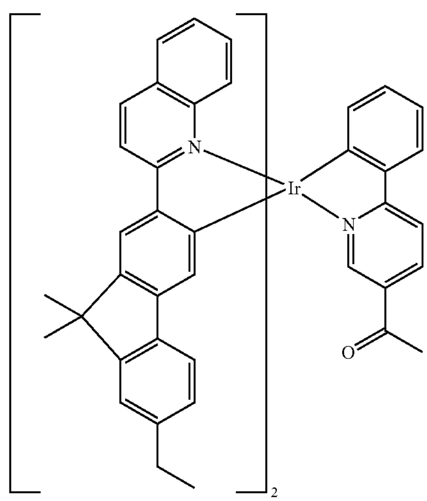

-continued
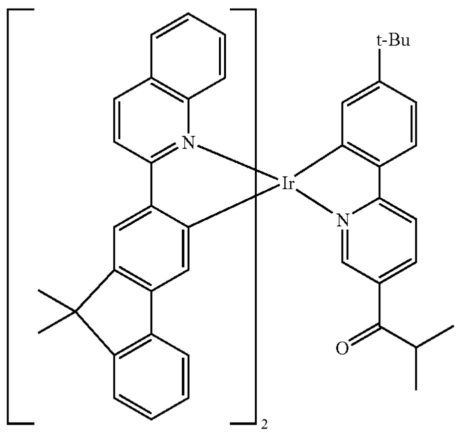
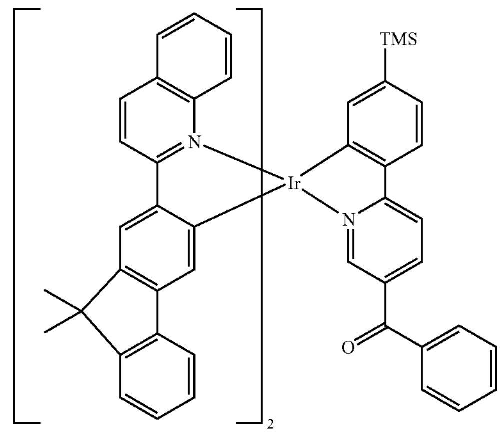
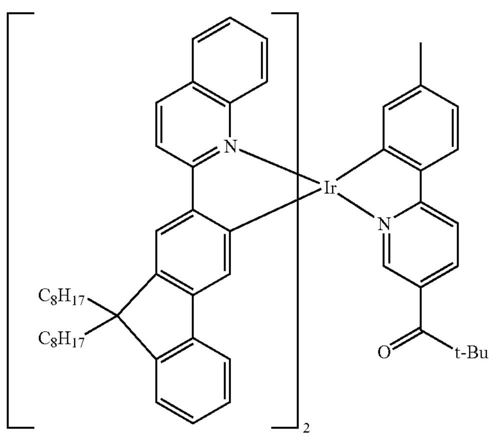
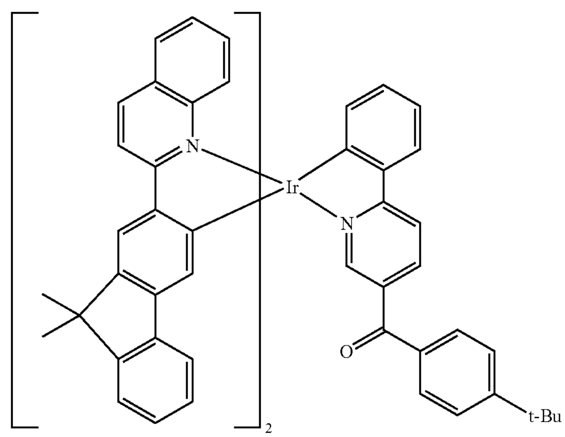
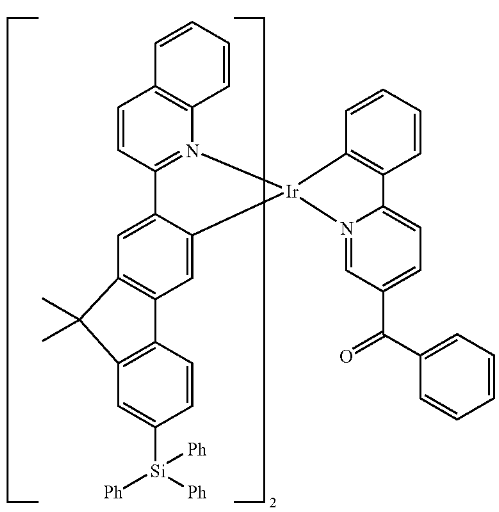
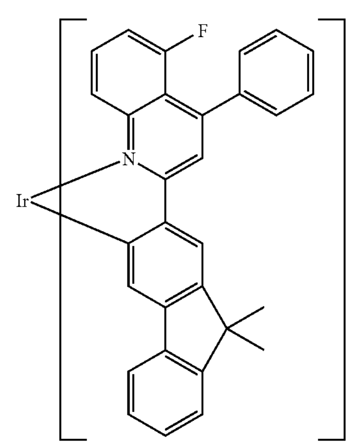

-continued
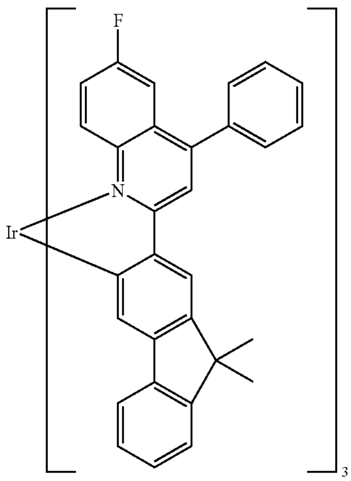
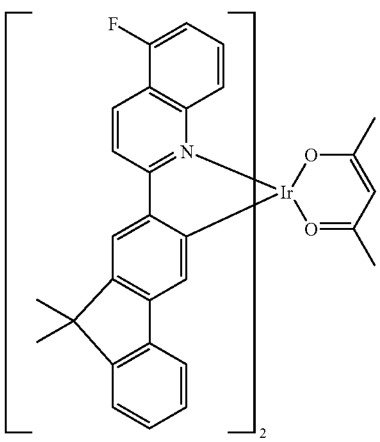
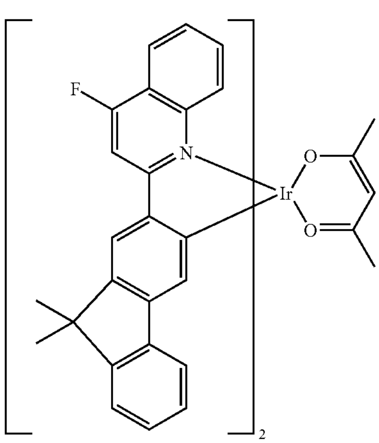
-continued
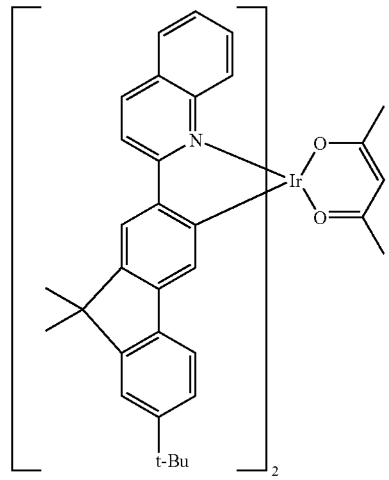
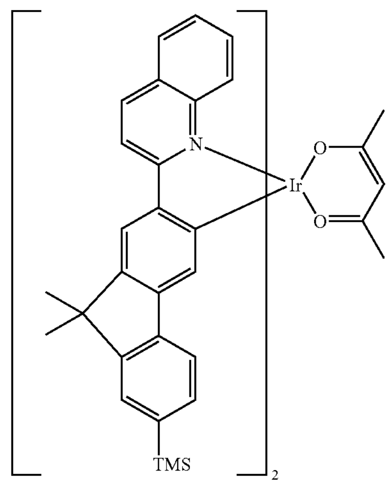
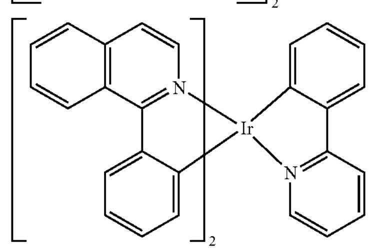
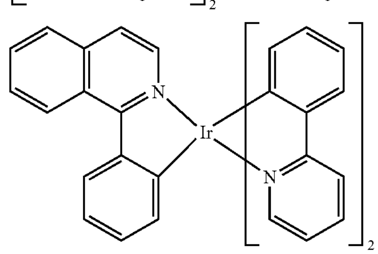
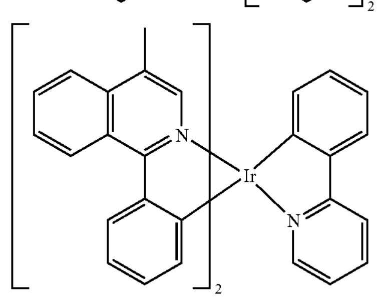

-continued
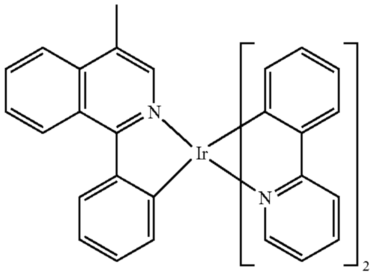
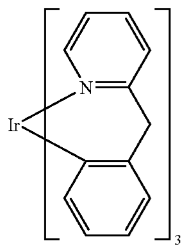
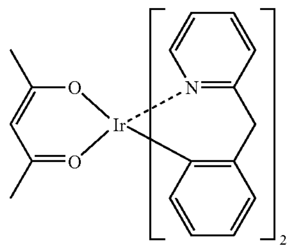
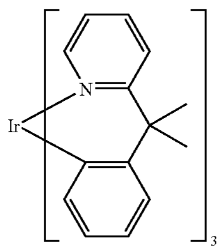
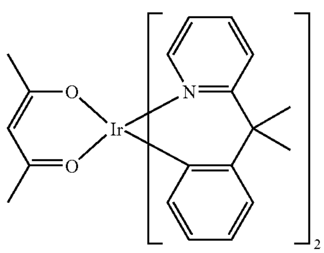
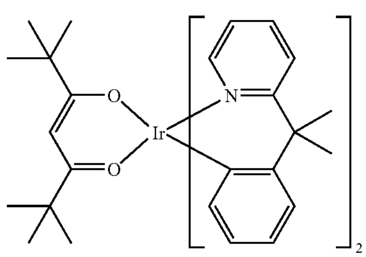
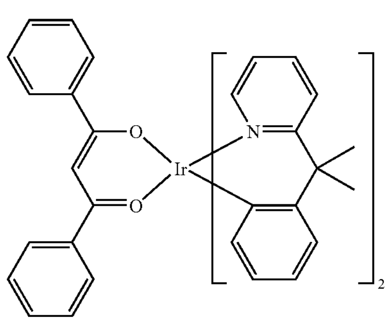
-continued
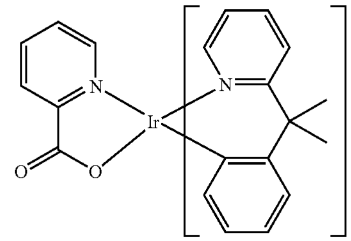
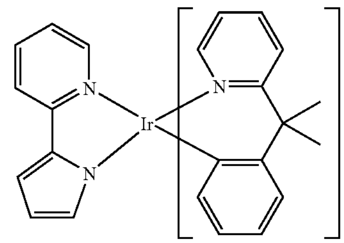
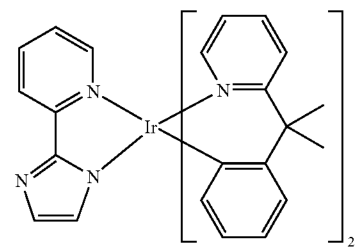
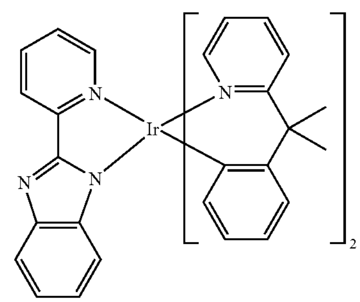
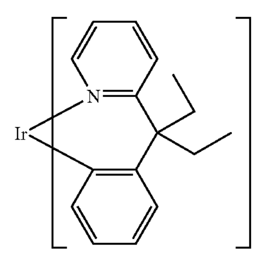
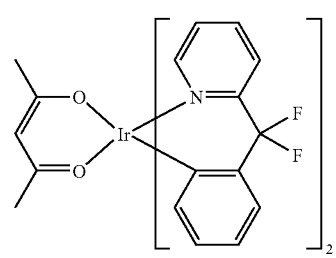

-continued
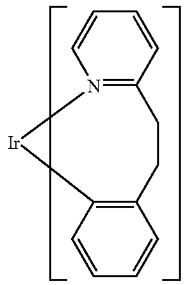
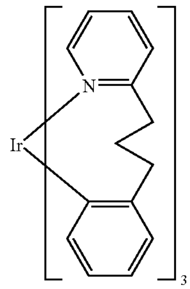
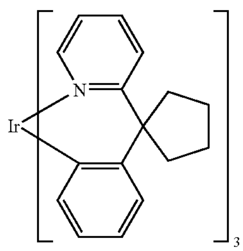
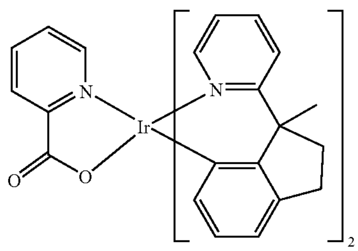
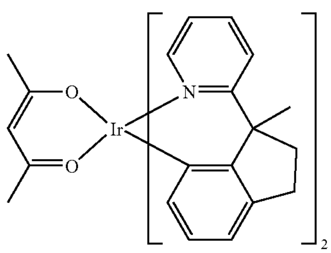
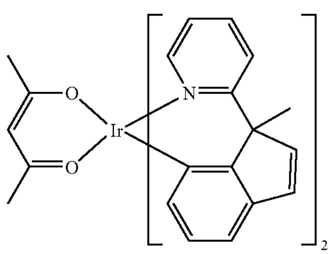
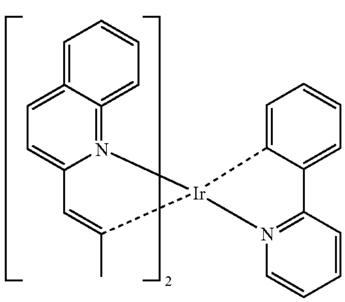
-continued
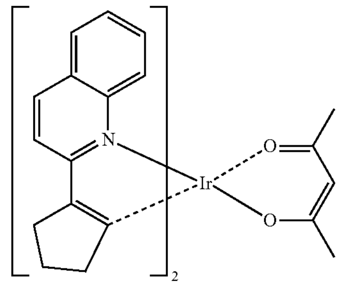
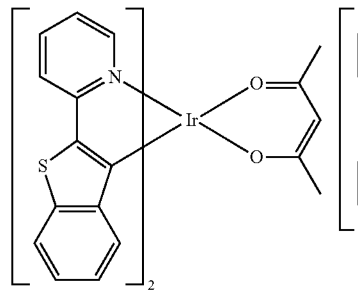
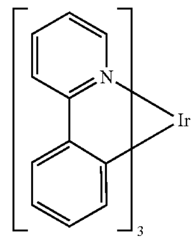
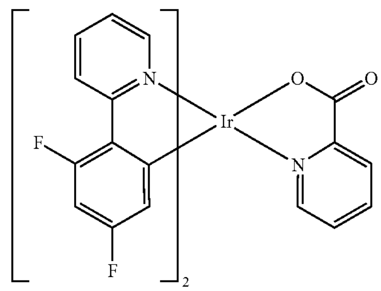
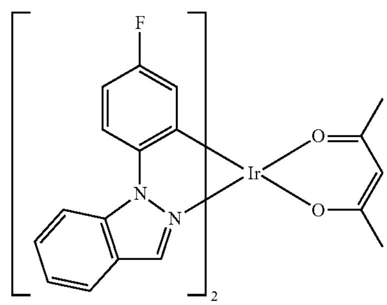
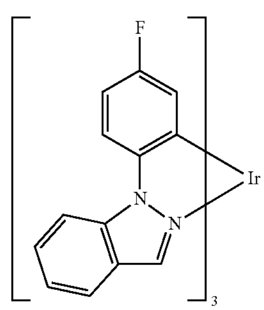
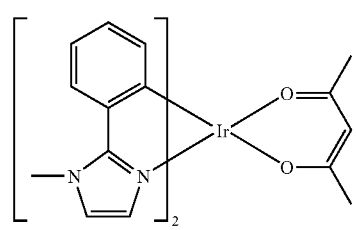

-continued
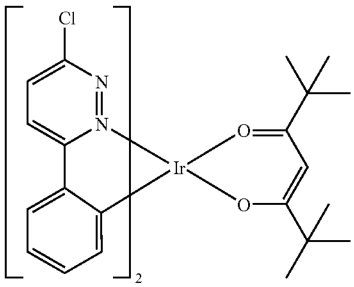
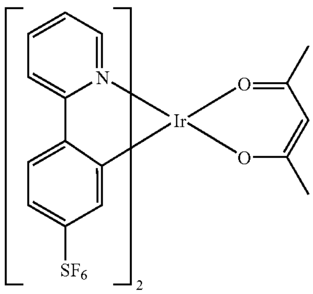
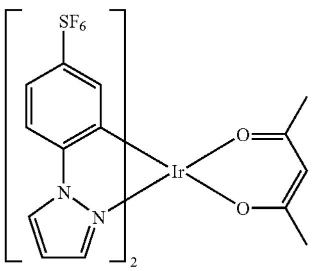
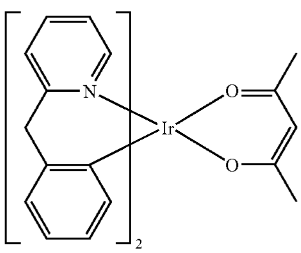
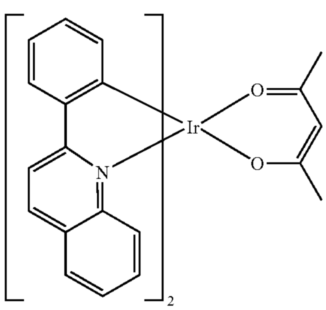
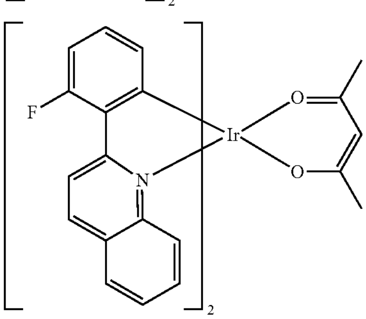
-continued
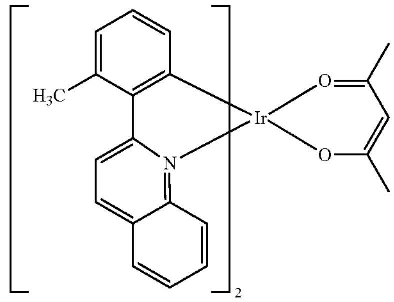
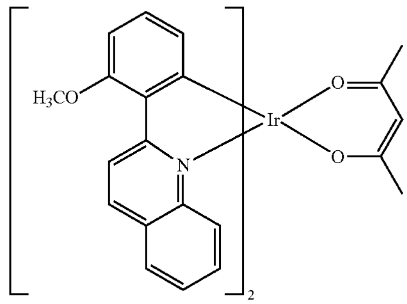
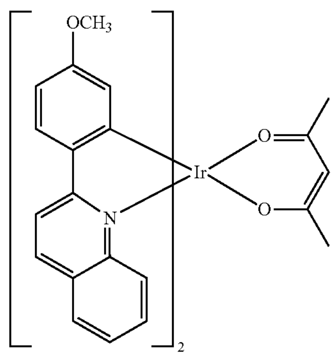
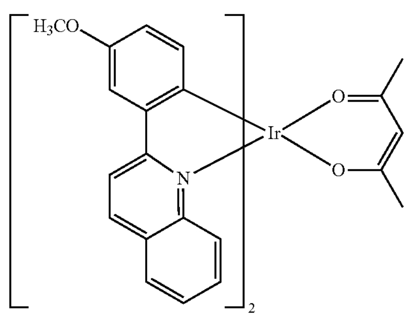
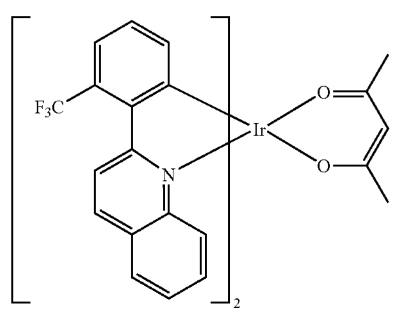

-continued
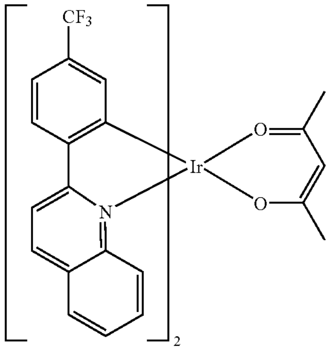
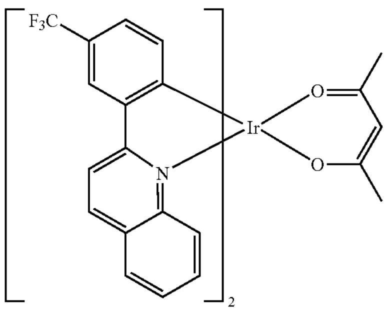
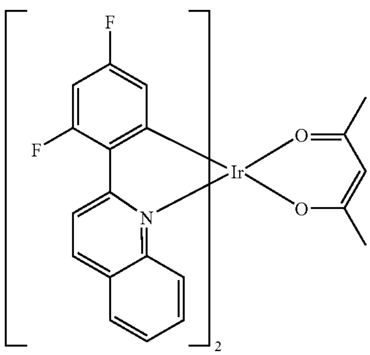
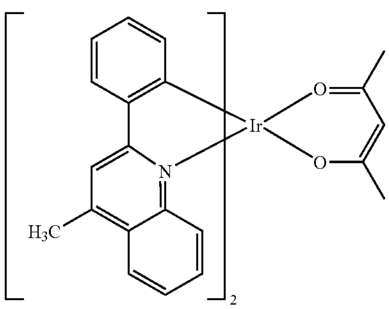
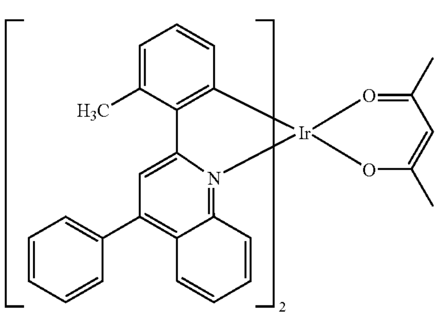
-continued
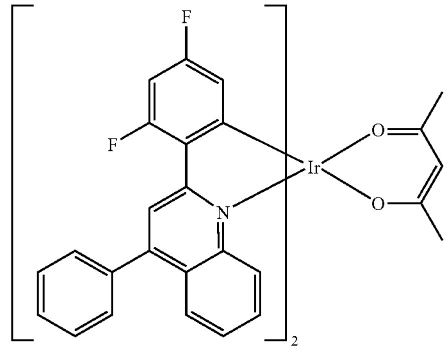
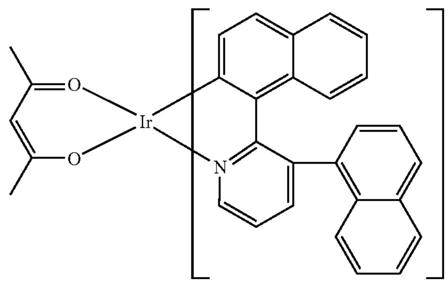
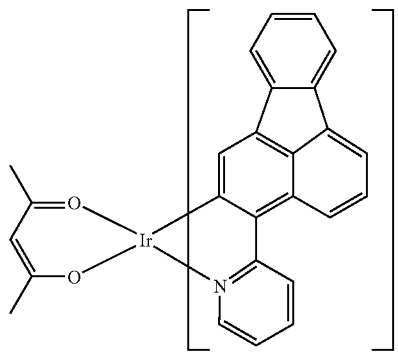
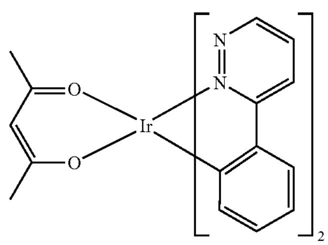
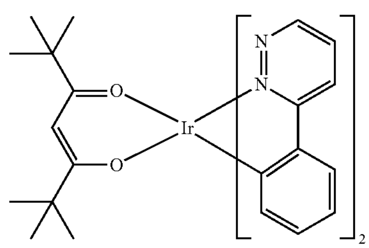
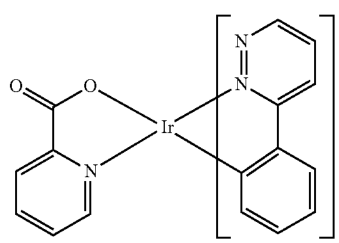

-continued
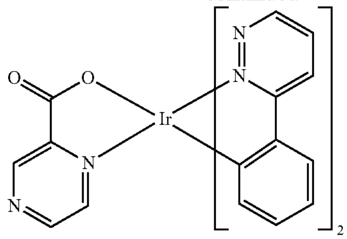
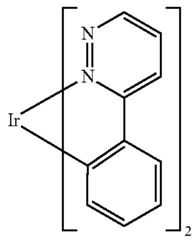
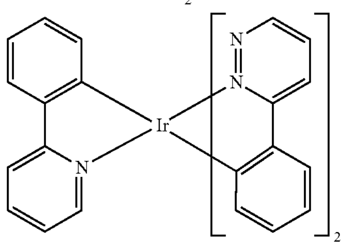
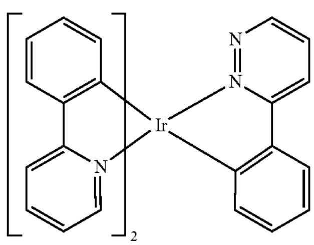
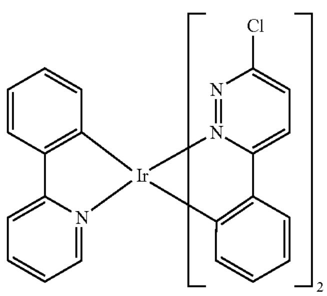
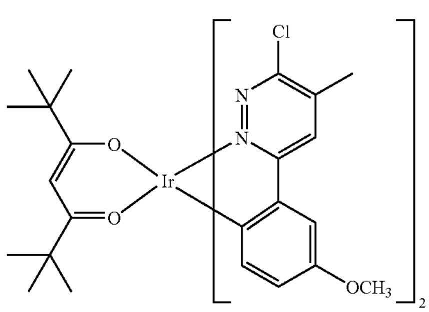
-continued
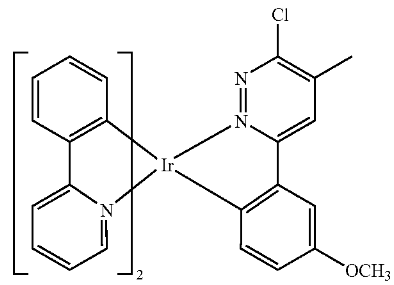
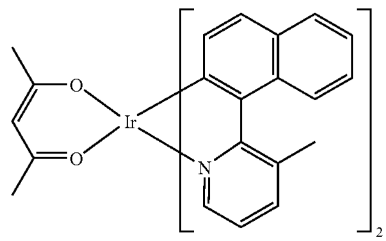
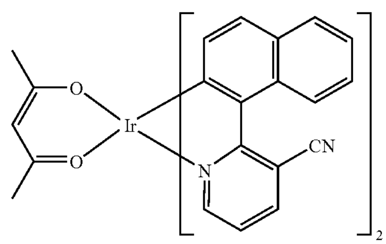
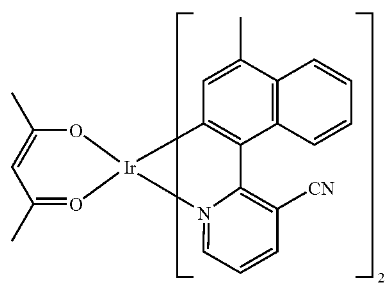
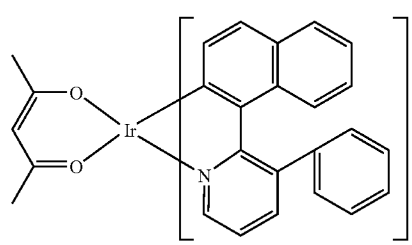
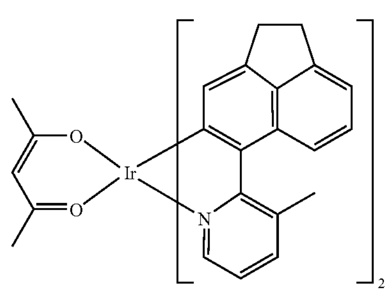

-continued
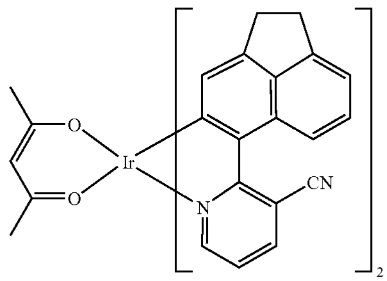
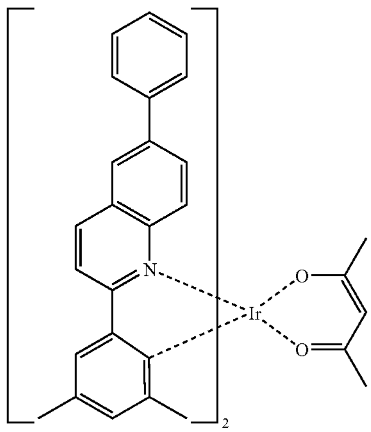
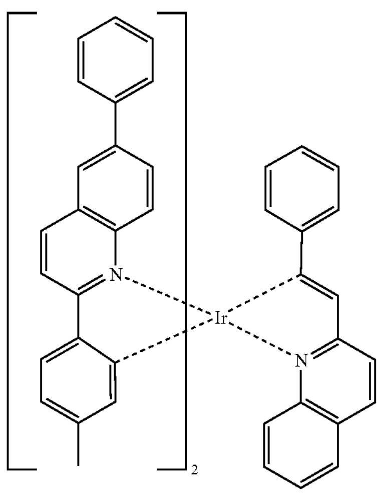
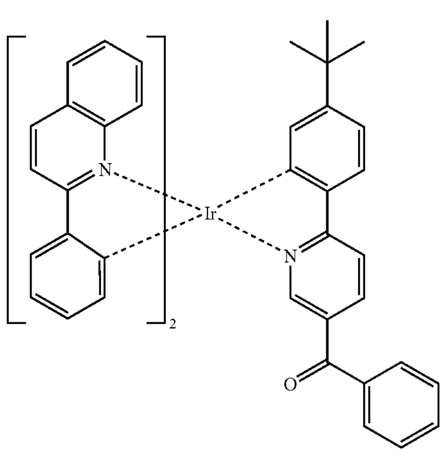
-continued
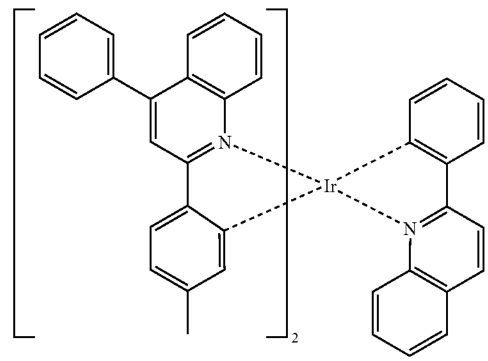
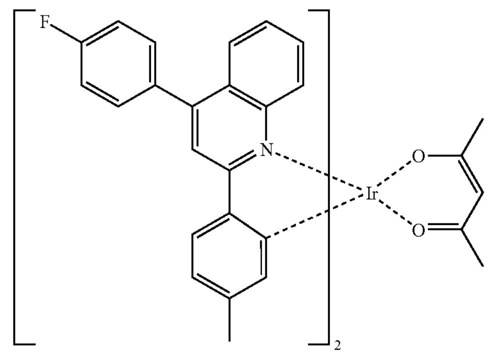
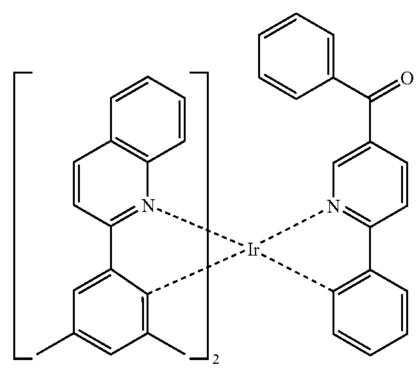
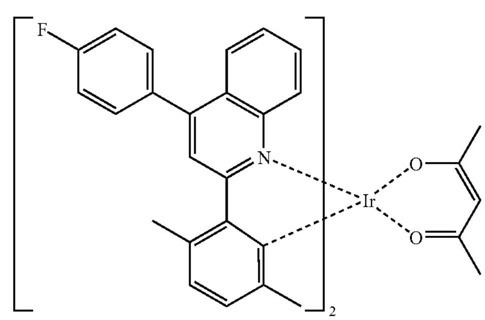
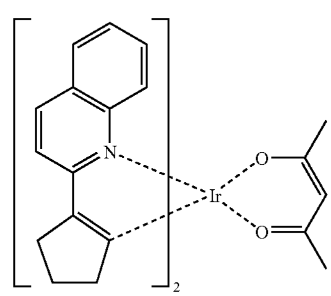

-continued
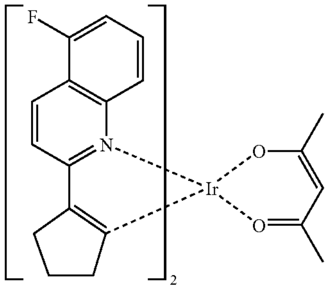
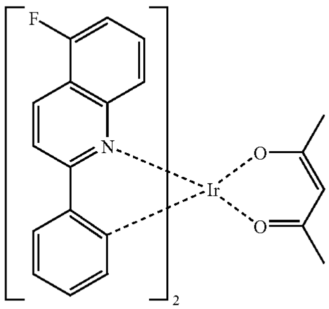
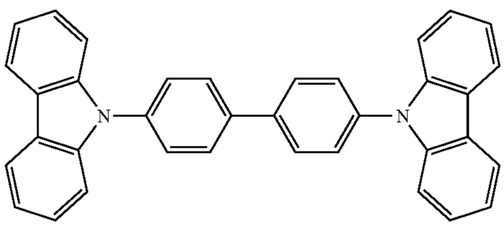
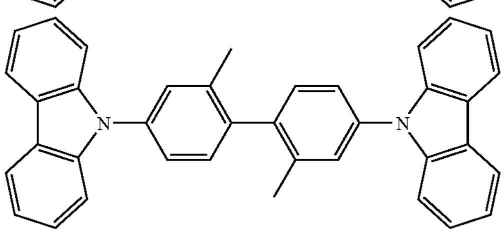
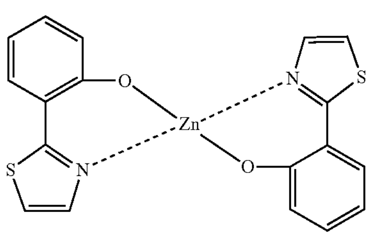
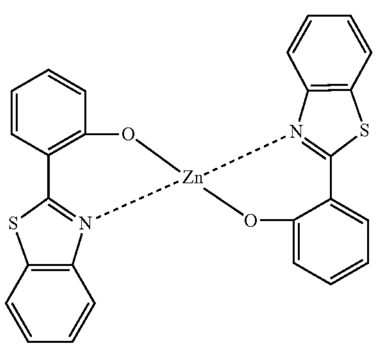
-continued
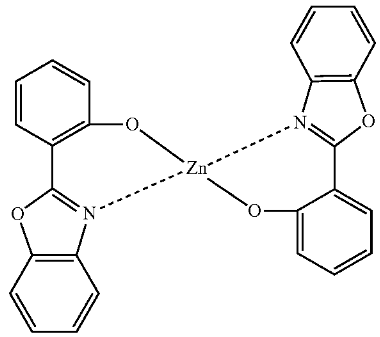
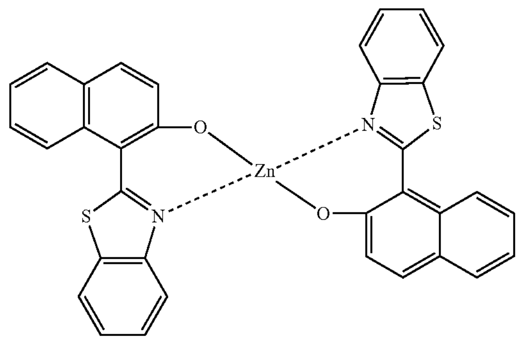
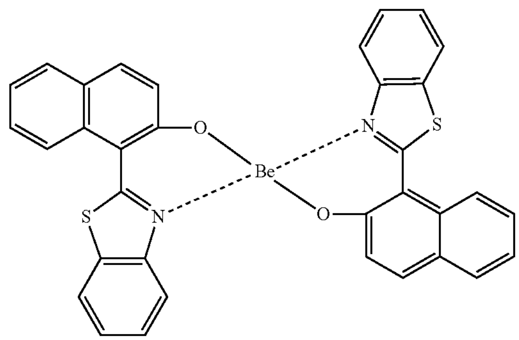
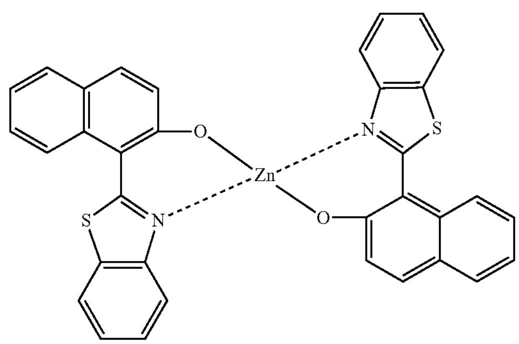
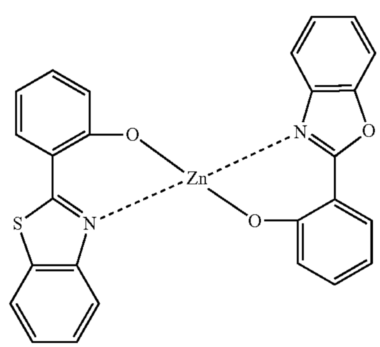

-continued
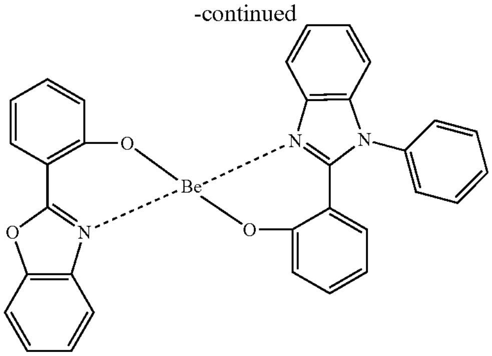
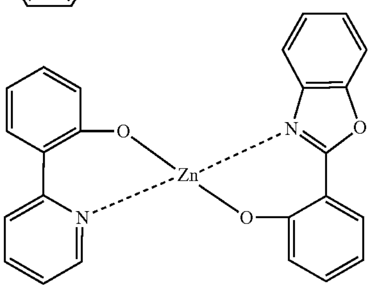
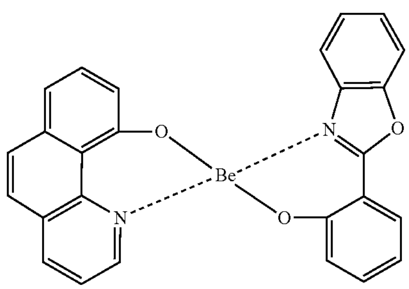
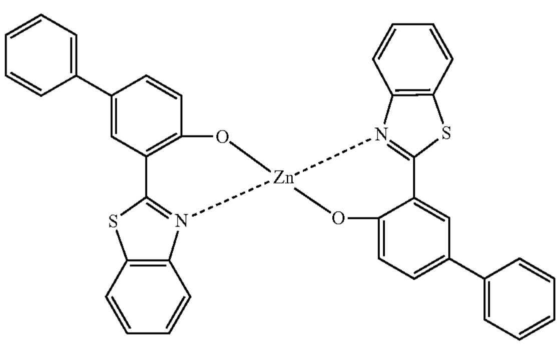
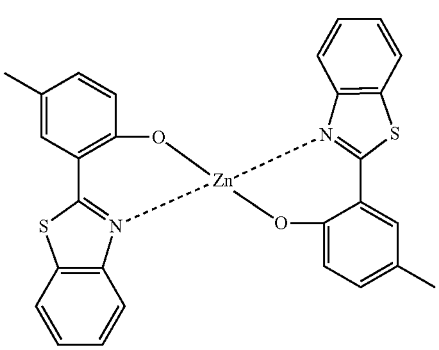
-continued
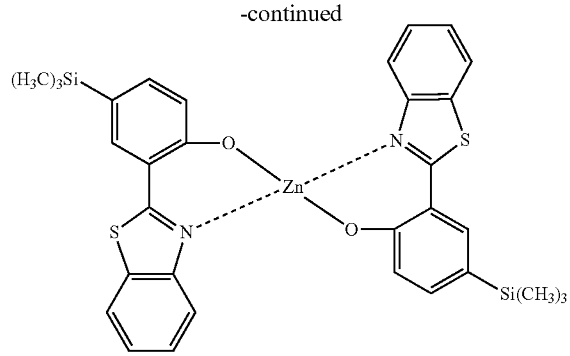
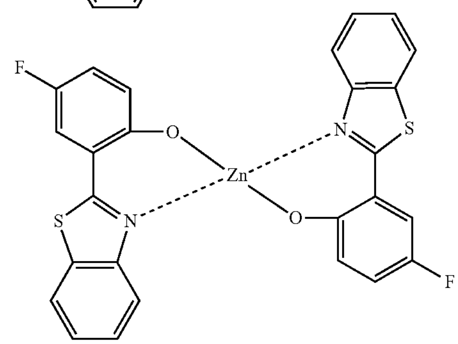
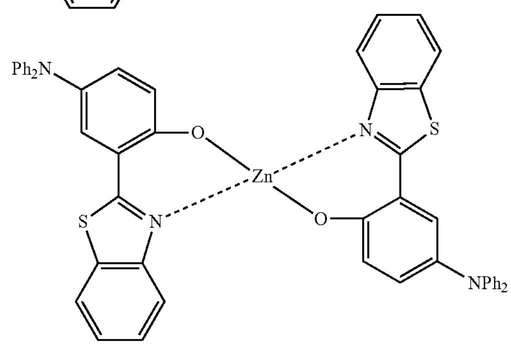
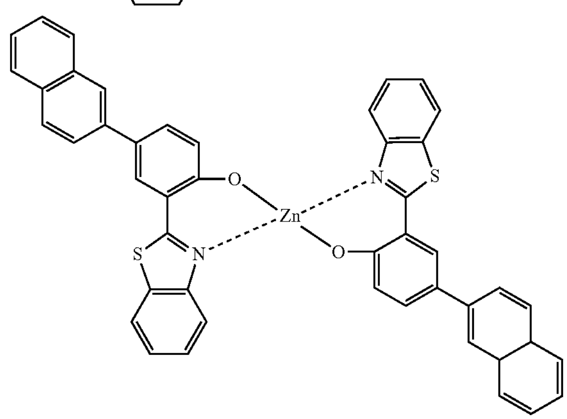
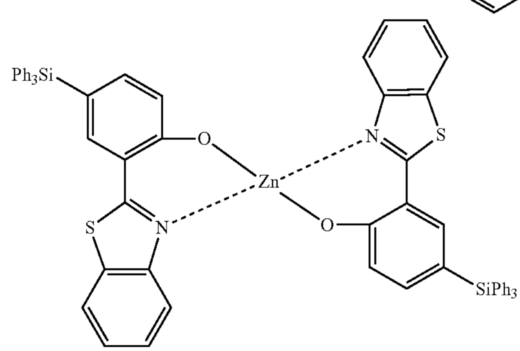

-continued
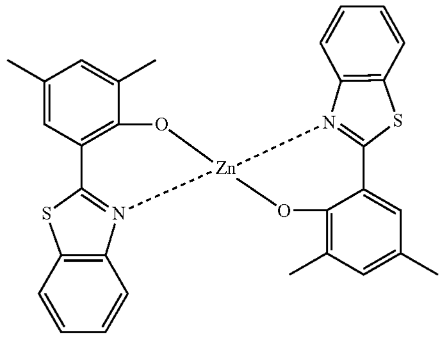
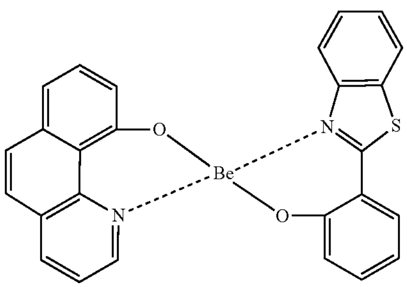
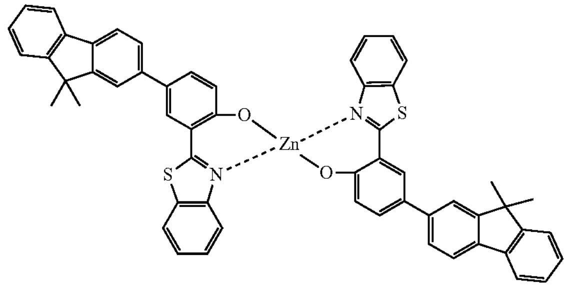
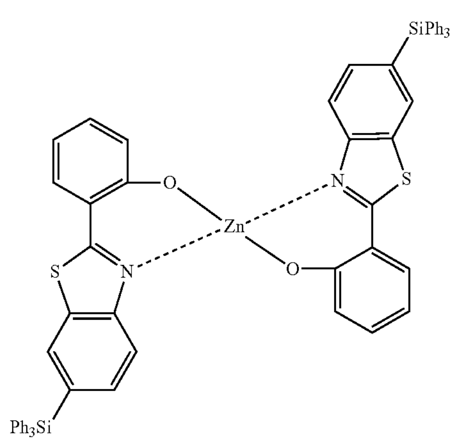
-continued
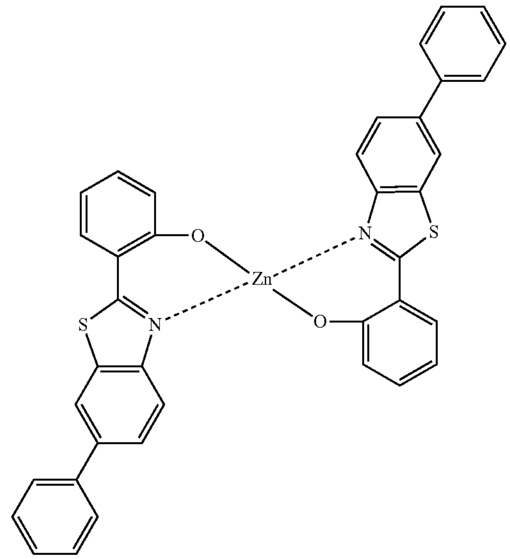
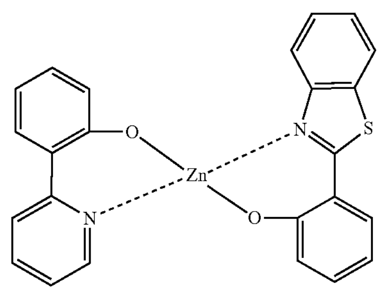
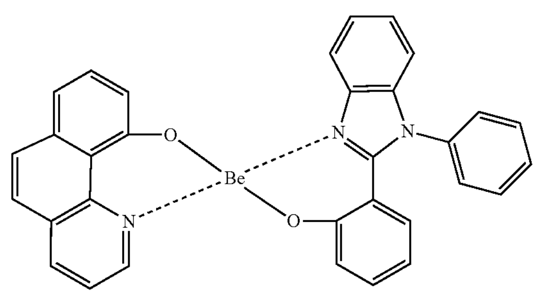
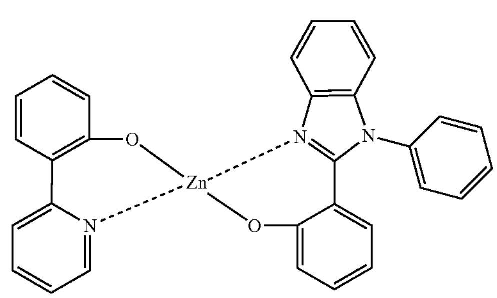

-continued
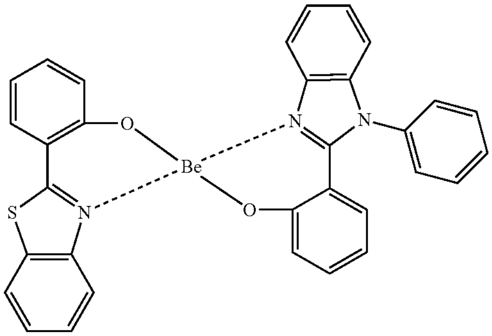
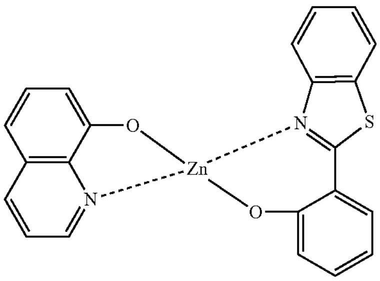
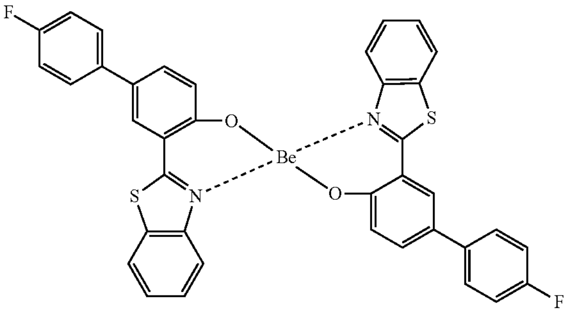
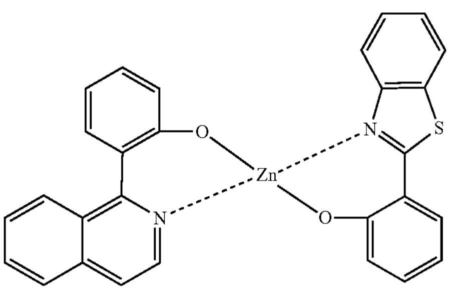
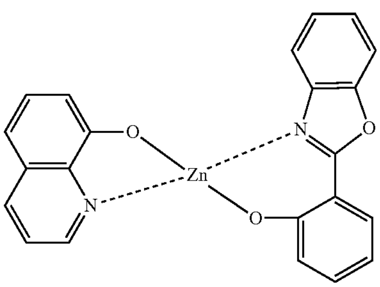
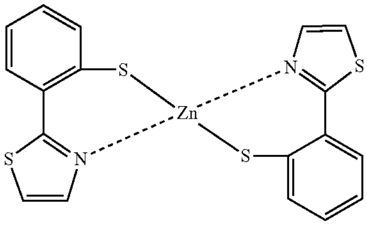
-continued
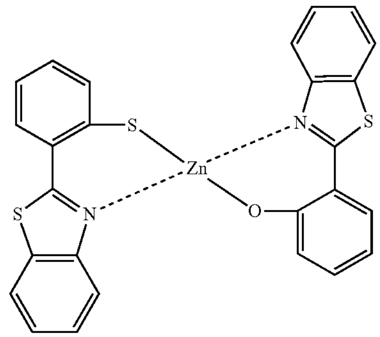
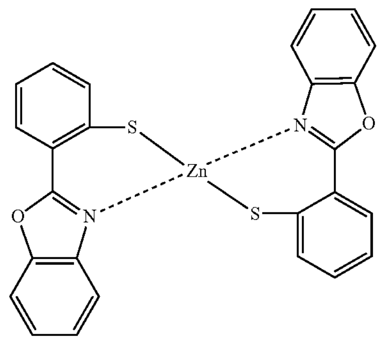
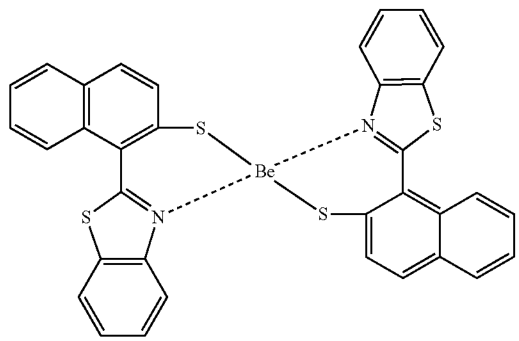
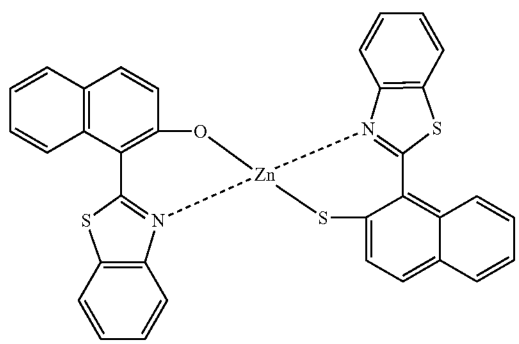
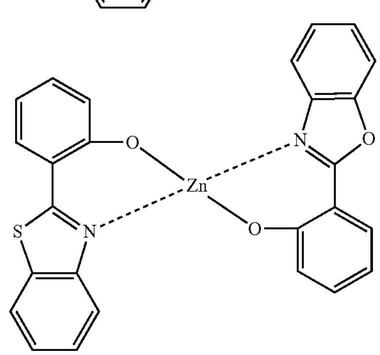

-continued
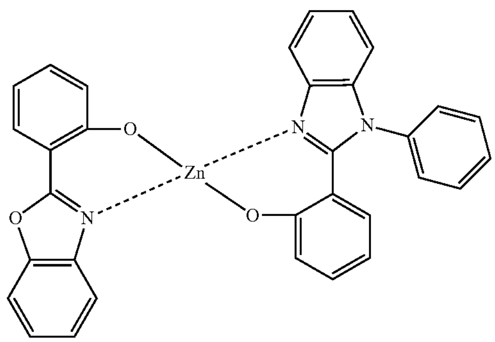
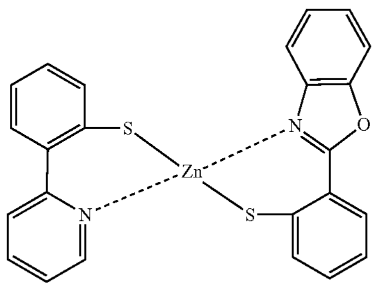
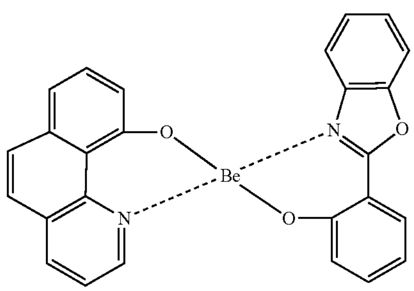
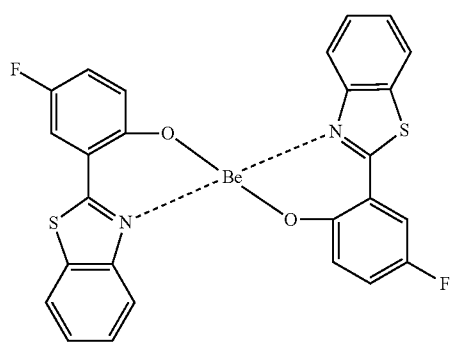
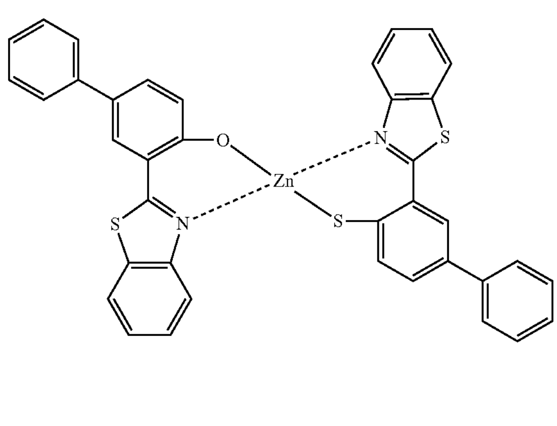
-continued
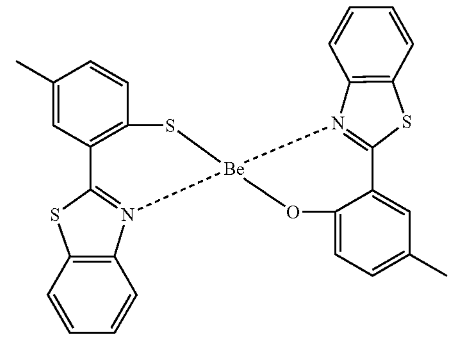
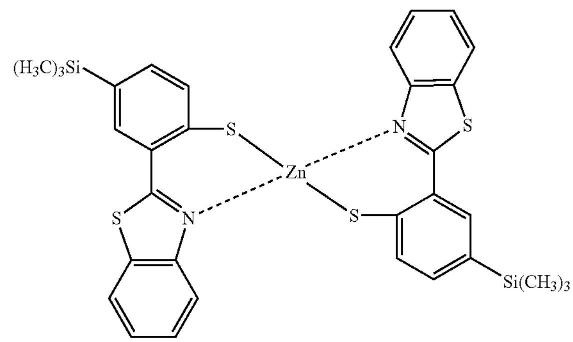
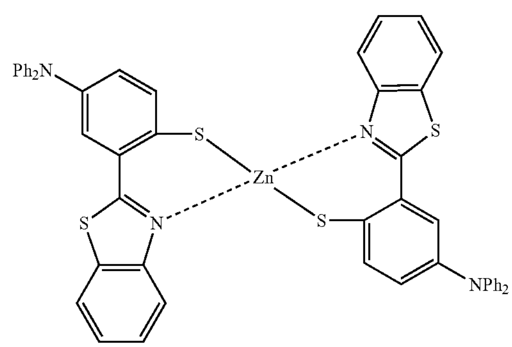
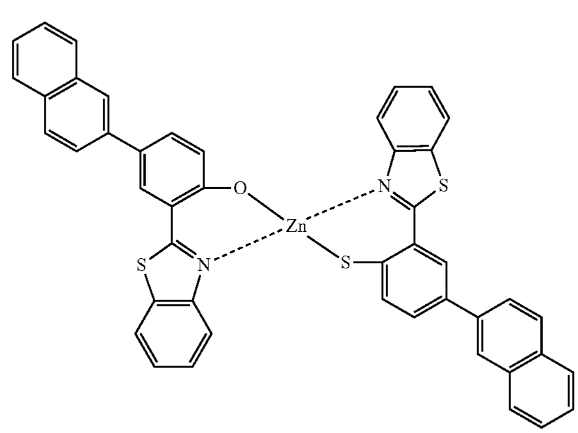

-continued
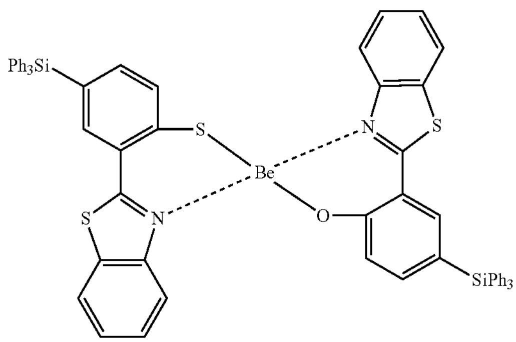
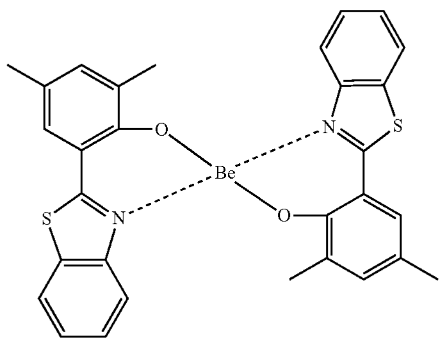
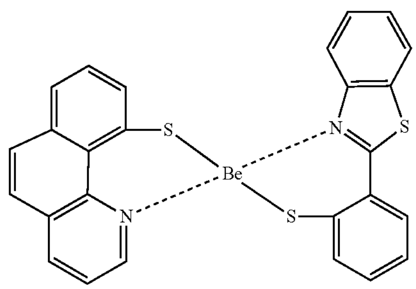
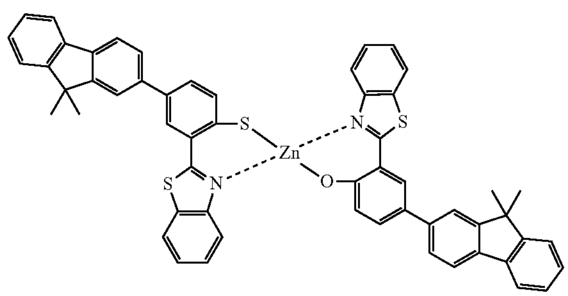
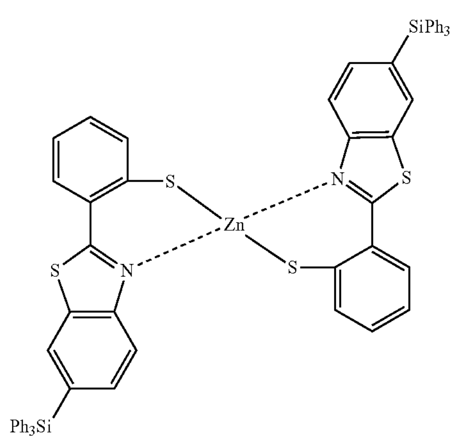
-continued
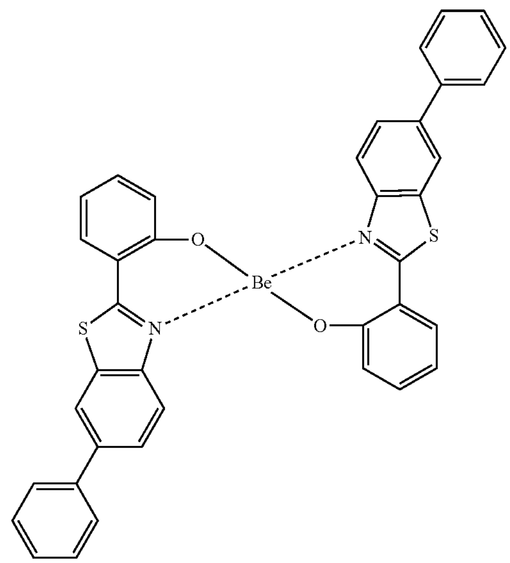
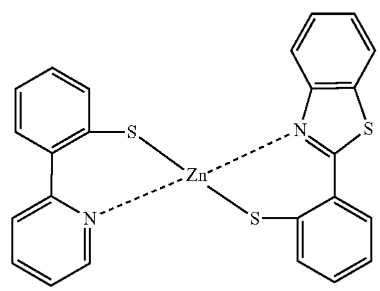
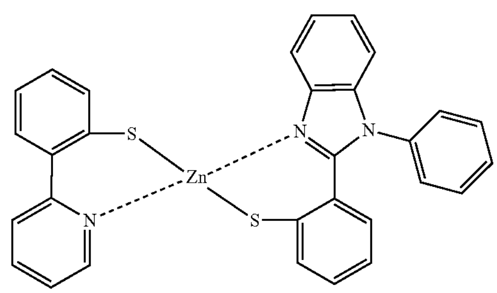
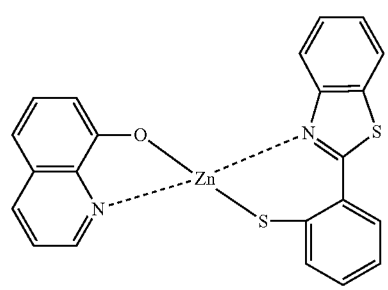
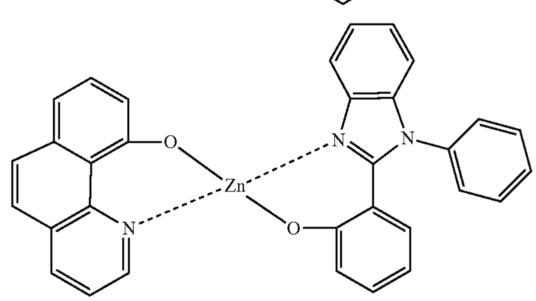

-continued
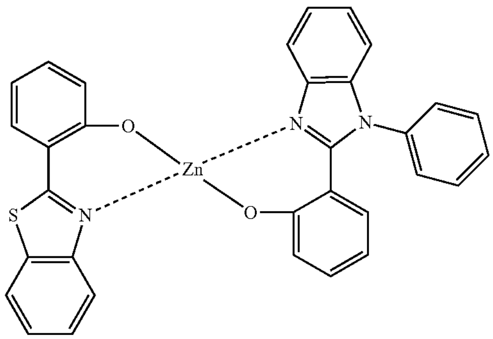
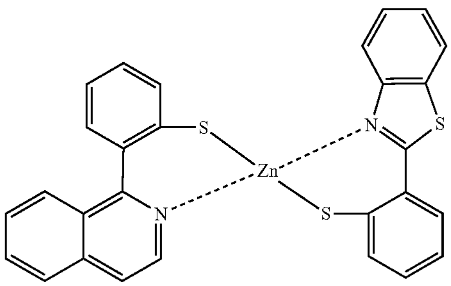
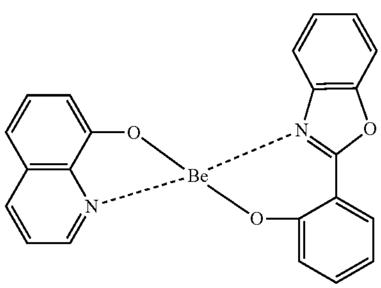
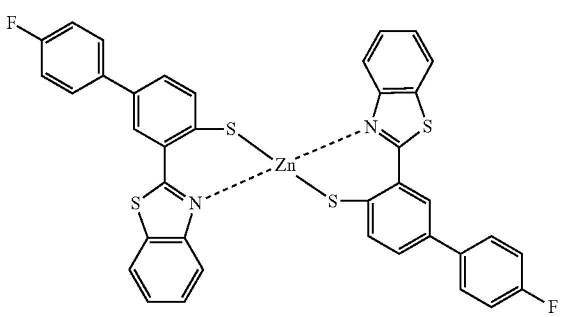
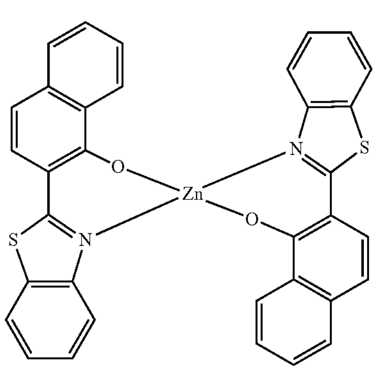
-continued
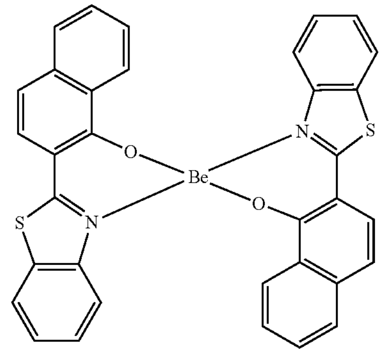
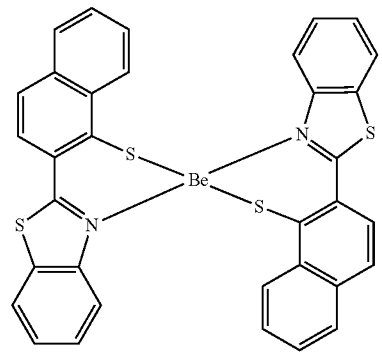
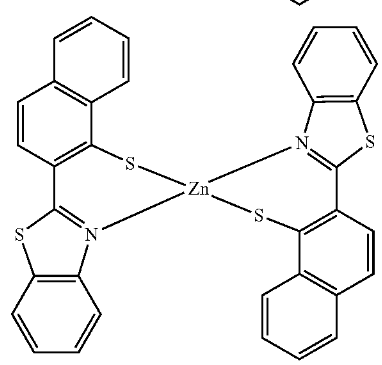
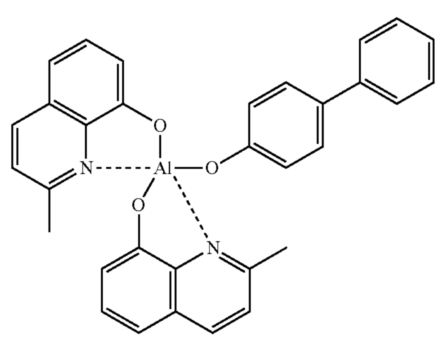
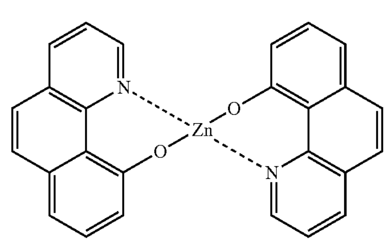

-continued

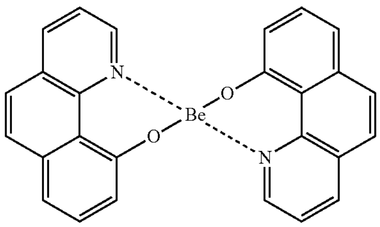

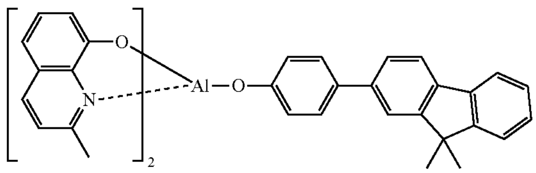

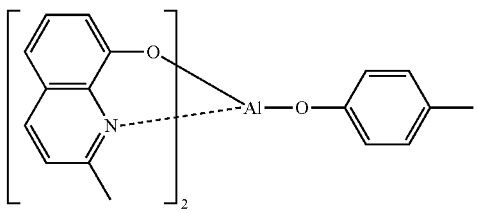

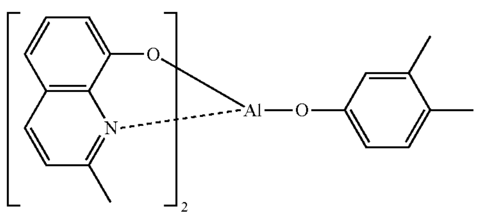

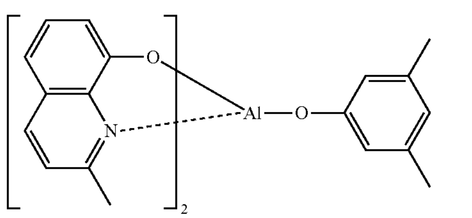

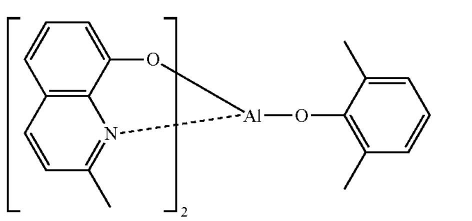

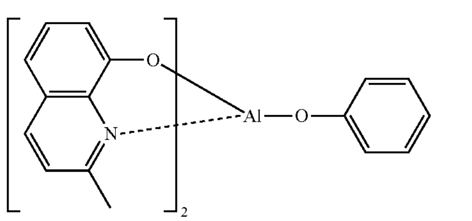

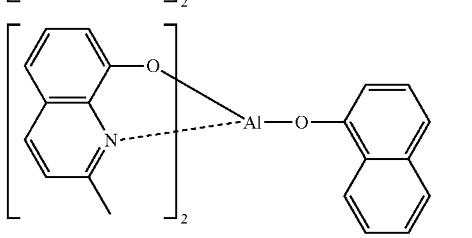

-continued

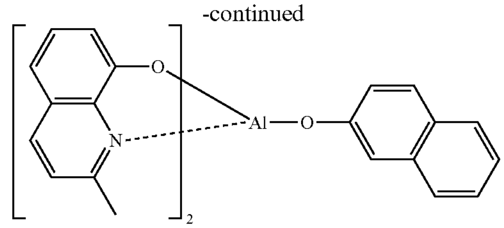

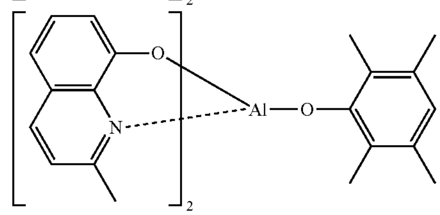

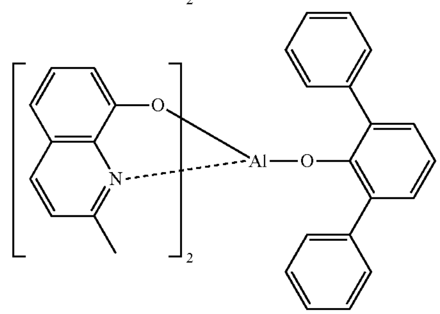

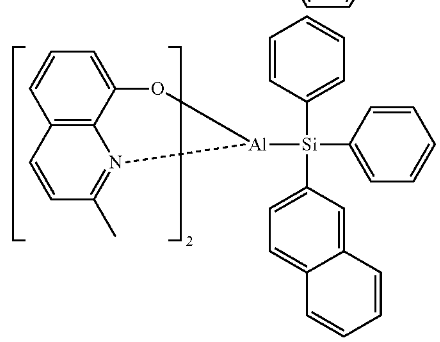

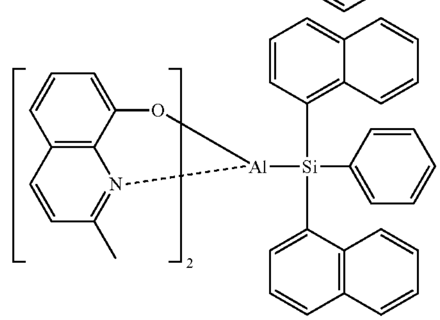

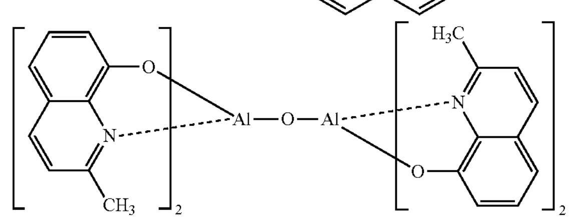

In an organic electroluminescent device according to the present invention, it is preferable to place one or more layer(s) (here-in-below, referred to as the "surface layer") selected from chalcogenide layers, metal halide layers and metal oxide layers, on the inner surface of at least one side of the pair of electrodes. Specifically, it is preferable to arrange a chalcogenide layer of silicon and aluminum metal (including oxides) on the anode surface of the EL medium layer, and a metal halide layer or a metal oxide layer on the cathode surface of the EL medium layer. As the result, stability in operation can be obtained.

Examples of chalcogenides preferably include $SiO_x$ ($1 \leqq X \leqq 2$), $AlO_x$ ($1 \leqq X \leqq 1.5$), SION, SiAlON, or the like. Examples of metal halides preferably include LiF, $MgF_2$, $CaF_2$, fluorides of rare earth metal, or the like. Examples of metal oxides preferably include $Cs_2O$, $Li_2O$, MgO, SrO, BaO, CaO, or the like.

In an organic electroluminescent device according to the present invention, it is also preferable to arrange, on at least one surface of the pair of electrodes thus manufactured, a mixed region of electron transport compound and a reductive dopant, or a mixed region of a hole transport compound with an oxidative dopant. Accordingly, the electron transport compound is reduced to an anion, so that injection and transportation of electrons from the mixed region to an EL medium are facilitated. In addition, since the hole transport compound is oxidized to form a cation, injection and transportation of holes from the mixed region to an EL medium are facilitated. Preferable oxidative dopants include various Lewis acids and acceptor compounds. Preferable reductive dopants include alkali metals, alkali metal compounds, alkaline earth metals, rare-earth metals, and mixtures thereof.

The organic electroluminescent compounds according to the invention, having high luminous efficiency and excellent color purity and life property of material, can be advantageously employed for manufacturing OLED's having very good operation life.

BEST MODE

The present invention is further described with respect to the representative compounds of the invention, by describing the organic electroluminescent compounds, the processes for preparing the same, and luminescent properties of the device manufactured therefrom in the Examples below, which are provided for illustration of the embodiments only but are not intended to limit the scope of the invention by any means.

PREPARATION EXAMPLES

Preparation Example 1

Preparation of Compound (8)

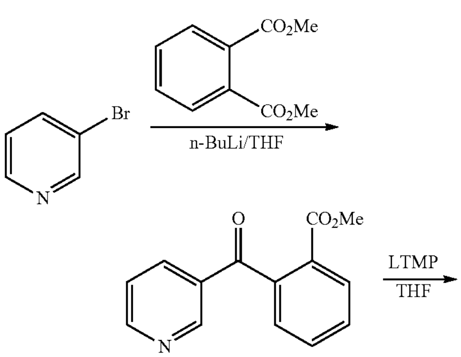

A

-continued

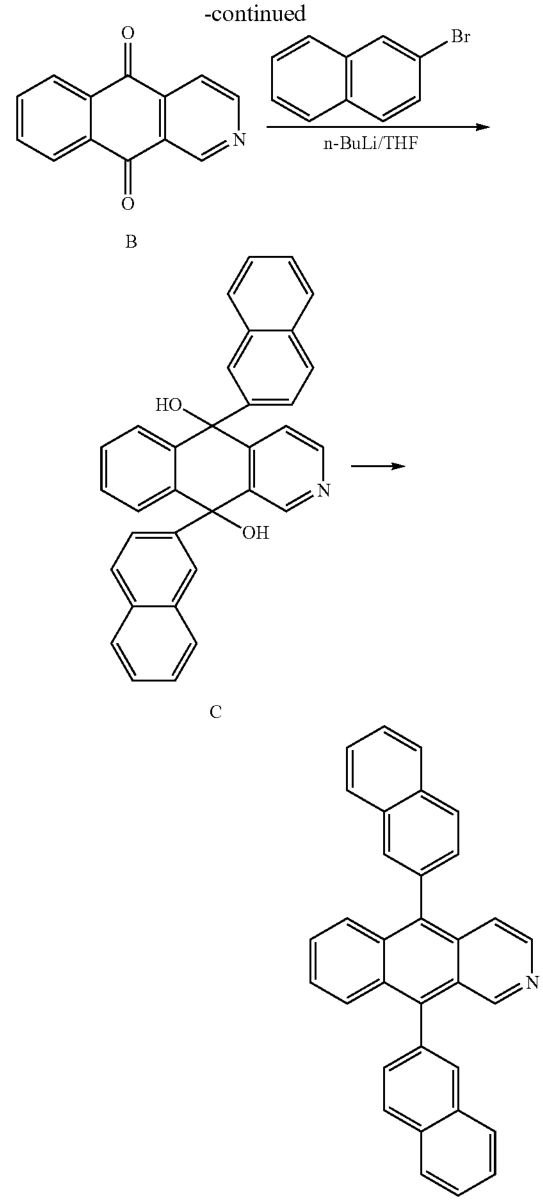

B

C

8

Preparation of Compound (A)

Under nitrogen atmosphere, a 50 mL round-bottomed flask was charged with 3-bromopyridine (96 μL, 1 mmol) and diethyl ether (10 mL), and the mixture was stirred. After chilling the mixture to −78° C., butyllithium (2.5 mL, 1 mmol, 2.5 M in hexane) was slowly added thereto. After stirring for 1 hour at −78° C., dimethyl phthalate (0.17 mL, 1 mmol) was slowly added at the same temperature. After stirring at −78° C. for 2 hours, the temperature was slowly raised to room temperature, and water (5 mL) was added thereto to carry out hydrolysis. The organic layers obtained therefrom by extraction with ether were combined and dried. After removing the solvent, the residue was purified via column chromatography to obtain Compound (A) (0.14 g, 56%) as solid product.

Preparation of Compound (B)

Under nitrogen atmosphere, a 50 mL round-bottomed flask was charged with Compound (A) (0.11 g, 0.44 mmol) and THF (5 mL), and the mixture was stirred. LTMP solution (10 mL) was added thereto at 0° C., and the resultant mixture was stirred at the same temperature for 2 hours. Then the temperature was slowly raised to room temperature, and water (5 mL) was added thereto to carry out hydrolysis. The mixture was extracted with ethyl acetate and the combined organic layer was dried and evaporated to remove the solvent. The residue was purified via column chromatography to obtain Compound (B) (41 mg, 44%) as solid product.

Preparation of Compound (C)

Under nitrogen atmosphere, a 250 mL round-bottomed flask was charged with 2-bromonaphthalene (3 g, 14.5 mmol) and THF (80 mL), and the mixture was stirred. After chilling the mixture to −78° C., n-butyllithium (30 mL, 12 mmol, 2.5 M in hexane) was slowly added thereto. The resultant mixture was stirred at −78° C. for 1 hour, and Compound (B) (1 g, 4.83 mmol) was slowly added thereto at the same temperature. The mixture was stirred for 12 hours while slowly raising the temperature to room temperature. The combined organic layer obtained therefrom by extraction with ethyl acetate was dried and evaporated to remove the solvent. The residue was purified via column chromatography to obtain Compound (C) (1.4 g, 63%) as solid product.

Preparation of Compound (8)

Under nitrogen atmosphere, a 100 mL round-bottomed flask was charged with Compound (C) (1 g, 2.15 mmol), potassium iodide (1.4 g, 8.59 mmol), sodium dihydrophosphate (1.37 g, 12.89 mmol) and acetic acid (40 mL). The mixture was stirred under reflux for 24 hours, and the solid generated was filtered, and washed sequentially with acetic acid, water and hexane. The solid was dried and recrystallized from ethyl acetate to obtain Compound (8) (0.53 g, 57%) as solid product.

Preparation Example 2

Preparation of Compound (383)

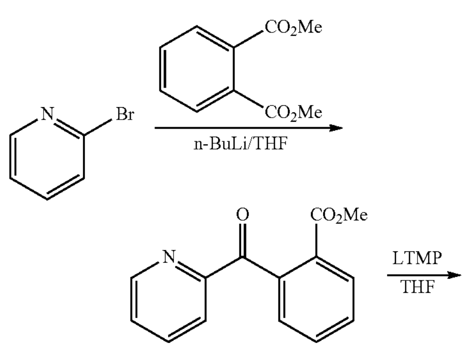

D

-continued

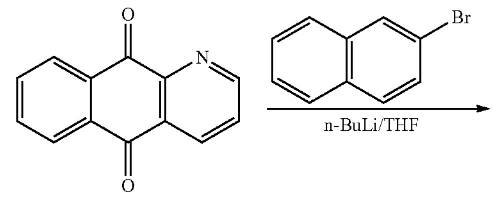

E

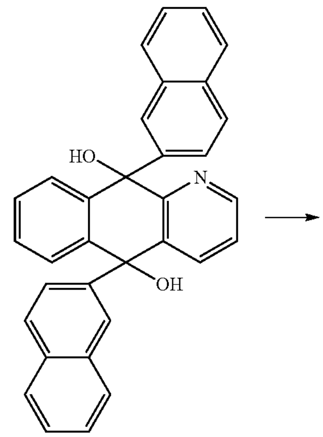

F

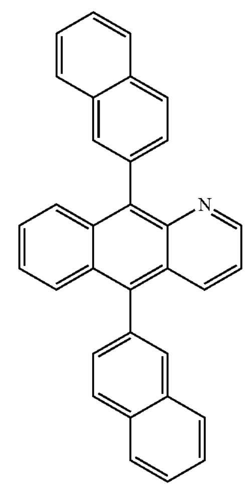

383

Preparation of Compound (D)

Under nitrogen atmosphere, a 50 mL round-bottomed flask was charged with 2-bromopyridine (96 µL, 1 mmol) and diethyl ether (10 mL), and the mixture was stirred. After chilling the mixture to −78° C., butyllithium (2.5 mL, 1 mmol, 2.5 M in hexane) was slowly added thereto. After stirring at −78° C. for 1 hour, dimethyl phthalate (0.17 mL, 1 mmol) was slowly added at the same temperature. After stirring at −78° C. for 2 hours, the temperature was slowly raised to room temperature, and water (5 mL) was added thereto to carry out hydrolysis. The combined organic layer obtained therefrom by extraction with ether was dried. After removing the solvent, the residue was purified via column chromatography to obtain Compound (D) (0.14 g, 56%) as solid product.

Preparation of Compound (E)

Under nitrogen atmosphere, a 50 mL round-bottomed flask was charged with Compound (D) (0.11 g, 0.44 mmol) and THF (5 mL), and the mixture was stirred. LTMP solution (10 mL) was added thereto at 0° C., and the resultant mixture was stirred at the same temperature for 2 hours. Then the temperature was slowly raised to room temperature, and water (5 mL) was added thereto to carry out hydrolysis. The mixture was extracted with ethyl acetate and the combined organic layer was dried and evaporated to remove the solvent. The residue was purified via column chromatography to obtain Compound (E) (41 mg, 44%) as solid product.

Preparation of Compound (F)

Under nitrogen atmosphere, a 250 mL round-bottomed flask was charged with 2-bromonaphthalene (3 g, 14.5 mmol) and THF (80 mL), and the mixture was stirred. After chilling the mixture to −78° C., butyllithium (30 mL, 12 mmol, 2.5 M in hexane) was slowly added thereto. The resultant mixture was stirred at −78° C. for 1 hour, and Compound (E) (1 g, 4.83 mmol) was slowly added thereto at the same temperature. The mixture was stirred for 12 hours while slowly raising the temperature to room temperature. The combined organic layer obtained therefrom by extraction with ethyl acetate was dried and evaporated to remove the solvent. The residue was purified via column chromatography to obtain Compound (F) (1.4 g, 63%) as solid product.

Preparation of Compound (383)

Under nitrogen atmosphere, a 100 mL round-bottomed flask was charged with Compound (F) (1 g, 2.15 mmol), potassium iodide (1.4 g, 8.59 mmol), sodium dihydrophosphate (1.37 g, 12.89 mmol) and acetic acid (40 mL). The mixture was stirred under reflux for 24 hours, and the solid generated was filtered, and washed sequentially with acetic acid, water and hexane. The solid was dried and recrystallized from ethyl acetate to obtain Compound (383) (0.53 g, 57%) as solid product.

Preparation Example 3

Preparation of Compound (758)

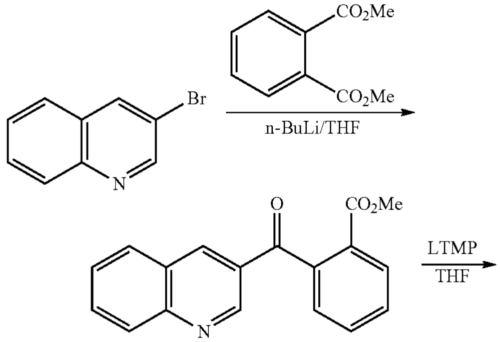

G

-continued

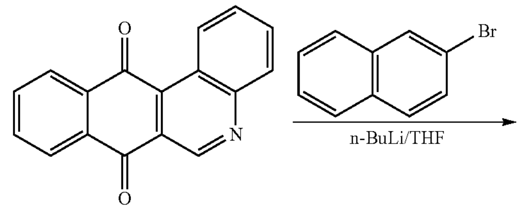

H

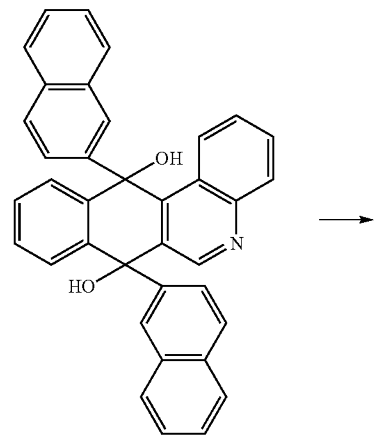

I

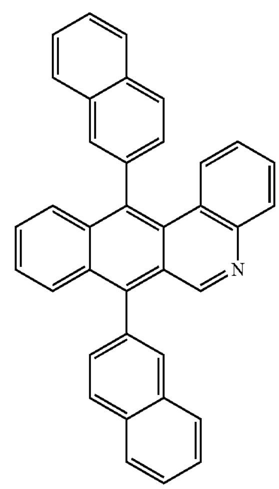

758

Preparation of Compound (G)

Under nitrogen atmosphere, a 50 mL round-bottomed flask was charged with 3-bromoquinoline (96 μL, 1 mmol) and diethyl ether (10 mL), and the mixture was stirred. After chilling the mixture to −78° C., butyllithium (2.5 mL, 1 mmol, 2.5 M in hexane) was slowly added thereto. After stirring at −78° C. for 1 hour, dimethyl phthalate (0.17 mL, 1 mmol) was slowly added at the same temperature. After stirring at −78° C. for 2 hours, the temperature was slowly raised to room temperature, and water (5 mL) was added thereto to carry out hydrolysis. The combined organic layer obtained therefrom by extraction with ether was dried. After removing the solvent, the residue was purified via column chromatography to obtain Compound (G) (0.14 g, 56%) as solid product.

Preparation of Compound (H)

Under nitrogen atmosphere, a 50 mL round-bottomed flask was charged with Compound (G) (0.11 g, 0.44 mmol) and THF (5 mL), and the mixture was stirred. LTMP solution (10 mL) was added thereto at 0° C., and the resultant mixture was stirred at the same temperature for 2 hours. Then the temperature was slowly raised to room temperature, and water (5 mL) was added thereto to carry out hydrolysis. The mixture was extracted with ethyl acetate and the combined organic layer was dried and evaporated to remove the solvent. The residue was purified via column chromatography to obtain Compound (H) (41 mg, 44%) as solid product.

Preparation of Compound (I)

Under nitrogen atmosphere, a 250 mL round-bottomed flask was charged with 2-bromonaphthalene (3 g, 14.5 mmol) and THF (80 mL), and the mixture was stirred. After chilling the mixture to −78° C., butyllithium (30 mL, 12 mmol, 2.5 M in hexane) was slowly added thereto. The resultant mixture was stirred at −78° C. for 1 hour, and Compound (H) (1 g, 4.83 mmol) was slowly added thereto at the same temperature. The mixture was stirred for 12 hours while slowly raising the temperature to room temperature. The combined organic layer obtained therefrom by extraction with ethyl acetate was dried and evaporated to remove the solvent. The residue was purified via column chromatography to obtain Compound (I) (1.4 g, 63%) as solid product.

Preparation of Compound (758)

Under nitrogen atmosphere, a 100 mL round-bottomed flask was charged with Compound (I) (1 g, 2.15 mmol), potassium iodide (1.4 g, 8.59 mmol), sodium dihydrophosphate (1.37 g, 12.89 mmol) and acetic acid (40 mL). The mixture was stirred under reflux for 24 hours, and the solid generated was filtered, and washed sequentially with acetic acid, water and hexane. The solid was dried and recrystallized from ethyl acetate to obtain Compound (758) (0.53 g, 57%) as solid product.

According to the procedure of Preparation Examples 1 to 3, organic electroluminescent compounds (Compounds 1 to 1215) were prepared, and the $^1$H NMR and MS/FAB data are shown in Table 1.

TABLE 1

| compound | $^1$H NMR($CDCl_3$, 200 MHz) | MS/FAB found | MS/FAB calculated |
|---|---|---|---|
| 1 | δ = 2.64 (6H, s), 7.57 (1H, m), 7.67 (2H, m), 8.16 (2H, m), 8.41 (1H, m), 8.98 (1H, m) | 207.27 | 207.10 |
| 7 | δ = 7.41 (2H, m), 7.5~7.52 (9H, m), 7.67 (2H, m), 8.45 (1H, m), 8.54 (2H, m), 8.91 (1H, s) | 331.41 | 331.14 |
| 8 | δ = 7.5 (1H, m), 7.58~7.59 (6H, m), 7.67 (2H, m), 7.73 (2H, m), 7.92 (2H, m), 8 (4H, m), 8.45 (1H, m), 8.54 (2H, m), 8.91 (1H, s) | 431.53 | 431.17 |
| 9 | δ = 7.50~7.55 (5H, m), 7.61~7.67 (4H, m), 8.04~8.08 (4H, m), 8.42~8.45 (3H, m), 8.54~8.55 (4H, m), 8.91 (1H, s) | 431.53 | 431.17 |
| 10 | δ = 7.5 (1H, m), 7.67 (2H, m), 7.82~7.93 (10H, m), 8.12 (4H, m), 8.45 (1H, m), 8.54 (2H, m), 8.91~8.93 (5H, m) | 531.64 | 531.20 |
| 11 | δ = 1.72 (12H, s), 7.28 (2H, m), 7.38 (2H, m), 7.5~7.55 (3H, m), 7.63~7.67 (4H, m), 7.77 (2H, m), 7.87~7.93 (4H, m), 8.45 (1H, m), 8.54 (2H, m), 8.91 (1H, s) | 563.73 | 563.26 |
| 12 | δ = 7.25 (8H, m), 7.41 (2H, m), 7.5~7.52 (9H, m), 7.67 (2H, m), 8.45 (1H, m), 8.54 (2H, m), 8.91 (1H, s) | 483.60 | 483.20 |
| 20 | δ = 1.35 (18H, s), 7.37~7.38 (8H, m), 7.5 (1H, m), 7.67 (2H, m), 8.45 (1H, m), 8.54 (2H, m), 8.91 (1H, m) | 443.62 | 443.26 |
| 24 | δ = 2.34 (12H, s), 7.31 (2H, m), 7.5 (1H, m), 7.6 (4H, m), 7.67 (2H, m), 8.45 (1H, m), 8.54 (2H, m), 8.91 (1H, s) | 387.52 | 387.20 |
| 41 | δ = 1.72 (12H, s), 7.28~7.38 (6H, m), 7.5~7.55 (5H, m), 7.63~7.67 (4H, m), 7.87 (2H, m), 8.45 (1H, m), 8.54 (2H, m), 8.91 (1H, s) | 563.73 | 563.26 |
| 80 | δ = 2.88 (8H, m), 6.58 (4H, m), 6.76 (4H, m), 7.02~7.04 (8H, m), 7.43 (1H, m), 7.67 (2H, m), 8.16 (2H, m), 8.42 (1H, m), 8.84 (1H, s) | 565.70 | 565.25 |
| 117 | δ = 7.25 (8H, m), 7.5 (1H, m), 7.58~7.59 (6H, m), 7.67 (2H, m), 7.73 (2H, m), 7.92 (2H, m), 8 (4H, m), 8.45 (1H, m), 8.54 (2H, m), 8.91 (1H, s) | 583.72 | 583.23 |
| 118 | δ = 7.25 (8H, m), 7.50~7.55 (5H, m), 7.61~7.67 (4H, m), 8.04~8.08 (4H, m), 8.42~8.45 (3H, m), 8.54~8.55 (4H, m), 8.91 (1H, s) | 583.72 | 583.23 |
| 120 | δ = 7.48~7.7 (17H, m), 8.04~8.08 (4H, m), 8.42~8.45 (3H, m), 8.54~8.55 (4H, m), 8.91 (1H, s) | 583.72 | 583.23 |
| 122 | δ = 7.47~7.5 (5H, m), 7.58~7.59 (6H, m), 7.67 (2H, m), 7.73 (2H, m), 7.85 (4H, m), 7.92 (2H, m), 8 (4H, m), 8.45 (1H, m), 8.54 (2H, m), 8.91 (1H, s) | 583.72 | 583.23 |
| 124 | δ = 7.25 (8H, m), 7.41~7.52 (15H, m), 7.67 (2H, m), 7.85 (4H, m), 8.45 (1H, m), 8.54 (2H, m), 8.91 (1H, s) | 635.79 | 635.26 |
| 126 | δ = 1.72 (12H, s), 7.28 (2H, m), 7.38 (2H, m), 7.47~7.55 (7H, m), 7.63~7.67 (4H, m), 7.77 (2H, m), 7.85~7.93 (8H, m), 8.45 (1H, m), 8.54 (2H, m), 8.91 (1H, s) | 715.92 | 715.32 |
| 140 | δ = 1.72 (6H, s), 7.28 (1H, m), 7.38~7.41 (2H, m), 7.5~7.55 (6H, m), 7.63~7.67 (3H, m), 7.77 (1H, m), 7.87~7.93 (2H, m), 8.45 (1H, m), 8.54 (2H, m), 8.91 (1H, s) | 447.57 | 447.20 |

TABLE 1-continued

| compound | $^1$H NMR($CDCl_3$, 200 MHz) | MS/FAB found | MS/FAB calculated |
|---|---|---|---|
| 152 | δ = 7.41 (2H, m), 7.5~7.55 (9H, m), 7.67 (2H, m), 7.79 (2H, m), 8.01 (2H, m), 8.45 (1H, m), 8.54~8.55 (4H, m), 8.91 (1H, s) | 457.56 | 457.18 |
| 153 | δ = 7.25 (4H, m), 7.41 (1H, m), 7.5~7.55 (7H, m), 7.61~7.67 (3H, m), 8.04~8.08 (2H, m), 8.42~8.45 (2H, m), 8.54~8.55 (3H, m), 8.91 (1H, s) | 457.56 | 457.18 |
| 156 | δ = 7.41 (1H, m), 7.48~7.59 (11H, m), 7.67~7.73 (4H, m), 7.92 (1H, m), 8 (2H, m), 8.45 (1H, m), 8.54 (2H, m), 8.91 (1H, s) | 457.56 | 457.18 |
| 157 | δ = 7.41~7.52 (8H, m), 7.58~7.59 (3H, m), 7.67 (2H, m), 7.73 (1H, m), 7.85 (2H, m), 7.92 (1H, m), 8 (2H, m), 8.45 (1H, m), 8.54 (2H, m), 8.91 (1H, s) | 457.56 | 457.18 |
| 209 | δ = 7.25 (4H, m), 7.41 (2H, m), 7.5~7.52 (10H, m), 7.67 (4H, m), 8.45 (2H, m), 8.54 (4H, m), 8.91 (2H, s) | 584.71 | 584.23 |
| 235 | δ = 1.72 (6H, s), 7.28 (1H, m), 7.38~7.41 (2H, m), 7.48 (2H, m), 7.5~7.55 (14H, m), 7.77 (1H, m), 7.87~7.93 (2H, m), 8.45 (2H, m), 8.54 (4H, m), 8.91 (2H, s) | 700.87 | 700.29 |
| 265 | δ = 7.41 (2H, m), 7.5~7.52 (9H, m), 7.58~7.59 (3H, m), 7.66~7.67 (5H, m), 7.73 (1H, m), 7.92 (1H, m), 8 (2H, m), 8.45 (1H, m), 8.54 (2H, m), 8.91 (1H, s) | 533.66 | 533.21 |
| 266 | δ = 7.41 (1H, m), 7.5~7.59 (8H, m), 7.67 (2H, m), 7.73~7.79 (3H, m), 7.92 (1H, m), 8~8.01 (4H, m), 8.45 (1H, m), 8.54~8.55 (4H, m), 8.91 (1H, s) | 507.62 | 507.20 |
| 267 | δ = 7.25 (4H, m), 7.5~7.67 (9H, m), 7.73 (1H, m), 7.92 (1H, m), 8~8.08 (4H, m), 8.42~8.45 (2H, m), 8.54~8.55 (3H, m), 8.91 (1H, s) | 507.62 | 507.20 |
| 303 | δ = 7.32~7.38 (2H, m), 7.5 (1H, m), 7.58~7.59 (3H, m), 7.66~7.73 (6H, m), 7.81 (1H, m), 7.89~7.92 (2H, m), 8 (2H, m), 8.45 (1H, m), 8.54 (2H, m), 8.91 (1H, s) | 471.55 | 471.16 |
| 354 | δ = 7.25 (4H, m), 7.5~7.67 (9H, m), 7.73 (1H, m), 7.92 (1H, m), 8~8.08 (4H, m), 8.42~8.45 (2H, m), 8.54~8.55 (3H, m), 8.91 (1H, s) | 507.62 | 507.20 |
| 383 | δ = 7.58~7.59 (7H, m), 7.67 (2H, m), 7.73 (2H, m), 7.92 (2H, m), 8 (4H, m), 8.38 (1H, m), 8.54 (2H, m), 8.83 (1H, m) | 431.53 | 431.17 |
| 384 | δ = 7.55~7.67 (9H, m), 8.04~8.08 (4H, m), 8.38~8.42 (3H, m), 8.54~8.55 (4H, m), 8.83 (1H, m) | 431.53 | 431.17 |
| 493 | δ = 7.25 (8H, m), 7.55~7.67 (9H, m), 8.04~8.08 (4H, m), 8.38~8.42 (3H, m), 8.54~8.55 (4H, m), 8.83 (1H, m) | 583.72 | 583.23 |
| 497 | δ = 7.47 (4H, m), 7.58~7.59 (7H, m), 7.67 (2H, m), 7.73 (2H, m), 7.85 (4H, m), 7.92 (2H, m), 8 (4H, m), 8.38 (1H, m), 8.54 (2H, m), 8.83 (1H, m) | 583.72 | 583.23 |
| 515 | δ = 1.72 (6H, s), 7.28 (1H, m), 7.38~7.41 (2H, m), 7.51~7.67 (9H, m), 7.77 (1H, m), 7.87~7.93 (2H, m), 8.38 (1H, m), 8.54 (2H, m), 8.83 (1H, m) | 447.57 | 447.20 |
| 518 | δ = 7.25 (4H, m), 7.41 (2H, m), 7.51~7.52 (8H, m), 7.58 (1H, m), 7.67 (2H, m), 8.38 (1H, m), 8.54 (2H, m), 8.83 (1H, m) | 407.51 | 407.17 |
| 525 | δ = 7.25 (4H, m), 7.41 (1H, m), 7.51~7.52 (4H, m), 7.58~7.59 (4H, m), 7.67 (2H, m), 7.73 (1H, m), 7.92 (1H, m), 8 (2H, m), 8.38 (1H, m), 8.54 (2H, m), 8.83 (1H, m) | 457.56 | 457.18 |
| 528 | δ = 7.25 (4H, m), 7.41 (1H, m), 7.51~7.67 (10H, m), 8.04~8.08 (2H, m), 8.38~8.42 (2H, m), 8.54~8.55 (3H, m), 8.83 (1H, m) | 457.56 | 457.18 |
| 531 | δ = 7.41 (1H, m), 7.48~7.59 (11H, m), 7.67~7.73 (4H, m), 7.92 (1H, m), 8 (2H, m), 8.38 (1H, m), 8.54 (2H, m), 8.83 (1H, m) | 457.56 | 457.18 |
| 532 | δ = 7.41~7.52 (7H, m), 7.58~7.59 (4H, m), 7.67 (2H, m), 7.73 (1H, m), 7.85 (2H, m), 7.92 (1H, m), 8 (2H, m), 8.38 (1H, m), 8.54 (2H, m), 8.83 (1H, m) | 457.56 | 457.18 |
| 635 | δ = 1.72 (6H, s), 7.28 (1H, m), 7.38 (1H, m), 7.55~7.67 (8H, m), 7.73~7.77 (2H, m), 7.87~7.93 (3H, m), 8 (2H, m), 8.38 (1H, m), 8.54 (2H, m), 8.83 (1H, m) | 497.63 | 497.21 |
| 637 | δ = 7.55~7.67 (9H, m), 7.73 (1H, m), 7.92 (1H, m), 8~8.08 (4H, m), 8.38~8.42 (2H, m), 8.54~8.55 (3H, m), 8.83 (1H, m) | 431.53 | 431.17 |
| 638 | δ = 7.25 (4H, m), 7.41 (1H, m), 7.51~7.52 (4H, m), 7.58~7.59 (4H, m), 7.67 (2H, m), 7.73 (1H, m), 7.92 (1H, m), 8 (2H, m), 8.38 (1H, m), 8.54 (2H, m), 8.83 (1H, m) | 457.56 | 457.18 |
| 650 | δ = 7.25 (4H, m), 7.41~7.52 (7H, m), 7.58~7.59 (4H, m), 7.67 (2H, m), 7.73 (1H, m), 7.85 (2H, m), 7.92 (1H, m), 8 (2H, m), 8.38 (1H, m), 8.54 (2H, m), 8.83 (1H, m) | 533.66 | 533.21 |
| 693 | δ = 1.72 (6H, s), 7.28 (1H, m), 7.38 (1H, m), 7.55~7.67 (8H, m), 7.77 (1H, m), 7.87~7.93 (2H, m), 8.04~8.08 (2H, m), 8.38~8.42 (2H, m), 8.54~8.55 (3H, m), 8.83 (1H, m) | 497.63 | 497.21 |
| 717 | δ = 7.41 (1H, m), 7.51~7.67 (12H, m), 7.73 (2H, m), 7.92 (2H, m), 8.04~8.08 (2H, m), 8.38~8.42 (2H, m), 8.54~8.55 (3H, m), 8.83 (1H, m) | 507.62 | 507.20 |

TABLE 1-continued

| compound | $^1$H NMR($CDCl_3$, 200 MHz) | MS/FAB found | MS/FAB calculated |
|---|---|---|---|
| 733 | δ = 7.5~7.67 (8H, m), 7.86 (1H, m), 7.98~8.08 (5H, m), 8.38~8.45 (3H, m), 8.54~8.55 (3H, m), 8.83 (1H, m) | 487.61 | 487.14 |
| 757 | δ = 7.41 (2H, m), 7.51~7.52 (8H, m), 7.6 (1H, m), 7.67 (2H, m), 7.78 (1H, m), 7.98 (1H, m), 8.06 (1H, m), 8.35 (1H, s), 8.54 (2H, m) | 381.47 | 381.15 |
| 758 | δ = 7.58~7.6 (7H, m), 7.67 (2H, m), 7.73~7.78 (3H, m), 7.92 (2H, m), 7.98~8 (5H, m), 8.06 (1H, m), 8.35 (1H, s), 8.54 (2H, m) | 481.59 | 481.18 |
| 759 | δ = 7.55~7.67 (9H, m), 7.78 (1H, m), 7.98~8.08 (6H, m), 8.35 (1H, s), 8.42 (2H, m), 8.54~8.55 (4H, m) | 481.59 | 481.18 |
| 761 | δ = 1.72 (12H, s), 7.28 (2H, m), 7.38 (2H, m), 7.55~7.67 (7H, m), 7.77~7.78 (3H, m), 7.87~7.98 (5H, m), 8.06 (1H, m), 8.35 (1H, s), 8.54 (2H, m) | 623.79 | 623.28 |
| 762 | δ = 7.25 (8H, m), 7.41 (2H, m), 7.51~7.52 (8H, m), 7.6 (1H, m), 7.67 (2H, m), 7.78 (1H, m), 7.98 (1H, m), 8.06 (1H, m), 8.35 (1H, s), 8.54 (2H, m) | 533.66 | 533.21 |
| 787 | δ = 7.41 (4H, m), 7.51~7.52 (16H, m), 7.6 (1H, m), 7.66~7.67 (8H, m), 7.78 (1H, m), 7.98 (1H, m), 8.06 (1H, m), 8.35 (1H, s), 8.54 (2H, m) | 685.85 | 685.28 |
| 840 | δ = 7.5~7.52 (4H, m), 7.6 (1H, m), 7.67~7.7 (4H, m), 7.78~7.79 (3H, m), 7.98 (3H, m), 8.06 (1H, m), 8.35 (1H, s), 8.54 (2H, m) | 493.64 | 493.10 |
| 875 | δ = 1.72 (12H, s), 7.25~7.28 (10H, m), 7.38 (2H, m), 7.55~7.67 (7H, m), 7.77~7.78 (3H, m), 7.87~7.98 (5H, m), 8.06 (1H, m), 8.35 (1H, s), 8.54 (2H, m) | 765.98 | 765.34 |
| 876 | δ = 1.72 (12H, s), 7.28 (2H, m), 7.38 (2H, m), 7.47 (4H, m), 7.55~7.67 (7H, m), 7.77~7.78 (3H, m), 7.85~7.98 (9H, m), 8.06 (1H, m), 8.35 (1H, s), 8.54 (2H, m) | 765.98 | 765.34 |
| 890 | δ = 1.72 (6H, s), 7.28 (1H, m), 7.38~7.41 (2H, m), 7.51~7.67 (9H, m), 7.77~7.78 (2H, m), 7.87~7.98 (3H, m), 8.06 (1H, m), 8.35 (1H, s), 8.54 (2H, m) | 497.63 | 497.23 |
| 898 | δ = 7.41 (2H, m), 7.51~7.52 (8H, m), 7.58~7.6 (3H, m), 7.67 (2H, m), 7.73~7.78 (3H, m), 7.92 (2H, m), 7.98 (1H, m), 8.06 (1H, m), 8.35 (1H, s), 8.54 (2H, m) | 507.62 | 507.20 |
| 912 | δ = 1.72 (6H, s), 7.28 (1H, m), 7.38~7.41 (2H, m), 7.48 (2H, m), 7.51~7.57 (11H, m), 7.77~7.78 (2H, m), 7.87~7.98 (3H, m), 8.06 (1H, m), 8.35 (1H, s), 8.54 (2H, m) | 573.72 | 573.25 |
| 1084 | δ = 1.72 (6H, s), 7.28 (1H, m), 7.38 (1H, m), 7.47 (2H, m), 7.55~7.67 (8H, m), 7.77~7.78 (2H, m), 7.85~8.08 (8H, m), 8.35 (1H, s), 8.42 (1H, m), 8.54~8.55 (3H, m) | 623.78 | 623.26 |
| 1126 | δ = 2.45 (3H, s), 7.18 (1H, m), 7.46~7.5 (2H, m), 7.58~7.59 (6H, m), 7.73 (2H, m), 7.92~8 (7H, m), 8.45 (1H, m), 8.91 (1H, m) | 445.55 | 445.18 |
| 1127 | δ = 2.45 (3H, s), 7.18 (1H, m), 7.46~7.55 (6H, m), 7.61 (2H, m), 7.94 (1H, m), 8.04~8.08 (4H, m), 8.42~8.45 (3H, m), 8.55 (2H, m), 8.91 (1H, m) | 445.55 | 445.18 |
| 1129 | δ = 1.41 (9H, s), 7.18 (1H, m), 7.46~7.5 (2H, m), 7.58~7.59 (6H, m), 7.73 (2H, m), 7.92~8 (7H, m), 8.45 (1H, m), 8.91 (1H, m) | 487.63 | 487.23 |
| 1132 | δ = 7.41 (1H, m), 7.5~7.52 (5H, m), 7.58~7.59 (6H, m), 7.73 (3H, m), 7.92 (2H, m), 8 (4H, m), 8.06 (1H, m), 8.34 (1H, m), 8.45 (1H, m), 8.91 (1H, m) | 507.62 | 507.20 |
| 1133 | δ = 7.41 (1H, m), 7.5~7.55 (9H, m), 7.61 (2H, m), 7.73 (1H, m), 8.04~8.08 (5H, m), 8.34 (1H, m), 8.42~8.45 (3H, m), 8.55 (2H, m), 8.91 (1H, m) | 507.62 | 507.20 |
| 1134 | δ = 1.72 (12H, s), 2.45 (3H, s), 7.18 (1H, m), 7.28 (2H, m), 7.38 (2H, m), 7.46~7.55 (4H, m), 7.63 (2H, m), 7.77 (2H, m), 7.87~7.94 (5H, m), 8.45 (1H, m), 8.91 (1H, m) | 577.76 | 577.28 |
| 1136 | δ = 1.72 (12H, s), 7.28 (2H, m), 7.38~7.41 (3H, m), 7.5~7.55 (7H, m), 7.63 (2H, m), 7.73~7.77 (3H, m), 7.87~7.93 (4H, m), 8.06 (1H, m), 8.34 (1H, m), 8.45 (1H, m), 8.91 (1H, m) | 639.82 | 639.29 |
| 1140 | δ = 7.5 (1H, m), 7.58~7.59 (9H, m), 7.73 (4H, m), 7.92 (3H, m), 8 (6H, m), 8.06 (1H, m), 8.34 (1H, m), 8.45 (1H, m), 8.91 (1H, m) | 557.68 | 557.21 |
| 1141 | δ = 7.5~7.61 (10H, m), 7.73 (2H, m), 7.92 (1H, m), 8~8.08 (7H, m), 8.34 (1H, m), 8.42~8.45 (3H, m), 8.55 (2H, m), 8.91 (1H, m) | 557.68 | 557.21 |
| 1144 | δ = 7.25 (8H, m), 7.41 (2H, m), 7.5~7.52 (9H, m), 7.58~7.59 (3H, m), 7.73 (2H, m), 7.92 (1H, m), 8 (2H, m), 8.06 (1H, m), 8.34 (1H, m), 8.45 (1H, m), 8.91 (1H, m) | 609.76 | 609.25 |
| 1146 | δ = 7.5~7.55 (7H, m), 7.61 (3H, m), 7.73 (1H, m), 8.04~8.08 (7H, m), 8.34 (1H, m), 8.42~8.45 (4H, m), 8.55 (3H, m), 8.91 (1H, m) | 557.68 | 557.21 |

TABLE 1-continued

| compound | $^1H$ NMR($CDCl_3$, 200 MHz) | MS/FAB found | MS/FAB calculated |
|---|---|---|---|
| 1150 | δ = 1.72 (6H, s), 7.28 (1H, m), 7.38 (1H, m), 7.5~7.63 (9H, m), 7.73~7.77 (4H, m), 7.87~7.93 (4H, m), 8 (4H, m), 8.06 (1H, m), 8.34 (1H, m), 8.45 (1H, m), 8.91 (1H, m) | 623.78 | 623.26 |
| 1156 | δ = 7.39~7.41 (6H, m), 7.5~7.52 (9H, m), 7.58~7.59 (3H, m), 7.73 (2H, m), 7.91~7.92 (5H, m), 8 (2H, m), 8.06 (1H, m), 8.34 (1H, m), 8.45 (1H, m), 8.91 (1H, m) | 633.78 | 633.25 |
| 1157 | δ = 1.72 (6H, s), 7.25~7.28 (9H, m), 7.38~7.41 (3H, m), 7.5~7.55 (10H, m), 7.63 (1H, m), 7.73~7.77 (2H, m), 7.87~7.93 (2H, m), 8.06 (1H, m), 8.34 (1H, m), 8.45 (1H, m), 8.91 (1H, m) | 675.86 | 675.29 |
| 1158 | δ = 1.72 (18H, s), 7.28 (3H, m), 7.38 (3H, m), 7.5~7.55 (4H, m), 7.63 (3H, m), 7.73~7.77 (4H, m), 7.87~7.93 (6H, m), 8.06 (1H, m), 8.34 (1H, m), 8.45 (1H, m), 8.91 (1H, m) | 755.98 | 755.36 |
| 1159 | δ = 1.72 (12H, s), 7.28 (2H, m), 7.38~7.41 (7H, m), 7.5~7.55 (7H, m), 7.63 (2H, m), 7.73~7.77 (3H, m), 7.87~7.93 (8H, m), 8.06 (1H, m), 8.34 (1H, m), 8.45 (1H, m), 8.91 (1H, m) | 816.04 | 815.36 |
| 1160 | δ = 2.45 (6H, s), 7.4 (2H, s), 7.41 (2H, m), 7.5~7.52 (9H, m), 8.45 (1H, m), 8.91 (1H, m) | 359.46 | 359.17 |
| 1165 | δ = 2.45 (3H, s), 7.18 (1H, m), 7.41~7.52 (7H, m), 7.58~7.59 (3H, m), 7.73 (1H, m), 7.92~8 (4H, m), 8.45 (1H, m), 8.91 (1H, m) | 395.49 | 395.17 |
| 1168 | δ = 1.72 (6H, s), 2.45 (3H, s), 7.18 (1H, m), 7.28 (1H, m), 7.38 (1H, m), 7.46~7.63 (7H, m), 7.73~7.77 (2H, m), 7.87~8 (6H, m), 8.45 (1H, m), 8.91 (1H, m) | 511.65 | 511.23 |
| 1173 | δ = 1.41 (9H, s), 1.72 (2H, s), 7.18 (1H, m), 7.28 (1H, m), 7.38 (1H, m), 7.46~7.63 (7H, m), 7.73~7.77 (2H, m), 7.87~8 (6H, m), 8.45 (1H, m), 8.91 (1H, m) | 553.73 | 553.28 |
| 1178 | δ = 1.72 (6H, s), 7.28 (1H, m), 7.38~7.41 (2H, m), 7.5~7.63 (10H, m), 7.73~7.77 (3H, m), 7.87~7.93 (3H, m), 8 (2H, m), 8.06 (1H, m), 8.34 (1H, m), 8.45 (1H, m), 8.91 (1H, m) | 573.72 | 573.25 |
| 1183 | δ = 1.72 (6H, s), 7.28 (1H, m), 7.38 (1H, m), 7.5~7.63 (9H, m), 7.73~7.77 (4H, m), 7.87~7.93 (4H, m), 8 (4H, m), 8.06 (1H, m), 8.34 (1H, m), 8.45 (1H, m), 8.91 (1H, m) | 623.78 | 623.26 |
| 1185 | δ = 7.41 (1H, m), 7.5~7.61 (11H, m), 7.73 (2H, m), 7.92 (1H, m), 8~8.08 (5H, m), 8.34 (1H, m), 8.42~8.45 (2H, m), 8.55 (1H, m), 8.91 (1H, m) | 507.62 | 507.20 |
| 1190 | δ = 7.25 (4H, m), 7.41 (2H, m), 7.5-7.52 (9H, m), 7.58~7.59 (3H, m), 7.73 (2H, m), 7.92 (1H, m), 8 (2H, m), 8.06 (1H, m), 8.34 (1H, m), 8.45 (1H, m), 8.91 (1H, m) | 533.66 | 533.21 |
| 1195 | δ = 1.72 (6H, s), 7.28 (1H, m), 7.38~7.41 (2H, m), 7.5~7.63 (10H, m), 7.73~7.77 (3H, m), 7.87~7.93 (3H, m), 8 (2H, m), 8.06 (1H, m), 8.34 (1H, m), 8.45 (1H, m), 8.91 (1H, m) | 573.72 | 573.25 |
| 1198 | δ = 7.25 (4H, m), 7.39~7.41 (5H, m), 7.5~7.52 (5H, m), 7.58~7.59 (6H, m), 7.73 (3H, m), 7.91~7.92 (6H, m), 8 (4H, m), 8.06 (1H, m), 8.34 (1H, m), 8.45 (1H, m), 8.91 (1H, m) | 759.93 | 759.29 |
| 1201 | δ = 7.25 (4H, m), 7.39~7.41 (6H, m), 7.5~7.52 (9H, m), 7.58~7.59 (3H, m), 7.73 (2H, m), 7.91~7.92 (5H, m), 8 (2H, m), 8.06 (1H, m), 8.34 (1H, m), 8.45 (1H, m), 8.91 (1H, m) | 709.87 | 709.28 |
| 1203 | δ = 1.72 (6H, s), 7.257.28 (5H, m), 7.38-7.41 (6H, m), 7.5-7.63 (10H, m), 7.73-7.77 (3H, m), 7.87-7.93 (7H, m), 8.0 (2H, m), 8.06 (1H, m), 8.34 (1H, m), 8.45 (1H, m), 8.91 (1H, m) | 826.03 | 825.34 |
| 1204 | δ = 7.5 (2H, m), 7.58~7.59 (6H, m), 7.73 (2H, m), 7.92 (2H, m), 8 (4H, m), 8.45 (2H, m), 8.91 (2H, m) | 432.51 | 432.16 |
| 1209 | δ = 7.55~7.61 (8H, m), 8.04~8.08 (4H, m), 8.38~8.42 (4H, m), 8.55 (2H, m), 8.83 (2H, m) | 432.51 | 432.16 |
| 1215 | δ = 1.72 (12H, s), 7.28 (2H, m), 7.38 (2H, m), 7.5~7.63 (6H, m), 7.77 (2H, m), 7.87~7.93 (4H, m), 8.38 (1H, m), 8.45 (1H, m), 8.83 (1H, m), 8.91 (1H, m) | 564.72 | 564.26 |

Example 1

Manufacture of an OLED Employing Organic Electroluminescent Compound According to the Invention An OLED device was manufactured by using an electroluminescent material according to the invention.

First, a transparent electrode ITO thin film (15Ω/□) (2) prepared from glass for OLED (produced by Samsung-Corning) (1) was subjected to ultrasonic washing with trichloroethylene, acetone, ethanol and distilled water, sequentially, and stored in isopropanol before use.

Then, an ITO substrate was equipped in a substrate folder of a vacuum vapor-deposit device, and 4,4',4"-tris(N,N-(2-naphthyl)-phenylamino)triphenylamine (2-TNATA, the structure is shown below) was placed in a cell of the vacuum vapor-deposit device, which was then ventilated up to $10^{-6}$ torr vacuum in the chamber. Electric current was applied to the cell to evaporate 2-TNATA, thereby providing vapor-deposit of a hole injecting layer (3) having 60 nm of thickness on the ITO substrate.

Then, to another cell of the vacuum vapor-deposit device, charged was N,N'-bis(α-naphthyl)-N,N'-diphenyl-4,4'-diamine (NPB, the structure is shown below), and electric current was applied to the cell to evaporate NPB, thereby providing vapor-deposit of a hole transport layer (4) with 20 nm of thickness on the hole injecting layer.

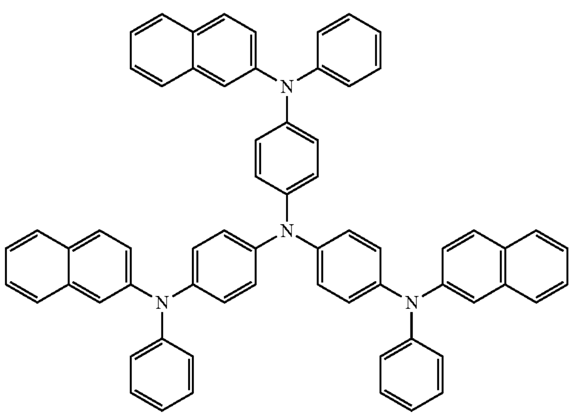

2-TNATA

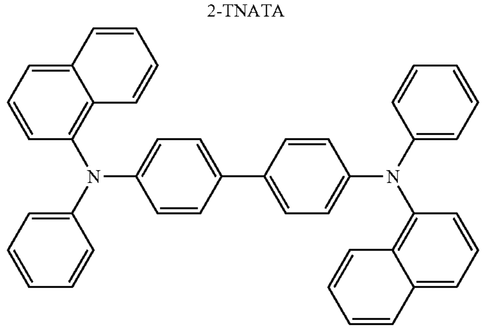

NPB

After forming the hole injecting layer and the hole transport layer, an electroluminescent layer was formed according to the following procedure. To one cell of a vacuum vapor-deposit device, charged was a compound according to the present invention (e.g. Compound 10) as electroluminescent material, while DSA-Ph (of which the structure is shown below) was charged to another cell. The two cells were simultaneously heated to carry out vapor-deposition at the rate of vapor-deposition of DSA-Ph of 2 to 5 wt %, thereby forming a vapor-deposit of an electroluminescent layer (5) having 30 nm thickness on the hole transport layer.

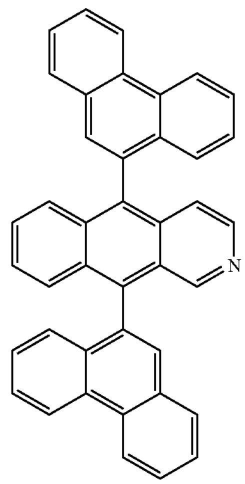

10

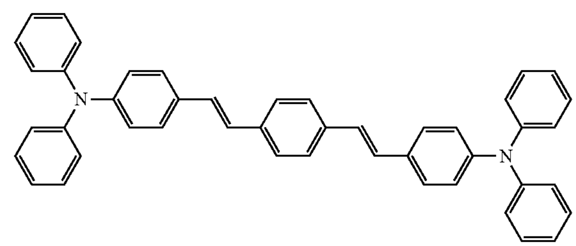

DSA-Ph

Then, tris(8-hydroxyquinoline)aluminum (III) (Alq) (of which the structure is shown below) was vapor-deposited as an electron transport layer (6) in a thickness of 20 nm, and then lithium quinolate (Liq) was vapor-deposited as an electron injecting layer (7) with a thickness of 1 to 2 nm. Thereafter, an Al cathode (8) was vapor-deposited in a thickness of 150 nm by using another vacuum vapor-deposit device to manufacture an OLED.

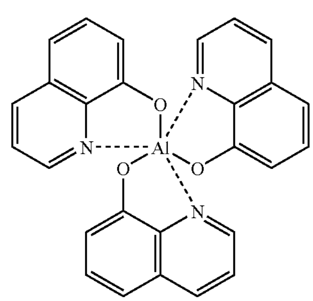

Alq

-continued

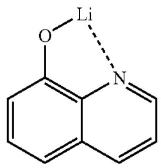

Liq

Each compound was employed as electroluminescent material for an OLED after purifying via vacuum sublimation at $10^{-6}$ torr.

Comparative Example 1

Manufacture of an OLED by Using Conventional Electroluminescent Material

After forming a hole injecting layer (3) and a hole transport layer (4) according to the same procedure as described in Example 1, dinaphthylanthracene (DNA) was charged to another cell of said vacuum vapor-deposit device, and DSA-Ph (as was in Example 1) was charged to still another cell. Then an electroluminescent layer (5) with a thickness of 30 nm was vapor-deposited on the hole transport layer at a vapor-deposition rate of 100:3.

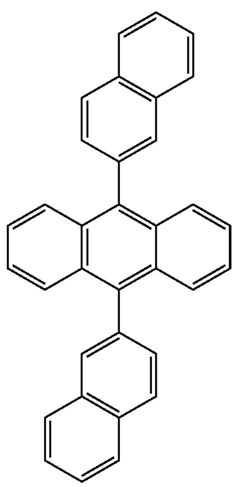

DNA

Then, an electron transport layer (6) and an electron injecting layer (7) were vapor-deposited according to the same procedure as in Example 1, and an Al cathode (8) was vapor-deposited thereon with a thickness of 150 nm by using another vacuum vapor-deposit device to manufacture an OLED.

Example 2

Manufacture of an OLED Employing Organic Electroluminescent Compound According to the Invention After forming a hole injecting layer and a hole transport layer according to the same procedure as in Example 1, a compound according to the present invention (e.g., Compound 10) was charged to one cell of said vacuum vapor-deposit device as electroluminescent material, and Compound (E) (of which the structure is shown below) was charged to another cell. The two substances were evaporated at different rates to provide doping at 2 to 5% by weight on the basis of the host, thereby vapor-depositing an electroluminescent layer with the thickness of 30 nm on the hole transport layer.

Compound E

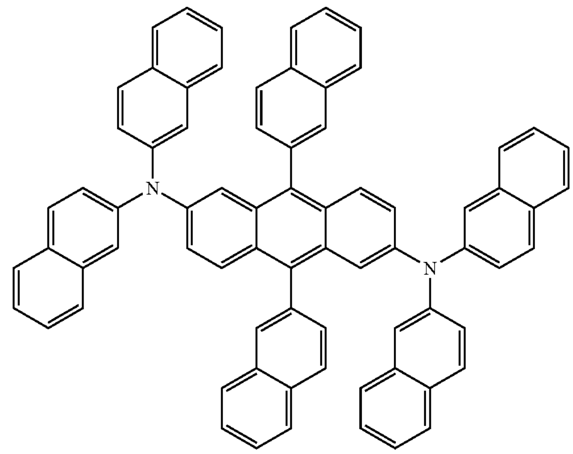

After vapor-depositing an electron transport layer and an electron injecting layer according to the same procedure as in Example 1, an Al cathode was vapor-deposited with a thickness of 150 nm by using another vacuum vapor-deposit device to manufacture an OLED.

Comparative Example 2

Manufacture of an OLED by Using Conventional Electroluminescent Material

After forming a hole injecting layer and a hole transport layer according to the same procedure as described in Example 1, tris(8-hydroxyquinoline)-aluminum (III) (Alq) was charged to another cell of said vacuum vapor-deposit device, and Coumarin 545T (C545T, of which the structure is shown below) was charged to still another cell. The two substances were evaporated at different rates to carry out doping, thereby vapor-depositing an electroluminescent layer with a thickness of 30 nm on the hole transport layer. The doping concentration preferably is from 1 to 3% by weight on the basis of Alq.

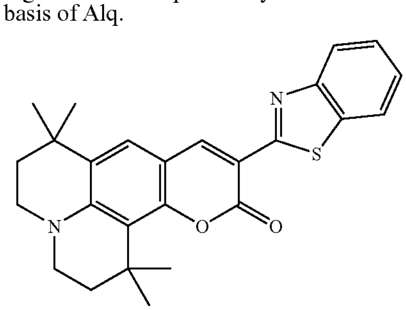

C545T

After vapor-depositing an electron transport layer and an electron injecting layer according to the same procedure as in Example 1, an Al cathode was vapor-deposited with a thickness of 150 nm by using another vacuum vapor-deposit device to manufacture an OLED.

Example 3

Electroluminescent Properties of OLED's Manufactured

The luminous efficiencies of the OLED's comprising the organic electroluminescent compounds according to the present invention (Examples 1 and 2) or conventional EL compound (Comparative Examples 1 and 2) were measured at 5,000 cd/m$^2$, respectively, and the results are shown in Table 2.

TABLE 2

| No. | Host | Dopant | Doping concentration (wt %) | Luminous efficiency (cd/A) @5000 cd/m$^2$ | Color |
|---|---|---|---|---|---|
| 1 | Compound 12 | DSA-Ph | 3 | 8.5 | Blue |
| 2 | Compound 41 | DSA-Ph | 3 | 8.2 | Blue |
| 3 | Compound 122 | DSA-Ph | 3 | 7.6 | Blue |
| 4 | Compound 223 | DSA-Ph | 3 | 7.4 | Blue |
| 5 | Compound 231 | DSA-Ph | 3 | 7.6 | Blue |
| 6 | Compound 267 | DSA-Ph | 3 | 7.8 | Blue |
| 7 | Compound 345 | DSA-Ph | 3 | 8.2 | Blue |
| 8 | Compound 502 | DSA-Ph | 3 | 8.1 | Blue |
| 9 | Compound 598 | DSA-Ph | 3 | 8.0 | Blue |
| 10 | Compound 877 | Compoud E | 3 | 18.3 | Green |
| 11 | Compound 895 | Compoud E | 3 | 19.2 | Green |
| 12 | Compound 963 | Compoud E | 3 | 20.2 | Green |
| 13 | Compound 1024 | Compoud E | 3 | 21.6 | Green |
| 14 | Compound 1141 | Compoud E | 3 | 18.1 | Green |
| 15 | Compound 1179 | Compoud E | 3 | 19.6 | Green |
| 16 | Compound 1199 | Compoud E | 3 | 18.7 | Green |
| Comp. 1 | DNA | DSA-Ph | 3 | 7.3 | Jade green |
| Comp. 2 | Alq | Compound C545T | 1 | 10.3 | Green |

As can be seen from Table 2, when the organic electroluminescent compound according to the invention was applied to a blue electroluminescent device, with same type of doping of DSA-Ph, the device realized far better color purity as compared to the device employing DNA according to Comparative Example 1 (conventional electroluminescent material), while having comparable luminous efficiency.

Further, the material according to the invention was applied to green electroluminescent devices. As can be seen from Table 2, the device employing Compound (1024) (an organic electroluminescent compound according to the invention) with 3.0% doping of Compound (E) showed more than twice of luminous efficiency as compared to the device employing Alq:C545T as conventional material (Comparative Example 2).

Accordingly, the organic electroluminescent compounds according to the present invention can be used as blue or green electroluminescent material of high efficiency. Moreover, the device, to which the host material according to the invention was applied, showed noticeable improvement in view of color purity. The improvement in both color purity and luminous efficiency proves that the materials of the present invention have excellent properties.

The invention claimed is:

1. An organic electroluminescent compound represented by Chemical Formula (1):

Chemical Formula 1

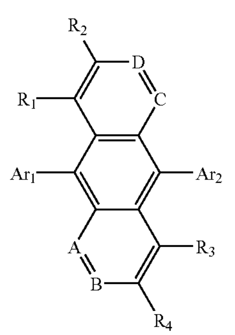

In Chemical Formula (1), A, B, C and D independently represent $CR_5$ or N, provided that A, B, C and D cannot represent $CR_5$ all at the same time;

$R_1$ through $R_5$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60) cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl, or $R_1$ and $R_2$ or $R_3$ and $R_4$ may be independently linked via (C3-C60)alkylene or (C3-C60)alkenylene with or without a fused ring to form an alicyclic ring, a mono- or a polycyclic aromatic ring; the alkylene or alkenylene may be further substituted by one or more substituent(s) selected from halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60) alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60) alkylthio, (C6-C60)arylthio, (C1-C60)alkoxycarbonyl, (C1-C60)alkylcarbonyl, (C6-C60)arylcarbonyl, carboxyl, nitro and hydroxyl;

$Ar_1$ and $Ar_2$ independently represent (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri (C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkylthio, (C1-C60)alkoxycarbonyl, (C1-C60)alkylcarbonyl, (C6-C60)arylcarbonyl, carboxyl, nitro, hydroxyl,

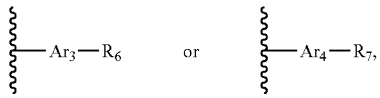

or a substituent represented by one of the following structural formulas:

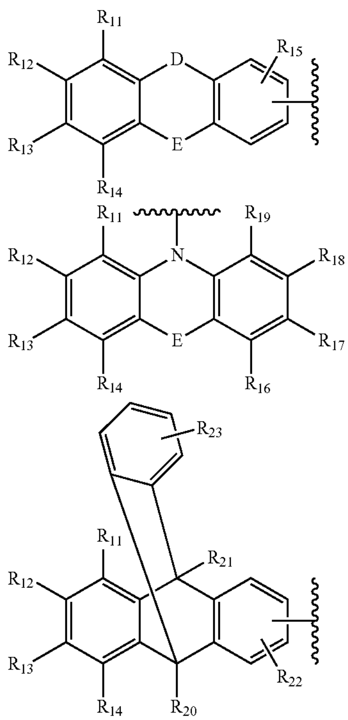

$Ar_3$ and $Ar_4$ independently represent (C1-C60)alkylenoxy, (C1-C60)alkylenethio, (C6-C60)arylenoxy, (C6-C60) arylenethio, (C6-C60)arylene or (C3-C60)heteroarylene;

$R_6$ and $R_7$ independently represent (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkylthio, (C1-C60)alkoxycarbonyl, (C1-C60)alkylcarbonyl, (C6-C60)arylcarbonyl, carboxyl, nitro or hydroxyl;

$R_{11}$ through $R_{23}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, a monocyclic or polycyclic aromatic ring;

D and E independently represent a chemical bond, —$(CR_{31}R_{32})_a$, —$N(R_{33})$—, —S—, —O—, —$Si(R_{34})(R_{35})$—, —$P(R_{36})$—, —C(═O)—, —$B(R_{37})$—, —$In(R_{38})$—, —Se—, —$Ge(R_{39})(R_{40})$, —$Sn(R_{41})(R_{42})$—, —$Ga(R_{43})$— or —$(R_{44})C{=}C(R_{45})$—;

$R_{31}$ through $R_{45}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl; or $R_{31}$ and $R_{32}$, $R_{34}$ and $R_{35}$, $R_{39}$ and $R_{40}$, $R_{41}$, and $R_{42}$, or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino, arylamino, alkylthio, aryloxy, arylthio of $R_1$ through $R_9$, $Ar_1$, $Ar_2$, $R_1$ through $R_{23}$ and $R_{31}$ through $R_{45}$; and alkylenoxy, alkylenethio, arylenoxy, arylenethio, arylene or heteroarylene of $Ar_3$ and $Ar_4$ may be further substituted by one or more substituent(s) selected from halogen, (C1-C60)alkyl with or without halogen substituent(s), (C6-C60)aryl, (C3-C60)heteroaryl with or without (C6-C60) aryl substituent(s), 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60) alkylcarbonyl, (C6-C60)arylcarbonyl, carboxyl, nitro and hydroxyl; and a is an integer from 0 to 4.

2. The organic electroluminescent compound according to claim 1, which is selected from the compounds represented by one of Chemical Formulas (2) to (7):

Chemical Formula 2

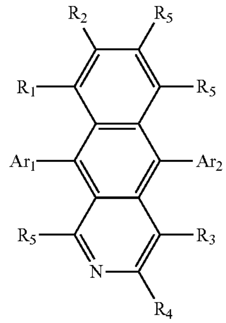

-continued

Chemical Formula 3

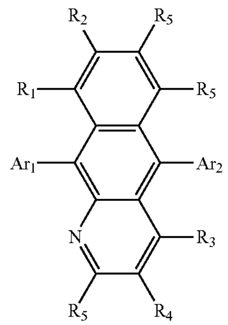

Chemical Formula 4

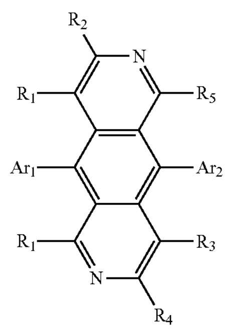

Chemical Formula 5

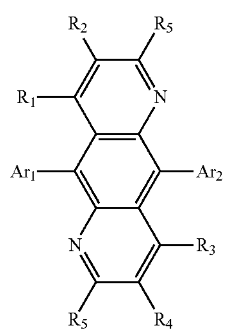

Chemical Formula 6

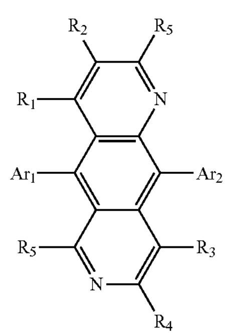

-continued

Chemical Formula 7

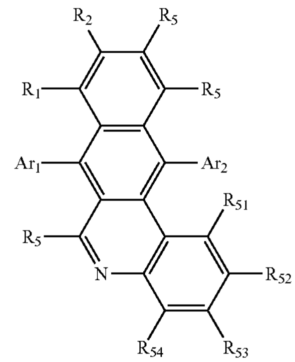

wherein, $Ar_1$, $Ar_2$ and $R_1$ through $R_5$ are defined as in claim 1; and $R_{51}$ through $R_{54}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro or hydroxyl, or $R_{52}$ and $R_{53}$ may be linked via (C3-C60)alkylene or (C3-C60)alkenylene with or without a fused ring to form an alicyclic ring, or a monocyclic or polycyclic aromatic ring.

3. The organic electroluminescent device according to claim 2, which is comprised of a first electrode; a second electrode; and at least one organic layer(s) interposed between the first electrode and the second electrode; wherein the organic layer comprises one or more organic electroluminescent compound(s) according to claim 1 or 2, and one or more dopant(s) selected from the compounds represented by one of Chemical Formulas (8) to (10):

Chemical Formula 8

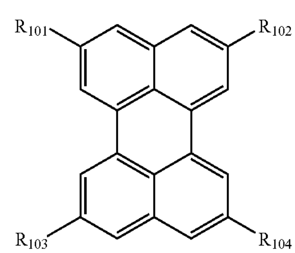

wherein, $R_{101}$ through $R_{104}$ independently represent hydrogen, halogen, (C1-C60)alkyl, (C6-C60)aryl, (C4-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)

alkylcarbonyl, (C6-C60)arylcarbonyl, carboxyl, nitro or hydroxyl; or each of $R_{101}$ through $R_{104}$ may be linked to an adjacent substituent via (C3-C60)alkylene or (C3-C60)alkenylene with or without fused ring to form an alicyclic ring, or a monocyclic or polycyclic aromatic ring;

the alkyl, alkenyl, alkynyl, cycloalkyl, heterocycloalkyl, aryl, heteroaryl, arylsilyl, alkylsilyl, alkoxy, aryloxy, arylthio, alkylamino, arylamino of $R_{101}$ through $R_{104}$, or the alicyclic ring, or the monocyclic or polycyclic aromatic ring formed therefrom by linkage to an adjacent substituent via (C3-C60)alkylene or (C3-C60)alkenylene with or without a fused ring may be further substituted by one or more substituent(s) selected from halogen, (C1-C60)alkyl, (C6-C60)aryl, (C4-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60)alkylthio, (C6-C60)arylthio, (C1-C60)alkoxycarbonyl, (C1-C60)alkylcarbonyl, (C6-C60)arylcarbonyl, carboxyl, nitro and hydroxyl;

Chemical Formula 9

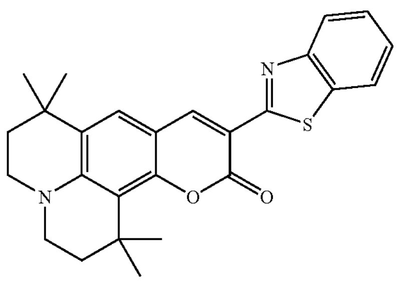

Chemical Formula 10

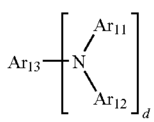

wherein, $Ar_{11}$ and $Ar_{12}$ independently represent (C1-C60)alkyl, (C6-C60)aryl, (C4-C60)heteroaryl, (C6-C60)arylamino, (C1-C60)alkylamino, 5- or 6-membered heterocycloalkyl containing one or more heteroatom(s) selected from N, O and S, (C3-C60)cycloalkyl, or arylene having one of the structures shown below: or

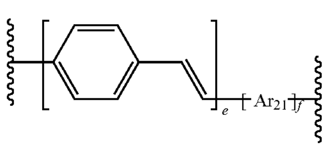

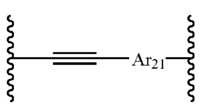

$Ar_{11}$ and $Ar_{12}$ may be linked via (C3-C60)alkylene or (C3-C60)alkenylene with or without a fused ring to form an alicyclic ring, or a monocyclic or polycyclic aromatic ring;

$Ar_{13}$ represents (C6-C60)arylene, (C4-C60)heteroarylene or an arylene having one of the structures shown below:

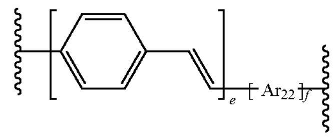

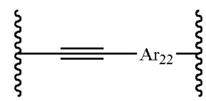

wherein, $Ar_{21}$ and $Ar_{22}$ independently represent (C6-C60)arylene or (C4-C60)heteroarylene;

d is an integer from 1 to 4, e is an integer from 1 to 4, and f is an integer of 0 or 1; and the alkyl, aryl, heteroaryl, arylamino, alkylamino, cycloalkyl or heterocycloalkyl of $Ar_{11}$ and $Ar_{12}$; or the arylene or heteroarylene of $Ar_{13}$, $Ar_{21}$ and $Ar_{22}$ may be further substituted by one or more substituent(s) selected from a group consisting of halogen, (C1-C60)alkyl, (C6-C60)aryl, (C4-C60)heteroaryl, 5- or 6-membered heterocycloalkyl containing one or more heteroatom(s) selected from N, O and S, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro and hydroxyl.

4. The organic electroluminescent device according to claim 3, wherein the organic layer comprises one or more compounds selected from a group consisting of arylamine compounds and styrylarylamine compounds.

5. The organic electroluminescent device according to claim 3, wherein the organic layer comprises one or more metal(s) selected from a group consisting of organic metals of Group 1, Group 2, $4^{th}$ period and $5^{th}$ period transition metals, lanthanide metals and d-transition elements in the Periodic Table of Elements.

6. The organic electroluminescent device according to claim 3, which is an organic electroluminescent display comprising the organic electroluminescent compound according to claim 1 or 2 and a compound having the electroluminescent peak at wavelength of not less than 560 nm.

7. The organic electroluminescent device according to claim 3, wherein the organic layer comprises a charge generating layer as well as the electroluminescent layer.

8. An organic electroluminescent device according to claim 4, wherein a mixed region of reductive dopant and organic substance, or a mixed region of oxidative dopant and organic substance is placed on the inner surface of one or both electrode(s) among the pair of electrodes.

9. An organic solar cell which comprises an organic electroluminescent compound represented by Chemical Formula (1):

Chemical Formula 1

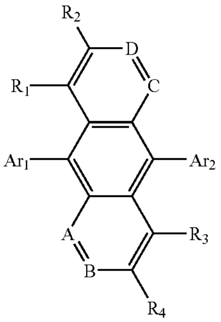

In Chemical Formula (1), A, B, C and D independently represent $CR_5$ or N, provided that A, B, C and D cannot represent $CR_5$ all at the same time;

$R_1$ through $R_5$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60) cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60) aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl, or $R_1$ and $R_2$ or $R_3$ and $R_4$ may be independently linked via (C3-C60)alkylene or (C3-C60)alkenylene with or without a fused ring to form an alicyclic ring, a mono- or a polycyclic aromatic ring; the alkylene or alkenylene may be further substituted by one or more substituent(s) selected from halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60) alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C1-C60) alkylthio, (C6-C60)arylthio, (C1-C60)alkoxycarbonyl, (C1-C60)alkylcarbonyl, (C6-C60)arylcarbonyl, carboxyl, nitro and hydroxyl;

$Ar_1$ and $Ar_2$ independently represent (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri (C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkylthio, (C1-C60)alkoxycarbonyl, (C1-C60)alkylcarbonyl, (C6-C60)arylcarbonyl, carboxyl, nitro, hydroxyl,

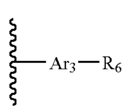

or

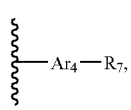

or a substituent represented by one of the following structural formulas:

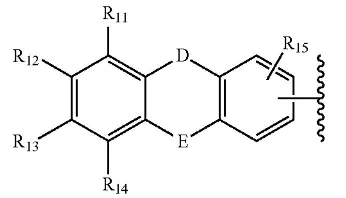

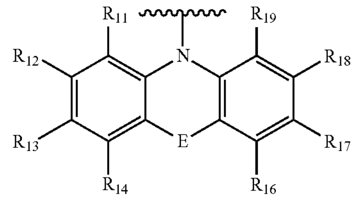

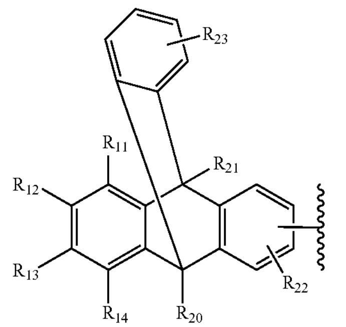

$Ar_3$ and $Ar_4$ independently represent (C1-C60)alkylenoxy, (C1-C60)alkylenethio, (C6-C60)arylenoxy, (C6-C60) arylenethio, (C6-C60)arylene or (C3-C60)heteroarylene;

$R_6$ and $R_7$ independently represent (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri (C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60) arylthio, (C1-C60)alkylthio, (C1-C60)alkoxycarbonyl, (C1-C60)alkylcarbonyl, (C6-C60)arylcarbonyl, carboxyl, nitro or hydroxyl;

$R_{11}$ through $R_{23}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl (C6-C60)arylsilyl, tri(C6-C60)arylsilyl, adamantyl, (C7-C60)bicycloalkyl, (C2-C60)alkenyl, (C2-C60) alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl; or each of $R_{11}$ through $R_{23}$ may be linked to an adjacent substituent via (C3-C60)alkylene or (C3-C60)alkenylene with or without a fused ring to form an alicyclic ring, a monocyclic or polycyclic aromatic ring;

D and E independently represent a chemical bond, $—(CR_{31}R_{32})_a—$, $—N(R_{33})—$, —S—, —O—, —Si $(R_{34})(R_{35})$—, —$P(R_{36})$—, —C(=O)—, —$B(R_{37})$—, —$In(R_{38})$—, —Se—, —$Ge(R_{39})(R_{40})$—, —$Sn(R_{41})(R_{42})$—, —$Ga(R_{43})$— or —$(R_{44})C{=}C(R_{45})$—;

$R_{31}$ through $R_{45}$ independently represent hydrogen, halogen, (C1-C60)alkyl, (C6-C60)aryl, (C3-C60)heteroaryl, 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro or hydroxyl; or $R_{31}$ and $R_{32}$, $R_{34}$ and $R_{35}$, $R_{39}$ and $R_{40}$, $R_{41}$ and $R_{42}$, or $R_{44}$ and $R_{45}$ may be linked via (C3-C60)alkylene or (C3-C60)alkenylene with or without a fused ring to form an alicyclic ring, or a monocyclic or polycyclic aromatic ring;

the alkyl, aryl, heteroaryl, heterocycloalkyl, cycloalkyl, trialkylsilyl, dialkylarylsilyl, triarylsilyl, adamantyl, bicycloalkyl, alkenyl, alkynyl, alkylamino, arylamino, alkylthio, aryloxy, arylthio of $R_1$ through $R_9$, $Ar_1$, $Ar_2$, $R_{11}$ through $R_{23}$ and $R_{31}$ through $R_{45}$; and alkylenoxy, alkylenethio, arylenoxy, arylenethio, arylene or heteroarylene of $Ar_3$ and $Ar_4$ may be further substituted by one or more substituent(s) selected from halogen, (C1-C60)alkyl with or without halogen substituent(s), (C6-C60)aryl, (C3-C60)heteroaryl with or without (C6-C60)aryl substituent(s), 5- or 6-membered heterocycloalkyl containing one or more heteroatom(s) selected from N, O, S and Si, (C3-C60)cycloalkyl, tri(C1-C60)alkylsilyl, di(C1-C60)alkyl(C6-C60)arylsilyl, tri(C6-C60)arylsilyl, adamantyl, (C7-C60)bicycloalkyl, (C2-C60)alkenyl, (C2-C60)alkynyl, (C1-C60)alkoxy, cyano, (C1-C60)alkylamino, (C6-C60)arylamino, (C6-C60)ar(C1-C60)alkyl, (C6-C60)aryloxy, (C6-C60)arylthio, (C1-C60)alkylthio, (C1-C60)alkoxycarbonyl, (C1-C60)alkylcarbonyl, (C6-C60)arylcarbonyl, carboxyl, nitro and hydroxyl; and a is an integer from 0 to 4.

* * * * *